US009775404B2

(12) United States Patent
Lyden

(10) Patent No.: US 9,775,404 B2
(45) **Date of Patent: *Oct. 3, 2017**

(54) CUSTOM ARTICLE OF FOOTWEAR AND METHOD OF MAKING THE SAME

(71) Applicant: Robert M. Lyden, Aloha, OR (US)

(72) Inventor: Robert M. Lyden, Aloha, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 15/175,042

(22) Filed: Jun. 7, 2016

(65) Prior Publication Data

US 2016/0353837 A1 Dec. 8, 2016

Related U.S. Application Data

(60) Division of application No. 13/465,020, filed on May 6, 2012, now Pat. No. 9,357,813, which is a (Continued)

(51) Int. Cl.

| | |
|---|---|
| ***A43B 13/18*** | (2006.01) |
| ***A43B 1/04*** | (2006.01) |
| ***A43B 1/00*** | (2006.01) |
| ***A43B 3/12*** | (2006.01) |
| ***A43B 7/14*** | (2006.01) |
| ***A43B 7/22*** | (2006.01) |
| ***A43B 13/36*** | (2006.01) |
| ***A43B 23/04*** | (2006.01) |
| ***A43D 1/02*** | (2006.01) |
| ***A43D 11/00*** | (2006.01) |
| ***G06Q 30/06*** | (2012.01) |

(Continued)

(52) U.S. Cl.

CPC .......... *A43B 13/183* (2013.01); *A43B 1/0063* (2013.01); *A43B 1/0081* (2013.01); *A43B 1/04* (2013.01); *A43B 3/128* (2013.01); *A43B 3/26* (2013.01); *A43B 7/1465* (2013.01); *A43B 7/22* (2013.01); *A43B 13/04* (2013.01); *A43B 13/122* (2013.01); *A43B 13/141* (2013.01); *A43B 13/184* (2013.01); *A43B 13/186* (2013.01); *A43B 13/188* (2013.01); *A43B 13/36* (2013.01); *A43B 23/021* (2013.01); *A43B 23/026* (2013.01); *A43B 23/028* (2013.01); *A43B 23/0215* (2013.01); *A43B 23/042* (2013.01); *A43D 1/02* (2013.01); *A43D 11/006* (2013.01); *G06Q 30/0621* (2013.01); *B33Y 80/00* (2014.12)

(58) Field of Classification Search

CPC ... A43B 13/183; A43B 13/186; A43B 13/181; A43B 13/182; A43B 13/184; A43B 13/185

USPC .......................................... 36/27, 38, 28, 7.8

See application file for complete search history.

(56) References Cited

U.S. PATENT DOCUMENTS 898,084 A * 9/1908 Backermann ........... A43B 5/18 36/7.8

2,399,543 A 4/1946 Dack (Continued)

FOREIGN PATENT DOCUMENTS

DE 3415705 A1 10/1985

*Primary Examiner* — Ted Kavanaugh

(57) ABSTRACT

The present invention teaches a method of making a custom article of footwear. Further, the article of footwear can include a knitted upper and means for cushioning. In addition, the components of the article of footwear can be selected from a wide range of options, and can be easily removed and replaced, as desired.

17 Claims, 228 Drawing Sheets

Related U.S. Application Data continuation of application No. 12/803,891, filed on Jul. 8, 2010, now Pat. No. 8,209,883, which is a continuation of application No. 11/516,166, filed on Sep. 6, 2006, now abandoned, which is a continuation-in-part of application No. 10/279,626, filed on Oct. 24, 2002, now Pat. No. 7,107,235, which is a continuation-in-part of application No. 10/152,402, filed on May 21, 2002, now Pat. No. 7,016,867, which is a continuation-in-part of application No. 09/573,121, filed on May 17, 2000, now Pat. No. 6,601,042, which is a continuation-in-part of application No. 09/523,341, filed on Mar. 10, 2000, now Pat. No. 6,449,878.

(60) Provisional application No. 60/360,784, filed on Mar. 1, 2002.

(51) Int. Cl.

| | |
|---|---|
| ***A43B 3/26*** | (2006.01) |
| ***A43B 13/04*** | (2006.01) |
| ***A43B 13/12*** | (2006.01) |
| ***A43B 13/14*** | (2006.01) |
| ***A43B 23/02*** | (2006.01) |
| *B33Y 80/00* | (2015.01) |

(56) References Cited

U.S. PATENT DOCUMENTS

| | | | | |
|---|---|---|---|---|
| 5,367,790 | A * | 11/1994 | Gamow | A43B 5/06 36/27 |
| 5,528,842 | A * | 6/1996 | Ricci | A43B 13/12 36/103 |
| 5,701,686 | A * | 12/1997 | Herr | A43B 5/06 36/27 |
| 8,959,797 | B2 | 2/2015 | Lyden | |
| 9,339,079 | B2 | 5/2016 | Lucas et al. | |
| 9,345,285 | B2 | 5/2016 | Lucas et al. | |
| 9,357,813 | B2 * | 6/2016 | Lyden | A43B 1/0081 |
| 2007/0209230 | A1 | 9/2007 | Dillon et al. | |
| 2008/0034615 | A1 | 2/2008 | Nishiwaki et al. | |

* cited by examiner

FIG. 161
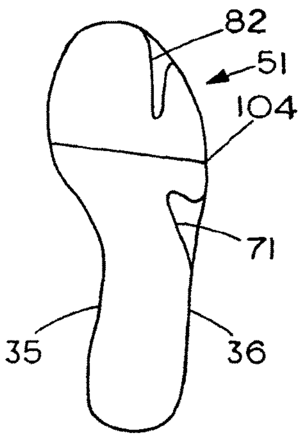
FIG. 162
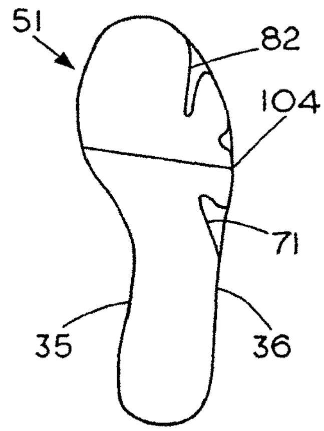
FIG. 163
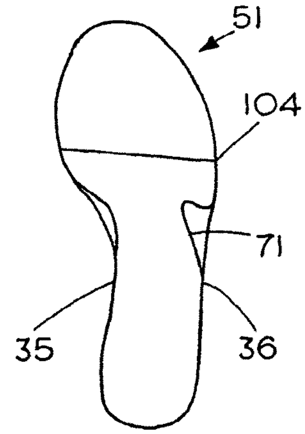
FIG. 164
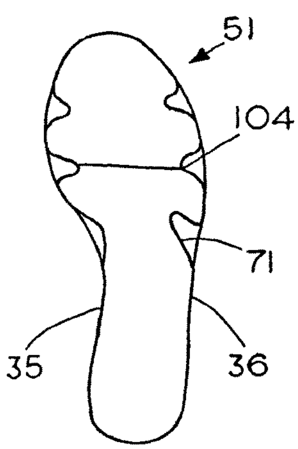
FIG. 165
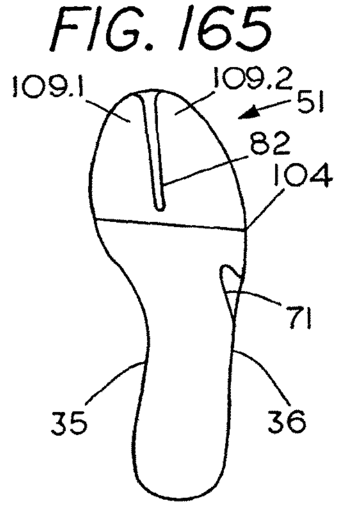
FIG. 166
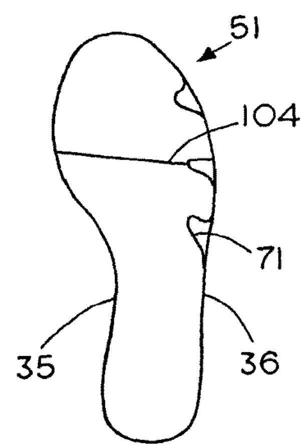
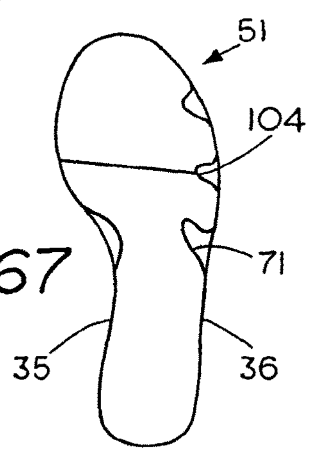
FIG. 167
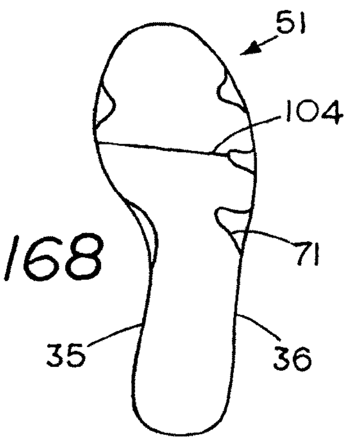
FIG. 168

FIG. 169
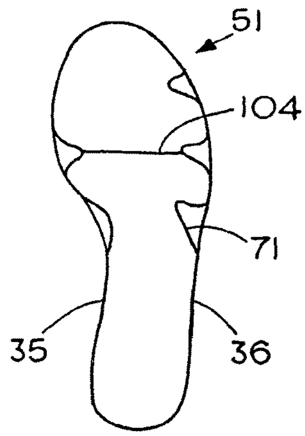
FIG. 170
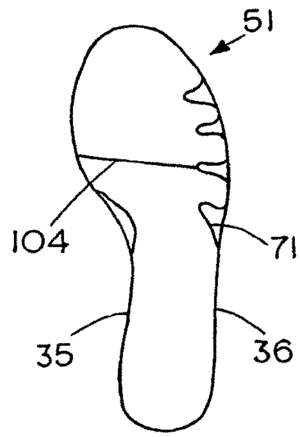
FIG. 171
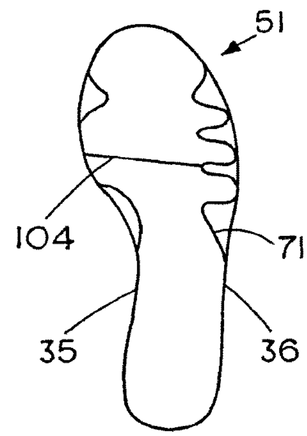
FIG. 172
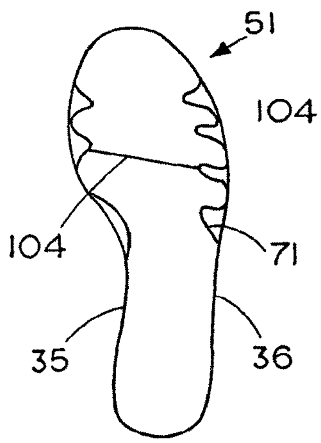
FIG. 173
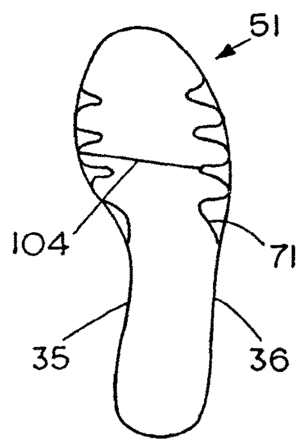
FIG. 174
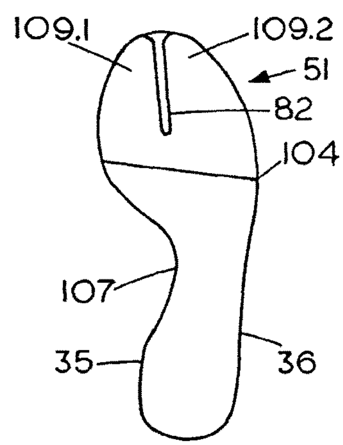
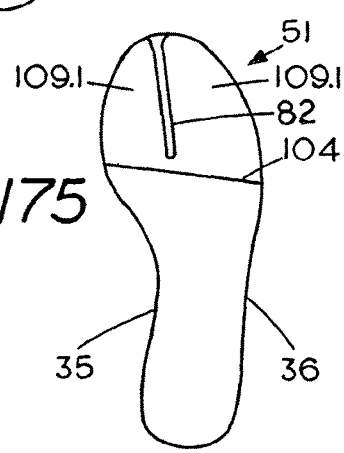
FIG. 175
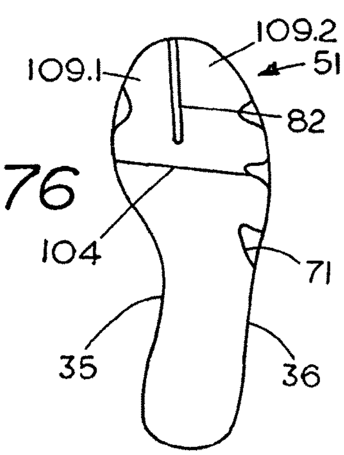
FIG. 176

FIG. 185
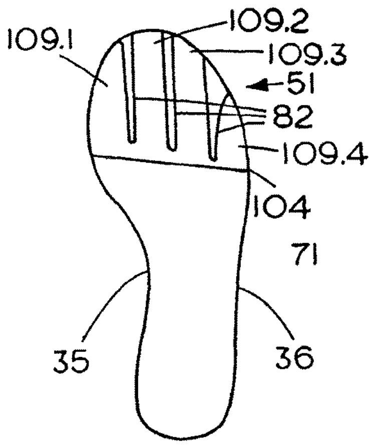
FIG. 186
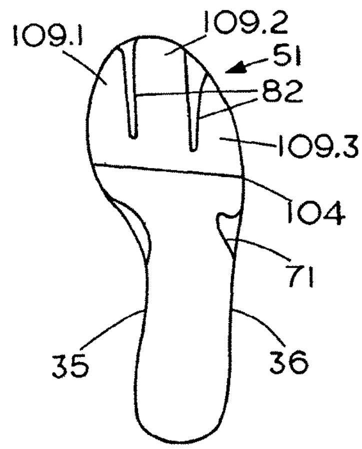
FIG. 187
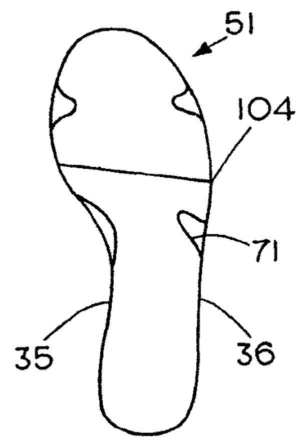
FIG. 188
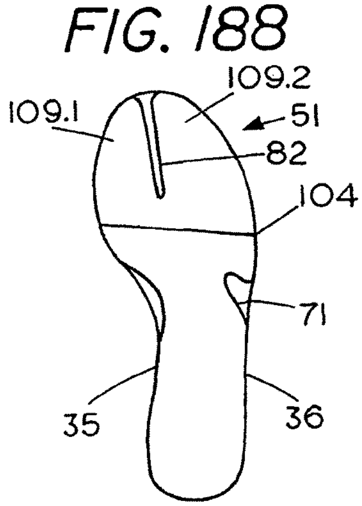
FIG. 189
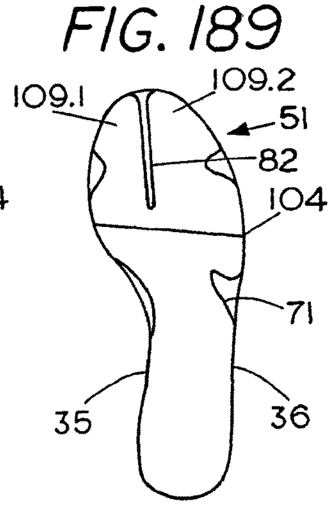
FIG. 190
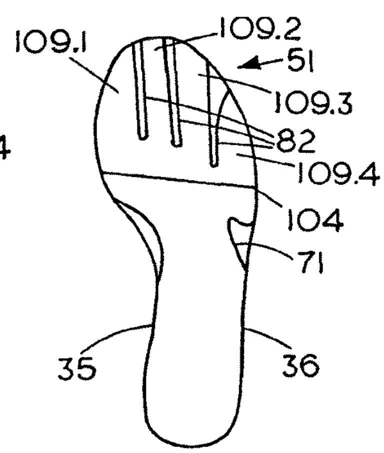
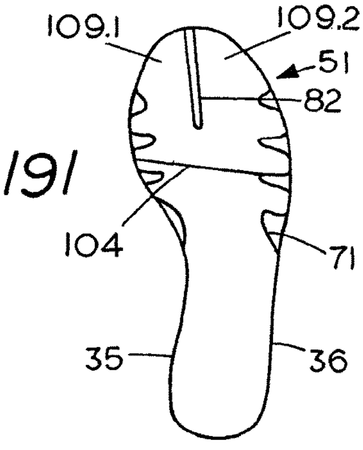
FIG. 191
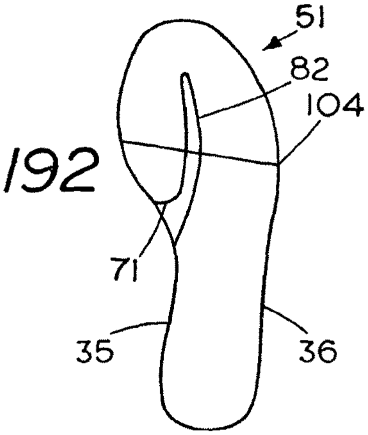
FIG. 192

FIG. 193
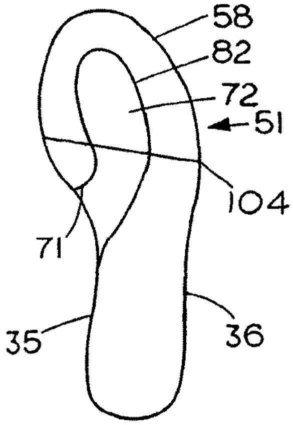
FIG. 194
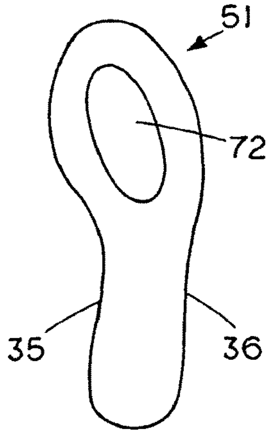
FIG. 195
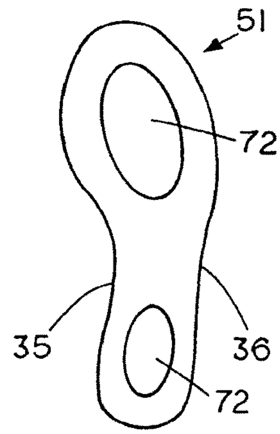
FIG. 196
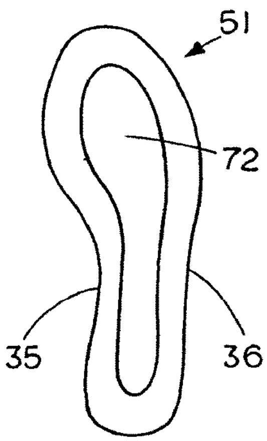
FIG. 197
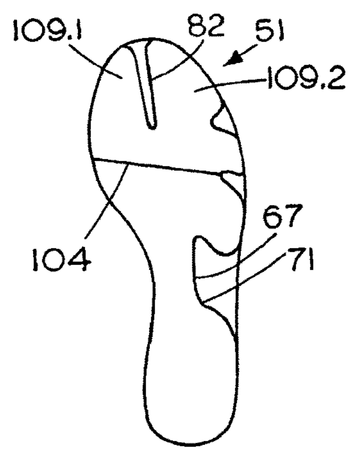
FIG. 198
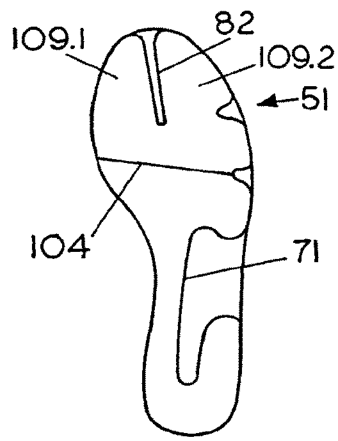
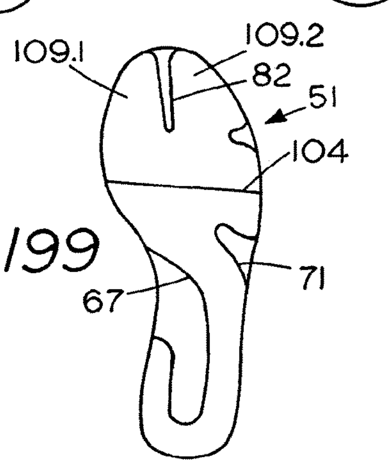
FIG. 199
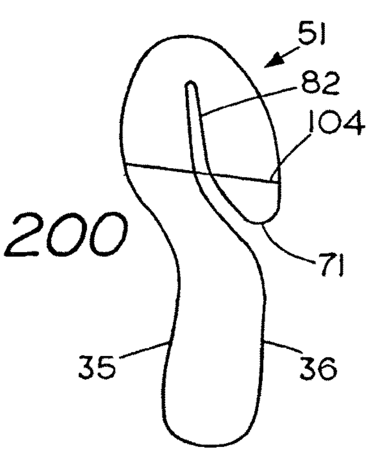
FIG. 200

FIG. 201
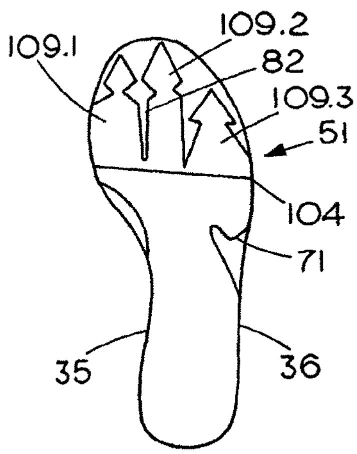
FIG. 202
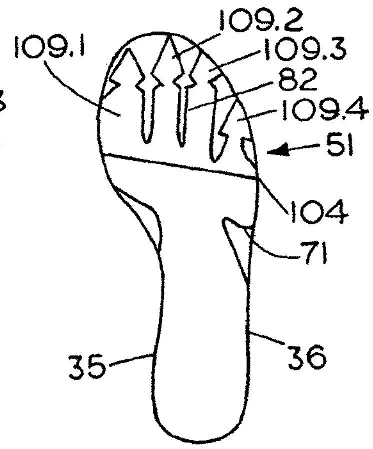
FIG. 203
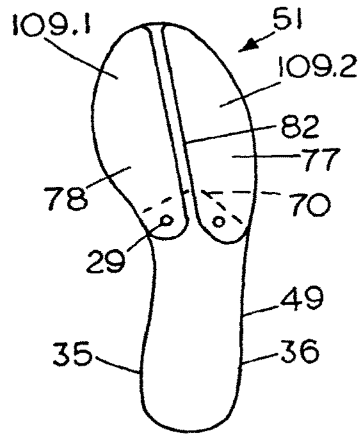
FIG. 204
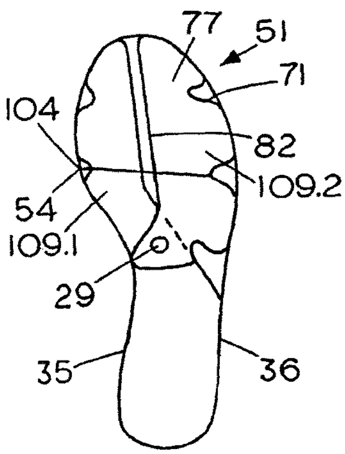
FIG. 205
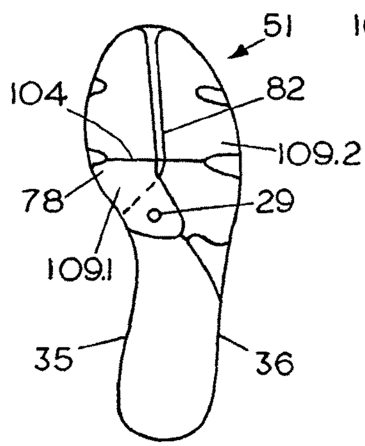
FIG. 206
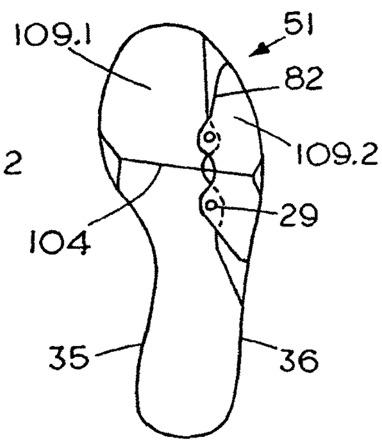
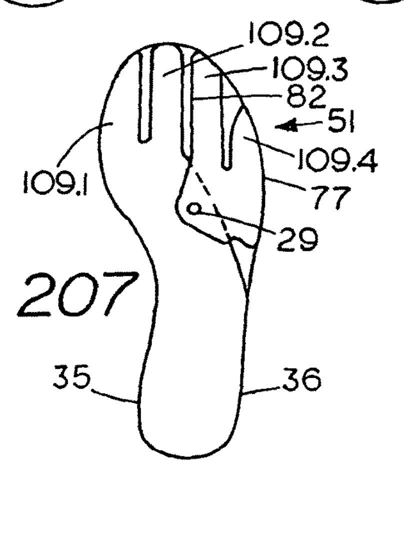
FIG. 207
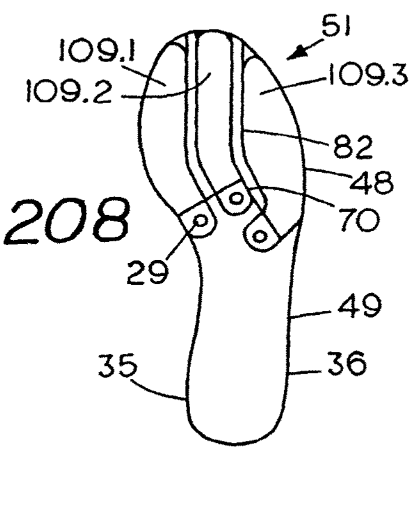
FIG. 208

FIG. 209
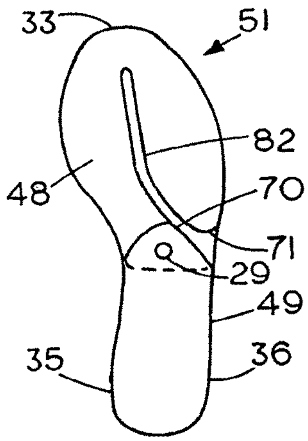
FIG. 210
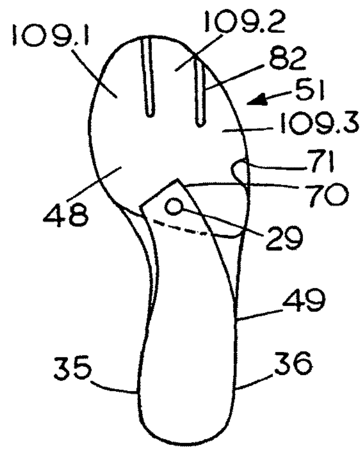
FIG. 211
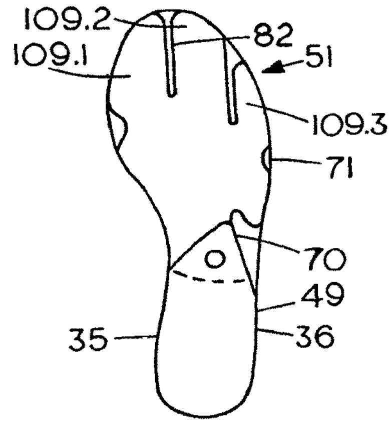
FIG. 212
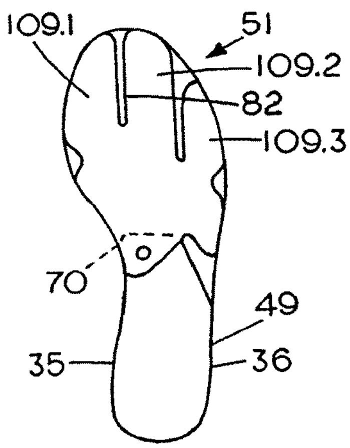
FIG. 213
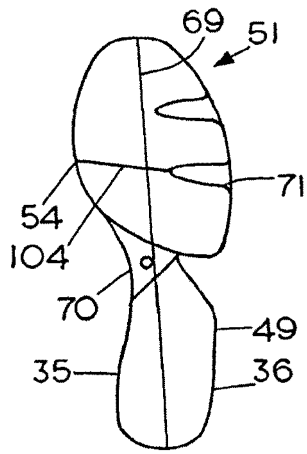
FIG. 214
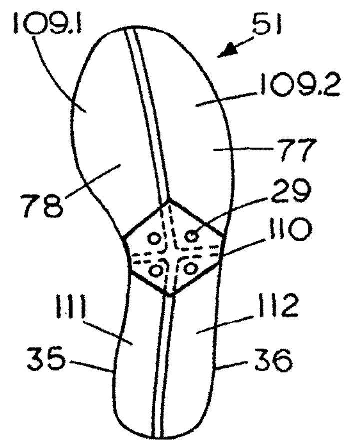
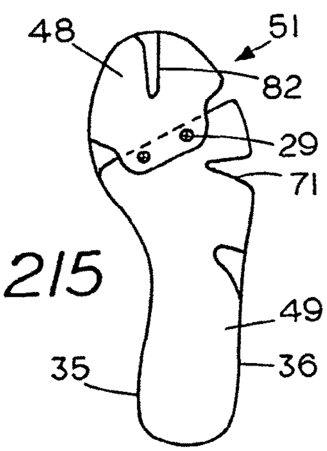
FIG. 215
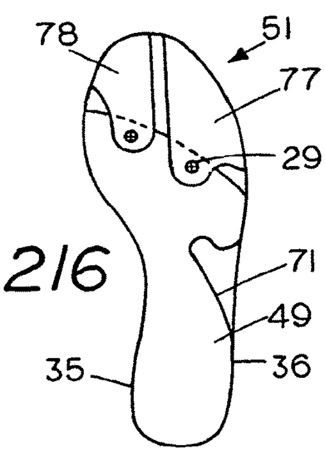
FIG. 216

FIG. 25I

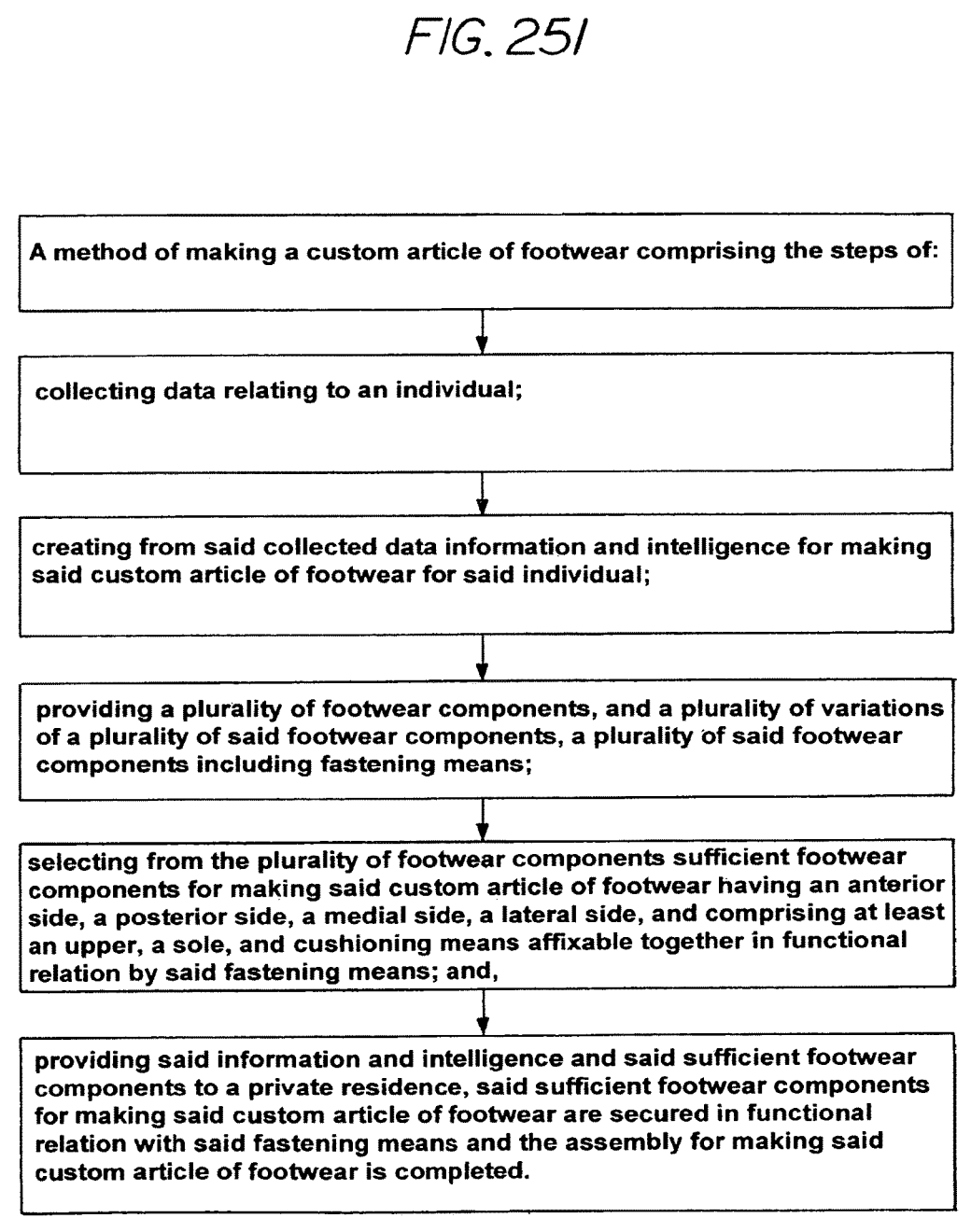

A method of making a custom article of footwear comprising the steps of:

↓ collecting data relating to an individual;

↓ creating from said collected data information and intelligence for making said custom article of footwear for said individual;

↓ providing a plurality of footwear components, and a plurality of variations of a plurality of said footwear components, a plurality of said footwear components including fastening means;

↓ selecting from the plurality of footwear components sufficient footwear components for making said custom article of footwear having an anterior side, a posterior side, a medial side, a lateral side, and comprising at least an upper, a sole, and cushioning means affixable together in functional relation by said fastening means; and,

↓ providing said information and intelligence and said sufficient footwear components to a private residence, said sufficient footwear components for making said custom article of footwear are secured in functional relation with said fastening means and the assembly for making said custom article of footwear is completed.

FIG. 253

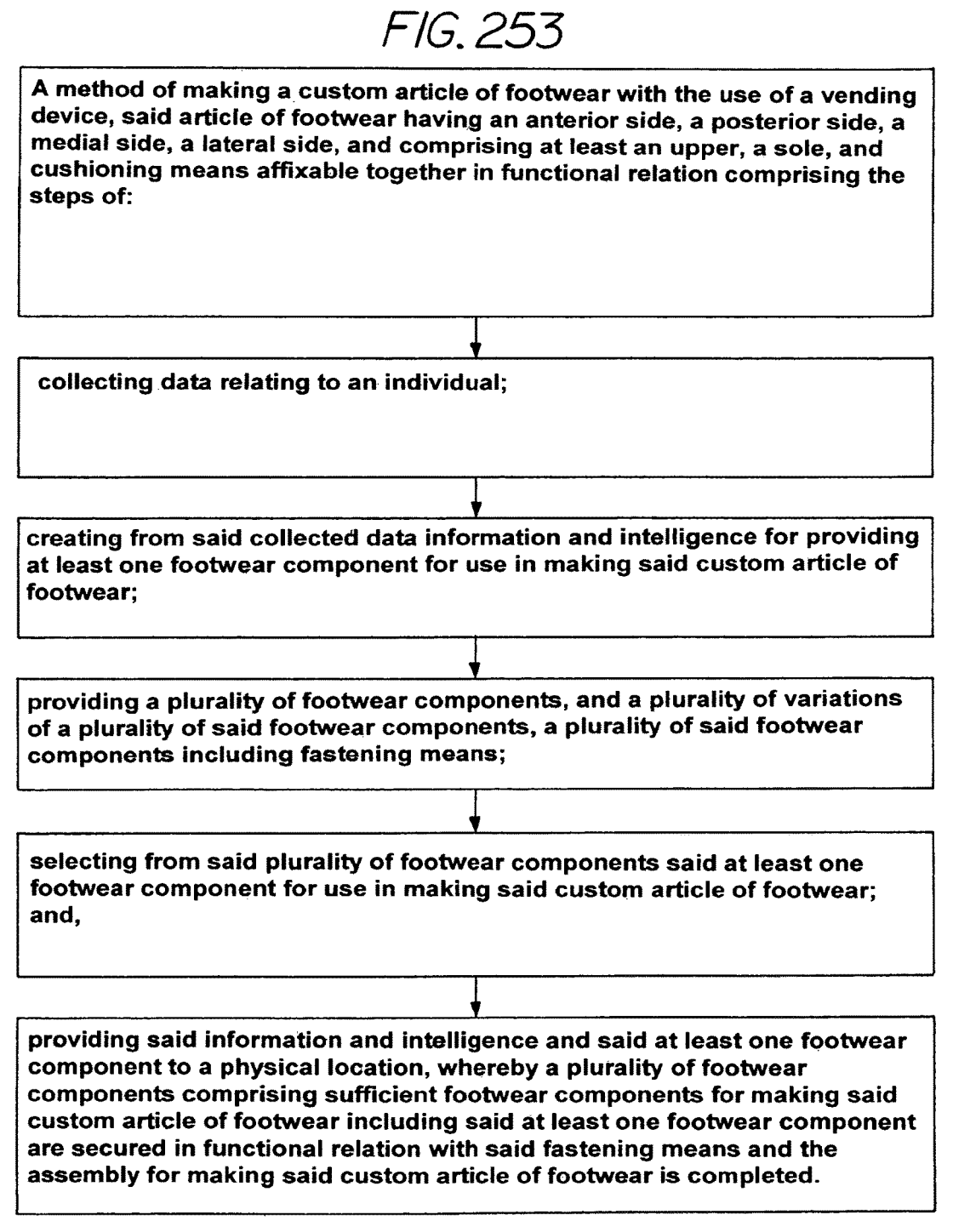

A method of making a custom article of footwear with the use of a vending device, said article of footwear having an anterior side, a posterior side, a medial side, a lateral side, and comprising at least an upper, a sole, and cushioning means affixable together in functional relation comprising the steps of:

↓ collecting data relating to an individual;

↓ creating from said collected data information and intelligence for providing at least one footwear component for use in making said custom article of footwear;

↓ providing a plurality of footwear components, and a plurality of variations of a plurality of said footwear components, a plurality of said footwear components including fastening means;

↓ selecting from said plurality of footwear components said at least one footwear component for use in making said custom article of footwear; and,

↓ providing said information and intelligence and said at least one footwear component to a physical location, whereby a plurality of footwear components comprising sufficient footwear components for making said custom article of footwear including said at least one footwear component are secured in functional relation with said fastening means and the assembly for making said custom article of footwear is completed.

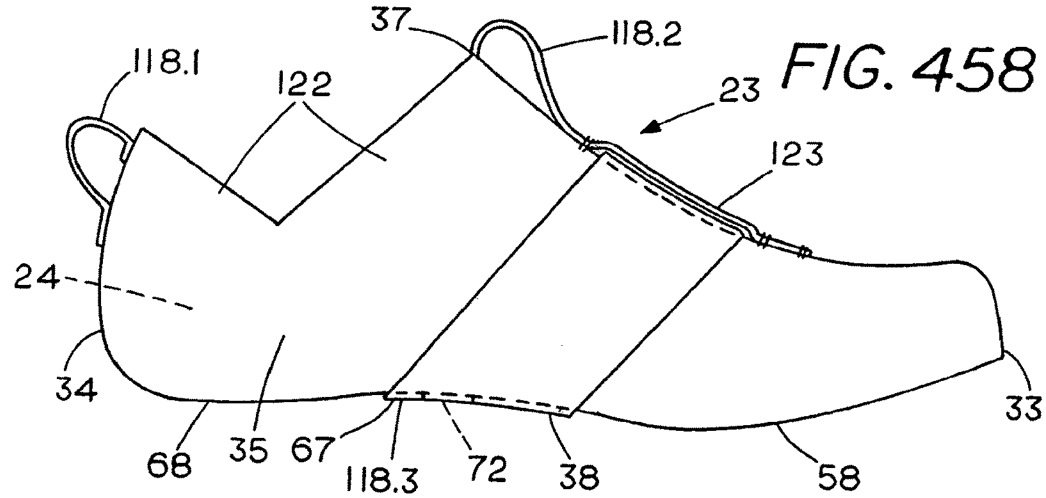
FIG. 458
FIG. 459
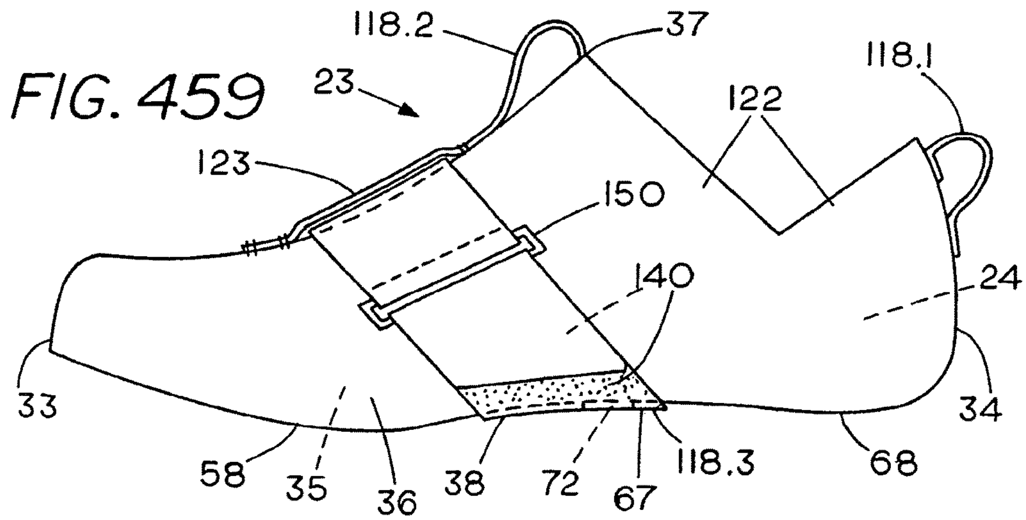
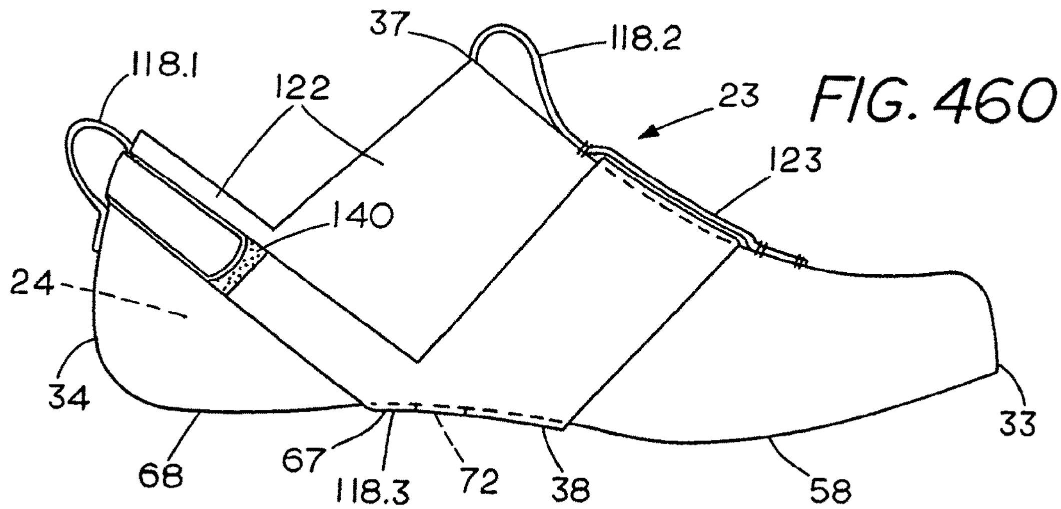
FIG. 460

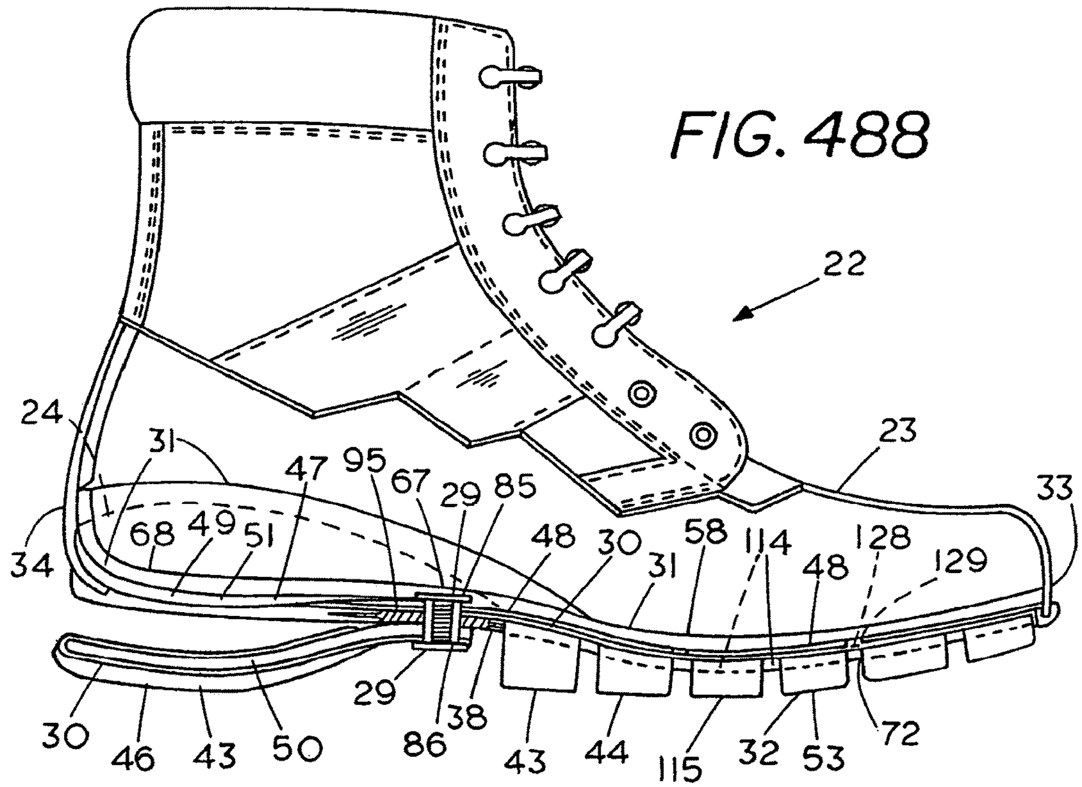
FIG. 488
FIG. 489
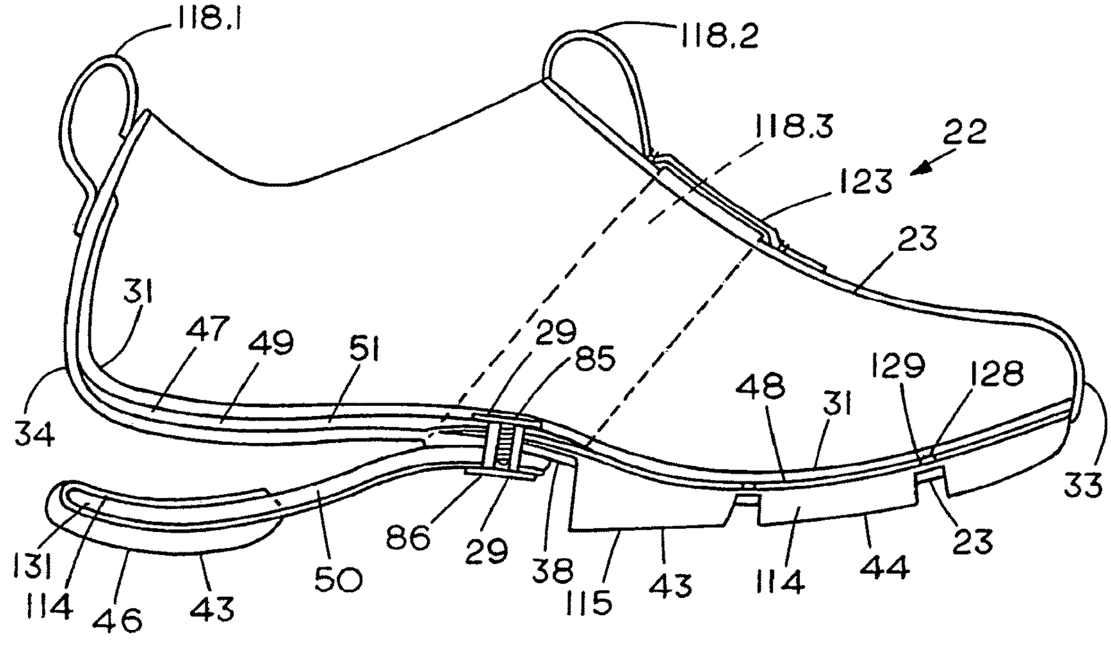

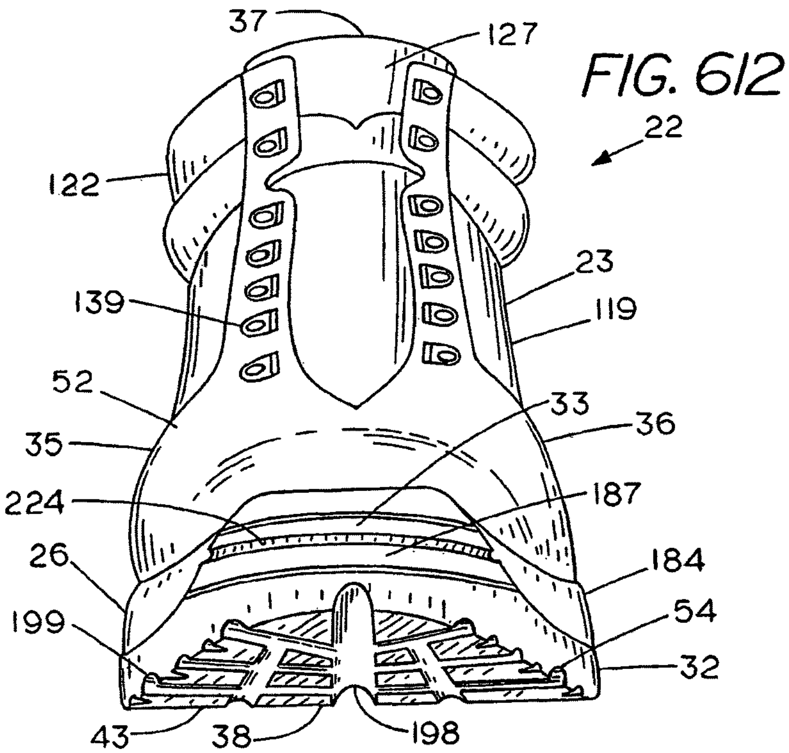
FIG. 612
FIG. 613
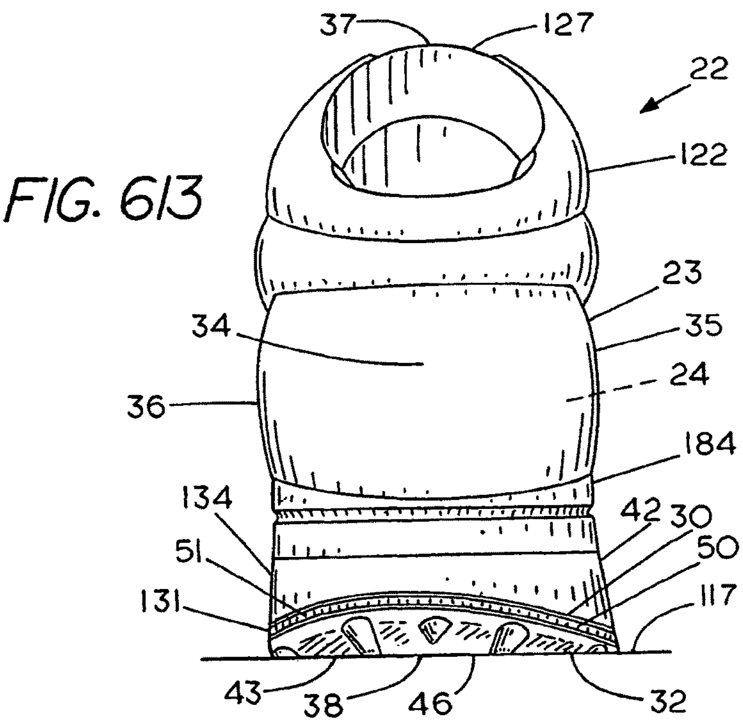

CUSTOM ARTICLE OF FOOTWEAR AND METHOD OF MAKING THE SAME

CROSS REFERENCE TO RELATED APPLICATIONS

The present patent application is a divisional of my pending U.S. patent application Ser. No. 13/465,020, filed May 6, 2012, allowed as U.S. Pat. No. 9,357,813, which was a continuation of my pending U.S. patent application Ser. No. 12/803,891, filed Jul. 8, 2010, now U.S. Pat. No. 8,209,883, which was a continuation of my U.S. patent application Ser. No. 11/516,166, filed Sep. 11, 2006, now U.S. Pat. No. 7,752,775; which is a continuation-in-part of my patent application Ser. No. 10/279,626, filed Oct. 24, 2002, now U.S. Pat. No. 7,107,235; which in turn is a continuation-in-part of my patent application Ser. No. 10/152,402, filed May 21, 2002, now U.S. Pat. No. 7,016,867, which claimed priority under 35 U.S.C. §119(e) of each of the following U.S. provisional patent applications: Ser. No. 60/360,784, filed Mar. 1, 2002; Ser. No. 60/345,951, filed Dec. 29, 2001; and Ser. No. 60/292,644, filed May 21, 2001, and which patent application Ser. No. 10/152,402 is a continuation-in-part of my U.S. patent application Ser. No. 09/573,121, filed May 17, 2000, now U.S. Pat. No. 6,601,042, which is a continuation-in-part of my U.S. patent application Ser. No. 09/523,341, filed Mar. 10, 2000, now U.S. Pat. No. 6,449,878. Further, the present patent application claims priority to pending U.S. patent application Ser. No. 11/895,506, filed Aug. 23, 2007, allowed. Priority for this present application is hereby claimed under 35 U.S.C. §120 based on the above identified U.S. patent applications, and priority for this present application is hereby claimed under 35 U.S.C. §119(e) based on the above identified U.S. provisional patent applications.

FIELD OF THE INVENTION

The present invention teaches customized articles of footwear including removable and replaceable components, and methods of making the same.

BACKGROUND OF THE INVENTION

The article of footwear taught in the present invention can include a spring element which can provide improved cushioning, stability, and running economy. Unlike the conventional foam materials presently being used by the footwear industry, a preferred spring element is not substantially subject to compression set degradation and can provide a relatively long service life. The components of the article of footwear including the upper, insole, spring element, and sole can be selected from a range of options, and can be easily removed and replaced, as desired. Further, the relative configuration and functional relationship as between the forefoot, midfoot and rearfoot areas of the article of footwear can be readily modified and adjusted. Accordingly, the article of footwear can be customized by an individual wearer or specially configured for a select target population in order to optimize desired performance criteria. Moreover, the present invention teaches a method of making an article of footwear, and also a way of doing both retail and Internet business.

Conventional athletic footwear typically include an outsole made of a thermoset rubber compound which is affixed by adhesive to a midsole made of ethylene vinyl acetate or polyurethane foam material which is in turn affixed by adhesive to an upper which is constructed with the use of stitching and adhesives. Because of the difficulty, time, and expense associated with renewing any portion of conventional articles of footwear, the vast majority are generally discarded at the end of their service life. This service life can be characterized as having a short duration when a wearer frequently engages in athletic activity such as distance running or tennis. In tennis, portions of the outsole can be substantially abraded within a few hours, and in distance running the foam midsole can become compacted and degrade by taking a compression set within one hundred miles of use. The resulting deformation of the foam midsole can degrade cushioning and footwear stability, thus contribute to the origin of athletic injuries. Accordingly, many competitive distance runners who routinely cover one hundred miles in a week's time will discard their athletic footwear after logging three hundred miles in order to avoid possible injury.

Even though the service life of conventional athletic footwear is relatively short, the price of athletic footwear has steadily increased over the last three decades, and some models now bear retail prices over one hundred and twenty dollars. However, some of this increase in retail prices has been design and fashion driven as opposed to reflecting actual value added. In any case, conventional athletic footwear remain disposable commodities and few are being recycled. The method of manufacture and disposal of conventional athletic footwear is therefore relatively inefficient and not environmentally friendly. In contrast with conventional athletic footwear, the present invention teaches an article of footwear that can include a spring element which does not take a compression set or similarly degrade, thus the physical and mechanical properties afforded by a preferred article of footwear can remain substantially the same over a useful service life which can be several times longer than that of conventional articles of footwear. The present invention teaches an article of footwear which represents an investment, as opposed to a disposable commodity. Like an automobile, the preferred article of footwear includes components which can be easily renewed and replaced, but also components which can be varied and customized, as desired.

Published examples of devices and means for selectively and removably affixing various components of an article of footwear include, e.g., U.S. Pat. Nos. 997,657, 1,219,507, 2,183,277, 2,200,080, 2,220,534, 2,552,943, 2,588,061, 2,640,283, 2,873,540, 3,012,340, 3,373,510, 3,538,628, 3,818,617, 3,846,919, 3,878,626, 3,906,646, 3,982,336, 4,103,440, 4,107,857, 4,132,016, 4,262,434, 4,267,650, 4,279,083, 4,300,294, 4,317,294, 4,351,120, 4,377,042, 4,420,894, 4,535,554, 4,538,368, 4,606,139, 4,747,220, 4,807,372, 4,825,563, 4,850,122, 4,887,369, 5,042,175, 5,083,385, 5,317,822, 5,339,544, 5,367,791, 5,381,610, 5,410,821, 5,533,280, 5,542,198, 5,615,497, 5,628,129, 5,661,915, 5,644,857, 5,657,558, 5,661,915, 5,678,327, 5,692,319, 5,729,916, 5,799,417, 5,822,888, 5,826,352, 5,896,608, 5,991,950, 6,023,857, 6,023,859, 6,145,221, 6,151,805, 6,247,249 B1, 6,282,814 B1, 6,324,772 B1, 6,332,281 B1, 6,349,486 B1, 6,931,766, and patent applications WO 97/46127 and WO 02/13641 A1, all of these patents and patent applications hereby being incorporated by reference herein.

Conventional athletic footwear cannot be substantially customized for use by the customer or wearer. The physical and mechanical properties of conventional athletic footwear are relatively fixed generic qualities. However, the body weight or mass and characteristic running technique of different individuals having the same footwear size can vary greatly. Often, the stiffness in compression of the foam material used in the midsole of athletic shoes can be too soft for individuals who employ more forceful movements, or who have greater body mass than an average wearer. Accordingly, conventional articles of athletic footwear do not provide optimal performance characteristics for individual wearers.

In contrast, the present invention permits a wearer to customize a preferred article of footwear. For example, the length, width, girth, and configuration of the upper, as provided by various last options, or by two or three dimensional modeling and footwear design equipment including computer software and data storage and retrieval systems, or by two or three dimensional measurement devices such as scanners, as well as the type of footwear construction and design of the upper can be selected by the customer or wearer. Further, the physical and mechanical properties of the article of footwear can be selected and changed as desired in order to optimize desired performance characteristics given various performance criteria or environmental conditions. For example, the configuration and geometry of the article of footwear, and the stiffness of the spring elements can be customized, as desired. In addition, the ability to easily remove, renew, and recycle the outsole portions of the preferred article of footwear can render the use of softer materials having enhanced shock and vibration dampening characteristics, but perhaps diminished wear properties, viable from a practical standpoint. Moreover, the outsole portion of the preferred article of footwear can be selected from a variety of options with regards to configuration, materials, and function.

The physical and mechanical properties associated with an article of footwear of the present invention can provide enhanced cushioning, stability, and running economy relative to conventional articles of footwear. The spring to dampening ratio of conventional articles of footwear is commonly in the range between 40-60 percent, whereas the preferred article of footwear can provide a higher spring to dampening ratio, thus greater mechanical efficiency and running economy. In this regard, the article of footwear can include a spring element that underlies the forefoot area which can store energy during the latter portion of the stance phase and early portion of the propulsive phase of the running cycle, and then release this energy during the latter portion of the propulsive phase, thus facilitating improved running economy. It is believed the resulting improvement in running performance can approximate one second over four hundred meters when running at four minutes/mile pace.

The preferred article of footwear can provide differential stiffness in the rearfoot area so as to reduce both the rate and magnitude of pronation, or alternately, the rate and magnitude of supination experienced by an individual wearer, thus avoid conditions which can be associated with injury. Likewise, the preferred article of footwear can provide differential stiffness in the midfoot and forefoot areas so as to reduce both the rate and magnitude of inward and/or outward rotation of the foot, thus avoid conditions which can be associated with injury. The preferred spring elements can also provide a stable platform which can prevent or reduce the amount of deformation caused by point loads, thus avoid conditions which can be associated with injury.

The use of relatively soft outsole materials having improved shock and vibration dampening characteristics can enhance cushioning effects. Further, in conventional articles of footwear, the shock and vibration generated during rearfoot impact is commonly transmitted most rapidly to a wearer through that portion of the outsole and midsole which has greatest stiffness, and this is normally a portion of the sole which is proximate the heel of the wearer that undergoes the greatest deflection and deformation. However, in the present invention a void space can exist beneath the heel of a wearer and the ground engaging portion of the outsole. Some of the shock and vibration generated during the rearfoot impact of an outsole with the ground support surface must then travel a greater distance through the outsole and inferior spring element in order to be transmitted to the superior spring element and a wearer. In addition, in the present invention, a posterior spacer which can serve as a shock and vibration isolator, and also vibration decay time modifiers can be used to decrease the magnitude of the shock and vibration transmitted to the wearer of a preferred article of footwear.

There are many published examples of attempts to introduce functional spring elements into articles of footwear, e.g., U.S. Pat. Nos. 357,062, 1,088,328, 1,107,894, 1,113,266, 1,352,865, 1,370,212, 2,444,865, 2,447,603, 2,456,102, 2,508,318, 3,333,353, 4,429,474, 4,492,046, 4,314,413, 4,486,964, 4,506,460, 4,566,206, 4,771,554, 4,854,057, 4,878,300, 4,942,677, 5,042,175, 5,052,130, 5,060,401, 5,138,776, 5,159,767, 5,203,095, 5,279,051, 5,337,492, 5,343,639, 5,353,523, 5,367,790, 5,381,608, 5,437,110, 5,461,800, 5,528,842, 5,596,819, 5,636,456, 5,647,145, 5,678,327, 5,701,686, 5,729,916, 5,822,886, 5,875,567, 5,937,544, 5,940,994, 6,029,374, 6,195,915, 6,247,249 B1, 6,282,814 B1, 6,327,795, 6,330,757, 6,324,772 B1, 6,393,731 B1, 6,416,610, French Patent 472,735, Italian Patent 633,409, European Patent Applications EP 0 890 321 A2, EP 1 048 233 A2, EP 1 033 087 A1, EP 1 025 770 A2, EP 1 240 838 A1, and PCT Patent Application WO 98/07341, all of these patents and patent applications hereby being incorporated by reference herein. Relatively few of these attempts have resulted in functional articles of footwear which have met with commercial success. The limitations of some of the prior art has concerned the difficulty of meeting the potentially competing criteria associated with cushioning and footwear stability. In other cases, the manufacturing costs of making prior art articles of footwear including spring elements have been prohibitive. Articles of footwear including discrete foam cushioning elements which have been commercialized include the Nike "SHOX," the Adidas "a3" which is believed to be taught in European Patent Application EP 1 240 838 A1, the Avia "ECS Cushioning" and Avia "ECS Stability," and also the Dada "SoleSonic Force."

The spring element and various other novel structures taught in the present invention can be used in a wide assortment of articles of footwear including but not limited to those used for running, walking, basketball, tennis, volleyball, cross-training, baseball, football, golf, soccer, cycling, sandals, hiking boots, and army boots. The present invention teaches an article of footwear which can provide a wearer with improved cushioning and stability, running economy, and an extended service life while reducing the risks of injury normally associated with footwear degradation. The preferred article of footwear provides a wearer with the ability to customize the fit, but also the physical and mechanical properties and performance of the article of footwear. Moreover, the preferred article of footwear is economical and environmentally friendly to both manufacture and recycle.

The present invention also teaches articles of footwear including means for adjusting the provided foot shape, length, width, and girth. For example, spring elements, anterior outsole elements, stability elements, and uppers having different configurations, and also alternate positions for selectively affixing various portions of an upper can be used to adjust and customize the fit of an article of footwear for an individual wearer. The upper can also include elastic or elongation means for adjusting the width, girth, and foot shape. The components of the article of footwear possibly including but not limited to the upper, insole, cushioning means such as a spring element, and sole can be selected from a range of options, and can be easily removed and replaced, as desired. Further, the relative configuration and functional relationship as between the forefoot, midfoot and rearfoot areas of the article of footwear can be readily modified and adjusted. Accordingly, the article of footwear can be configured and customized for a wearer or a select target population in order to optimize performance criteria, as desired.

Moreover, the present invention teaches a method of making articles of footwear, and way of doing both retail and Internet business. For example, the anatomical features, configuration, and dimensions of a given wearer's foot and any other special needs, requirements, or preferences can be recorded by direct communication, observation, and measurement in a retail or medical setting, or alternately, by a wearer or other individual within their home or other remote site, and this data can be used to generate information and intelligence relating to making a custom article of footwear. Conventional measuring or reproduction means such as rulers, measuring tapes, Brannock devices, two or three dimensional scanners, pressure sensors, infrared thermography, stereolithography, photographs, photocopies, FAX, e-mail, cameras, images, tracings, video, television, computers and computer screens, software, data storage and retrieval systems, templates, molds, models, and patterns can be used to help determine and make selections relating to an individual's foot shape, length, width, girth, and the like.

Teachings which have been published or that otherwise constitute public information regarding the conduct of Internet or retail business include: U.S. Pat. No. 5,897,622 granted to Blinn et al.; U.S. Pat. No. 5,930,769 granted to Rose; U.S. Pat. No. 5,983,200 granted to Slotznick; U.S. Pat. No. 5,983,201 granted to Fay; U.S. Pat. No. 6,206,750 B1 granted to Barad et al.; U.S. Pat. No. 5,206,804 granted to Theis et al.; PCT patent application WO 98/18386 by Rami; U.S. Pat. Nos. 5,123,169, 5,128,880, 5,195,030, 5,216,594, 5,231,723, 5,237,520, and 5,339,252 by granted to White or White et al.; U.S. Pat. Nos. 4,267,728; 4,598,376; 4,604,807; 4,736,203; 4,800,657; 4,813,436; 5,063,603; 5,164,793; 5,311,357; 5,351,303; 5,483,601; 5,500,802; U.S. patent application Ser. No. 09/716,321 by Christopher Cook entitled "System and Method for Sizing Footwear over a Computer Network," assigned to Nike, Inc. which was made of public record in connection with U.S. patent application Ser. No. 10/675,237 that was published as US 2005/0071242, entitled "Method and System for Custom-Manufacturing Footwear," by Mark Allen and John Tawney, assigned to Nike, Inc.; U.S. patent application Ser. No. 10/099,685 published as US 2004/0024645, entitled "Custom Fit Sale of Footwear" by Daniel Potter and Allan Schrock; WO 90/05345; WO 94/20020; the press release by Nike, Inc. dated Nov. 22, 1999 and the Internet website www.nike.com, and in particular, the section associated with the Nike iD program; the Internet website www.customatix.com; the Internet website www.adidas.com, and in particular, click on "products," then click on "mass customization," and see everything related to the "MI Adidas" initiative; the Internet website www.copycaps.com; the publication in the Oakland Tribune on Dec. 18, 1996 relating to the Internet Mall website; the publication "The Florsheim Shoe Company—Express Shop," Harvard Business School, Copyright 1988 by the President and Fellows of Harvard College; the publication "Custom Fit Footwear," from www.digitoe.com, 1984-Present, Digitoe, Inc.; the publication "6 Steps to Ordering Shoe Lasts & Footwear From Digitoe®," June, 1998, Digitoe, Inc.; the newspaper article "Nike Will Let Buyers Help Design Shoes," by Andy Dworkin in "The Oregonian," business section, Oct. 21, 1999; the article "NGAGE Digital Sizing System," Nike World Record, February-March, 1997; the article by Tim Wilson entitled "Custom Manufacturing—Nike Model Shows Web's Limitations," Internetweek; Manhasset; Dec. 6, 1999, Issue 792; and, the article "Customizing For the Masses," by Krysten A. Crawford, Forbes Magazine, Oct. 16, 2000, page 168. All of the patents and patent applications recited in this paragraph being hereby incorporated by reference herein.

Given the provision of an adequate and ready stock of the various components anticipated for use in making the preferred articles of footwear, and the information and intelligence created from the data relating to an individual wearer or target population, a worker and/or automated system can assemble and make a customized article of footwear within five minutes. In fact, it is possible to assemble a custom article of footwear according to the present invention in less than one minute using a single fastener. This can be accomplished at the point of purchase or service center which can be located in a retail store, medical facility, or remote manufacturing environment. Accordingly, similar to the rapid delivery eyewear service centers and retail stores which presently exist, a customer can now also be provided with a custom article of footwear within minutes. Alternately, if and when an individual's data is received from a remote site at the Website or other address of a company which practices the present invention, and transmitted to a manufacturing or assembly center, a custom article of footwear can be made and possibly delivered to an individual's home or other designated address by same day or overnight service, as desired.

SUMMARY OF THE INVENTION

The present invention teaches a method of making a custom article of footwear. The article of footwear taught in the present invention can include a spring element that can provide improved cushioning, stability, and running economy. Unlike the conventional foam materials presently being used by the footwear industry, a preferred spring element is not substantially subject to compression set degradation and can provide a relatively long service life. The components of the article of footwear including the upper, insole, heel counter, spring element, and sole can be selected from a range of options, and can be easily removed and replaced, as desired.

A preferred article of footwear can include an anterior side, a posterior side, a medial side, a lateral side, a superior side, an inferior side, a longitudinal axis, a transverse axis, an upper, a sole, cushioning means such as a spring element comprising a superior spring element and an inferior spring element, and fastening means such as a mechanical fastener including male and female parts or self-adhesive means. The superior spring element can extend substantially between the posterior side and the anterior side of the article of footwear and be substantially positioned within the upper in order to secure the upper to the superior spring element. The inferior spring element and the sole can be substantially positioned inferiorly and externally with respect to the upper, and the superior spring element can be affixed in functional relation to the inferior spring element by at least one fastener. The article of footwear can further include an upper having a plurality of openings on the inferior side in the forefoot area. Further, an anterior outsole element including a backing can be at least partially positioned within the upper. However, the substantial portion of the anterior outsole element including the ground engaging portion and a plurality of traction members can project through the openings in the upper, thus the substantial portion of the anterior outsole element can nevertheless be substantially positioned inferiorly and externally relative to the upper. In an alternate embodiment, the article of footwear can further include an upper having a plurality of openings on the inferior side, but also on a portion of the medial side, lateral side, and anterior side in the forefoot area, and the anterior outsole element can then include a backing having an elevated profile and traction members that extend upwards about a portion of the medial side, lateral side, and anterior side of the upper. In an alternate embodiment, the anterior portion of the outsole can be removably affixed to the external side of the upper with the use of other fastening means.

The article of footwear can possibly further include an insole, a stability element, a sole including an anterior outsole element, a middle outsole element, and a posterior outsole element having a backing, and also closure means such as an elastic upper, shoe laces, a strap including VELCRO® hook and pile, or a strap including openings and eyelets for receiving conventional shoe laces. A strap can encompass the medial side, lateral side, inferior side, and superior side of the upper. An alternate embodiment of a strap can also include a portion that encompasses the posterior side of the upper. In any case, a strap can be selectively removable and replaceable. In an alternate embodiment, the upper can be over-lasted, that is, over-sized in order to accommodate a removable and replaceable midsole cushioning element which can be inserted into the upper between the top portion of the insole and inferior side of upper.

The insole can include an elevated profile about the medial side, lateral side, anterior side, and posterior side for protecting a wearer's foot from contact with an elevated portion of an anterior outsole element, stability element, side support, or heel counter. The insole can include a heel pad, toe pad, bottom, and side portions having different thickness for selectively adjusting the effective length and width of the article of footwear. The inferior side of the upper can include an opening in the rearfoot area for positioning a removable and replaceable cushioning element such as a fluid-filled bladder or a resilient foam material. The superior side of an insole can then include a window in the rearfoot area for viewing a removable and replaceable cushioning element such as a fluid-filled bladder or a resilient foam material. A fluid-filled bladder can be positioned between a superior spring element, posterior spring element, or external heel counter and the inferior spring element.

The inferior spring element can be affixed in functional relation to the superior spring element and can project rearward and downward therefrom forming a V-shape. The superior spring element can further include an anterior spring element and a posterior spring element affixed together in functional relation, and the inferior spring element can be affixed in functional relation to the posterior spring element. The anterior spring element and posterior spring element can be affixed together in an overlapping relationship. The anterior spring element can further include a projection, and the posterior spring element can include a recess for accommodating the anterior spring element. The superior spring element can have a configuration generally corresponding to the bottom net of the last of an article of footwear and can either be generally planar, or curved. At least a portion of the superior spring element can be curved to mate with the anatomy of a wearer. Further, a superior spring element can possibly also include a side stabilizer or a heel counter. The heel counter can be integral to the superior spring element, or alternately be a separate component. The upper can be trapped and secured in functional relation between an external heel counter and an overlaying superior spring element. An advantageous thickness for an external heel counter for a wearer having a given body weight can be approximately 2.0 mm for a wearer having a body weight in the range between 100-140 pounds; 2.5 mm for a body weight in the range between 140-180 pounds, and 3.0 mm for a body weight in the range between 180-220 pounds.

An anterior spring element can have a curved shape and incorporate toe spring. The amount of toe spring incorporated in an anterior spring element can be in the range between 0-40 mm, and in particular, in the range between 10-30 mm. A substantial portion of the anterior spring element can extend anterior of 50 percent of the length of the upper as measured from the posterior side of the upper, whereas a substantial portion of the inferior spring element can extend within 50 percent of the length of the upper as measured from the posterior side of the upper.

The inferior spring element can include a longitudinal axis, a transverse axis, and a flexural axis. The flexural axis can be consistent with the transverse axis. An inferior spring element including a flexural axis consistent with the transverse axis can have a symmetrical configuration on both the medial side and lateral side. Alternately, an inferior spring element including a flexural axis consistent with the transverse axis can have an asymmetrical configuration, and can have greater concavity downwards adjacent the transverse axis on the medial side than on the lateral side. Alternately, the inferior spring element can include a flexural axis deviated from the transverse axis in the range between 10-50 degrees. In particular, given an average individual wearer who would be characterized as a rearfoot striker, it can be advantageous for the flexural axis to be deviated from the transverse axis in the range between 20-30 degrees in footwear intended for walking or running. Accordingly, the length of the effective lever arm on the medial side of the inferior spring element will be shorter than that on the lateral side, that is, as measured between the posterior side of the inferior spring element and the location of the flexural axis on each respective side. One way of expressing the length differential of the effective lever arms of the inferior spring element on the medial side versus the lateral side is with a ratio. In this regard, it can be advantageous for effecting rearfoot stability that the ratio of the length of the effective lever arms on the lateral side relative to those on the medial side be in the range between 1/1 to 2/1, and in particular, in the range between 1.25/1 to 2/1, and preferably in the range between 1.25/1 to 1.75/1.

Further, in a men's size 9 article of footwear, the posteriormost position of the flexural axis on the medial side can be in the range between 1-6 inches from the posterior side of the upper, and in particular, in the range between 2-4 inches from the posterior side of the upper. An inferior spring element including a flexural axis deviated from the transverse axis can have a symmetrical configuration on both the medial side and lateral side. Alternately, an inferior spring element including a flexural axis deviated from the transverse axis can have an asymmetrical configuration, and can have greater concavity downwards adjacent the transverse axis on the medial side than on the lateral side. Whether the flexural axis be consistent with the transverse axis or be deviated therefrom, an inferior spring element having a symmetrical configuration on the medial side and lateral side can include an anterior portion extending between its anterior side and an anterior tangent point, a middle portion including an anterior curve extending between the anterior tangent point and a posterior tangent point, and a posterior portion extending between the posterior tangent point and the posterior side of said inferior spring element. It can be advantageous that the anterior curve be configured to have a fitted symmetrical radius of curvature. Moreover, the posterior portion of the inferior spring element can be inclined, or include a posterior curve.

The inferior spring element can attain maximum separation from the superior spring element at a position anterior of the posterior side of the inferior spring element, and can substantially maintain the maximum separation between that position and the posterior side of the inferior spring element. Alternately, the inferior spring element can attain maximum separation from the superior spring element at a position anterior of the posterior side of the inferior spring element, and the separation can then be decreased between that position and the posterior side of the inferior spring element. The inferior spring element can be concave downwards near the anterior side of the inferior spring element, but can be concave upwards or convex near the posterior side of the inferior spring element. The inferior spring element can be made in a laminate configuration or structure. The inferior spring element can be made in a tapered configuration or structure. An inferior spring element can exhibit less stiffness in compression on the lateral side relative to the medial side, and it can be advantageous for walking and running activity that the differential stiffness be in the range between two-to-three to one.

The spring element can be made of a fiber composite material, and an unidirectional carbon fiber composite material including a toughened epoxy can be preferred for use. Alternately, the spring element can be made of a metal material such as spring steel or titanium. The spring element is preferably made of a material having spring characteristics such that the material is capable of storing and returning at least 70 percent of the mechanical energy imparted thereto. In this regard, a preferred fiber composite material, or alternately, a metal material such as spring steel or spring grade titanium is capable of storing and returning at least 90 percent of the energy imparted thereto when their mechanical characteristics are measured using test method ASTM 790.

The superior spring element can have a thickness in the range between 0.5-10.0 mm. The superior spring element can include an anterior spring element or forefoot area having a thickness in the range between 0.5-2.5 mm, and in particular, in the range between 1.0-1.75 mm. The superior spring element can also include a posterior spring element having a thickness in the range between 1-10 mm. When the superior spring element, or posterior spring element has a three dimensional shape in the rearfoot area including an integral heel counter or side counters, the superior spring element or posterior spring element can generally have a thickness in the range between 1-5 mm. Further, a spring element can include areas having different thickness, notches, slits, or openings which can serve to produce differential stiffness characteristics when the spring element is loaded. In this regard, the superior spring element or anterior spring element in the forefoot area can include at least one longitudinal notch or slit, and also a plurality of transverse notches or slits on the medial side and lateral side for influencing the flexural modulus and torsional characteristics in a desired manner. It can sometimes be advantageous for the transverse notches or slits on the lateral side to extend for a greater distance relative to those present on the medial side, and also for a pair of opposing notches or slits on the medial side and lateral side to approximately correspond the position of the metatarsal-phalangeal joints, that is, be positioned between 60-70 percent of the length of the upper as measured from the posterior side. The spring element can include different types, orientations, configurations, and numbers of fiber composite layers in different areas in order to achieve differential stiffness when the spring element is loaded. Accordingly, the flexural modulus or stiffness exhibited by a spring element in the rearfoot area, midfoot area, forefoot area, and also that exhibited about any axis can be engineered, as desired. In this regard, it can be advantageous to create a region of reduced stiffness, that is, a forefoot strike zone, on the lateral side in the area approximately corresponding to the location of a wearer's metatarsal-phalangeal joints.

The inferior spring element can provide deflection in the range between 5-50 mm. For example, deflection approximately in the range between 8-15 mm could be selected by some wearers for a training shoe intended for use in running at a relatively fast pace, a racing flat, or a track spike. Alternately, deflection approximately in the rage between 15-50 mm could be selected by some wearers for a training shoe intended for use in running at a relatively slow pace. The inferior spring element can have a thickness in the range between 3-10 mm. The superior spring element can have a thickness in the range between 0.5-10.0 mm. The superior spring element can include a forefoot area or anterior spring element having a thickness in the range between 0.5-2.5 mm, and in particular, in the range between 1.0-1.75 mm. Generally, regarding a men's size 9 article of footwear, an advantageous overall length of an inferior spring element for running is in the range between 4.75 and 5.5 inches, the width in the range between 75-85 mm, the vertical elevation is in the range between 10-18 mm, and the thickness is in the range between 4-5.5 mm at the anterior side 33 and in the range between approximately 2-3 mm at the posterior side. Generally, an advantageous fitted symmetrical radius of curvature for use in a men's size 9 running shoe with respect to the anterior curve is in the range between 2.25 and 3.25 inches, an advantageous radius of curvature with respect to the superior side of the posterior curve is in the range between 7 and 11 inches, and an advantageous radius of curvature regarding the inferior side of the posterior portion is in the range between 4-6 inches. When no other means are being used to create differential stiffness between the medial and lateral sides of an article of footwear which is intended for use in running, given an inferior spring element having the configuration shown, it is generally advantageous for the flexural axis to be deviated from the transverse axis in the range between 20-30 degrees.

In particular, an inferior spring element for possible use with a men's size 9 article of footwear can have an overall length of 5.25 inches, and the anterior portion can measure 1.125 inches, the middle portion can measure 2.5 inches, and the posterior portion can measure 1.625 inches. Alternately, the overall length can be reduced by 0.25 inch by subtracting 0.125 inches from both the anterior portion and the posterior portion. Further, the inferior spring element can have a maximum width in the range between 75-80 mm, and the flexural axis can be deviated from the transverse axis in the range between 20-30 degrees. The anterior portion of the inferior spring element can also project downwards at a three degree angle towards the anterior side. This can facilitate attaining an advantageous geometry and fit with respect to a superior spring element and also an external heel counter. The fitted symmetrical radius of curvature of the anterior curve can have a radius of 2.606 inches, whereas the radius of curvature of the superior side of the posterior curve can be 9.0 inches, and the radius of curvature corresponding to the tapering of the inferior side of the posterior portion can be 5.138 inches. The vertical elevation of the inferior spring element can be 0.6299 inches or 16 mm, and the thickness of an inferior spring element for a wearer having a body weight of approximately 140-160 pounds can be 0.189 inches or 4.8 mm at the anterior side and tapering to only 0.1083 inches or 2.75 mm at the posterior side. If and when desired, the vertical elevation can be changed in the range between 10-18 mm, something that would also cause the fitted symmetrical radius of curvature associated with the anterior curve to also change, but otherwise merely changing the vertical elevation need not substantially change the other dimensions and configuration. The thickness and tapered configuration of the inferior spring element can be varied for use by individuals having different body weight, running technique, or characteristic running speeds, and also for use in many different activities. Given an inferior spring element having the dimensions recited in this paragraph, the following general guidelines regarding the desired thickness for a wearer could apply: a maximum thickness of 4.0 mm for a wearer having a body weight in the range between 100-120 pounds; 4.25 mm for a wearer in the range between 120-140 pounds; 4.5 mm for a wearer in the range between 140-160 pounds; 4.75 mm for a wearer in the range between 160-180 pounds; 5.0 mm for a wearer in the range between 180-200 pounds; and 5.25 mm for a wearer in the range between 200-220 pounds.

The article of footwear can further include a posterior spacer between the superior spring element or posterior spring element and the inferior spring element. Further, an anterior spacer can be used between a superior spring element and an anterior spring element, or alternately between an anterior spring element and an inferior anterior spring element. An anterior spacer or posterior spacer can also possibly be positioned between the anterior spring element and the posterior spring element. An anterior spacer and a posterior spacer can have a wedge or sloped shape. An anterior spacer can have a gently rounded shape near the posterior side. The shape of a posterior spacer and an anterior spacer can be used to modify the configuration and performance of a spring element and that of an associated article of footwear.

In an alternate embodiment of an article of footwear, the superior spring element can extend substantially between the posterior side and anterior side of the upper. Again the superior spring element can consist of a posterior spring element and an anterior spring element configured in an overlapping relationship. The inferior spring element can be affixed in functional relation to the superior spring element or posterior spring element, thus form a spring element having a v-shape in the rearfoot area. Further, an inferior anterior spring element can be positioned and affixed in function relation to an anterior spacer and the superior spring element or anterior spring element, thus forming a spring element having a v-shape in the forefoot area as well. The inferior anterior spring element can include at least one longitudinal notch or slit, and also at least one transverse notch or slit for influencing the flexural and torsional characteristics in a desired manner. Again, as with preferably at least seventy-five percent, and most preferably substantially all of the other major components of the article of footwear, the inferior anterior spring element, anterior spacer, and anterior outsole element can be selectively removed and replaced, as desired.

Cushioning elements such as fluid-filled bladders or foam materials can be formed or affixed to the backing portion of the anterior outsole element, and also to the backing portion of the posterior outsole element. Alternately, a cushioning element can include a web portion, backing portion, or flange, and the cushioning element can be inserted into a pocket in the anterior outsole element or the posterior outsole element and a substantial portion of the cushioning element can then project through an opening in the backing portion of the respective outsole element. Accordingly, the cushioning element can be affixed in position, but the cushioning element can nevertheless be selectively removable and replaceable. Again, a fluid-filled bladder can be positioned between the superior spring element or posterior spring element and the inferior spring element. Further, a fluid-filled bladder can also be positioned on the inferior side of the inferior spring element. In addition, a fluid-filled bladder positioned between the superior spring element or posterior spring element and the inferior spring element including at least one chamber can be in fluid communication with another chamber or fluid filled bladder positioned on the inferior side of the inferior spring element. Fluid-filled bladders including valves that can also serve as a motion control device can be used. Moreover, fluid-filled bladders that form part of a larger dynamically-controlled cushioning system can be used. Such an article of footwear can include at least one fluid-filled bladder including a plurality of chambers, a control system possibly including a CPU, a pressure detector, and a regulator for modulating the level of fluid communication between different fluid-filled bladders or chambers.

The sole can consist of a single component, or alternately can consist of a two part component including an anterior outsole element and a posterior outsole element, or alternately can consist of a three part component including an anterior outsole element, a middle outsole element, and a posterior outsole element. The anterior outsole element can be affixed in functional relation to the superior spring element, or anterior spring element. The anterior outsole element can include an undercut portion for mating with openings in the upper, thus providing a snap fit with the upper. The posterior outsole element and the middle outsole element can be affixed to the inferior spring element, and thereby be affixed in functional relation to the superior spring element. The sole can include a midsole and an outsole, or merely an outsole. The sole can also include an outsole having a backing, a tread or ground engaging surface, traction members, a rocker configuration, and lines of flexion, whether in partial or complete combination. The sole can include a bicycle cleat, or traction members suitable for use on natural or artificial turf. The anterior outsole element can have a generally planar configuration, or alternately, a three dimensional wrap configuration. The anterior outsole element can be made in different length sizes, width sizes, and last or foot shapes, as desired. The backing portion of the anterior outsole element can include an elevated profile and thereby substantially define the shape of the upper in the forefoot area. Further, the backing portion of the anterior outsole element can be molded and cut to a desired length, width, girth and footshape, as desired. The backing portion of an anterior spring element can be substantially positioned in the forefoot area, or alternately, can substantially extend full length. A gasket can be used to seal the junction between the anterior outsole element and the upper. The sole can further include a cushioning element such as a fluid-filled bladder, or a foam material. A cushioning element can be affixed in functional relation to the backing portion of an outsole element. Alternately, a cushioning element can include a web portion, backing portion, or flange, and the cushioning element can be inserted into a pocket in the outsole element and a substantial portion of the cushioning element can project through a opening in the backing portion of the outsole element. Accordingly, the cushioning element can be affixed in position, but the cushioning element can nevertheless be selectively removable and replaceable. A middle outsole element can be made of at least one fluid-filled bladder, or alternately be made of a resilient foam material. In a bottom plan view, a middle outsole element can have a generally triangular shape. A cushioning element can be positioned on the medial side in order to create a differential cushioning and stability effect. In an alternate embodiment, the sole can be affixed in functional relation to the exterior of the upper. The anterior outsole element can include male mating structures for mating with female mating structures on the superior spring element. Again, the sole can be selectively removable and replaceable, and can be made with a multiplicity of alternate configurations and materials which are particularly suitable for use given specific environmental conditions and performance tasks.

The upper can further include a sleeve for affixing at least a portion of the superior spring element in function relation thereto. The upper can be substantially made using a single piece of textile material that can be cut by an automatic cutting machine, and stitched using an automatic three dimensional sewing machine. Alternately, the upper can be substantially made of a molded plastic material. Alternately, the upper can be substantially made of a circular knitted and/or three dimensional textile material, or woven textile material. Further, an upper substantially made of a circular knitted and/or three-dimensional textile material, or woven textile material can be over-molded with a plastic material, or otherwise include an plastic material reinforcement affixed thereto.

The components of the article of footwear including the upper, insole, superior spring element possibly including an anterior spring element and a posterior spring element, heel counter, inferior spring element, sole including an anterior outsole element and a posterior outsole element having a backing, and at least one fastener can be selectively removable and replaceable. A fastener can include a male part and a female part, and can further include a geometric shape such as a square, triangular, pentagon, hexagon, or other shape which can substantially prevent the rotation of various components of a spring element relative to one another. A fastener can include splines on the mating surfaces of corresponding male and female parts for permitting the selective adjustment of the angular orientation or deviation of the inferior spring element with reference to the longitudinal axis. A fastener can include locking means such as a plastic material whereby the male part and female part cannot be accidentally loosened.

The article of footwear can further include a spring guard for protecting the posterior aspect of the mating portions of the superior spring element or posterior spring element and the inferior spring element. The article of footwear can further include a vibration decay time modifier. The vibration decay time modifiers can include a head and a stem. The head of the vibration decay time modifiers can be dimensioned and configured for vibration substantially free of contact with the base of the posterior spacer or spring element in directions which substantially encompass a 360 degree arc and normal to the longitudinal axis of the stem.

In an alternate embodiment of an article of footwear, the spring element can consist of a superior spring element which can include an anterior spring element and a posterior spring element affixed together in functional relation, but not include an inferior spring element projecting rearward and downward therefrom. In an alternate embodiment, the anterior spring element can include a medial anterior spring element and a lateral anterior spring element that are removably affixed in functional relation to the posterior spring element. In an alternate embodiment, the anterior spring element and inferior spring element can consist of a single component, or alternately, can be affixed together in functional relation, and the posterior spring element can be affixed in functional relation thereto. An alternate article of footwear can have an anterior side, a posterior side, a medial side, a lateral side, a superior side, an inferior side, a longitudinal axis, a transverse axis, and a plurality of fasteners. The upper can include a plurality of alternate openings on the inferior side at a plurality of different positions, and the alternate openings can be offset by a distance corresponding to a change in one standard width size and configured for receiving the plurality of fasteners. Spring elements can be made in different configurations for accommodating different length sizes, width sizes, and also different last or foot shapes. A spring element can have a plurality of openings, or alternately, can have notches or slits for accommodating a plurality of fasteners, and the spring element can be positioned within the upper. The upper can then be removably affixed in functional relation to the spring element by the plurality of fasteners, as desired.

An article of footwear can have an anterior side, a posterior side, a medial side, a lateral side, a superior side, an inferior side, a longitudinal axis, and a transverse axis. The article of footwear can include an upper including a plurality of openings on the inferior side, an insole, a heel counter, a fastener, and a sole including an anterior outsole element and a posterior outsole element. The anterior outsole element can be positioned in functional relation within the upper and can include a plurality of traction members. The traction members can substantially project through the openings on the inferior side of the upper. At least one of the traction members can include an undercut which can serve to mechanically engage, snap-lock, or otherwise secure the outsole to a portion of the upper. The article of footwear can include a spring element including a superior spring element and an inferior spring element, and the superior spring element can extend substantially between the posterior side and the anterior side of the article of footwear and be substantially positioned in functional relation within the upper to secure the upper to the superior spring element. The inferior spring element can be substantially positioned inferiorly and externally with respect to the upper. The posterior outsole element can be affixed in function relation to the inferior spring element and the superior spring element by a fastener. The upper, insole, heel counter, superior spring element, inferior spring element, anterior outsole element, posterior outsole element, and fastener can be selectively removable and replaceable. The article of footwear can further include a stability element, a sole including an anterior outsole element, a middle outsole element, and a posterior outsole element having a backing, a midsole cushioning element such as a fluid-filled bladder or a resilient foam material, and closure means such as an elastic upper, shoe laces, a strap including VELCRO® hook and pile, or a strap including openings and eyelets for receiving conventional shoe laces.

The present invention teaches a method of making a custom article of footwear comprising the steps of:

collecting data relating to an individual;

creating from said collected data information and intelligence for making said custom article of footwear for said individual;

providing a plurality of footwear components, and a plurality of variations of a plurality of said footwear components, a plurality of said footwear components including fastening means;

selecting from the plurality of footwear components sufficient footwear components for making said custom article of footwear having an anterior side, a posterior side, a medial side, a lateral side, and comprising at least an upper, a sole, and cushioning means affixable together in functional relation by said fastening means;

providing said information and intelligence and said sufficient footwear components to a physical location at which said custom article of footwear can be made; and, securing a plurality of said sufficient footwear components in functional relation with said fastening means and completing the assembly for making said custom article of footwear.

The information and intelligence can comprise an individual's foot length size and foot width size. The upper can comprise at least in part a textile material. The upper can substantially comprise a molded upper. The upper can substantially comprise a biodegradable material.

The fastening means can comprise mechanical means. The fastening means can comprise at least one independent fastening component. A fastening component can comprise a single mechanical fastener including male and female parts. The fastening means can comprise mechanical means and self-adhesive means. The fastening means can comprise self-adhesive means. The sufficient footwear components can be substantially affixed together in functional relation by mechanical means and be removable and replaceable. Alternately, at least seventy-five percent of the sufficient footwear components can be removable and replaceable. Alternately, at least ninety percent of said sufficient footwear components can be removable and replaceable. At least three of said sufficient footwear components can be removably secured in functional relation with fastening means. Alternately, at least four of said sufficient footwear components can be removably secured in functional relation with fastening means. Alternately, at least five of said sufficient footwear components can be removably secured in functional relation with fastening means. Accordingly, the article of footwear can be substantially recyclable.

The article of footwear can comprise an insole. The insole can be removable and replaceable and provided in a plurality of variations including different alternate effective length sizes for possible use within said upper, whereby the effective length size provided by the upper can be selectively varied. The insole can be removable and replaceable and provided in a plurality of variations including different alternate effective width sizes for possible use within the upper, whereby the effective width size provided by the upper can be selectively varied.

The article of footwear can comprise closure means. The closure means an comprise laces, and straps.

The article of footwear can comprise a heel counter. The heel counter can be positioned on the exterior of the upper. The heel counter, upper, cushioning means, and sole can be removably secured together in functional relation by fastening means.

The custom article of footwear can comprise a toe counter. The toe counter can comprise male mechanical engagement means for affixing the sole. The toe counter can comprise female mechanical engagement means for affixing the sole. The custom article of footwear can comprise a footframe. The custom article of footwear can comprise a posterior spacer.

The article of footwear can include cushioning means comprising an elastomeric material. The elastomeric material can comprise a foam material. The cushioning means can comprise at least one cushioning element. The cushioning means can comprise a fluid-filled bladder. The fluid can comprise a gas.

The cushioning means can comprise a spring. The spring can comprise a fiber composite material. The spring can substantially comprise a fiber composite material that stores and returns at least 70 percent of the mechanical energy imparted thereto when measured using test method ASTM 790. The spring can comprise a metal material. The cushioning means can comprise a dampener. The spring can comprise a spring element. The spring element can comprise a superior spring element. The superior spring element can be positioned inside of the upper and extend substantially between the posterior side and the anterior side. The superior spring element can extend between the posterior side and the anterior side for at least fifty percent of the length of the upper. The superior spring element can extend between the posterior side and the anterior side in the range between 50-60 percent of the length of the upper. The superior spring element can comprise at least one flex notch.

The spring element can comprise an inferior spring element. The inferior spring element can have an anterior side, posterior side, medial side, lateral side, superior side, inferior side, longitudinal axis, transverse axis, and a flexural axis, and the inferior spring element can comprise an anterior portion extending between the anterior side of the inferior spring element and an anterior tangent point, a middle portion including an anterior curve extending downwards between the anterior tangent point and a posterior tangent point, and a posterior portion extending upwards between the posterior tangent point and the posterior side of the inferior spring element. The inferior spring element can have a medial side and a lateral side and can comprise an asymmetrical curved configuration on the medial side relative to the lateral side. The inferior spring element can have an anterior side, posterior side, medial side, lateral side, superior side, inferior side, longitudinal axis, transverse axis, and a flexural axis, and the flexural axis can be deviated from the transverse axis in the range between 10 and 50 degrees. The inferior spring element can comprise a tapered configuration.

Given a men's size 9 article of footwear, the superior spring element can comprise a thickness in the range between 0.5 and 7 mm, and the inferior spring element can comprise a length in the range between 100-160 mm, a width in the range between 70-90 mm, and a thickness in the range between 3 and 7 mm.

The article of footwear can comprise a central processing unit or CPU for adjusting the cushioning characteristics provided by said article of footwear.

The sole can comprise a midsole. The sole can comprise an outsole. The outsole can comprise an anterior outsole element and a posterior outsole element. The sole can comprise a stabilizer comprising a middle outsole element. The outsole can comprise a backing portion. The backing portion of the outsole can comprise at least one upwardly extending stability element. The outsole can comprise a pocket, whereby a portion of the cushioning means can be inserted into the pocket and the outsole is thereby at least partially removably affixed in functional relation to the cushioning means.

The sole can be affixed with the use of at least one hook. The sole can be affixed with the use of at least one snap. The sole can be affixed with the use of tongue and groove. The sole can be affixed with the use of at least one pin and channel. The sole can be affixed with a mechanical fastener.

The upper can have a superior side and inferior side, and the outsole can be removably affixed in functional relation to the inferior side of the upper. The upper can have a superior side and an inferior side, and the sole can comprise an outsole including a plurality of traction members, and the upper can further comprise a plurality of openings on the inferior side, whereby at least a portion of the outsole is removably affixed in functional relation to the upper and the plurality of traction members substantially project through the plurality of openings on the inferior side of the upper. At least one of the traction members can comprise an undercut, whereby the outsole can be mechanically secured in functional relation to the upper.

The step of securing a plurality of the sufficient footwear components in functional relation with fastening means can be completed in less than one working day. The step of securing a plurality of the sufficient footwear components in functional relation with fastening means can be completed in less than five minutes. The step of securing a plurality of the sufficient footwear components in functional relation with fastening means can be completed in less than one minute. All of the recited steps for making the custom article of footwear can be substantially completed at a retail store. Alternatively, the sufficient footwear components can be provided to an address selected by the individual, and the step of securing a plurality of the sufficient footwear components in functional relation with fastening means can be completed by the individual.

The data relating to the individual can comprise information selected from the group consisting of the individual's name, mailing address, age, sex, weight, foot length size, foot width size, arch characteristics, preferred athletic activity, performance level, telephone number, electronic mail address, identification number, password, preferred method of payment, preferred method of delivery, and the individual's preferences regarding the selection of the custom article of footwear and components thereof.

The data for making a custom article of footwear can be provided by the individual from a remote site using electronic means. The data and information and intelligence for making the custom article of footwear can be stored in a data storage and retrieval system for future use. The data can be transmitted electronically over a global communication network. The global communication network can comprise the Internet. The global communication network can include a wireless communication device such as a computer or cell phone.

The step of collecting data relating to an individual for making a custom article of footwear can comprise a means of communication selected from the group consisting of direct spoken word, direct observation and measurement, spoken word using a telephone, key selection using a telephone, written word, letter, facsimile, electronic mail, use of a point of purchase display, use of a computer keyboard, use of a computer touch screen, use of a computer including voice recognition capability, use of a data storage and retrieval system, use of a scanner, use of an imaging device, use of a photograph, use of video, use of a wireless computer, use of a wireless cell phone.

The step of creating information and intelligence for making a custom article of footwear can comprise information and intelligence selected from the group consisting of determining the individual's foot length, determining the individual's foot width, determining at least one appropriate footwear last, determining an appropriate three dimensional footwear model, determining a three dimensional footwear pattern, determining at least one appropriate footwear category type, determining at least one appropriate footwear style, determining at least one appropriate footwear sku, determining a plurality of appropriate footwear components and a plurality of variations of a plurality of the footwear components, determining present inventory and location thereof, causing new inventory to be created, determining the most efficient and cost effective location from which to distribute at least one footwear component of the custom article of footwear, and determining the most efficient and cost effective location from which to distribute the custom article of footwear.

The step of providing a plurality of footwear components, and a plurality of variations of a plurality of said footwear components for making a custom article of footwear, can comprise providing alternative footwear options selected from the group consisting of alternative footwear product categories, alternative footwear models, alternative footwear skus, alternative footwear colors, alternative footwear materials, alternative footwear components, alternative footwear options using images generated using a computer database, alternative footwear options using at least one actual footwear component, and alternative footwear options using at least one custom article of footwear.

The step of selecting from the plurality of footwear components sufficient footwear components for making a custom article of footwear can comprise providing a capability to the individual selected from the group consisting of providing a data input capability, providing a search capability, providing a selection capability, providing a purchase capability.

The step of providing information and intelligence and the sufficient footwear components to a physical location at which the custom article of footwear can be made can comprise a physical location selected from the group consisting of a company headquarters, a retail store, a sales office, a service center, a medical office, a factory, a vending machine, a warehouse and distribution center, a private residence.

The present invention teaches a method of making a custom article of footwear comprising the steps of:

collecting data relating to an individual;

creating from said collected data information and intelligence for making said custom article of footwear for said individual;

providing a plurality of footwear components, and a plurality of variations of a plurality of said footwear components, a plurality of said footwear components including fastening means;

selecting from the plurality of footwear components sufficient footwear components for making said custom article of footwear having an anterior side, a posterior side, a medial side, a lateral side, and comprising at least an upper, a sole, and cushioning means affixable together in functional relation by said fastening means; and, providing said information and intelligence and said sufficient footwear components to a private residence, whereby said sufficient footwear components for making said custom article of footwear are secured in functional relation with said fastening means and the assembly for making said custom article of footwear is completed.

The present invention teaches a method of making a custom article of footwear having an anterior side, a posterior side, a medial side, a lateral side, and comprising at least an upper, a sole, and cushioning means affixable together in functional relation comprising the steps of:

collecting data relating to an individual;

creating from said collected data information and intelligence for providing at least one footwear component for use in making said custom article of footwear;

providing a plurality of footwear components, and a plurality of variations of a plurality of said footwear components, a plurality of said footwear components including fastening means;

selecting from said plurality of footwear components said at least one footwear component for use in making said custom article of footwear; and, providing said information and intelligence and said at least one footwear component to a physical location, whereby a plurality of footwear components comprising sufficient footwear components for making said custom article of footwear including said at least one footwear component are secured in functional relation with said fastening means and the assembly for making said custom article of footwear is completed.

The present invention teaches a method of making a custom article of footwear with the use of a vending device, said article of footwear having an anterior side, a posterior side, a medial side, a lateral side, and comprising at least an upper, a sole, and cushioning means affixable together in functional relation comprising the steps of:

collecting data relating to an individual;

creating from said collected data information and intelligence for providing at least one footwear component for use in making said custom article of footwear;

providing a plurality of footwear components, and a plurality of variations of a plurality of said footwear components, a plurality of said footwear components including fastening means;

selecting from the plurality of footwear components said at least one footwear component for use in making said custom article of footwear; and, providing said information and intelligence and said at least one footwear component to a physical location, whereby a plurality of footwear components comprising sufficient footwear components for making said custom article of footwear including said at least one footwear component are secured in functional relation with said fastening means and the assembly for making said custom article of footwear is completed.

The step of collecting data relating to an individual using a vending device for making a custom article of footwear can comprise a means of communication selected from the group consisting of direct spoken word, direct observation and measurement, spoken word using a telephone, key selection using a telephone, written word, letter, facsimile, electronic mail, use of a point of purchase display, use of a computer keyboard, use of a computer touch screen, use of a computer including voice recognition capability, use of a data storage and retrieval system, use of a scanner, use of an imaging device, use of a photograph, use of video, use of a wireless computer, use of a wireless cell phone.

The data relating to the individual for making a custom article of footwear using a vending device can comprise information selected from the group consisting of the individual's name, mailing address, age, sex, weight, foot length size, foot width size, arch characteristics, preferred athletic activity, performance level, telephone number, electronic mail address, identification number, password, preferred method of payment, preferred method of delivery, and the individual's preferences regarding the selection of the custom article of footwear and components thereof.

The step of creating information and intelligence for making a custom article of footwear using a vending device can comprise information and intelligence selected from the group consisting of determining the individual's foot length, determining the individuals foot width, determining at least one appropriate footwear last, determining an appropriate three dimensional footwear model, determining a three dimensional footwear pattern, determining at least one appropriate footwear category type, determining at least one appropriate footwear style, determining at least one appropriate footwear sku, determining a plurality of appropriate footwear components and a plurality of variations of a plurality of the footwear components, determining present inventory and location thereof, causing new inventory to be created, determining the most efficient and cost effective location from which to distribute at least one footwear component of the custom article of footwear, determining the most efficient and cost effective location from which to distribute the custom article of footwear.

The step of providing a plurality of footwear components, and a plurality of variations of a plurality of said footwear components for making a custom article of footwear using a vending device, can comprise providing alternative footwear options selected from the group consisting of alternative footwear product categories, alternative footwear models, alternative footwear skus, alternative footwear colors, alternative footwear materials, alternative footwear components, alternative footwear options using images generated using a computer database, alternative footwear options using at least one actual footwear component, and alternative footwear options using at least one custom article of footwear.

The step of selecting from the plurality of footwear components sufficient footwear components for making the custom article of footwear using a vending device can comprise providing a capability to the individual selected from the group consisting of providing a data input capability, providing a search capability, providing a selection capability, providing a purchase capability.

The step of causing a custom article of footwear to be delivered to a designated address from a physical location with the use of a vending device can comprise a site selected from the group consisting of a company headquarters, a retail store, a sales office, a service center, a medical office, a factory, a vending machine, a warehouse and distribution center.

The custom article of footwear can comprise a shoe or boot. The article of footwear can be overlasted and include a removable insole, whereby the insole can be removed and replaced as desired by a different footwear component. The different footwear component can comprise a footwear component selected from the group consisting of an insole, an inner liner, a fit-sleeve, a sock, a slipper, a boot, an aquatic boot, a cold weather liner, a hot and humid weather liner, a cold weather slipper, a hot and humid weather slipper, a conventional shoe, or a rock climbing shoe which can be inserted and fit within the custom article of footwear.

The aforementioned methods of making and delivering a custom article of footwear, or at least one component thereof, can be applied to many footwear products for use in running, walking, basketball, tennis, volleyball, cross-training, baseball, football, golf, soccer, cycling, sandals, skating, and hiking.

BRIEF DESCRIPTION OF THE DRAWING FIGURES

Figure 100:
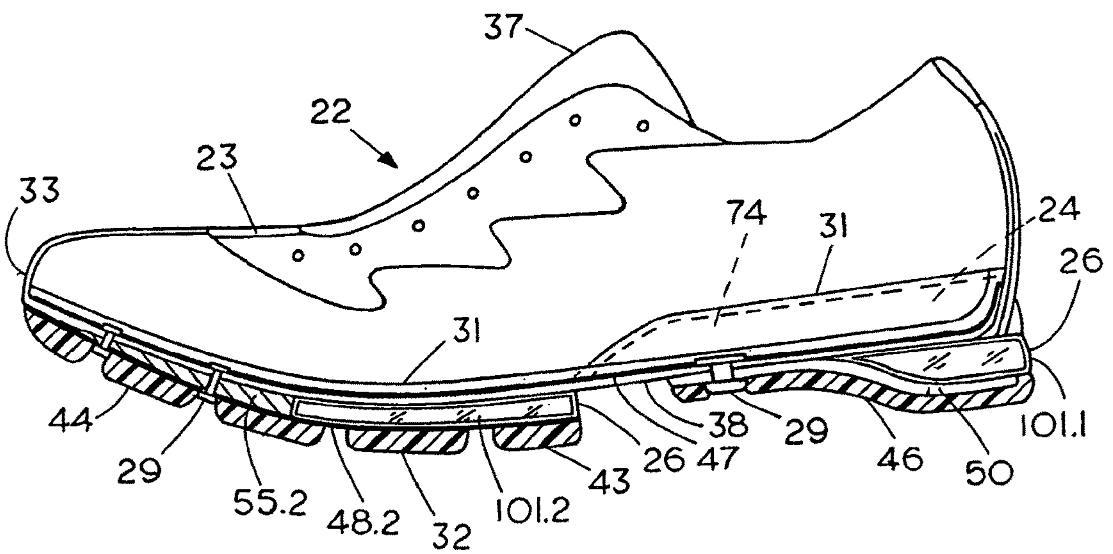

FIG. 100 is a longitudinal cross-sectional medial side view of an alternate article of footwear including two midsole cushioning elements consisting of a first fluid-filled bladder affixed between the superior spring element and the inferior spring element in the rearfoot area, and a second fluid-filled bladder affixed between the superior spring element and an inferior anterior spring element in the forefoot area.

Figure 101:
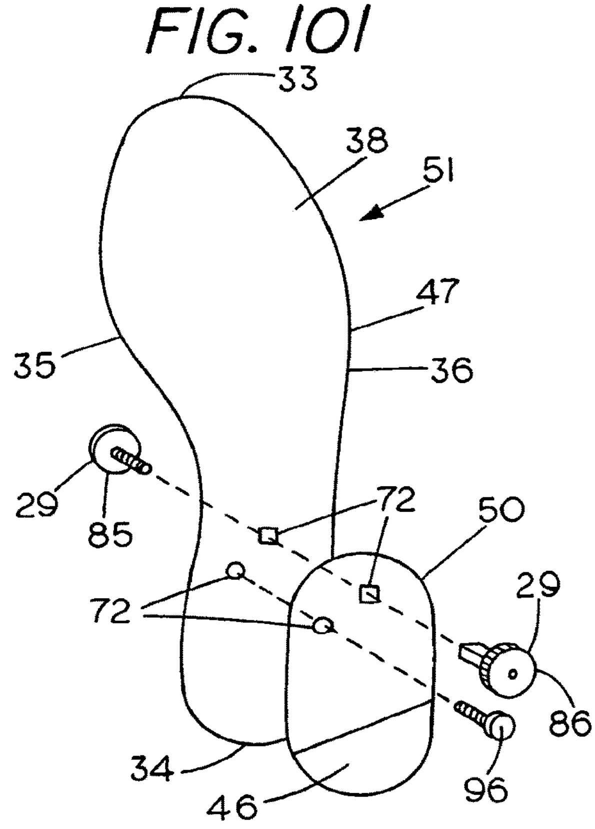

FIG. 101 is a perspective exploded view of a spring element including a superior spring element, and an inferior spring element showing a fastener and a locating pin.

Figure 102:
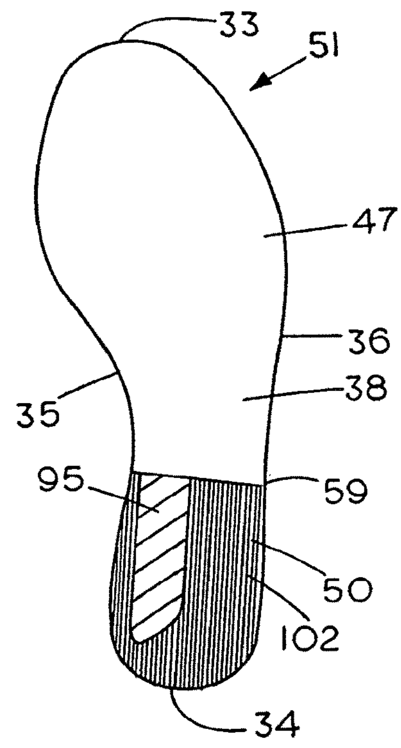

FIG. 102 is a bottom plan view of a spring element including a superior spring element, and an inferior spring element having an insert.

Figure 103:
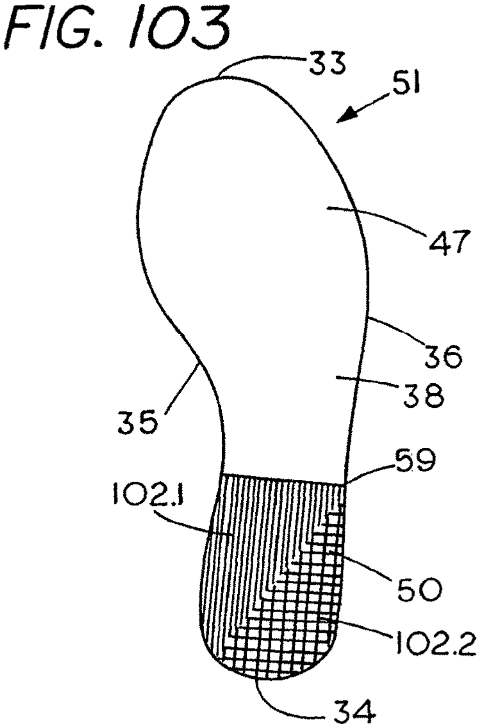

FIG. 103 is a bottom plan view of a spring element including a superior spring element, and an inferior spring element having different fiber composite materials on the medial side than on the lateral side.

Figure 104:
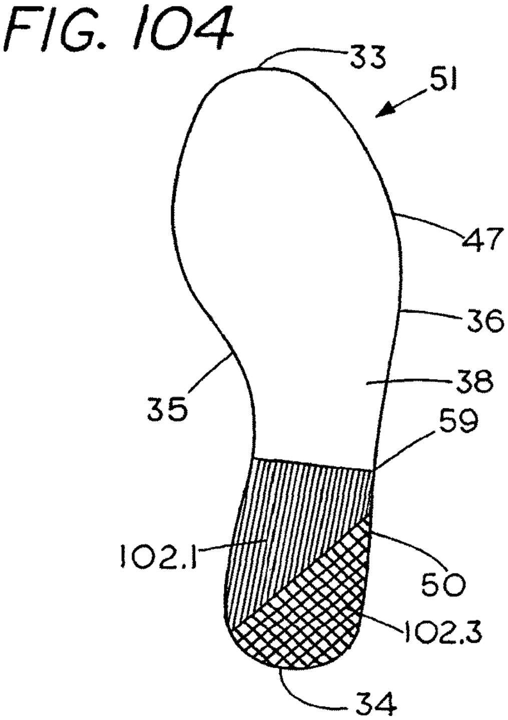

FIG. 104 is a bottom plan view of a spring element including a superior spring element, and an inferior spring element having different fiber composite materials on the medial side than on the lateral side.

Figure 105:
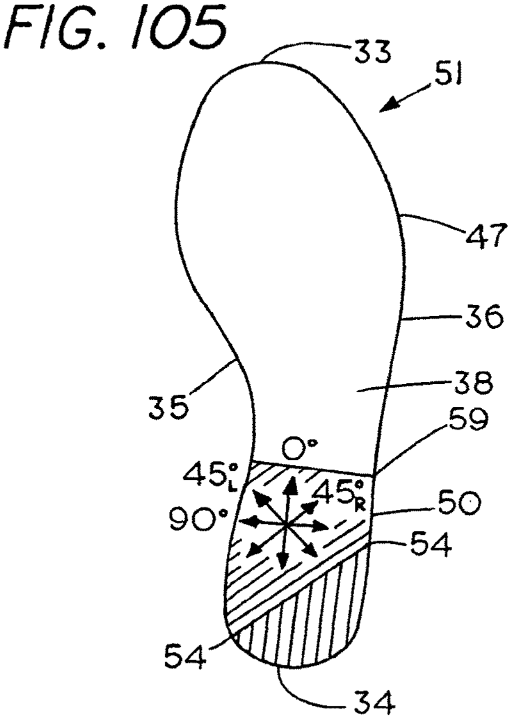

FIG. 105 is a bottom plan view of a spring element including a superior spring element, and an inferior spring element having different fiber composite material orientations on the medial side than on the lateral side.

Figure 106:
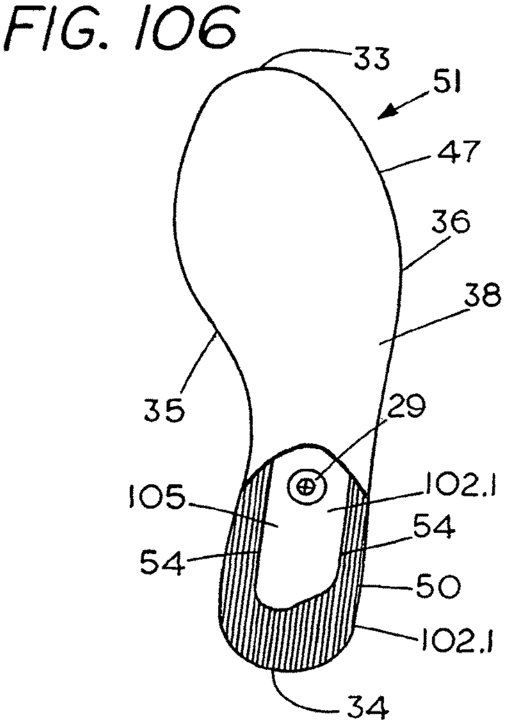

FIG. 106 is a bottom plan view of a spring element including a superior spring element, and an inferior spring element having different fiber composite material orientation on the medial side, lateral side, and posterior side, than in the middle portion.

Figure 107:
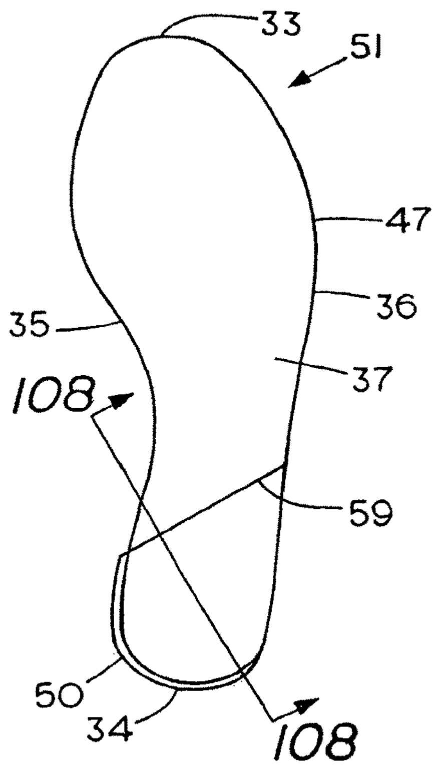

FIG. 107 is a top plan view of a spring element including a superior spring element and an inferior spring element made of a metal material.

Figure 108:
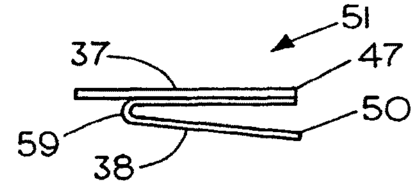

FIG. 108 is a cross-sectional view of the spring element shown in FIG. 107 taken along line 108-108.

Figure 109:
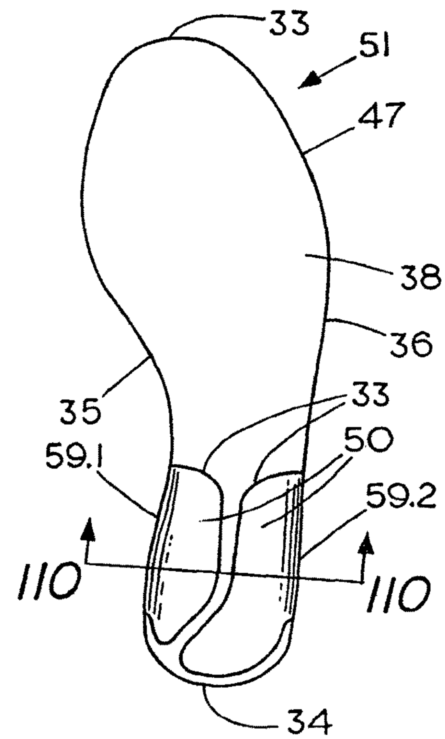

FIG. 109 is a bottom plan view of a spring element including a superior spring element and an inferior spring element made of a metal material.

Figure 110:
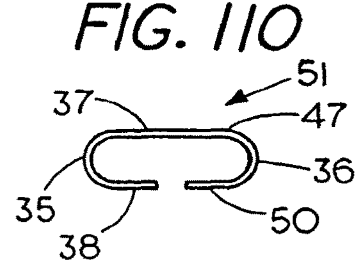

FIG. 110 is a cross-sectional view of the spring element shown in FIG. 109 taken along line 110-110.

Figure 111:
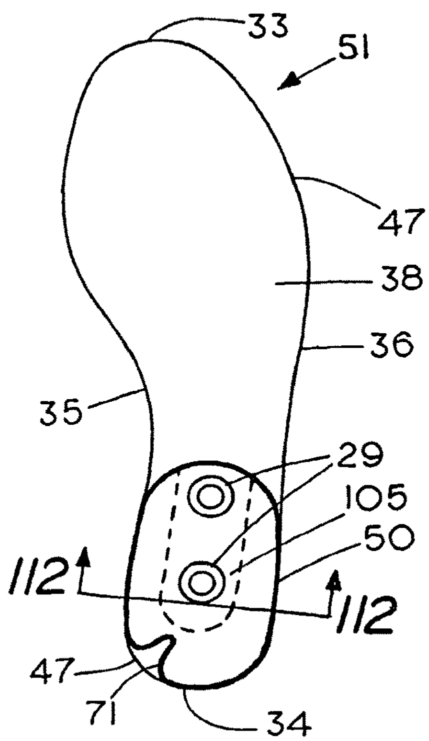

FIG. 111 is a bottom plan view of a spring element including a superior spring element and an inferior spring element having a symmetrical cantilever shape.

Figure 112:
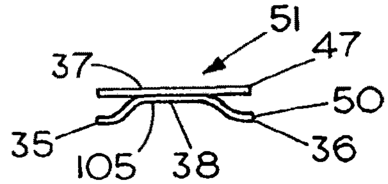

FIG. 112 is a cross-sectional view of the spring element shown in FIG. 111 taken along line 112-112.

Figure 113:
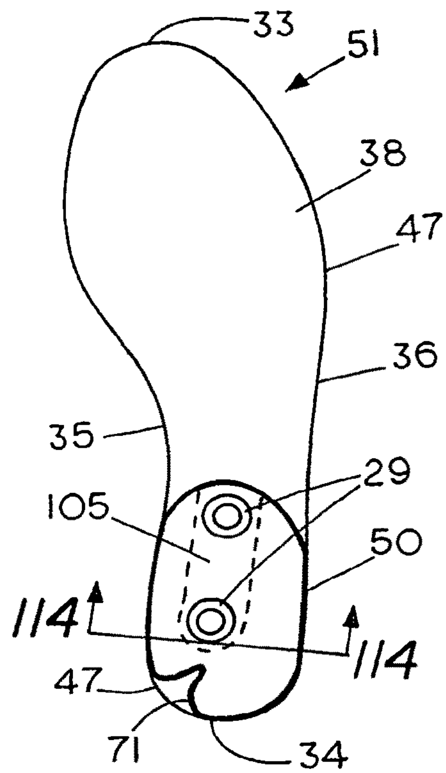

FIG. 113 is a bottom plan view of a spring element including a superior spring element and an inferior spring element having an asymmetrical cantilever shape.

Figure 114:
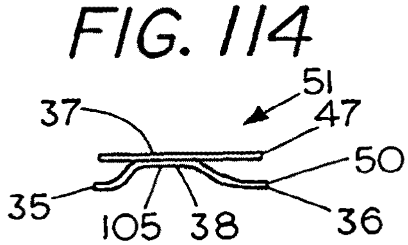

FIG. 114 is a cross-sectional view of the spring element shown in FIG. 113 taken along line 114-114.

Figure 74:
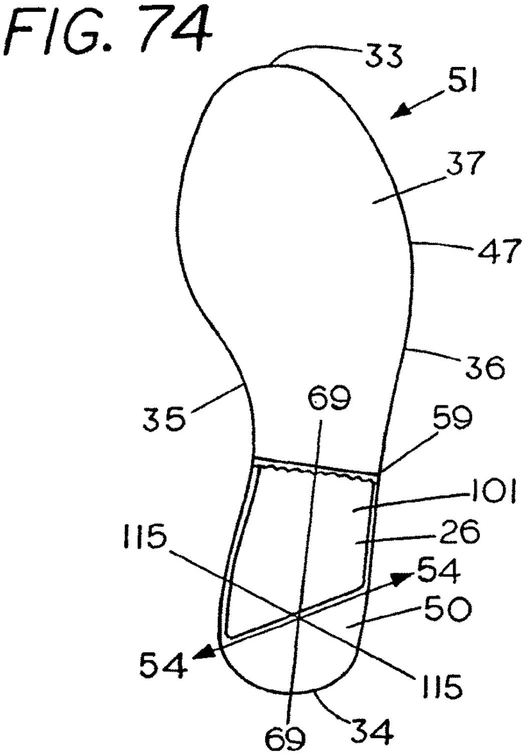
FIG. 74 is a top plan view of a spring element including a superior spring element with parts broken away posterior of the flexural axis in order to reveal a midsole cushioning element and an inferior spring element.
Figure 115:
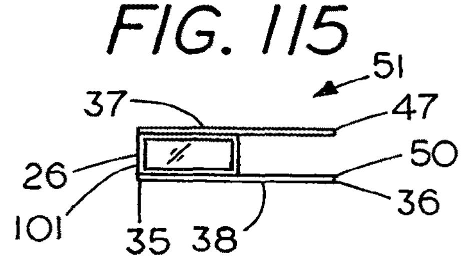

FIG. 115 is a cross-sectional view of the spring element shown in FIG. 74 taken along line 115-115.

Figure 75:
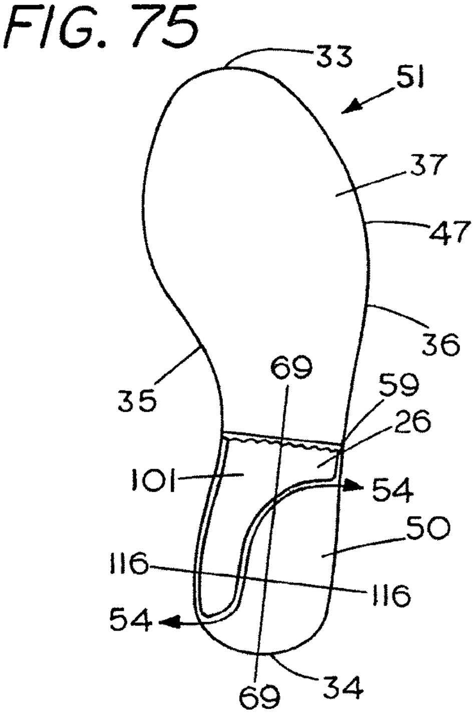
FIG. 75 is a top plan view of a spring element including a superior spring element with parts broken away posterior of the flexural axis in order to reveal a midsole cushioning element and an inferior spring element.
Figure 116:
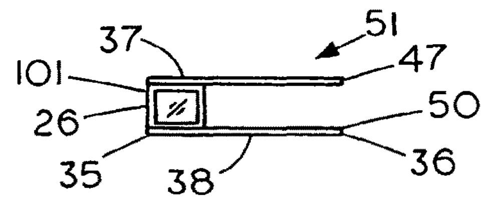

FIG. 116 is a cross-sectional view of the spring element shown in FIG. 75 taken along line 116-116.

Figure 76:
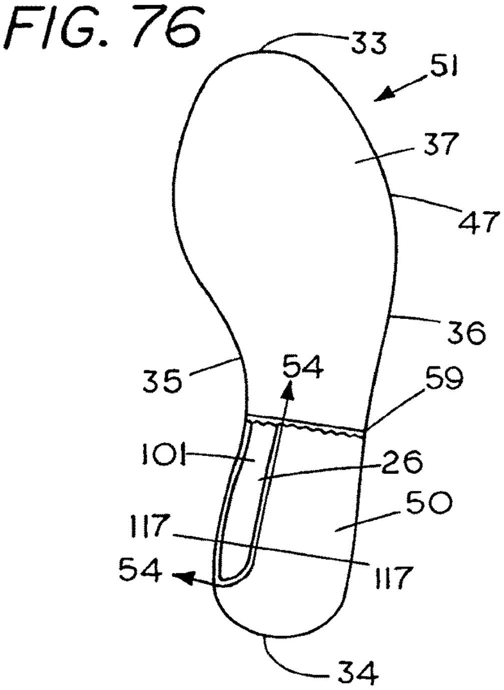
FIG. 76 is a top plan view of a spring element including a superior spring element with parts broken away posterior of the flexural axis in order to reveal a midsole cushioning element and an inferior spring element.
Figure 117:
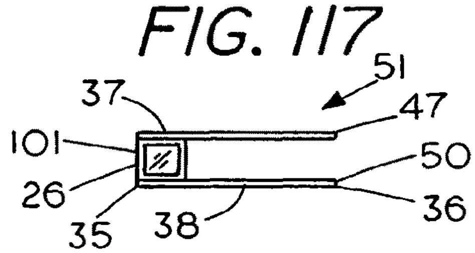

FIG. 117 is a cross-sectional view of the spring element shown in FIG. 76 taken along line 117-117.

Figure 118:
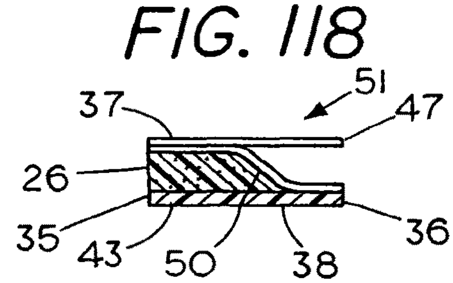

FIG. 118 is a cross-sectional view of an alternate spring element taken along a line similar to 115 shown in FIG. 74.

Figure 119:
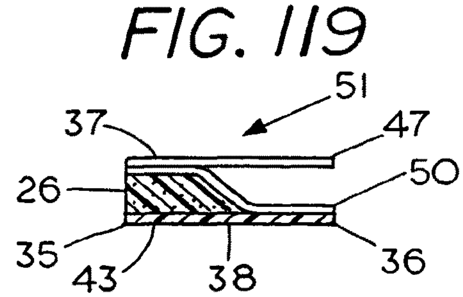

FIG. 119 is a cross-sectional view of an alternate spring element taken along a line similar to 116 shown in FIG. 75.

Figure 120:
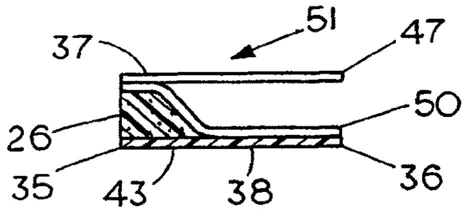

FIG. 120 is a cross-sectional view of an alternate spring element taken along a line similar to 117 shown in FIG. 76.

Figure 121:
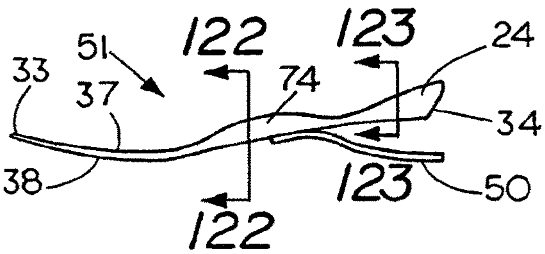

FIG. 121 is a side view of a spring element including a superior spring element including a heel counter and side support, and an inferior spring element.

Figure 122:
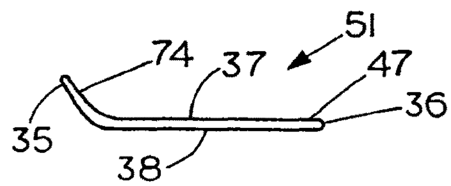

FIG. 122 is a cross-sectional view taken along line 122-122 of the superior spring element shown in FIG. 121.

Figure 123:
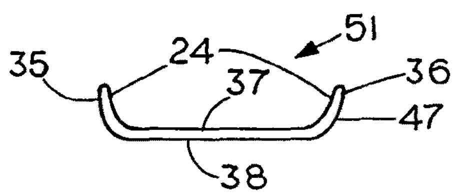

FIG. 123 is a cross-sectional view taken along line 123-123 of the superior spring element shown in FIG. 121.

Figure 124:
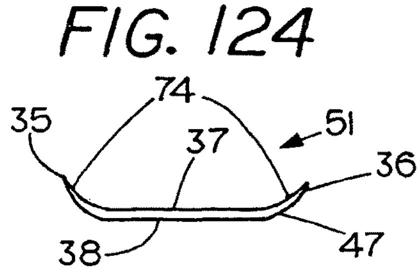

FIG. 124 is a cross-sectional view of an alternate spring element taken along a line similar to 122 shown in FIG. 121.

Figure 125:
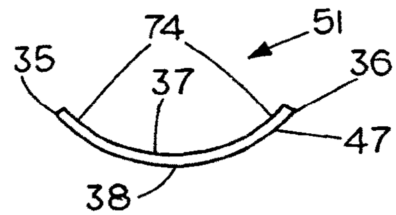

FIG. 125 is a cross-sectional view of an alternate spring element having an arcuate shape taken along a line similar to 122 shown in FIG. 121.

Figure 126:
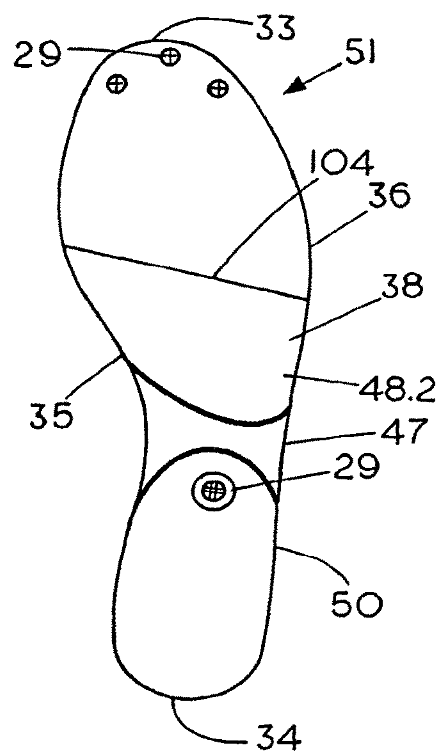

FIG. 126 is a bottom plan view of a spring element including a superior spring element, an anterior spring element, and an inferior spring element.

Figure 127:
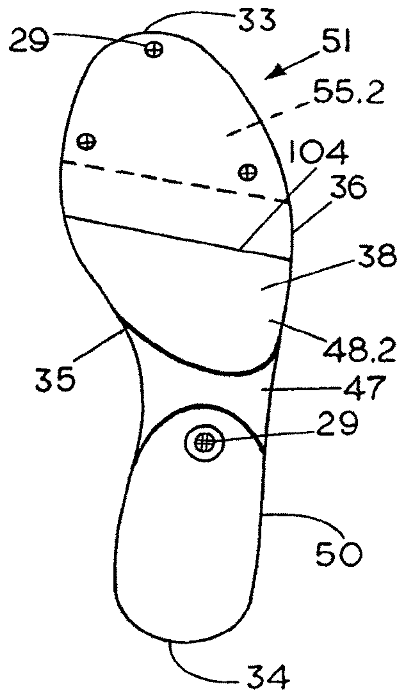

FIG. 127 is a bottom plan view of a spring element including a superior spring element, an anterior spring element, and an inferior spring element.

Figure 128:
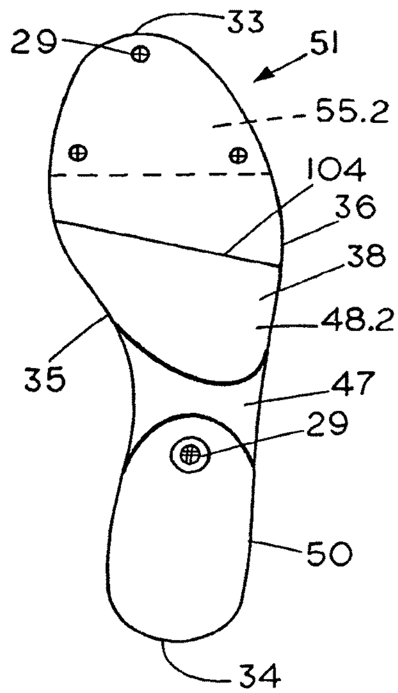

FIG. 128 is a bottom plan view of a spring element including a superior spring element, an anterior spring element, and an inferior spring element.

Figure 129:
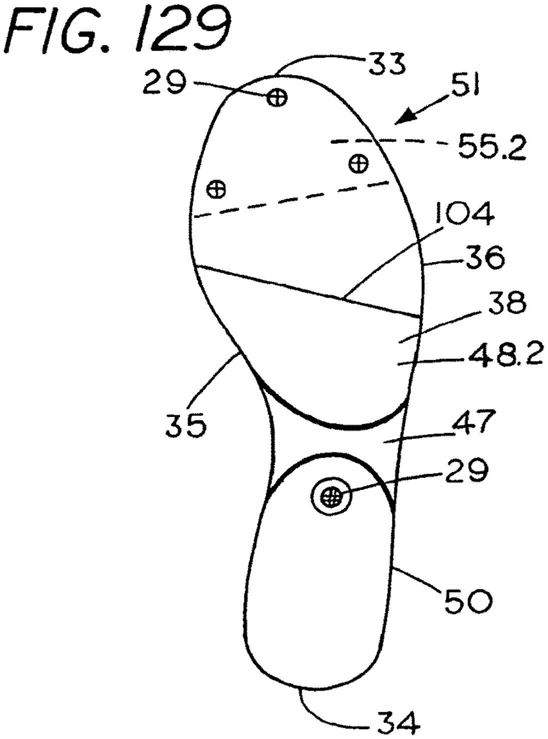

FIG. 129 is a bottom plan view of a spring element including a superior spring element, an anterior spring element, and an inferior spring element.

Figure 130:
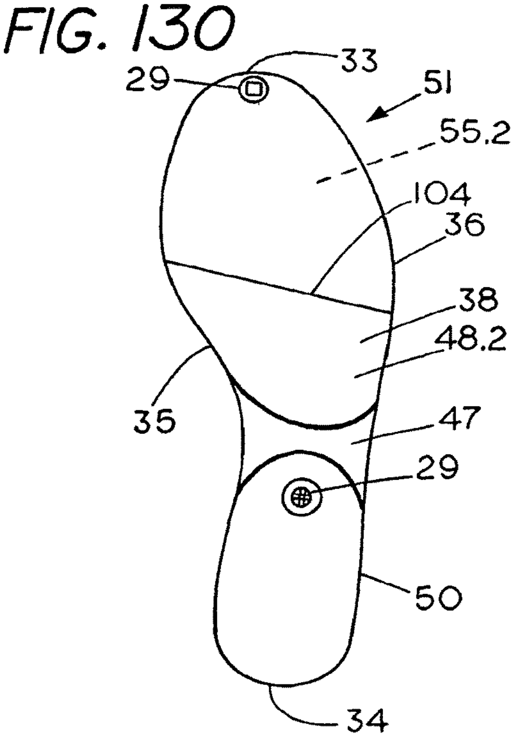

FIG. 130 is a bottom plan view of a spring element including a superior spring element, an anterior spring element, and an inferior spring element.

Figure 131:
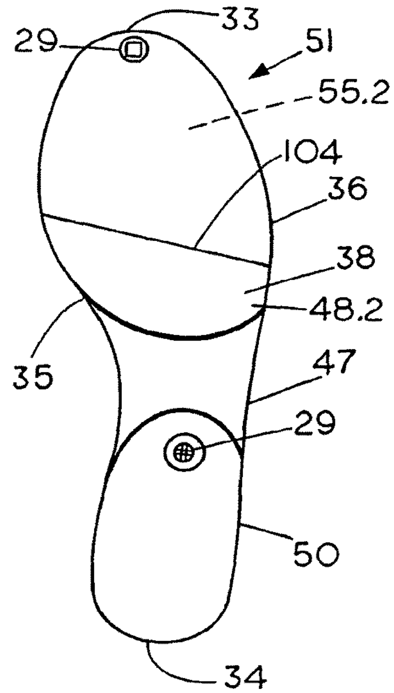

FIG. 131 is a bottom plan view of a spring element including a superior spring element, an anterior spring element, and an inferior spring element.

Figure 132:
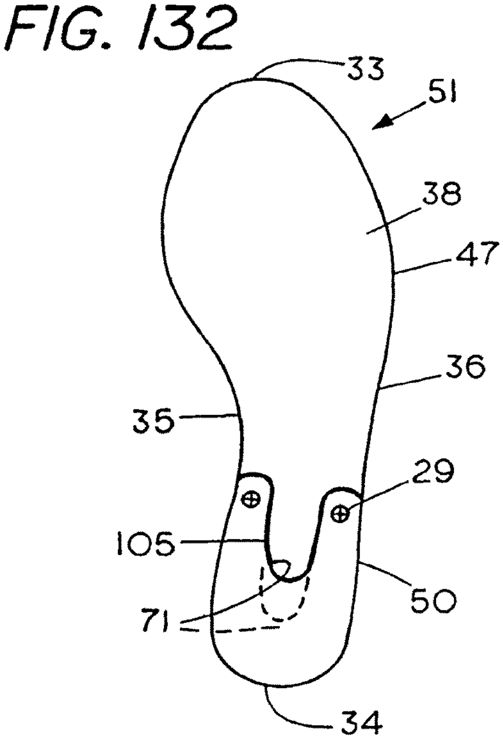

FIG. 132 is a bottom plan view of a spring element including a superior spring element, and an inferior spring element having a U-shape.

Figure 133:
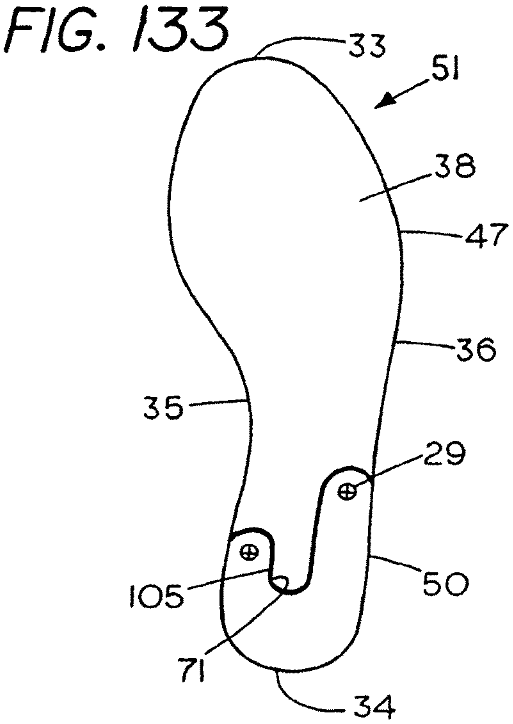

FIG. 133 is a bottom plan view of a spring element including a superior spring element, and an inferior spring element having a J-shape.

Figure 134:
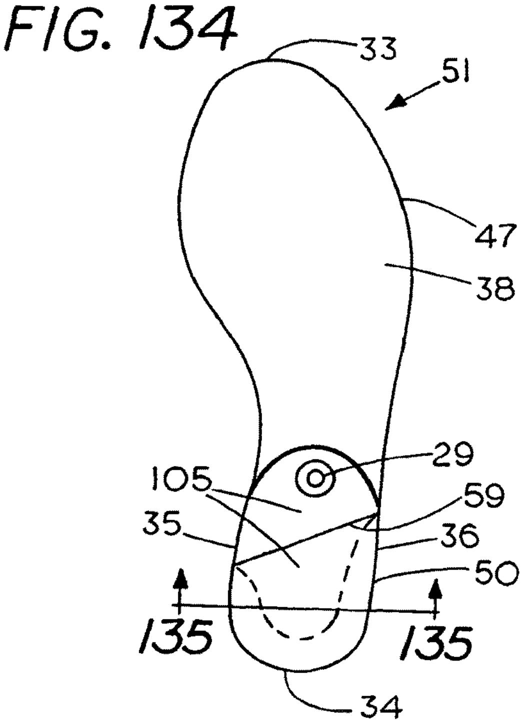

FIG. 134 is a bottom plan view of a spring element including a superior spring element, and an inferior spring element having a curved shape.

Figure 135:
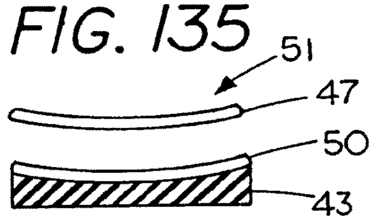

FIG. 135 is a cross-sectional view taken along line 135-135 of the spring element shown in FIG. 134.

Figure 136:
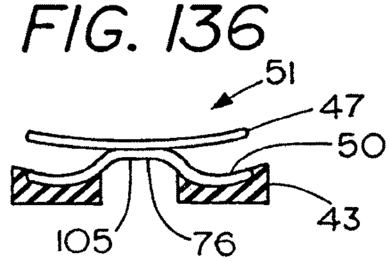

FIG. 136 is a cross-sectional view taken along a line similar to 135-135 of an alternate spring element having a cantilever shape.

Figure 137:
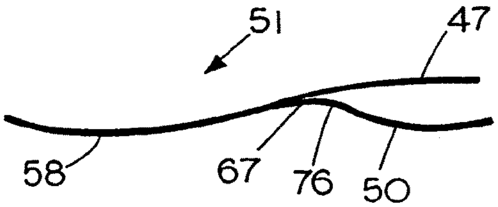

FIG. 137 is a medial side view of a spring element including a superior spring element and an inferior spring element including a concavity in the midfoot area and toe spring in the forefoot area.

Figure 138:
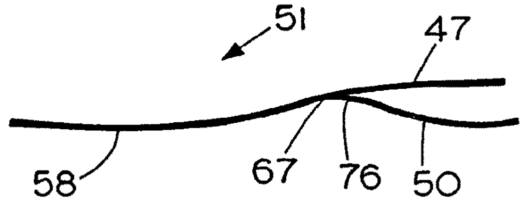

FIG. 138 is a medial side view of a spring element including a superior spring element, an inferior spring element including a concavity in the midfoot area, but substantially without toe spring in the forefoot area.

Figure 139:
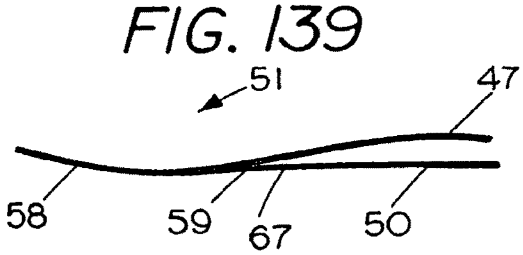

FIG. 139 is a medial side view of a spring element including a superior spring element and an inferior spring element including a flexural axis and toe spring in the forefoot area.

Figure 140:
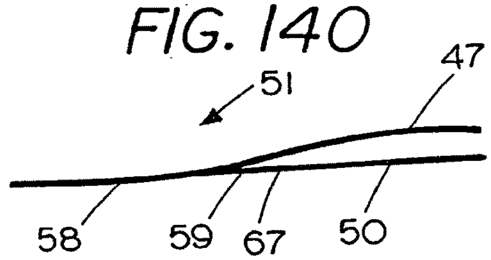

FIG. 140 is a medial side view of a spring element including a superior spring element, an inferior spring element including a flexural axis in the forefoot area, but substantially without toe spring in the forefoot area.

Figure 141:
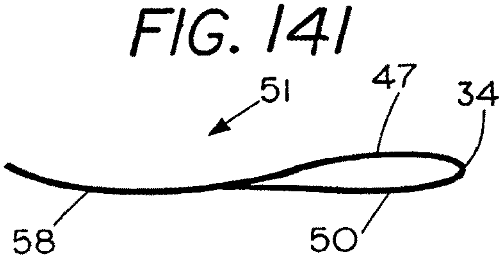

FIG. 141 is a medial side view of a spring element including a superior spring element formed in continuity with an inferior spring element having an elliptical shape near the posterior side.

Figure 142:
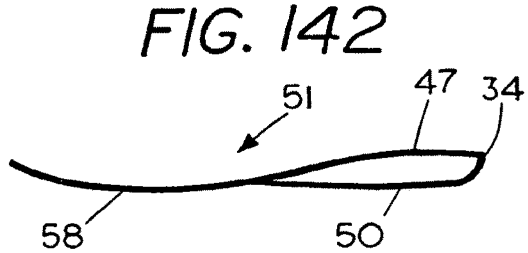

FIG. 142 is a medial side view of a spring element including a superior spring element formed in continuity with an inferior spring element having an upwardly curved shape near the posterior side.

Figure 143:
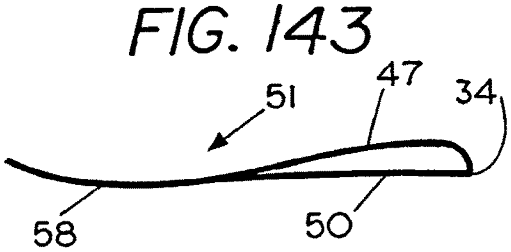

FIG. 143 is a medial side view of a spring element including a superior spring element having a downwardly curved shape near the posterior side which is formed in continuity with an inferior spring element.

Figure 144:
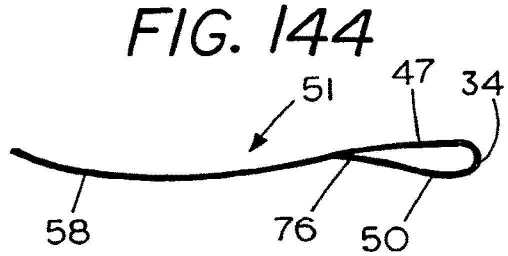

FIG. 144 is a medial side view of a spring element including a superior spring element formed in continuity with an inferior spring element having an elliptical shape near the posterior side and a concavity in the midfoot area.

Figure 145:
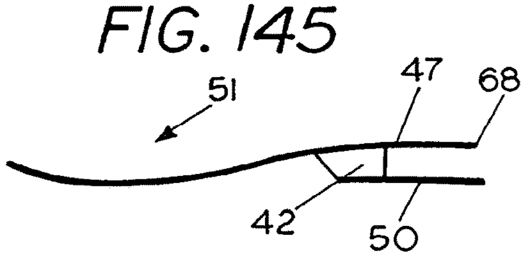

FIG. 145 is a medial side view of a spring element including a superior spring element which is affixed to a posterior spacer and a generally planar inferior spring element.

Figure 146:
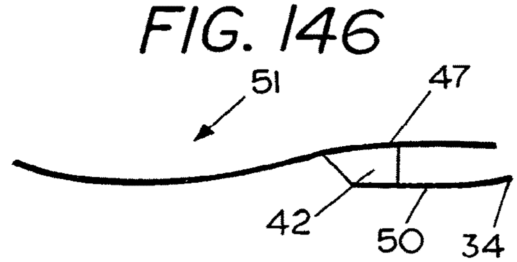

FIG. 146 is a medial side view of a spring element including a superior spring element which is affixed to a posterior spacer and an inferior spring element that is curved upwards at the posterior side.

Figure 147:
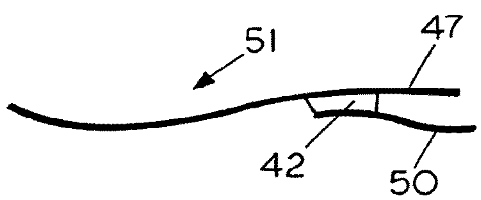

FIG. 147 is a medial side view of a spring element including a superior spring element which is affixed to a posterior spacer and an inferior spring element that is curved downward near its anterior end and curved upwards near the posterior side.

Figure 148:
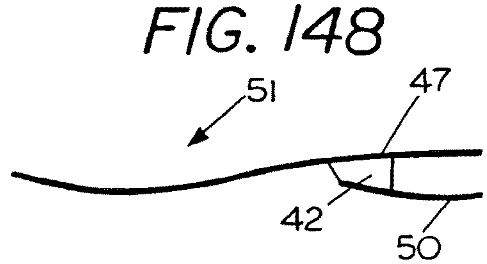

FIG. 148 is a medial side view of a spring element including a superior spring element which is affixed to a posterior spacer and an inferior spring element that is arcuate and curved upwards at both ends.

Figure 149:
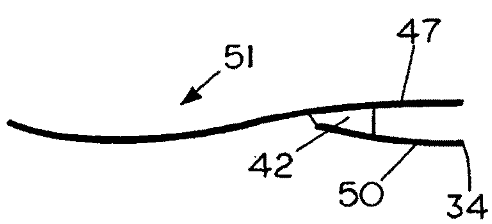

FIG. 149 is a medial side view of a spring element including a superior spring element which is affixed to a posterior spacer and an inferior spring element that projects downwards near its anterior end, but is approximately horizontal near the posterior side.

Figure 150:
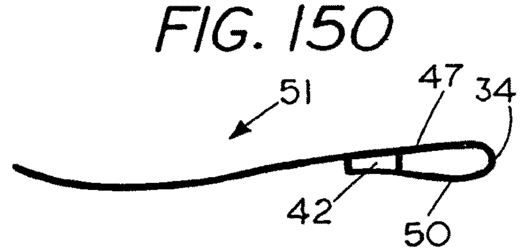

FIG. 150 is a medial side view of a spring element including a superior spring element which is formed in continuity with an inferior spring element that has an elliptical shape near the posterior side, and the inferior spring element is affixed to a posterior spacer and the superior spring element near its anterior end.

Figure 151:
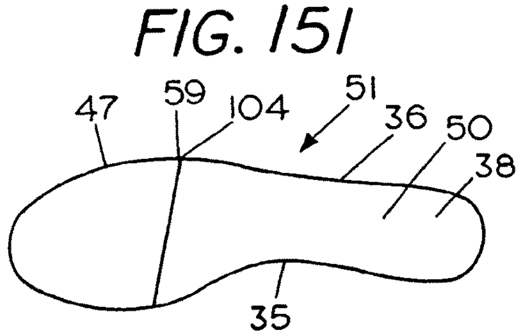

FIG. 151 is a bottom plan view of a spring element including a superior spring element and an inferior spring element showing a line which represents the approximate position of the metatarsal-phalangeal joints and also the flexural axis.

Figure 152:
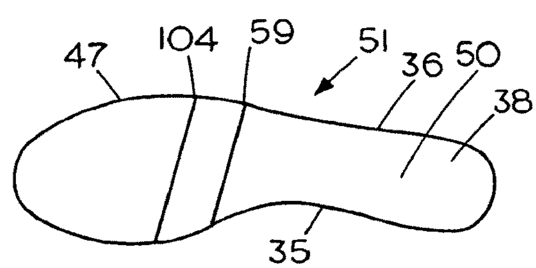

FIG. 152 is a bottom plan view of a spring element including a superior spring element and an inferior spring element showing a line which represents the approximate position of the metatarsal-phalangeal joints, and a more posterior and parallel flexural axis.

Figure 153:
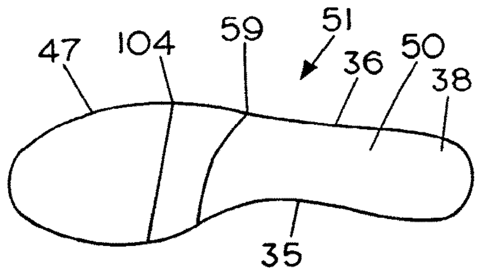

FIG. 153 is a bottom plan view of a spring element including a superior spring element and an inferior spring element showing a line which represents the approximate position of the metatarsal-phalangeal joints and also a more posterior flexural axis that is approximately parallel near the medial side, but which curves away near the lateral side.

Figure 154:
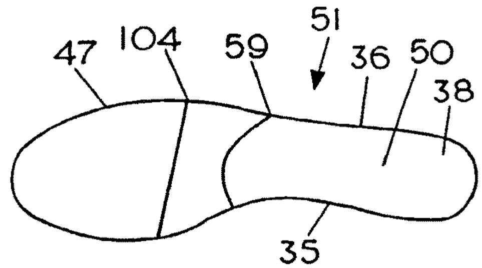

FIG. 154 is a bottom plan view of a spring element including a superior spring element and an inferior spring element showing a line which represents the approximate position of the metatarsal-phalangeal joints and also a more posterior and arcuate flexural axis.

Figure 155:
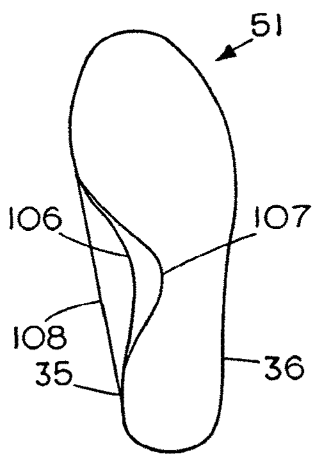

FIG. 155 is a top plan view of a spring element showing a line that represents the approximate position of the metatarsal-phalangeal joints, and also straight last, semi-curved last, and curved last configurations.

Figure 156:
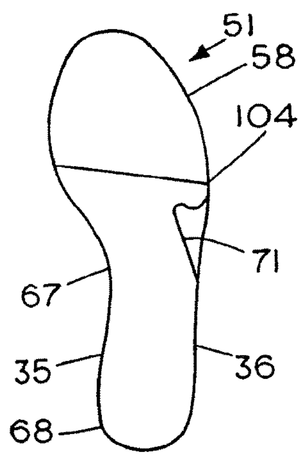

FIG. 156 is a top plan view of a spring element showing a line that represents the approximate position of the metatarsal-phalangeal joints, and a notch on the lateral side.

Figure 157:
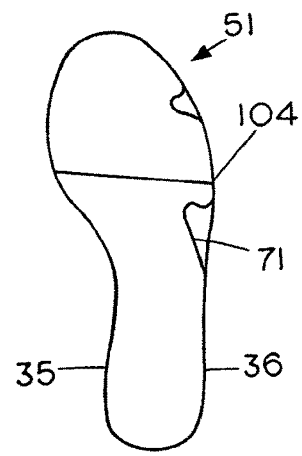

FIG. 157 is a top plan view of a spring element showing a line that represents the approximate position of the metatarsal-phalangeal joints, and two notches on the lateral side.

Figure 158:
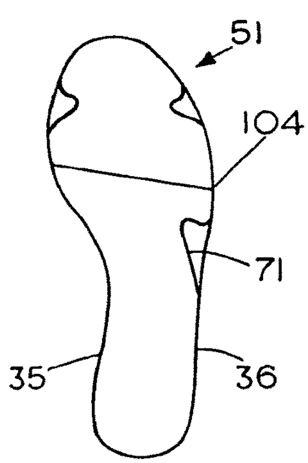

FIG. 158 is a top plan view of a spring element showing a line that represents the approximate position of the metatarsal-phalangeal joints, two notches on the lateral side, and one notch on the medial side.

Figure 159:
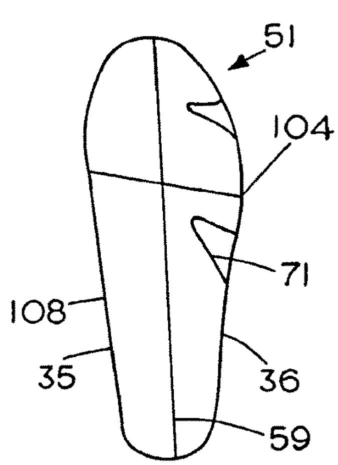

FIG. 159 is a top plan view of a spring element showing a line that represents the approximate position of the metatarsal-phalangeal joints, a straight last configuration, and two notches on the lateral side.

Figure 160:
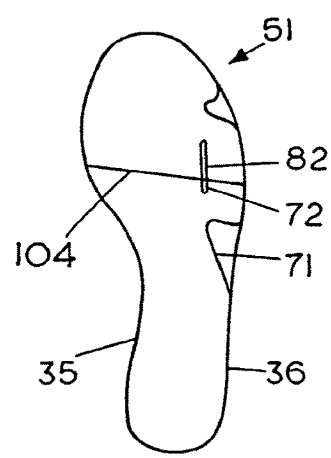

FIG. 160 is a top plan view of a spring element showing a line that represents the approximate position of the metatarsal-phalangeal joints, two notches on the lateral side, and an opening which forms a slit near the lateral side.

FIG. 161 is a top plan view of a spring element showing a line that represents the approximate position of the metatarsal-phalangeal joints, a notch on the lateral side, and a notch extending from near the anterior side forming a slit.

FIG. 162 is a top plan view of a spring element showing a line that represents the approximate position of the metatarsal-phalangeal joints, two notches on the lateral side, and a notch extending from near the anterior side forming a slit.

FIG. 163 is a top plan view of a spring element showing a line that represents the approximate position of the metatarsal-phalangeal joints, a notch on the lateral side, and an opposing notch on the medial side.

FIG. 164 is a top plan view of a spring element showing a line that represents the approximate position of the metatarsal-phalangeal joints, three notches on the lateral side, and three opposing notches on the medial side.

FIG. 165 is a top plan view of a spring element showing a line that represents the approximate position of the metatarsal-phalangeal joints, a notch on the lateral side, and a notch extending from the anterior side forming a slit.

FIG. 166 is a top plan view of a spring element showing a line that represents the approximate position of the metatarsal-phalangeal joints, and three notches on the lateral side.

FIG. 167 is a top plan view of a spring element showing a line that represents the approximate position of the metatarsal-phalangeal joints, three notches on the lateral side, and one notch on the medial side.

FIG. 168 is a top plan view of a spring element showing a line that represents the approximate position of the metatarsal-phalangeal joints, three notches on the lateral side, and two notches on the medial side.

FIG. 169 is a top plan view of a spring element showing a line that represents the approximate position of the metatarsal-phalangeal joints, three notches on the lateral side, and two notches on the medial side.

FIG. 170 is a top plan view of a spring element showing a line that represents the approximate position of the metatarsal-phalangeal joints, four notches on the lateral side, and one notch on the medial side.

FIG. 171 is a top plan view of a spring element showing a line that represents the approximate position of the metatarsal-phalangeal joints, four notches on the lateral side, and two notches on the medial side.

FIG. 172 is a top plan view of a spring element showing a line that represents the approximate position of the metatarsal-phalangeal joints, four notches on the lateral side, and three notches on the medial side.

FIG. 173 is a top plan view of a spring element showing a line that represents the approximate position of the metatarsal-phalangeal joints, four notches on the lateral side, and four notches on the medial side.

FIG. 174 is a top plan view of a spring element showing a line that represents the approximate position of the metatarsal-phalangeal joints, a curved lasted configuration, and a notch extending from the anterior side forming a longitudinal slit.

FIG. 175 is a top plan view of a spring element showing a line that represents the approximate position of the metatarsal-phalangeal joints, a semi-curved lasted configuration, and a notch extending from the anterior side forming a longitudinal slit.

FIG. 176 is a top plan view of a spring element showing a line that represents the approximate position of the metatarsal-phalangeal joints, three notches on the lateral side, one notch on the medial side, and a notch extending from the anterior side forming a longitudinal slit.

Figure 177:
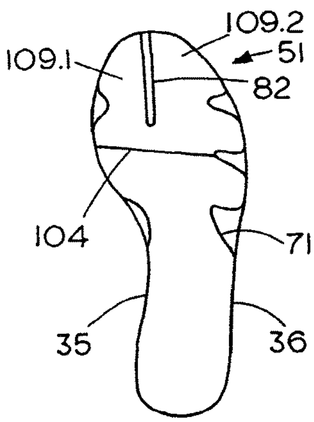

FIG. 177 is a top plan view of a spring element showing a line that represents the approximate position of the metatarsal-phalangeal joints, three notches on the lateral side, two notches on the medial side, and a notch extending from the anterior side forming a longitudinal slit.

Figure 178:
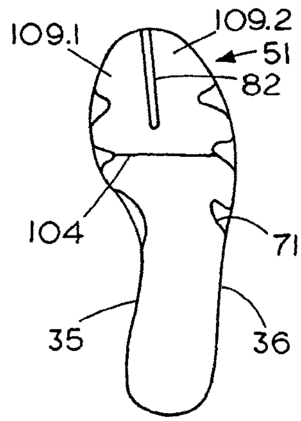

FIG. 178 is a top plan view of a spring element showing a line that represents the approximate position of the metatarsal-phalangeal joints, three notches on the lateral side, three notches on the medial side, and a notch extending from the anterior side forming a longitudinal slit.

Figure 179:
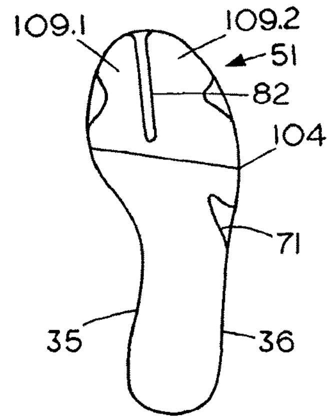

FIG. 179 is a top plan view of a spring element showing a line that represents the approximate position of the metatarsal-phalangeal joints, two notches on the lateral side, one notch on the medial side, and a notch extending from the anterior side forming a longitudinal slit.

Figure 180:
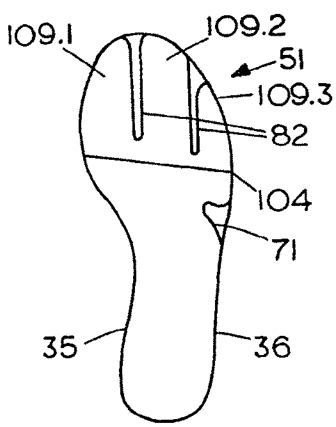

FIG. 180 is a top plan view of a spring element showing a line that represents the approximate position of the metatarsal-phalangeal joints, one notch on the lateral side, and two notches extending from the anterior side forming two longitudinal slits.

Figure 181:
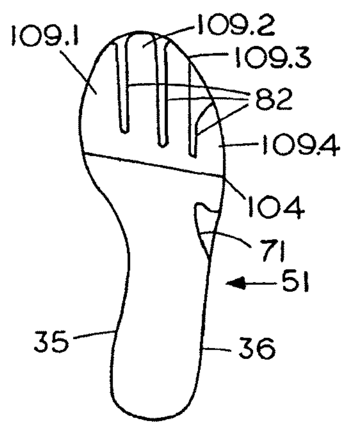

FIG. 181 is a top plan view of a spring element showing a line that represents the approximate position of the metatarsal-phalangeal joints, one notch on the lateral side, and three notches extending from the anterior side forming three longitudinal slits.

Figure 182:
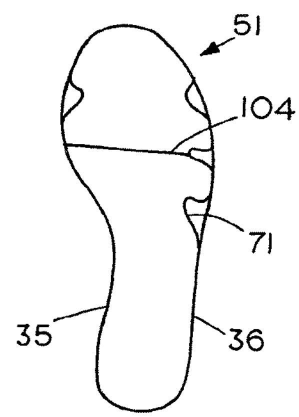

FIG. 182 is a top plan view of a spring element showing a line that represents the approximate position of the metatarsal-phalangeal joints, three notches on the lateral side, and one notch on the medial side.

Figure 183:
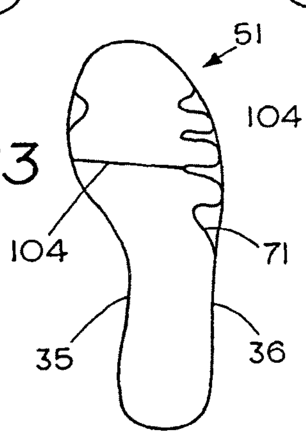

FIG. 183 is a top plan view of a spring element showing a line that represents the approximate position of the metatarsal-phalangeal joints, four notches on the lateral side, and one notch on the medial side.

Figure 184:
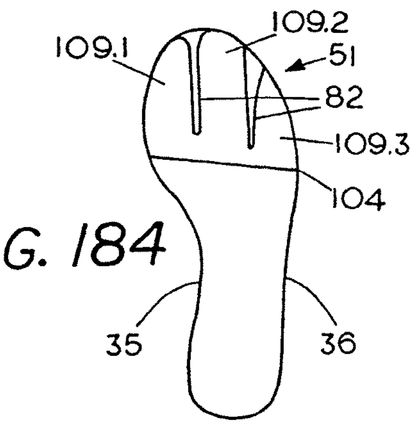

FIG. 184 is a top plan view of a spring element showing a line that represents the approximate position of the metatarsal-phalangeal joints, and two notches extending from the anterior side forming two longitudinal slits.

FIG. 185 is a top plan view of a spring element showing a line that represents the approximate position of the metatarsal-phalangeal joints, and three notches extending from the anterior side forming three longitudinal slits.

FIG. 186 is a top plan view of a spring element showing a line that represents the approximate position of the metatarsal-phalangeal joints, a notch on the lateral side, an opposing notch on the medial side, and two notches extending from the anterior side forming two longitudinal slits.

FIG. 187 is a top plan view of a spring element showing a line that represents the approximate position of the metatarsal-phalangeal joints, two notches on the lateral side, and two opposing notches on the medial side.

FIG. 188 is a top plan view of a spring element showing a line that represents the approximate position of the metatarsal-phalangeal joints, one notch on the medial side, an opposing notch on the lateral side, and one notch extending from the anterior side forming a longitudinal slit.

FIG. 189 is a top plan view of a spring element showing a line that represents the approximate position of the metatarsal-phalangeal joints, two notches on the medial side, two opposing notches on the lateral side, and one notch extending from the anterior side forming a longitudinal slit.

FIG. 190 is a top plan view of a spring element showing a line that represents the approximate position of the metatarsal-phalangeal joints, one notch on the medial side, an opposing notch on the lateral side, and three notches extending from the anterior side forming three longitudinal slits.

FIG. 191 is a top plan view of a spring element showing a line that represents the approximate position of the metatarsal-phalangeal joints, four notches on the medial side, four opposing notches on the lateral side, and one notch extending from the anterior side forming a longitudinal slit.

FIG. 192 is a top plan view of a spring element showing a notch on the medial side that extends anteriorly forming a longitudinal slit.

FIG. 193 is a top plan view of a spring element showing a relatively wide notch on the medial side that extends anteriorly forming a relatively wide longitudinal slit.

FIG. 194 is a top plan view of a spring element showing an oval shaped opening in the forefoot area.

FIG. 195 is a top plan view of a spring element showing an oval shaped opening in the forefoot area, and another oval shaped opening in the rearfoot area.

FIG. 196 is a top plan view of a spring element having an elongated opening extending between the rearfoot area, midfoot area, and forefoot area.

FIG. 197 is a top plan view of a spring element showing a line that represents the approximate position of the metatarsal-phalangeal joints, three notches on the lateral side including one in the midfoot area, and a notch extending from the anterior side forming a longitudinal slit.

FIG. 198 is a top plan view of a spring element showing a line that represents the approximate position of the metatarsal-phalangeal joints, three notches on the lateral side including one in the midfoot area which extends into the rearfoot area, and a notch extending from the anterior side forming a longitudinal slit.

FIG. 199 is a top plan view of a spring element showing a line that represents the approximate position of the metatarsal-phalangeal joints, two notches on the lateral side, a relatively wide notch on the medial side extending into the midfoot area and rearfoot area, and a notch extending from the anterior side forming a longitudinal slit.

FIG. 200 is a top plan view of a spring element showing a notch on the lateral side that extends anteriorly forming a longitudinal slit.

FIG. 201 is a top plan view of a spring element showing a line that represents the approximate position of the metatarsal-phalangeal joints, two notches on the lateral side, two notches on the medial side, and two notches extending from the anterior side forming two longitudinal slits forming three fingers resembling those of a bird or reptile.

FIG. 202 is a top plan view of a spring element showing a line that represents the approximate position of the metatarsal-phalangeal joints, two notches on the lateral side, two notches on the medial side, and three notches extending from the anterior side forming three longitudinal slits forming four fingers resembling those of a bird or reptile.

FIG. 203 is a top plan view of a spring element including a posterior spring element including a protrusion, a removable lateral anterior spring element and also medial anterior spring element, and fasteners.

FIG. 204 is a top plan view of a spring element including a removable lateral anterior spring element and a fastener.

FIG. 205 is a top plan view of a spring element including a removable medial anterior spring element and a fastener.

FIG. 206 is a top plan view of a spring element including a removable lateral anterior spring element and fasteners.

FIG. 207 is a top plan view of a spring element including a removable lateral anterior spring element, a fastener, and three notches extending from the anterior side forming three longitudinal slits.

FIG. 208 is a top plan view of a spring element including three fingers, three fasteners, and a posterior spring element.

FIG. 209 is a top plan view of a spring element including an anterior spring element having a notch on the lateral side that extends anteriorly forming a longitudinal slit, a fastener, and a posterior spring element.

FIG. 210 is a top plan view of a spring element including an anterior spring element having a notch on the lateral side and two notches which extend from the anterior side forming two longitudinal slits, a fastener, and a posterior spring element that extends into the forefoot area.

FIG. 211 is a top plan view of a spring element including an anterior spring element having two notches on the lateral side, one notch on the medial side, and two notches which extend from the anterior side forming two longitudinal slits, a fastener, and a posterior spring element that extends into the midfoot area.

FIG. 212 is a top plan view of a spring element including an anterior spring element having two notches on the lateral side, one notch on the medial side, and two notches which extend from the anterior side forming two longitudinal slits, a fastener, and a posterior spring element having a different configuration than that shown in FIG. 211.

FIG. 213 is a top plan view of a spring element including an anterior spring element having two notches on the lateral side which extend nearly to the longitudinal axis, a fastener, and a posterior spring element.

FIG. 214 is a top plan view of a spring element including a lateral anterior spring element, a medial anterior spring element, a lateral posterior spring element, a medial posterior spring element, and a bracket.

FIG. 215 is a top plan view of a spring element including a removable anterior spring element including a notch extending from the anterior side forming a longitudinal slit, two fasteners, and a posterior spring element having two notches on the lateral side.

FIG. 216 is a top plan view of a spring element including a removable lateral anterior spring element and medial anterior spring element, two fasteners, and a posterior spring element having a notch on the lateral side.

Figure 217:
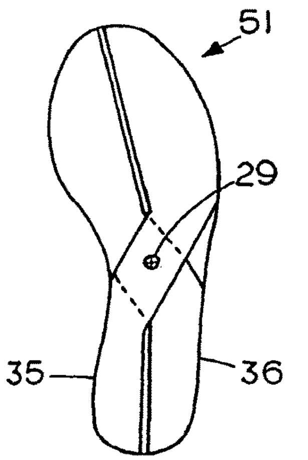

FIG. 217 is a top plan view of a spring element including a lateral anterior spring element formed as a single part with a medial posterior spring element, a medial anterior spring element formed as a single part with a lateral posterior spring element, and a fastener.

Figure 218:
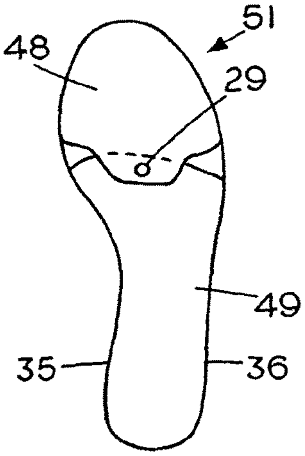

FIG. 218 is a top plan view of a spring element including an anterior spring element, a posterior spring element, and a fastener.

Figure 219:
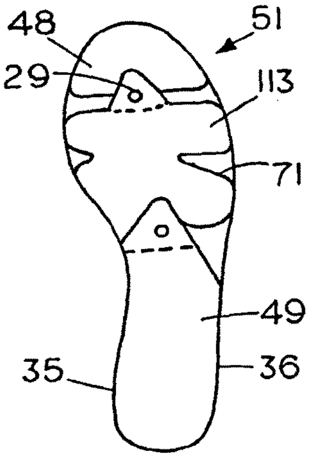

FIG. 219 is a top plan view of a spring element which includes an anterior spring element, an intermediate spring element, a posterior spring element, and two fasteners.

Figure 220:
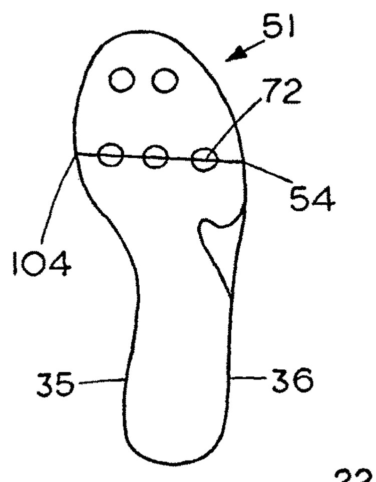

FIG. 220 is a top plan view of a spring element that includes a notch and a plurality of openings.

Figure 221:
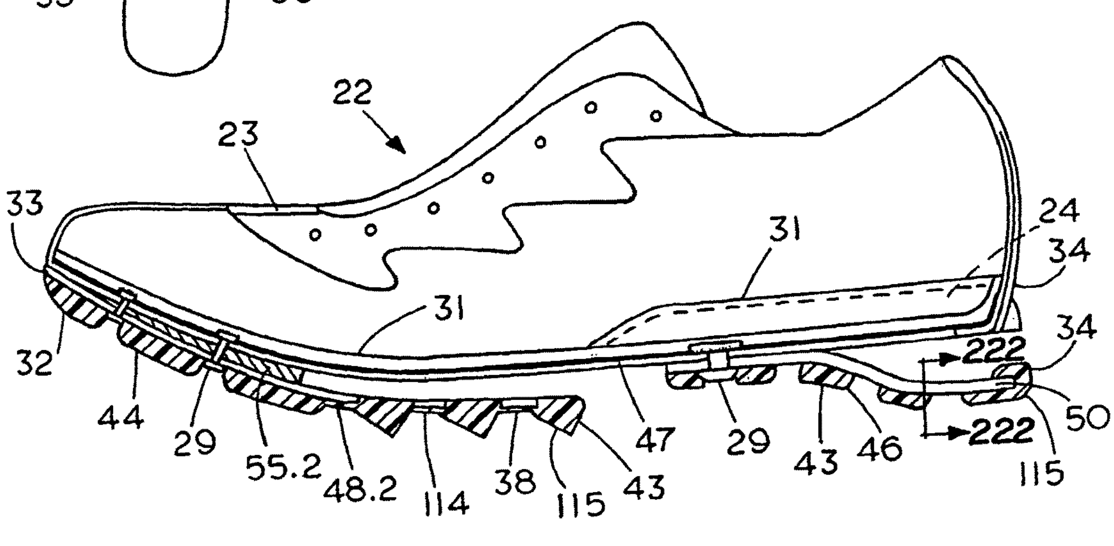

FIG. 221 is a longitudinal cross-sectional side view of an article of footwear including a spring element including a superior spring element, an anterior spring element, and an inferior spring element.

Figure 222:
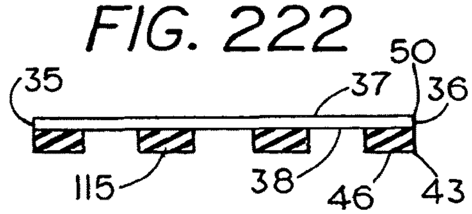

FIG. 222 is a cross-sectional view taken along line 222-222 of the inferior spring element shown in FIG. 221.

Figure 223:
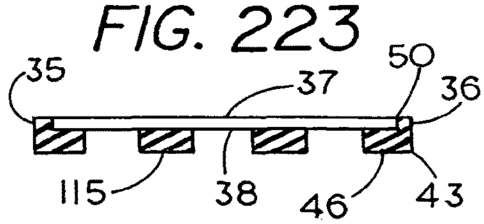

FIG. 223 is a cross-sectional view taken along a line similar to 222-222 of an alternate inferior spring element.

Figure 224:
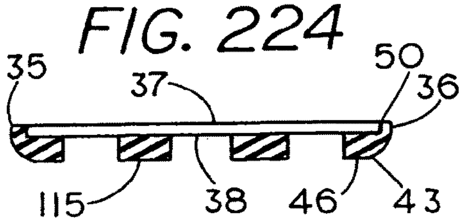

FIG. 224 is a cross-sectional view taken along a line similar to 222-222 of an alternate inferior spring element.

Figure 225:
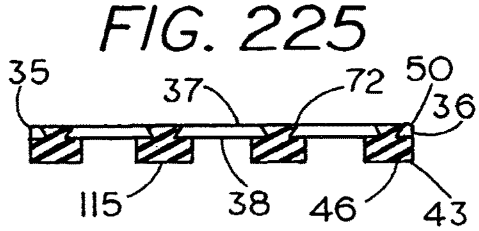

FIG. 225 is a cross-sectional view taken along a line similar to 222-222 of an alternate inferior spring element.

Figure 226:
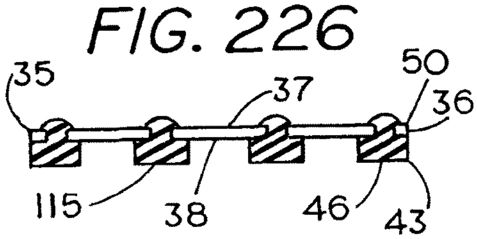

FIG. 226 is a cross-sectional view taken along a line similar to 222-222 of an alternate inferior spring element.

Figure 227:
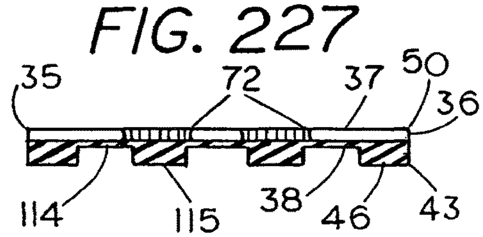

FIG. 227 is a cross-sectional view taken along a line similar to 222-222 of an alternate inferior spring element.

Figure 228:
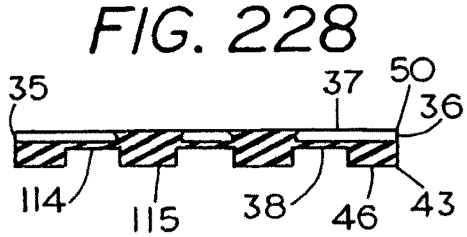

FIG. 228 is a cross-sectional view taken along a line similar to 222-222 of an alternate inferior spring element.

Figure 229:
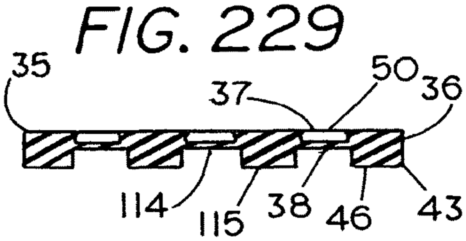

FIG. 229 is a cross-sectional view taken along a line similar to 222-222 of an alternate inferior spring element.

Figure 230:
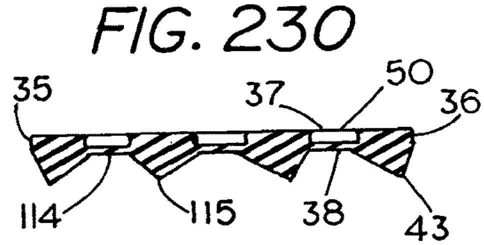

FIG. 230 is a cross-sectional view taken along a line similar to 222-222 of an alternate inferior spring element.

Figure 231:
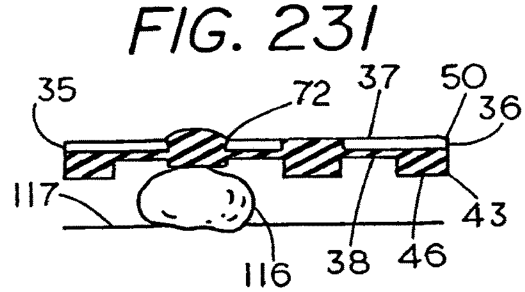

FIG. 231 is a cross-sectional view taken along a line similar to 222-222 of an inferior spring element similar to that shown in FIG. 228, but also showing deflection of a traction member.

Figure 232:
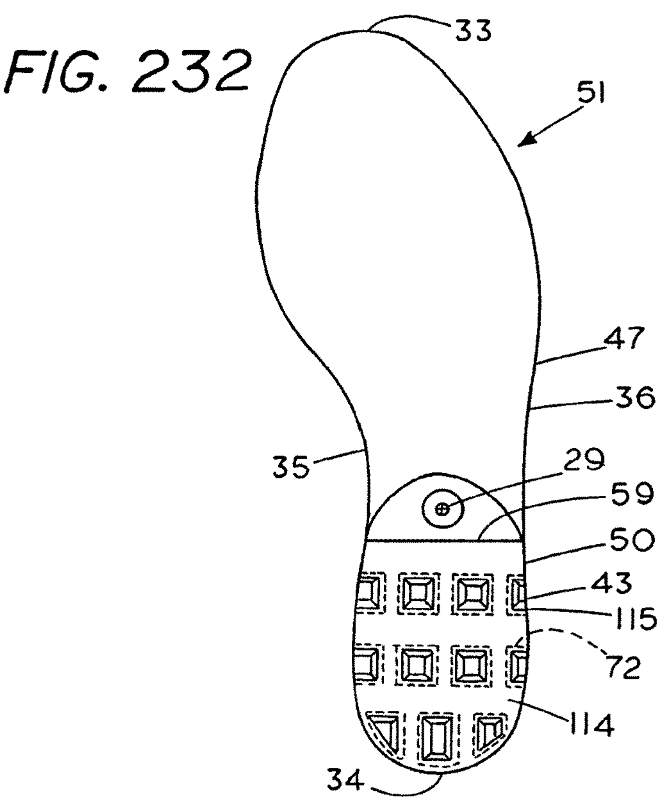

FIG. 232 is a bottom plan view of a spring element including an inferior spring element including an outsole having traction members.

Figure 233:
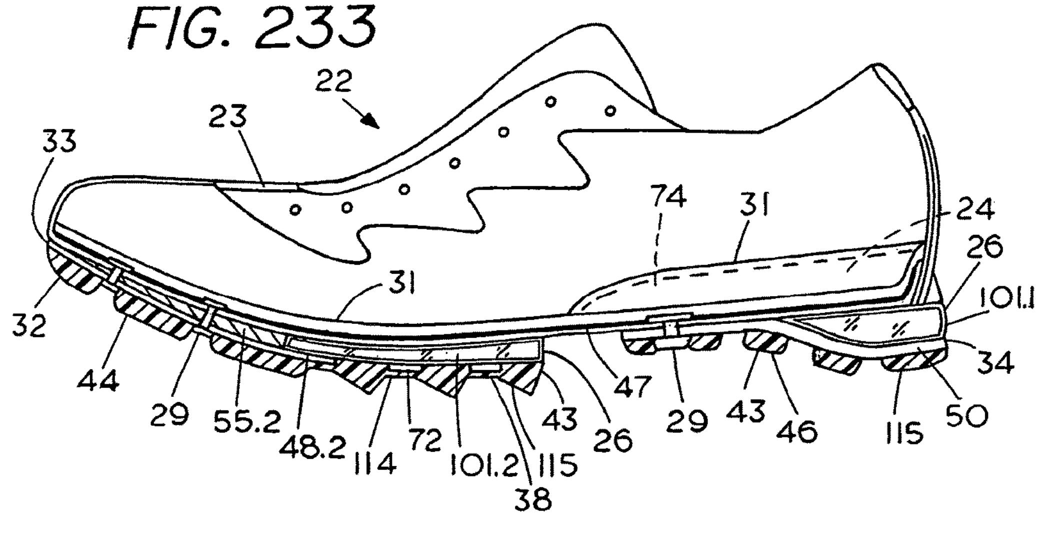

FIG. 233 is a longitudinal cross-sectional side view of an alternate article of footwear including a spring element and fluid-filled bladders.

Figure 45:
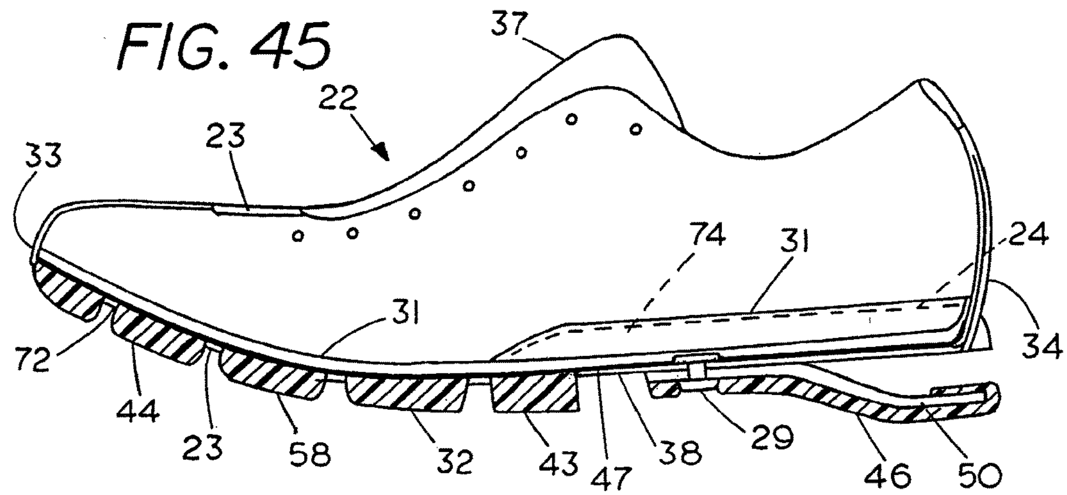
FIG. 45 is a longitudinal cross-sectional medial side view of an alternate article of footwear having outsole portions affixed directly to the superior spring element in the forefoot area.
Figure 234:
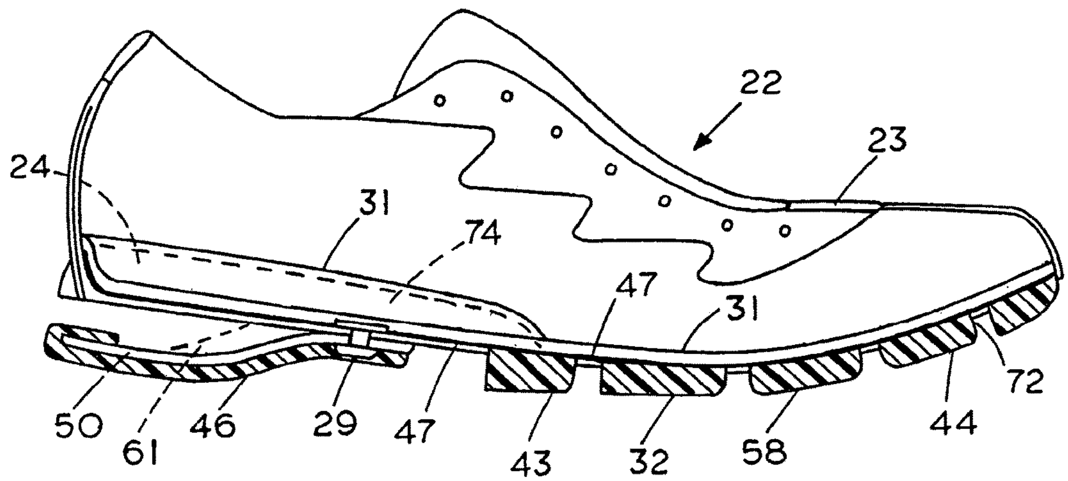

FIG. 234 is a longitudinal cross-sectional lateral side view of the article of footwear and spring element shown in FIG. 45.

Figure 49:
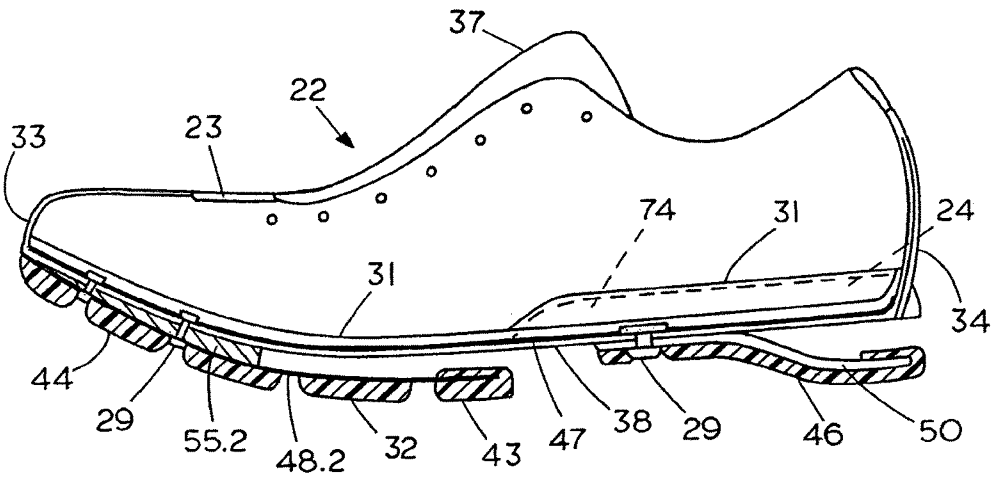
FIG. 49 is a longitudinal cross-sectional medial side view of an alternate article of footwear having outsole portions affixed directly to an anterior spring element in the forefoot area that is affixed to an anterior spacer and a superior spring element.
Figure 235:
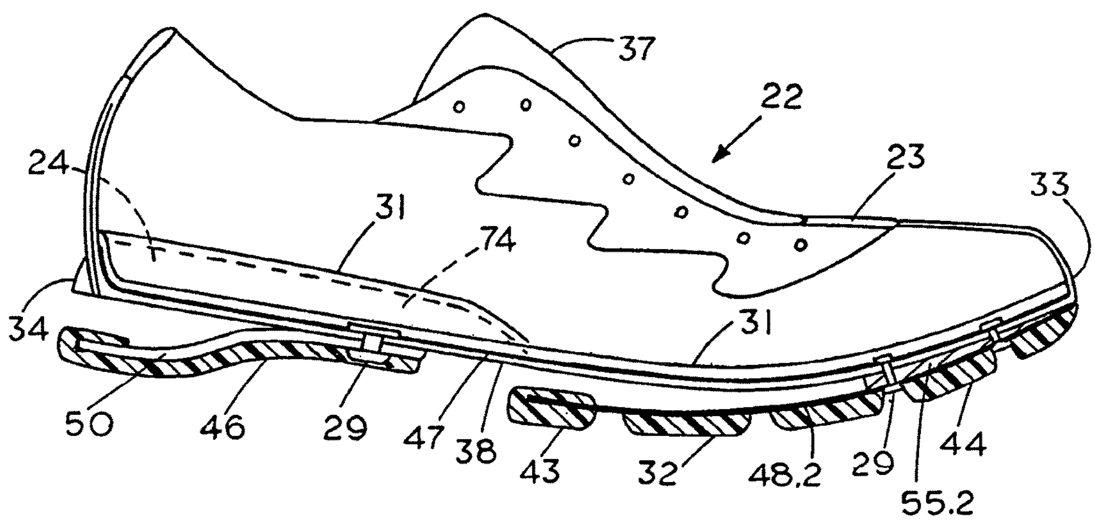

FIG. 235 is a longitudinal cross-sectional lateral side view of the article of footwear and spring element shown in FIG. 49.

Figure 236:
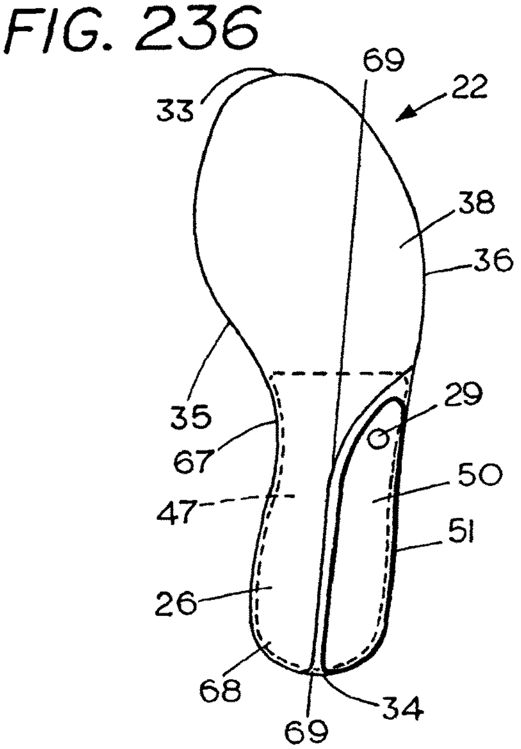

FIG. 236 is a bottom plan view of an article of footwear including a midsole on the medial side, and a spring element including a superior spring element, and an inferior spring element.

Figure 237:
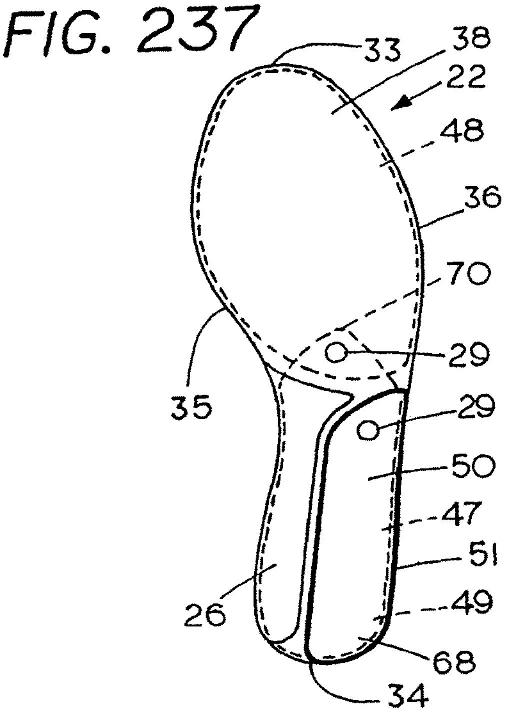

FIG. 237 is a bottom plan view of an article of footwear including a midsole on the medial side, and a spring element including a superior spring element, and an inferior spring element.

Figure 238:
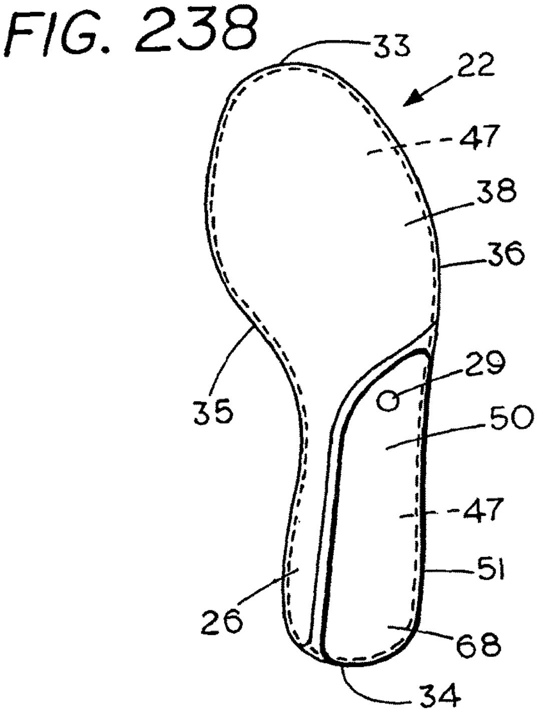

FIG. 238 is a bottom plan view of an article of footwear including a midsole on the medial side, and a spring element including a superior spring element, and an inferior spring element.

Figure 239:
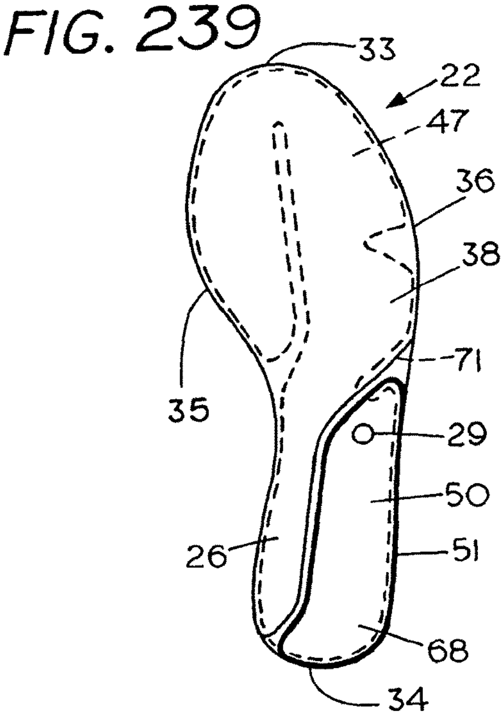

FIG. 239 is a bottom plan view of an article of footwear including a midsole on the medial side, and a spring element including a superior spring element, and an inferior spring element.

Figure 240:
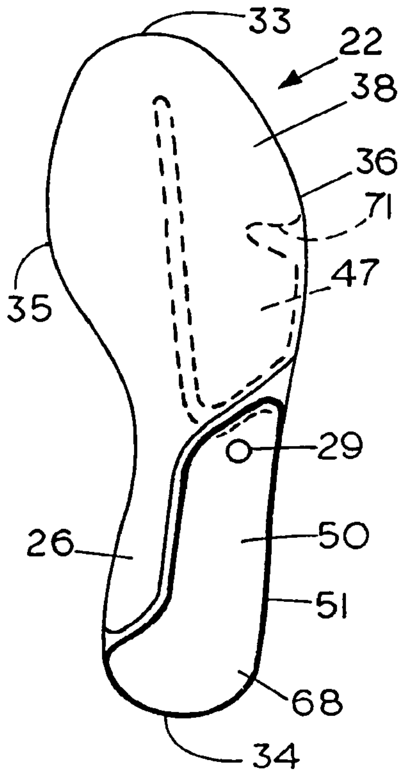

FIG. 240 is a bottom plan view of an article of footwear including a midsole on the medial side, and a spring element including a superior spring element, and an inferior spring element.

Figure 241:
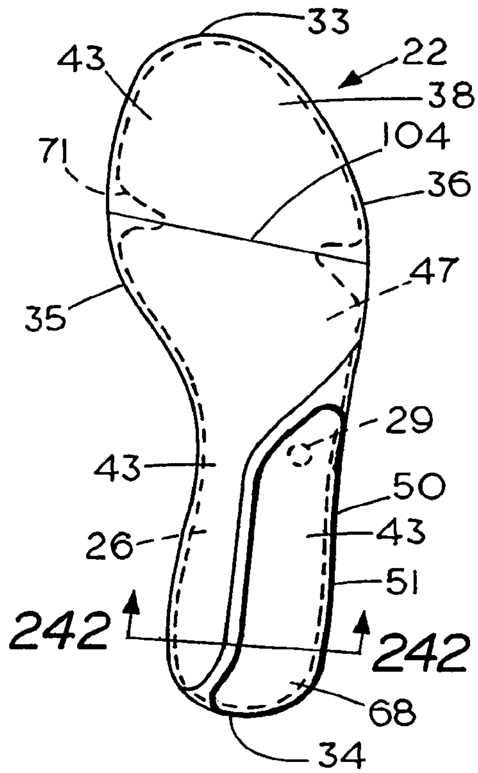

FIG. 241 is a bottom plan view of an article of footwear including a midsole on the medial side, and a spring element including a superior spring element, and an inferior spring element.

Figure 242:
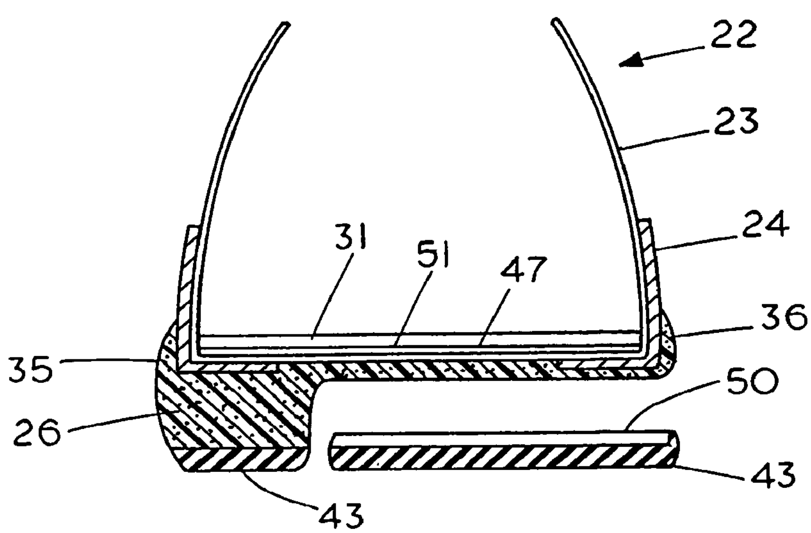

FIG. 242 is a cross-sectional view taken along line 242-242 shown in FIG. 241.

Figure 243:
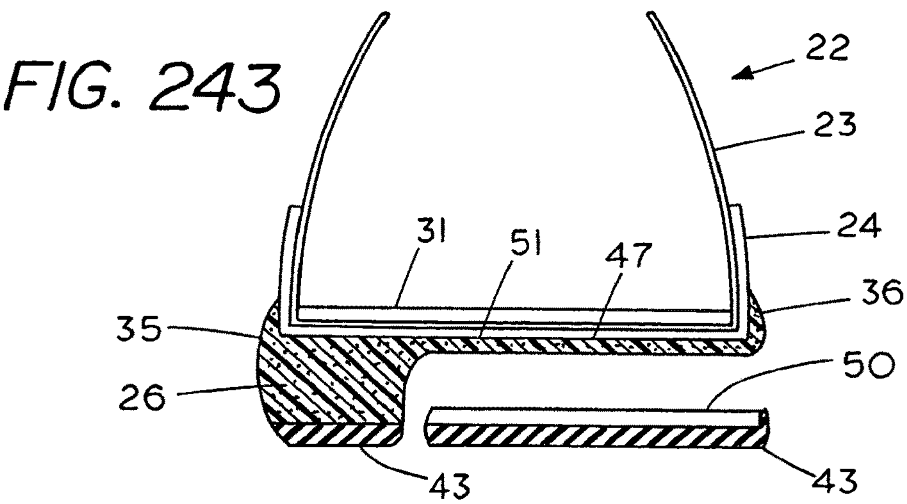

FIG. 243 is a cross-sectional view taken along a line similar to 242-242 shown in FIG. 241 showing an alternate footwear construction relative to that shown in FIG. 242.

Figure 244:
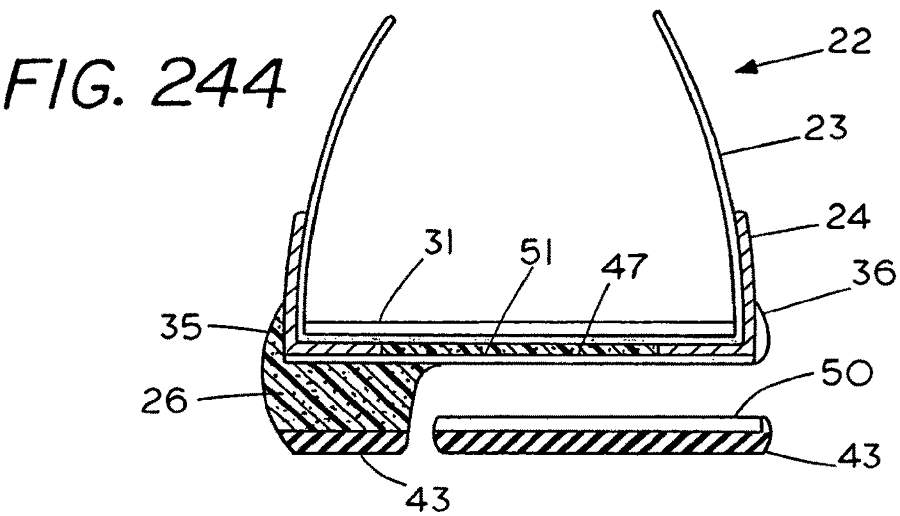

FIG. 244 is a cross-sectional view taken along a line similar to 242-242 shown in FIG. 241 showing an alternate footwear construction relative to that shown in FIG. 242.

Figure 245:
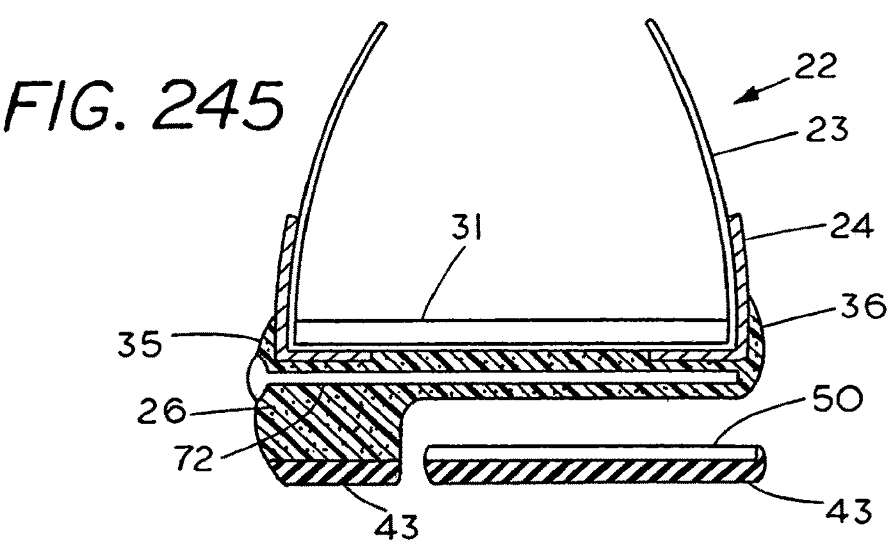

FIG. 245 is a cross-sectional view taken along a line similar to 242-242 shown in FIG. 241 showing an alternate footwear construction relative to that shown in FIG. 242.

Figure 246:
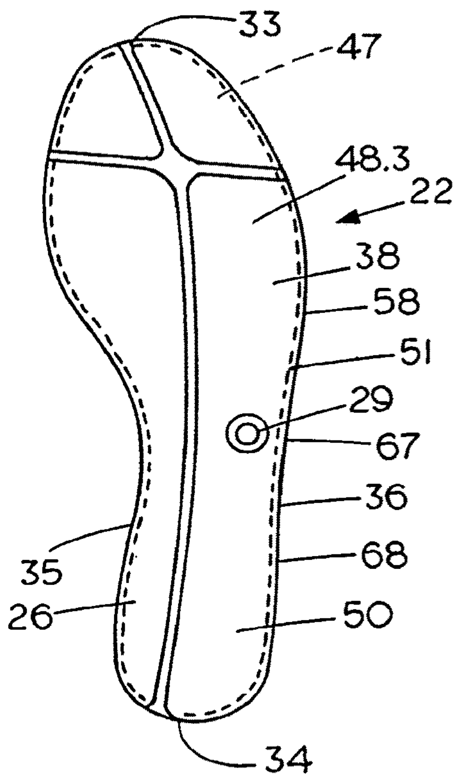

FIG. 246 is a bottom plan view of an article of footwear including a midsole on the medial side, a spring element including a superior spring element, and an inferior spring element including an anterior spring element.

Figure 247:
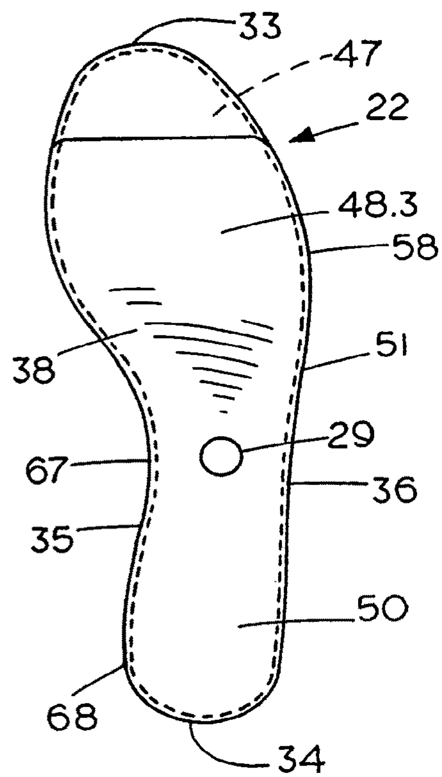

FIG. 247 is a bottom plan view of an article of footwear including a spring element including a superior spring element, and an inferior spring element including an anterior spring element.

Figure 248:
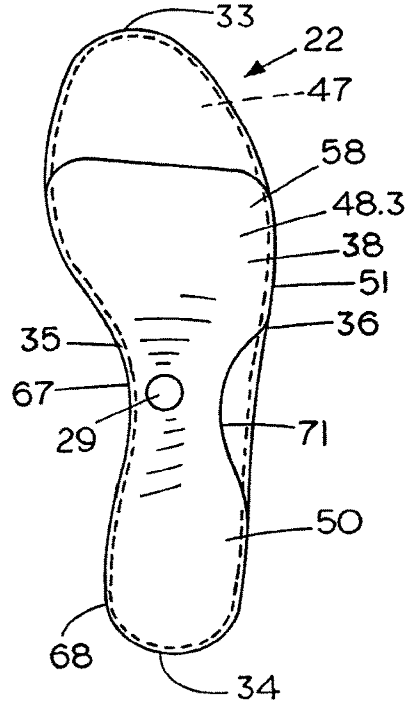

FIG. 248 is a bottom plan view of an article of footwear including a spring element including a superior spring element, and an inferior spring element including an anterior spring element.

Figure 249:
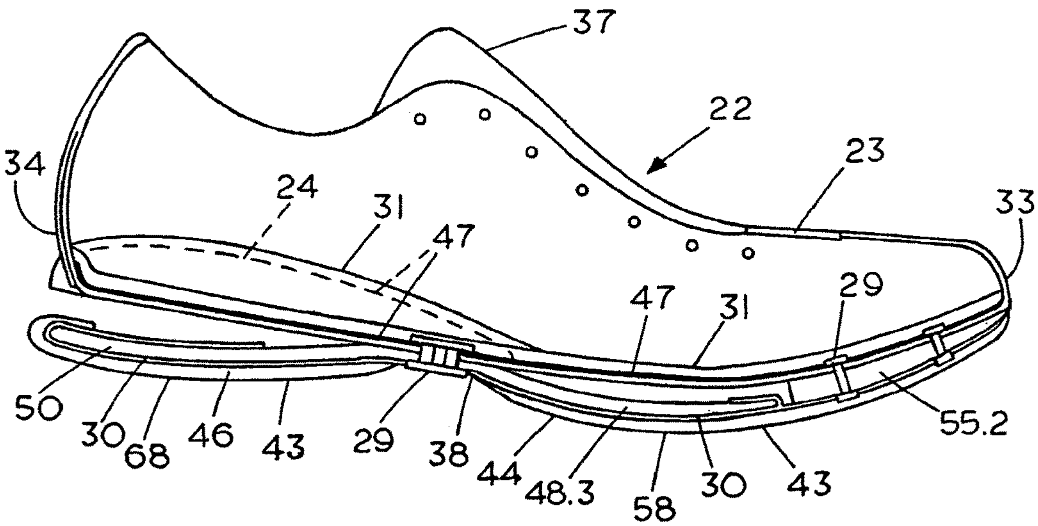

FIG. 249 is a longitudinal cross-sectional lateral side view of the embodiment shown in FIG. 246 showing an article of footwear including a midsole on the medial side, a spring element including a superior spring element, and an inferior spring element including an anterior spring element.

Figure 250:
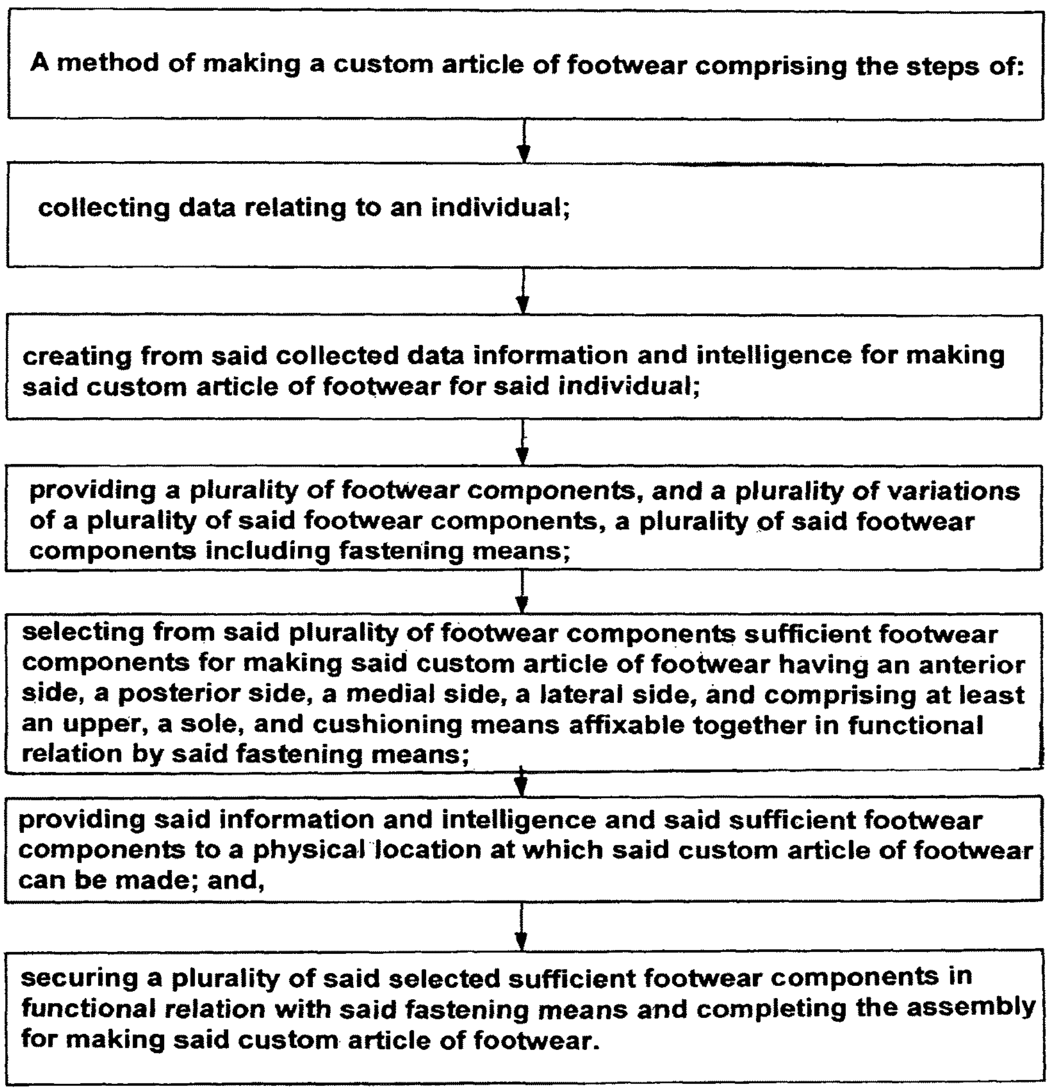

FIG. 250 is a flow diagram regarding a method of making a custom article of footwear.

FIG. 251 is a flow diagram regarding a method of providing sufficient footwear components for making a custom article of footwear.

Figure 252:
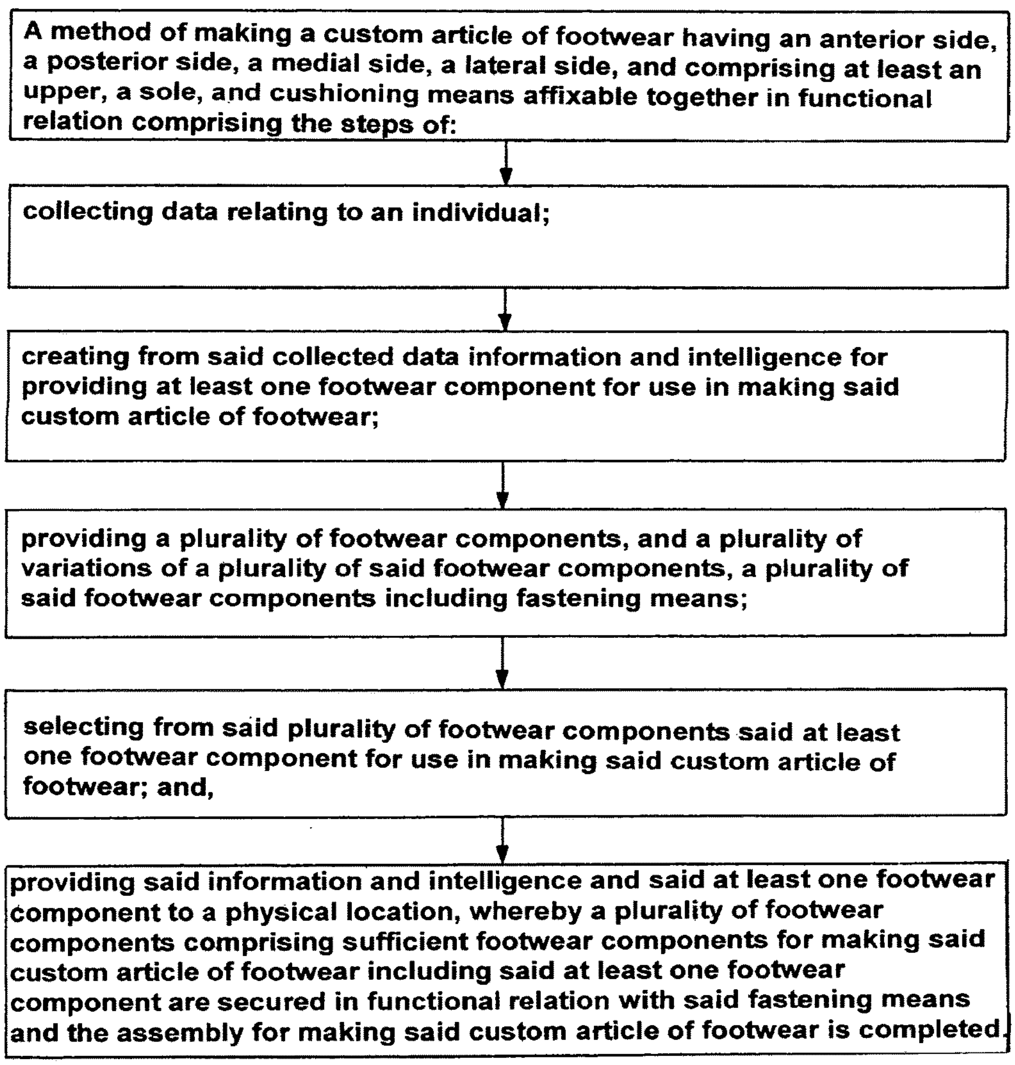

FIG. 252 is a flow diagram regarding a method of making and delivering at least one footwear component for use in making a custom article of footwear.

FIG. 253 is a flow diagram regarding a method of making and providing at least one footwear component for use in making a custom article of footwear using a vending device.

Figure 254:
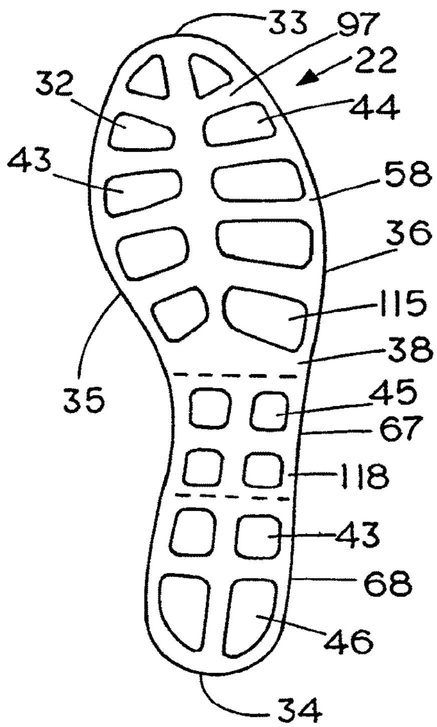

FIG. 254 is a bottom plan view of an article of footwear including a plurality of openings on the inferior side and a plurality of traction members projecting therethrough.

Figure 255:
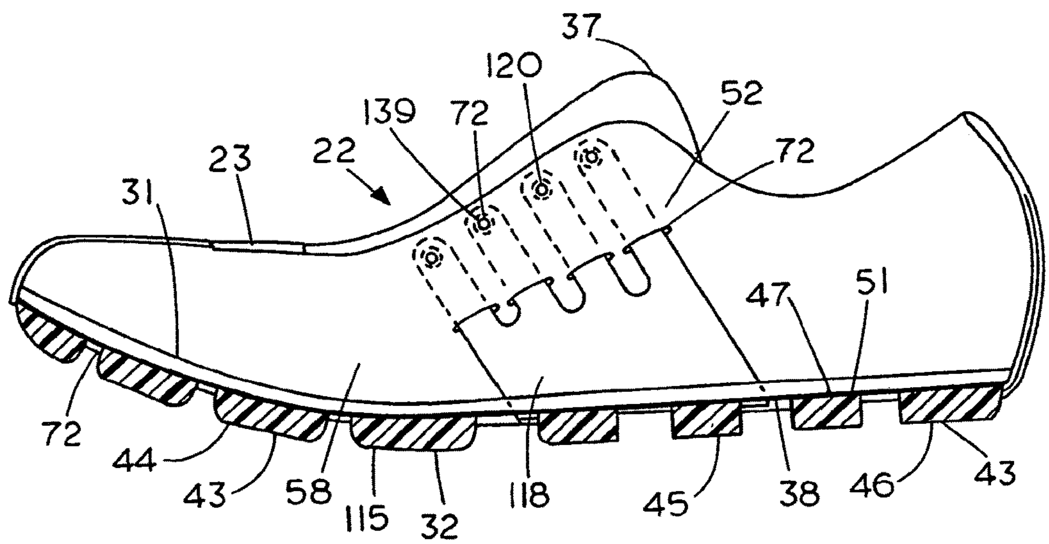

FIG. 255 is a longitudinal cross-sectional side view of an article of footwear including a plurality of openings in the quarter and portions of a strap passing therethrough.

Figure 256:
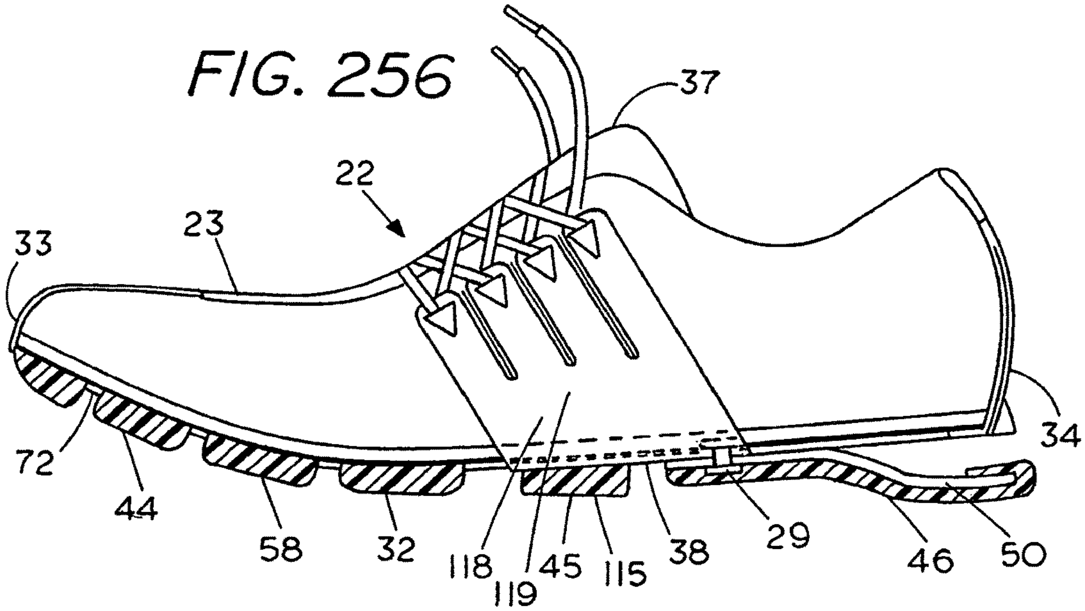

FIG. 256 is a side view of an article of footwear with parts broken away including an external removable strap.

Figure 257:
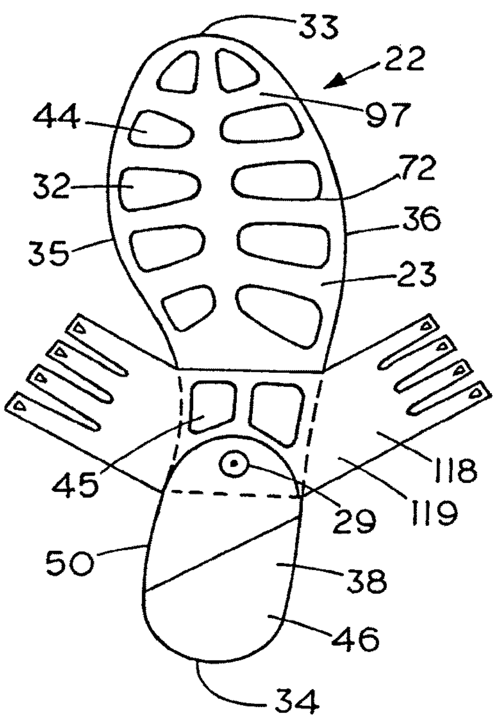

FIG. 257 is a bottom plan view of the article of footwear shown in FIG. 256.

Figure 258:
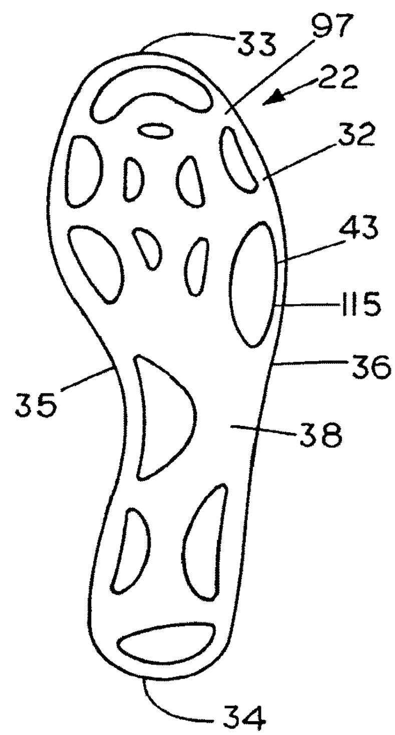

FIG. 258 is a bottom plan view of an article of footwear including a plurality of openings and a plurality of traction members projecting therethrough.

Figure 259:
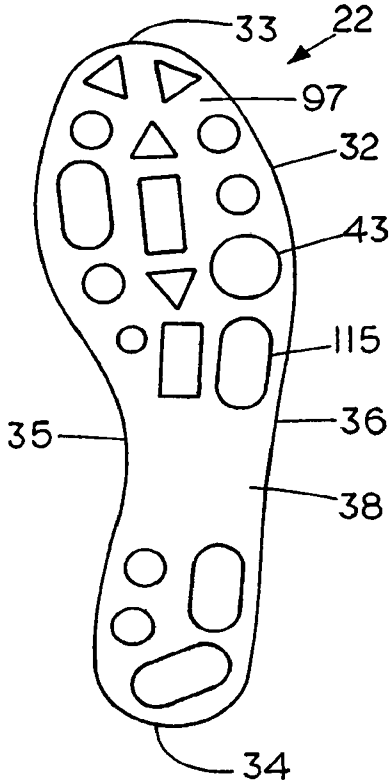

FIG. 259 is a bottom plan view of an article of footwear including a plurality of openings and a plurality of traction members projecting therethrough.

Figure 260:
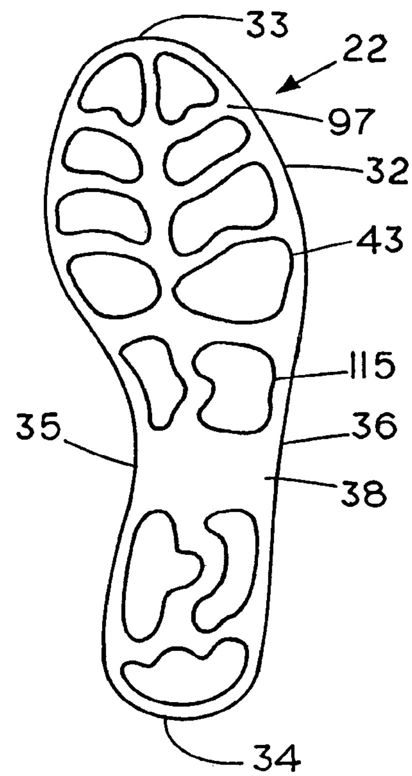

FIG. 260 is a bottom plan view of an article of footwear including a plurality of openings and a plurality of traction members projecting therethrough.

Figure 261:
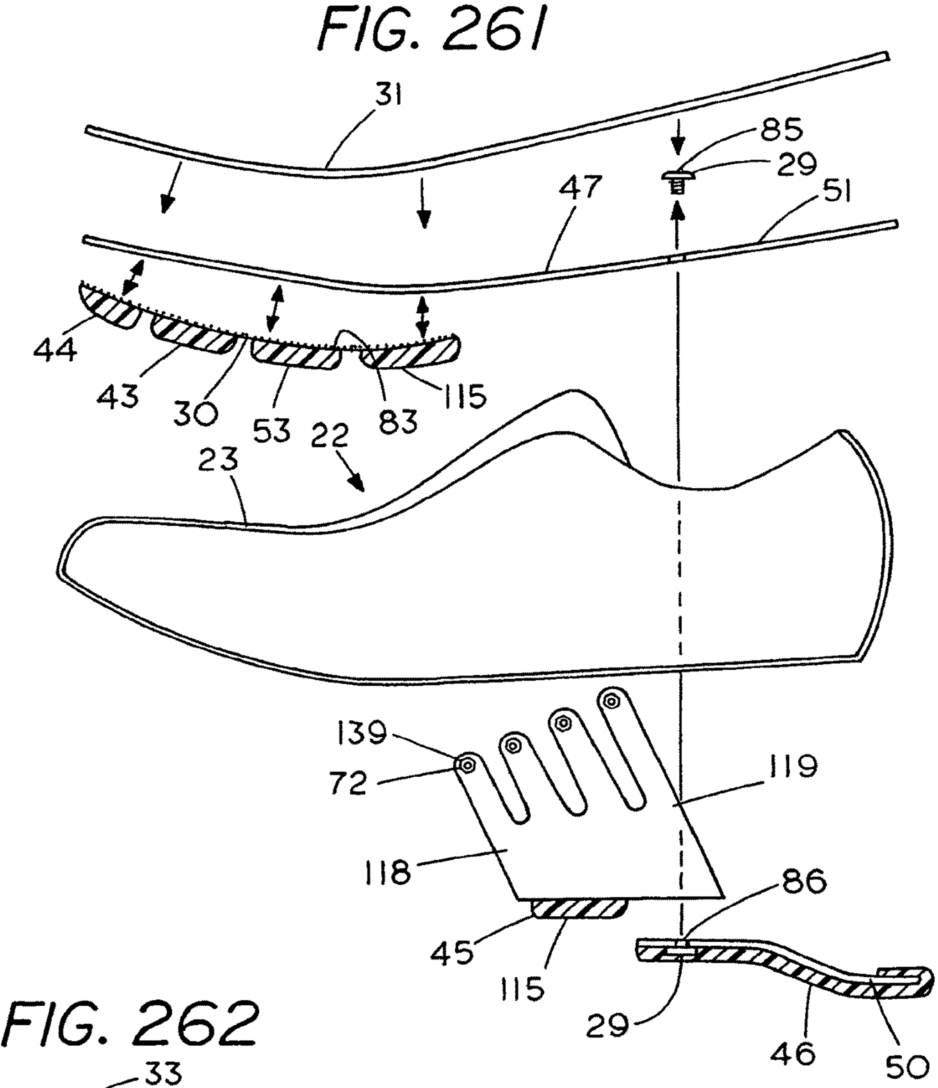

FIG. 261 is a longitudinal cross-sectional exploded side view of an article of footwear including an upper, insole, superior spring element, anterior outsole element, fastener, strap, and inferior spring element including a posterior outsole element.

Figure 262:
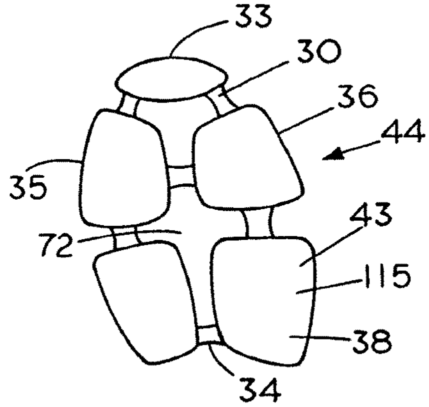

FIG. 262 is a bottom plan view of an anterior outsole element including traction members and a backing.

Figure 263:
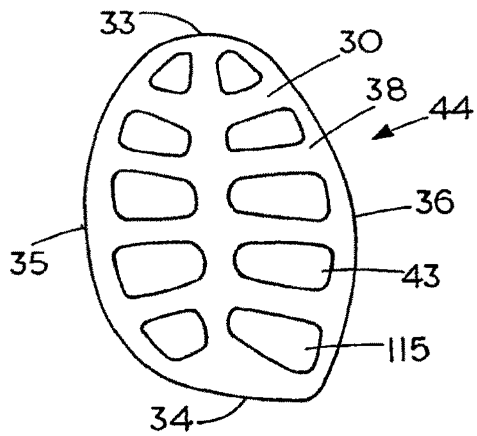

FIG. 263 is a bottom plan view of an anterior outsole element including traction members and a backing.

Figure 264:
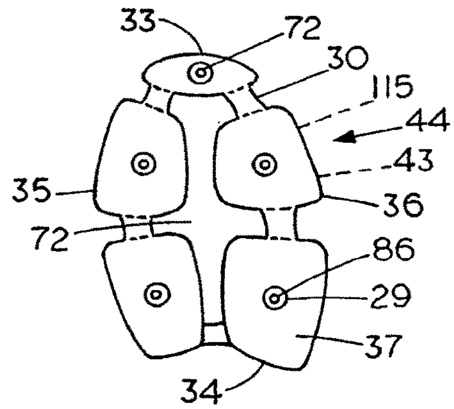

FIG. 264 is a top plan view of an anterior outsole element including traction members and a backing.

Figure 265:
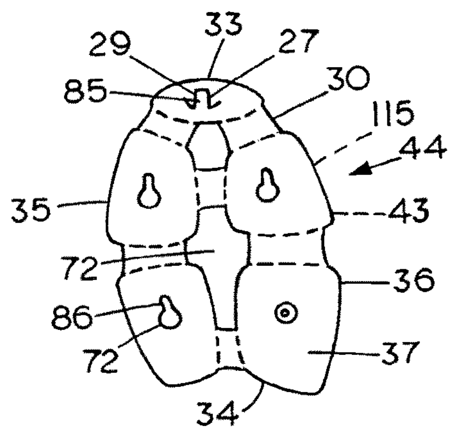

FIG. 265 is a top plan view of an anterior outsole element including traction members and a backing.

Figure 266:
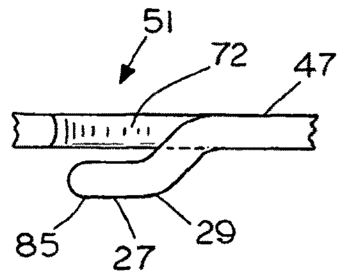

FIG. 266 is a side cross-sectional view of a spring element having parts broken away and including a hook.

Figure 267:
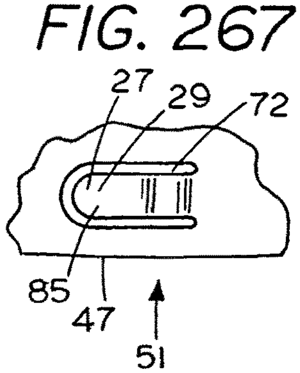

FIG. 267 is a top plan view of a spring element having parts broken away, and including a hook generally similar to that shown in FIG. 266.

Figure 268:
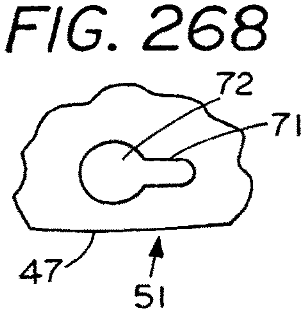

FIG. 268 is a top plan view of a spring element having parts broken away, and including an opening and a notch.

Figure 269:
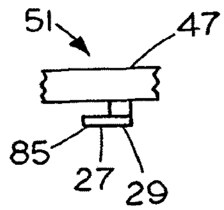

FIG. 269 is a side view of a spring element having parts broken away, and including a fastener including a hook.

Figure 270:
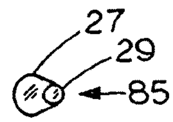

FIG. 270 is a top plan view of the fastener including a hook shown in FIG. 269.

Figure 271:
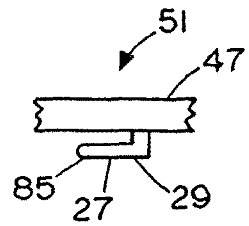

FIG. 271 is a side view of a spring element having parts broken away, and including a fastener including a hook.

Figure 272:
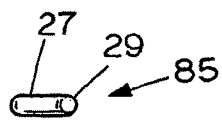

FIG. 272 is a top plan view of the fastener including a hook shown in FIG. 271.

Figure 273:
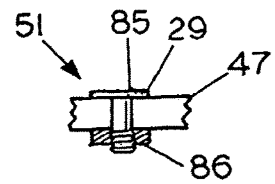

FIG. 273 is a side cross-sectional view of a spring element having parts broken away, and having a fastener including male and female parts affixed thereto.

Figure 274:
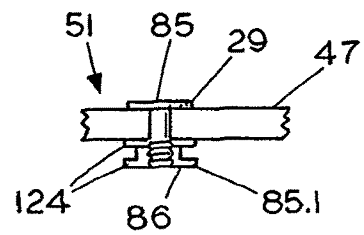

FIG. 274 is a side cross-sectional view of a spring element having parts broken away, and having a fastener including male and female parts affixed thereto.

Figure 275:
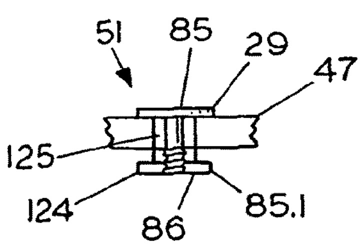

FIG. 275 is a side cross-sectional view of a spring element having parts broken away, and having a fastener including male and female parts affixed thereto.

Figure 276:
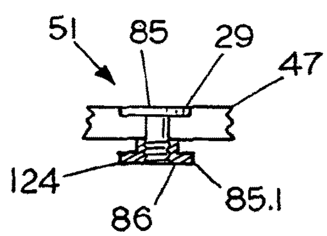

FIG. 276 is a side cross-sectional view of a spring element having parts broken away, and having a fastener including male and female parts affixed thereto.

Figure 277:
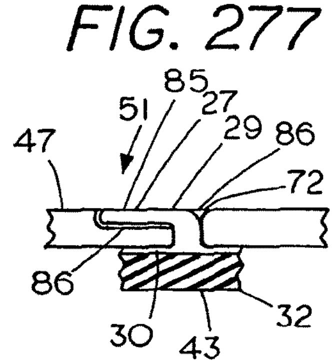

FIG. 277 is a side cross-sectional view of a spring element having parts broken away, and having a outsole including a backing that includes a fastener having a hook affixed thereto.

Figure 278:
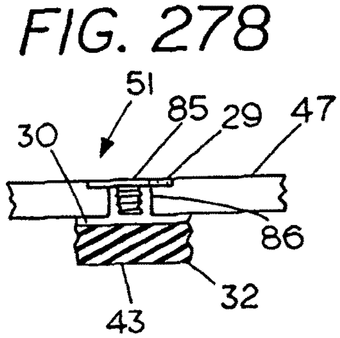

FIG. 278 is a side cross-sectional view of a spring element having parts broken away, and having a outsole including a backing that includes a fastener including a female part having a male part affixed thereto.

Figure 279:
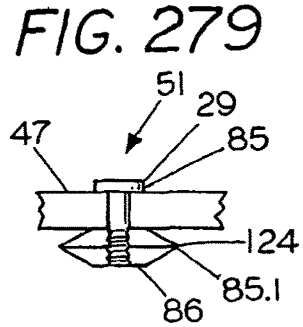

FIG. 279 is a side cross-sectional view of a spring element having parts broken away, and having a fastener including male and female parts affixed thereto.

Figure 280:
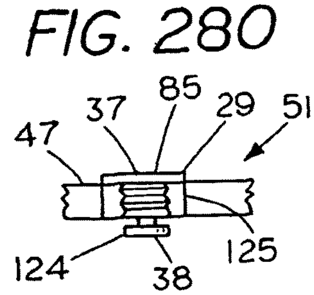

FIG. 280 is a side cross-sectional view of a spring element having parts broken away, and having a fastener including male and female parts affixed thereto.

Figure 281:
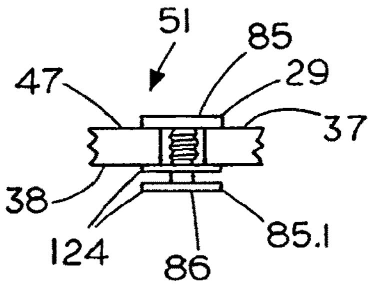

FIG. 281 is a side cross-sectional view of a spring element having parts broken away, and having a fastener including male and female parts affixed thereto.

Figure 282:
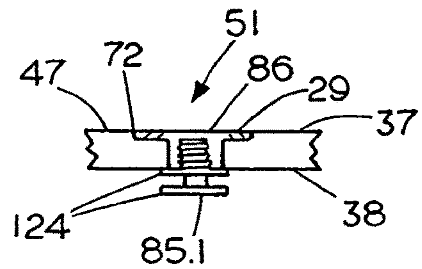

FIG. 282 is a side cross-sectional view of a spring element having parts broken away, and having a fastener including male and female parts affixed thereto.

Figure 283:
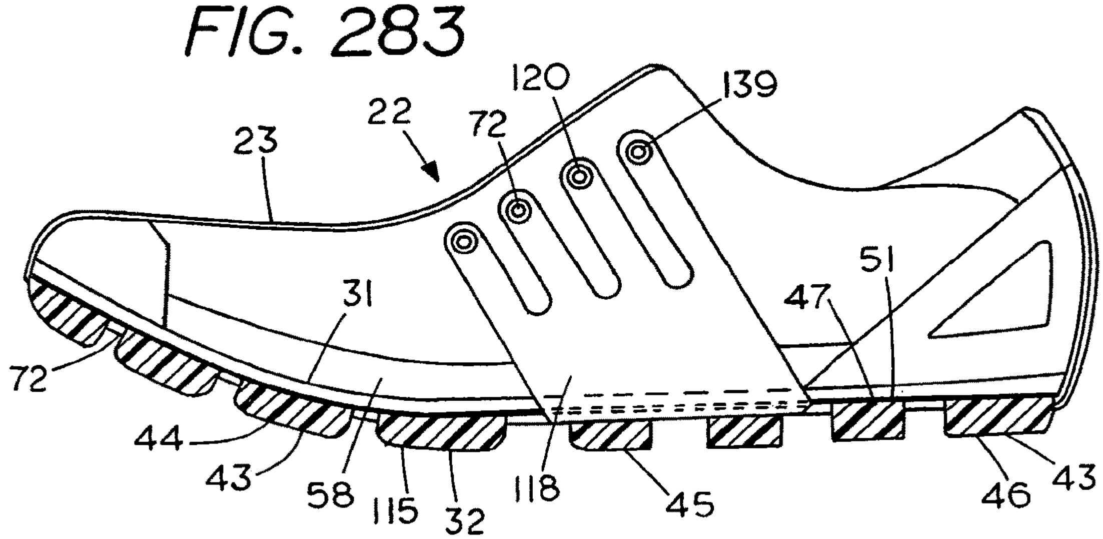

FIG. 283 is a side view of an article of footwear with parts broken away, and including an external strap.

Figure 284:
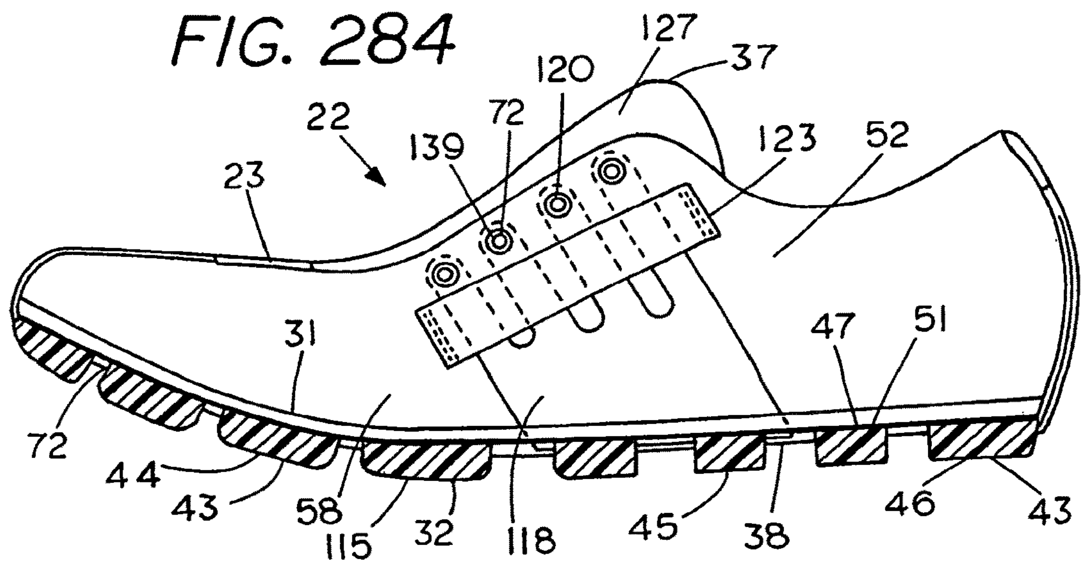

FIG. 284 is a longitudinal cross-sectional side view of an article of footwear including an internal strap and a retainer.

Figure 285:
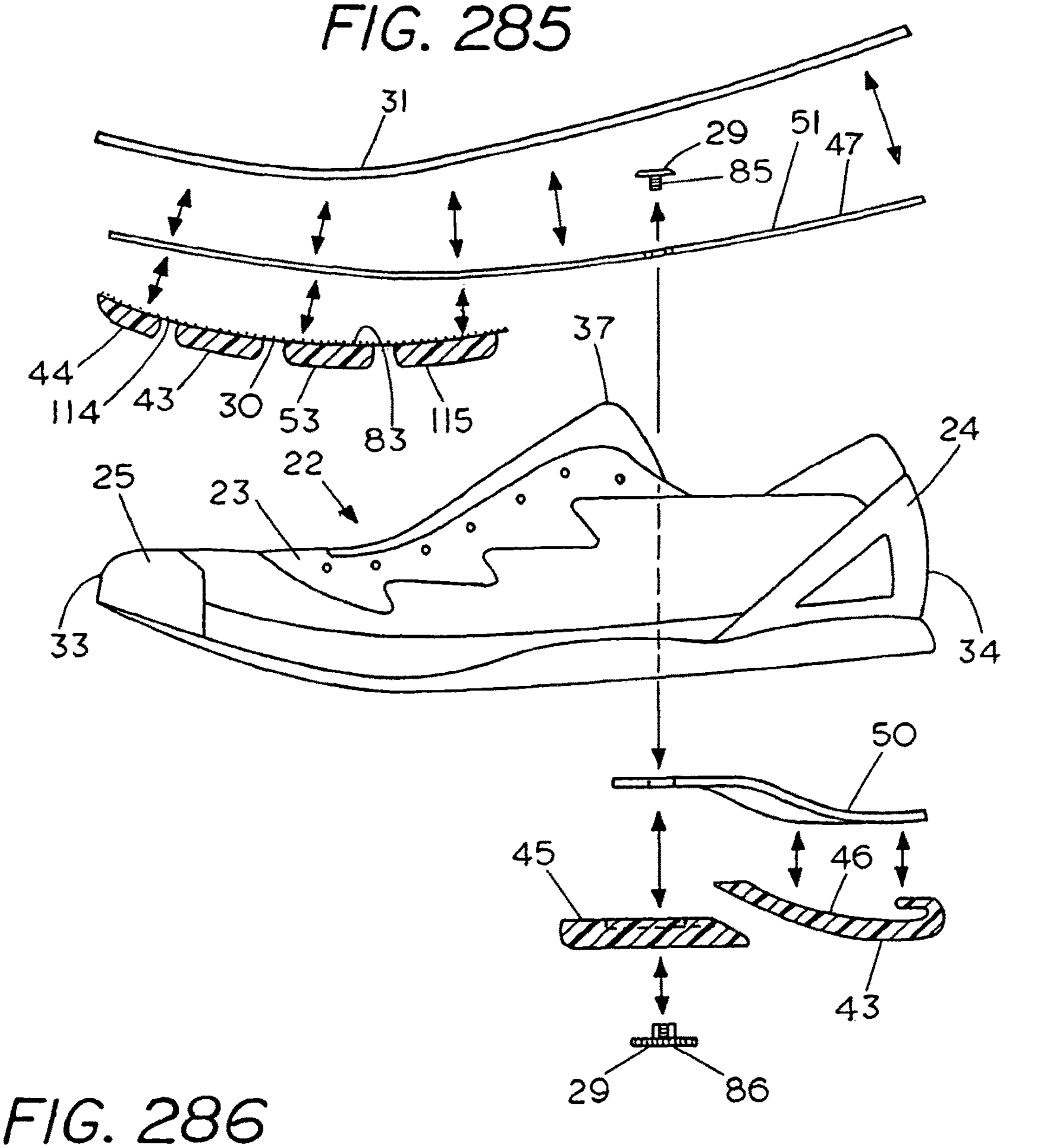

FIG. 285 is an exploded side view of an article of footwear including an insole, superior spring element, anterior outsole element including self-adhesive, fastener, upper, inferior spring element, middle outsole element, and posterior outsole element.

Figure 286:
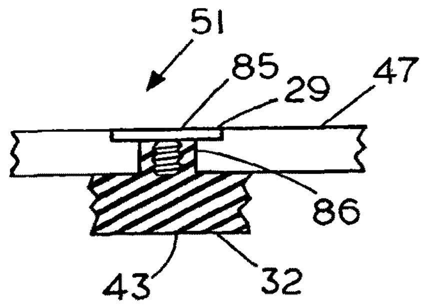

FIG. 286 is a side cross-sectional view of a fastener affixed in functional relation to a spring element having parts broken away, and a sole having parts broken away.

Figure 287:
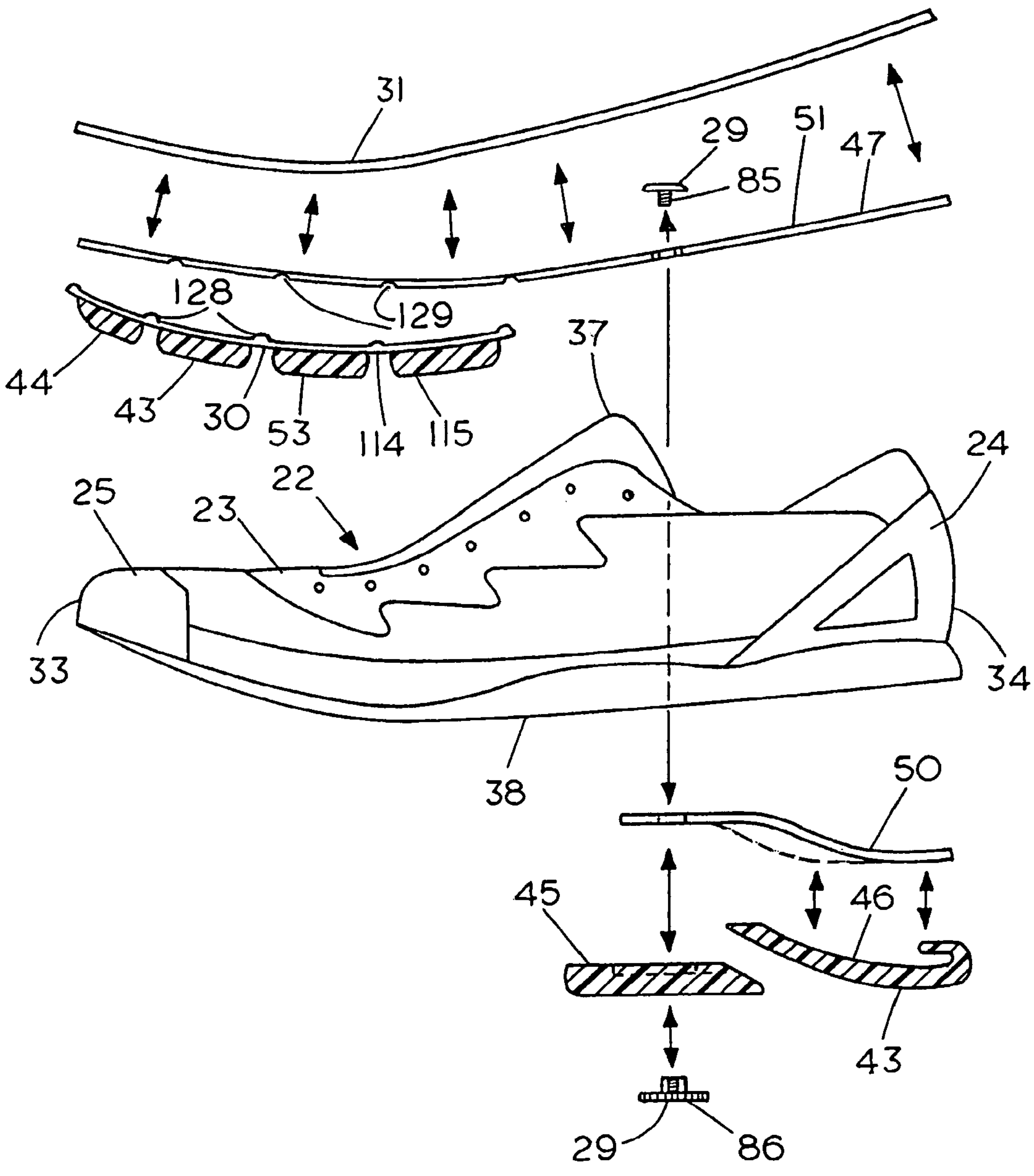

FIG. 287 is an exploded side view of an article of footwear including an insole, a superior spring element including female mating structures, an anterior outsole element including male mating structures, a fastener, an upper, an inferior spring element, a middle outsole element, and a posterior outsole element.

Figure 288:
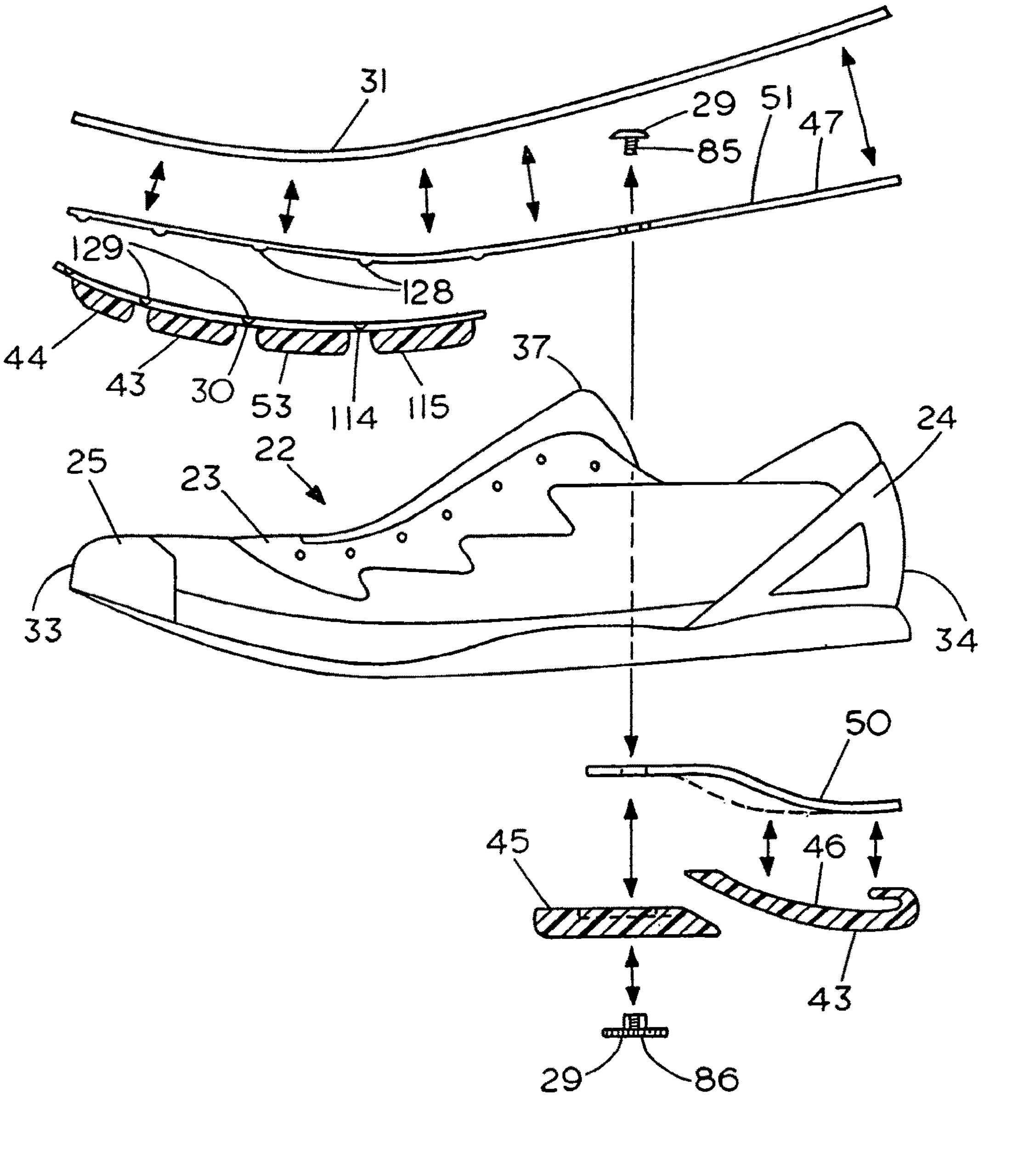

FIG. 288 is an exploded side view of an article of footwear including an insole, superior spring element including male mating structures, anterior outsole element including female mating structures, fastener, upper, inferior spring element, middle outsole element, and posterior outsole element.

Figure 289:
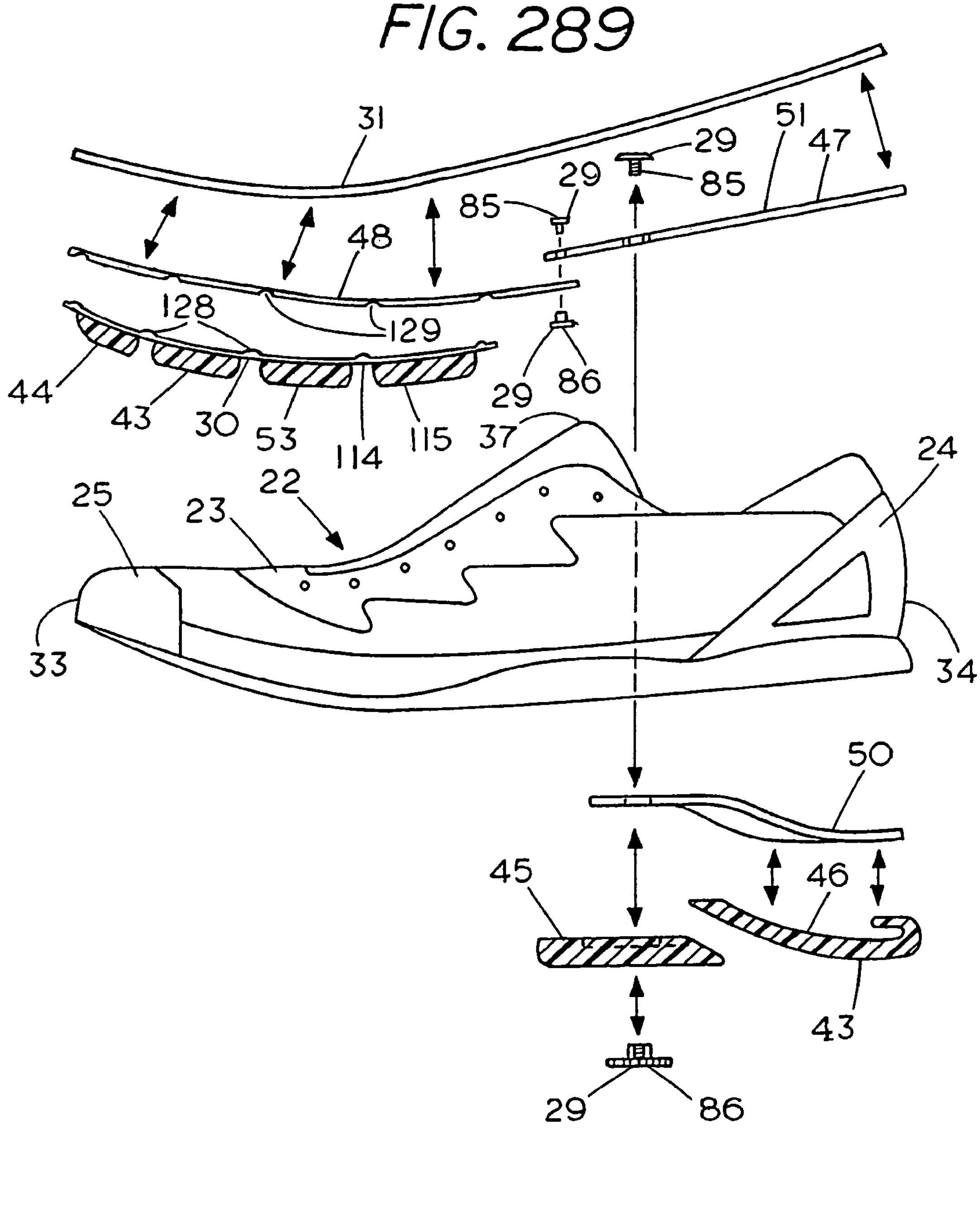

FIG. 289 is a side cross-sectional view of an article of footwear including an insole, a superior spring element including an anterior spring element including female mating structures and a posterior spring element, an anterior outsole element including male mating structures, a fastener, an upper, an inferior spring element, a middle outsole element, and a posterior outsole element.

Figure 290:
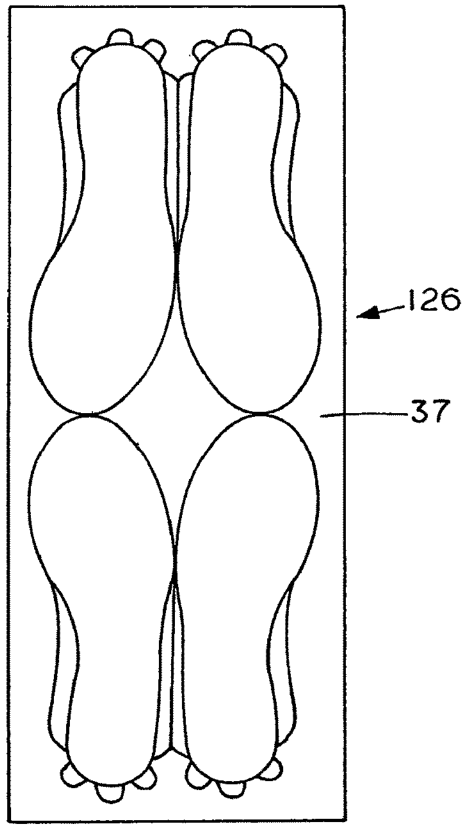

FIG. 290 is a top plan view of a mold for making at least a portion of a spring element.

Figure 291:
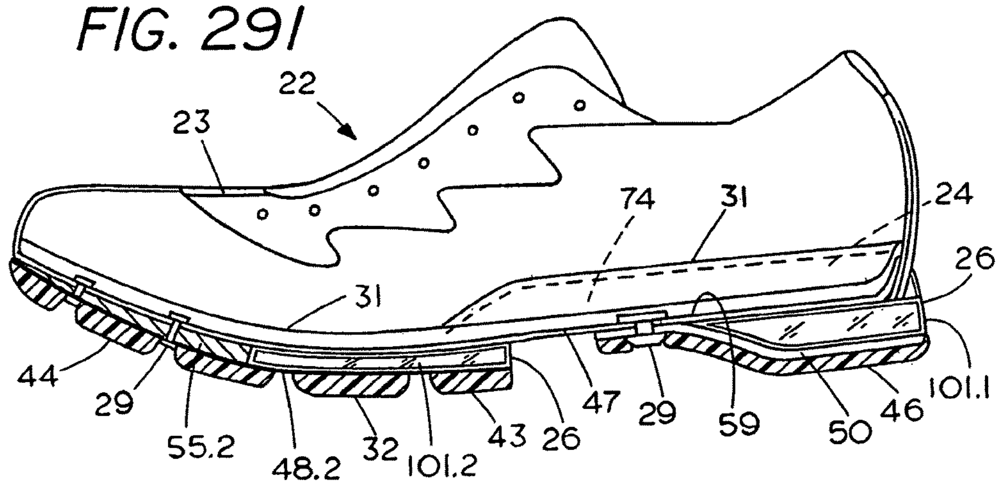

FIG. 291 is a longitudinal cross-sectional side view of an article of footwear including a superior spring element, inferior spring element, anterior spring element, and fluid-filled bladders.

Figure 292:
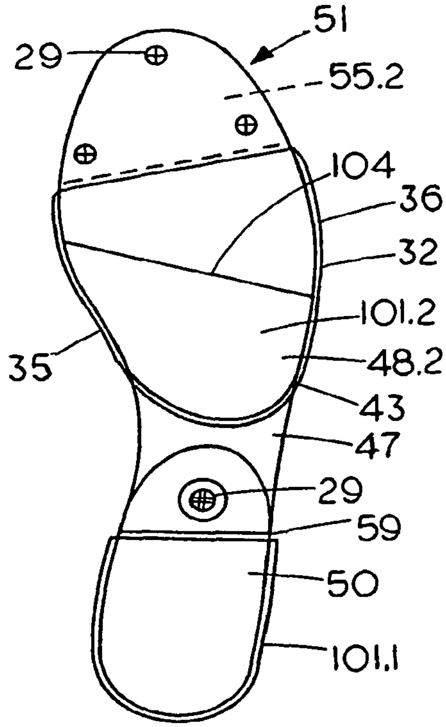

FIG. 292 is a bottom plan view of an article of footwear generally similar to that shown in FIG. 291 showing fluid-filled bladders as if it were possible to view these structures through a transparent anterior spring element, inferior spring element, and outsole.

Figure 293:
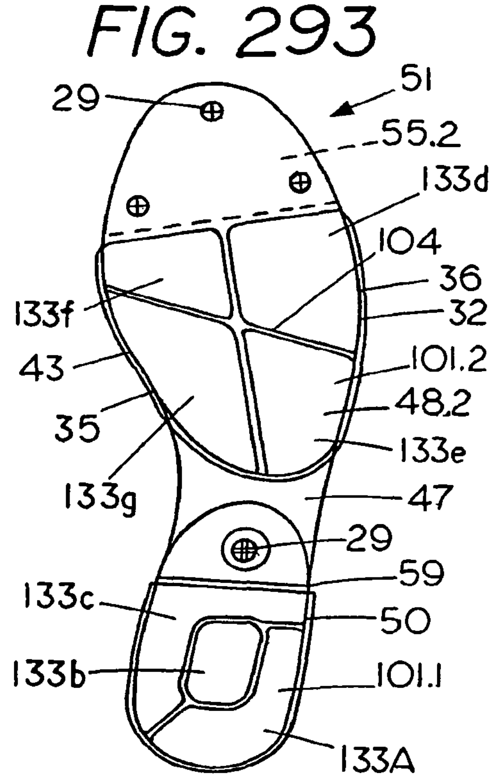

FIG. 293 is a bottom plan view of an article of footwear generally similar to that shown in FIG. 291 showing fluid-filled bladders including a plurality of chambers as if it were possible to view these structures through a transparent anterior spring element, inferior spring element, and outsole.

Figure 294:
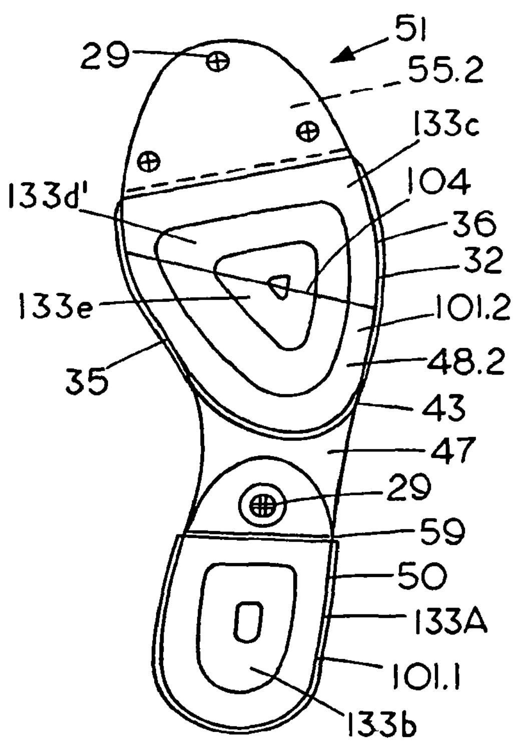

FIG. 294 is a bottom plan view of an article of footwear generally similar to that shown in FIG. 291 showing fluid-filled bladders including a plurality of chambers as if it were possible to view these structures through a transparent anterior spring element, inferior spring element, and outsole.

Figure 295:
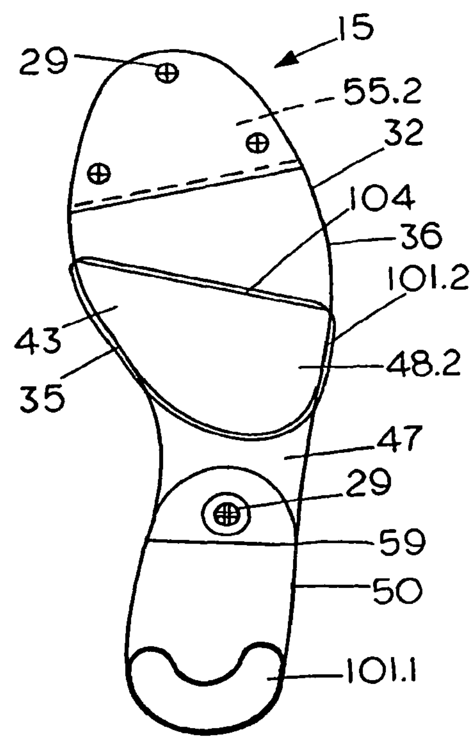

FIG. 295 is a bottom plan view of an article of footwear generally similar to that shown in FIG. 291 showing fluid-filled bladders as if it were possible to view these structures through a transparent anterior spring element, inferior spring element, and outsole.

Figure 296:
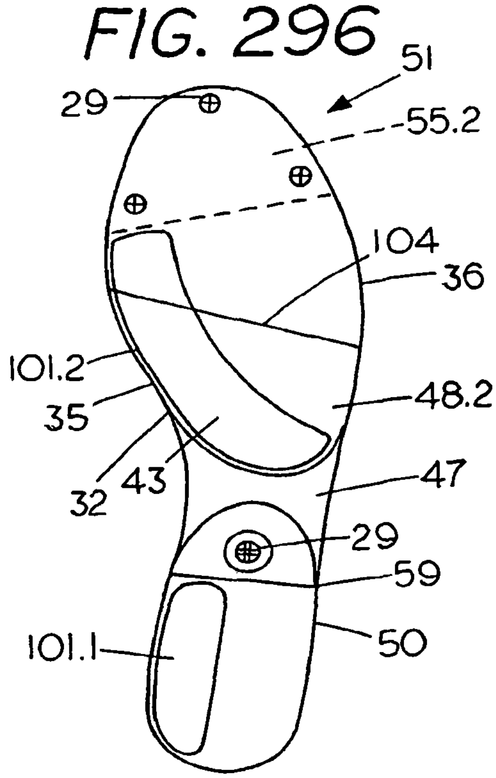

FIG. 296 is a bottom plan view of an article of footwear generally similar to that shown in FIG. 291 showing fluid-filled bladders as if it were possible to view these structures through a transparent anterior spring element, inferior spring element, and outsole.

Figure 297:
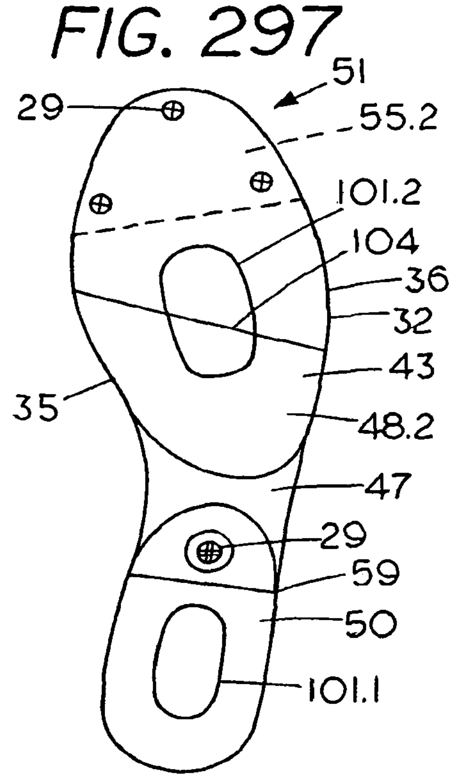

FIG. 297 is a bottom plan view of an article of footwear generally similar to that shown in FIG. 291 showing fluid-filled bladders as if it were possible to view these structures through a transparent anterior spring element, inferior spring element, and outsole.

Figure 298:
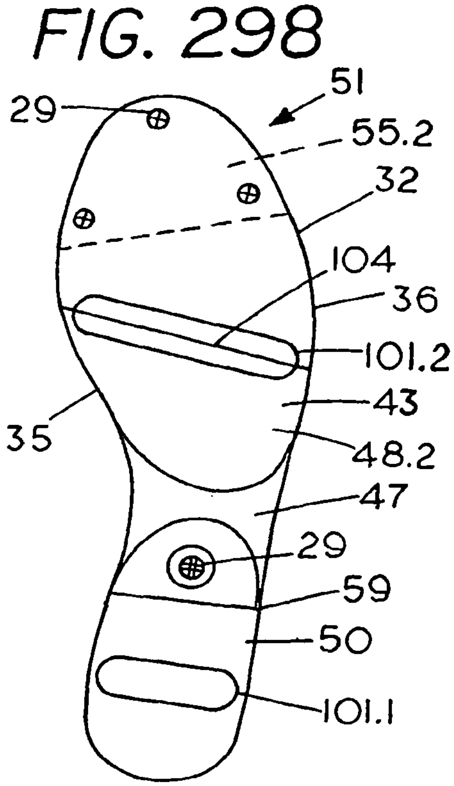

FIG. 298 is a bottom plan view of an article of footwear generally similar to that shown in FIG. 291 showing fluid-filled bladders as if it were possible to view these structures through a transparent anterior spring element, inferior spring element, and outsole.

Figure 299:
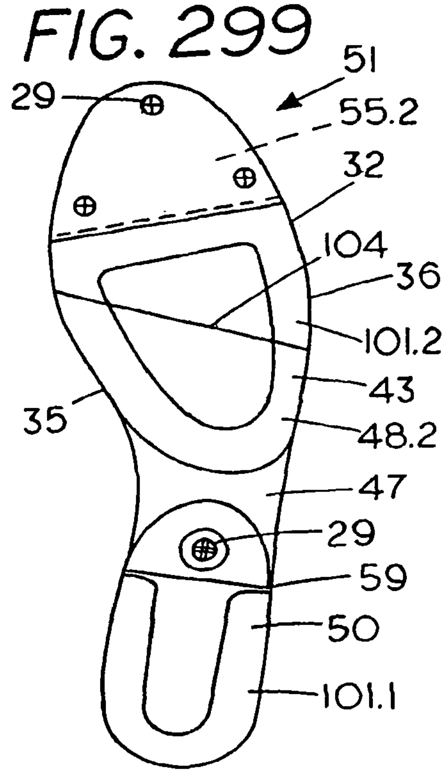

FIG. 299 is a bottom plan view of an article of footwear generally similar to that shown in FIG. 291 showing fluid-filled bladders as if it were possible to view these structures through a transparent anterior spring element, inferior spring element, and outsole.

Figure 300:
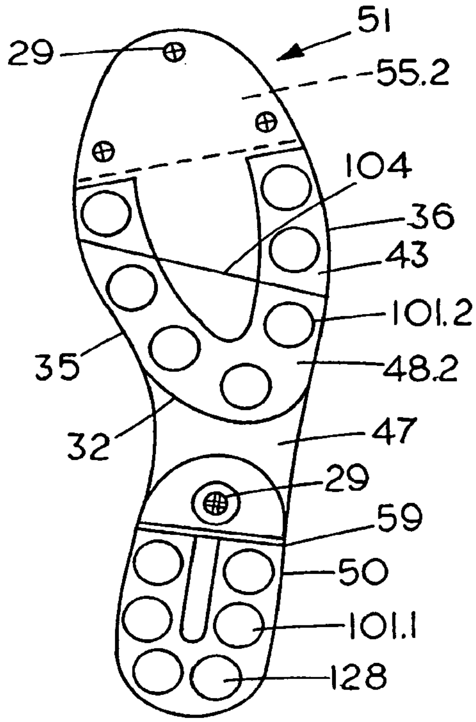

FIG. 300 is a bottom plan view of an article of footwear generally similar to that shown in FIG. 291 showing fluid-filled bladders as if it were possible to view these structures through a transparent anterior spring element, inferior spring element, and outsole.

Figure 301:
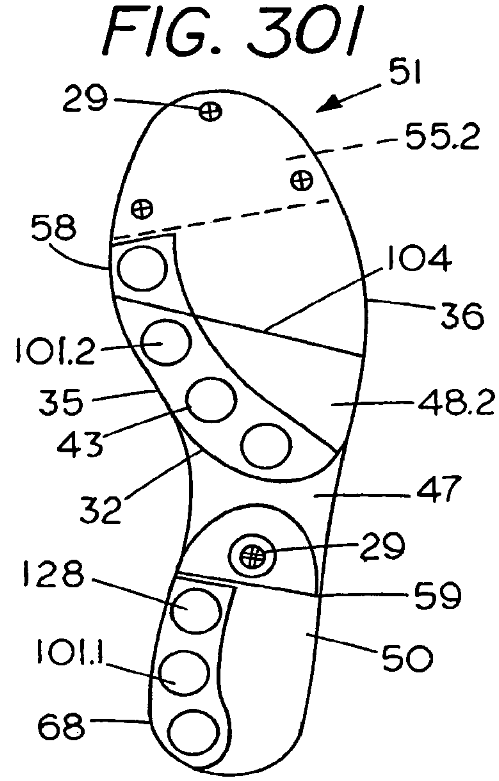

FIG. 301 is a bottom plan view of an article of footwear generally similar to that shown in FIG. 291 showing fluid-filled bladders as if it were possible to view these structures through a transparent anterior spring element, inferior spring element, and outsole.

Figure 302:
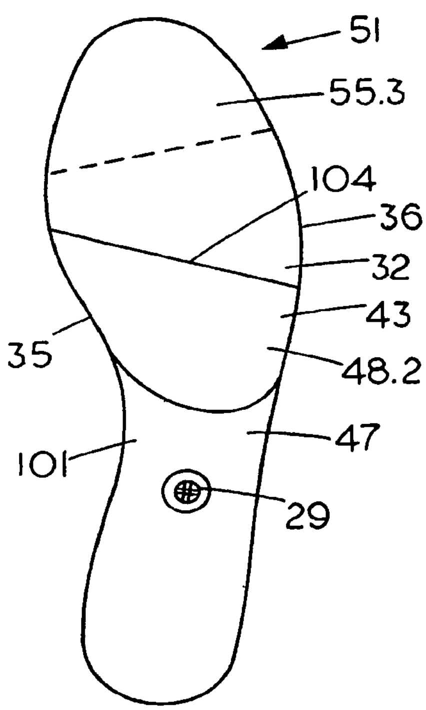
Figure 304:
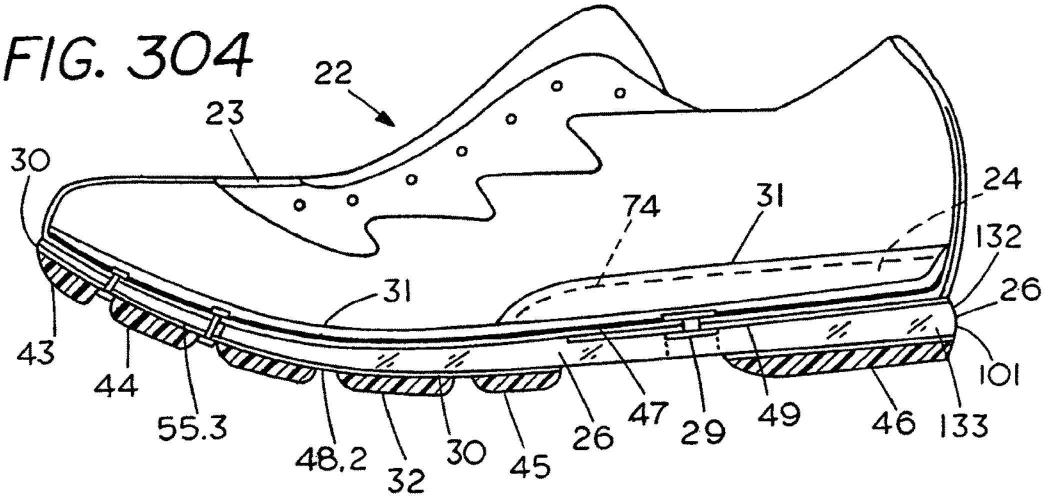

FIG. 302 is a bottom plan view of an article of footwear generally similar to that shown in FIG. 304 showing a fluid-filled bladder as if it were possible to view the structure through a transparent anterior spring element and outsole.

Figure 303:
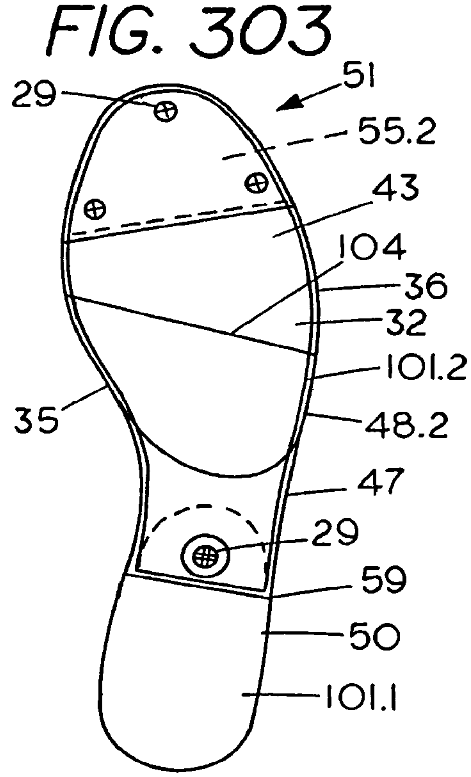
Figure 305:
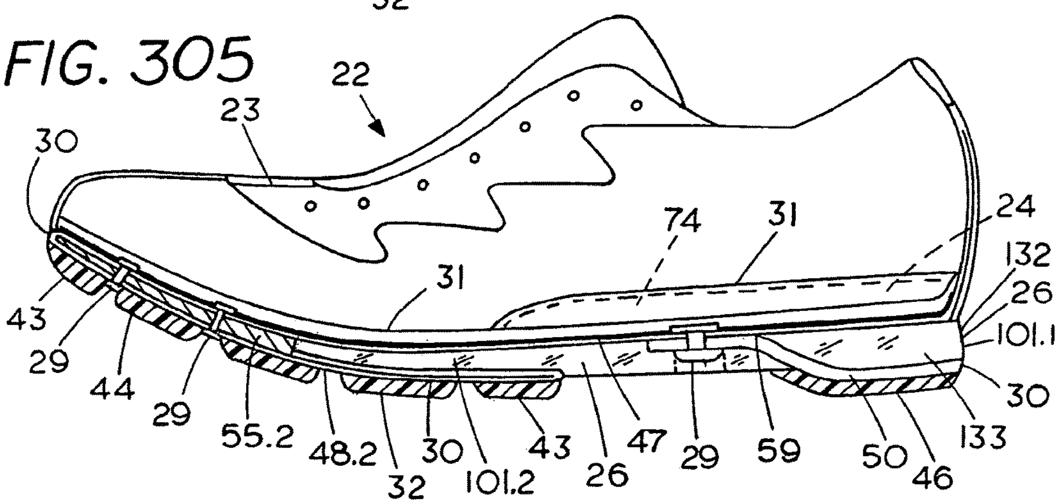

FIG. 303 is a bottom plan view of an article of footwear generally similar to that shown in FIG. 305 showing a fluid-filled bladder as if it were possible to view the structure through a transparent anterior spring element, inferior spring element, and outsole.

FIG. 304 is a longitudinal cross-sectional side view of an article of footwear generally similar to that shown in FIG. 302.

FIG. 305 is a longitudinal cross-sectional side view of an article of footwear generally similar to that shown in FIG. 303.

Figure 306:
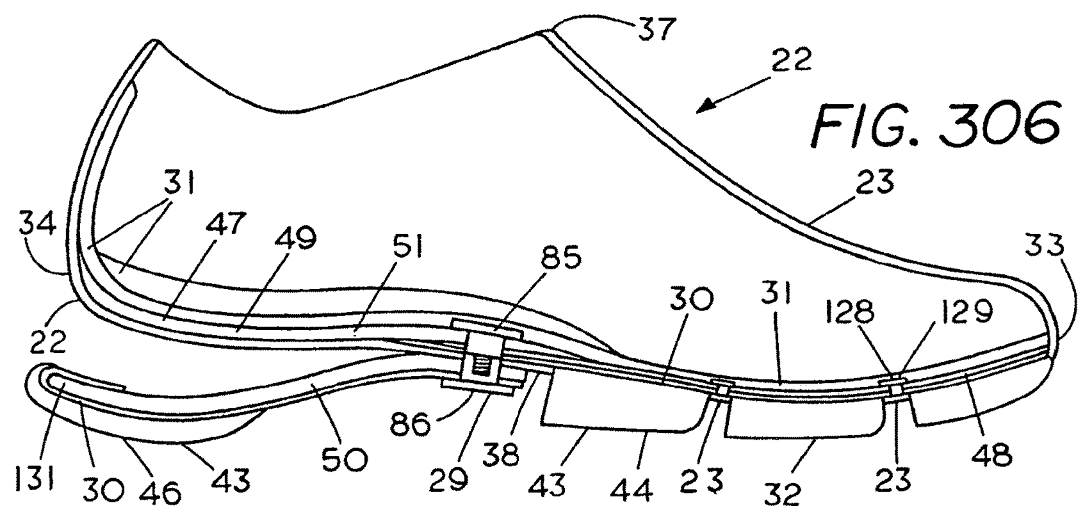

FIG. 306 is a longitudinal cross-sectional side view of an article of footwear showing an upper, insole, superior spring element including an anterior spring element and posterior spring element, male and female mating structures, fastener, anterior outsole element including a backing and an outsole, inferior spring element, and a posterior outsole element including a pocket, a backing, and an outsole.

Figure 307:
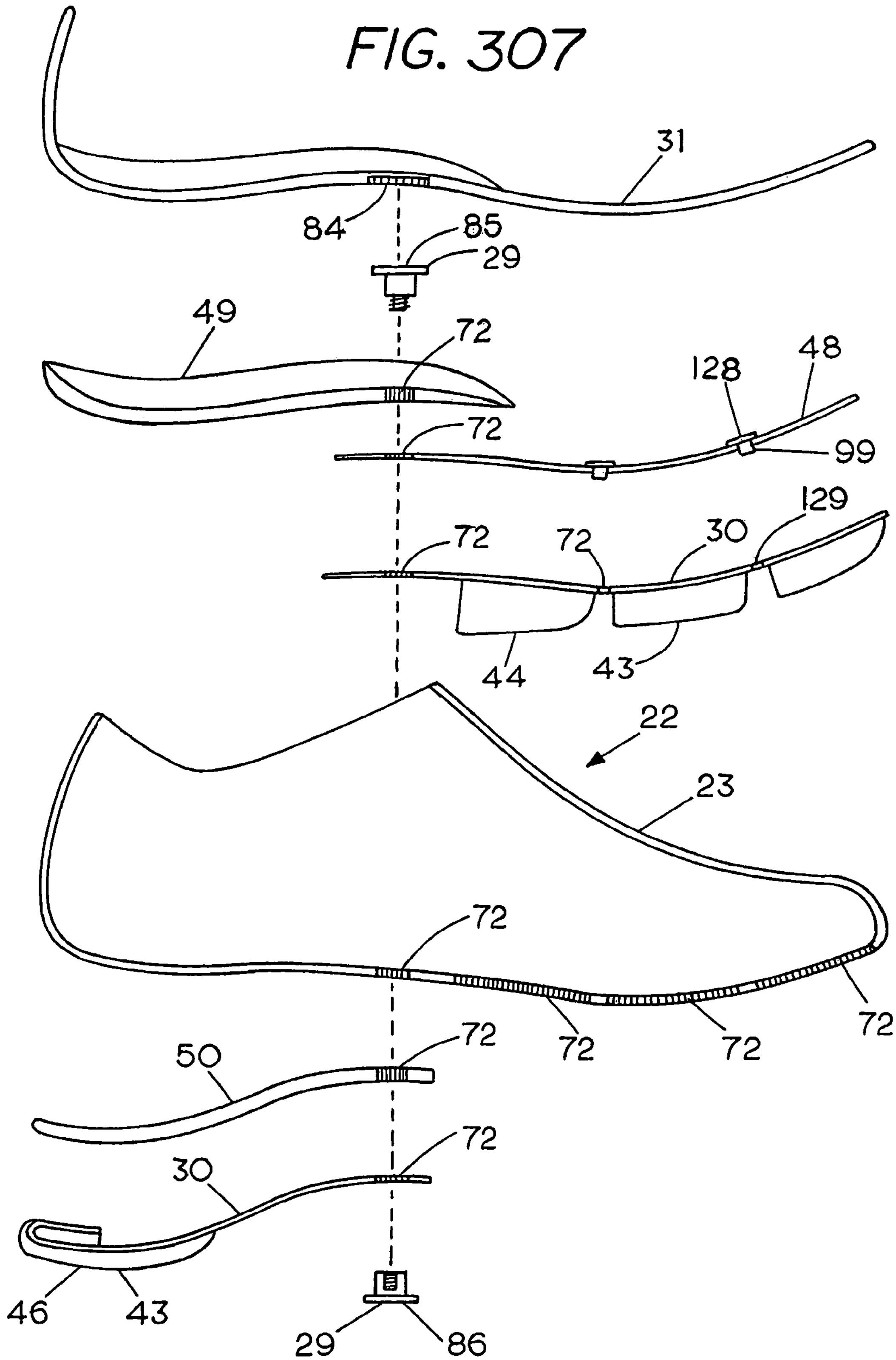

FIG. 307 is a longitudinal cross-sectional exploded side view of the article of footwear shown in FIG. 306.

Figure 308:
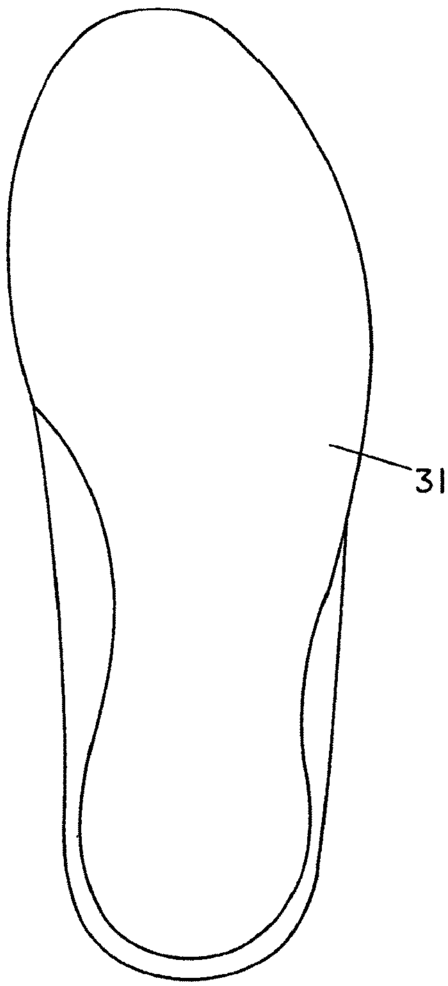

FIG. 308 is a top plan view of an insole for use in the article of footwear shown in FIG. 307.

Figure 309:
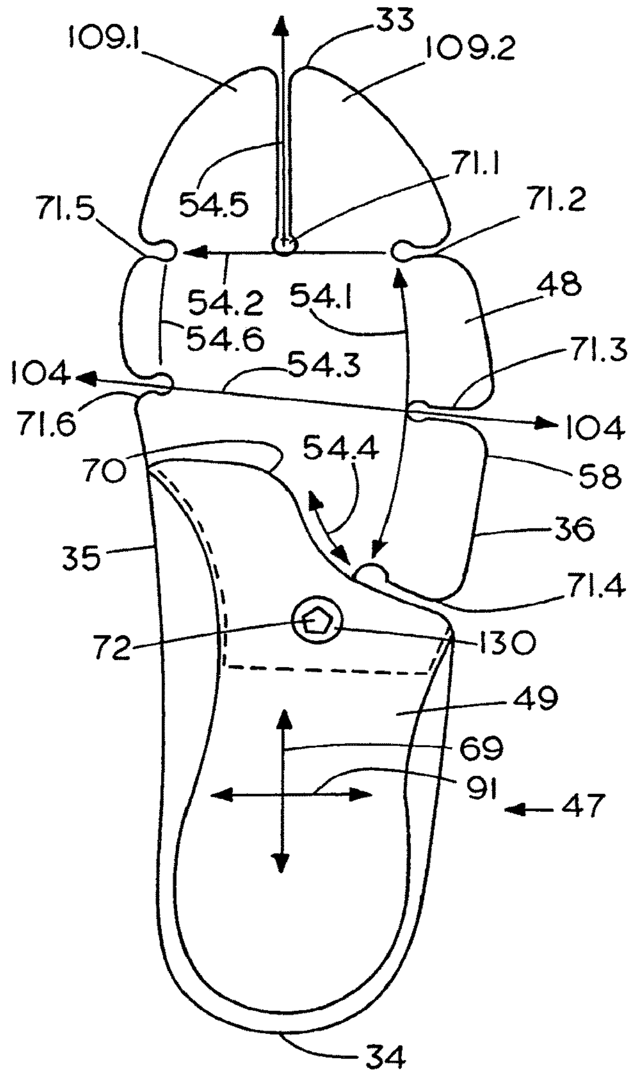

FIG. 309 is a top plan view of the posterior spring element and anterior spring element shown in FIG. 307.

Figure 310:
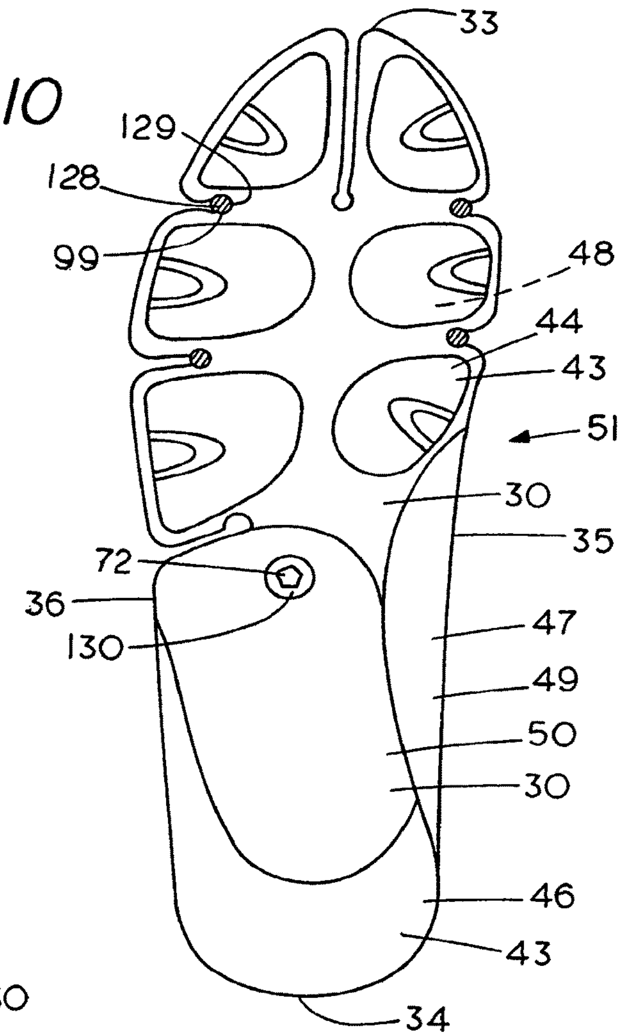

FIG. 310 is a bottom plan view of the posterior spring element, anterior spring element including female mating structures, anterior outsole element including male mating structures, inferior spring element and posterior outsole element shown in FIG. 307.

Figure 311:
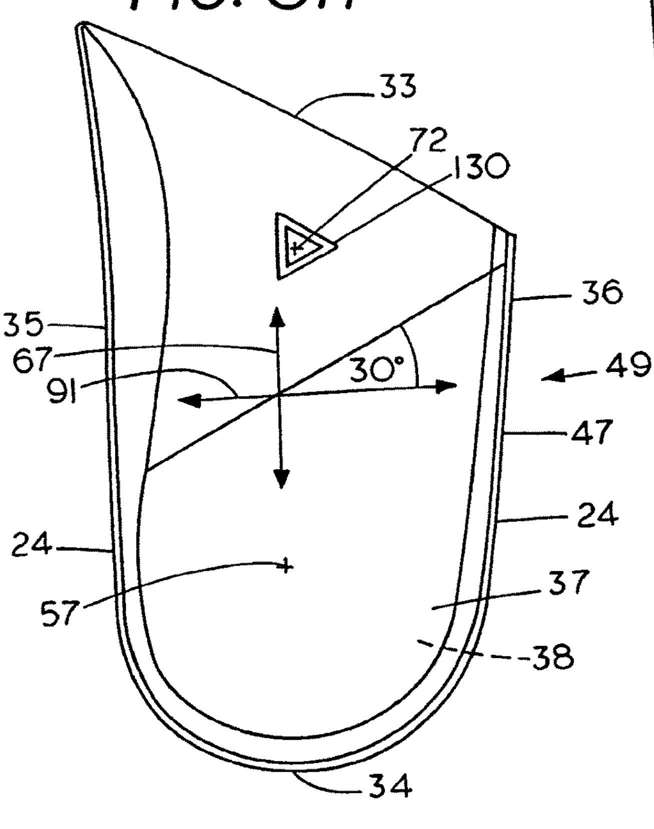

FIG. 311 is a top plan view of an alternate posterior spring element.

Figure 312:
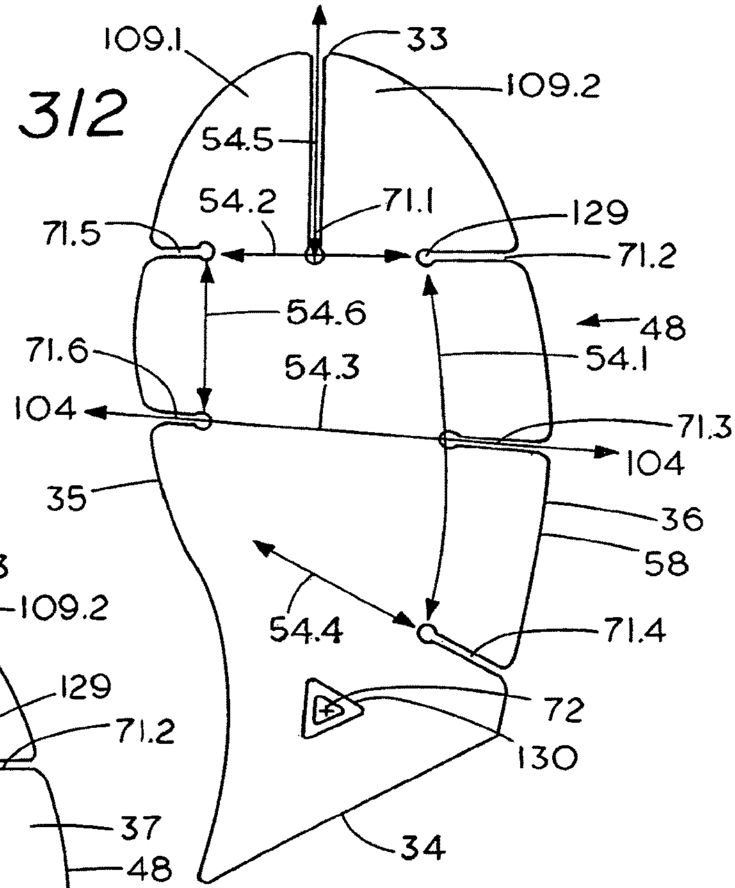

FIG. 312 is a top plan view of an alternate anterior spring element.

Figure 313:
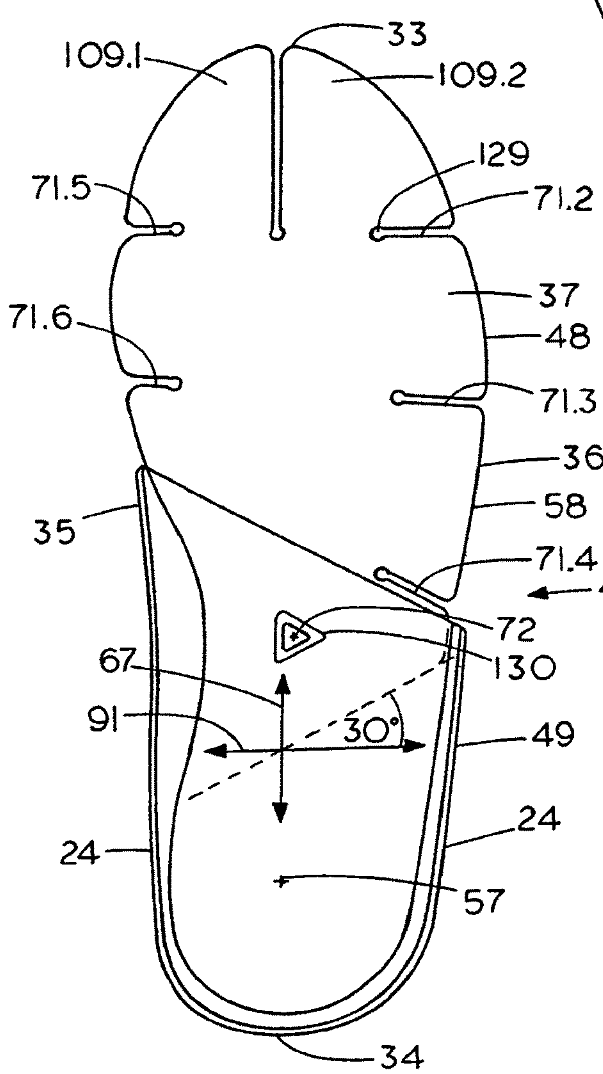

FIG. 313 is a top plan view of the posterior spring element and anterior spring element shown in FIGS. 311 and 312.

Figure 314:
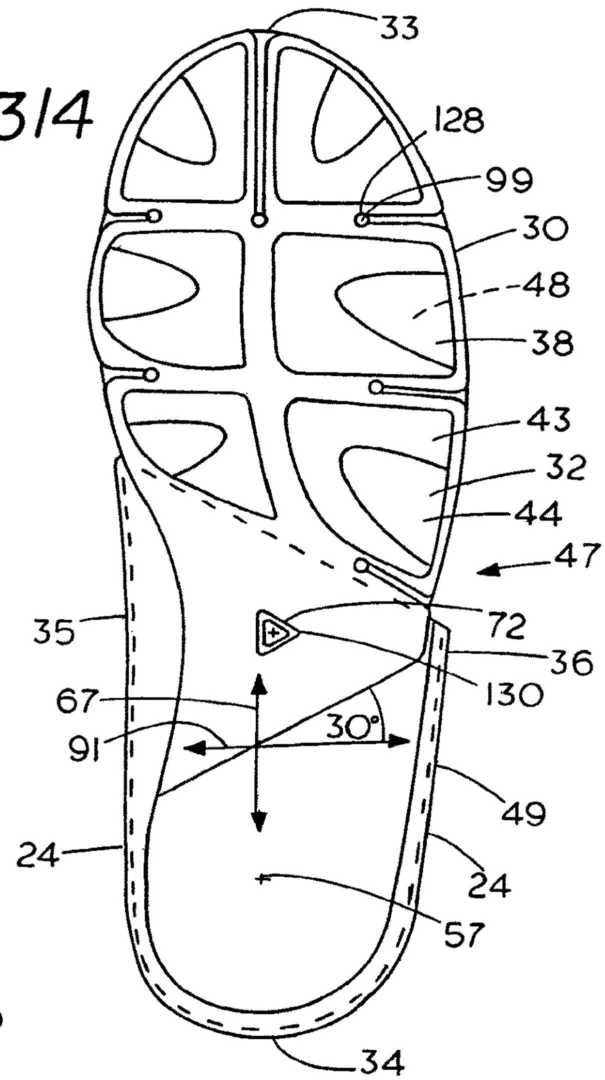

FIG. 314 is a bottom plan view of the posterior spring element and anterior spring element shown in FIGS. 311 and 312, and an anterior outsole element.

Figure 315:
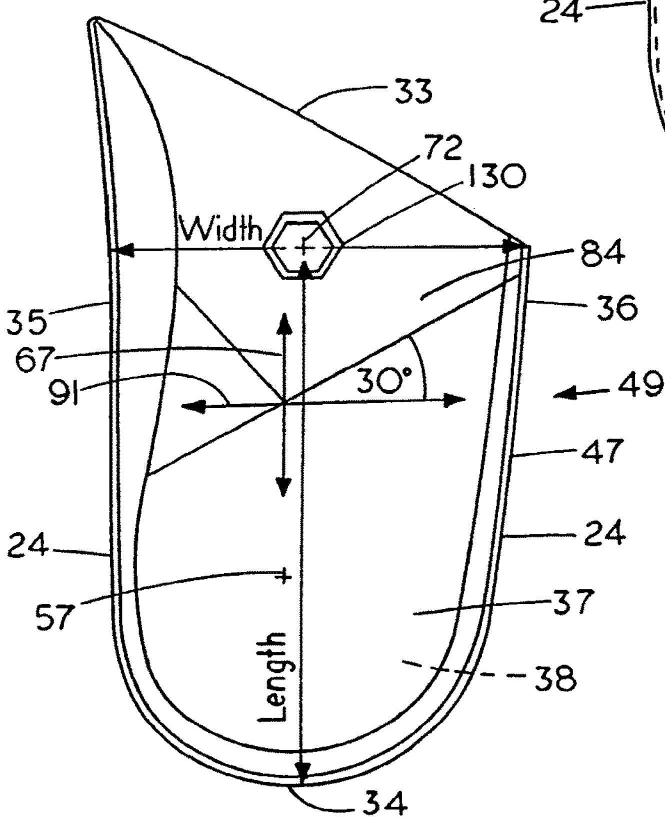

FIG. 315 is a top plan view of an alternate posterior spring element.

Figure 316:
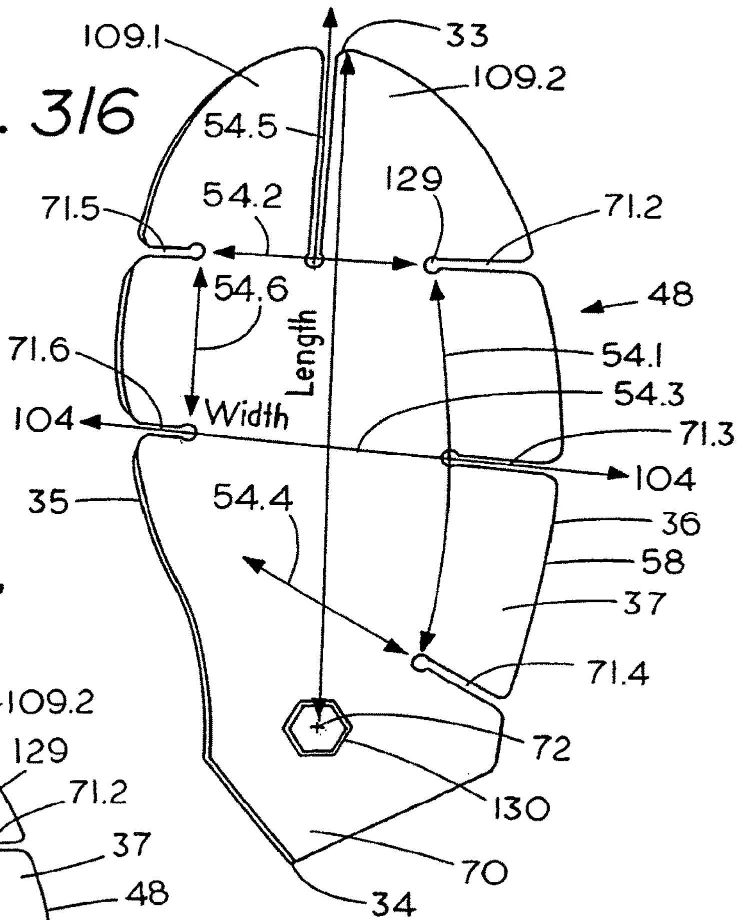

FIG. 316 is a top plan view of an alternate anterior spring element.

Figure 317:
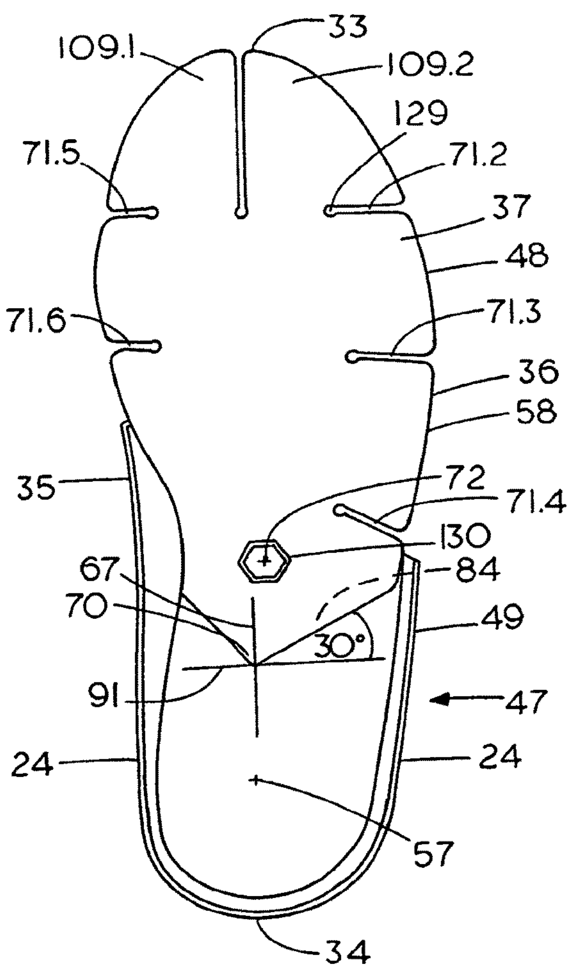

FIG. 317 is a top plan view of the posterior spring element and anterior spring element shown in FIGS. 315 and 316.

Figure 318:
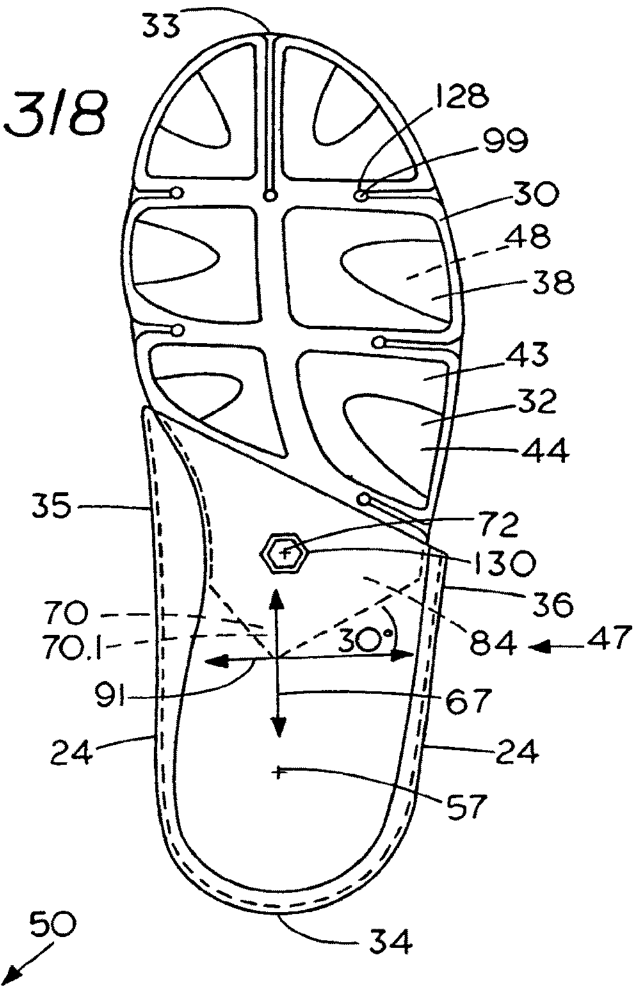

FIG. 318 is a bottom plan view of the posterior spring element and anterior spring element shown in FIGS. 315 and 316, and an anterior outsole element.

Figure 319:
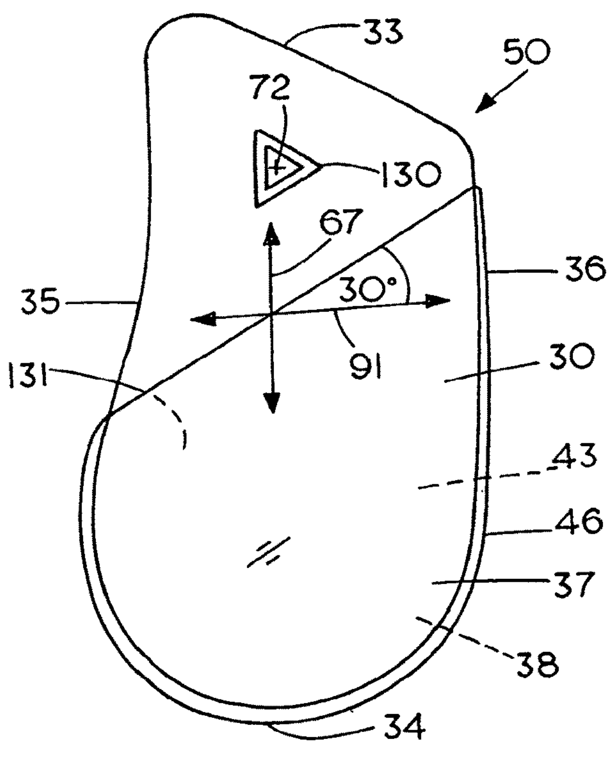

FIG. 319 is a top plan view of an inferior spring element, and a posterior outsole element.

Figure 320:
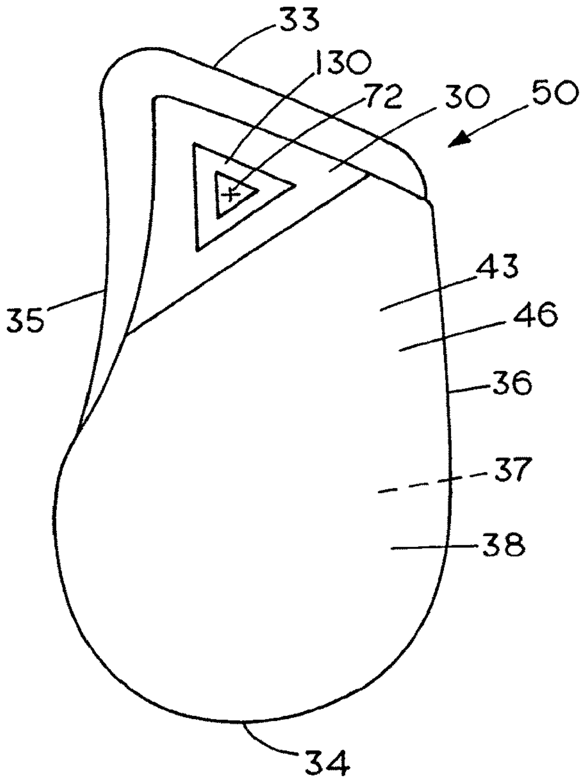

FIG. 320 is a bottom plan view of an inferior spring element, and a posterior outsole element.

Figure 321:
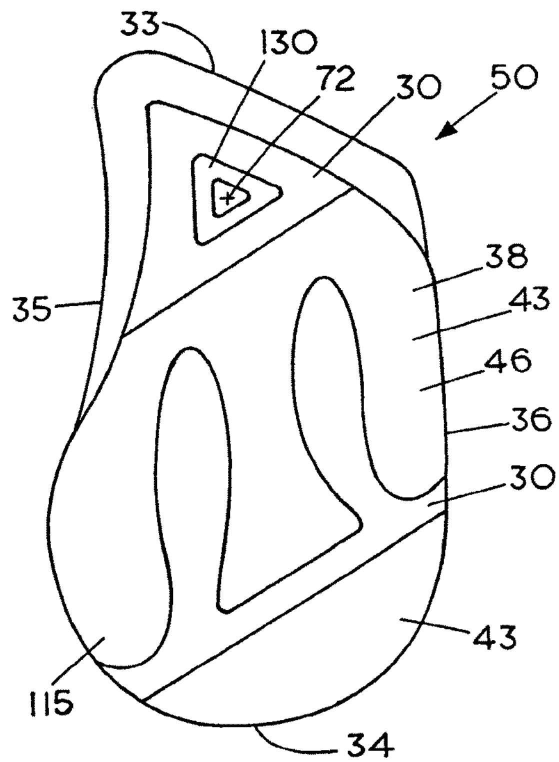

FIG. 321 is a bottom plan view of an inferior spring element, and a posterior outsole element having a different design.

Figure 322:
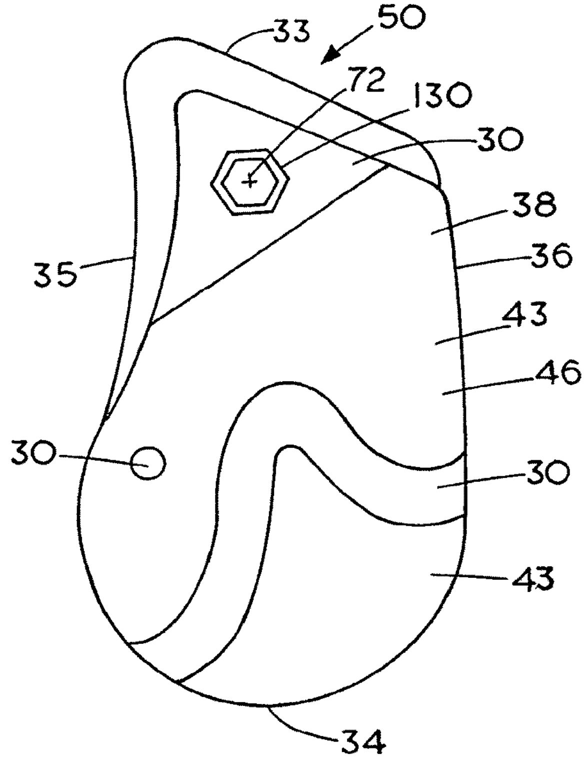

FIG. 322 is a bottom plan view of an inferior spring element, and a posterior outsole element having a different design.

Figure 323:
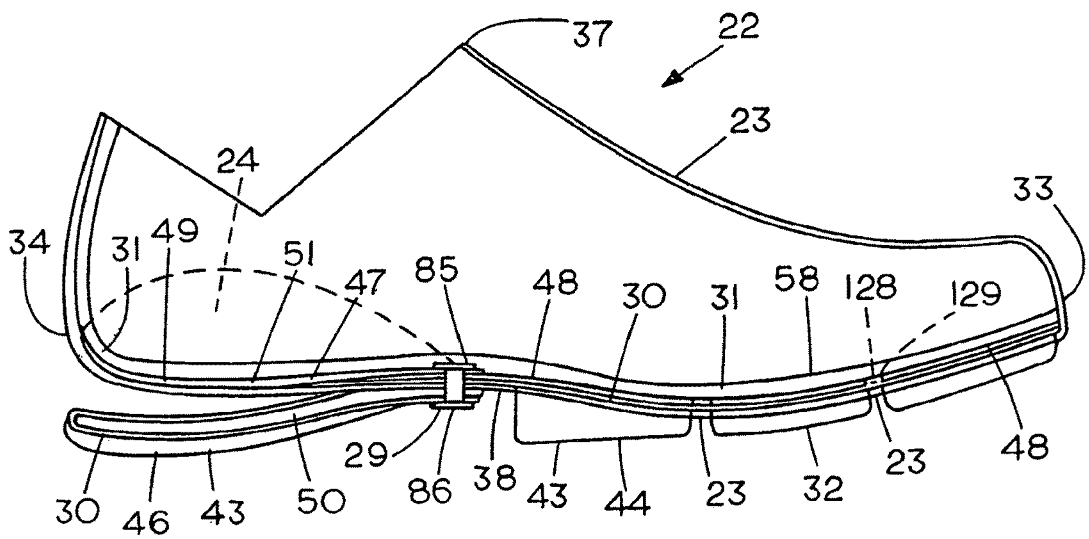

FIG. 323 is a longitudinal cross-sectional side view of an article of footwear including an upper, insole, superior spring element including a posterior spring element and an anterior spring element, anterior outsole element including a backing and traction elements, fastener, an inferior spring element, and a posterior outsole element.

Figure 324:
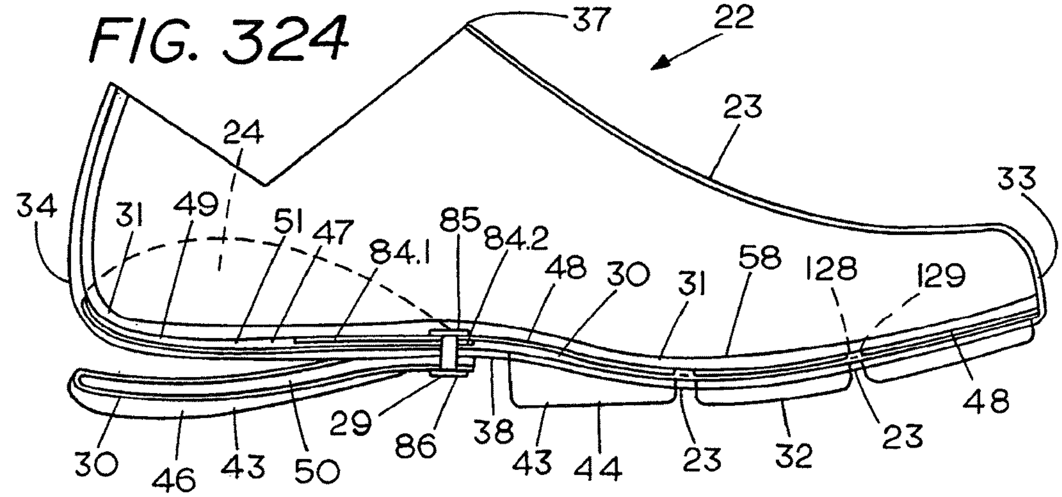

FIG. 324 is a longitudinal cross-sectional side view of an alternate article of footwear relative to that shown in FIG. 323 including an upper, insole, superior spring element including a posterior spring element and an anterior spring element, anterior outsole element including a backing and traction elements, fastener, an inferior spring element, and a posterior outsole element.

Figure 325:
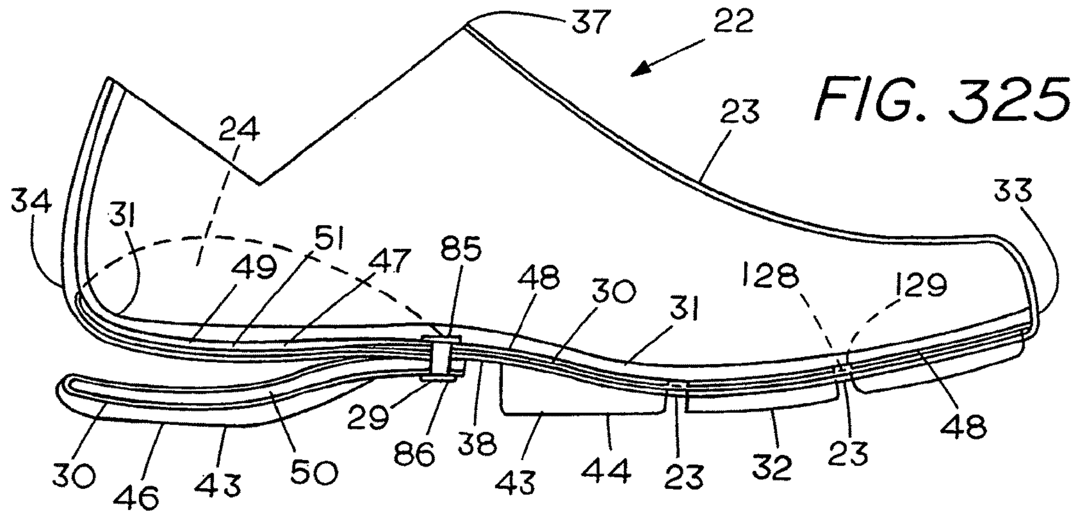

FIG. 325 is a longitudinal cross-sectional side view of an alternate article of footwear relative to that shown in FIG. 323 including an upper, insole, superior spring element including a posterior spring element and an anterior spring element, anterior outsole element including a backing and traction elements, fastener, an inferior spring element, and a posterior outsole element.

Figure 326:
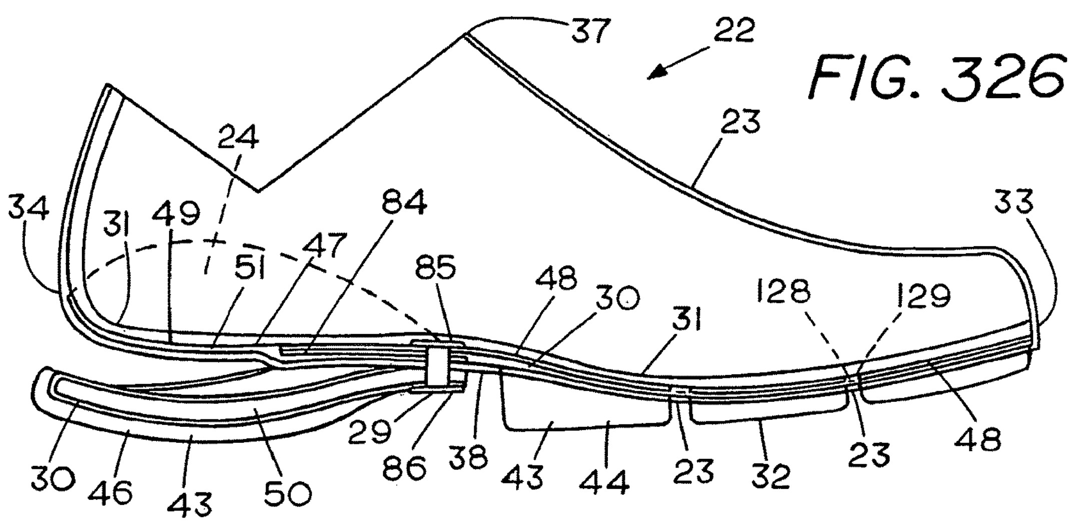

FIG. 326 is a longitudinal cross-sectional side view of an alternate article of footwear relative to that shown in FIG. 323 including an upper, insole, superior spring element including a posterior spring element and an anterior spring element, anterior outsole element including a backing and traction elements, fastener, an inferior spring element, and a posterior outsole element.

Figure 327:
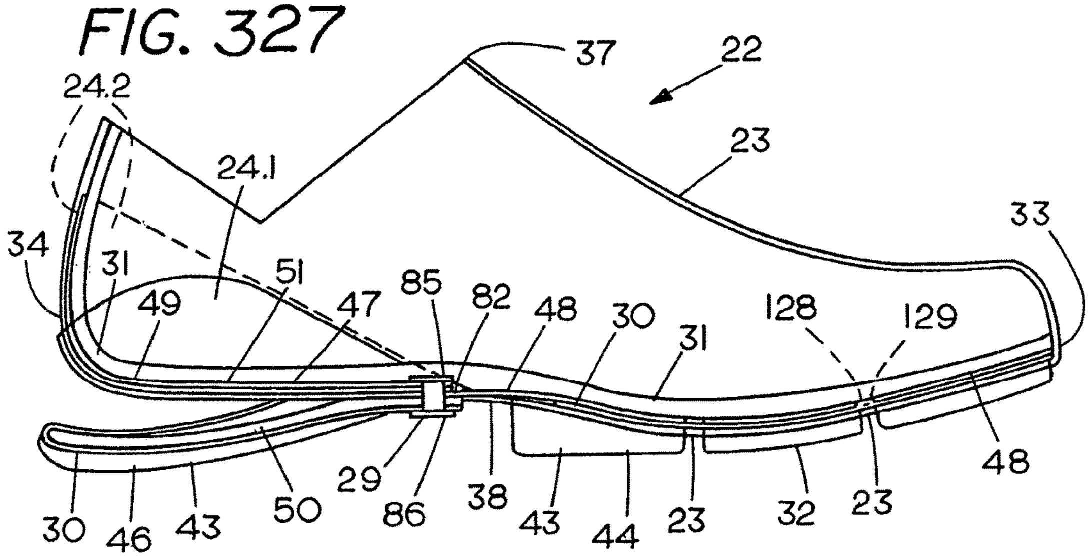

FIG. 327 is a longitudinal cross-sectional side view of an alternate article of footwear relative to that shown in FIG. 323 including an upper, insole, superior spring element including a posterior spring element and an anterior spring element, anterior outsole element including a backing and traction elements, fastener, an inferior spring element, and a posterior outsole element.

Figure 328:
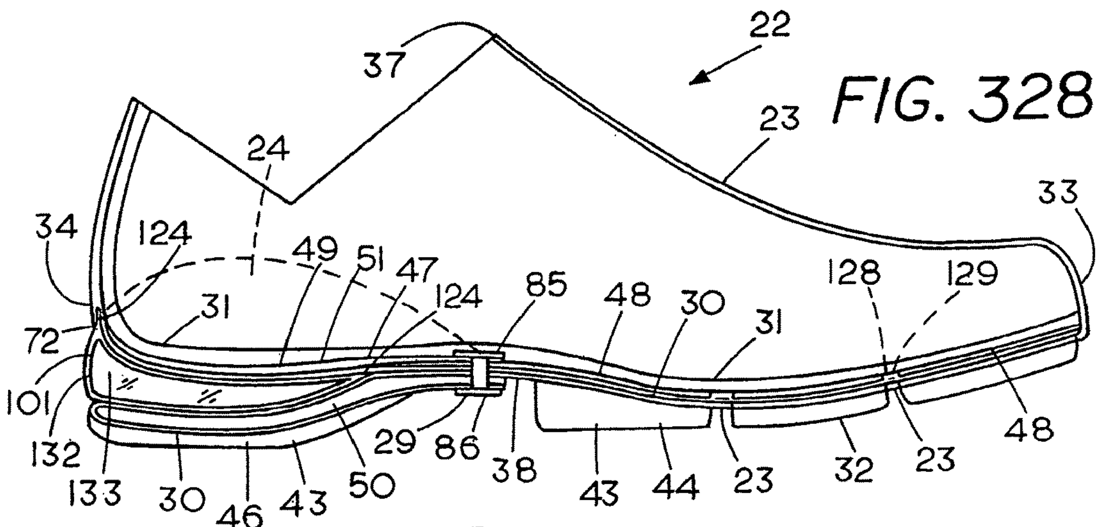

FIG. 328 is a longitudinal cross-sectional side view of an alternate article of footwear relative to that shown in FIG. 323 including an upper, insole, superior spring element including a posterior spring element and an anterior spring element, anterior outsole element including a backing and traction elements, fastener, fluid-filled bladder, an inferior spring element, and a posterior outsole element.

Figure 329:
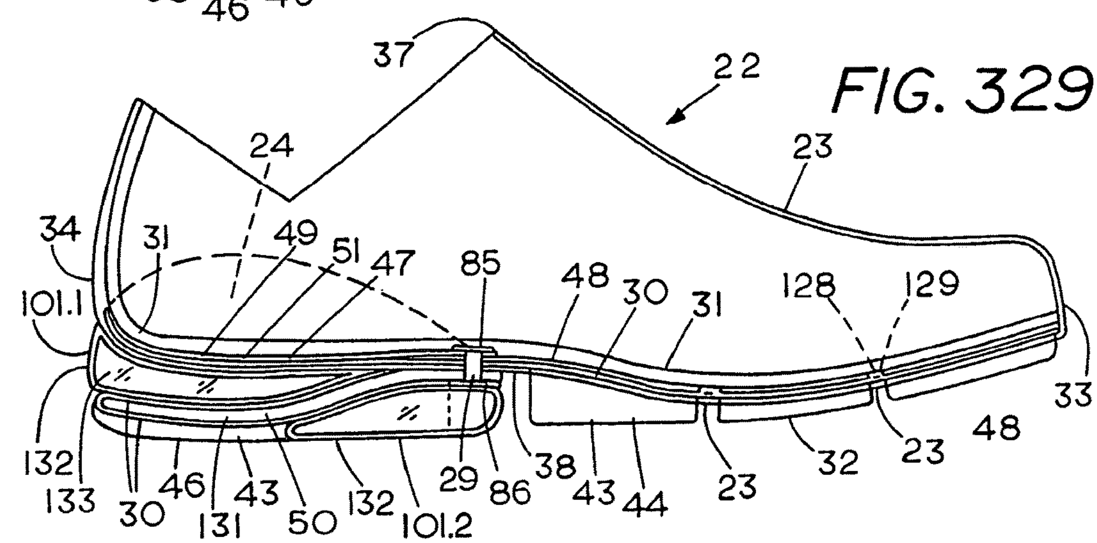

FIG. 329 is a longitudinal cross-sectional side view of an alternate article of footwear relative to that shown in FIG. 323 including an upper, insole, superior spring element including a posterior spring element and an anterior spring element, anterior outsole element including a backing and traction elements, fastener, fluid-filled bladders, an inferior spring element, and a posterior outsole element.

Figure 330:
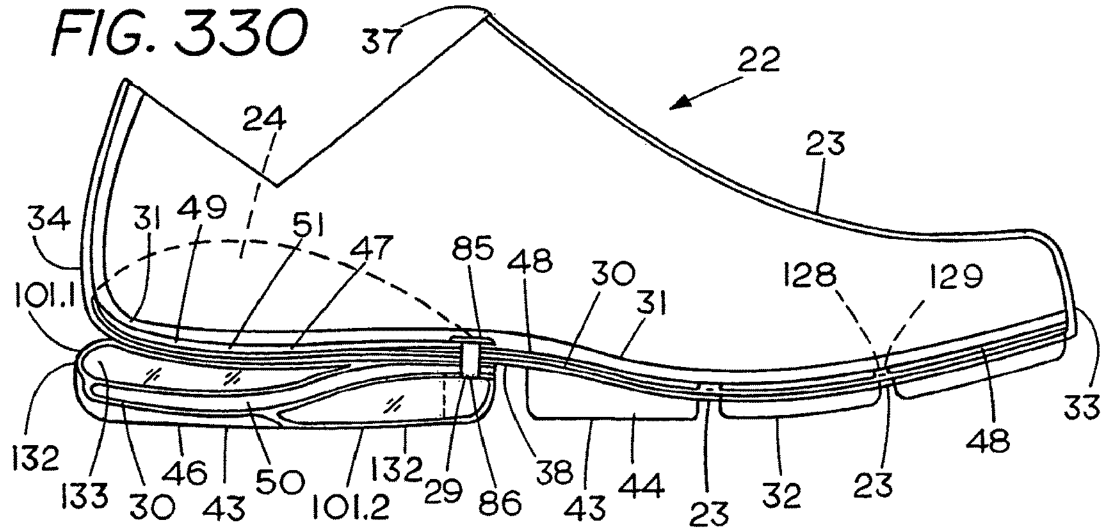

FIG. 330 is a longitudinal cross-sectional side view of an alternate article of footwear relative to that shown in FIG. 323 including an upper, insole, superior spring element including a posterior spring element and an anterior spring element, anterior outsole element including a backing and traction elements, fastener, fluid-filled bladders, an inferior spring element, and a posterior outsole element.

Figure 331:
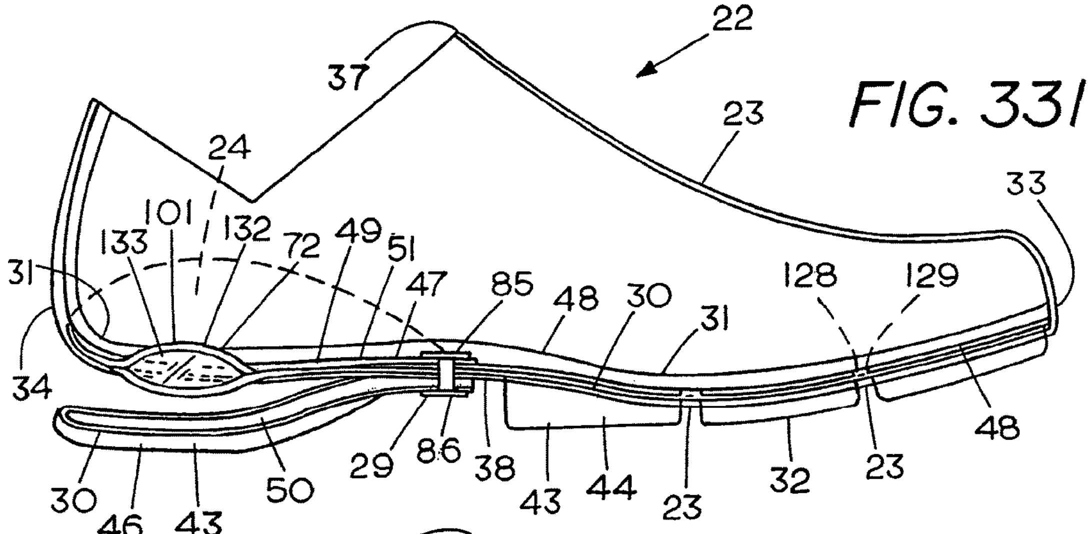

FIG. 331 is a longitudinal cross-sectional side view of an alternate article of footwear relative to that shown in FIG. 323 including an upper, insole, superior spring element including a posterior spring element and an anterior spring element, anterior outsole element including a backing and traction elements, fastener, a fluid-filled bladder, an inferior spring element, and a posterior outsole element.

Figure 332:
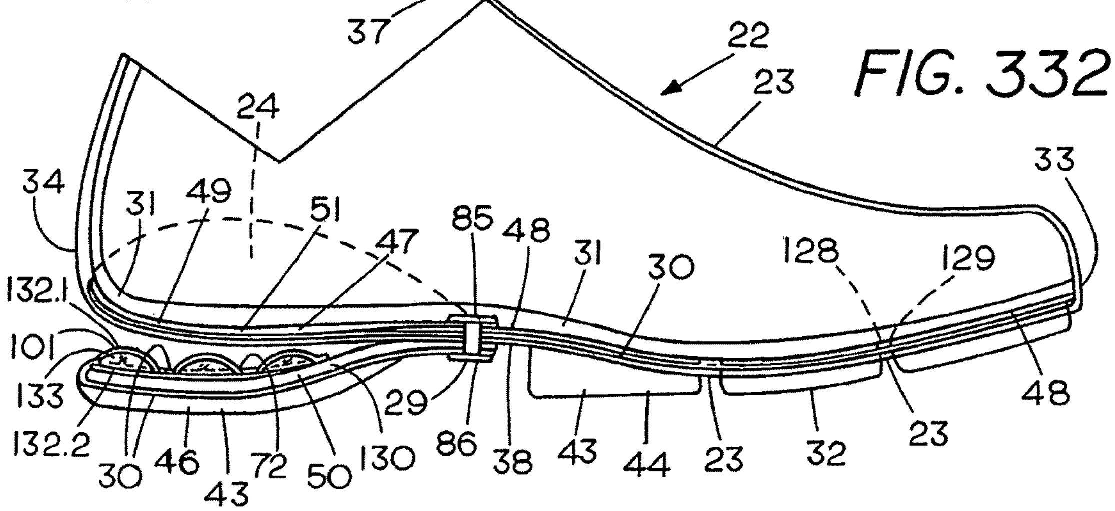

FIG. 332 is a longitudinal cross-sectional side view of an alternate article of footwear relative to that shown in FIG. 323 including an upper, insole, superior spring element including a posterior spring element and an anterior spring element, anterior outsole element including a backing and traction elements, fastener, a fluid-filled bladder, and an inferior spring element including a posterior outsole element.

Figure 333:
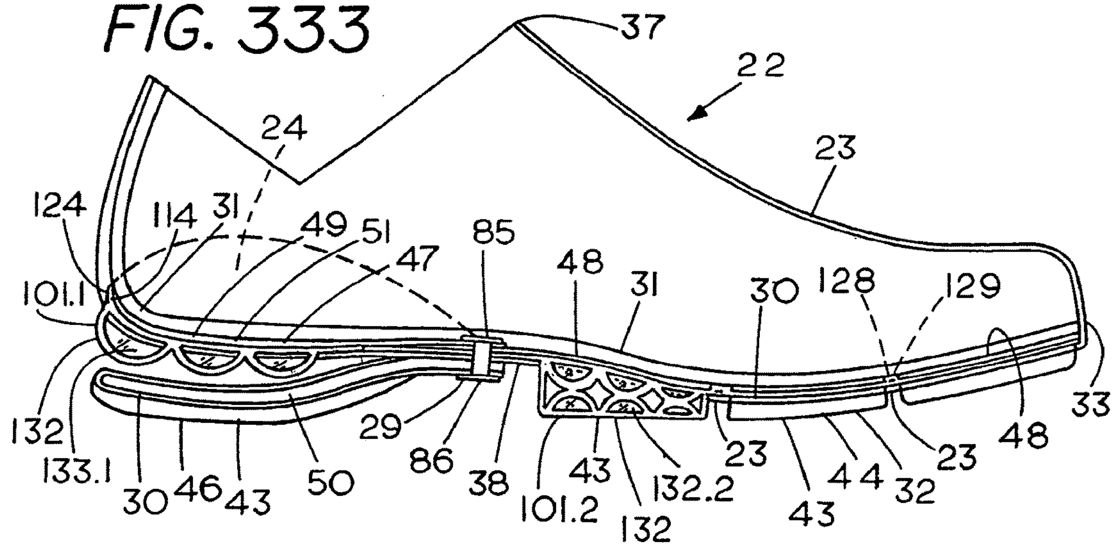

FIG. 333 is a side cross-sectional view of an alternate article of footwear relative to that shown in FIG. 323 including an upper, insole, superior spring element including a posterior spring element and an anterior spring element, anterior outsole element including a backing and traction elements, fastener, fluid-filled bladders, an inferior spring element, and a posterior outsole element.

Figure 334:
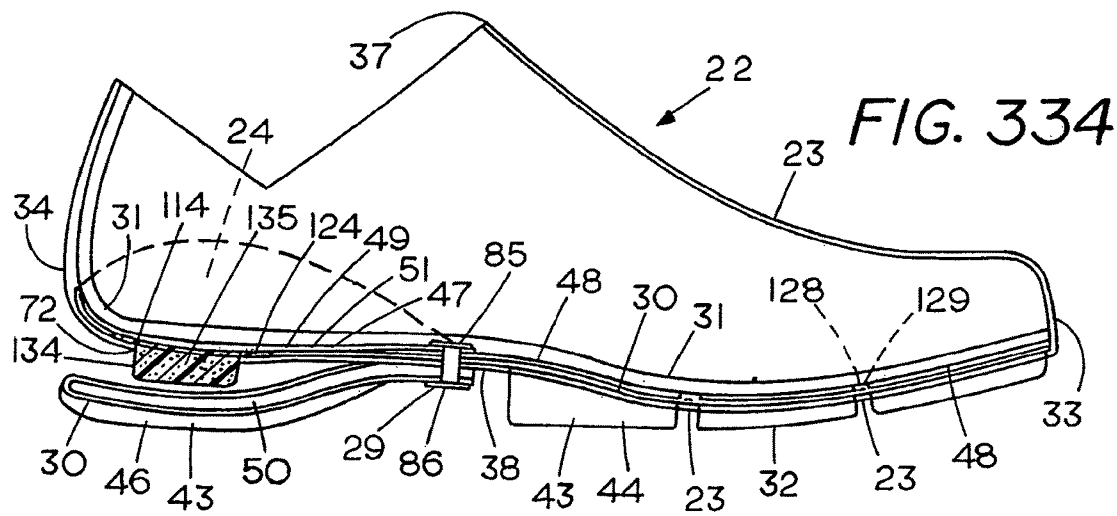

FIG. 334 is a longitudinal cross-sectional side view of an alternate article of footwear relative to that shown in FIG. 323 including an upper, insole, superior spring element including a posterior spring element and an anterior spring element, anterior outsole element including a backing and traction elements, fastener, a cushioning element, an inferior spring element, and a posterior outsole element.

Figure 335:
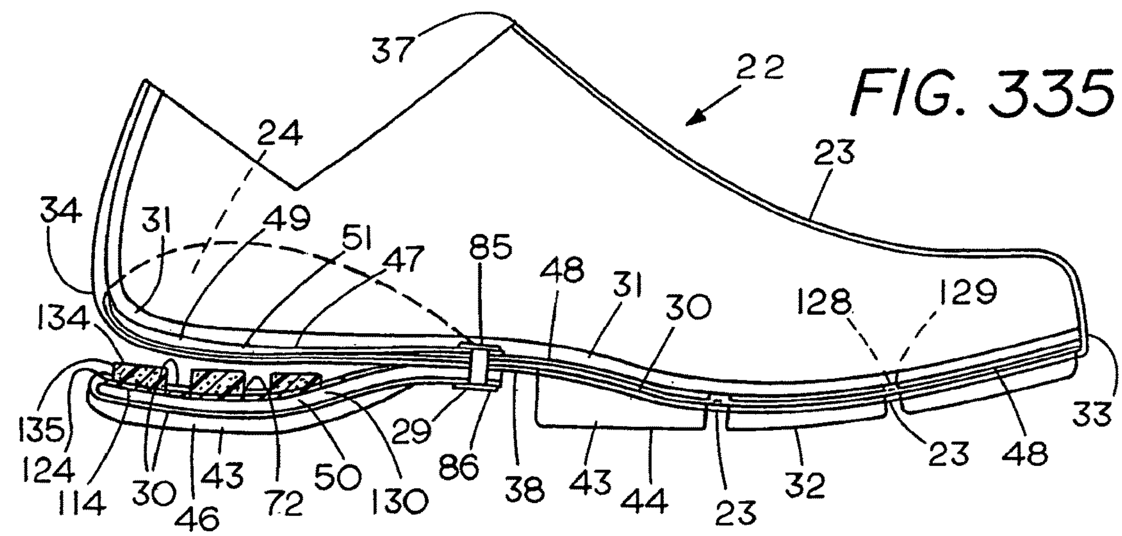

FIG. 335 is a longitudinal cross-sectional side view of an alternate article of footwear relative to that shown in FIG. 323 including an upper, insole, superior spring element including a posterior spring element and an anterior spring element, anterior outsole element including a backing and traction elements, fastener, a cushioning element, an inferior spring element, and a posterior outsole element.

Figure 336:
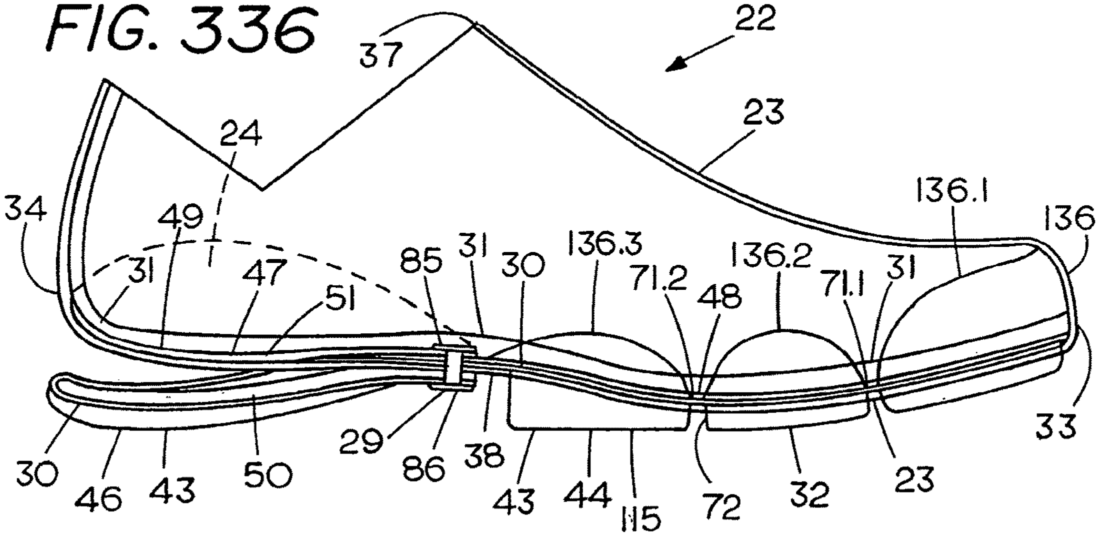

FIG. 336 is a longitudinal cross-sectional side view of an article of footwear including an upper, insole, superior spring element including a posterior spring element and an anterior spring element, anterior outsole element including a backing and traction elements, fastener, internal stability element, an inferior spring element, and a posterior outsole element.

Figure 337:
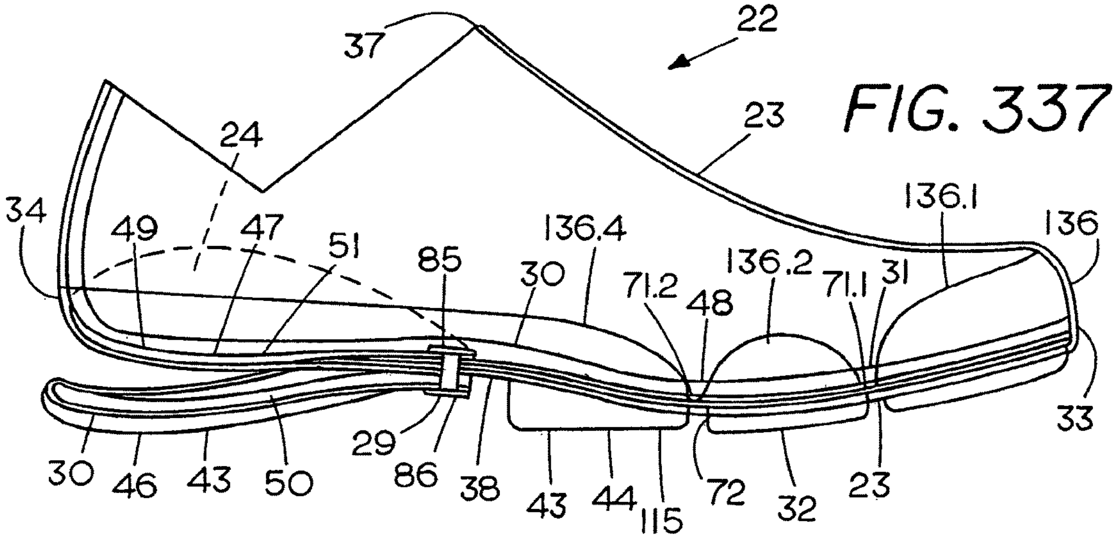

FIG. 337 is a longitudinal cross-sectional side view of an alternate article of footwear relative to that shown in FIG. 336 including an upper, insole, superior spring element including a posterior spring element and an anterior spring element, anterior outsole element including a backing and traction elements, fastener, internal stability element, an inferior spring element, and a posterior outsole element.

Figure 338:
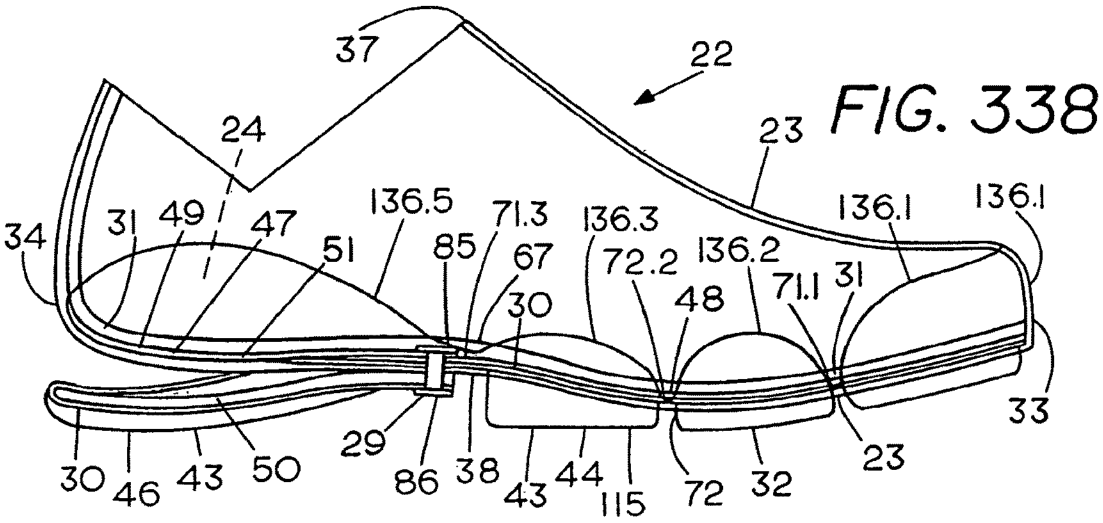

FIG. 338 is a longitudinal cross-sectional side view of an alternate article of footwear relative to that shown in FIG. 336 including an upper, insole, superior spring element including a posterior spring element and an anterior spring element, anterior outsole element including a backing and traction elements, fastener, internal stability element, an inferior spring element, and a posterior outsole element.

Figure 339:
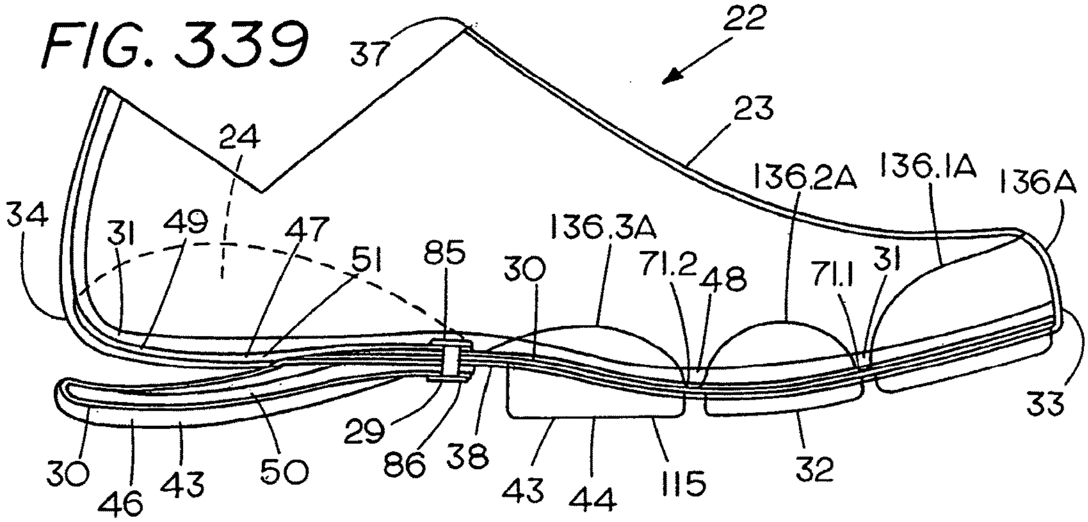

FIG. 339 is a longitudinal cross-sectional side view of an alternate article of footwear relative to that shown in FIG. 336 including an upper, insole, superior spring element including a posterior spring element and an anterior spring element, anterior outsole element including a backing and traction elements, fastener, external stability element, an inferior spring element, and a posterior outsole element.

Figure 340:
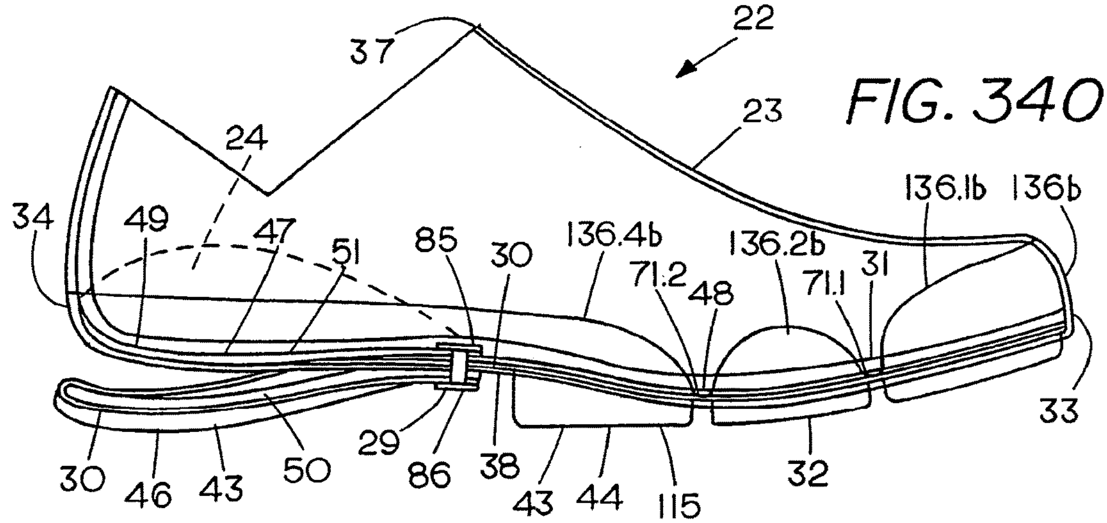

FIG. 340 is a longitudinal cross-sectional side view of an alternate article of footwear relative to that shown in FIG. 337 including an upper, insole, superior spring element including a posterior spring element and an anterior spring element, anterior outsole element including a backing and traction elements, fastener, external stability element, an inferior spring element, and a posterior outsole element.

Figure 341:
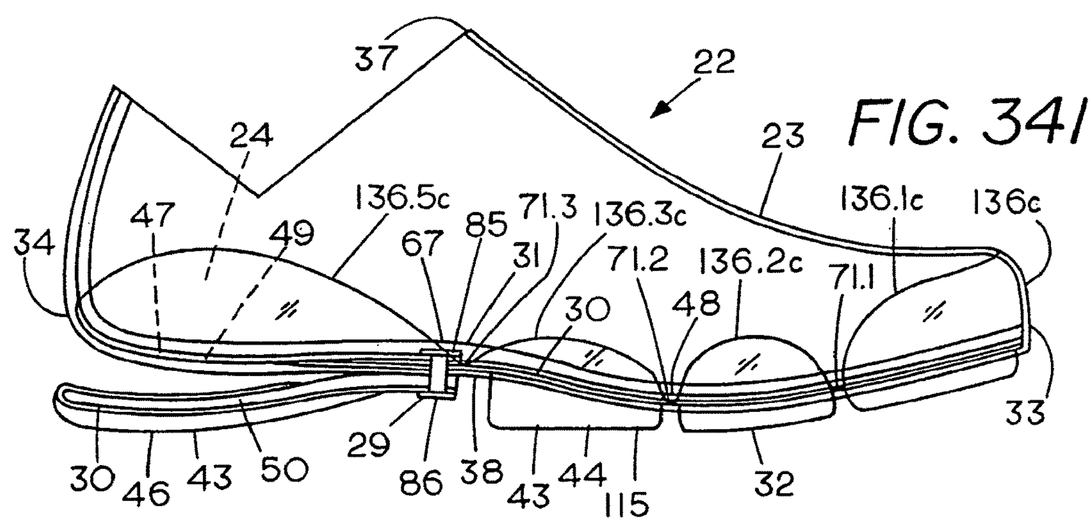

FIG. 341 is a longitudinal cross-sectional side view of an alternate article of footwear relative to that shown in FIG. 338 including an upper, insole, superior spring element including a posterior spring element and an anterior spring element, anterior outsole element including a backing and traction elements, fastener, external stability element, an inferior spring element, and a posterior outsole element.

Figure 342:
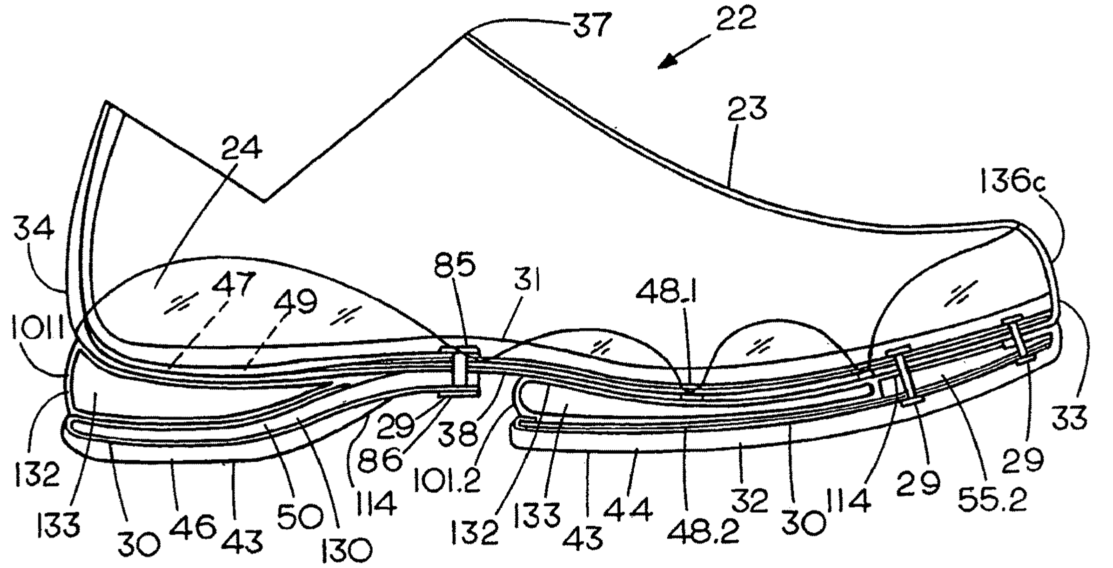

FIG. 342 is a longitudinal cross-sectional side view of an alternate article of footwear relative to that shown in FIG. 341 including an upper, insole, superior spring element including a posterior spring element and anterior spring elements, anterior outsole element including a backing and traction elements, fastener, external stability element, fluid-filled bladders, an inferior spring element, and a posterior outsole element.

Figure 343:
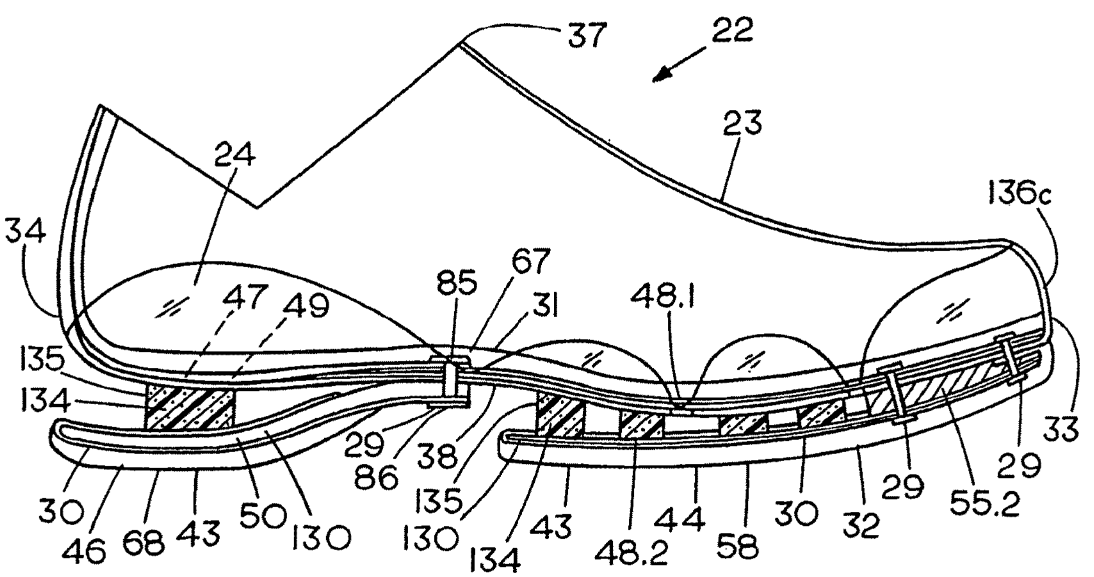

FIG. 343 is a longitudinal cross-sectional side view of an alternate article of footwear relative to that shown in FIG. 342 including an upper, insole, superior spring element including a posterior spring element and anterior spring elements, anterior outsole element including a backing and traction elements, fastener, external stability element, a plurality of cushioning elements, an inferior spring element, and a posterior outsole element.

Figure 344:
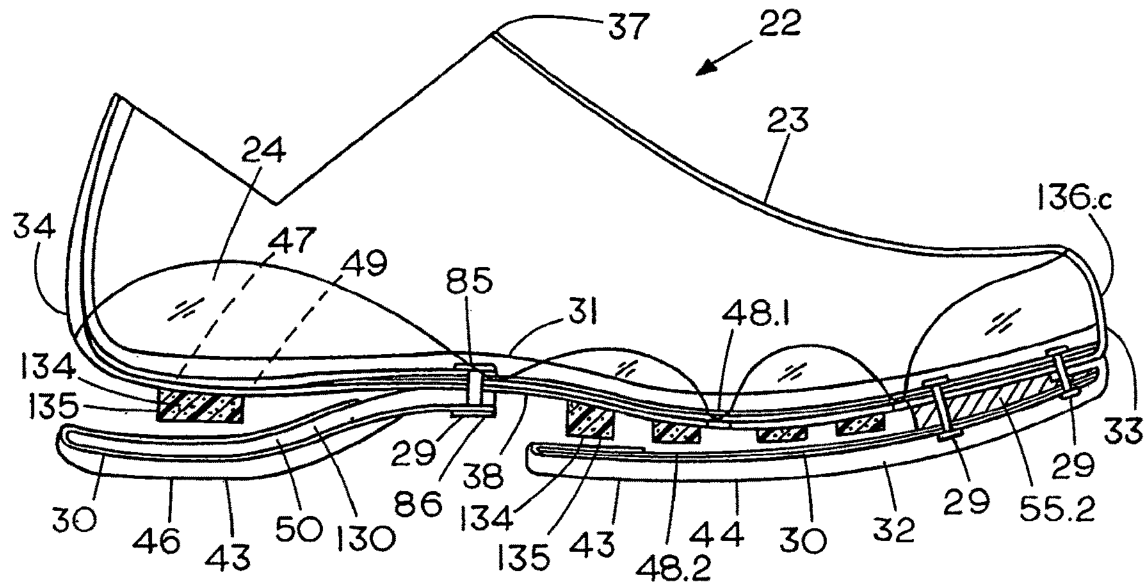

FIG. 344 is a longitudinal cross-sectional side view of an alternate article of footwear relative to that shown in FIG. 343 including an upper, insole, superior spring element including a posterior spring element and anterior spring elements, anterior outsole element including a backing and traction elements, fastener, external stability element, a plurality of cushioning elements, an inferior spring element, and a posterior outsole element.

Figure 345:
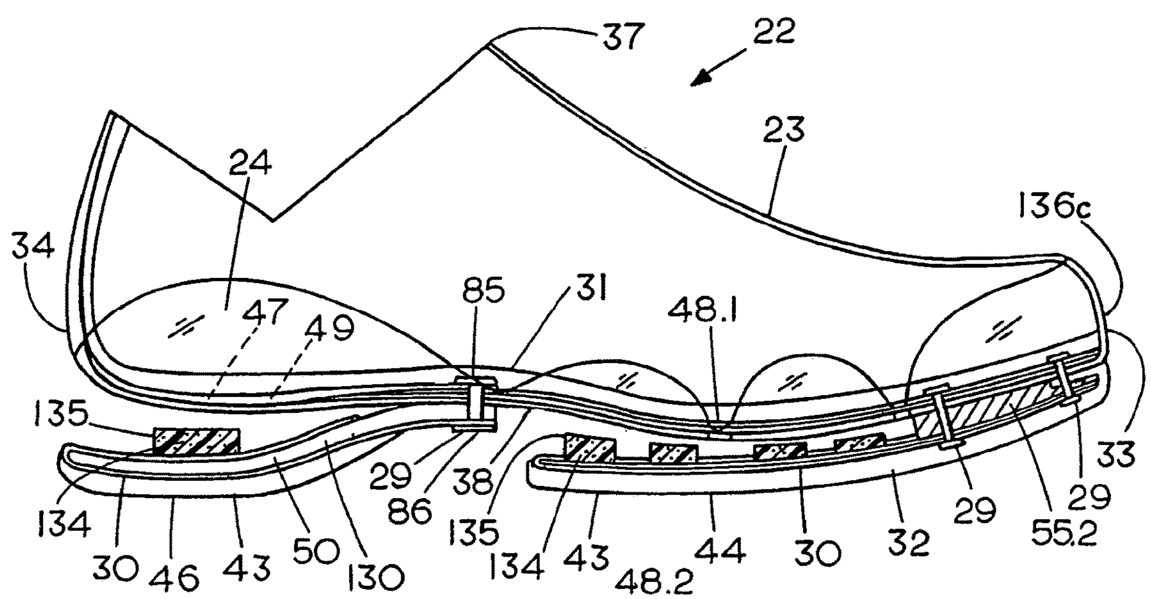

FIG. 345 is a longitudinal cross-sectional side view of an alternate article of footwear relative to that shown in FIG. 343 including an upper, insole, superior spring element including a posterior spring element and anterior spring elements, anterior outsole element including a backing and traction elements, fastener, external stability element, a plurality of cushioning elements, an inferior spring element, and a posterior outsole element.

Figure 346:
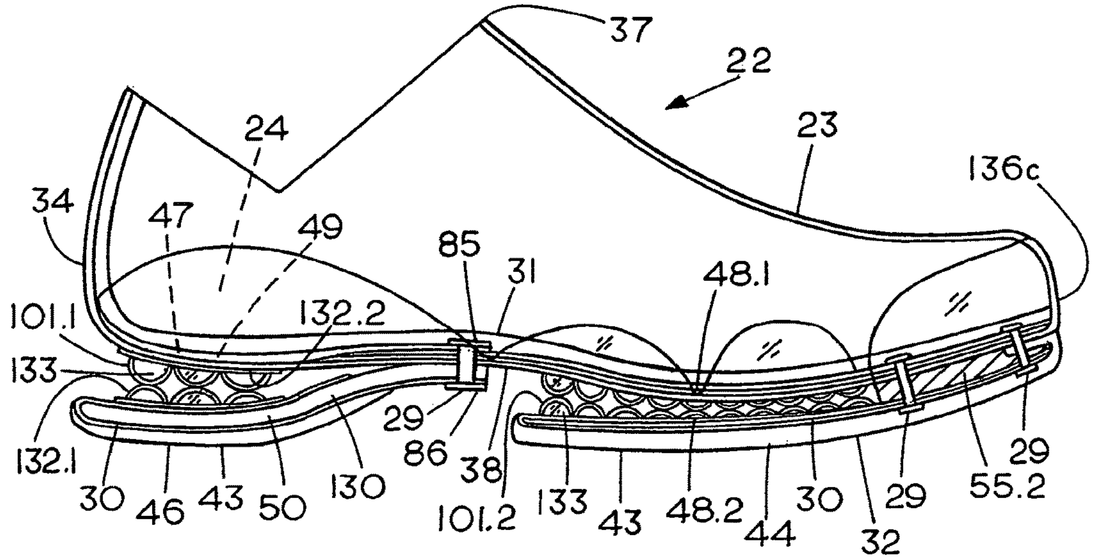

FIG. 346 is a longitudinal cross-sectional side view of an alternate article of footwear relative to that shown in FIG. 342 including an upper, insole, superior spring element including a posterior spring element and anterior spring elements, anterior outsole element including a backing and traction elements, fastener, external stability element, fluid-filled bladders, an inferior spring element, and a posterior outsole element.

Figure 347:
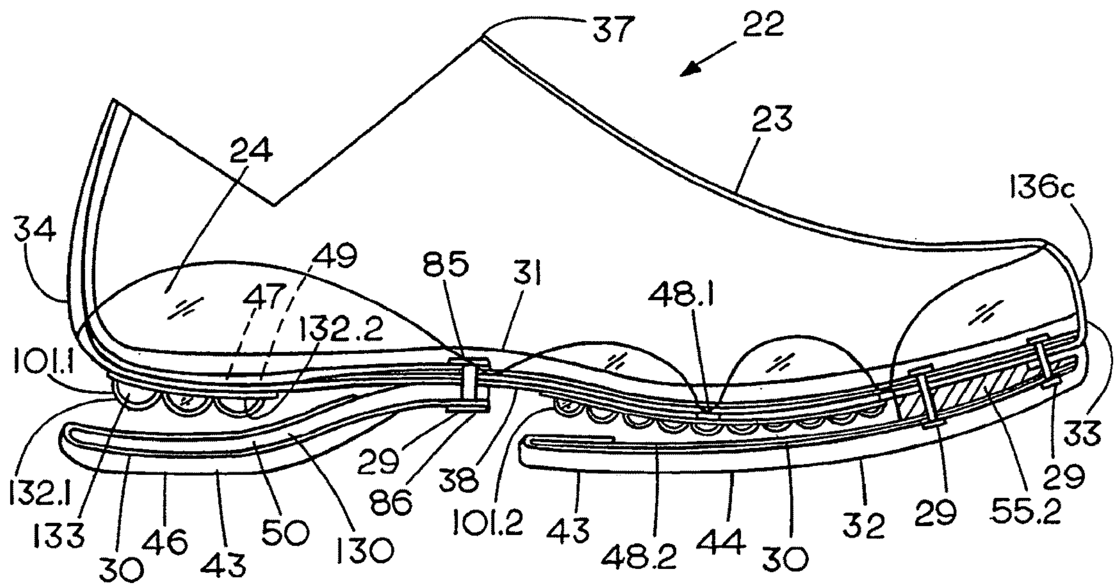

FIG. 347 is a longitudinal cross-sectional side view of an alternate article of footwear relative to that shown in FIG. 346 including an upper, insole, superior spring element including a posterior spring element and anterior spring elements, anterior outsole element including a backing and traction elements, fastener, external stability element, fluid-filled bladders, an inferior spring element, and a posterior outsole element.

Figure 348:
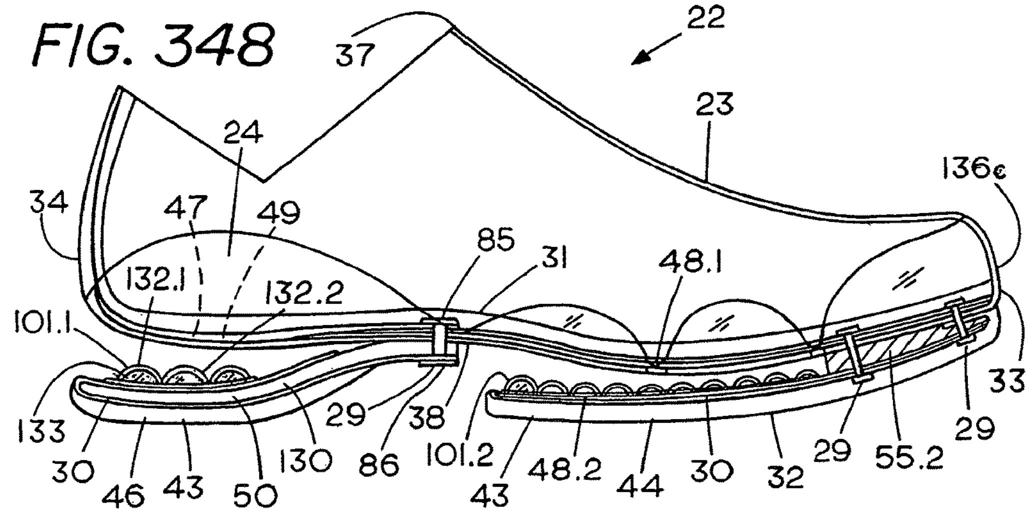

FIG. 348 is a longitudinal cross-sectional side view of an alternate article of footwear relative to that shown in FIG. 346 including an upper, insole, superior spring element including a posterior spring element and anterior spring elements, anterior outsole element including a backing and traction elements, fastener, external stability element, fluid-filled bladders, an inferior spring element, and a posterior outsole element.

Figure 349:
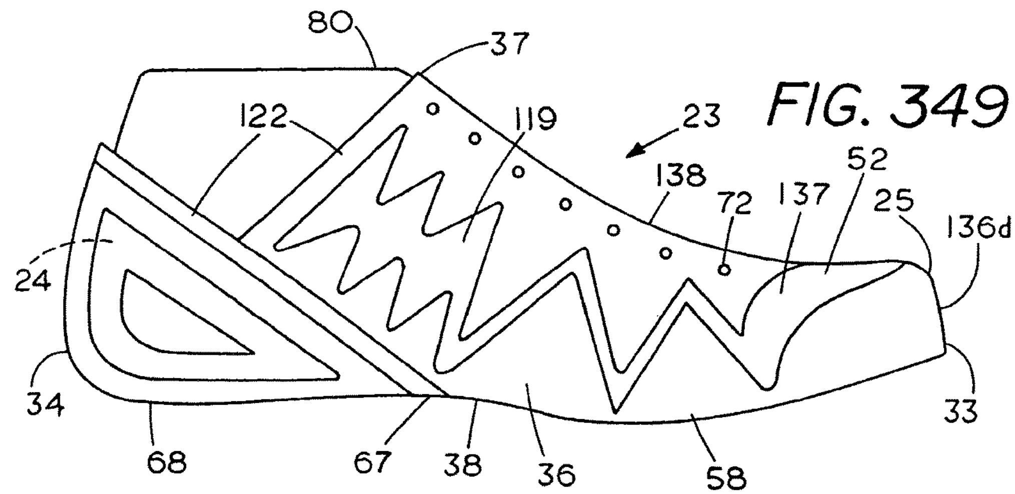

FIG. 349 is a side view of an upper including a textile material and a plastic material mounted on a footwear last.

Figure 350:
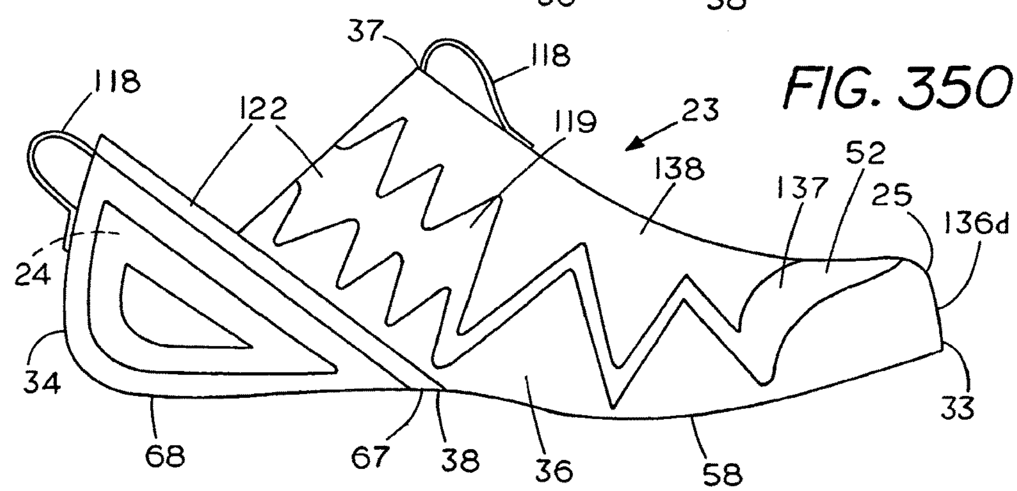

FIG. 350 is a side view of an alternate upper including a textile material and a plastic material mounted on a footwear last.

Figure 351:
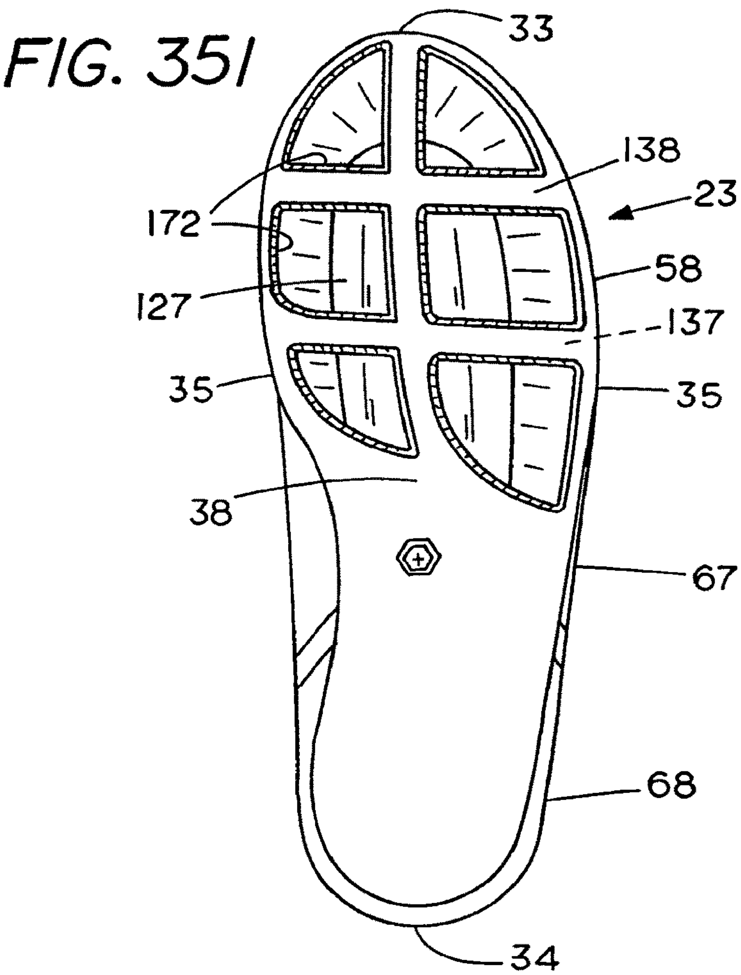

FIG. 351 is a bottom plan view of an upper including openings on the inferior side for the passage of traction members therethrough that is generally similar to the uppers shown in FIGS. 349 and 350.

Figure 352:
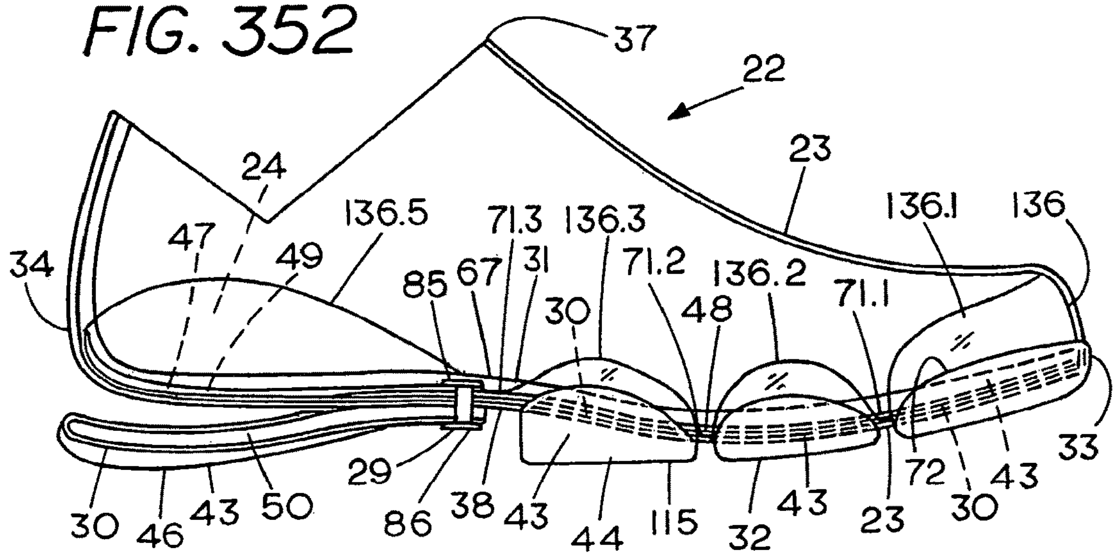

FIG. 352 is a side view of an article of footwear generally similar to that shown in FIG. 338, but including an upper having openings for the passage of traction members therethrough that extend upwards on the medial side, lateral side, and at least a portion of the anterior side.

Figure 353:
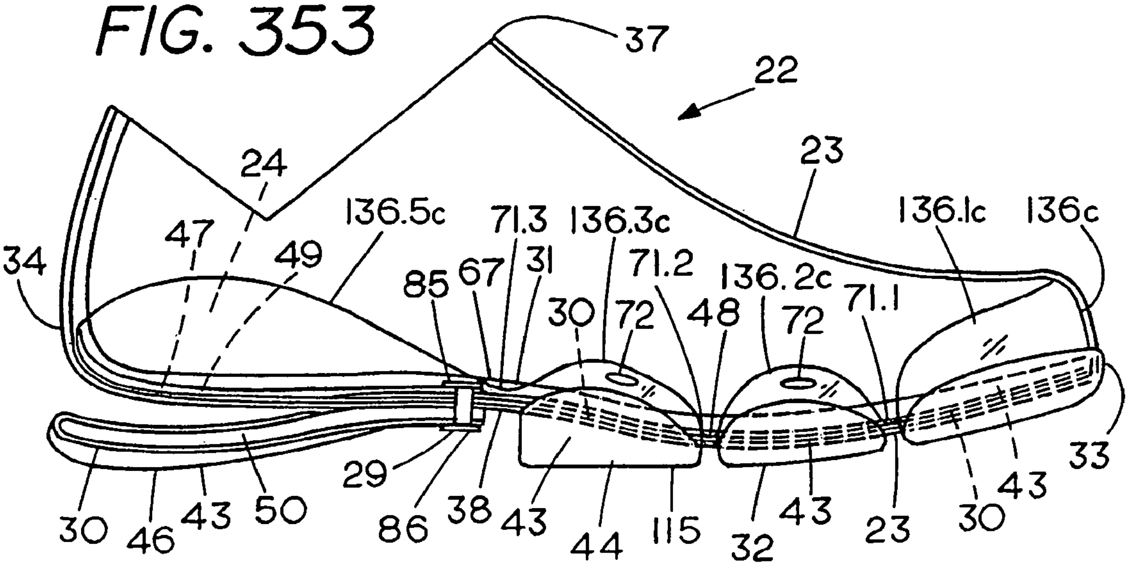

FIG. 353 is a side view of an article of footwear generally similar to that shown in FIG. 341, but including an upper having openings for the passage of traction members therethrough that extend upwards on the medial side, lateral side, and at least a portion of the anterior side.

Figure 354:
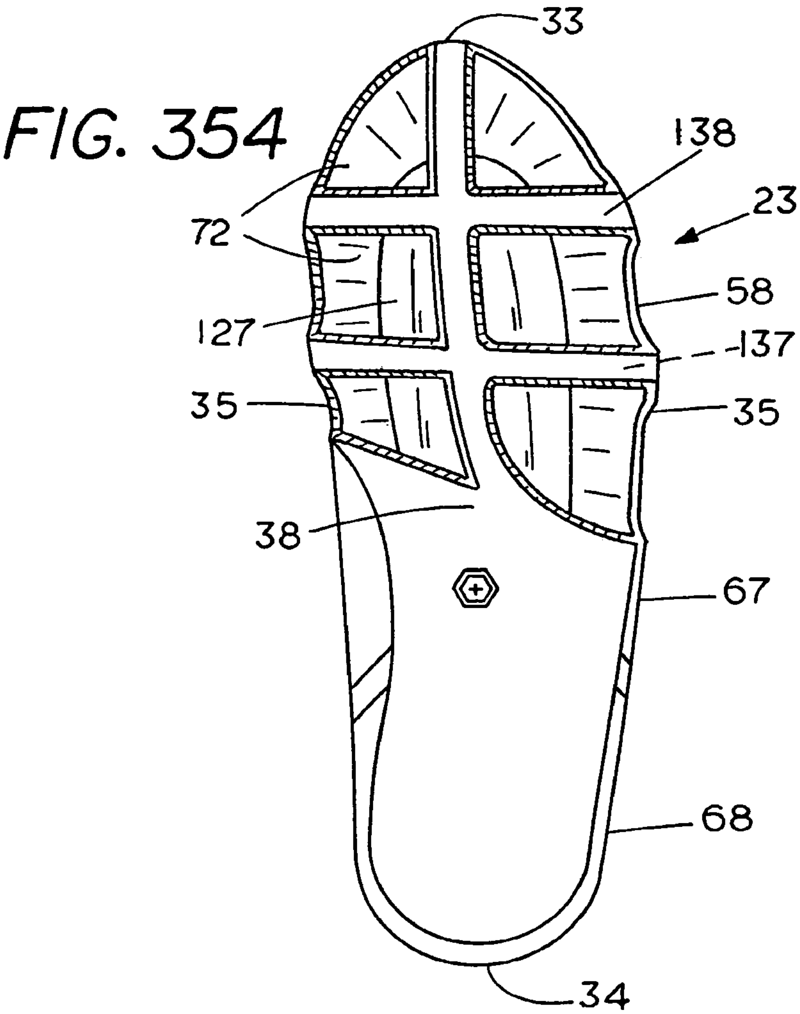

FIG. 354 is a bottom plan view of an upper including openings on the inferior side for the passage of traction members therethrough that is generally similar to the uppers shown in FIGS. 352 and 353.

Figure 355:
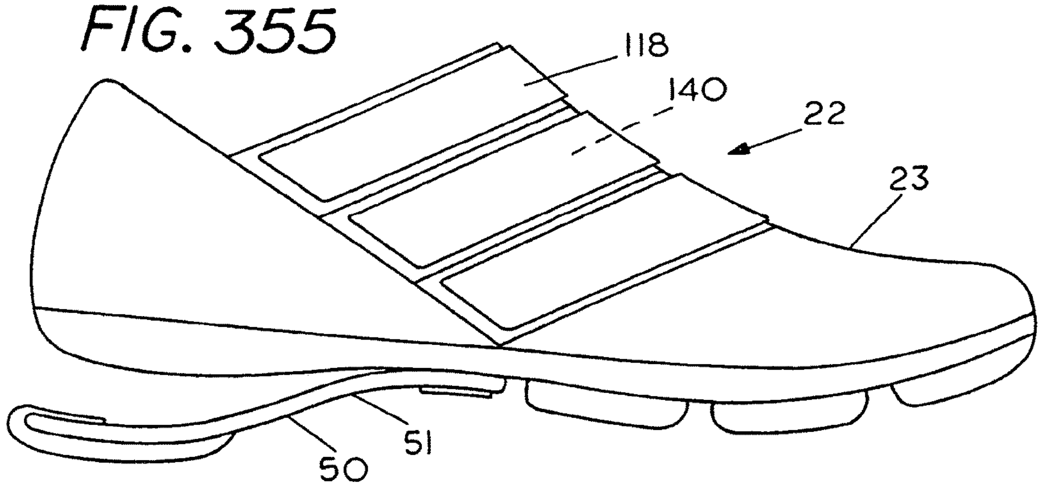

FIG. 355 is a side view of an article of footwear having an upper including three straps.

Figure 356:
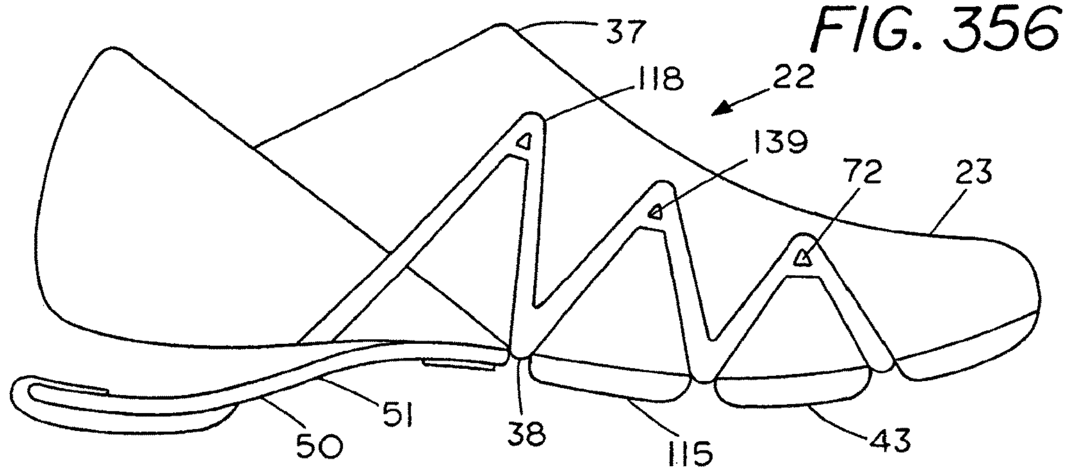

FIG. 356 is side view of an article of footwear including a removable strap having openings and eyestays.

Figure 357:
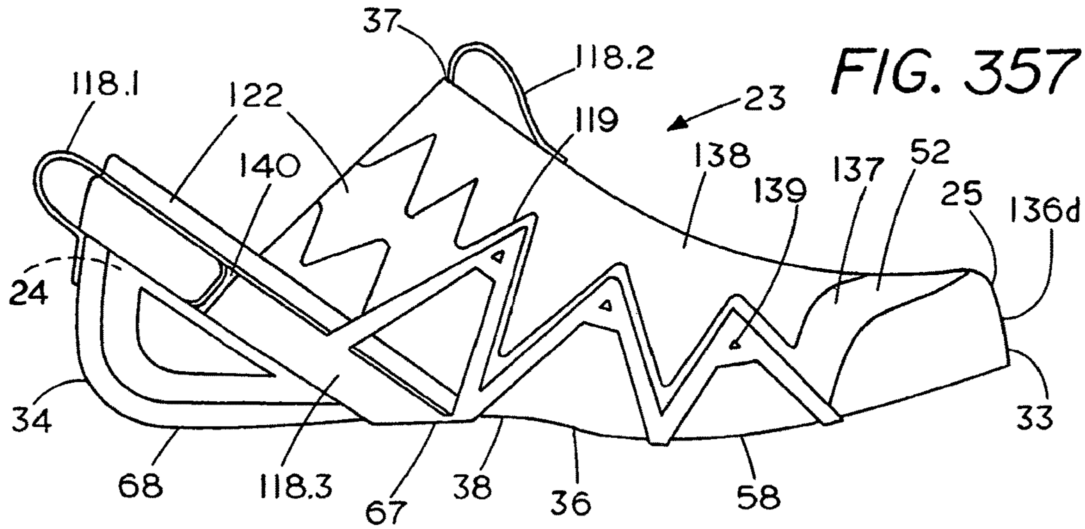

FIG. 357 is a side view of an article of footwear including an alternate removable strap including VELCRO® hook and pile.

Figure 358:
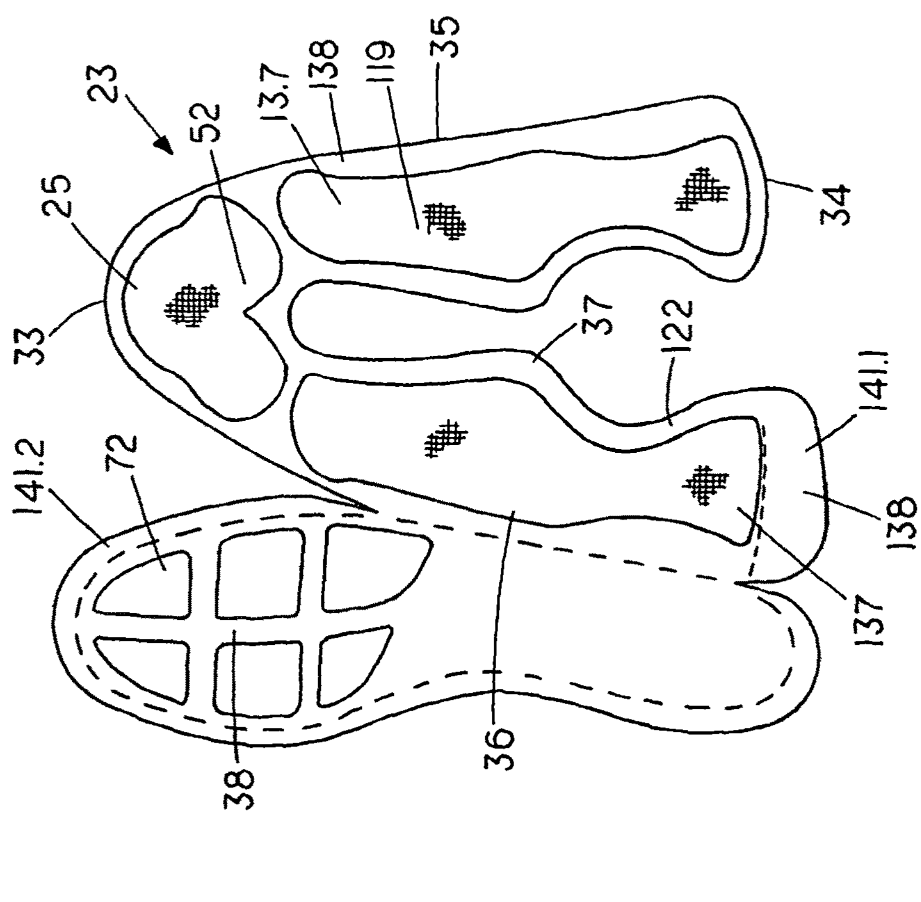

FIG. 358 is a top plan view of a pattern for an upper of an article of footwear that is substantially formed in a single part.

Figure 359:
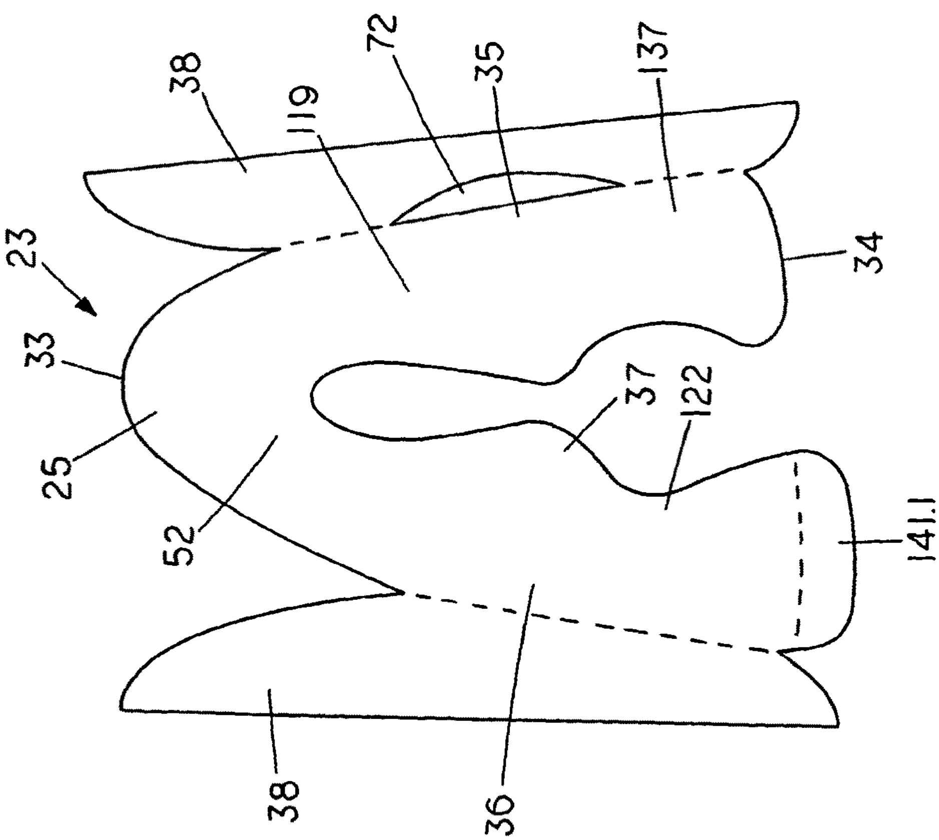

FIG. 359 is a top plan view of an alternate pattern for an upper of an article of footwear that is substantially formed in a single part.

Figure 360:
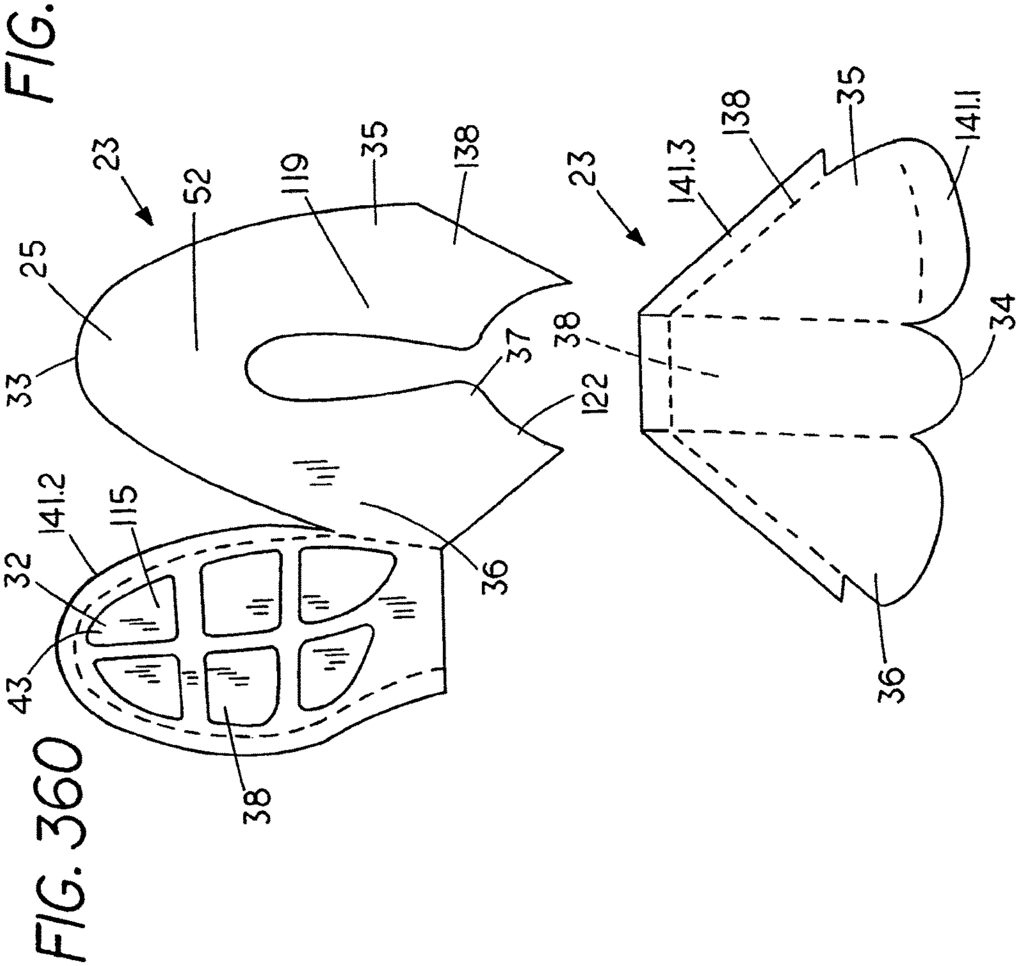

FIG. 360 is a top plan view of an alternate pattern for an upper of an article of footwear that is substantially formed in two parts.

Figure 361:
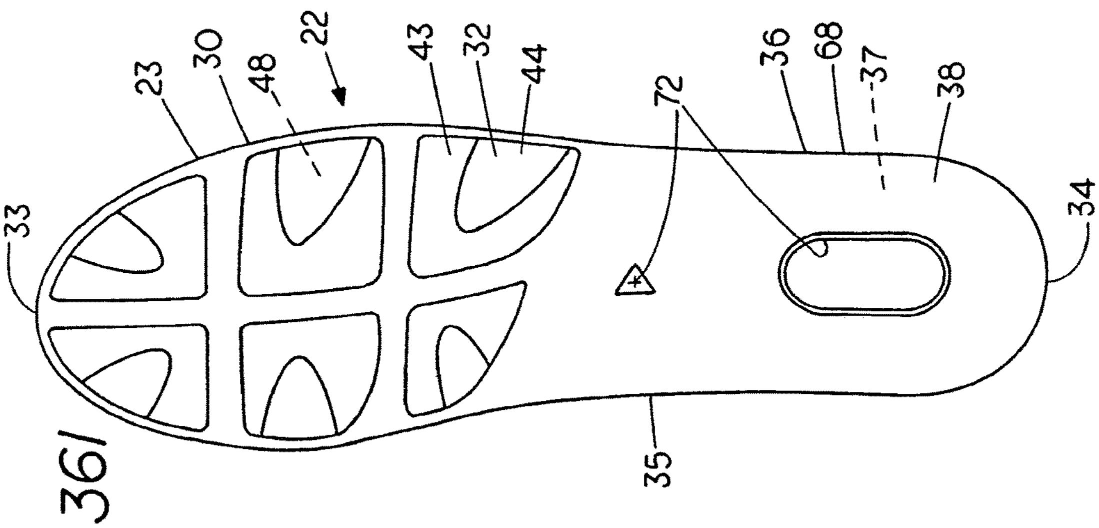

FIG. 361 is a bottom plan view of an upper of an article of footwear having an opening in the rearfoot area.

Figure 362:
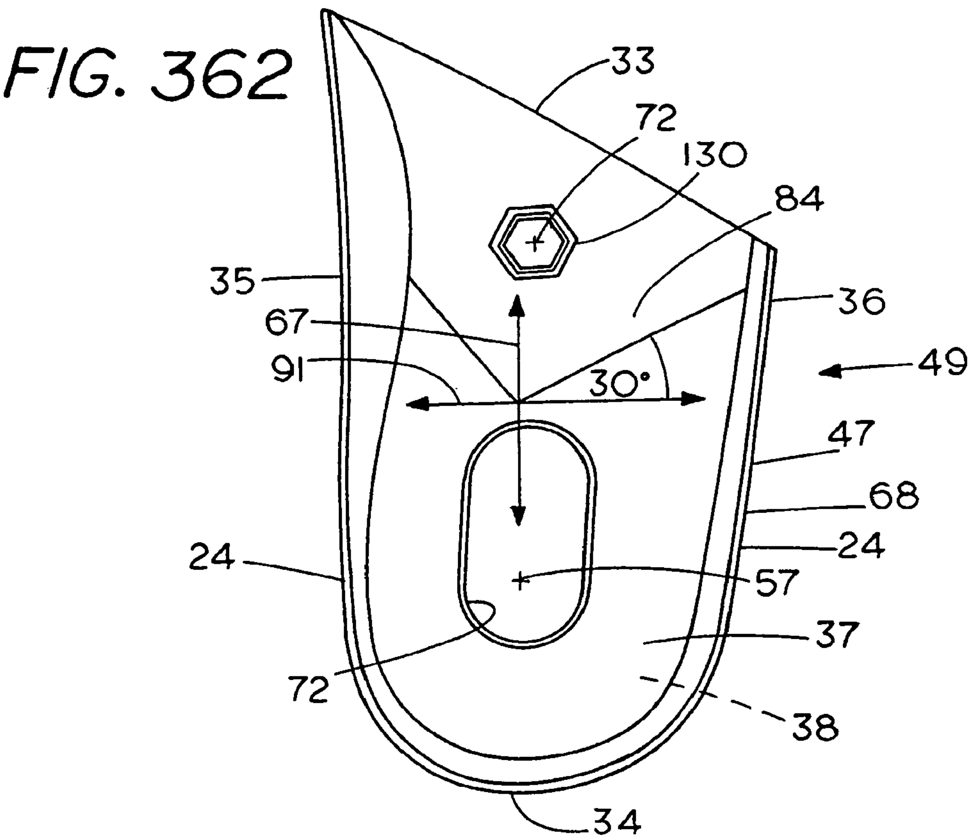

FIG. 362 is a top plan view of a posterior spring element having an opening in the rearfoot area.

Figure 363:
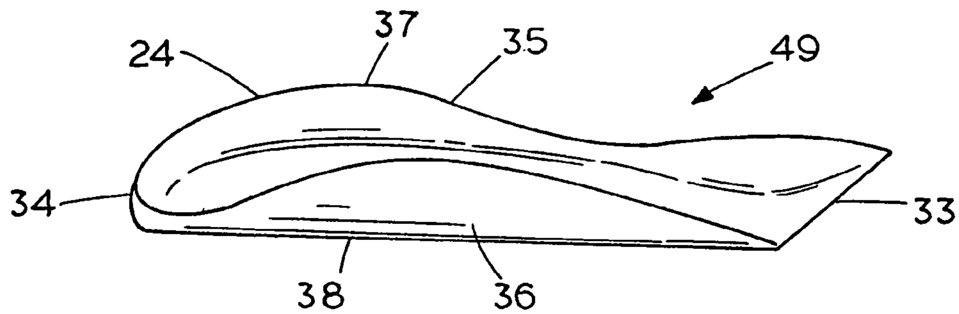

FIG. 363 is a side perspective view of a posterior spring element having a three dimensional shape including a relatively low profile cupped shape about the medial, lateral, and posterior sides.

Figure 364:
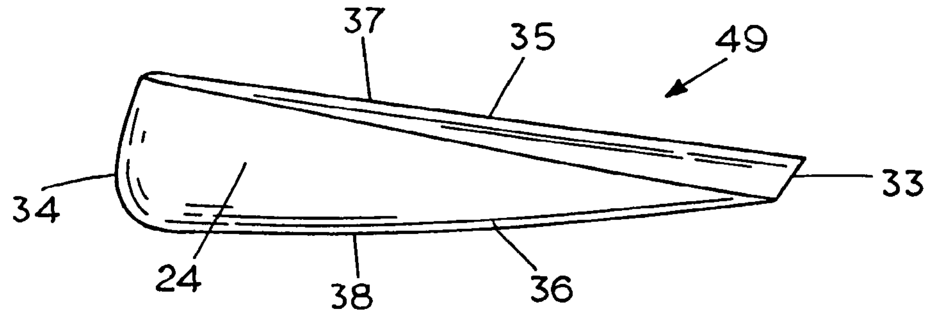

FIG. 364 is a side perspective view of a posterior spring element having a three dimensional shape including a heel counter having a relatively high profile about the medial, lateral, and posterior sides.

Figure 365:
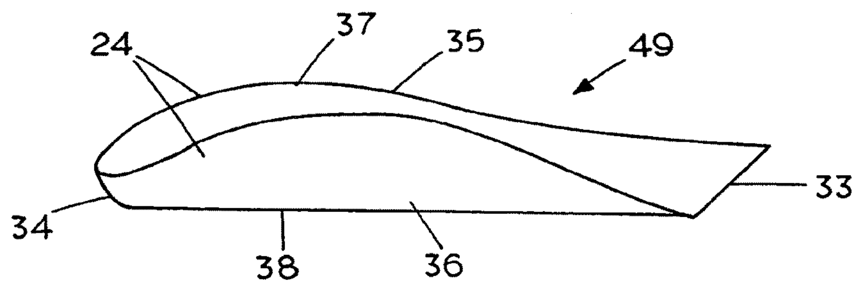

FIG. 365 is a side perspective view of a posterior spring element having a three dimensional shape including two generally opposing heel counters having a relatively high profile on the medial and lateral sides, and a relatively low profile cupped shape about the posterior side.

Figure 366:
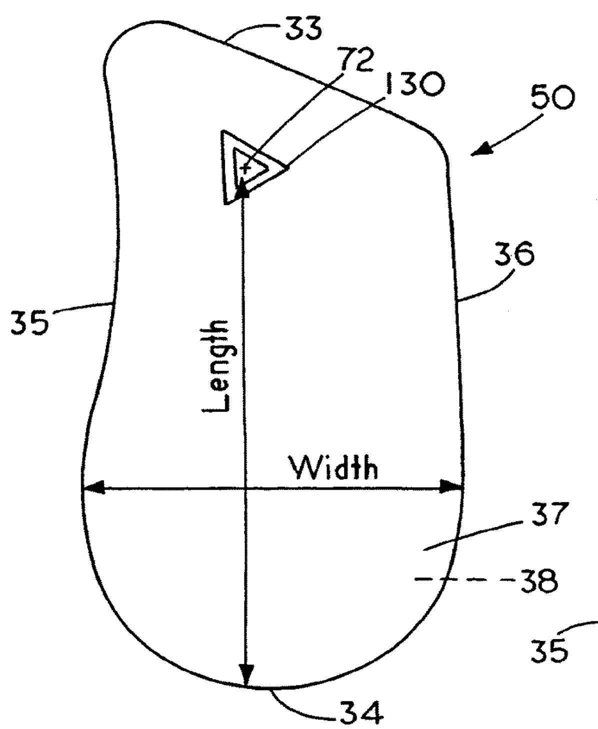

FIG. 366 is a top plan view of an inferior spring element showing a position associated with a width measurement and also another position associated with a length measurement.

Figure 367:
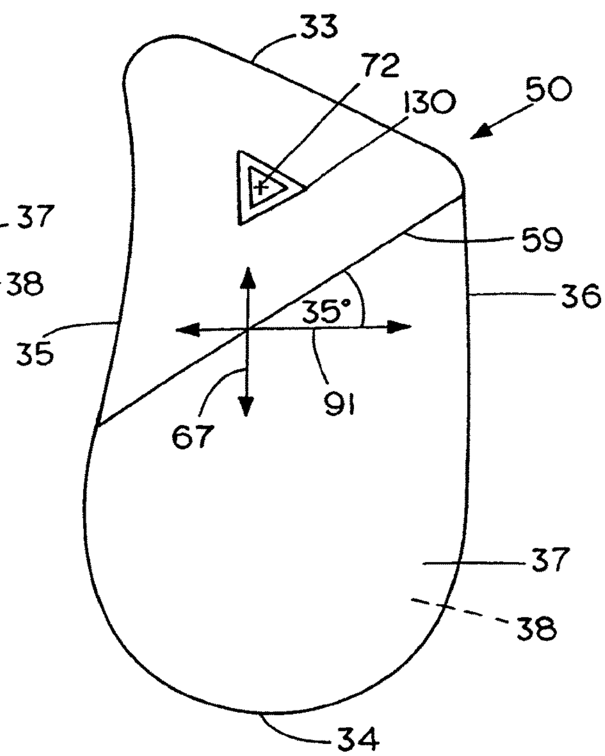

FIG. 367 is a top plan view of an inferior spring element showing a flexural axis orientated at approximately 35 degrees from the transverse axis for possible use by a wearer characterized as having a relatively neutral or normal rearfoot motion.

Figure 368:
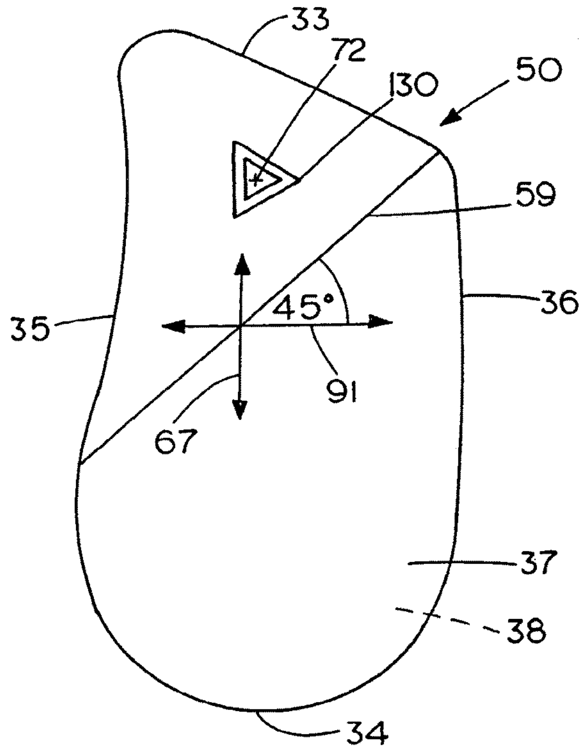

FIG. 368 is a top plan view of an inferior spring element showing a flexural axis orientated at approximately 45 degrees from the transverse axis for possible use by a wearer having a rearfoot motion characterized by substantial pronation.

Figure 369:
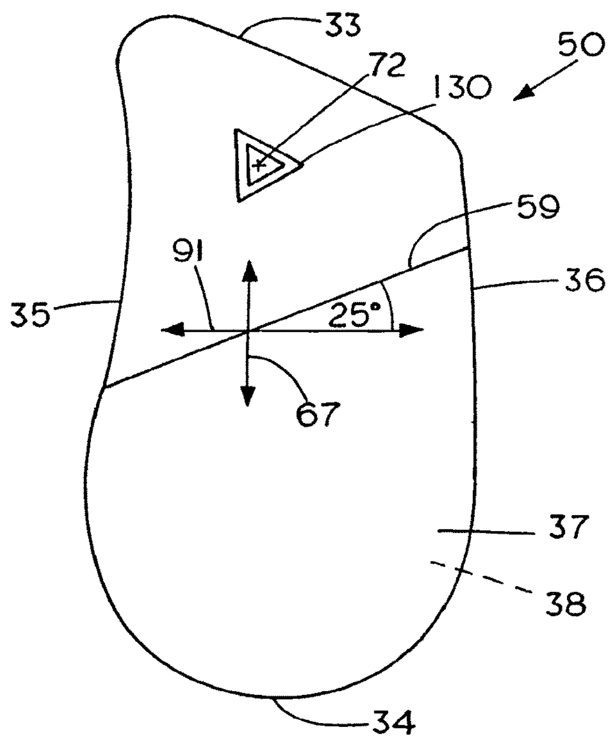

FIG. 369 is a top plan view of an inferior spring element showing a flexural axis orientated at approximately 25 degrees from the transverse axis for possible use by a wearer having a rearfoot motion characterized by substantial supination.

Figure 370:
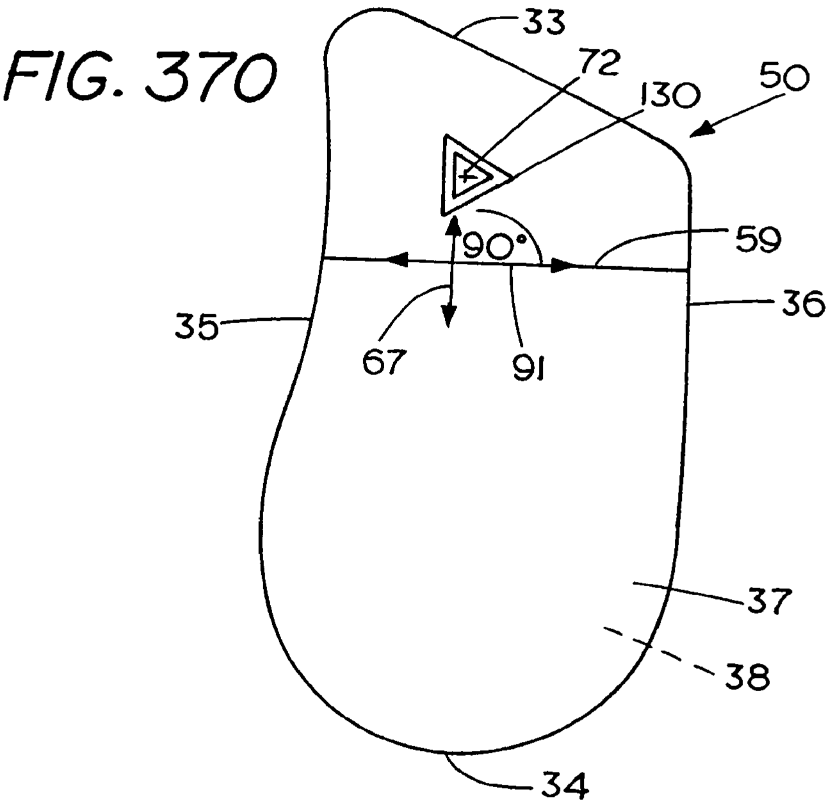

FIG. 370 is a top plan view of an inferior spring element showing a flexural axis orientated at approximately 90 degrees from the longitudinal axis, thus generally consistent with the transverse axis.

Figure 371:
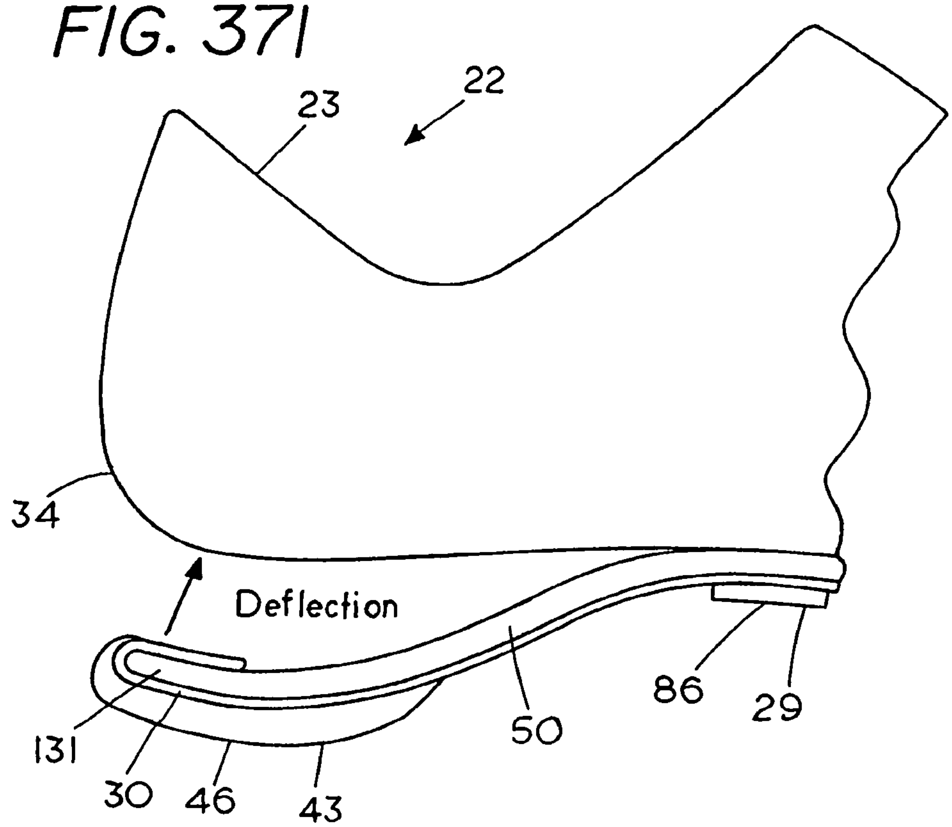

FIG. 371 is a side view of an inferior spring element affixed in functional relation to an article of footwear showing possible deflection of the inferior spring element with an arrow, and also an associated table for selecting a desired amount of deflection.

Figure 372:
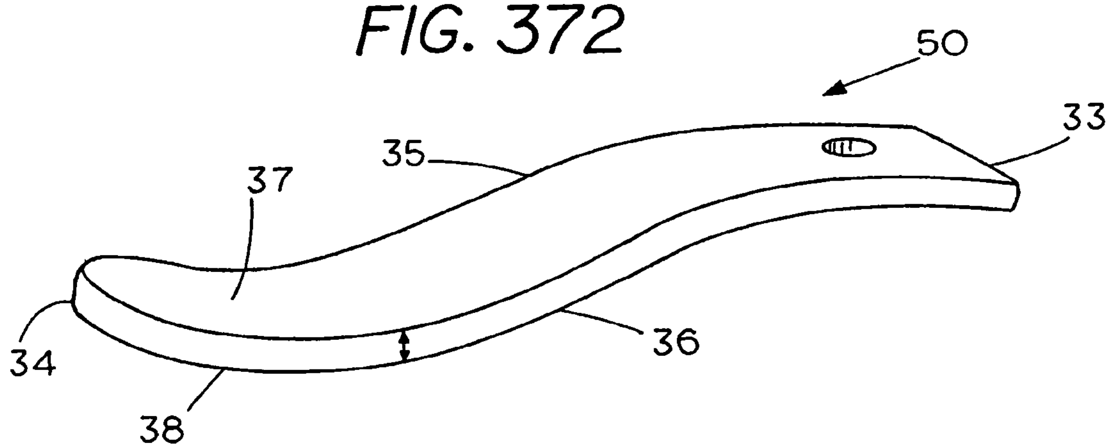

FIG. 372 is a side view of an inferior spring element showing the thickness of the inferior spring element with an arrow, and also an associated table for selecting a desired thickness/stiffness.

Figure 373:
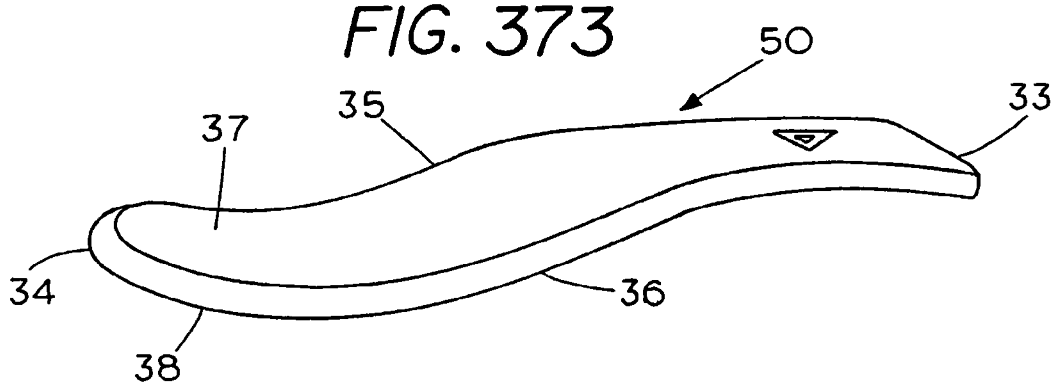

FIG. 373 is a side perspective view of an inferior spring element having an asymmetrical curvature on the medial side versus the lateral side.

Figure 374:
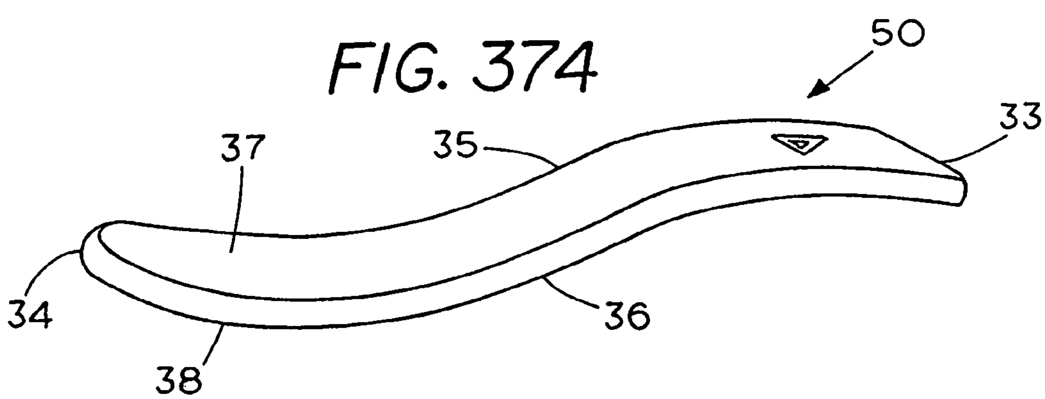

FIG. 374 is a side perspective view of an inferior spring element having a symmetrical curvature on the medial side and the lateral side.

Figure 375:
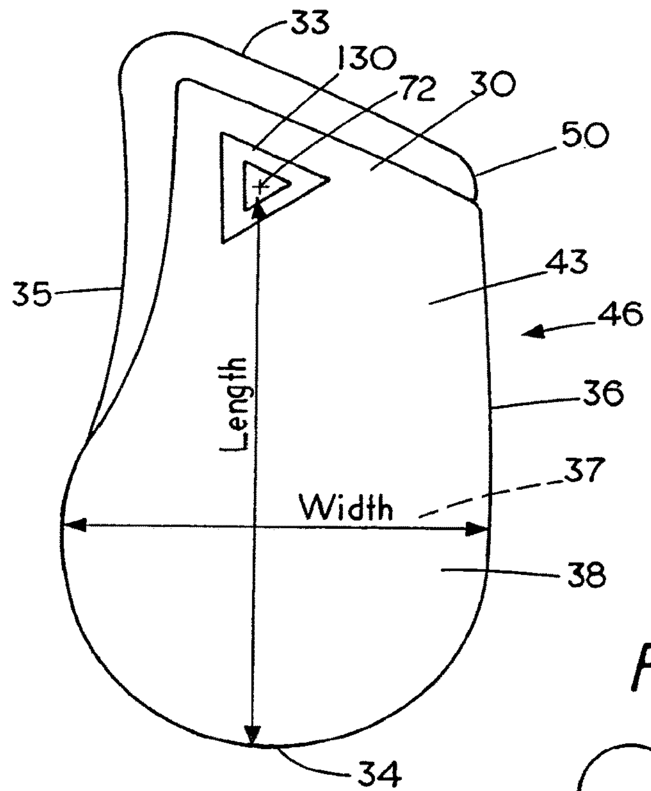

FIG. 375 is a bottom plan view of a posterior outsole element mounted on an inferior spring element showing a position associated with a width measurement and also another position associated with a length measurement.

Figure 376:
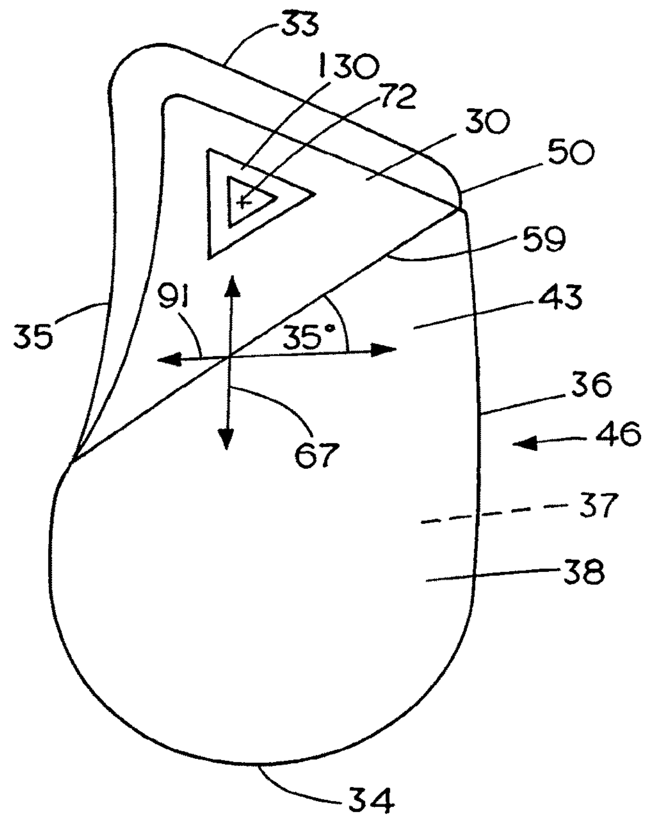

FIG. 376 is a bottom plan view of a posterior outsole element mounted on an inferior spring element having a flexural axis oriented at approximately 35 degrees from the transverse axis similar to that shown in FIG. 367.

Figure 377:
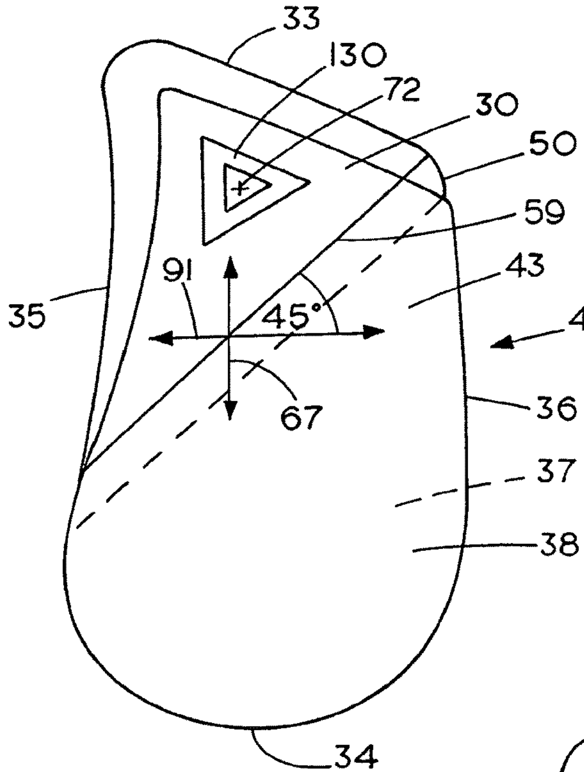

FIG. 377 is a bottom plan view of a posterior outsole element mounted on an inferior spring element having a flexural axis oriented at approximately 45 degrees from the transverse axis similar to that shown in FIG. 368.

Figure 378:
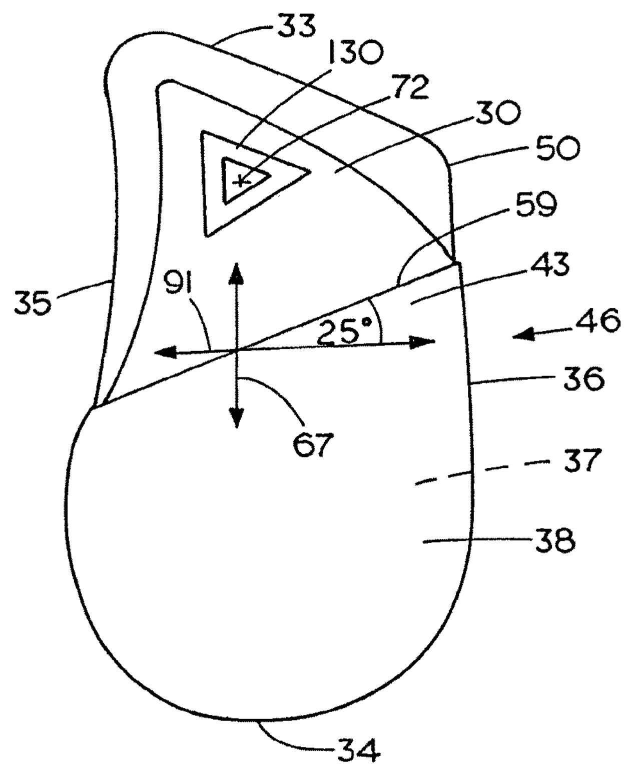

FIG. 378 is a bottom plan view of a posterior outsole element mounted on an inferior spring element having a flexural axis oriented at approximately 25 degrees from the transverse axis similar to that shown in FIG. 369.

Figure 379:
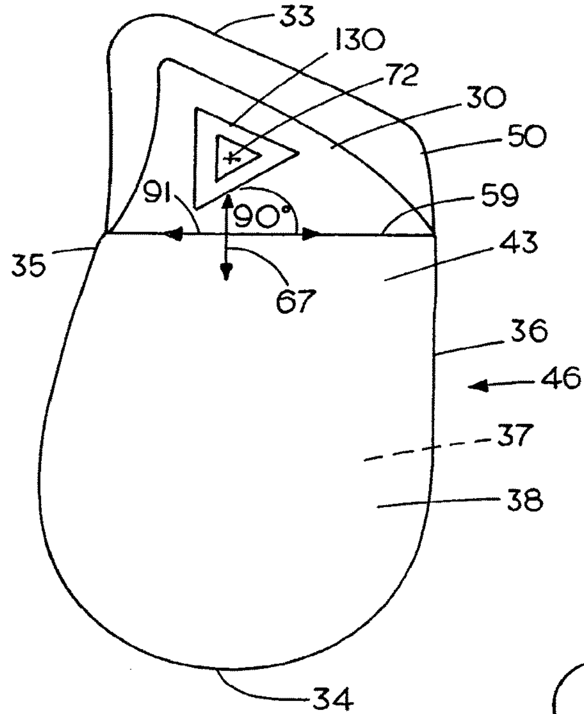

FIG. 379 is a bottom plan view of a posterior outsole element mounted on an inferior spring element having a flexural axis oriented at approximately 90 degrees from the transverse axis similar to that shown in FIG. 370.

Figure 380:
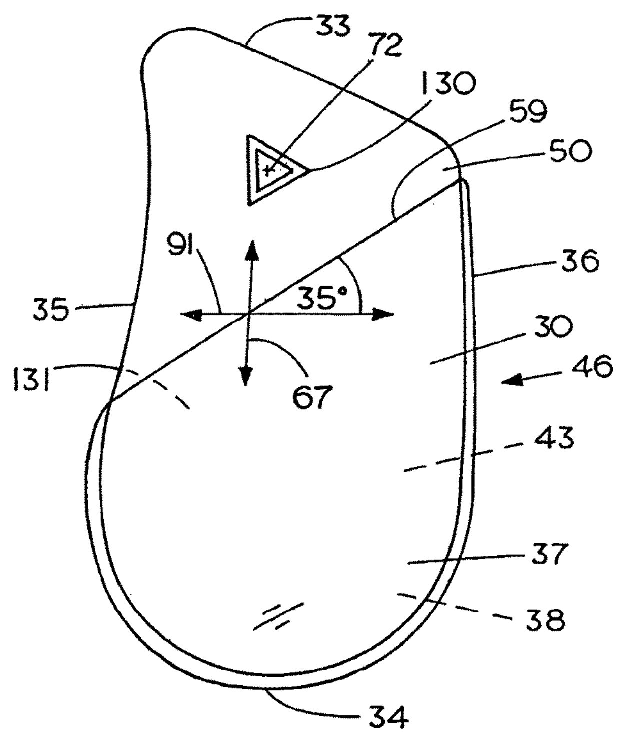

FIG. 380 is a top plan view of a posterior outsole element mounted on an inferior spring element having a flexural axis oriented at approximately 35 degrees from the transverse axis similar to that shown in FIG. 367.

Figure 381:
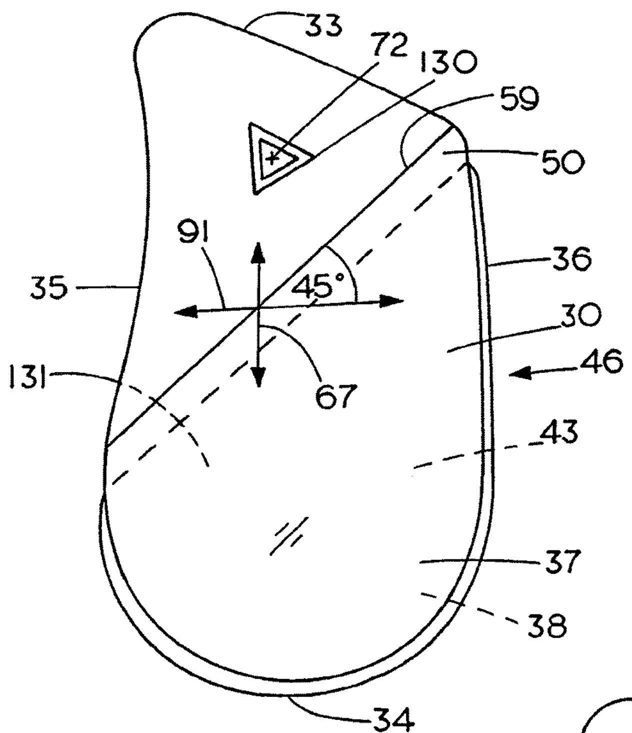

FIG. 381 is a top plan view of a posterior outsole element mounted on an inferior spring element having a flexural axis oriented at approximately 45 degrees from the transverse axis similar to that shown in FIG. 368.

Figure 382:
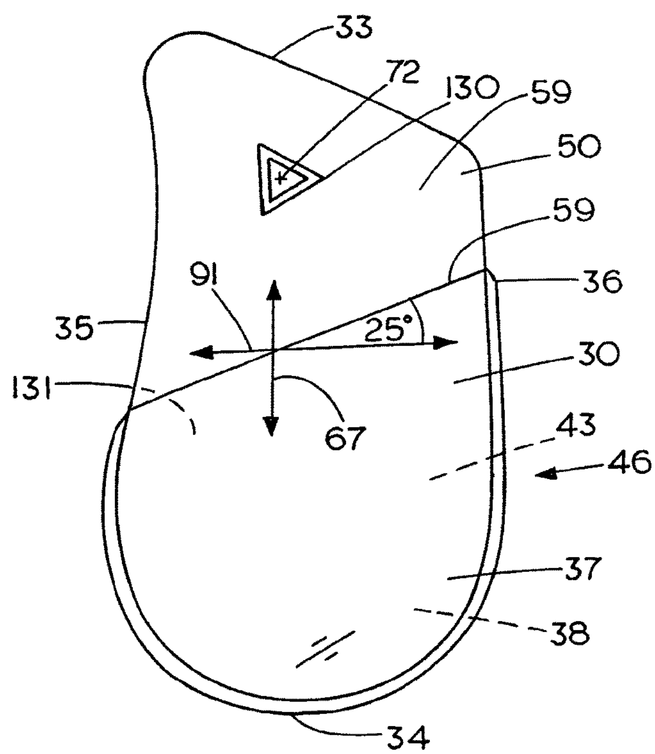

FIG. 382 is a top plan view of a posterior outsole element mounted on an inferior spring element having a flexural axis oriented at approximately 25 degrees from the transverse axis similar to that shown in FIG. 369.

Figure 383:
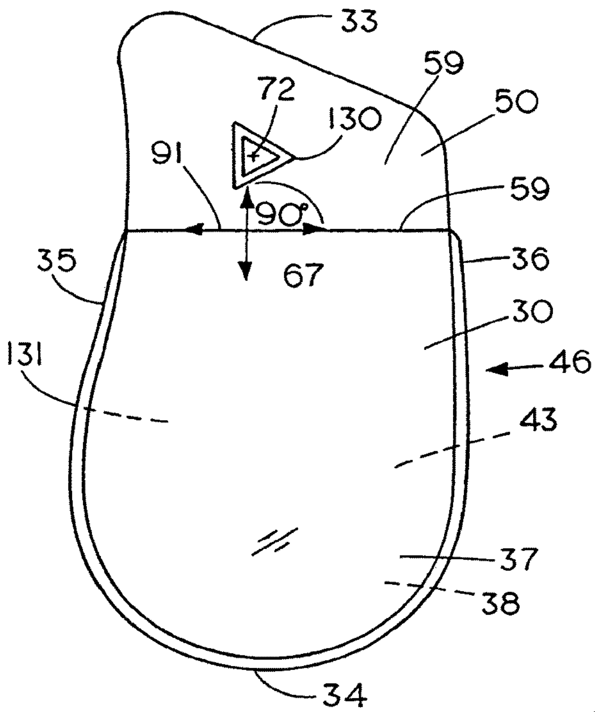

FIG. 383 is a top plan view of a posterior outsole element mounted on an inferior spring element having a flexural axis oriented at approximately 90 degrees, thus generally consistent with the transverse axis, and similar to the embodiment shown in FIG. 370.

Figure 384:
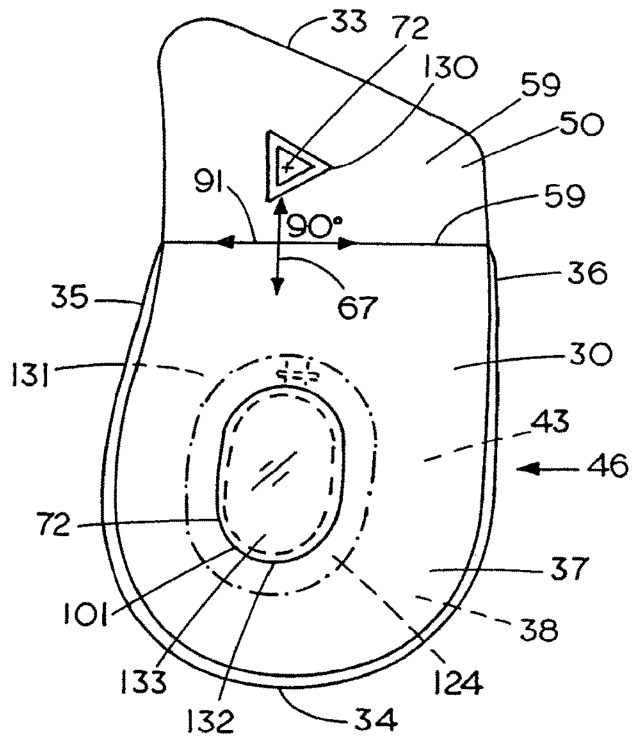

FIG. 384 is a top plan view of a posterior outsole element including an opening for accommodating a fluid-filled bladder.

Figure 385:
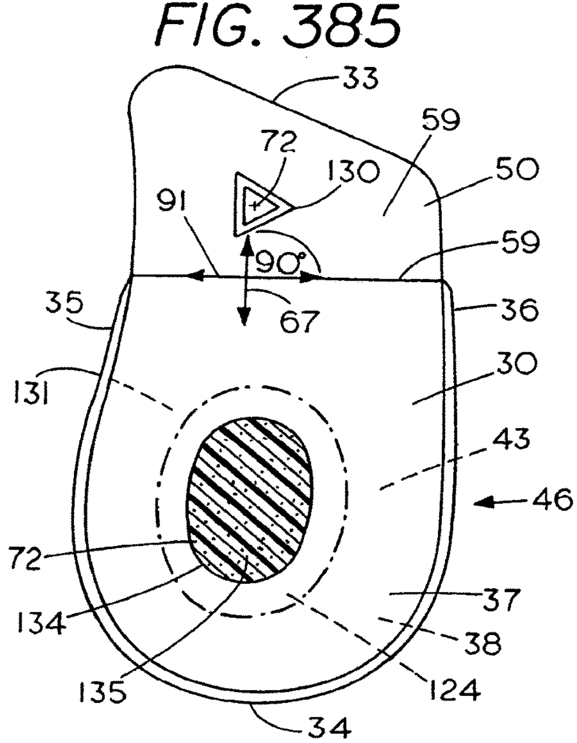

FIG. 385 is a top plan view of a posterior outsole element including an opening for accommodating a foam cushioning element.

Figure 386:
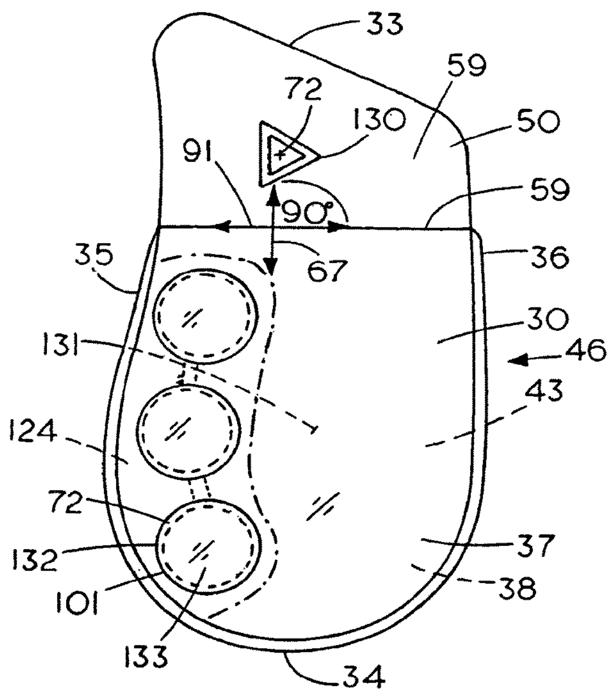

FIG. 386 is a top plan view of a posterior outsole element including a plurality of openings for accommodating a fluid-filled bladder.

Figure 387:
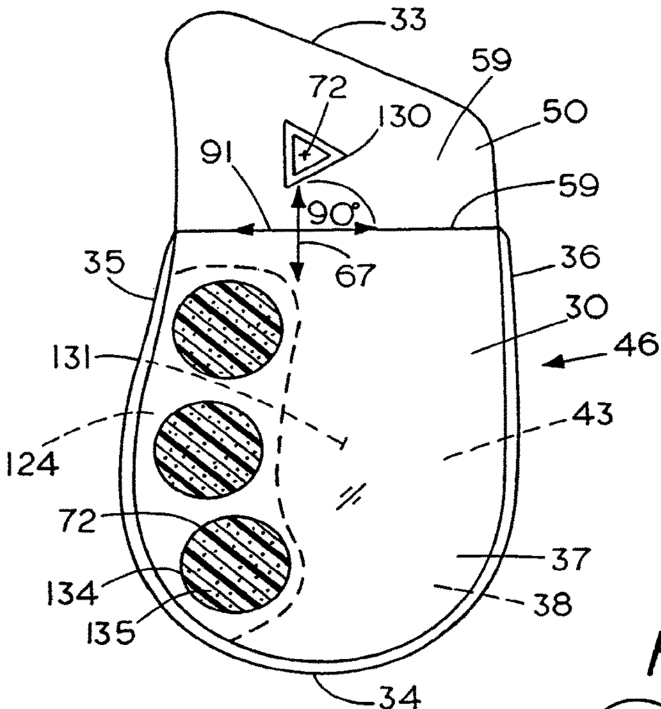

FIG. 387 is a top plan view of a posterior outsole element including a plurality of openings for accommodating a foam cushioning element.

Figure 388:
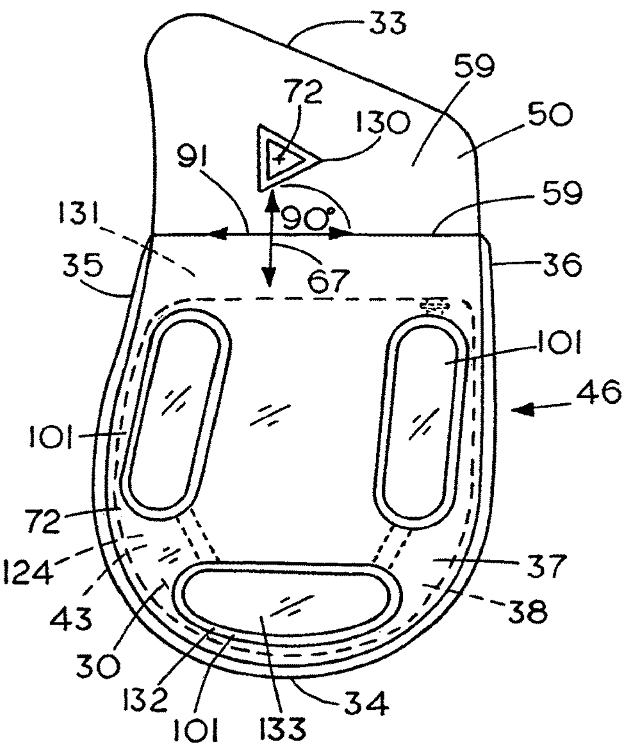

FIG. 388 is a top plan view of a posterior outsole element including a plurality of openings for accommodating a fluid-filled bladder.

Figure 389:
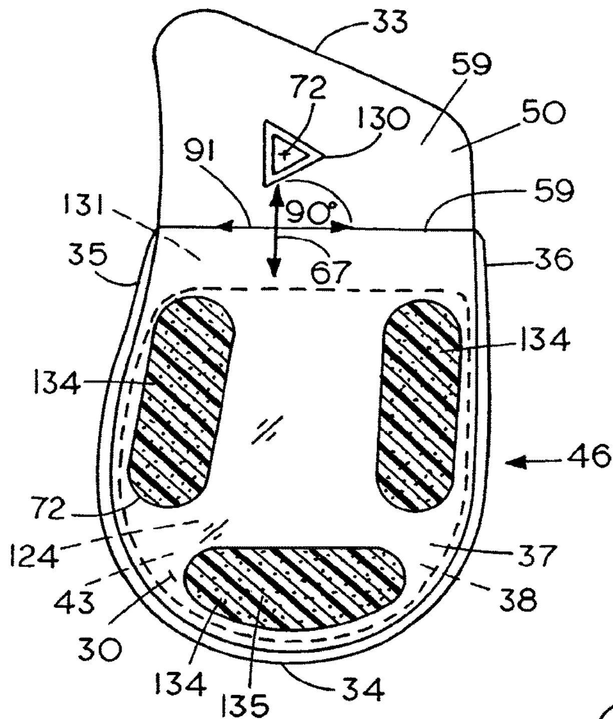

FIG. 389 is a top plan view of a posterior outsole element including a plurality of openings for accommodating a foam cushioning element.

Figure 390:
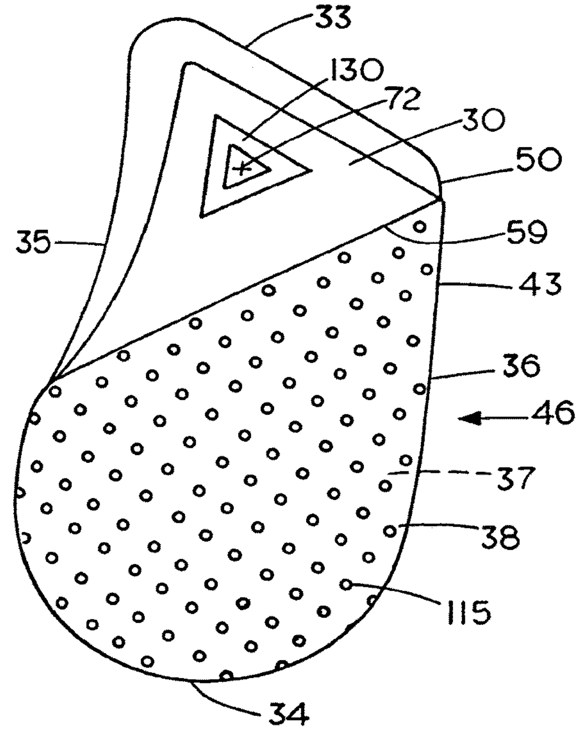

FIG. 390 is a bottom plan view of a posterior outsole element including a plurality of traction members.

Figure 391:
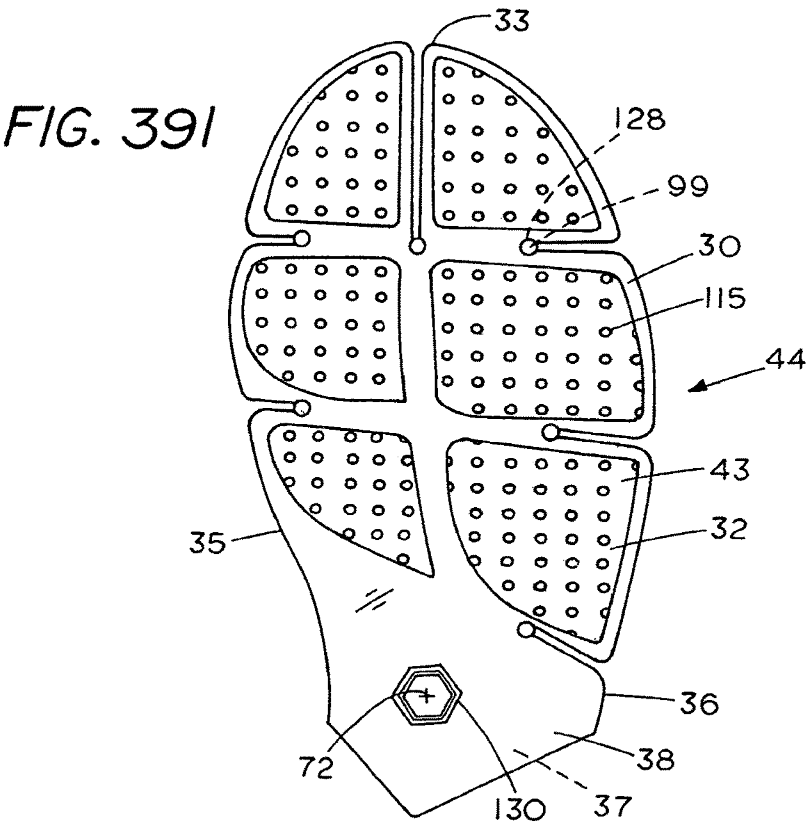

FIG. 391 is a bottom plan view of an anterior outsole element including a plurality of traction members.

Figure 392:
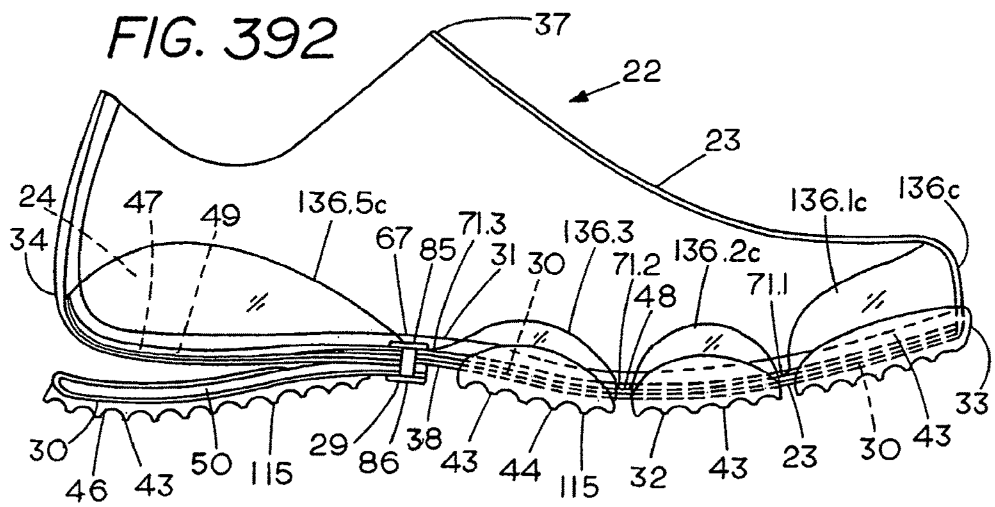

FIG. 392 is a side view of an article of footwear including a posterior outsole element and also an anterior outsole element including a plurality of traction members generally similar to those shown in FIGS. 390-391.

Figure 393:
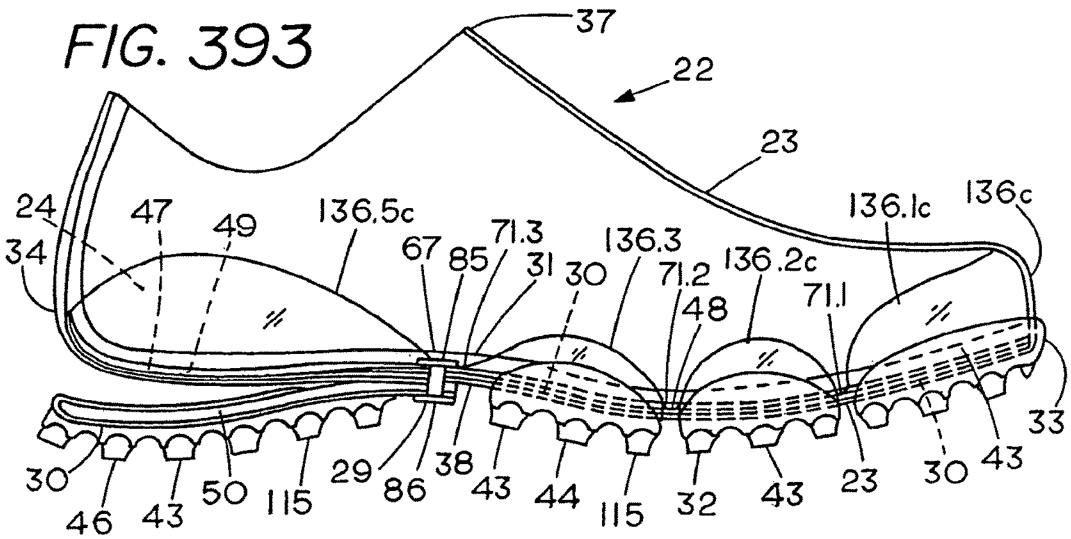

FIG. 393 is a side view of an article of footwear including a posterior outsole element and also an anterior outsole element including a plurality of traction members having greater height than those shown in FIGS. 390-392.

Figure 394:
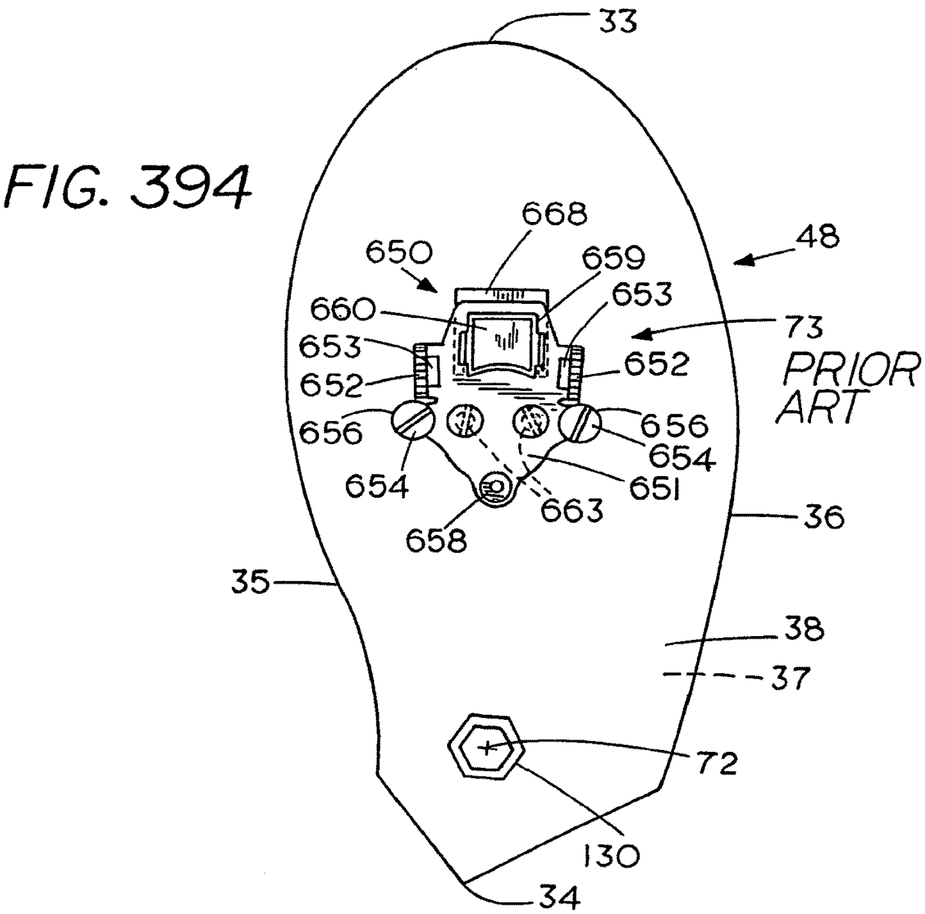

FIG. 394 is a bottom plan view of an anterior spring element with no flex notches, but including a bicycle cleat system.

Figure 395:
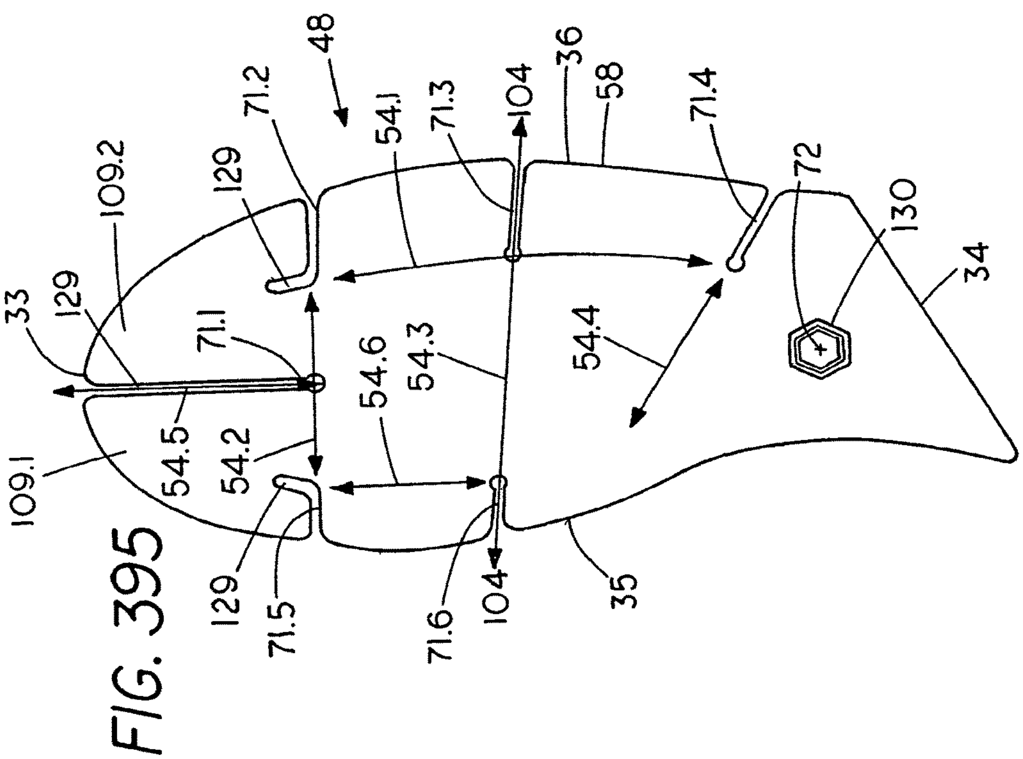

FIG. 395 is a top plan view of an anterior spring element generally similar to that shown in FIG. 316, but having two flex notches with a slightly different configuration.

Figure 396:
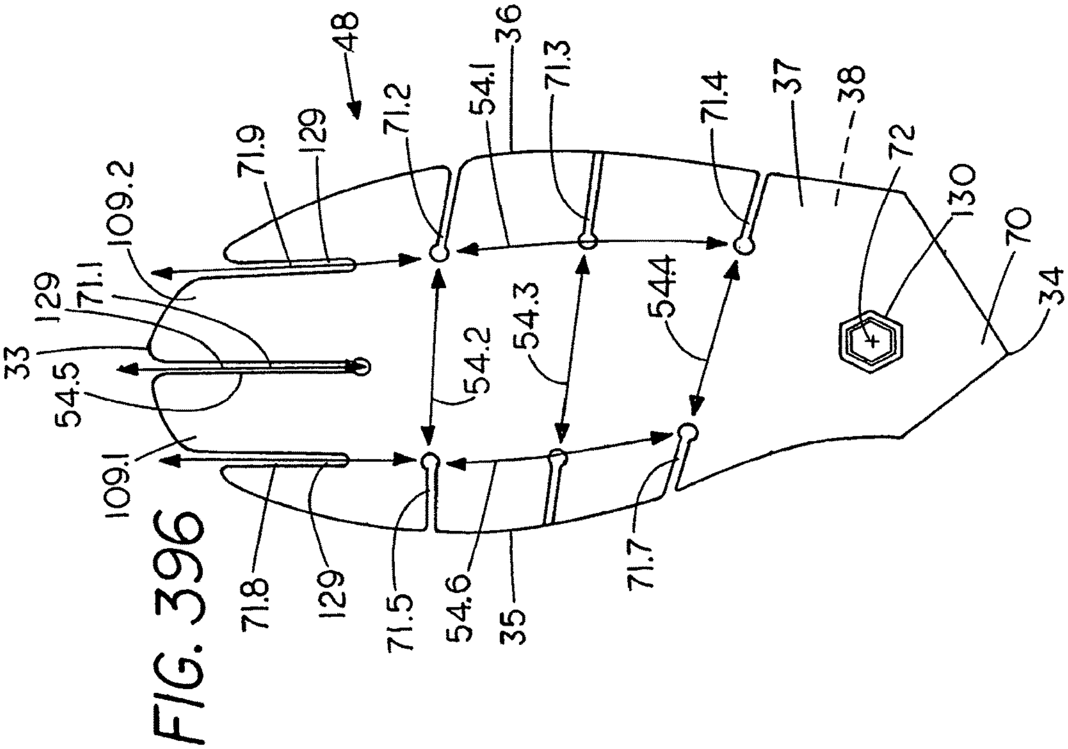

FIG. 396 is a top plan view of an anterior spring element generally similar to that shown in FIG. 316, but including a greater number of flex notches.

Figure 397:
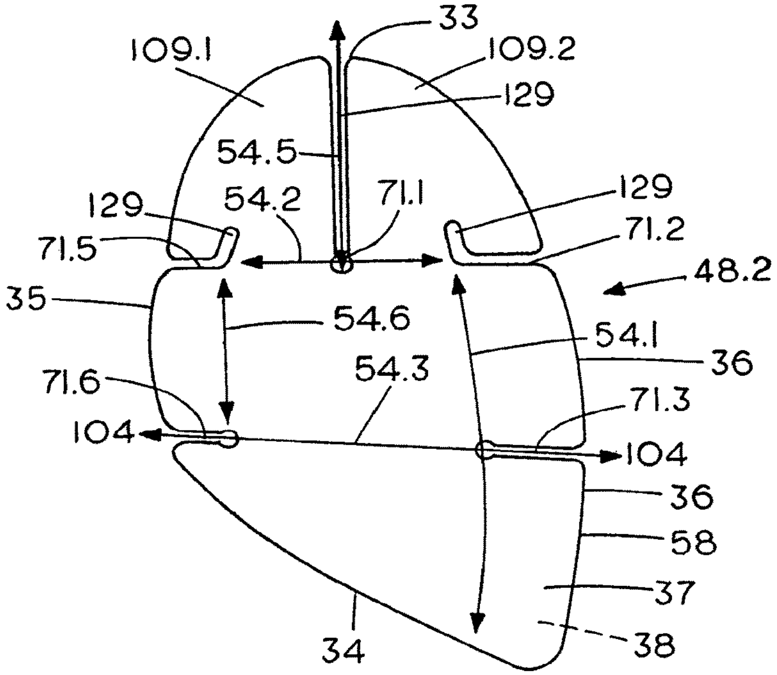

FIG. 397 is a top plan view of an inferior anterior spring element including longitudinal and transverse flex notches.

Figure 398:
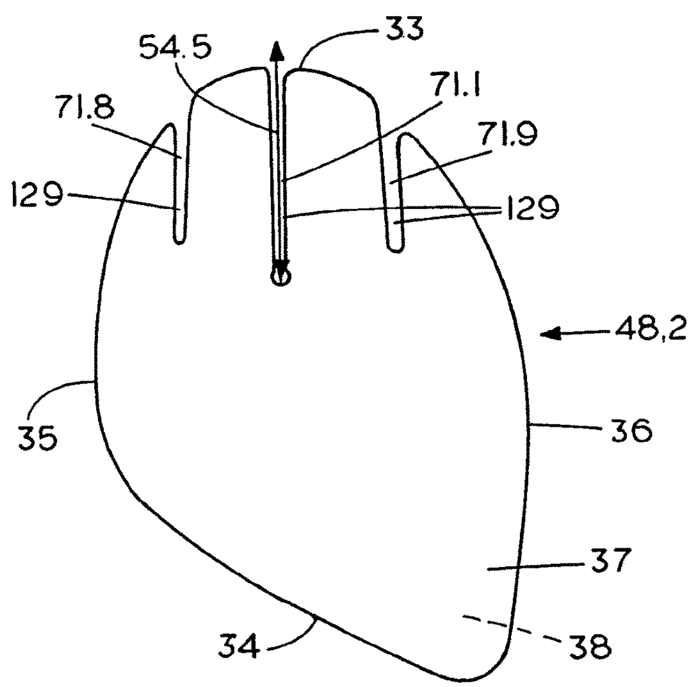

FIG. 398 is a top plan view of an inferior anterior spring element including longitudinal flex notches.

Figure 399:
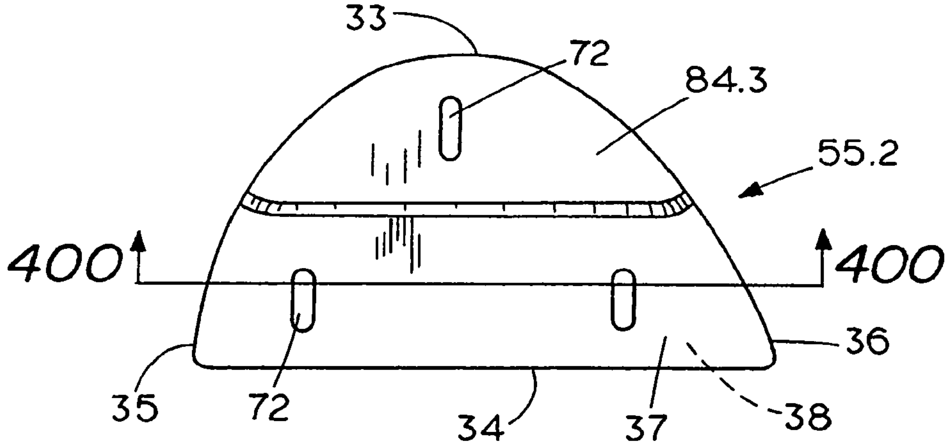

FIG. 399 is a top plan view of an anterior spacer for use between an anterior spring element and an inferior anterior spring element similar to that shown in FIG. 342.

Figure 400:
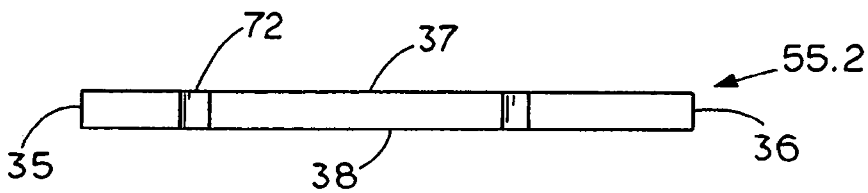

FIG. 400 is a cross-sectional view taken along line 400-400 of the anterior spacer shown in FIG. 399 having a generally planar configuration.

Figure 401:
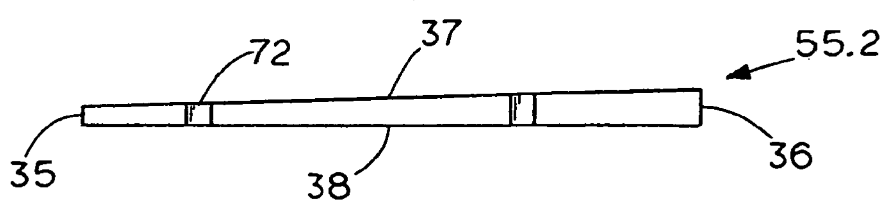

FIG. 401 is a cross-sectional view taken along a line similar to line 400-400 shown in FIG. 399 of an alternate anterior spacer having a inclined configuration.

Figure 402:
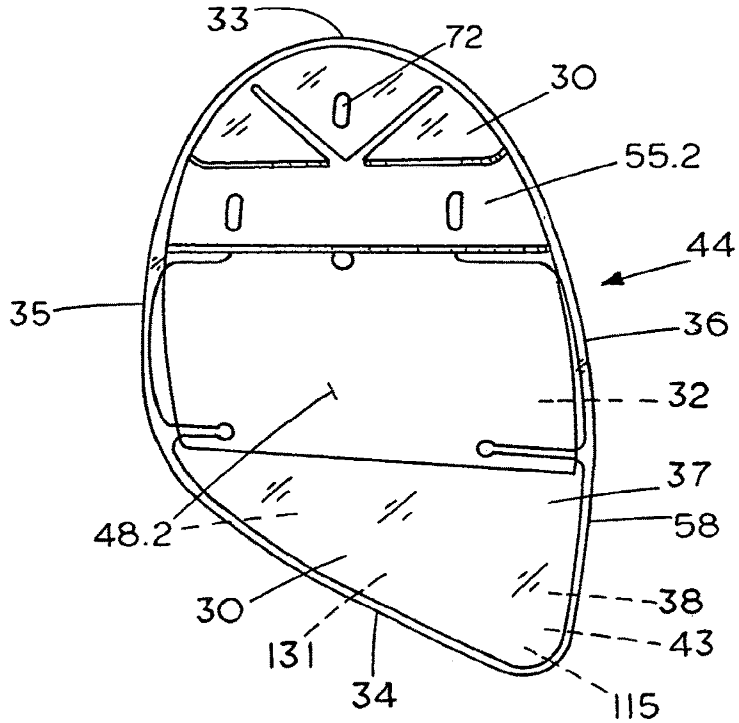

FIG. 402 is a top plan view of an inferior anterior spring element generally similar to that shown in FIG. 397 at least partially positioned below an anterior spacer generally similar to that shown in FIG. 399, and the inferior anterior spring element is also at least partially contained within an anterior outsole element.

Figure 403:
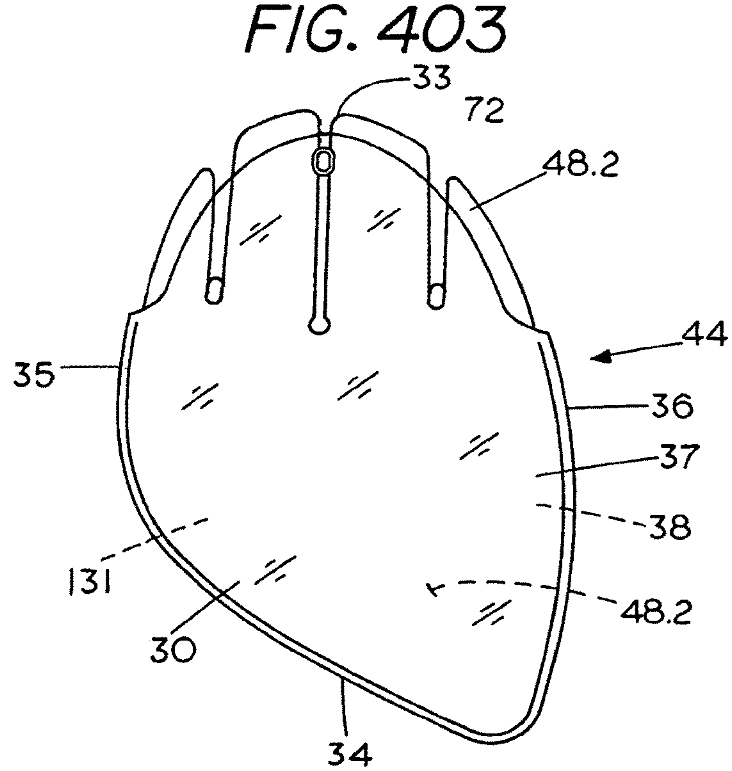

FIG. 403 is a top plan view of an inferior anterior spring element generally similar to that shown in FIG. 398 substantially positioned within an anterior outsole element.

Figure 404:
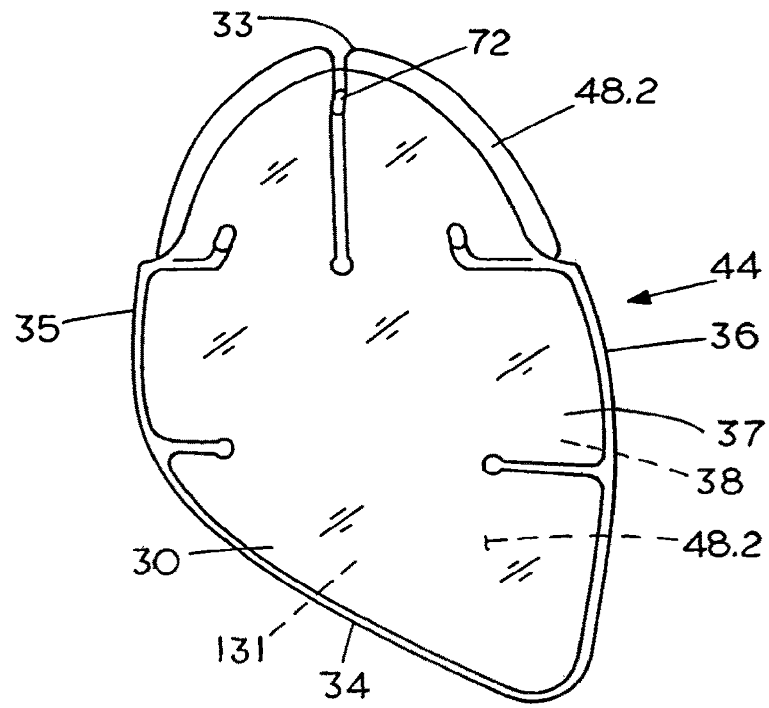

FIG. 404 is a top plan view of an inferior anterior spring element generally similar to that shown in FIG. 397 substantially positioned within an anterior outsole element.

Figure 405:
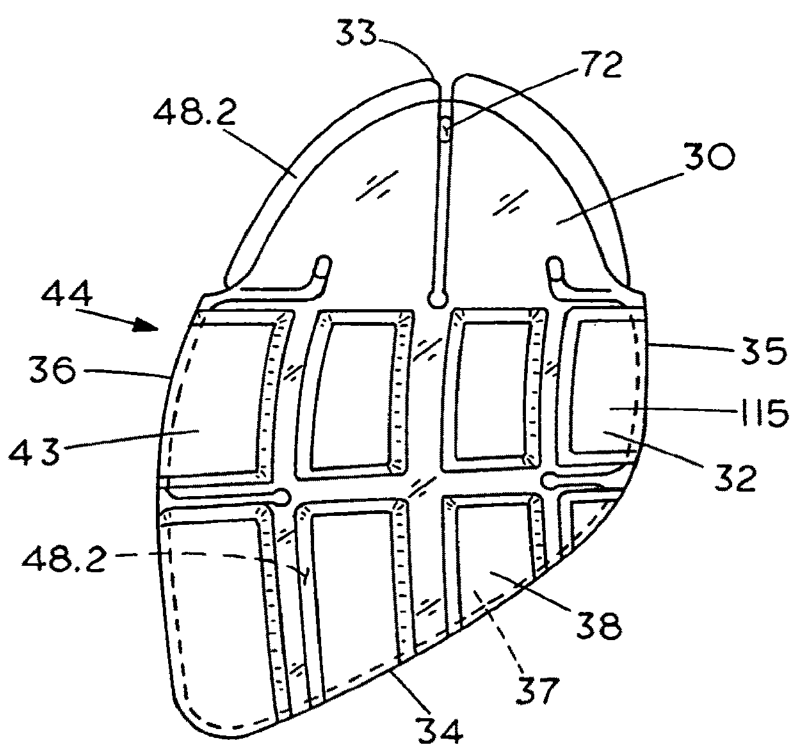

FIG. 405 is a bottom plan view of an inferior anterior spring element generally similar to that shown in FIG. 397 substantially positioned within an anterior outsole element.

Figure 406:
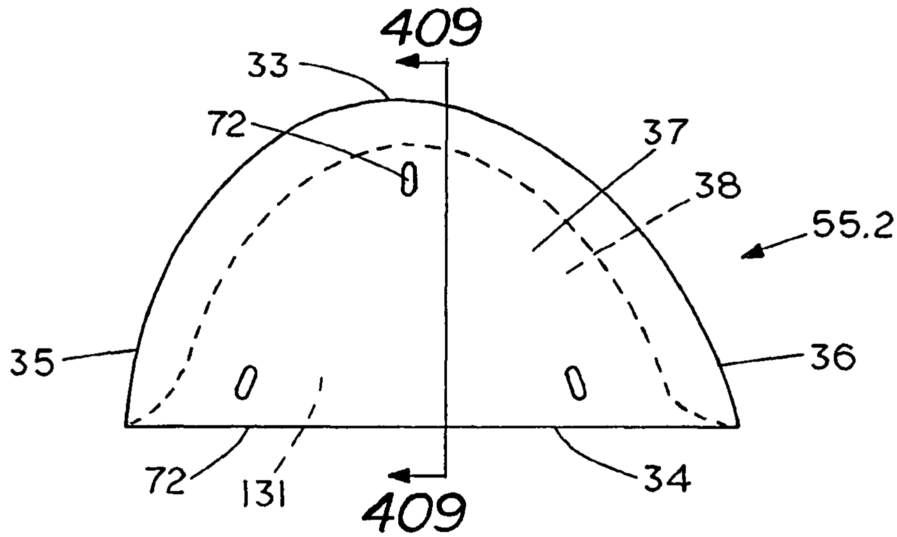

FIG. 406 is a top plan view of an alternate anterior spacer for use between an anterior spring element and an inferior anterior spring element.

Figure 407:
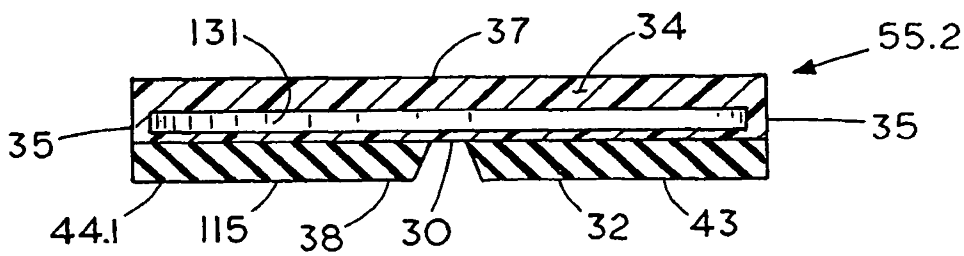

FIG. 407 is a posterior side view of the alternate anterior spacer shown in FIG. 406 for use between an anterior spring element and an inferior anterior spring element.

Figure 408:
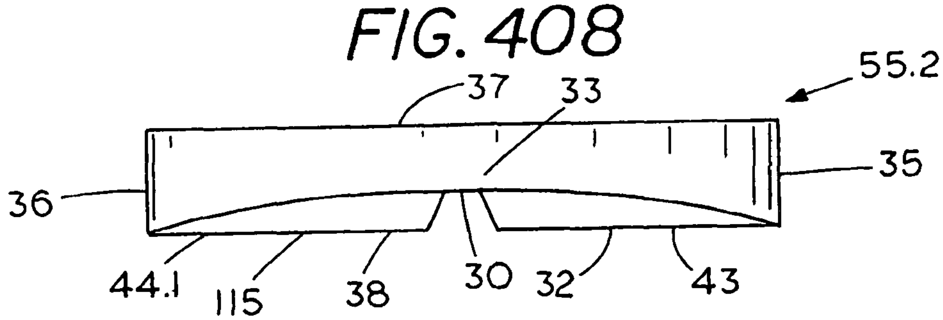

FIG. 408 is an anterior side view of the alternate anterior spacer for use between an anterior spring element and an inferior alternate spring element shown in FIG. 406.

Figure 409:
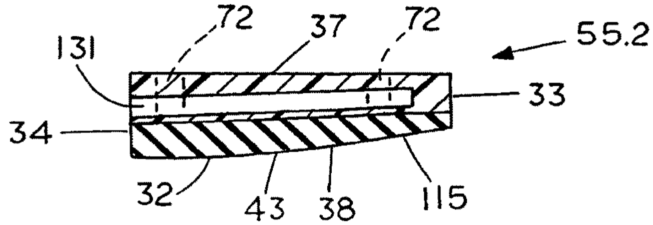

FIG. 409 is a side cross-sectional view taken along line 409-409 of the alternate anterior spacer for use between an anterior spring element and an inferior alternate spring element shown in FIG. 406.

Figure 410:
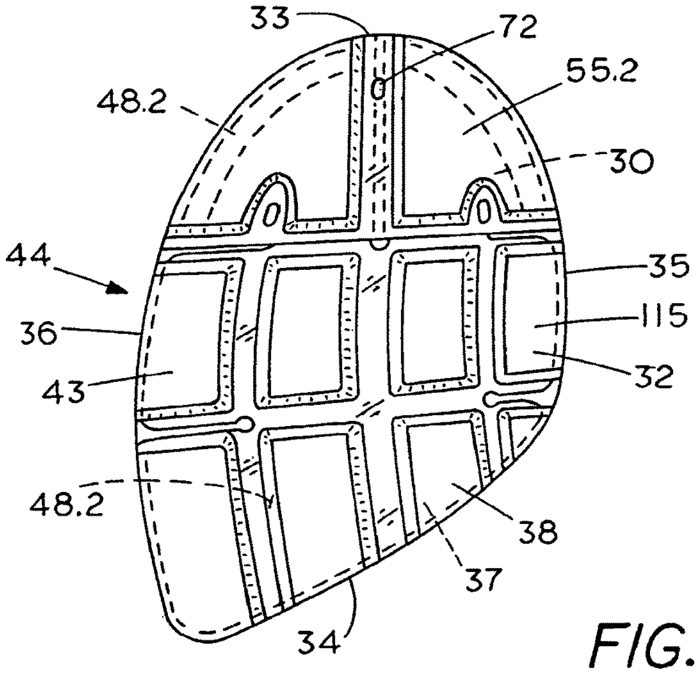

FIG. 410 is a bottom plan view of the inferior anterior spring element positioned within the anterior outsole element shown in FIG. 405, but also within the anterior spacer shown in FIGS. 406-409.

Figure 411:
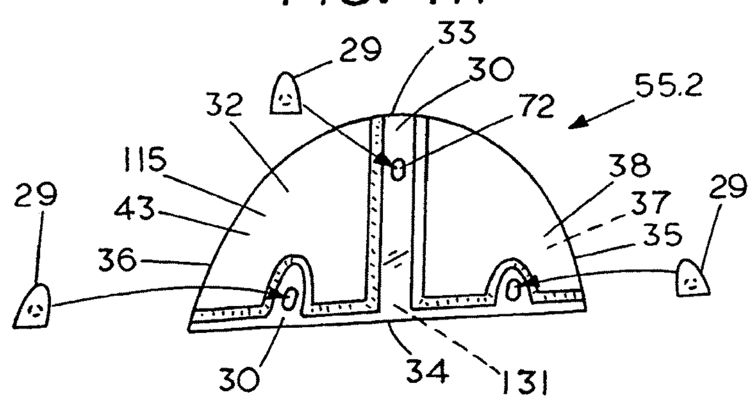

FIG. 411 is a bottom plan view of the anterior spacer shown in FIGS. 406-410, and also a plurality of fasteners having a semi-oval shape.

Figure 412:
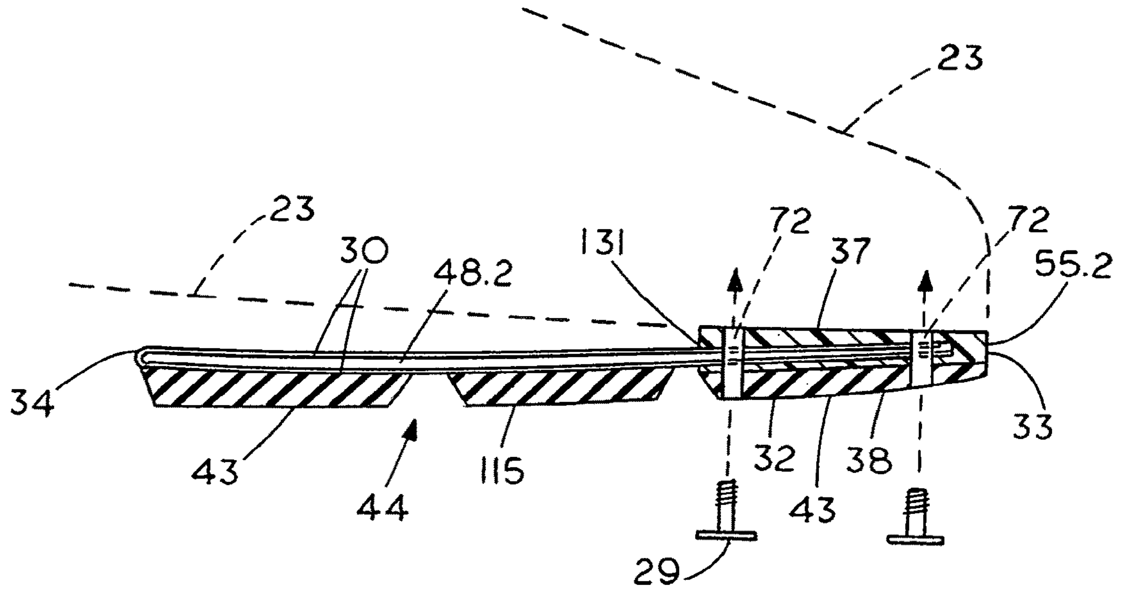

FIG. 412 is a longitudinal cross-sectional side view generally similar to that shown in FIG. 342 showing the inferior anterior spring element, anterior spacer, and anterior outsole element shown in FIGS. 404-411.

Figure 413:
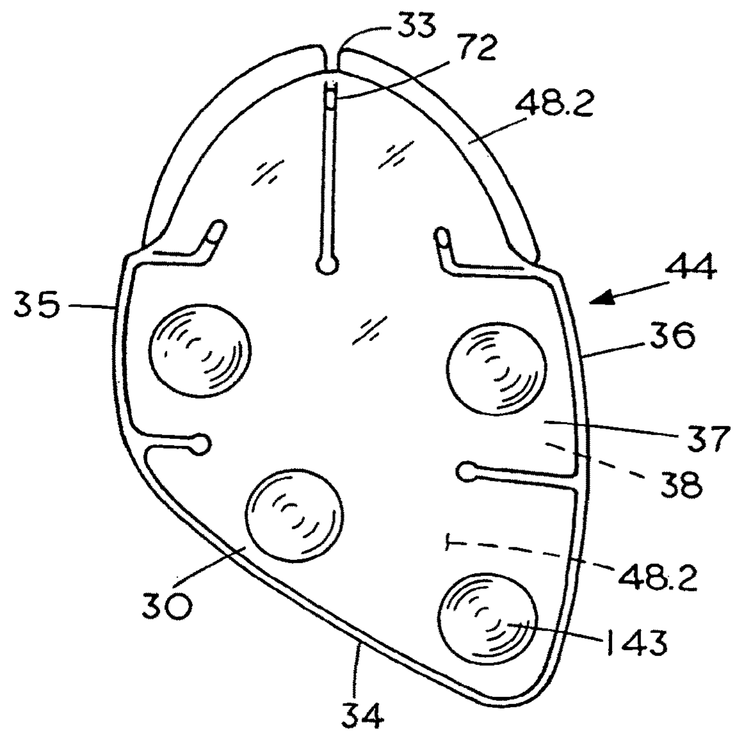

FIG. 413 is a top plan view of an inferior anterior spring element positioned within an anterior outsole element having a backing including a plurality of elevated semi-circular domes.

Figure 414:
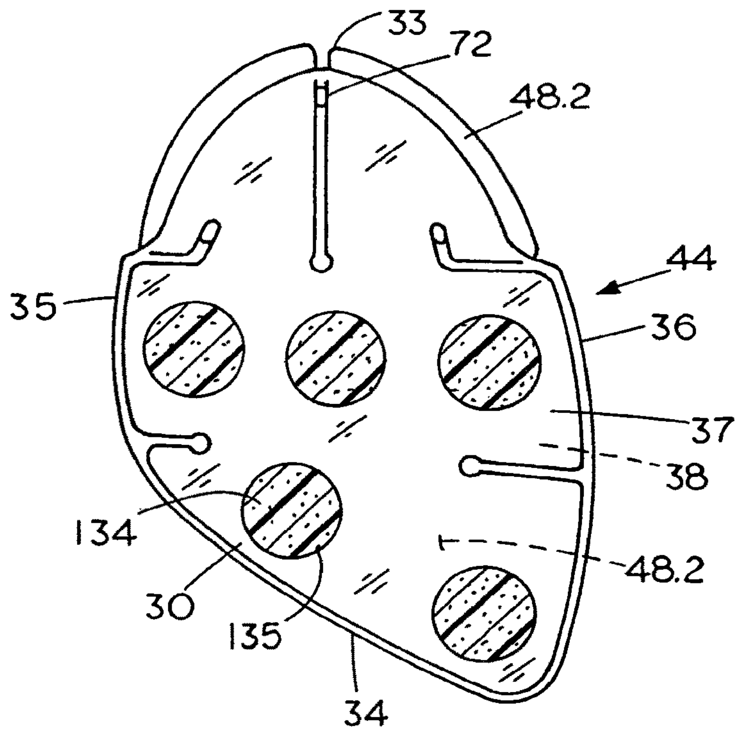

FIG. 414 is a top plan view of an inferior anterior spring element positioned within an anterior outsole element having a backing including a plurality of foam cushioning elements affixed thereto.

Figure 415:
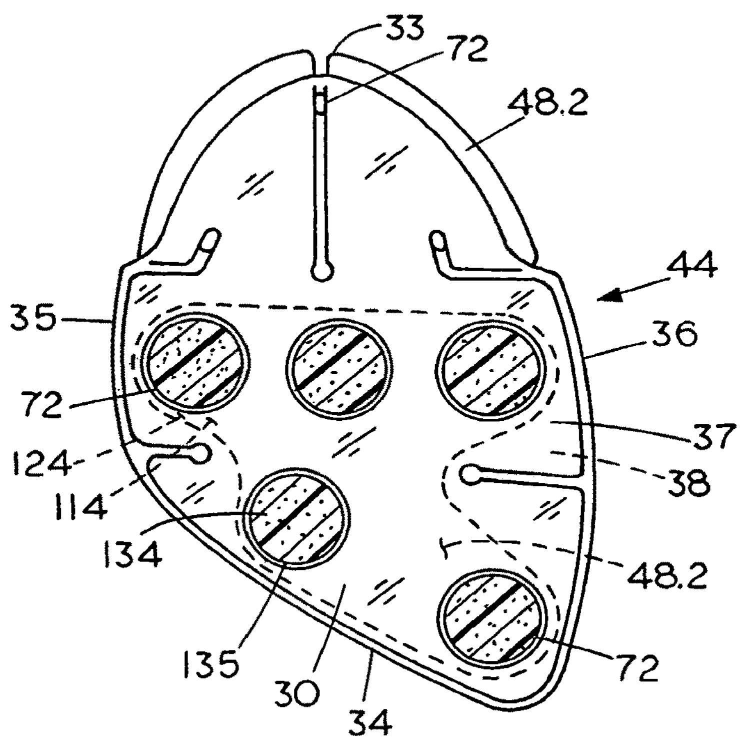

FIG. 415 is a top plan view of an inferior anterior spring element positioned within an anterior outsole element having a backing including a plurality of openings for permitting portions of a foam cushioning element to project therethrough.

Figure 416:
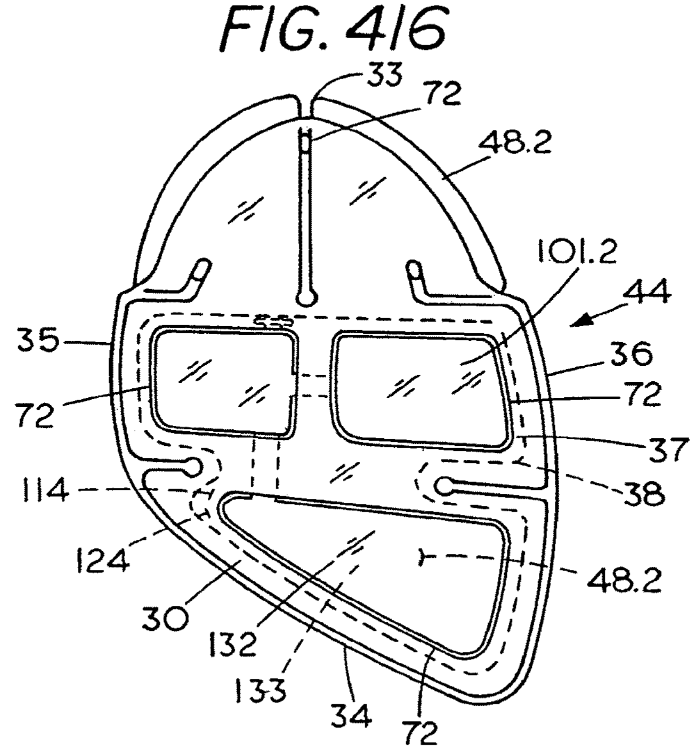

FIG. 416 is a top plan view of an inferior anterior spring element positioned within an anterior outsole element having a backing including a plurality of openings for permitting portions of a fluid-filled bladder to project therethrough.

Figure 417:
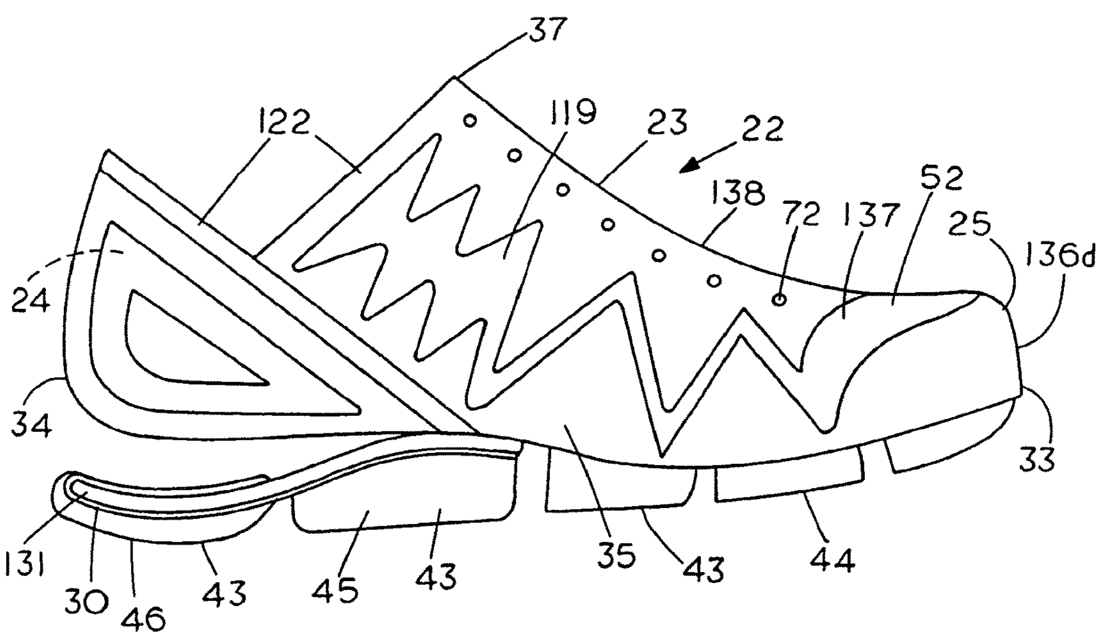

FIG. 417 is a side view of an article of footwear including a middle outsole element.

Figure 418:
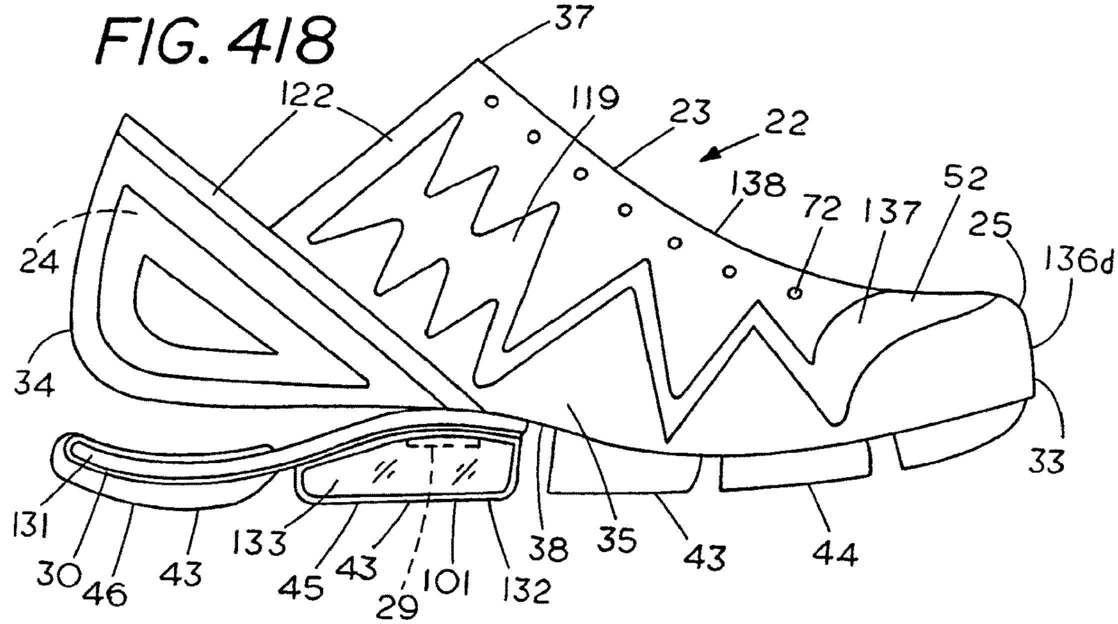

FIG. 418 is a side view of an article of footwear including a middle outsole element substantially consisting of a fluid-filled bladder.

Figure 419:
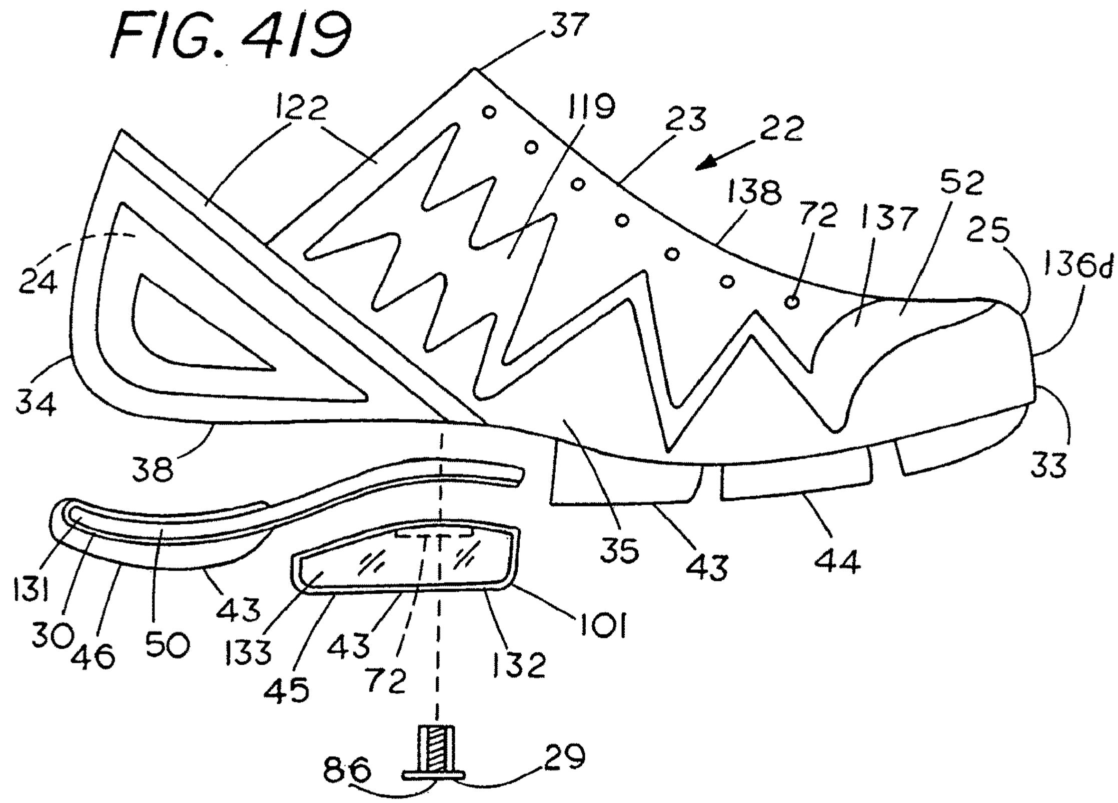

FIG. 419 is a partially exploded side view of an article of footwear including the middle outsole element shown in FIG. 418.

Figure 420:
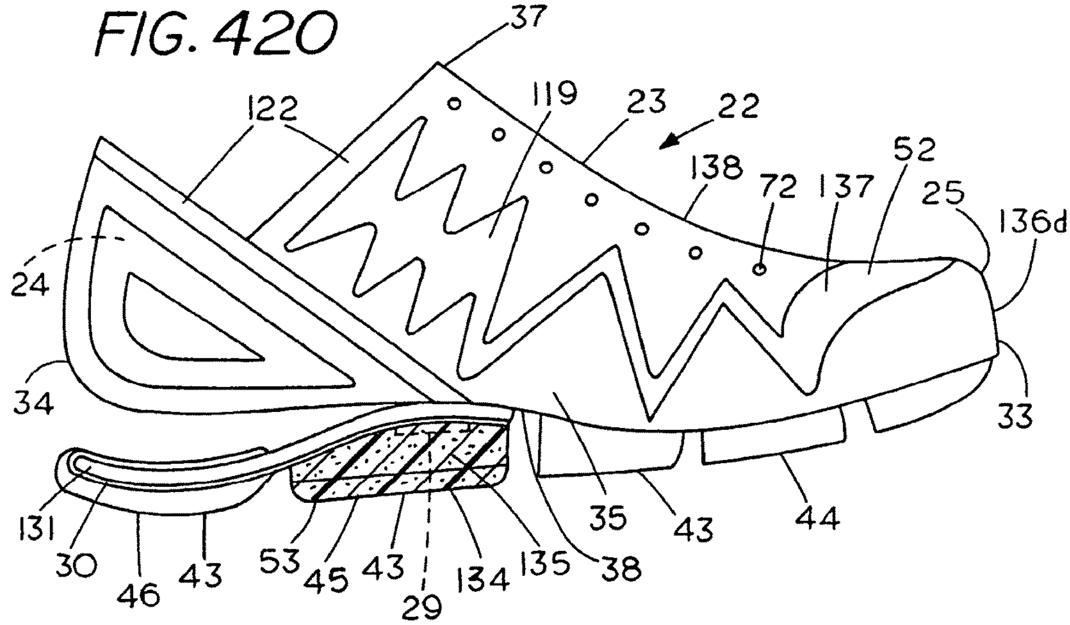

FIG. 420 is a side view of an article of footwear including a middle outsole element substantially consisting of a foam cushioning element.

Figure 421:
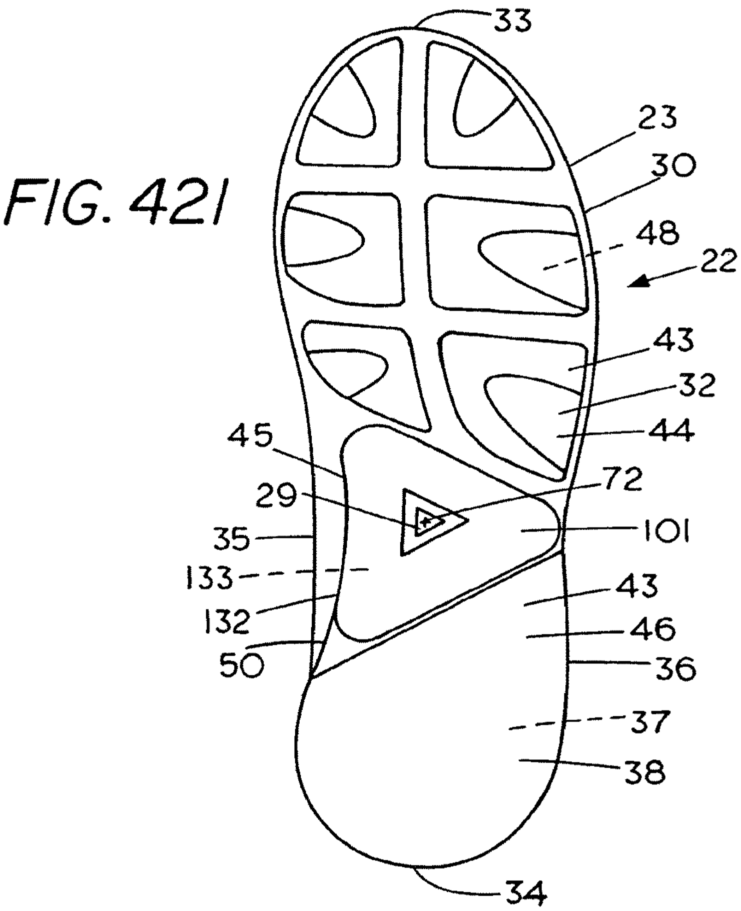

FIG. 421 is a bottom plan view of the article of footwear including the middle outsole element shown in FIG. 418.

Figure 422:
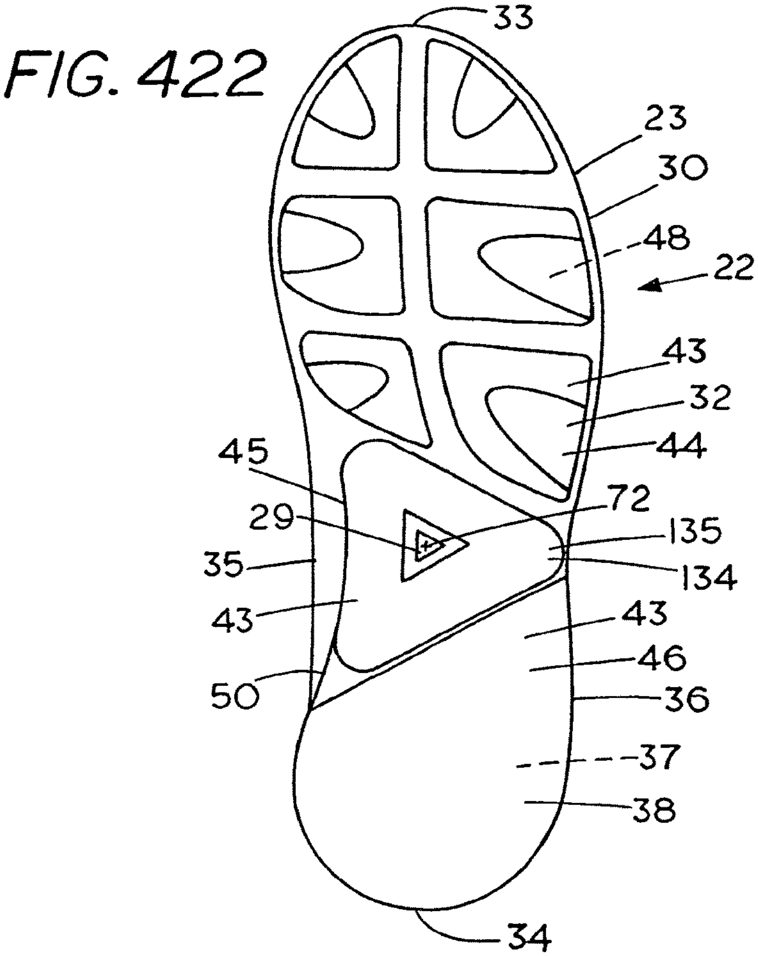

FIG. 422 is a bottom plan view of the article of footwear including the middle outsole element shown in FIG. 420.

Figure 423:
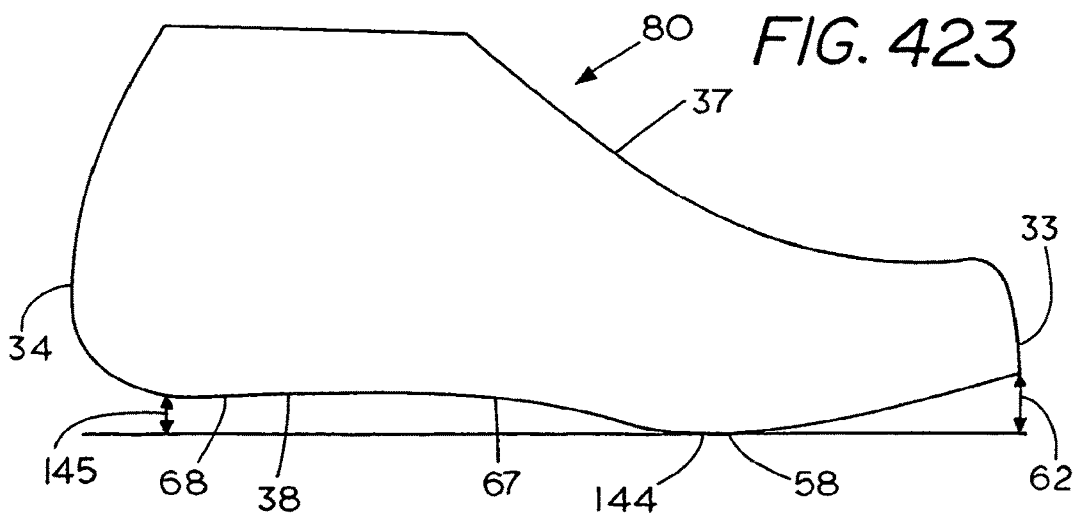

FIG. 423 is a side view of a footwear last showing toe spring.

Figure 424:
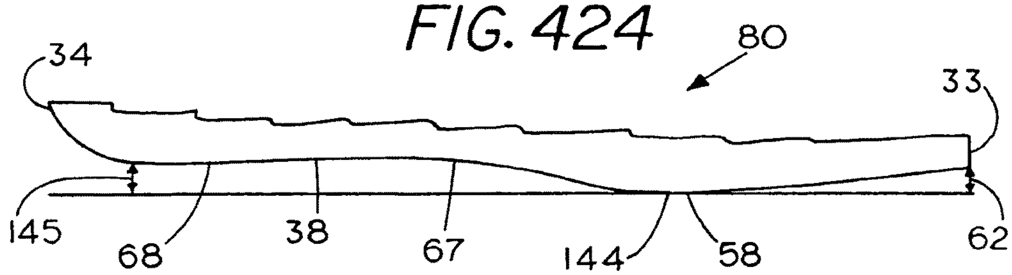

FIG. 424 is a side view of a footwear last showing toe spring, and with parts broken away.

Figure 425:
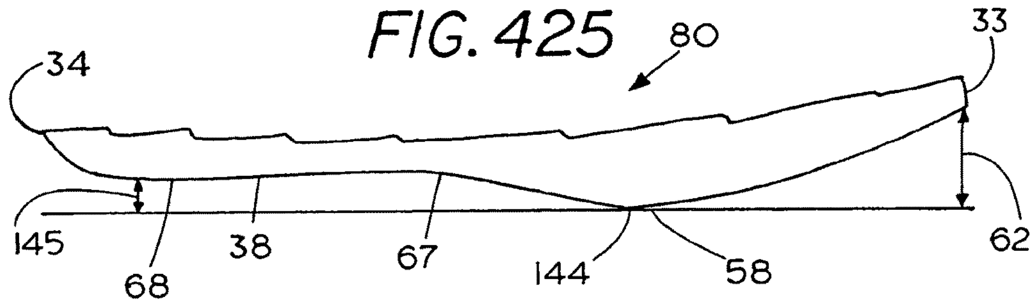

FIG. 425 is a side view of a footwear last showing toe spring, and with parts broken away.

Figure 426:
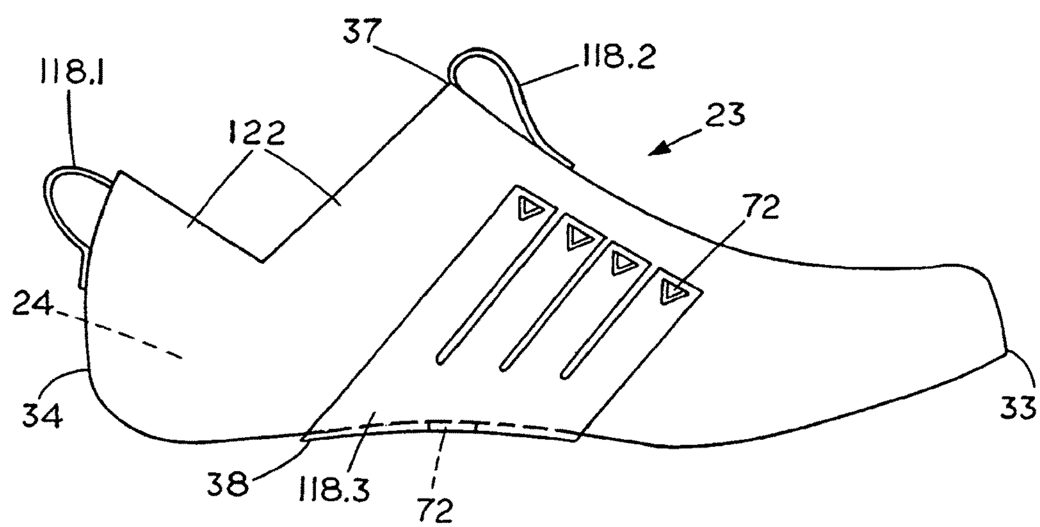

FIG. 426 is a side view of an upper including a removable strap including openings for accommodating lace closure means.

Figure 427:
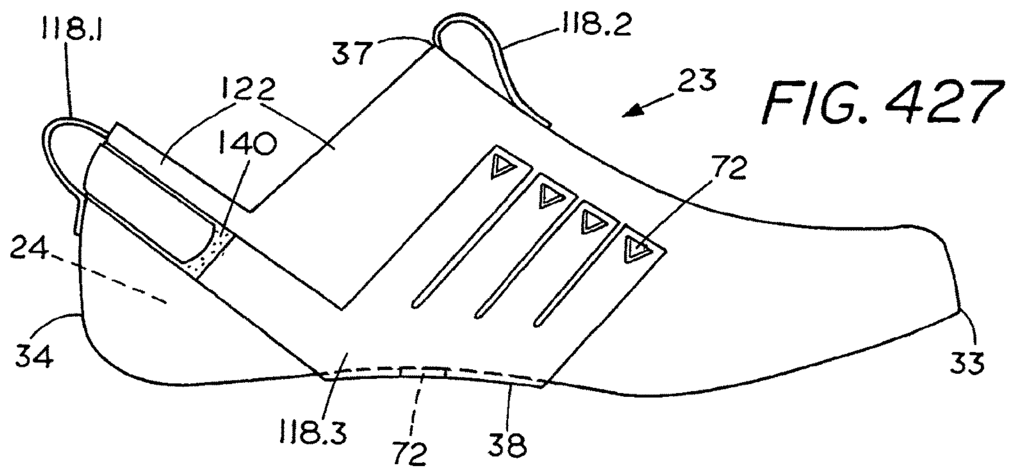

FIG. 427 is a side view of an upper including a removable strap including openings for accommodating lace closure means, and also a strap portion encompassing the posterior side of the upper.

Figure 428:
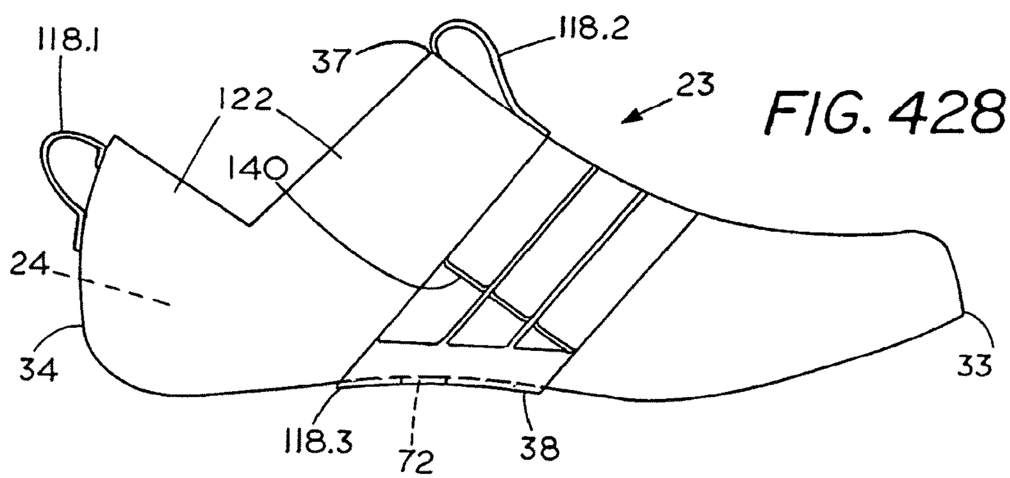

FIG. 428 is a side view of an upper including a removable strap including VELCRO® hook and pile closure means.

Figure 429:
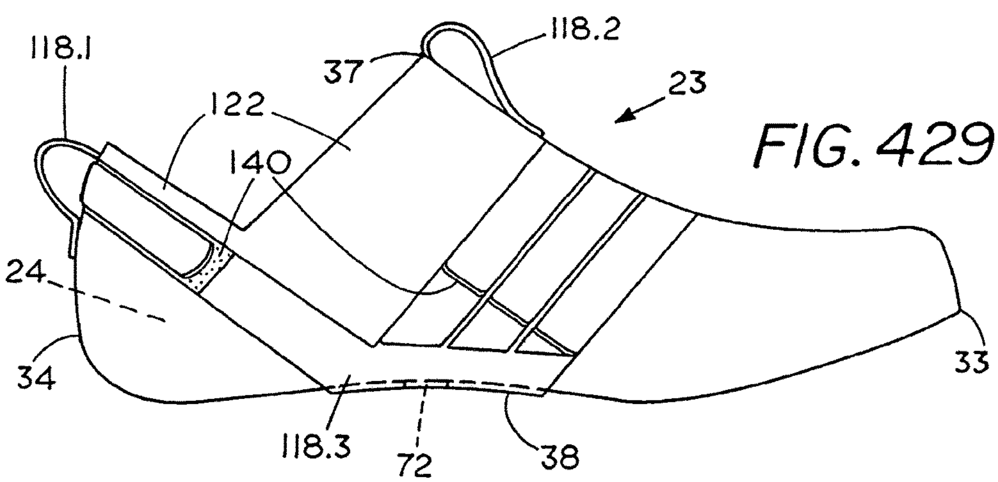

FIG. 429 is a side view of an upper including a removable strap including VELCRO® hook and pile closure means, and also a strap portion encompassing the posterior side of the upper.

Figure 430:
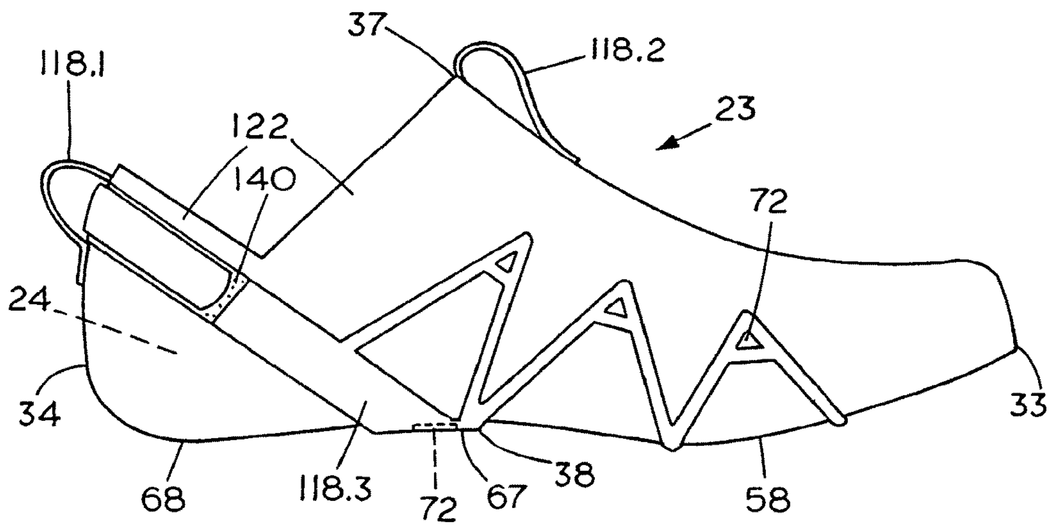

FIG. 430 is a side view of an upper including a removable strap including openings for accommodating lace closure means, and also a strap portion encompassing the posterior side of the upper.

Figure 431:
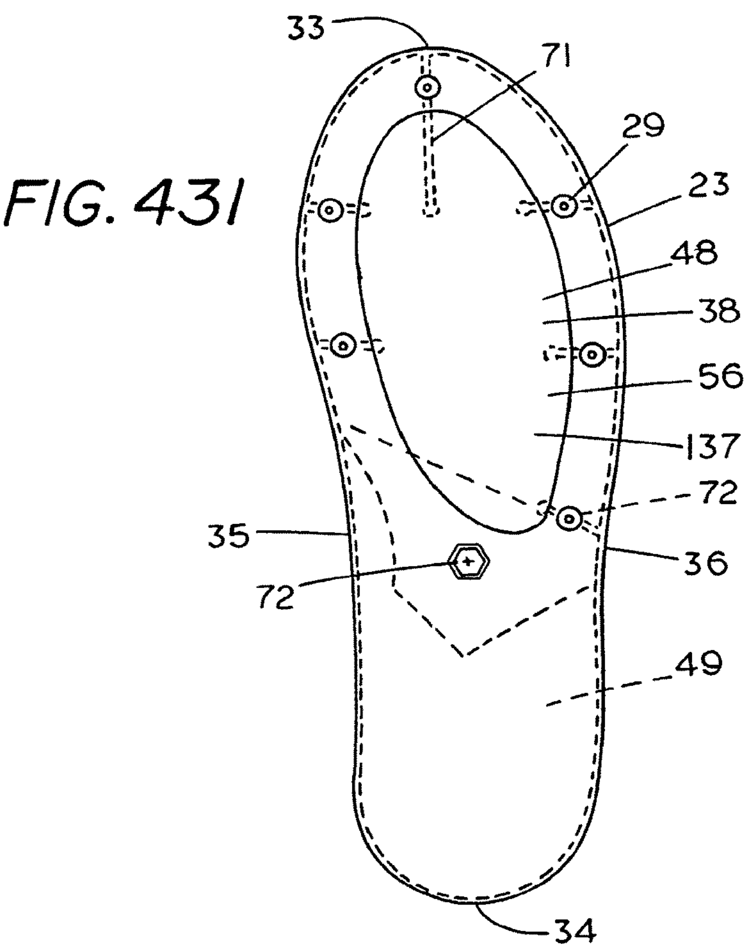

FIG. 431 is a bottom plan view of a superior spring element including a posterior spring element, and an anterior spring element including a plurality of flex notches generally similar to that shown in FIG. 316 positioned in functional relation within an upper, and also showing a plurality of fasteners for selectively adjusting the width and girth of the upper.

Figure 432:
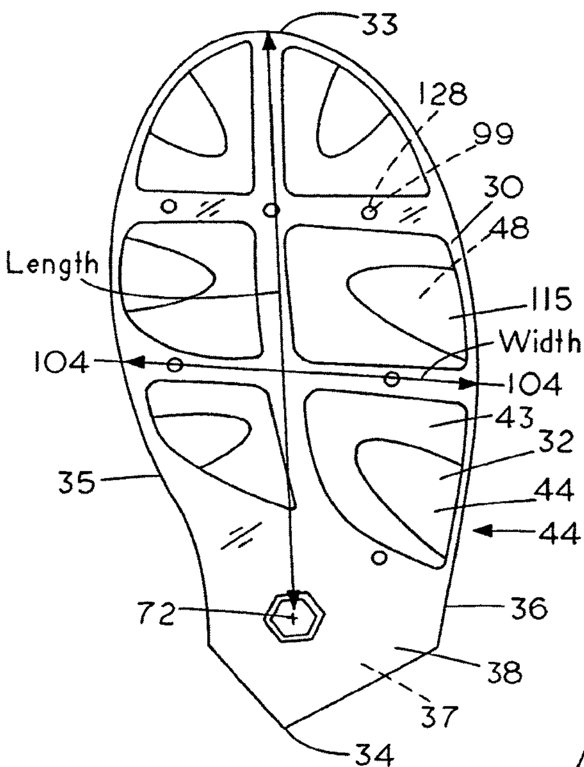

FIG. 432 is a bottom plan view of an anterior outsole element including a hexagonal opening for accommodating a fastener.

Figure 433:
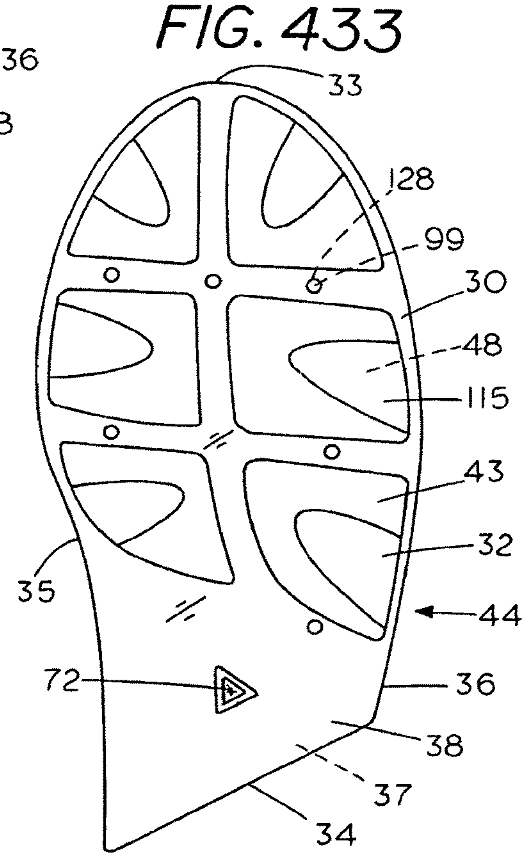

FIG. 433 is a bottom plan view of an anterior outsole element including a triangular opening for accommodating a fastener, and also having a different configuration or last shape than the embodiment shown in FIG. 432.

Figure 434:
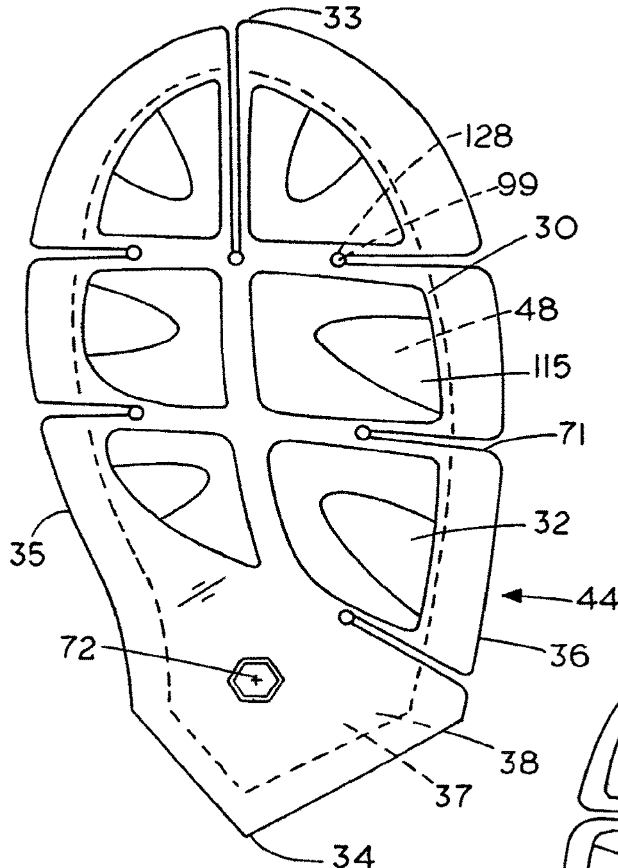

FIG. 434 is a bottom plan view of an anterior outsole element including a hexagonal opening for accommodating a fastener, a plurality of flex notches, and an extended backing portion.

Figure 435:
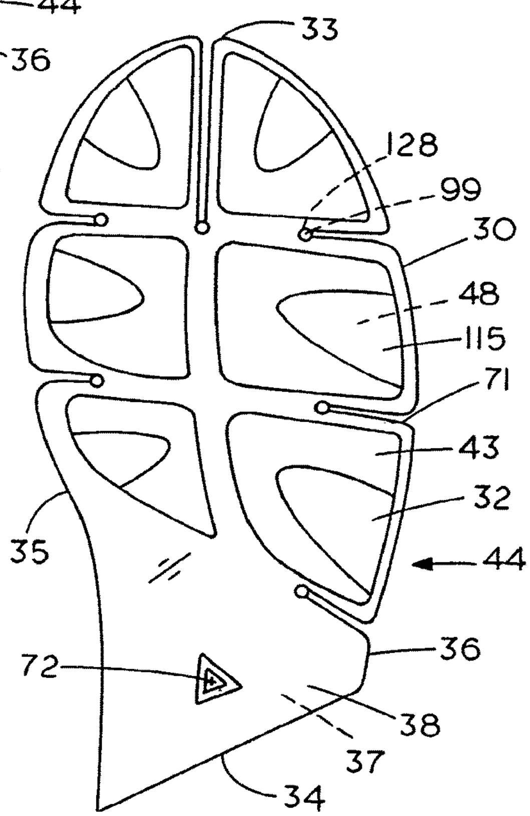

FIG. 435 is a bottom plan view of an anterior outsole element including a triangular opening for accommodating a fastener, a plurality of flex notches, and also having a different configuration or last shape than the embodiments shown in FIGS. 432-434.

Figure 436:
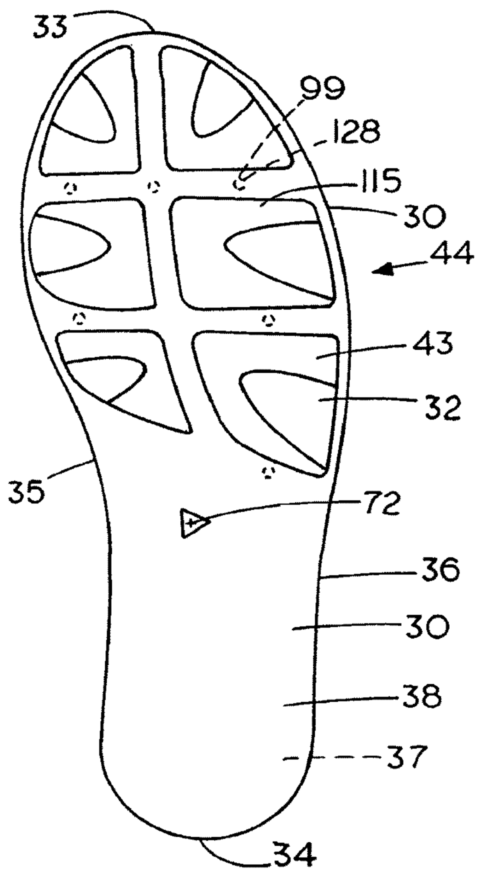

FIG. 436 is a bottom plan view of an anterior outsole element including a backing portion that can extend substantially full length between the anterior side and posterior side of an upper for an article of footwear.

Figure 437:
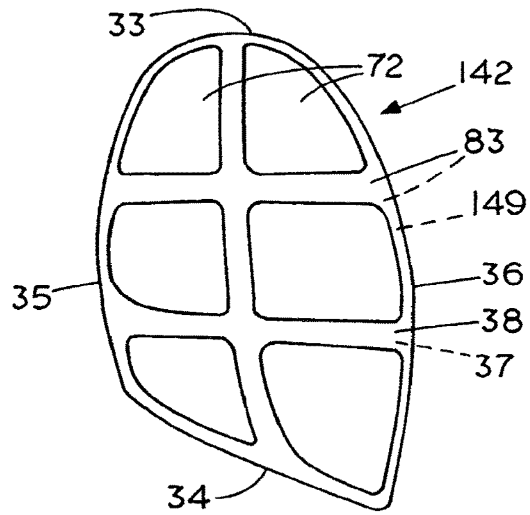

FIG. 437 is a bottom plan view of a gasket for possible use between an anterior outsole element and an upper.

Figure 438:
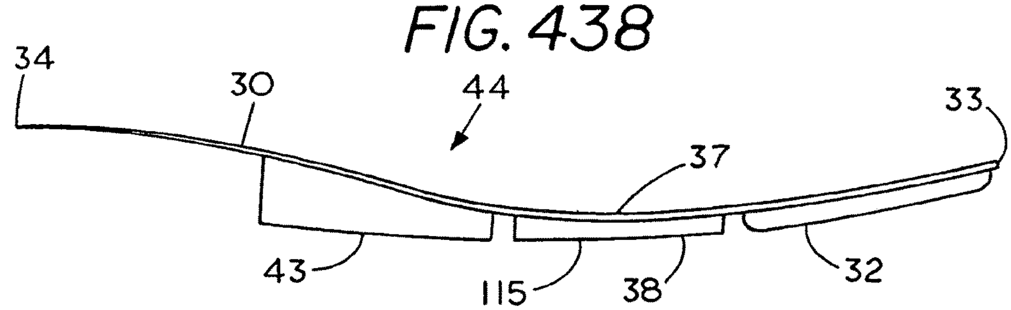

FIG. 438 is a side view of an anterior outsole element having a generally planar configuration.

Figure 439:
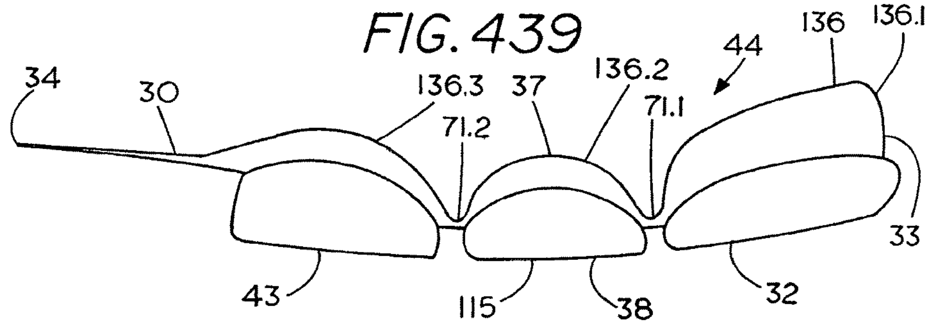

FIG. 439 is a side view of an anterior outsole element including an elevated stability element having a three dimensional wrap configuration.

Figure 440:
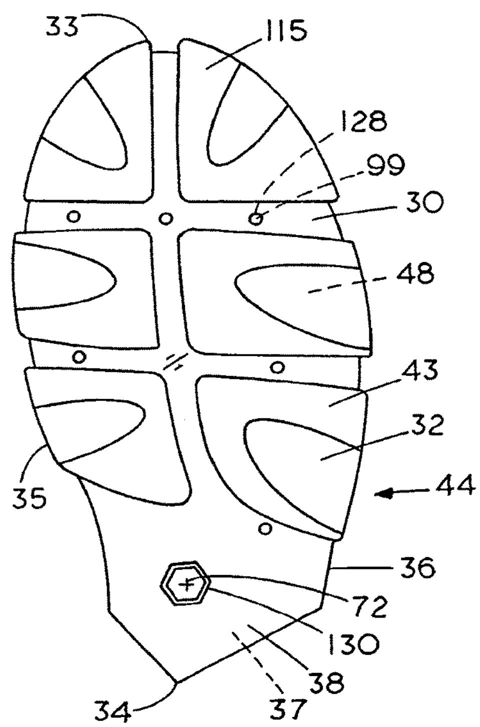

FIG. 440 is a bottom plan view of an anterior outsole element generally similar to that shown in FIG. 439.

Figure 441:
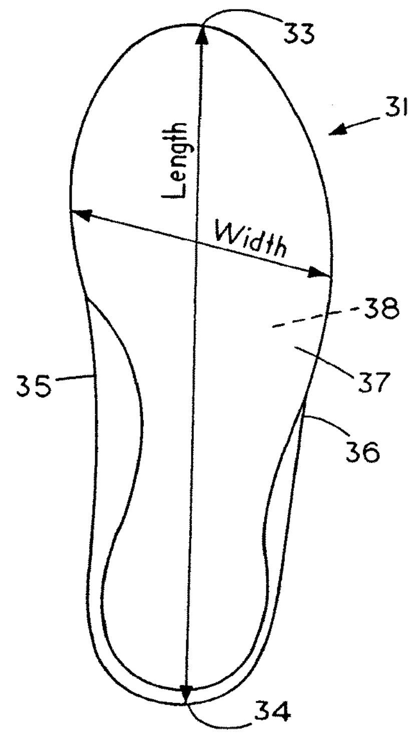

FIG. 441 is a top plan view of an insole showing arrows indicating approximate positions of width and length measurements.

Figure 442:
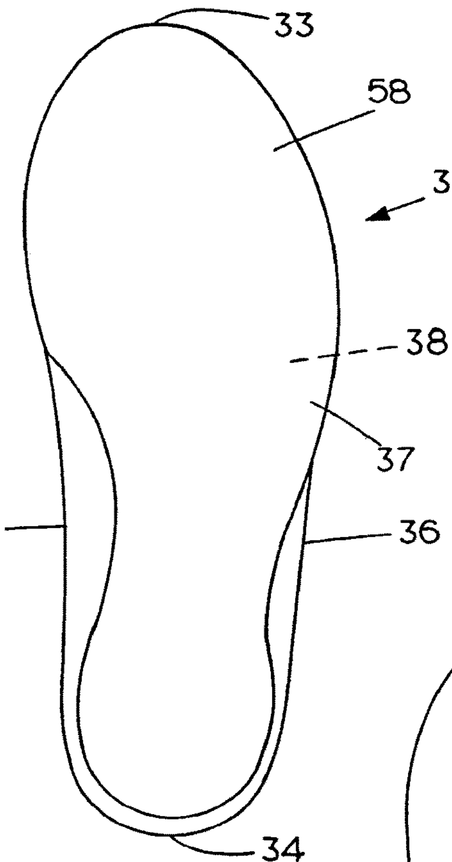

FIG. 442 is a top plan view of an insole having a substantially planar forefoot area.

Figure 443:
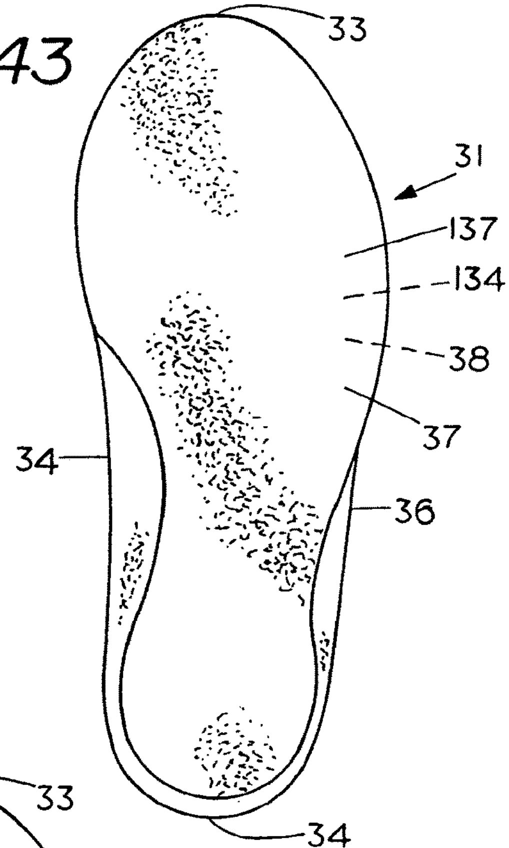

FIG. 443 is a top plan view of an insole made of light-weight foam material including a cover layer made of a brushed textile material.

Figure 444:
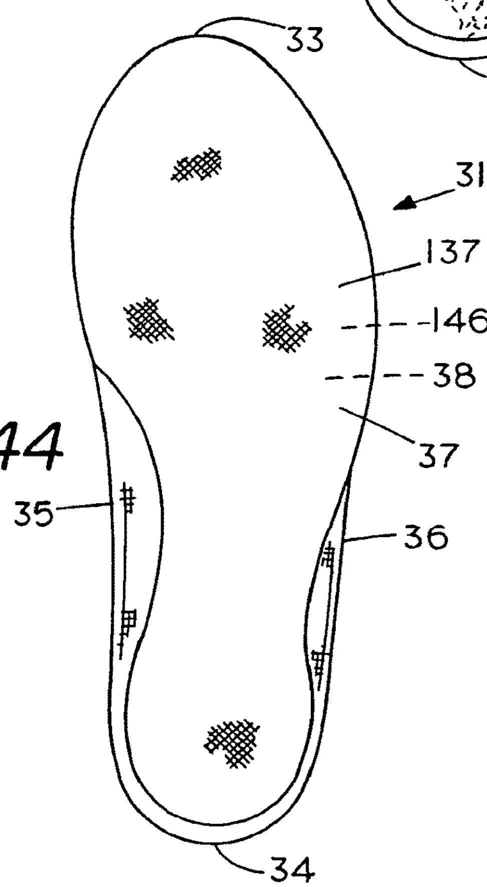

FIG. 444 is a top plan view of an insole made of an elastomeric material having substantial dampening characteristics including a relatively smooth cover layer made of a textile material.

Figure 445:
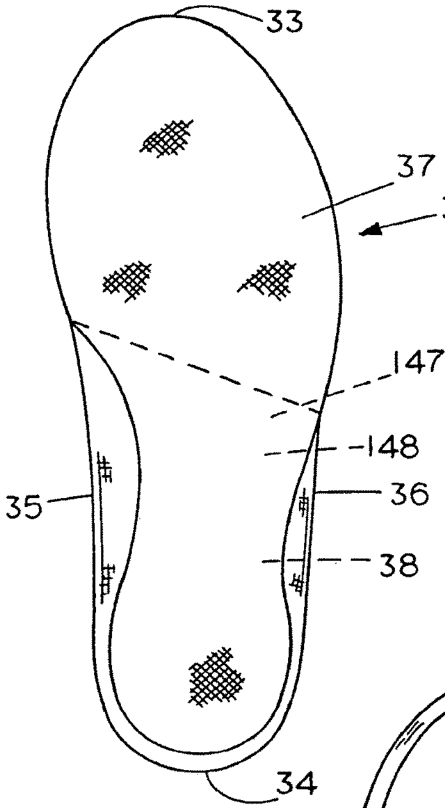

FIG. 445 is a top plan view of the insole shown in FIG. 444 further including a custom moldable bladder including a light cure material.

Figure 446:
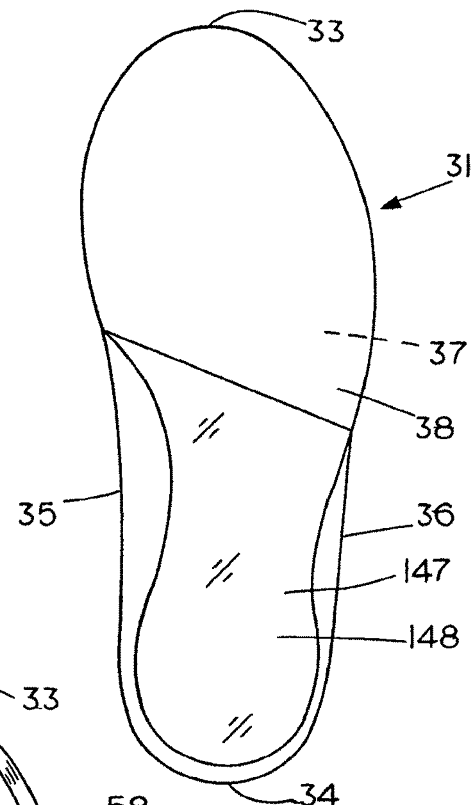

FIG. 446 is a bottom plan view of the insole shown in FIG. 444 further including a custom moldable bladder including a light cure material.

Figure 447:
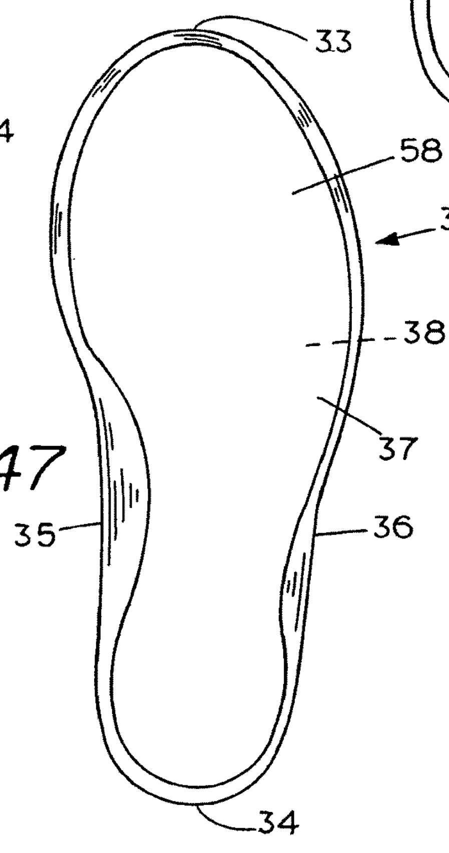

FIG. 447 is a top plan view of an insole having a three dimensional wrap configuration in the forefoot area.

Figure 448:
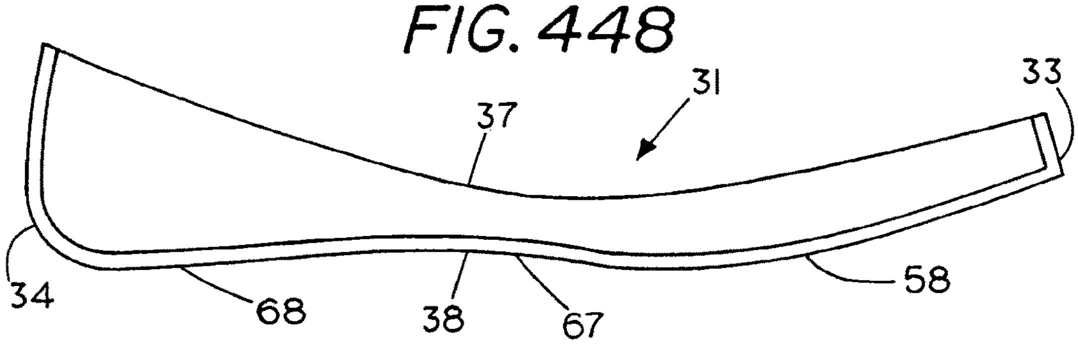

FIG. 448 is a side cross-sectional view of an insole having a three dimensional wrap configuration in the forefoot area, midfoot area, and rearfoot area.

Figure 449:
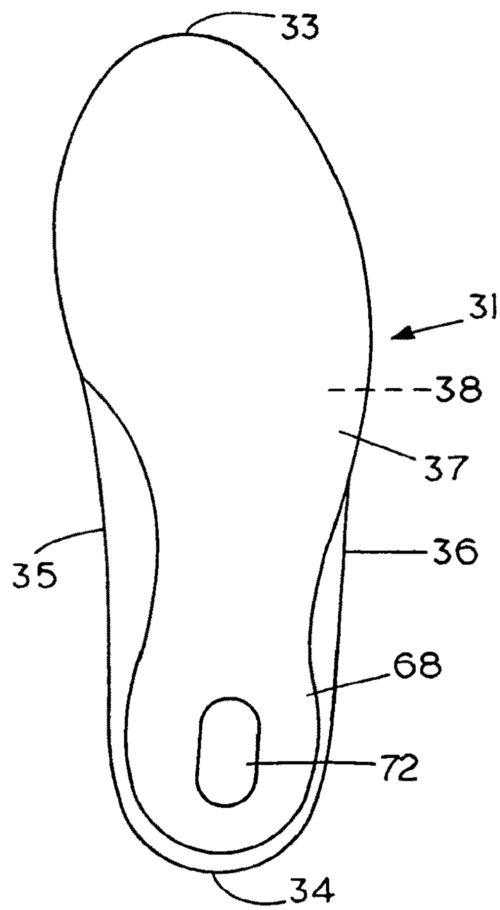

FIG. 449 is a top plan view of an insole having an opening in the rearfoot area.

Figure 450:
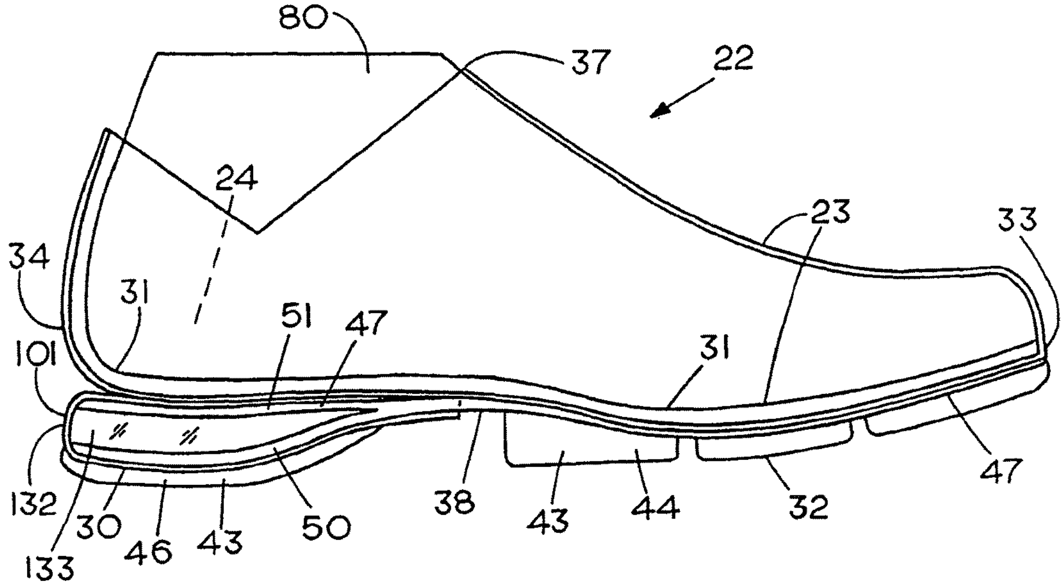

FIG. 450 is a longitudinal cross-sectional side view of an article of footwear including a bladder, and also a superior spring element and an inferior spring element that are made as a single integral part.

Figure 451:
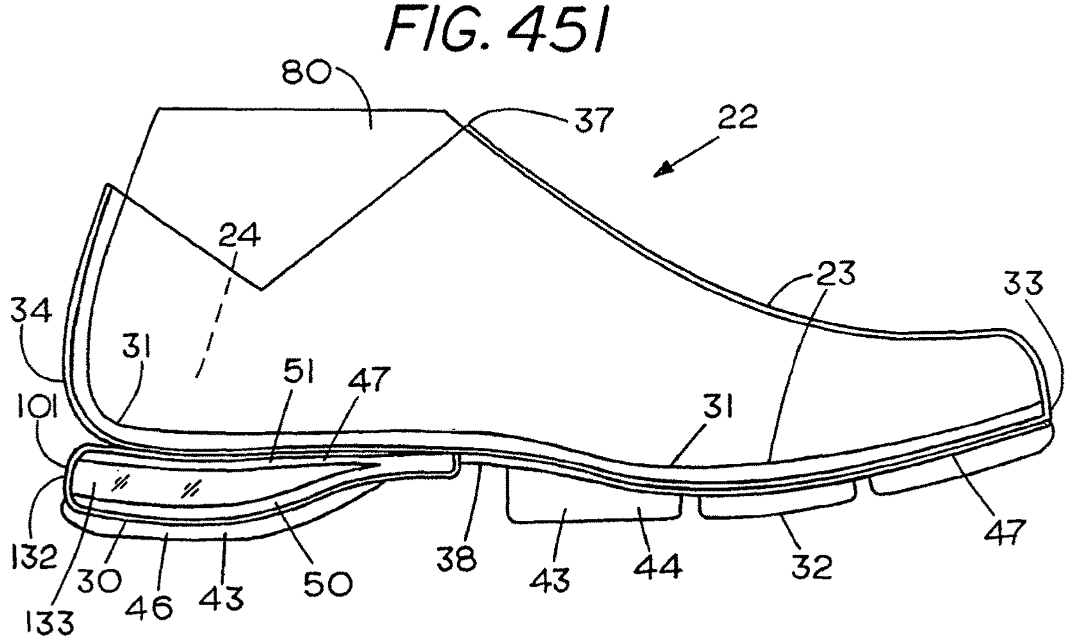

FIG. 451 is a longitudinal cross-sectional side view of an article of footwear including a bladder, and also a superior spring element and an inferior spring element that are made separately, but later affixed together permanently to form a single integral part.

Figure 452:
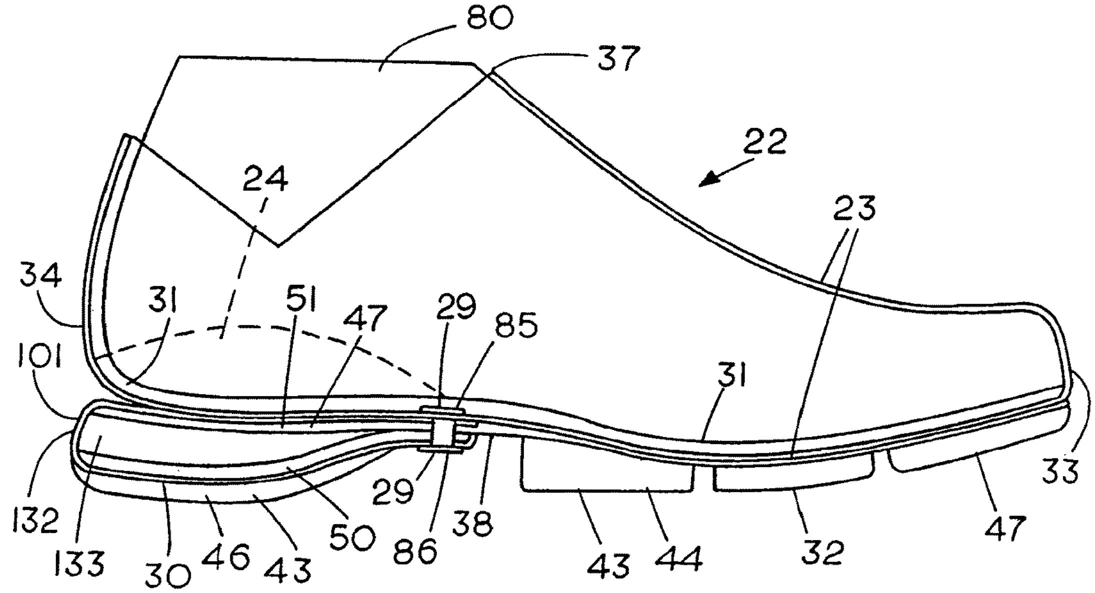

FIG. 452 is a longitudinal cross-sectional side view of an article of footwear including a bladder, and also a selectively removable and replaceable inferior spring element.

Figure 453:
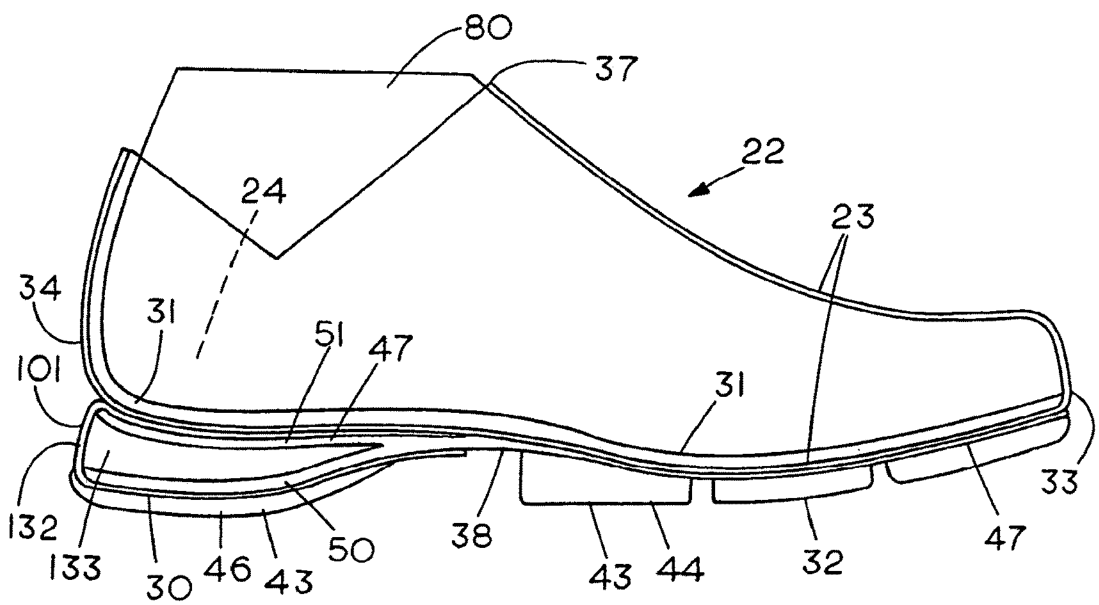

FIG. 453 is a longitudinal cross-sectional side view of an article of footwear including a bladder, and a superior spring element and an inferior spring element that are made as a single integral part.

Figure 454:
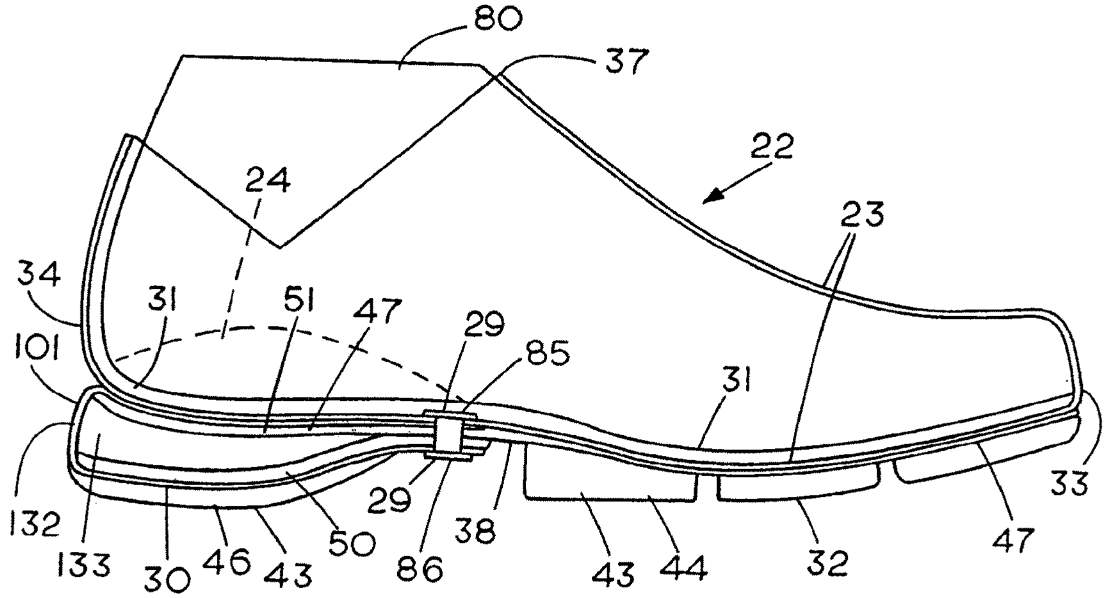

FIG. 454 is a longitudinal cross-sectional side view of an article of footwear including a bladder, and also a selectively removable and replaceable inferior spring element.

Figure 455:
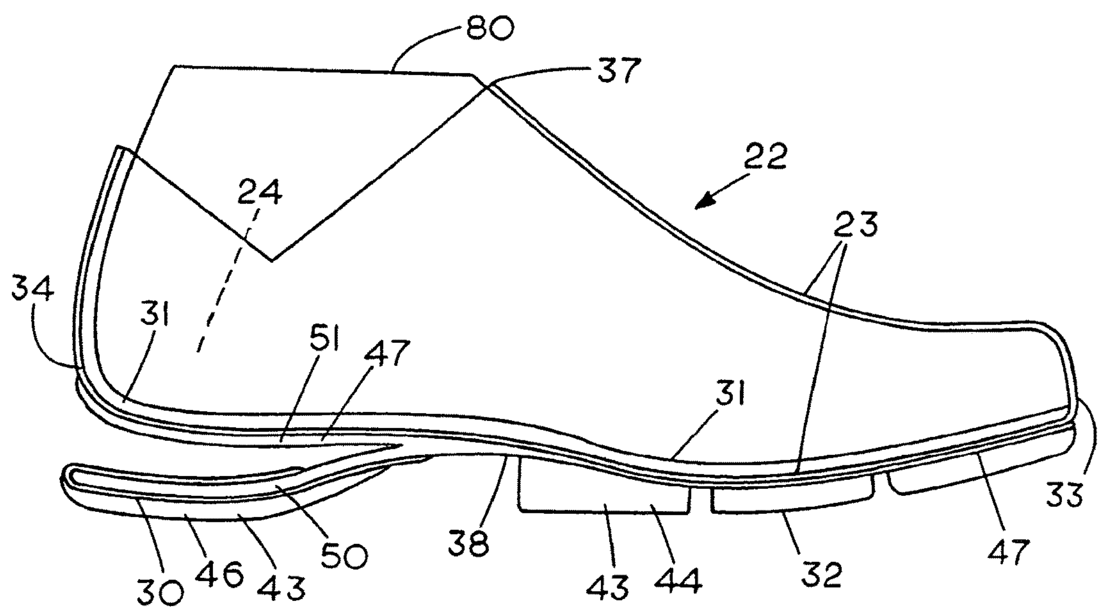

FIG. 455 is a longitudinal cross-sectional side view of an article of footwear including a superior spring element and an inferior spring element that are made as a single integral part.

Figure 456:
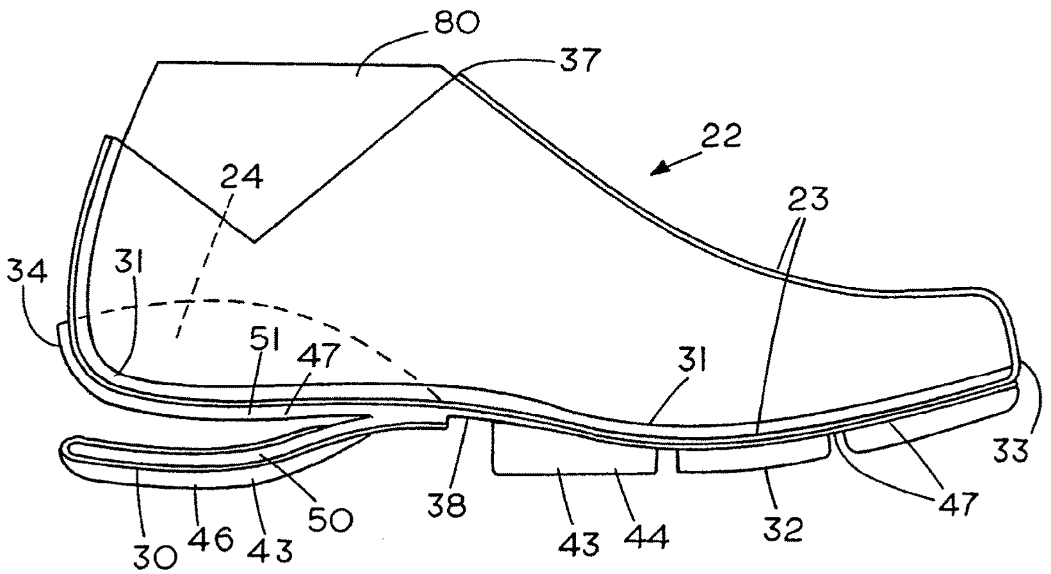

FIG. 456 is a longitudinal cross-sectional side view of an article of footwear including a superior spring element and an inferior spring element that are made separately, but later affixed together permanently to form a single integral part.

Figure 457:
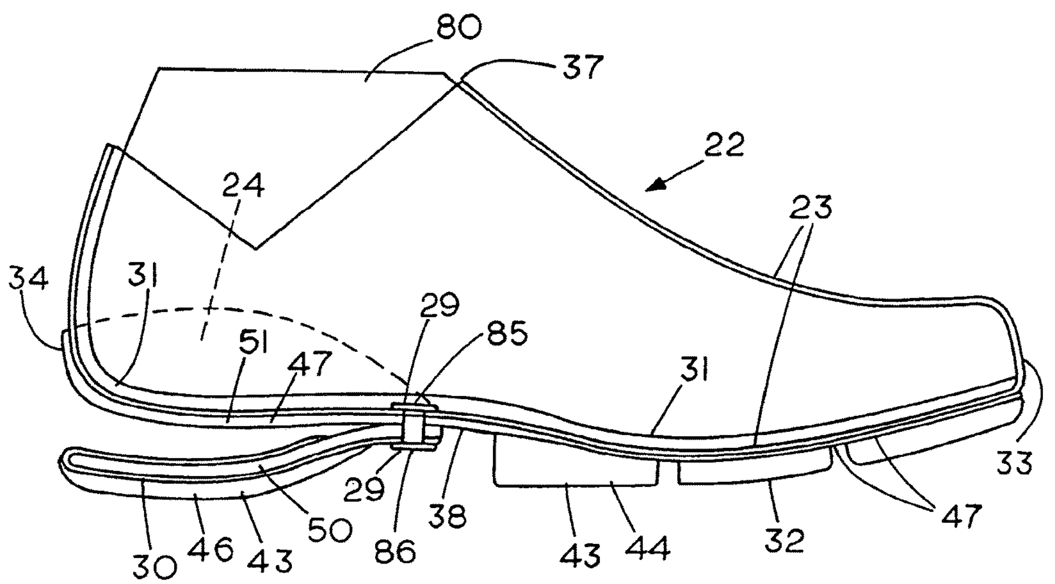

FIG. 457 is a longitudinal cross-sectional side view of an article of footwear including a selectively removable and replaceable inferior spring element.

FIG. 458 is a medial side view of an upper of an article of footwear including a strap that is held in position by a retainer on the superior side.

FIG. 459 is a lateral side view of the upper of an article of footwear shown in FIG. 458.

FIG. 460 is a medial side view of an upper of an article of footwear including a strap generally similar to that shown in FIG. 458, but further including an integral strap portion that encompasses the posterior side of the upper.

Figure 461:
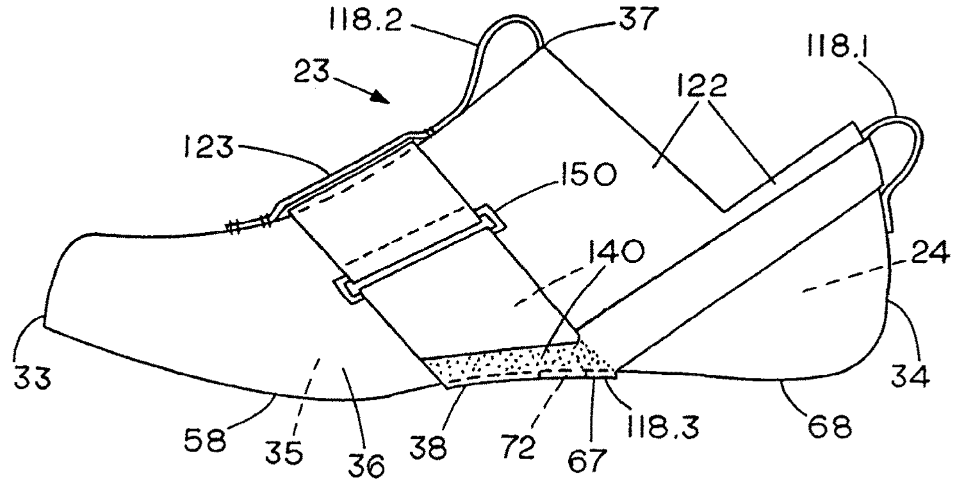

FIG. 461 is a lateral side view of the upper of an article of footwear shown in FIG. 460.

Figure 462:
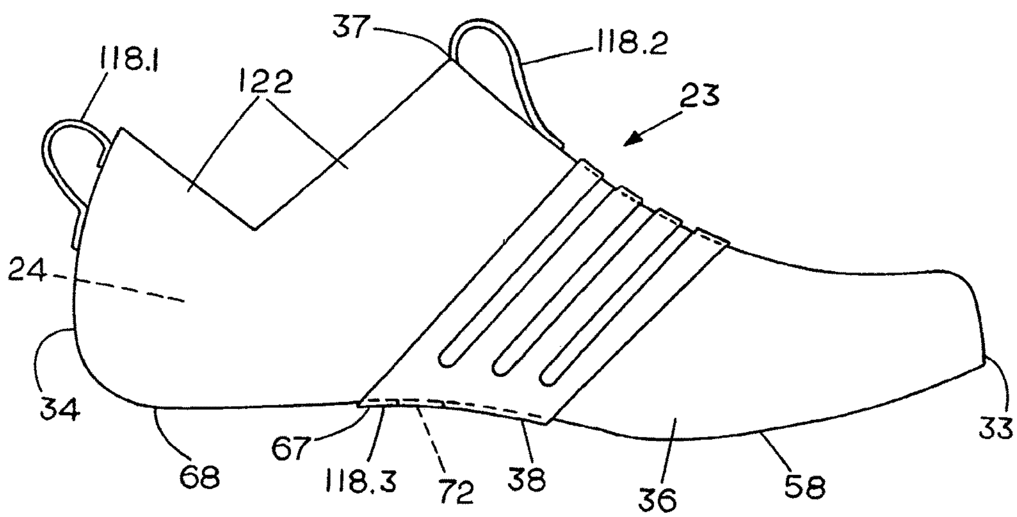

FIG. 462 is a lateral side view of an upper of an article of footwear that includes a strap made from a resilient and elastomeric material.

Figure 463:
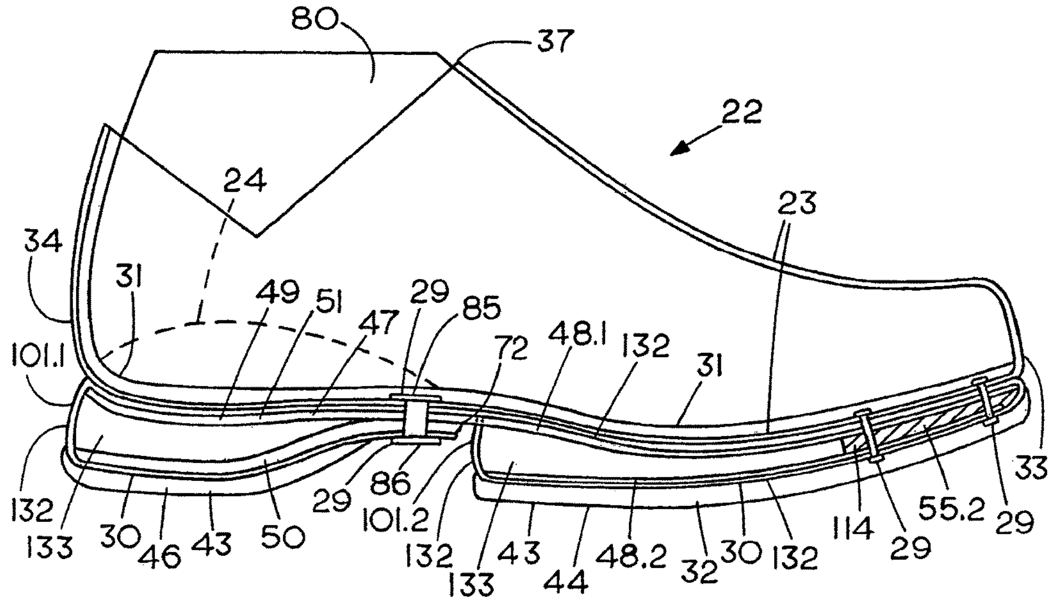

FIG. 463 is a longitudinal cross-sectional lateral side view of an article of footwear that includes two bladders, and a selectively removable and replaceable spring element.

Figure 464:
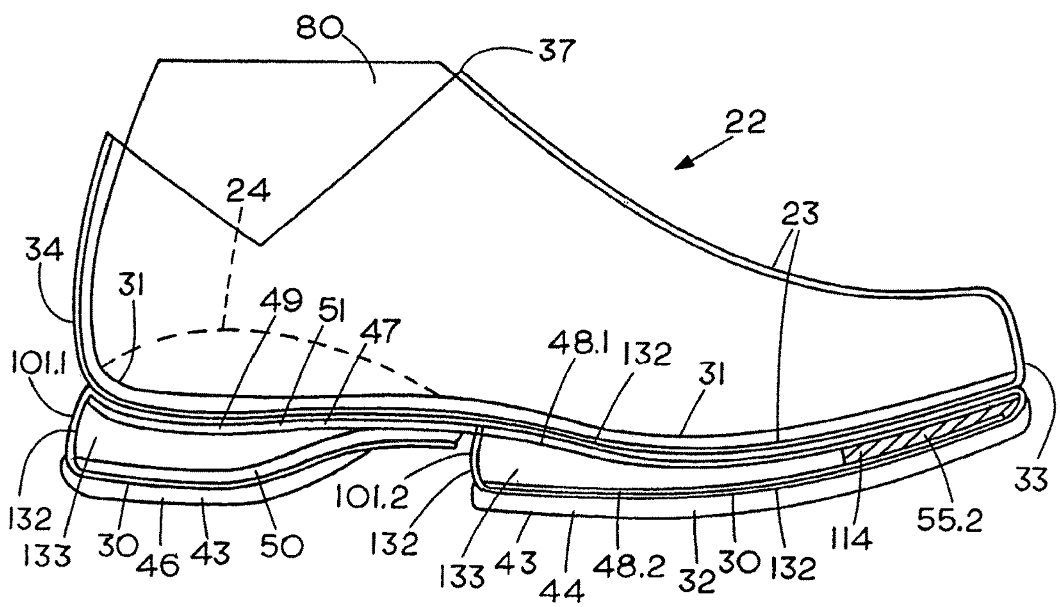

FIG. 464 is a longitudinal cross-sectional lateral side view of an article of footwear that includes two bladders generally similar to that shown in FIG. 463, but not including a plurality of fasteners.

Figure 465:
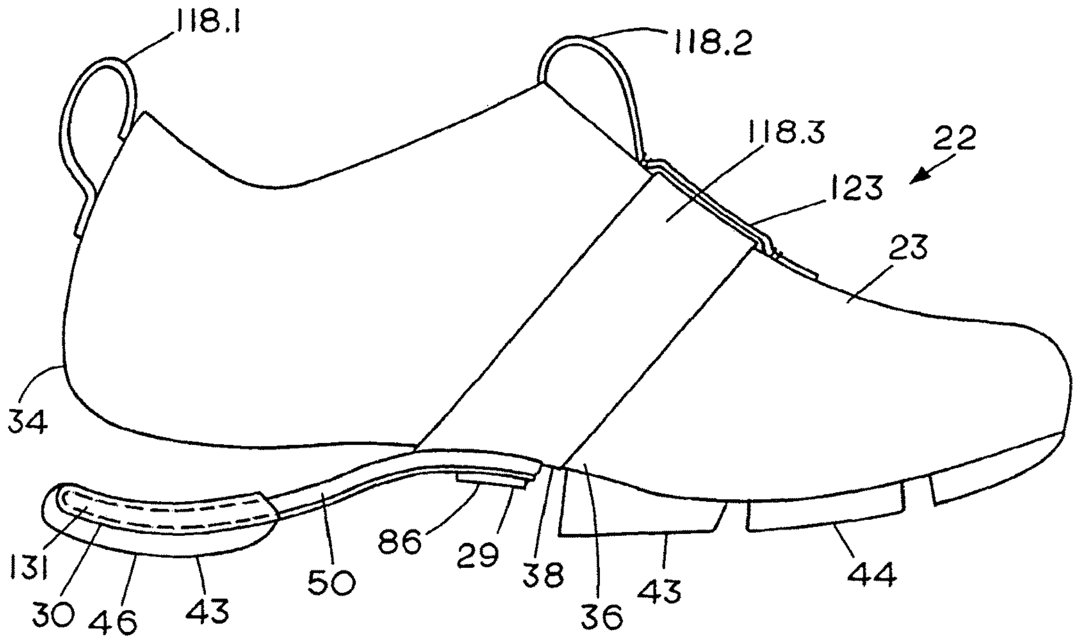

FIG. 465 is a lateral side view of an article of footwear including an upper and strap generally similar to that shown in FIGS. 458-459, and also including selectively removable and replaceable components.

Figure 466:
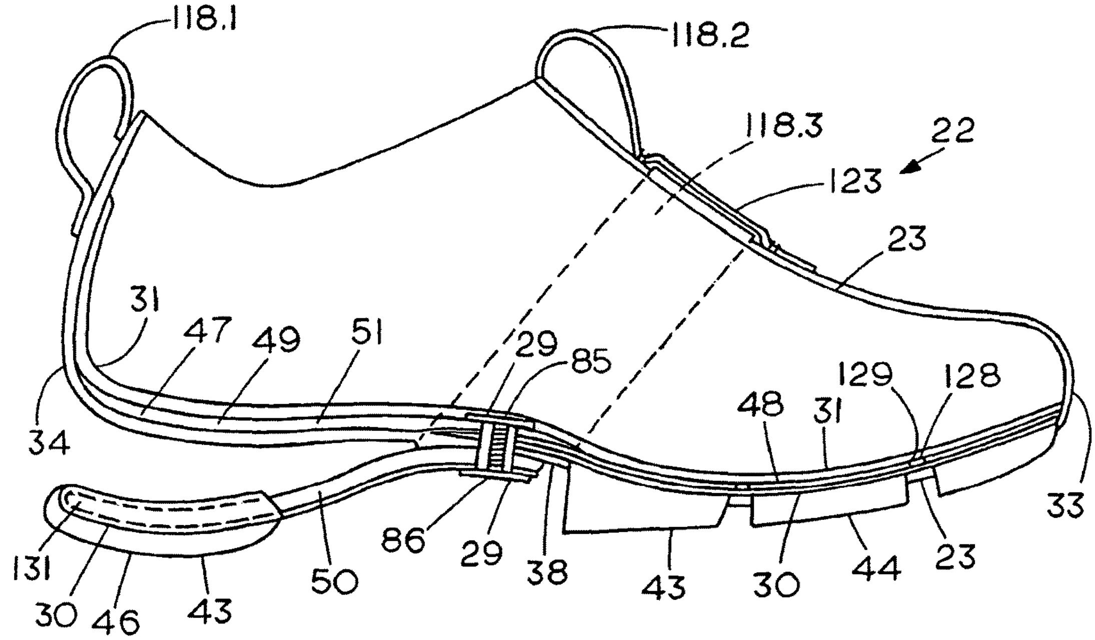

FIG. 466 is a longitudinal cross-sectional side view of the article of footwear shown in FIG. 465.

Figure 467:
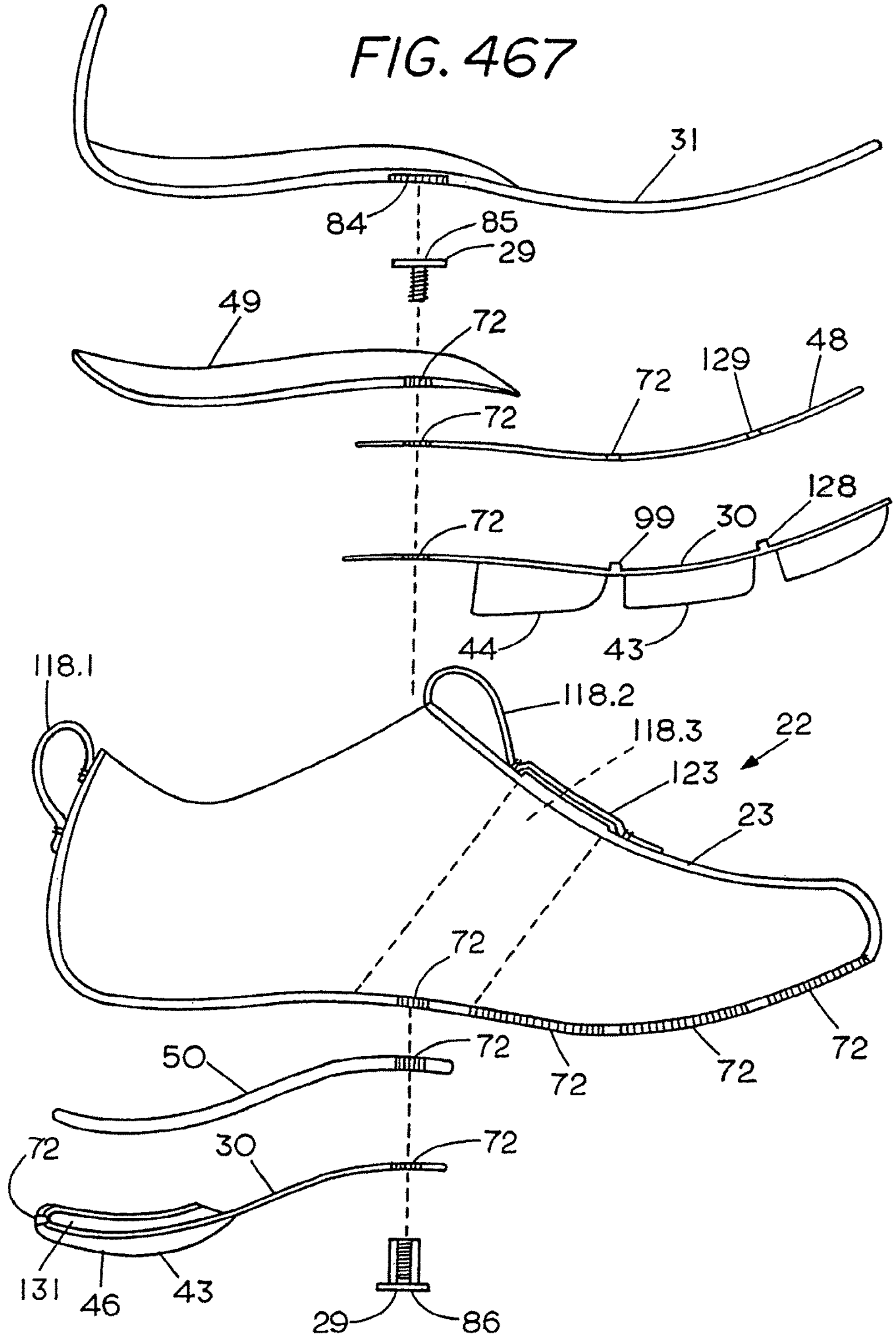

FIG. 467 is an exploded longitudinal cross-sectional side view of the article of footwear shown in FIGS. 465-466.

Figure 468:
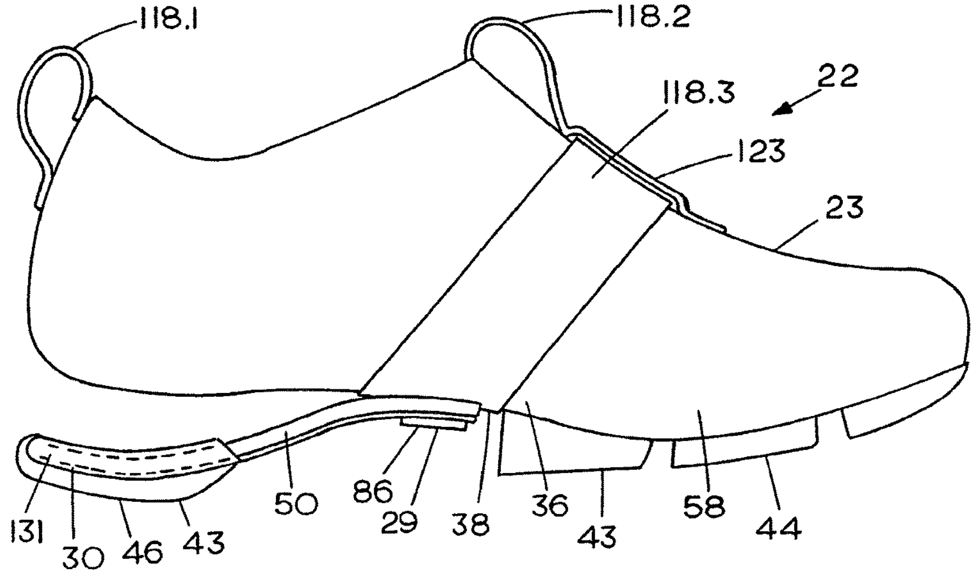

FIG. 468 is a lateral side view of an article of footwear including an upper and strap generally similar to that shown in FIGS. 458-459, and also including selectively removable and replaceable components.

Figure 469:
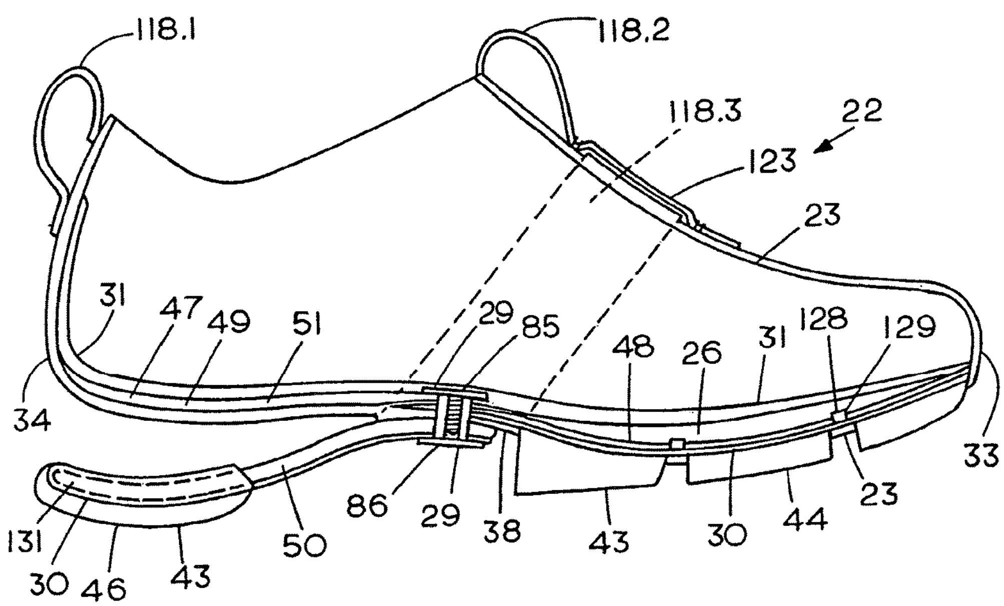

FIG. 469 is a longitudinal cross-sectional side view of the article of footwear shown in FIG. 468.

Figure 470:
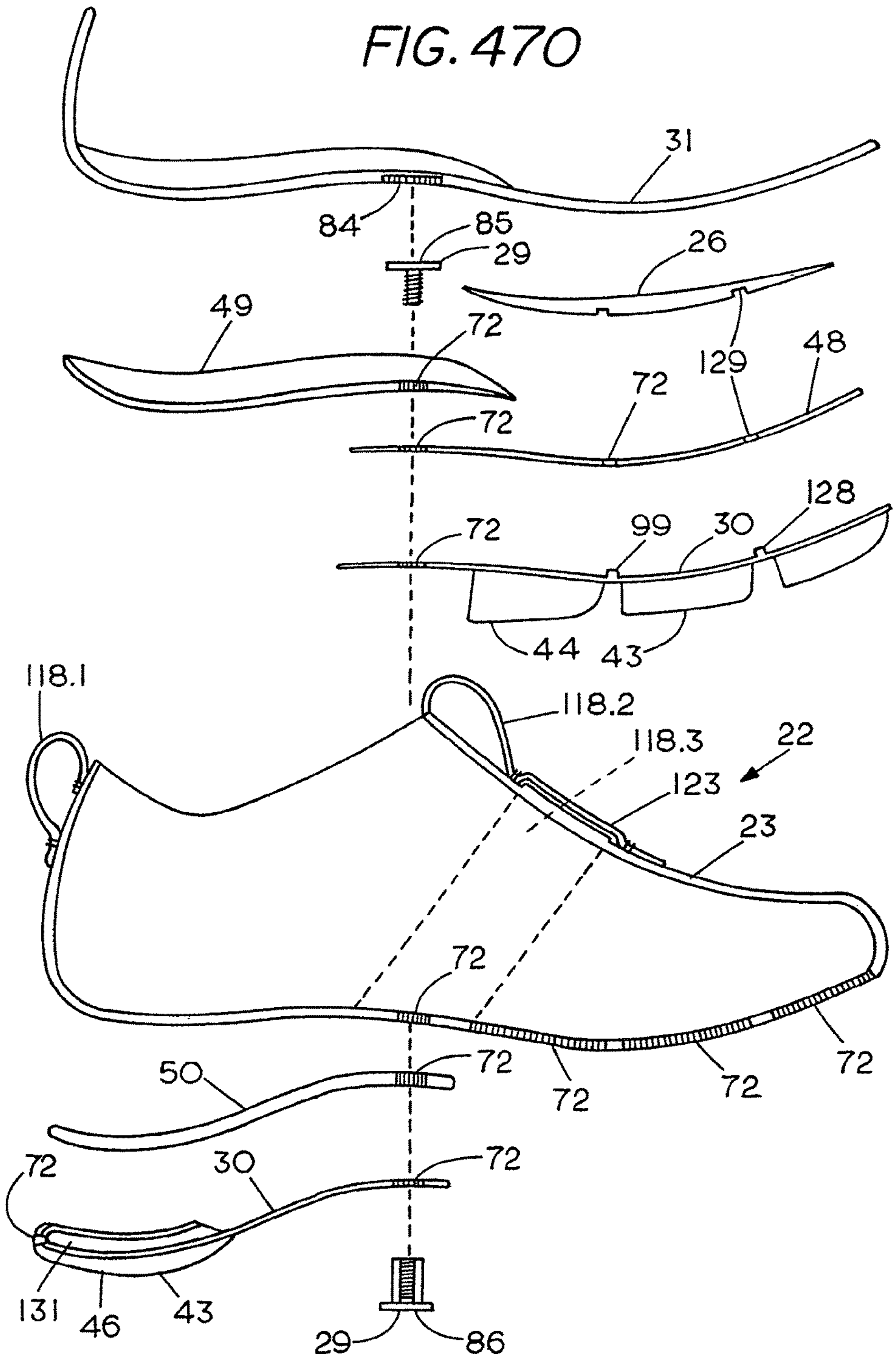

FIG. 470 is an exploded longitudinal cross-sectional side view of the article of footwear shown in FIGS. 468-469.

Figure 471:
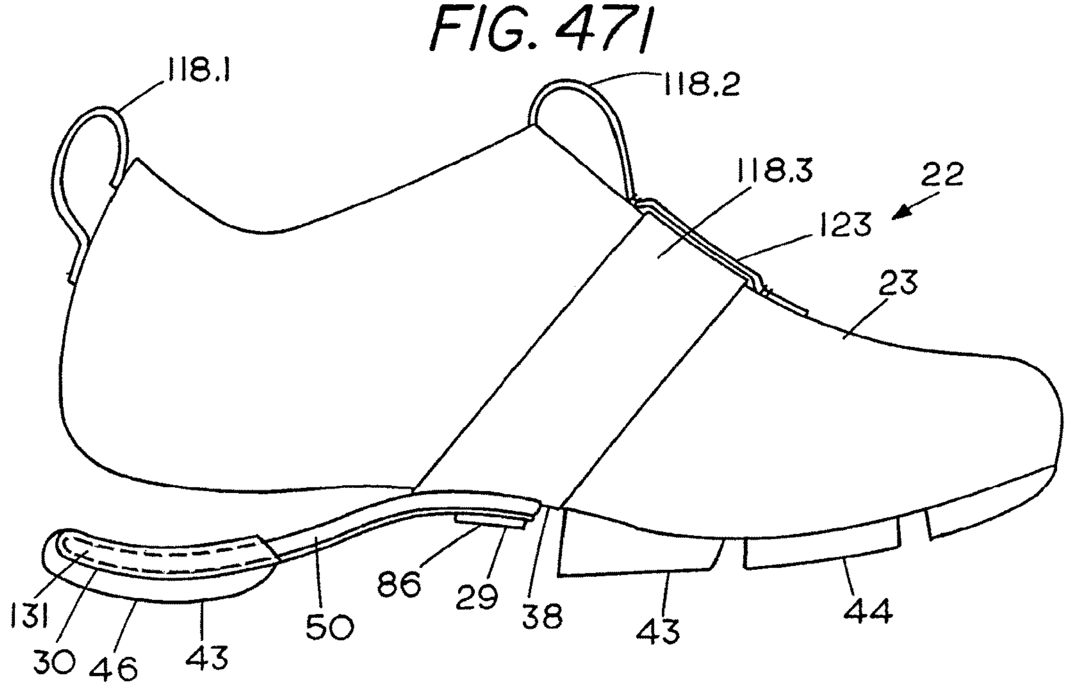

FIG. 471 is a lateral side view of an article of footwear including an upper and strap generally similar to that shown in FIGS. 458-459, and also including selectively removable and replaceable components.

Figure 472:
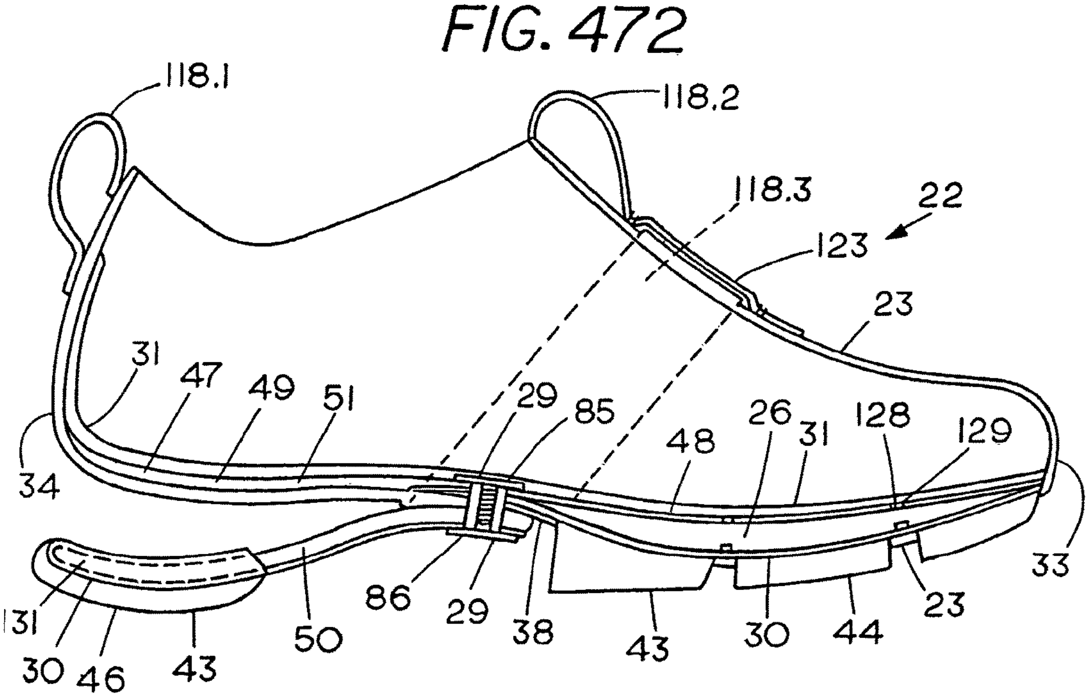

FIG. 472 is a longitudinal cross-sectional side view of the article of footwear shown in FIG. 471.

Figure 473:
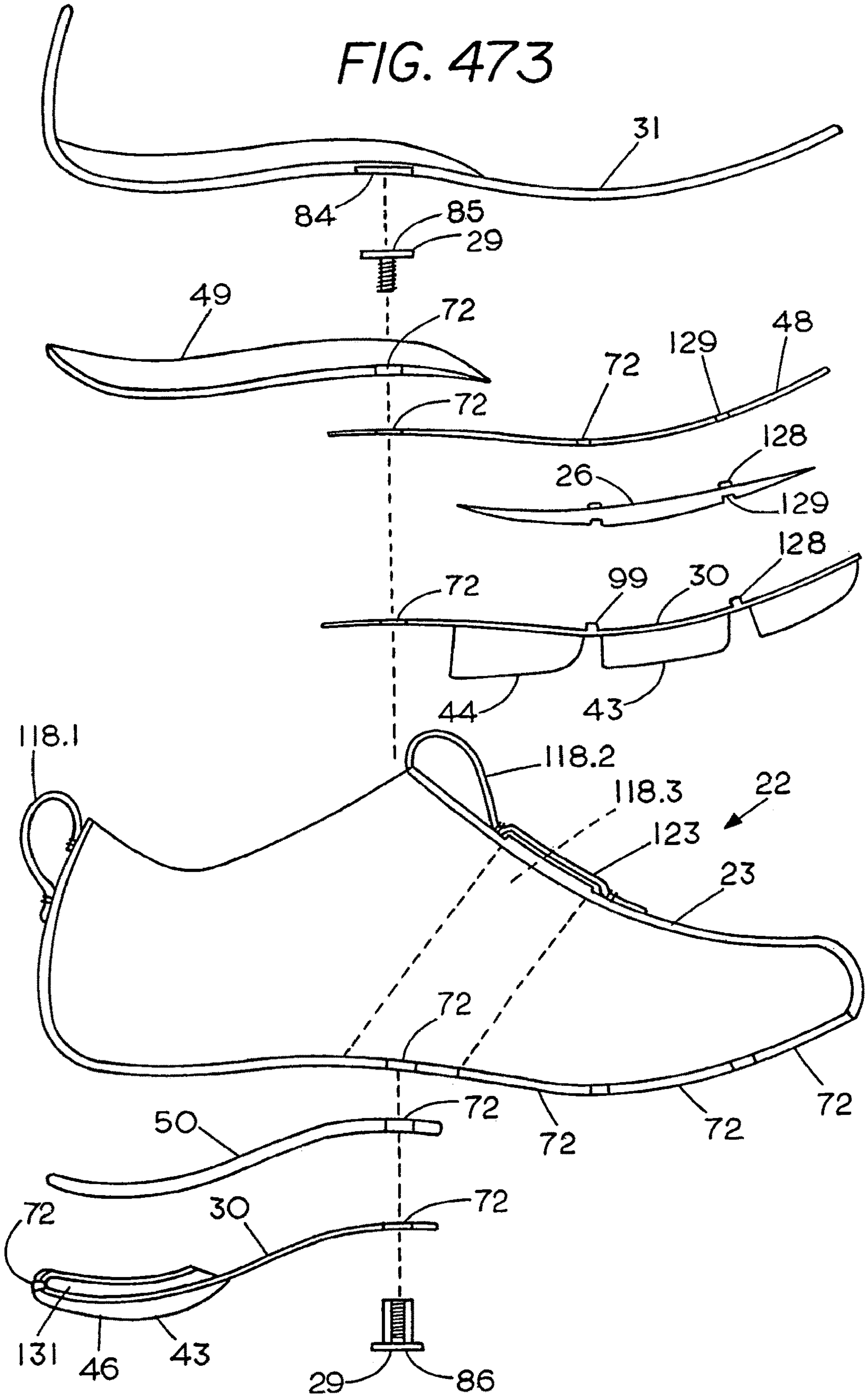

FIG. 473 is an exploded longitudinal cross-sectional side view of the article of footwear shown in FIGS. 471-472.

Figure 474:
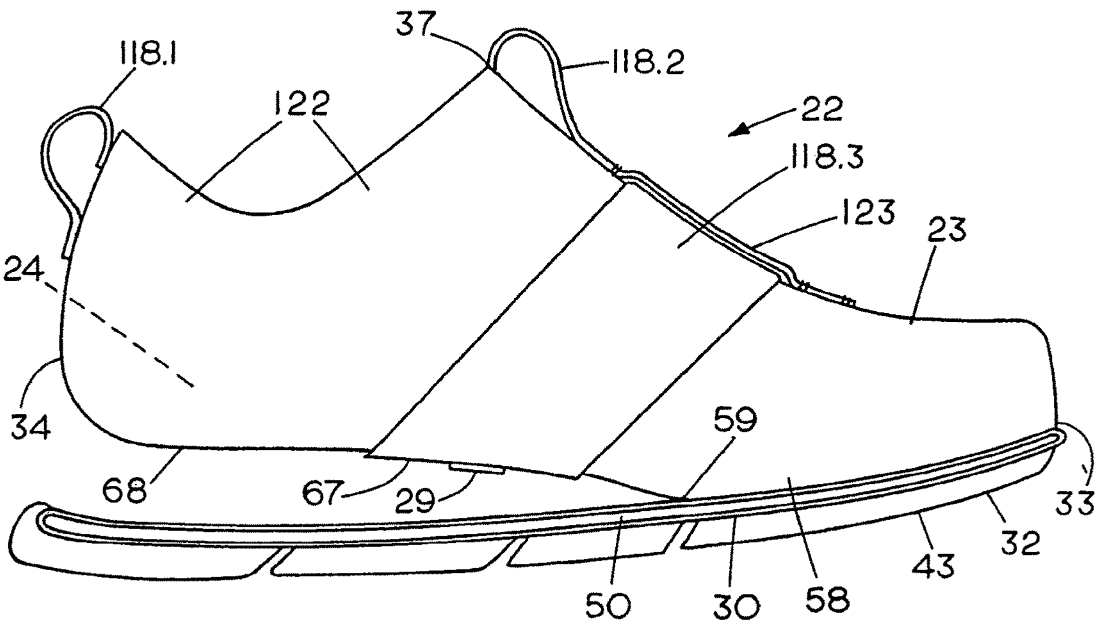

FIG. 474 is a side view of an article of footwear including a spring element including a superior spring element and an inferior spring element, and having a flexural axis located in the forefoot area.

Figure 475:
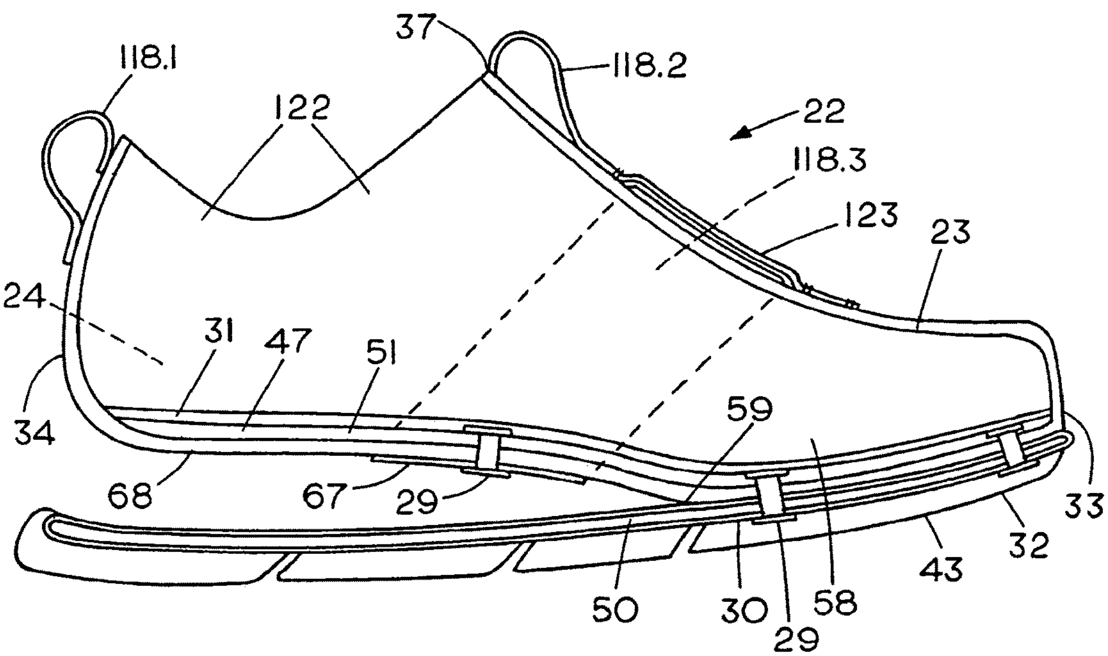

FIG. 475 is a longitudinal cross-sectional side view of the article of footwear shown in FIG. 474.

Figure 476:
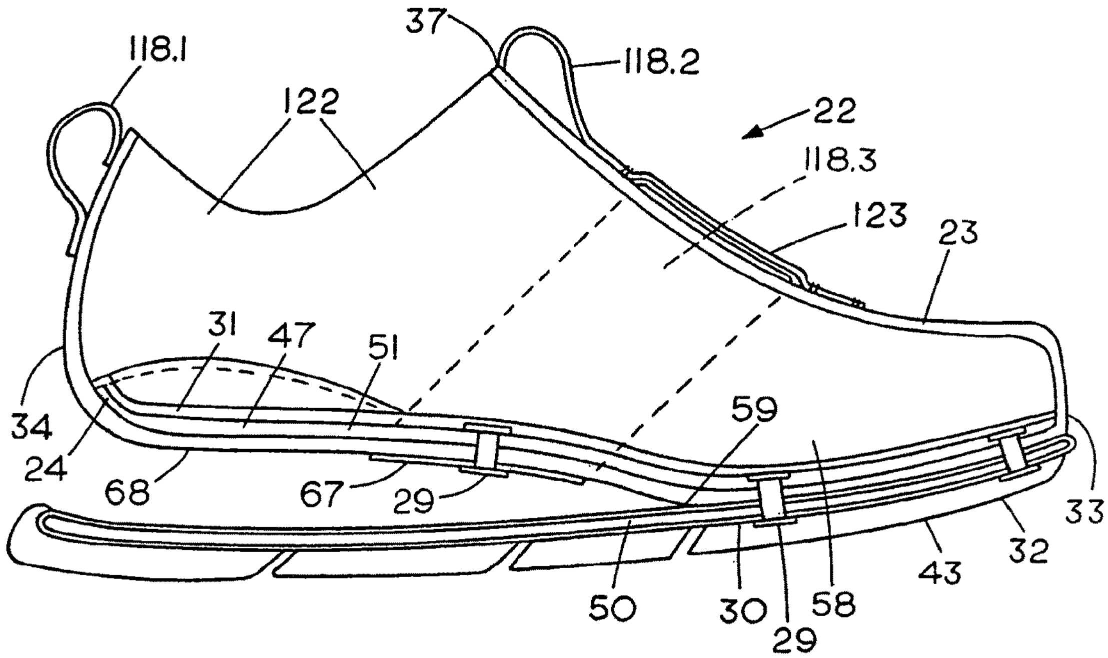

FIG. 476 is a longitudinal cross-sectional side view of an article of footwear generally similar to that shown in FIG. 475, but the superior spring element further includes an integral heel counter in the rearfoot area.

Figure 477:
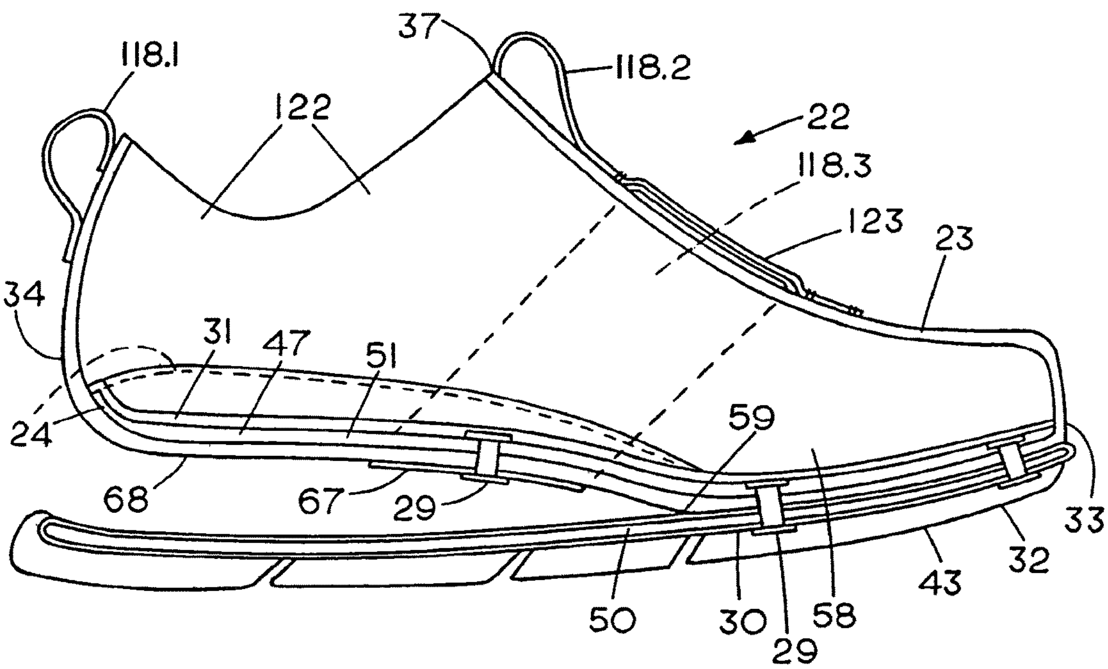

FIG. 477 is a longitudinal cross-sectional side view of an article of footwear generally similar to that shown in FIG. 475, but the superior spring element further includes an integral heel counter in the rearfoot area that extends into midfoot area, and a portion of the forefoot area.

Figure 478:
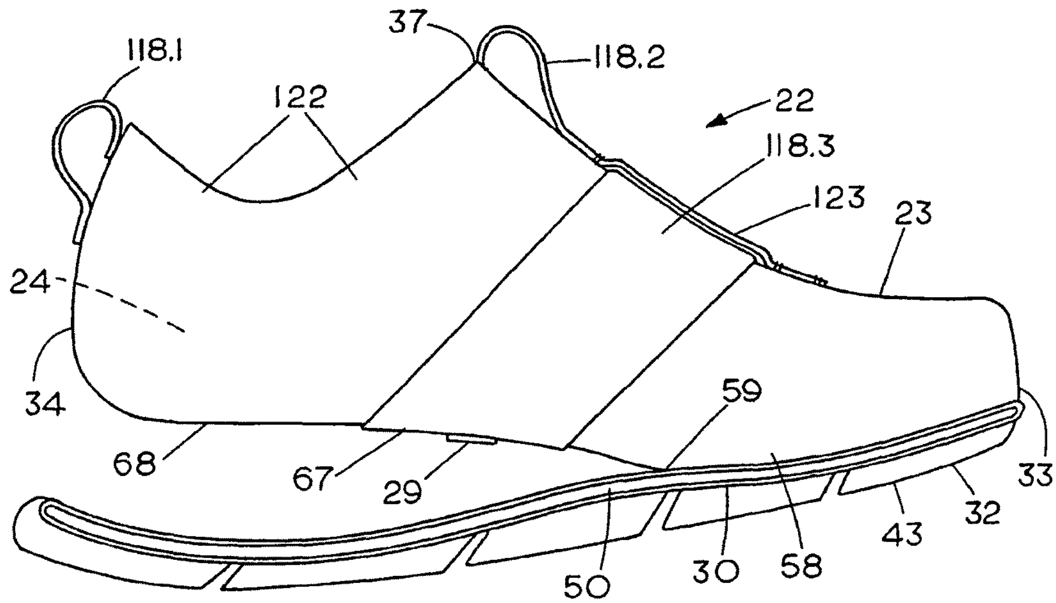

FIG. 478 is a side view of an article of footwear generally similar to that shown in FIG. 474, but including an inferior spring element having downward curvature posterior of the flexural axis, and upwards curvature near the posterior end of the inferior spring element.

Figure 479:
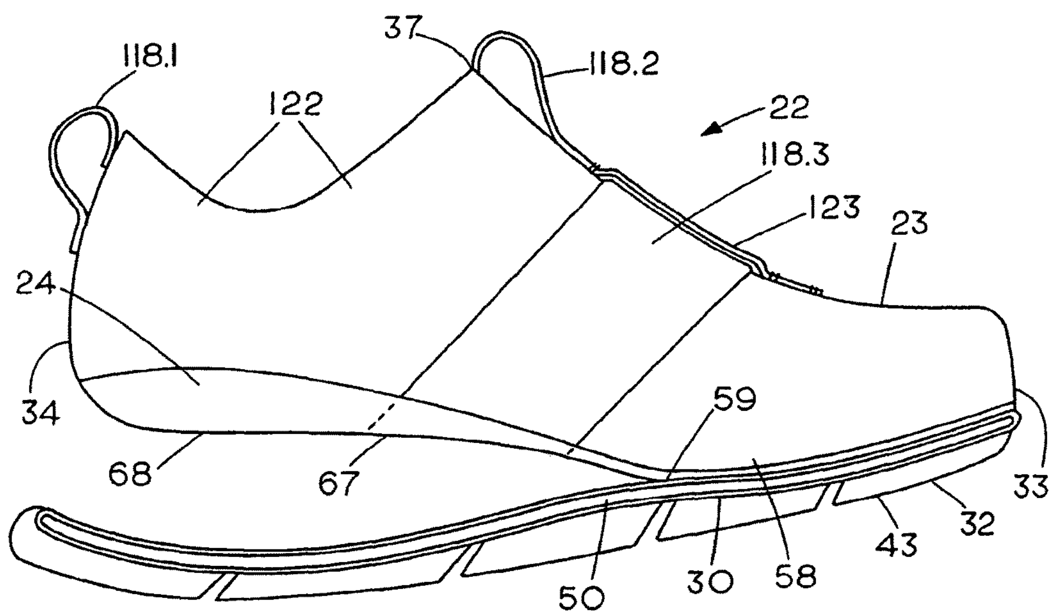

FIG. 479 is a side view of an article of footwear generally similar to that shown in FIG. 478, but having a superior spring element that is affixed in functional relation by adhesive to the exterior of the upper.

Figure 480:
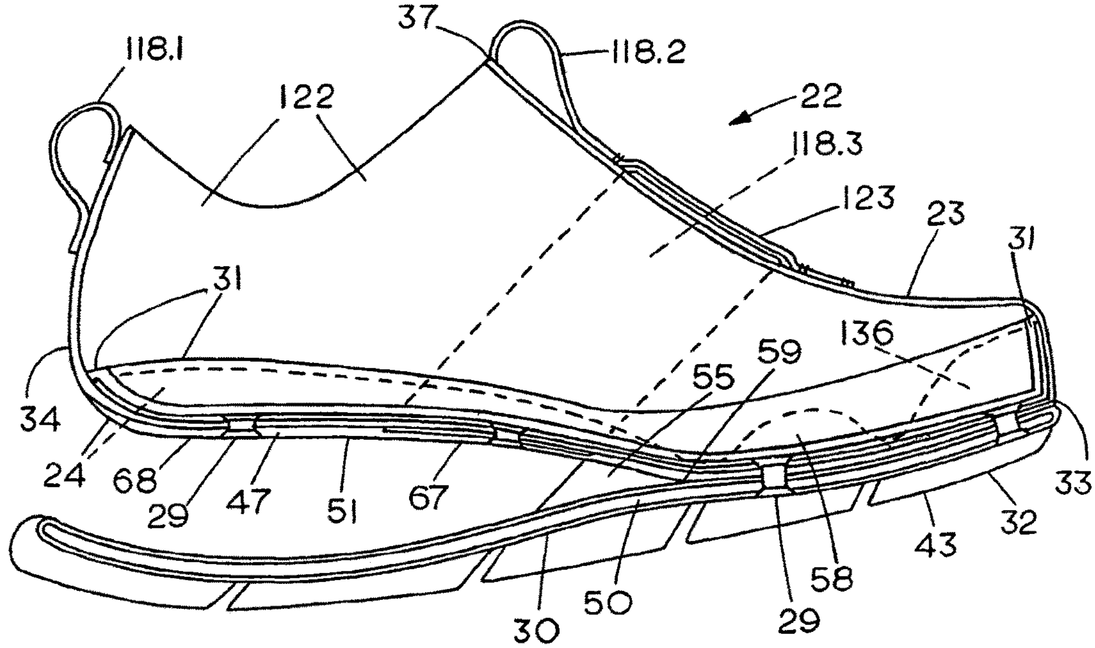

FIG. 480 is a longitudinal cross-sectional side view of an article of footwear generally similar to that shown in FIG. 479, but further including an internal stability element, whereby the upper can instead be affixed in functional relation to the superior spring element by mechanical means.

Figure 481:
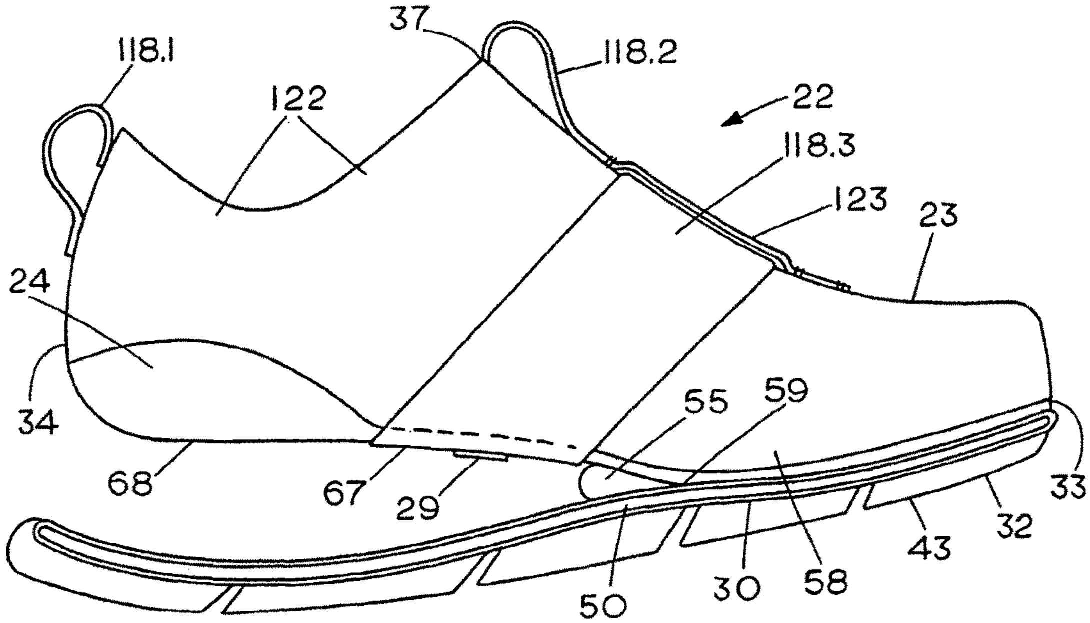

FIG. 481 is a side view of an article of footwear generally similar to that shown in FIG. 480, but including an anterior spacer having a gently rounded shape on the posterior side.

Figure 482:
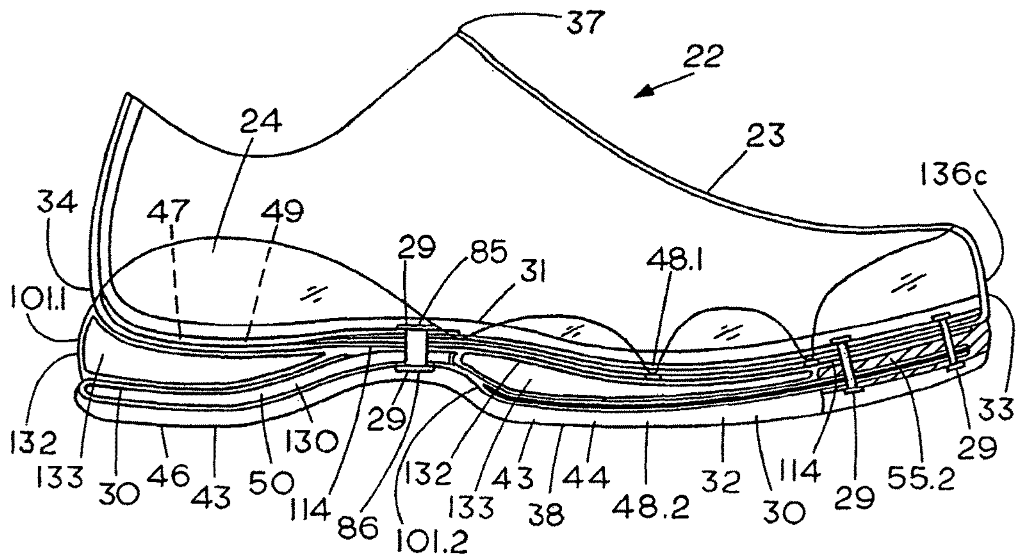

FIG. 482 is a longitudinal cross-sectional side view of an article of footwear including two fluid-filled bladders, and an outsole that extends substantially full length between the posterior side and the anterior side of the article of footwear.

Figure 483:
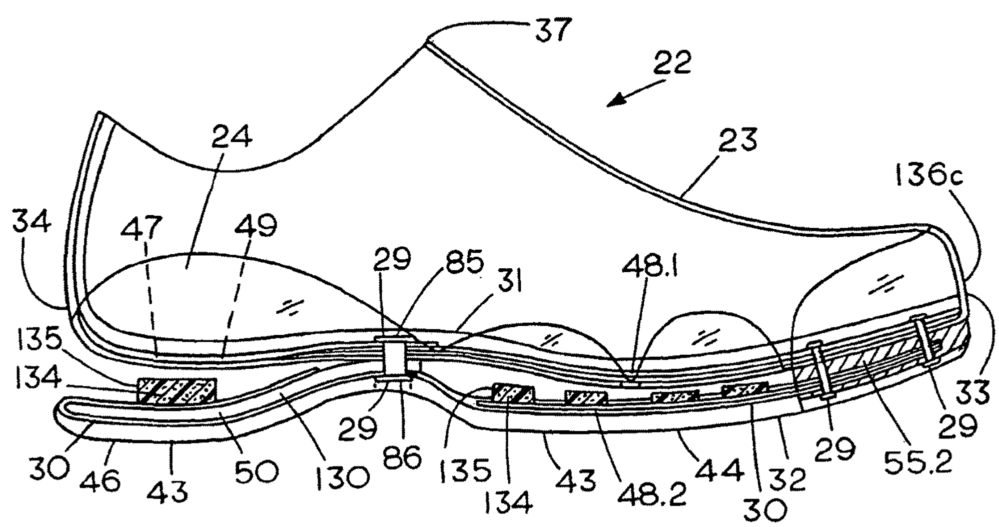

FIG. 483 is a longitudinal cross-sectional side view of an article of footwear including a plurality of foam cushioning elements, and an outsole that extends substantially full length between the posterior side and the anterior side of the article of footwear.

Figure 484:
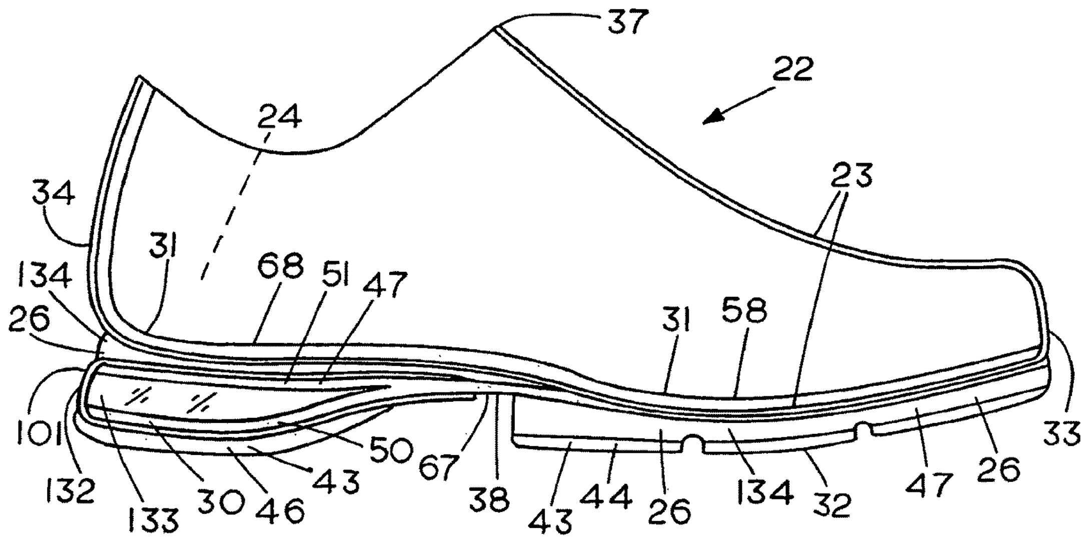

FIG. 484 is a longitudinal cross-sectional side view of an article of footwear including a midsole between the upper and superior side of the spring element in the rearfoot area, and also between the inferior side of the spring element and the outsole in the forefoot area.

Figure 485:
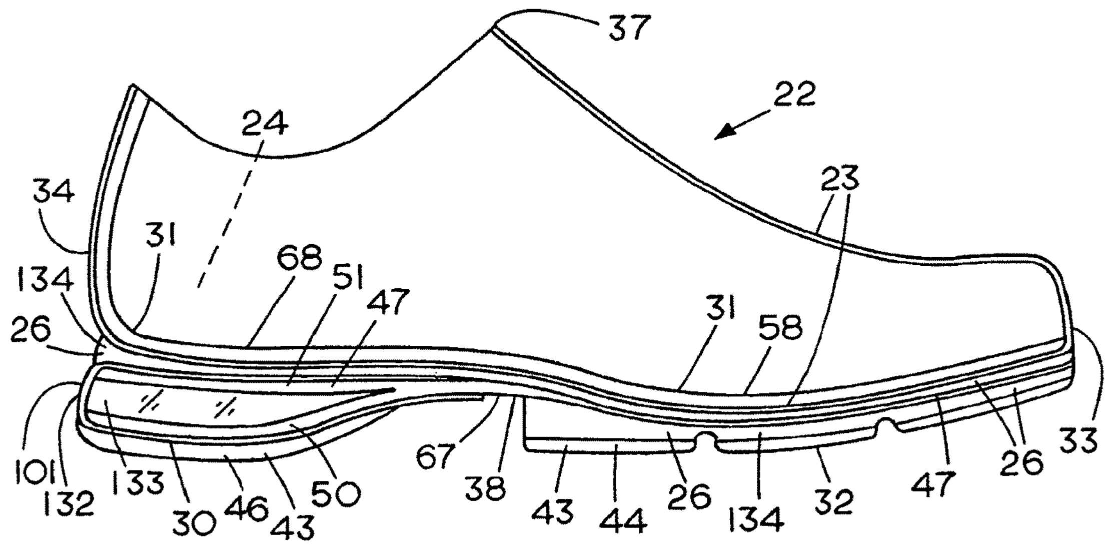

FIG. 485 is a longitudinal cross-sectional side view of an article of footwear including a midsole between the upper and superior side of the spring element in the rearfoot area, midfoot area, and forefoot area, and also between the inferior side of the spring element and the outsole in the forefoot area.

Figure 486:
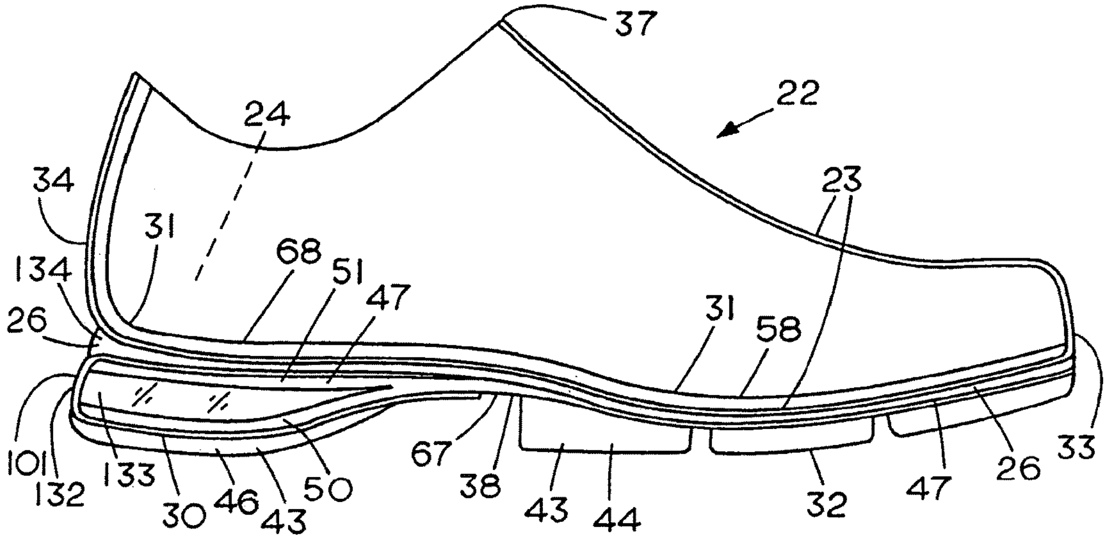

FIG. 486 is a longitudinal cross-sectional side view of an article of footwear including a midsole between the upper and superior side of the spring element in the rearfoot area, midfoot area, and forefoot area.

Figure 487:
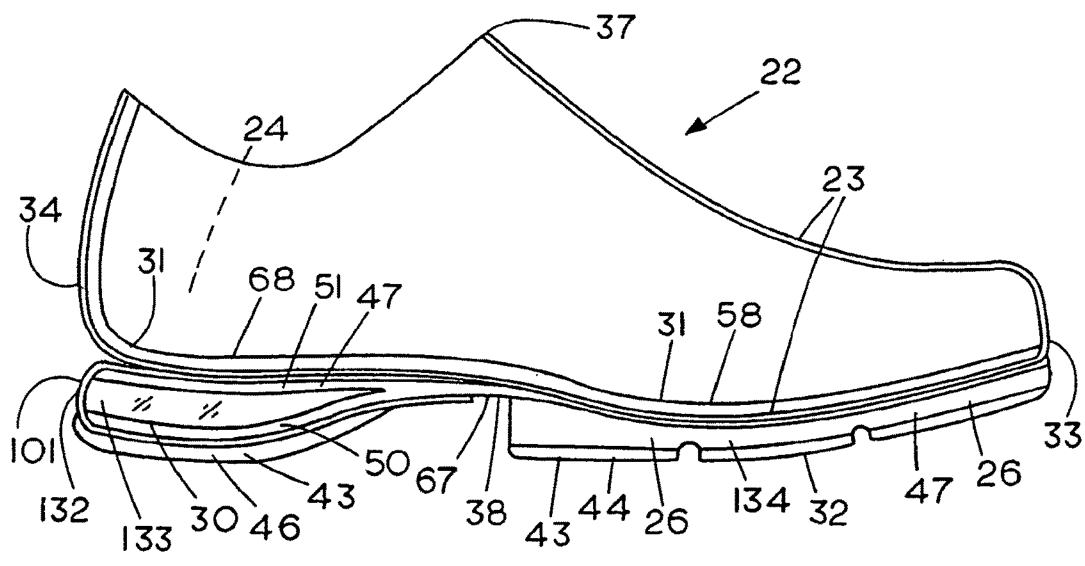

FIG. 487 is a longitudinal cross-sectional side view of an article of footwear including a midsole in the forefoot area between the inferior side of the spring element and the outsole.

FIG. 488 is a longitudinal cross-sectional side view of a boot including a spring element.

FIG. 489 is a longitudinal cross-sectional side view of an article of footwear including an anterior outsole element including a web portion.

Figure 490:
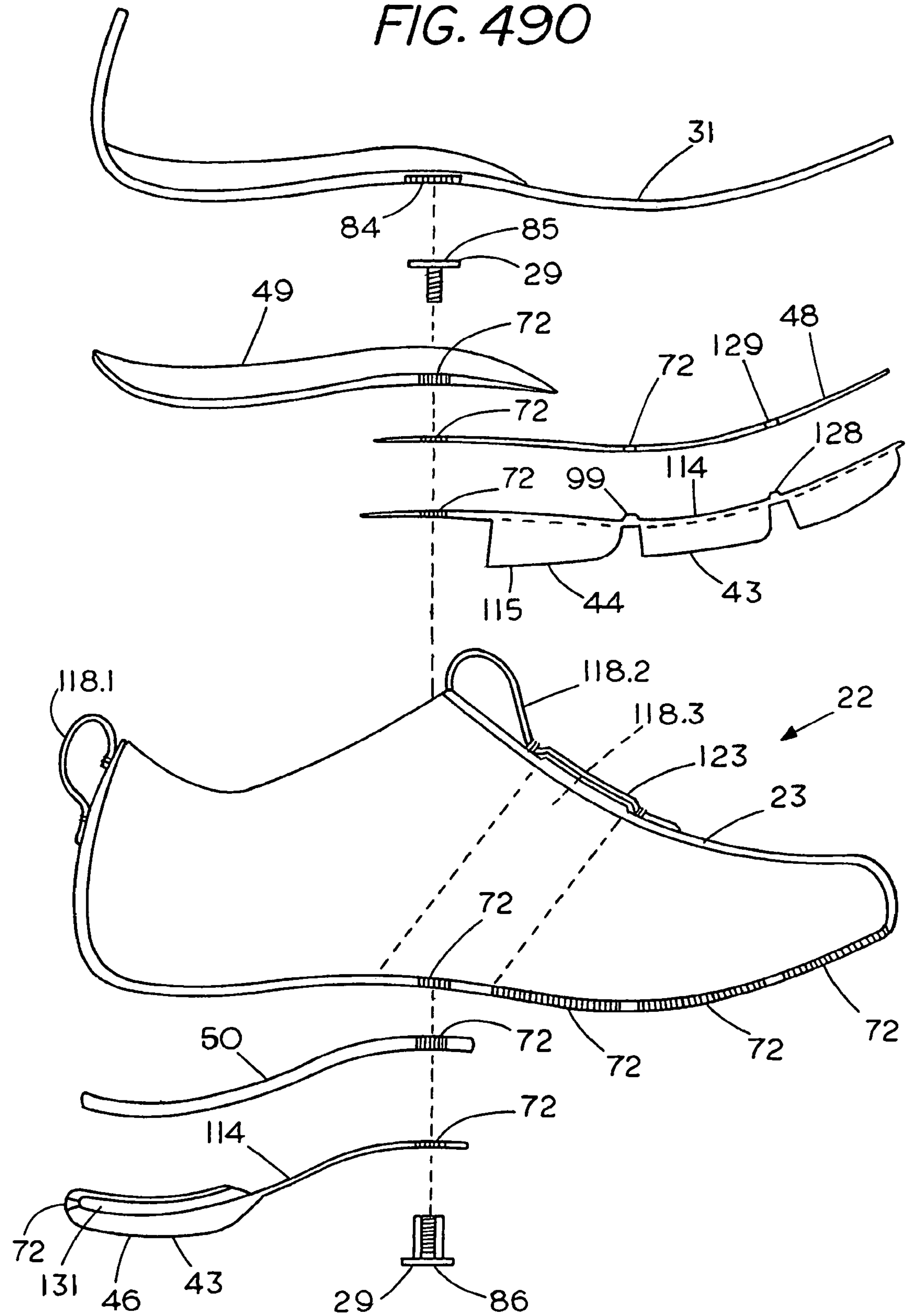

FIG. 490 is an exploded longitudinal cross-sectional side view of the article of footwear shown in FIG. 489.

Figure 491:
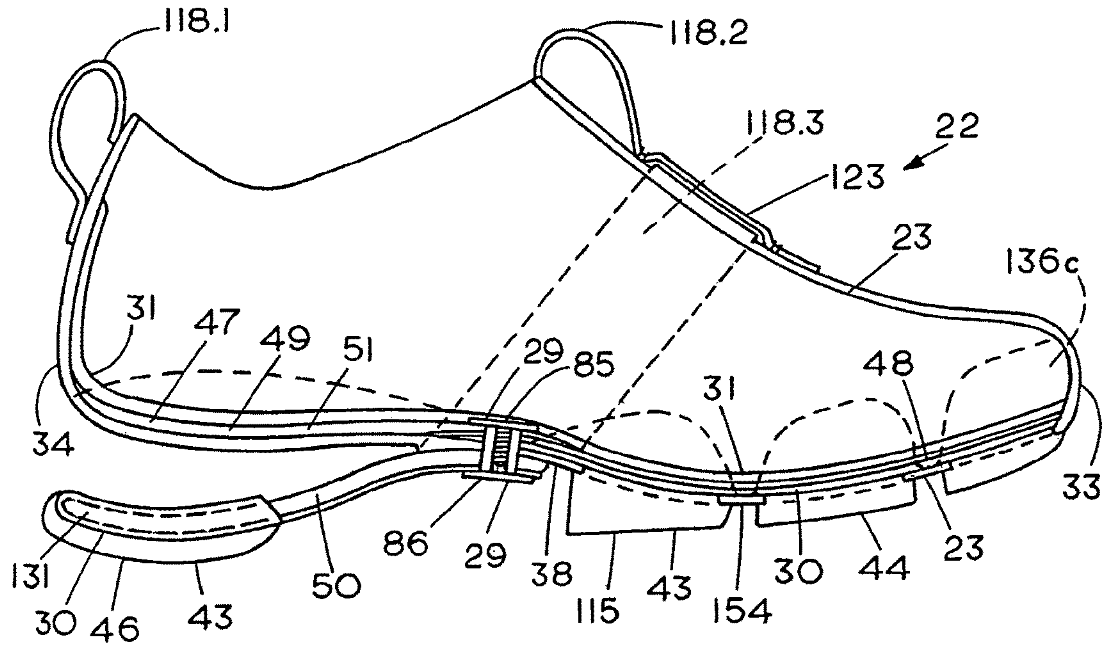

FIG. 491 is a longitudinal cross-sectional side view of an article of footwear including an anterior outsole element having an undercut portion.

Figure 492:
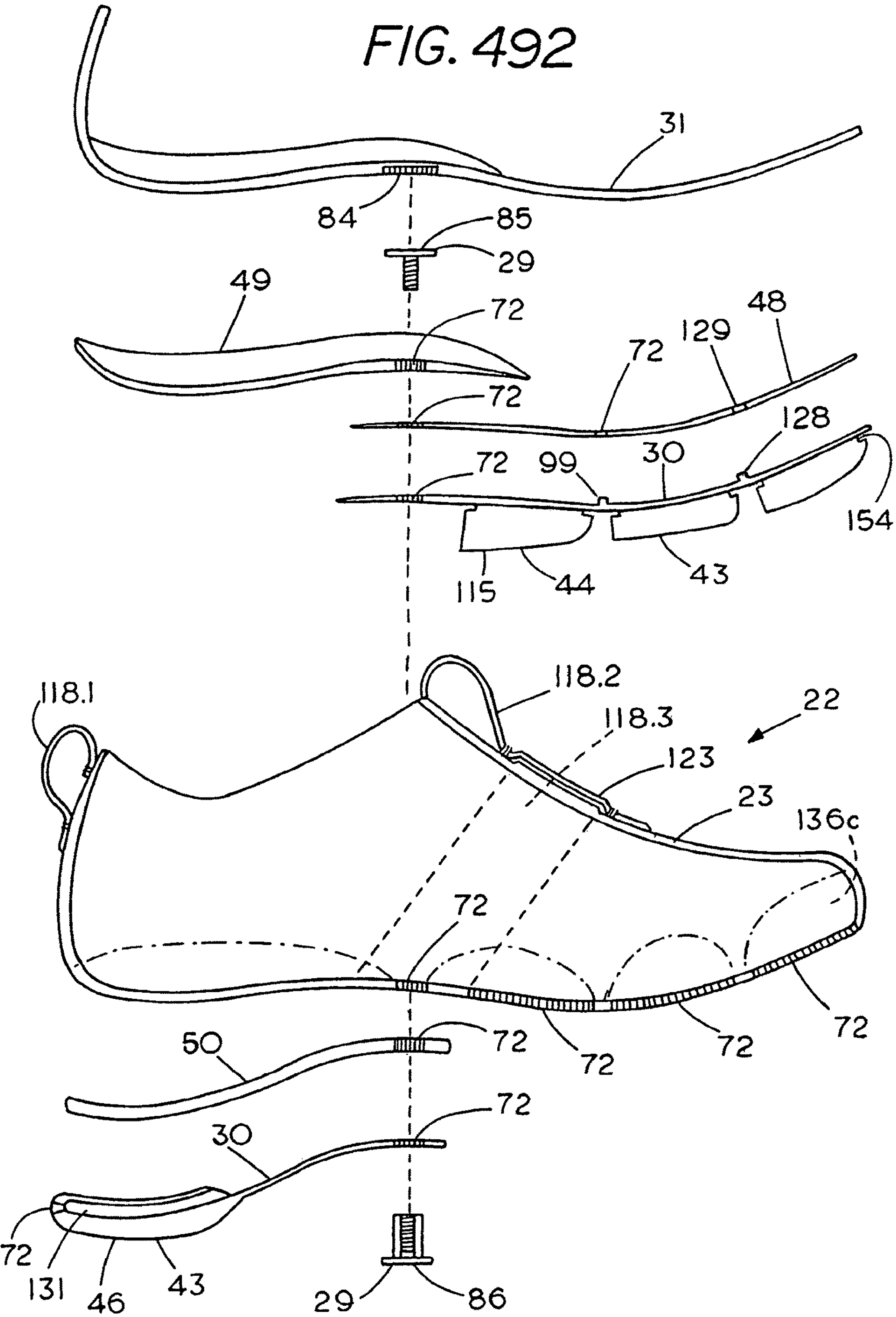

FIG. 492 is an exploded longitudinal cross-sectional side view of the article of footwear shown in FIG. 491.

Figure 493:
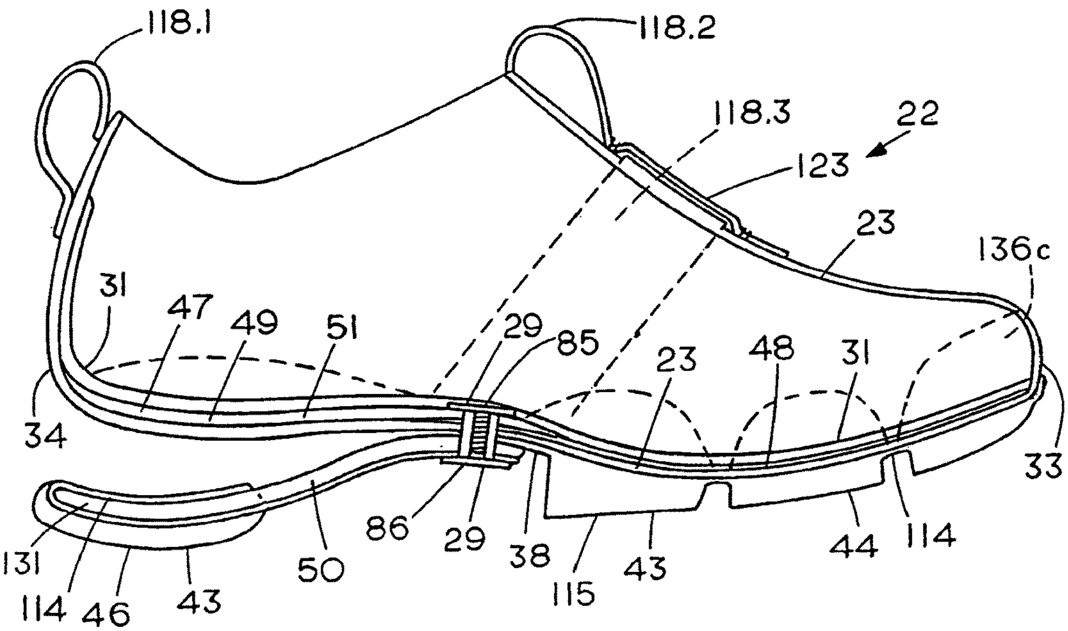

FIG. 493 is a longitudinal cross-sectional side view of an article of footwear including an anterior outsole element including a web portion that is affixed to the exterior of the upper.

Figure 494:
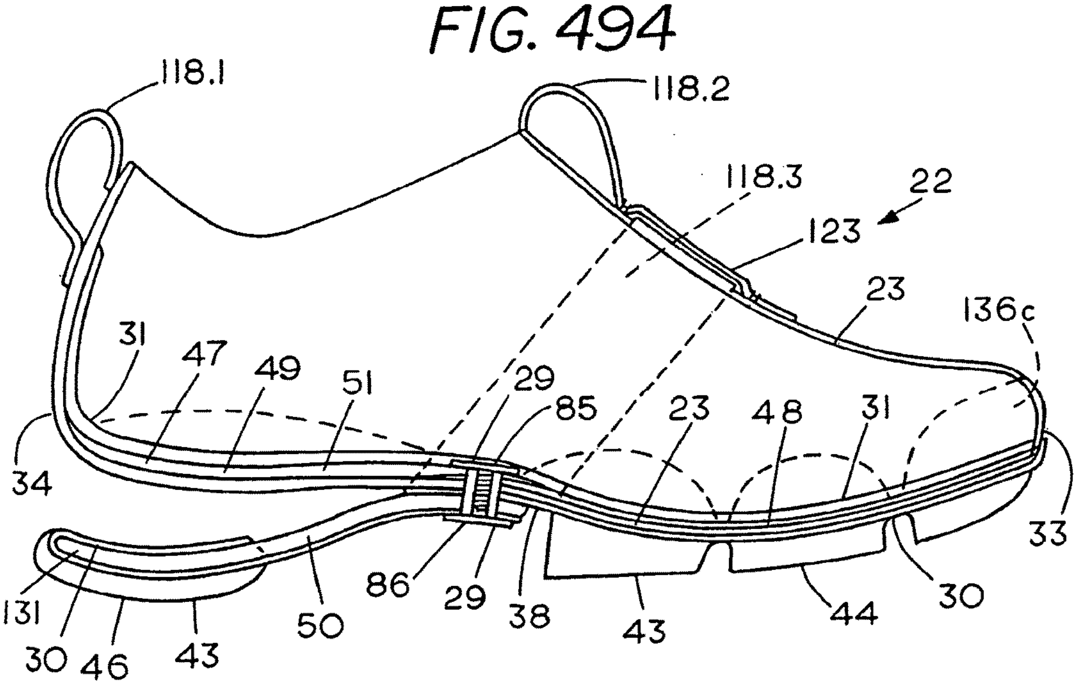

FIG. 494 is a longitudinal cross-sectional side view of an article of footwear including an anterior outsole element including a backing that is affixed to the exterior of the upper.

Figure 495:
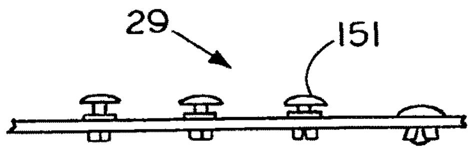

FIG. 495 shows multiple views of a prior art snap rivet.

Figure 496:
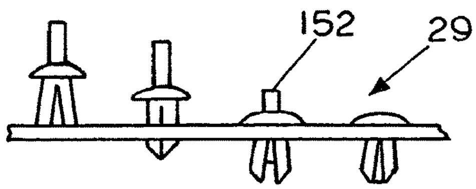

FIG. 496 shows multiple views of a prior art push rivet.

Figure 497:
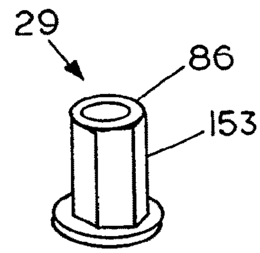

FIG. 497 is a perspective view of a prior art full-hex blind threaded insert which can possibly be used as the female part of a fastener.

Figure 498:
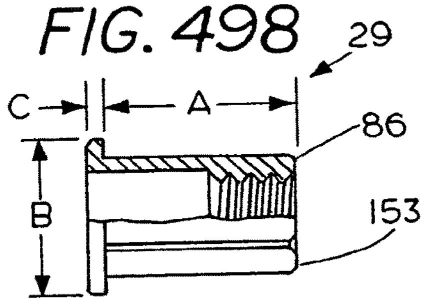

FIG. 498 is a side view of the prior art full-hex blind threaded insert shown in FIG. 497.

Figure 499:
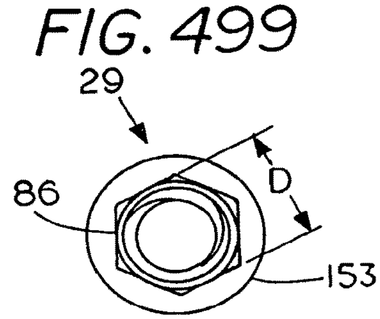

FIG. 499 is a top view of the prior art full-hex blind threaded insert shown in FIG. 497.

Figure 500:
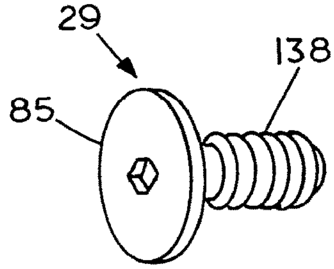

FIG. 500 is a perspective view of a male part of a fastener for possible use with the female part of a fastener shown in FIGS. 497-499.

Figure 501:
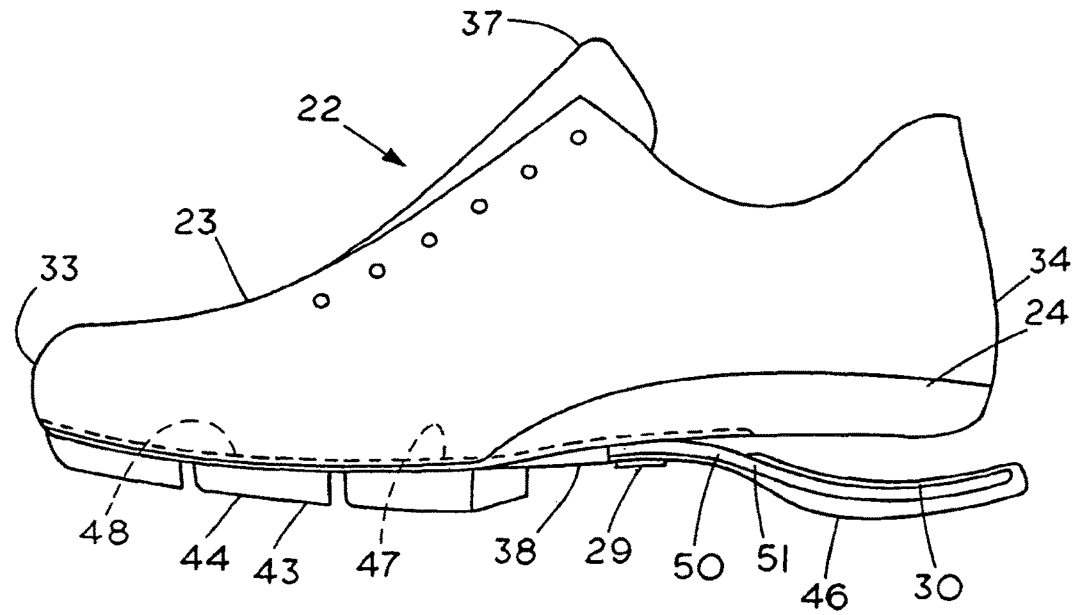

FIG. 501 is a medial side view of an article of footwear including a three quarter length superior spring element and external heel counter.

Figure 502:
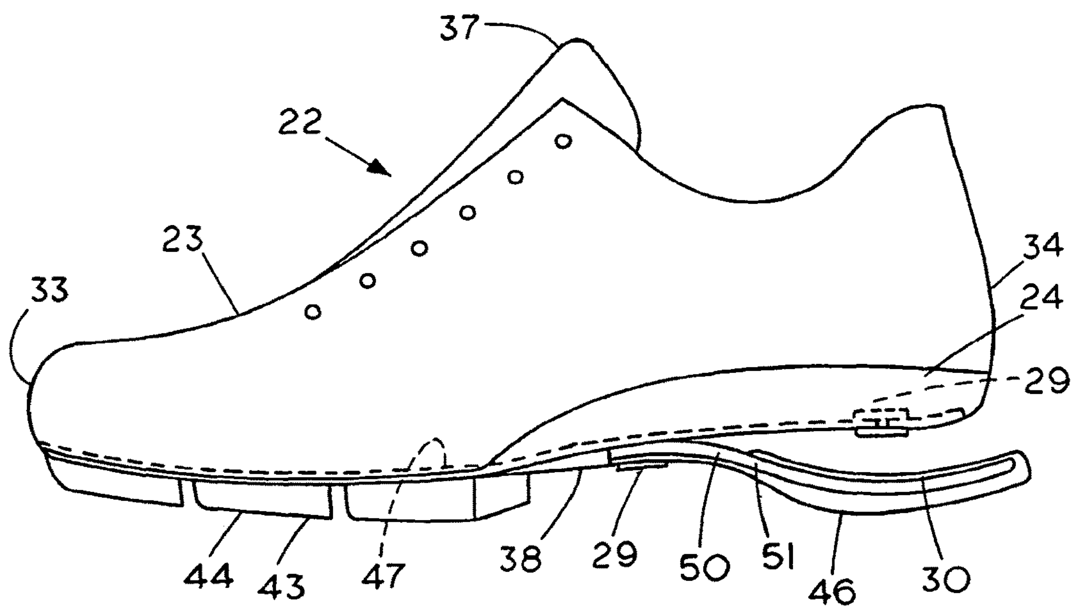

FIG. 502 is a medial side view of an article of footwear including a full length superior spring element and external heel counter.

Figure 503:
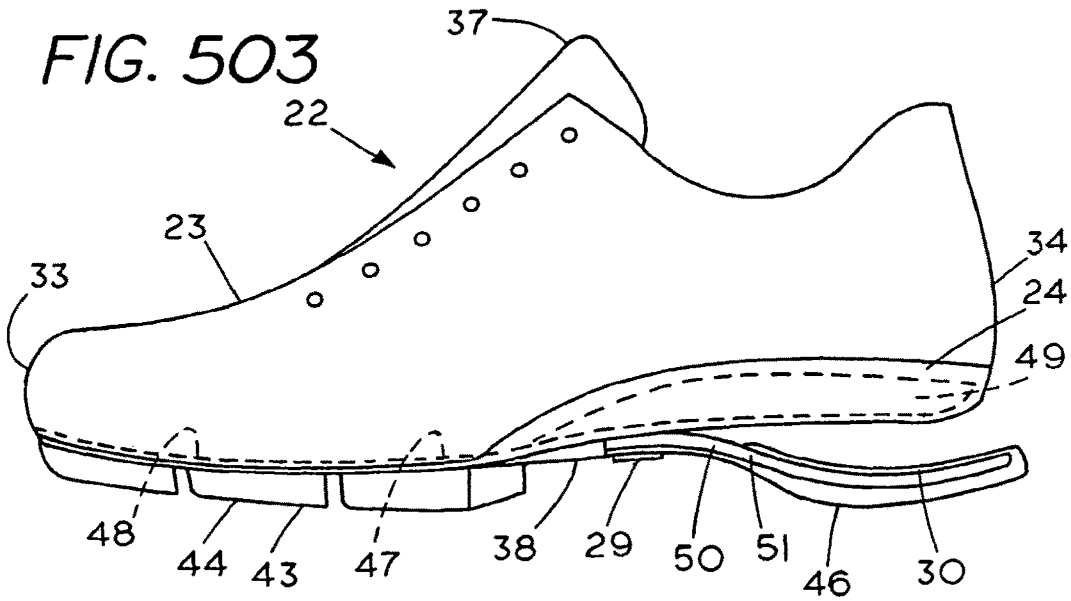

FIG. 503 is a medial side view of an article of footwear including a full length superior spring element including an anatomical three dimensional cupped shape, and also external heel counter.

Figure 504:
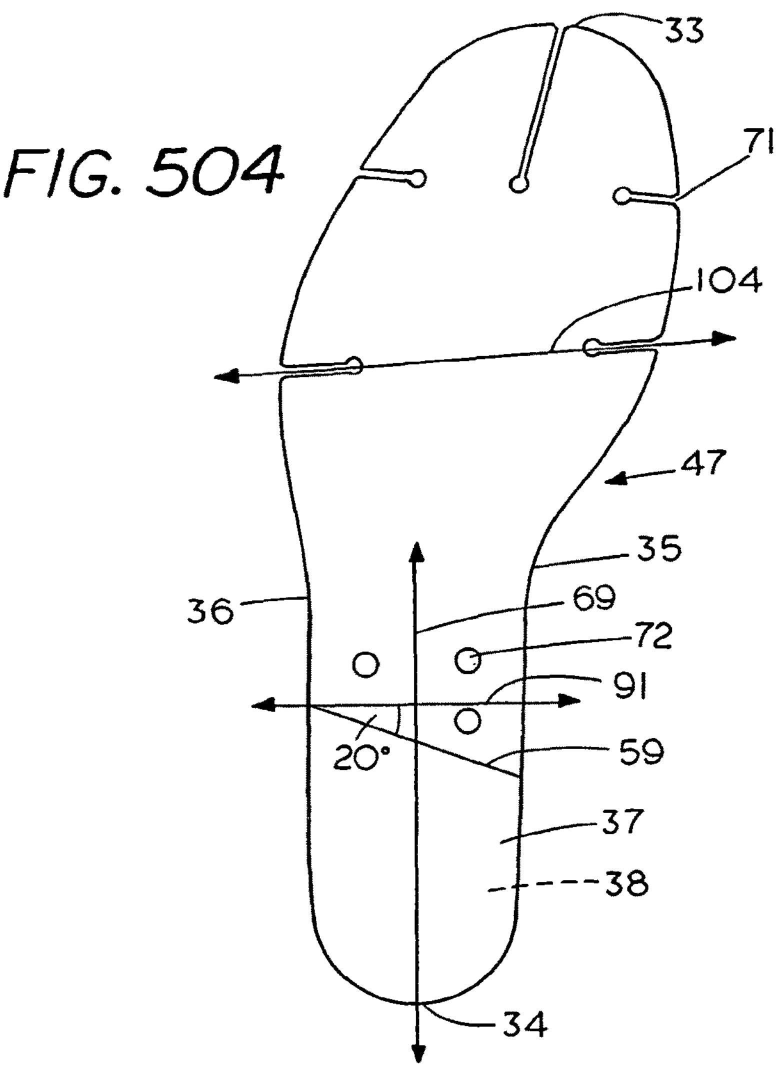

FIG. 504 is a top plan view of a generally planar superior spring element similar to that shown with dashed lines in FIG. 502 for use in an article of footwear.

Figure 505:
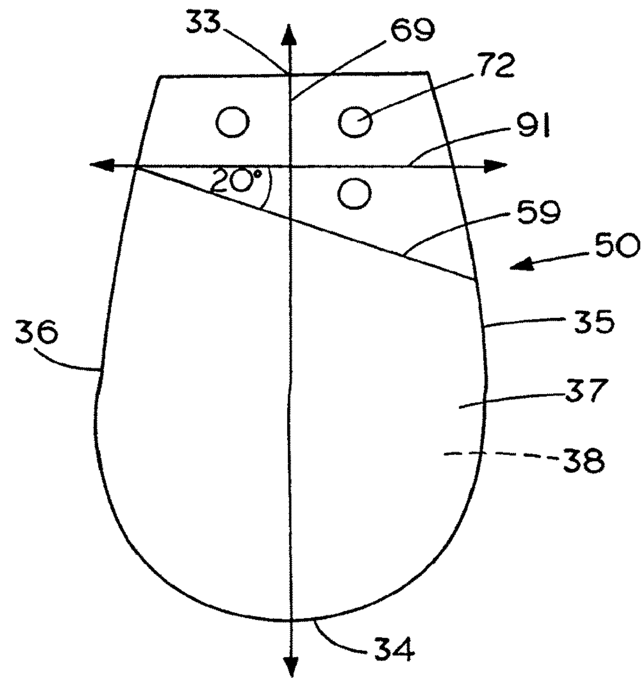

FIG. 505 is a top plan view of the inferior spring element shown in FIGS. 501-503.

Figure 506:
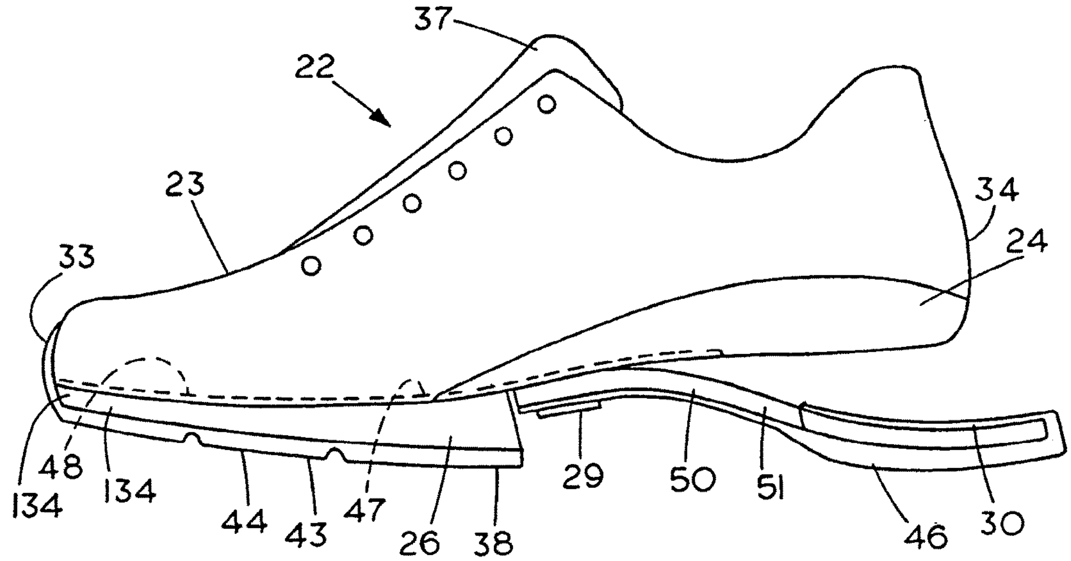

FIG. 506 is a medial side view of an article of footwear including a three quarter length superior spring element, and an inferior spring element that extends rearward substantially beyond the posterior side of the upper.

Figure 507:
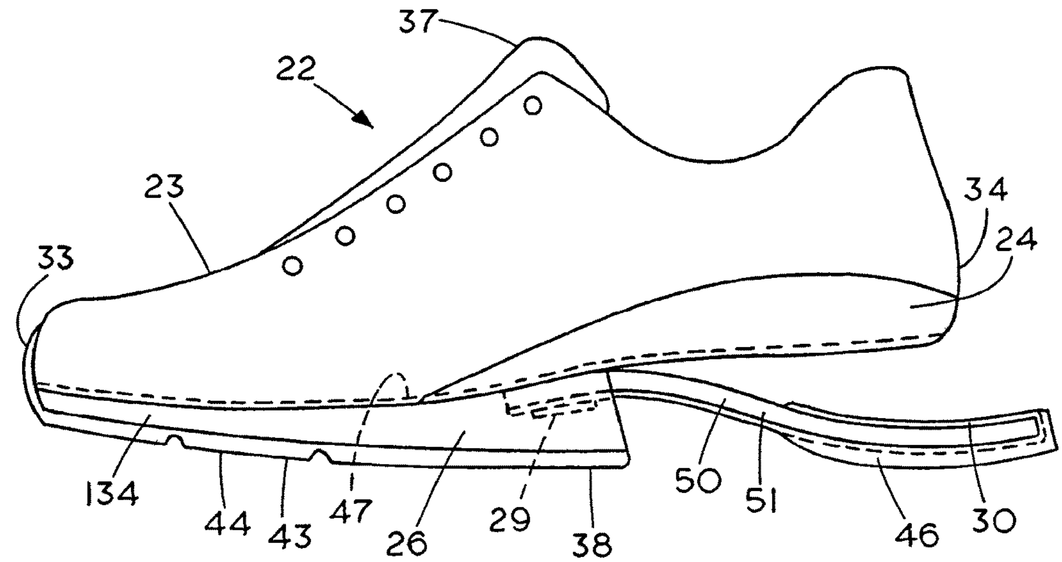

FIG. 507 is a medial side view of an article of footwear including a full length superior spring element, and an inferior spring element that extends rearward substantially beyond the posterior side of the upper.

Figure 508:
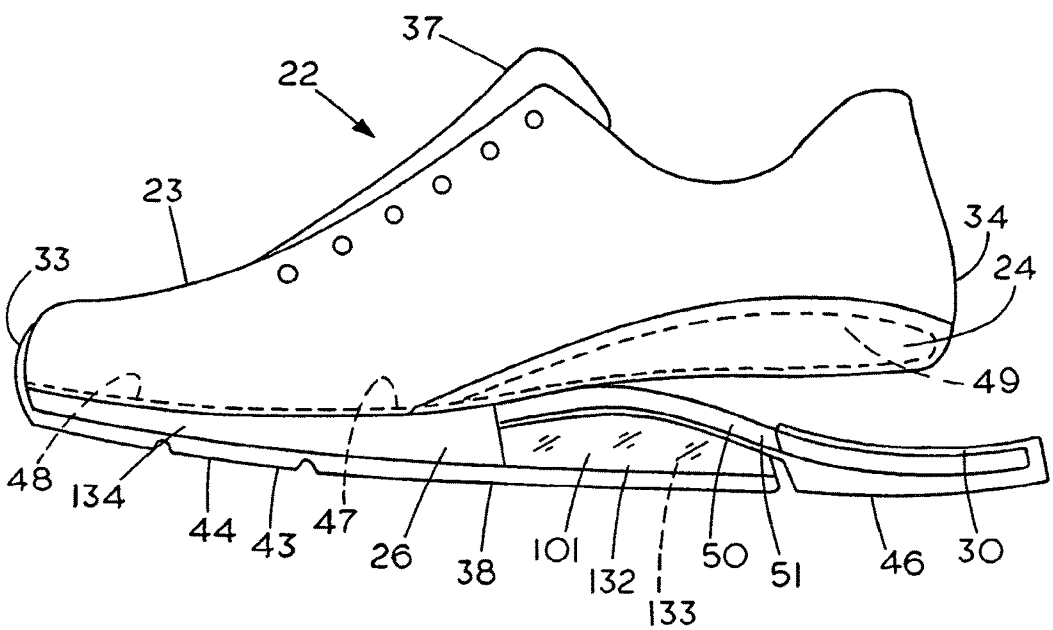

FIG. 508 is a medial side view of an article of footwear including a full length superior spring element including an anatomical three dimensional cupped shape, a fluid-filled bladder, and an inferior spring element that extends rearward substantially beyond the posterior side of the upper.

Figure 509:
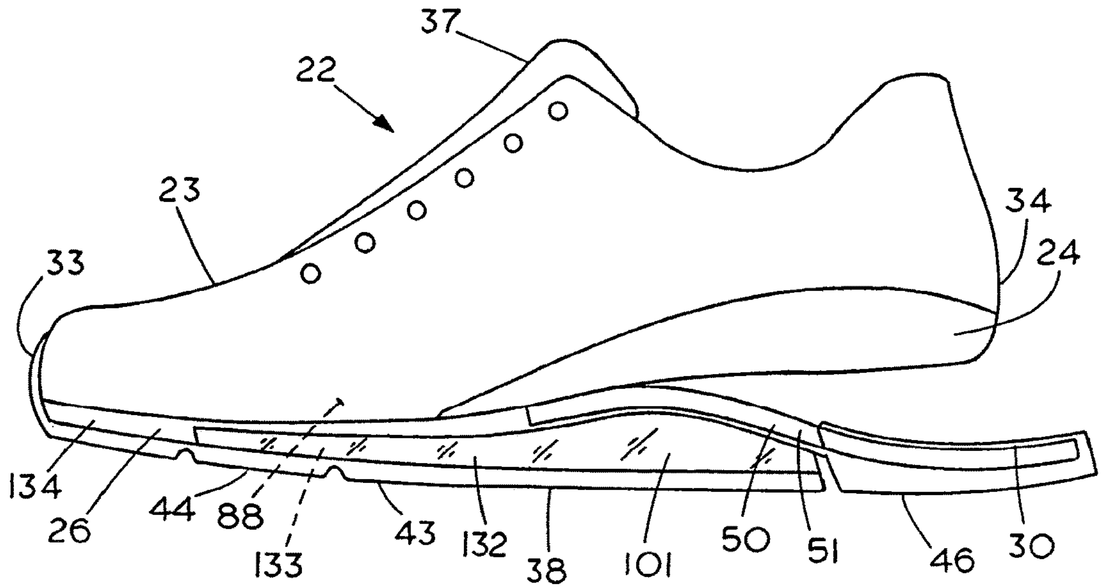

FIG. 509 is a medial side view of an article of footwear including a fluid-filled bladder that extends between the midfoot and forefoot areas, and an inferior spring element that extends rearward substantially beyond the posterior side of the upper.

Figure 510:
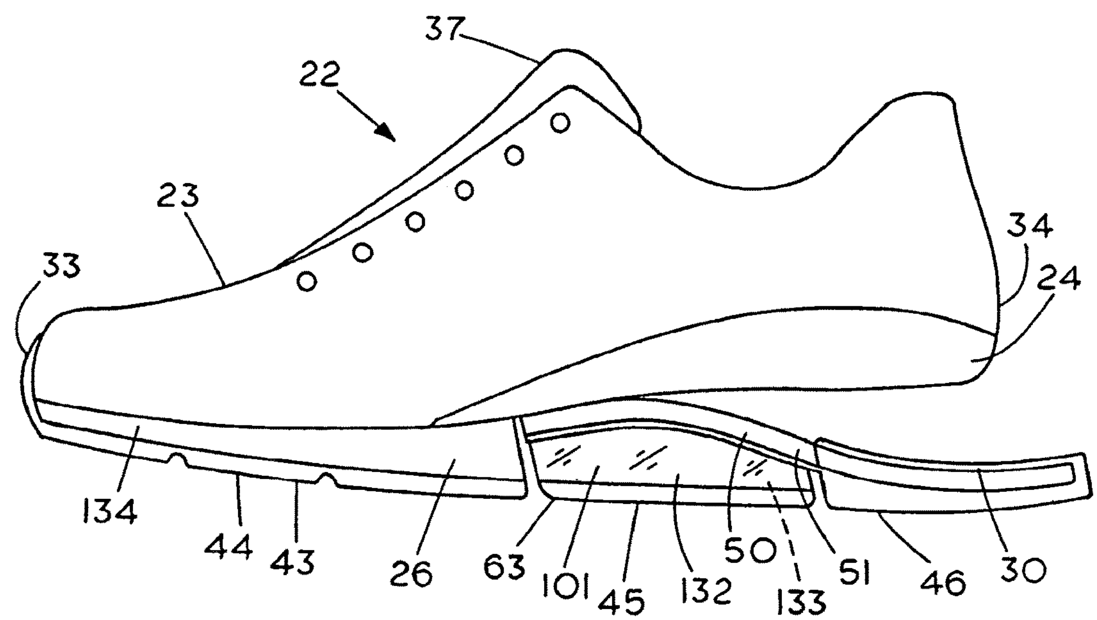

FIG. 510 is a medial side view of an article of footwear including a removable middle outsole element or stabilizer that is affixed to a fluid-filled bladder, and an inferior spring element that extends rearward substantially beyond the posterior side of the upper.

Figure 511:
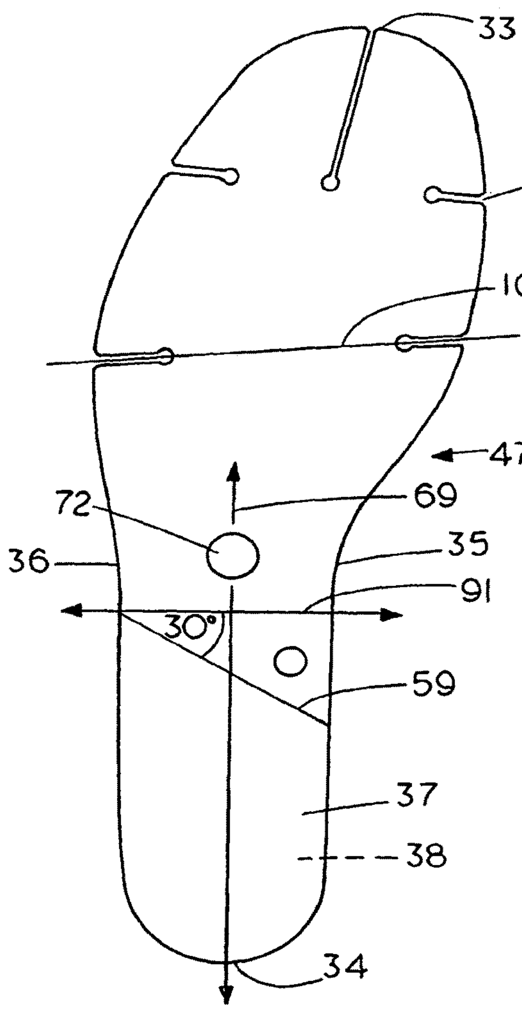

FIG. 511 is a top plan view of a superior spring element for possible use in an article of footwear generally similar to that shown in FIG. 507.

Figure 512:
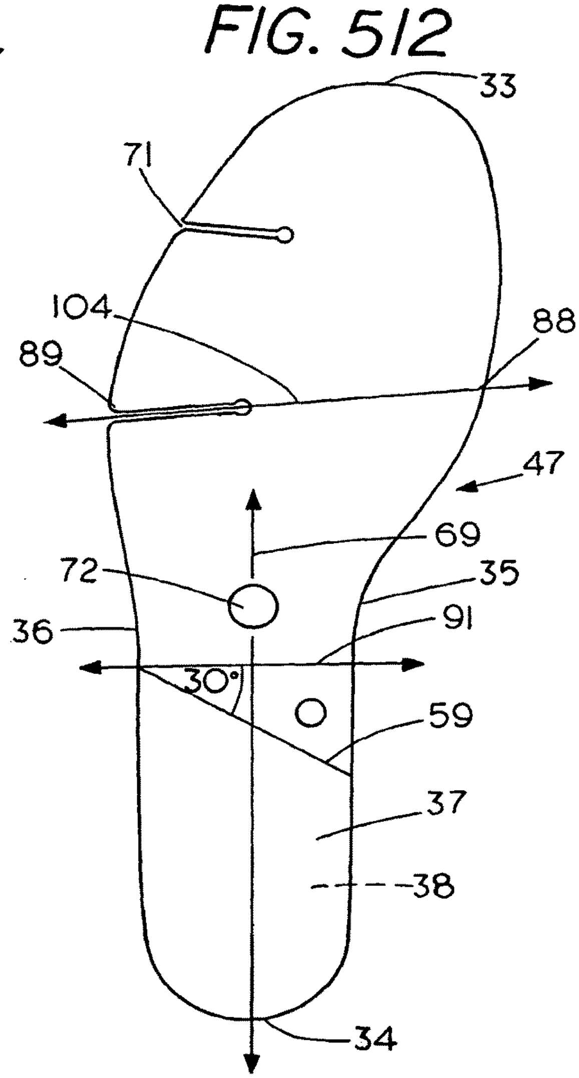

FIG. 512 is a top plan view of a superior spring element including flex notches on the lateral side for possible use in an article of footwear generally similar to that shown in FIG. 507.

Figure 513:
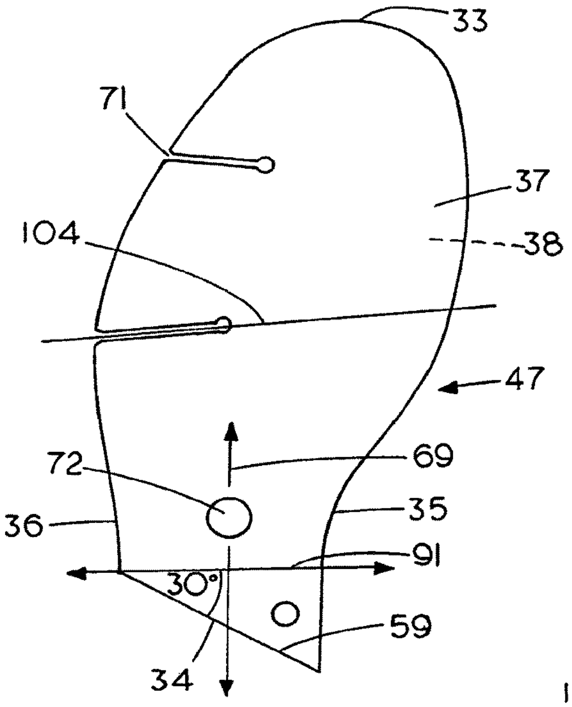

FIG. 513 is a top plan view of a three quarter length superior spring element including flex notches on the lateral side for possible use in the articles of footwear shown in FIGS. 501 and 506.

Figure 514:
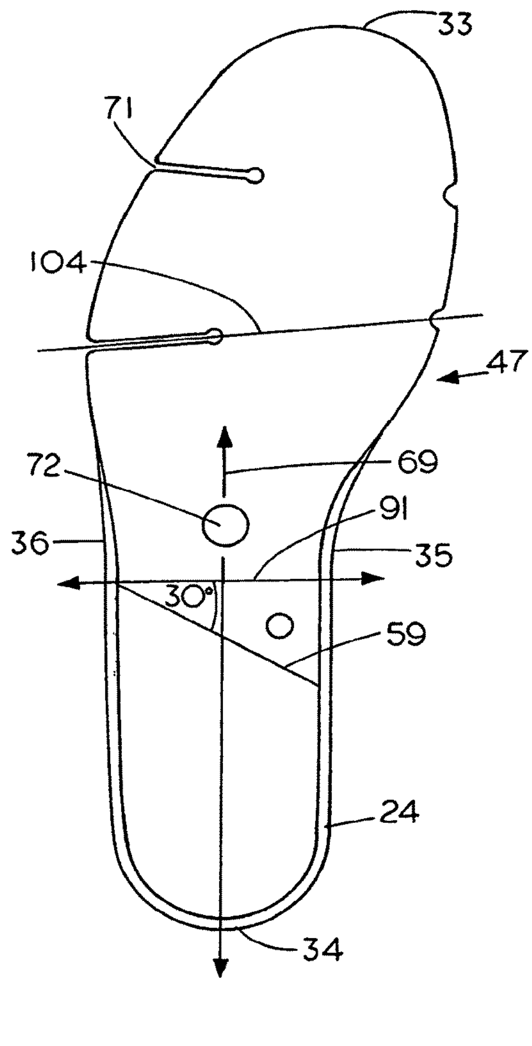

FIG. 514 is a top plan view of a superior spring element including flex notches on the lateral side and also a three dimensional cupped shape in the rearfoot area for possible use in an article of footwear generally similar to that shown in FIG. 508.

Figure 515:
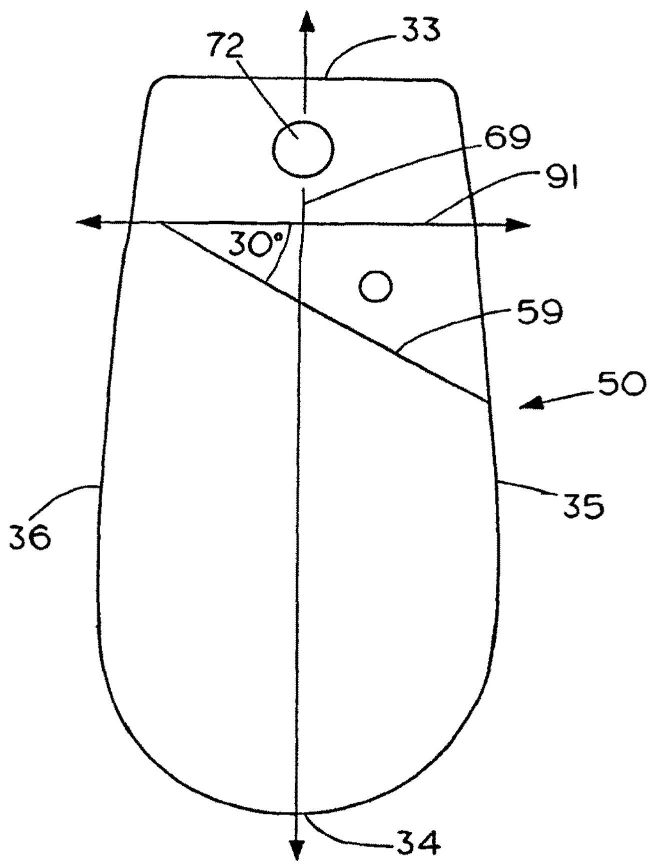

FIG. 515 is a top plan view of the inferior spring element shown in FIGS. 506-510, and 519.

Figure 516:
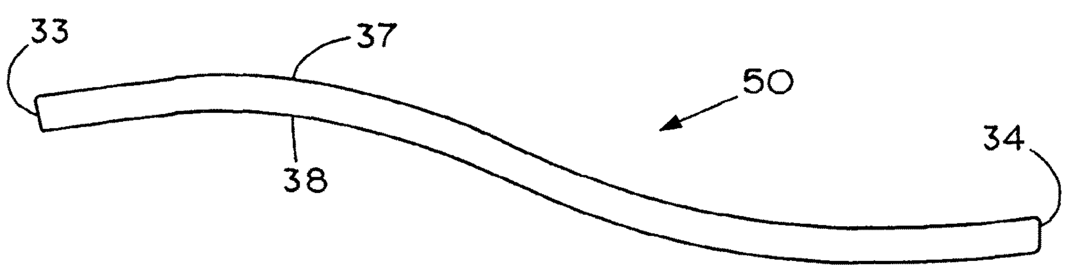

FIG. 516 is an enlarged medial side view of the inferior spring element shown in FIG. 515.

Figure 517:
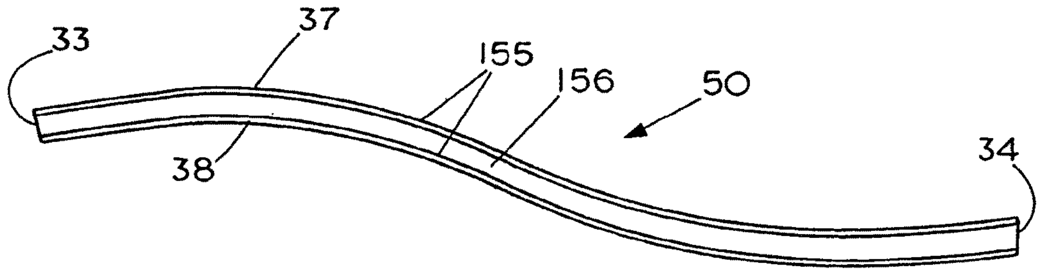

FIG. 517 is a medial side view of an alternate inferior spring element generally similar to that shown in FIGS. 515-516, but including a laminate structure.

Figure 518:
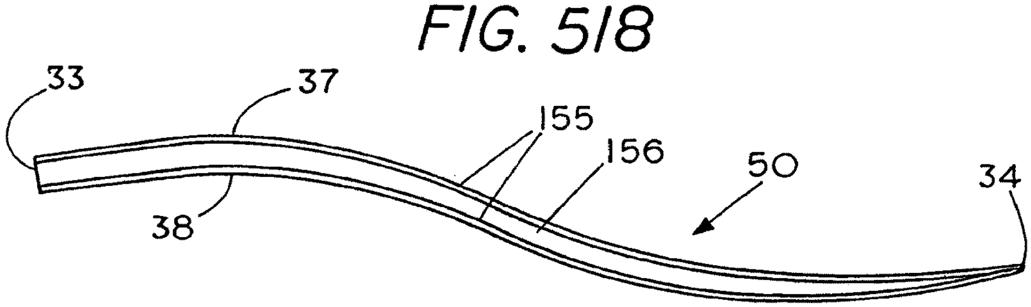

FIG. 518 is a medial side view of an alternate inferior spring element generally similar to that shown in FIG. 517, but including a laminate structure and having a tapered configuration near the posterior side.

Figure 519:
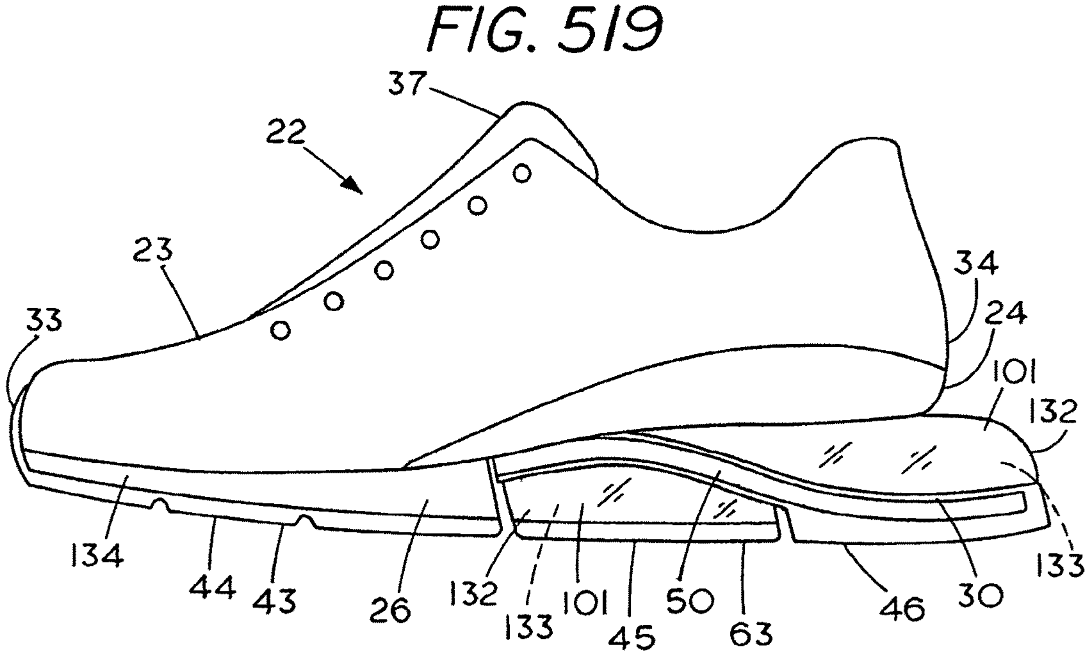

FIG. 519 is a medial side view of an article of footwear generally similar to that shown in FIG. 510, but also including a fluid-filled bladder between the inferior side of the upper and superior side of the inferior spring element.

Figure 520:
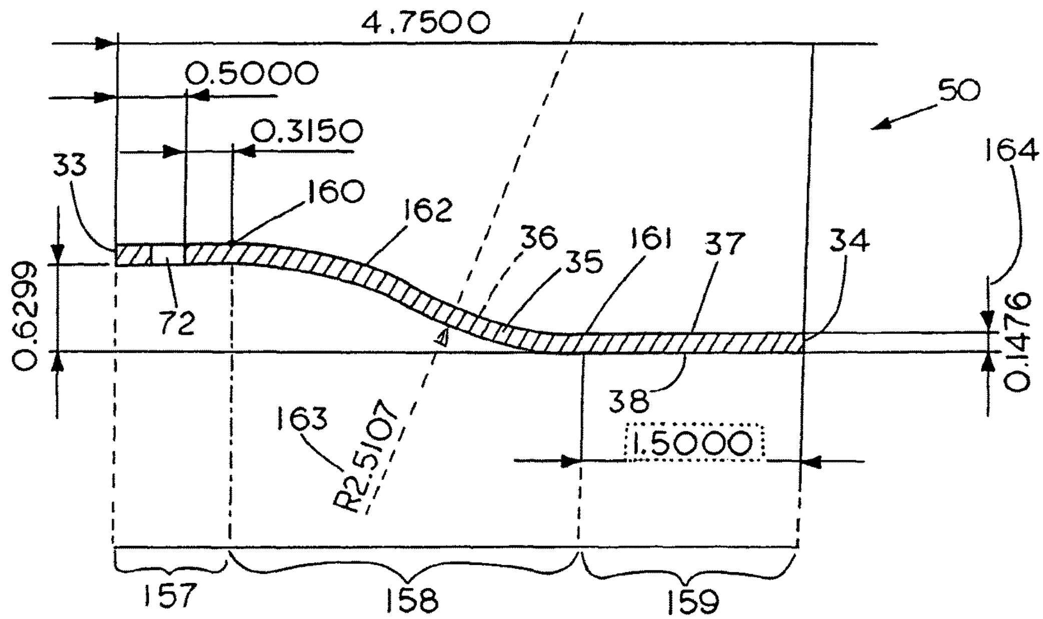

FIG. 520 is a side view of an engineering drawing of an inferior spring element.

Figure 521:
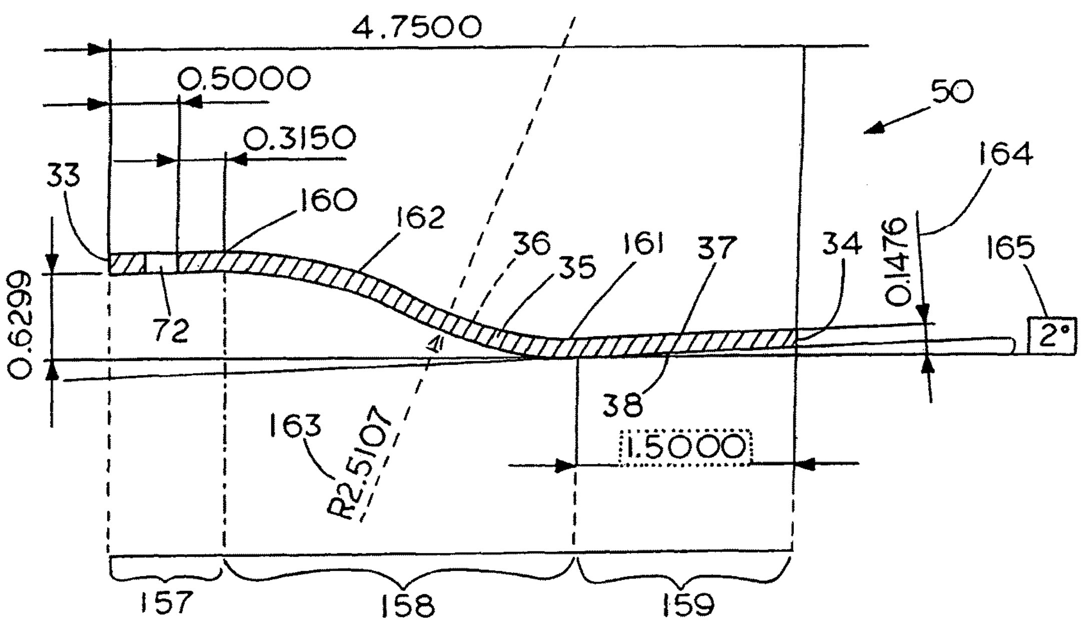

FIG. 521 is a side view of an engineering drawing of an inferior spring element generally similar to that shown in FIG. 520, but having a tapered posterior portion.

Figure 522:
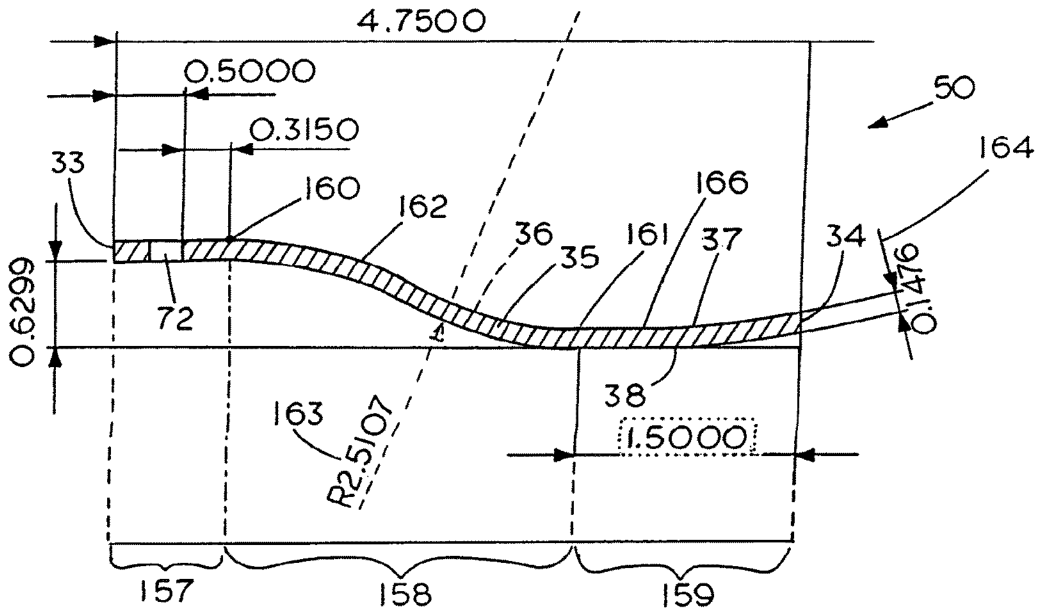

FIG. 522 is a side view of an engineering drawing of an inferior spring element generally similar to that shown in FIG. 520, but having a curved posterior portion.

Figure 523:
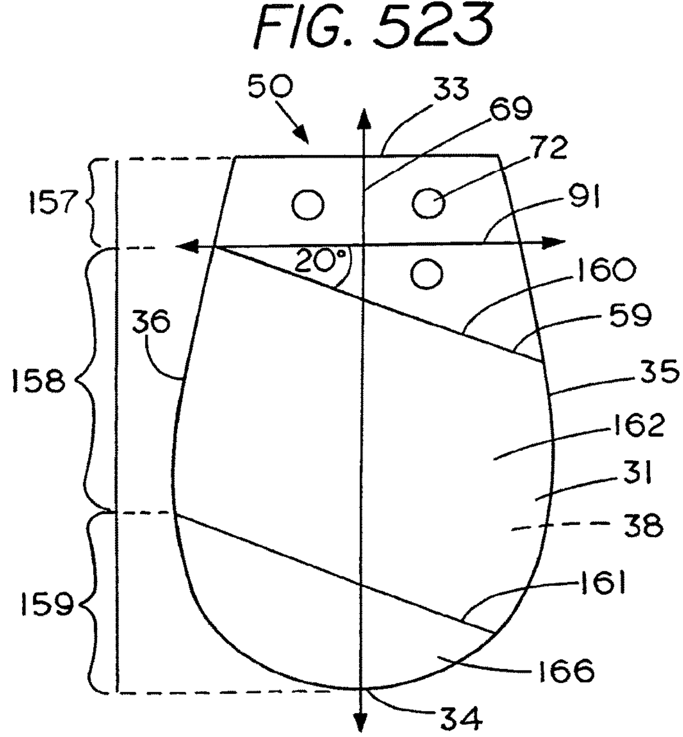

FIG. 523 is a top plan view of an inferior spring element generally similar to that shown in FIGS. 505 and 520, but showing several features of the inferior spring element in greater detail.

Figure 524:
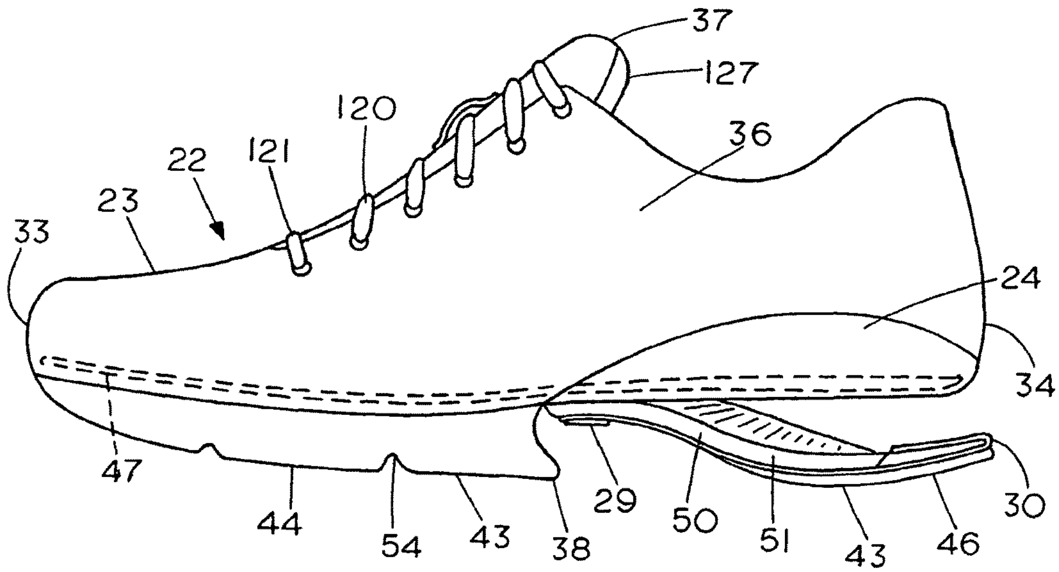

FIG. 524 is a lateral side view of an article of footwear including an external heel counter, and a spring element including a superior spring element shown with phantom dashed lines and an inferior spring element.

Figure 525:
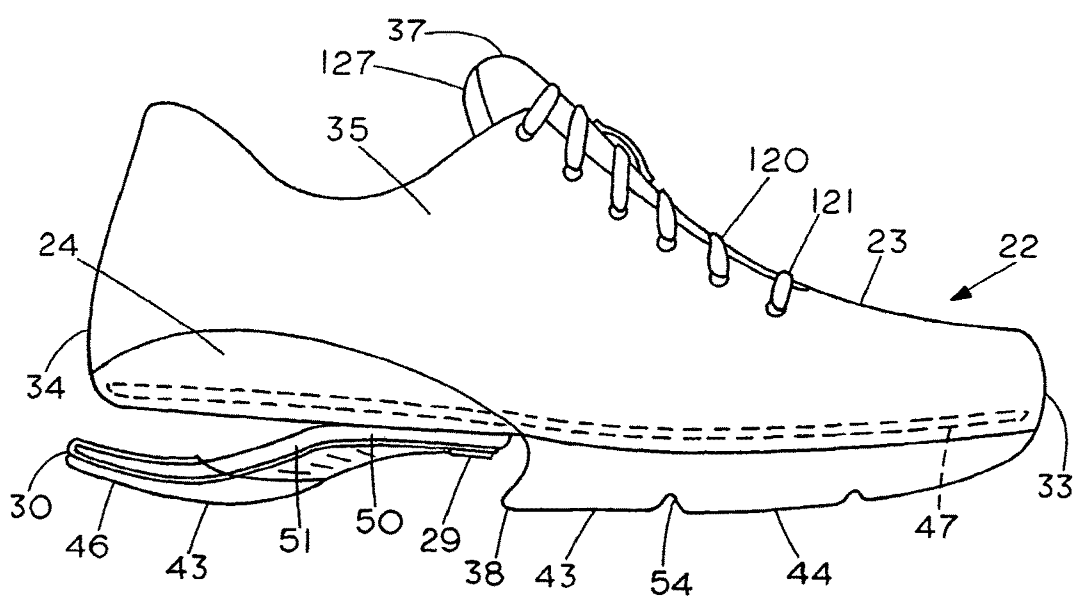

FIG. 525 is a medial side view of the article of footwear shown in FIG. 524.

Figure 526:
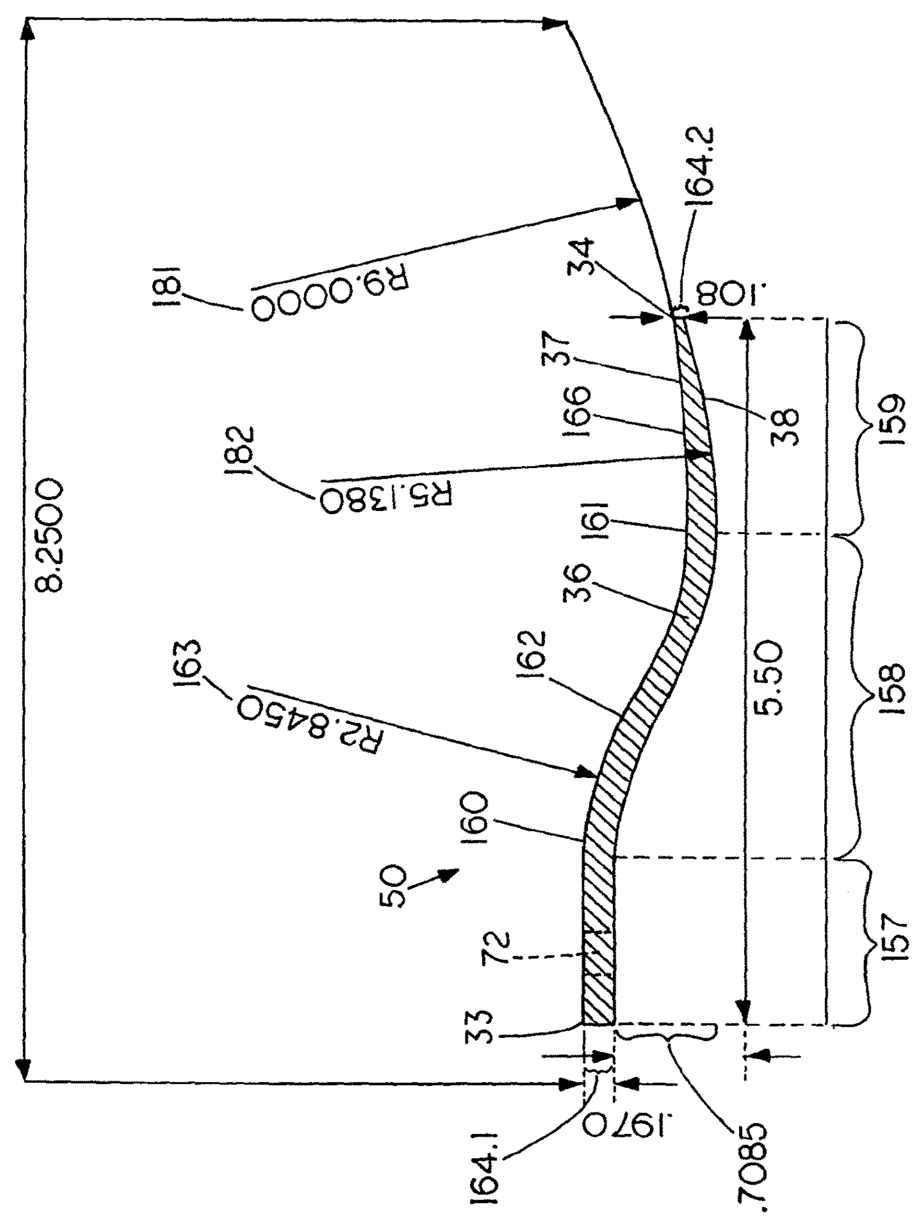

FIG. 526 is a side view engineering drawing showing the dimensions of an inferior spring element for possible use with an article of footwear such as that shown in FIGS. 524 and 525.

Figure 527:
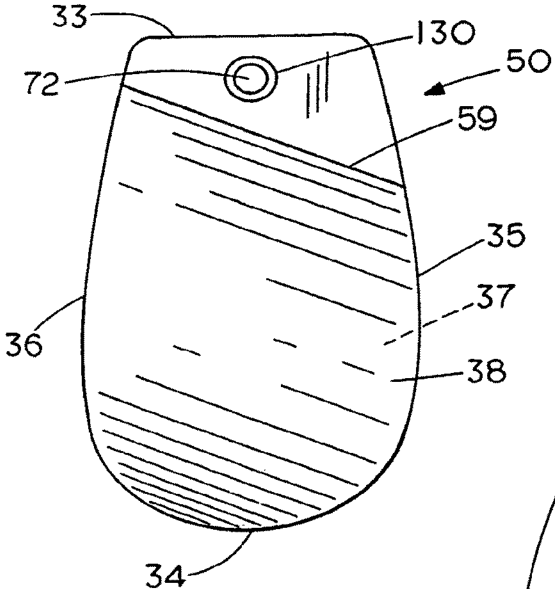

FIG. 527 is a bottom plan view of the inferior spring element shown in FIGS. 524 and 525.

Figure 528:
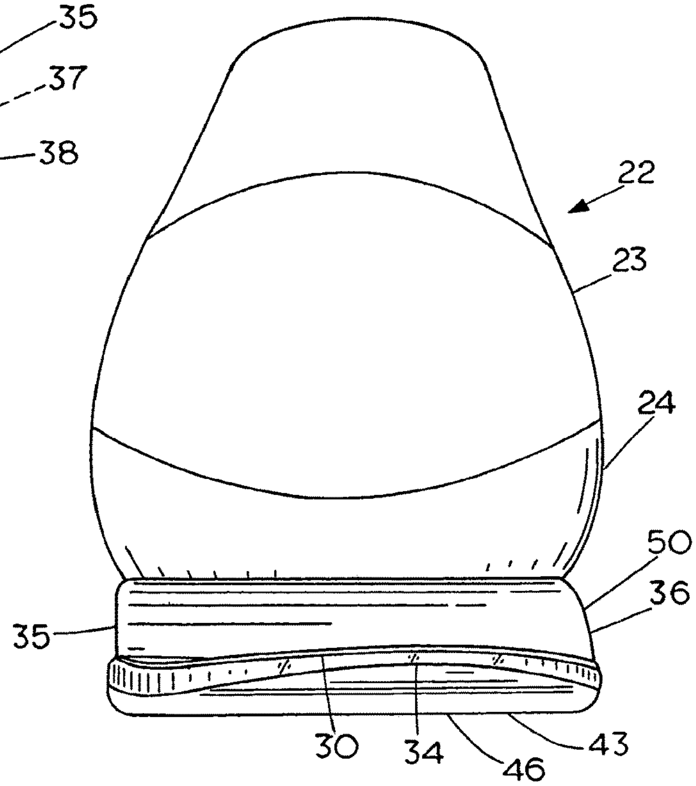

FIG. 528 is a rear view of an article of footwear generally similar to that shown in FIGS. 524 and 525.

Figure 529:
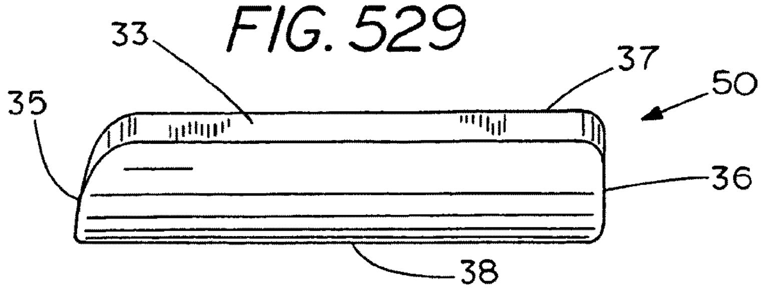

FIG. 529 is a front view of the inferior spring element shown in FIG. 527.

Figure 530:
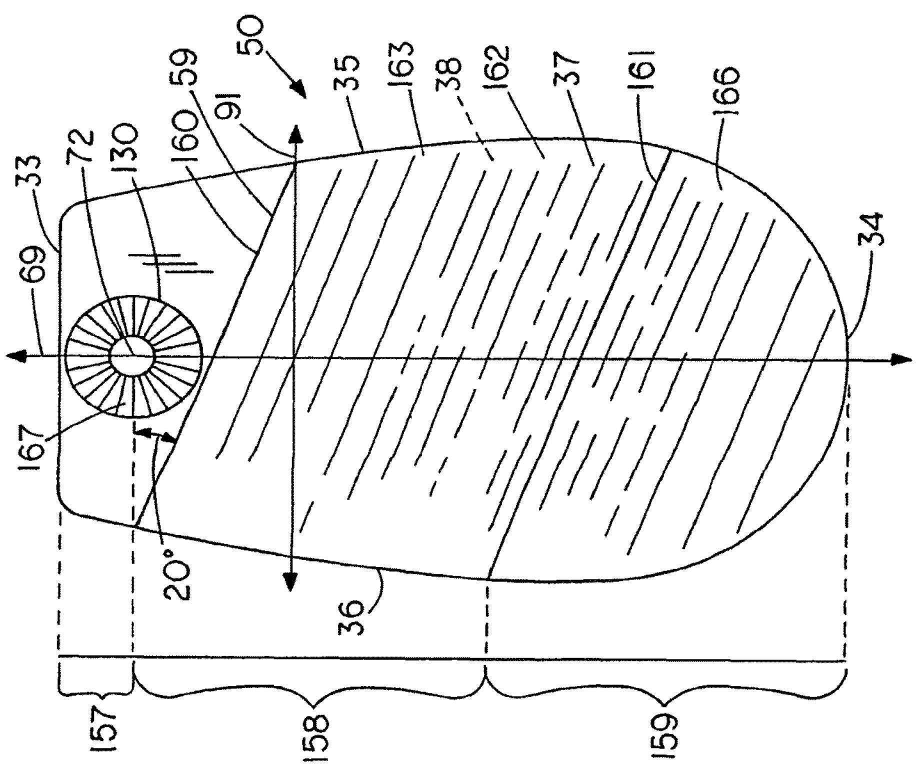

FIG. 530 is a top plan view of the inferior spring element shown in FIG. 527.

Figure 531:
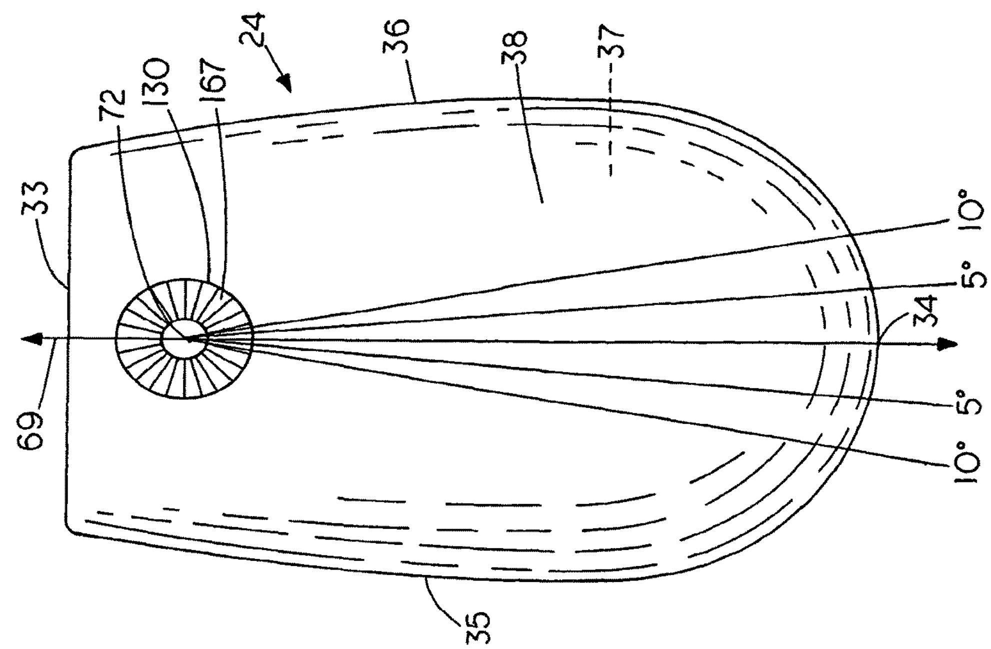

FIG. 531 is a bottom plan view of the external heel counter shown in FIGS. 524, 525 and 528.

Figure 532:
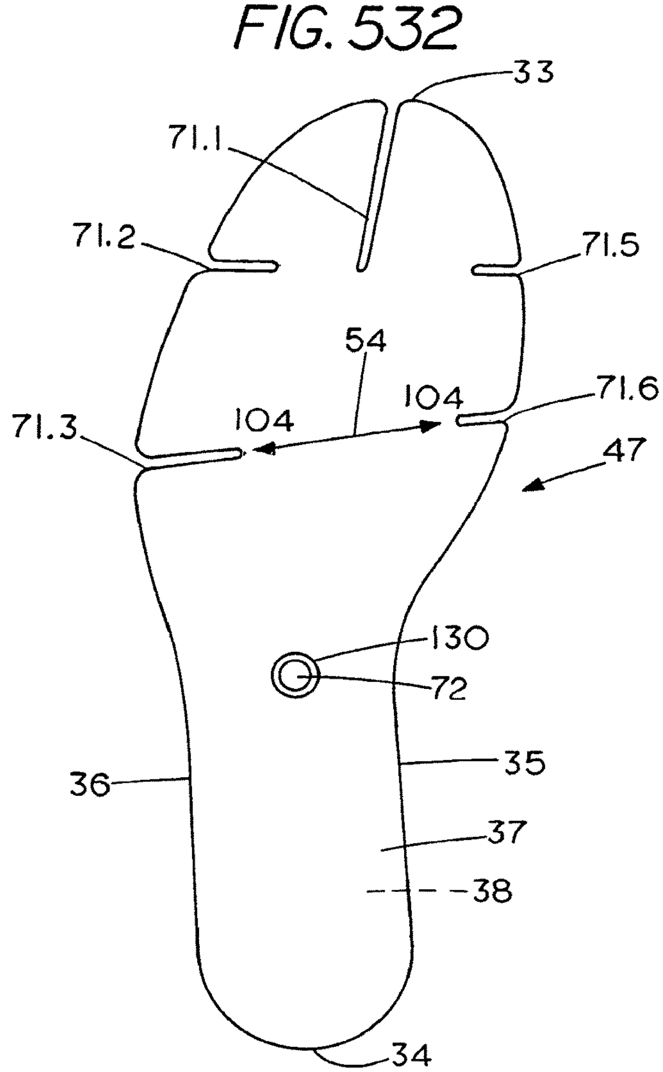

FIG. 532 is a top plan view of a superior spring element for possible use with an article of footwear having a longitudinal flex notch and two flex notches on the lateral side.

Figure 533:
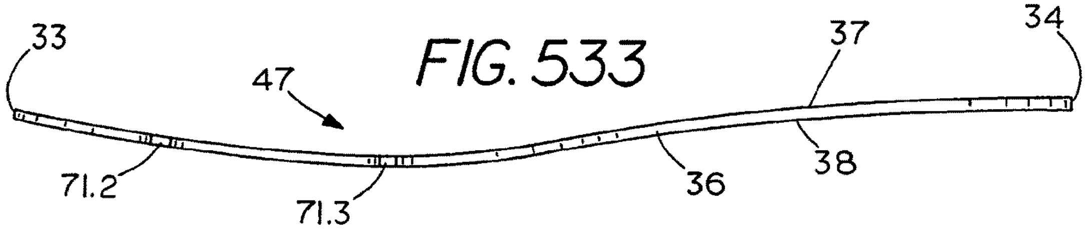

FIG. 533 is a lateral side view of the superior spring element shown in FIG. 532.

Figure 534:
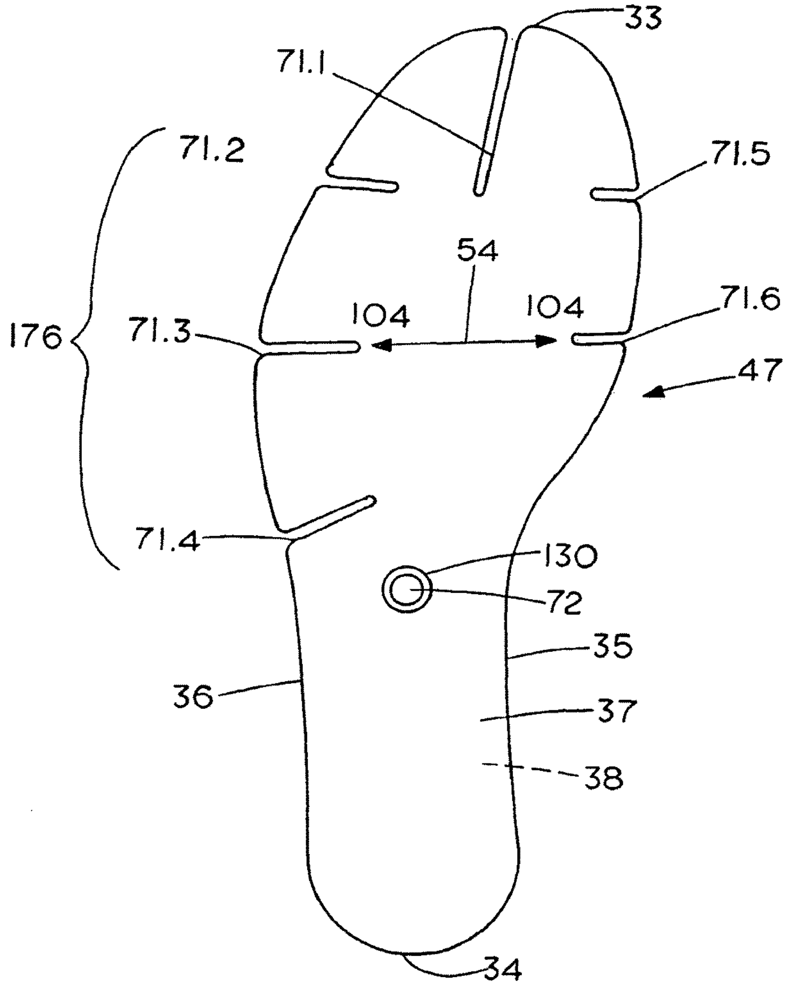

FIG. 534 is a top plan view of a superior spring element for possible use with an article of footwear having a longitudinal flex notch and three flex notches on the lateral side.

Figure 535:
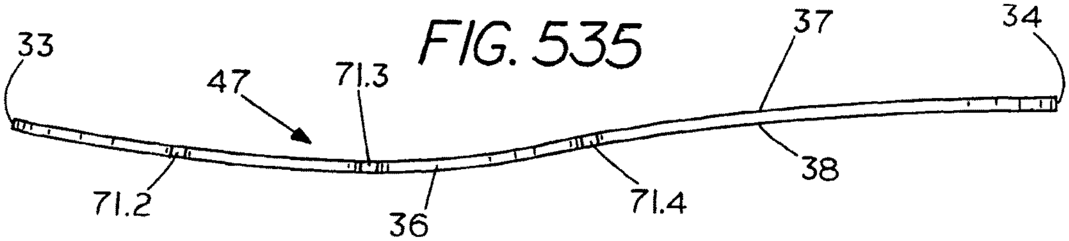

FIG. 535 is a lateral side view of the superior spring element shown in FIG. 534.

Figure 536:
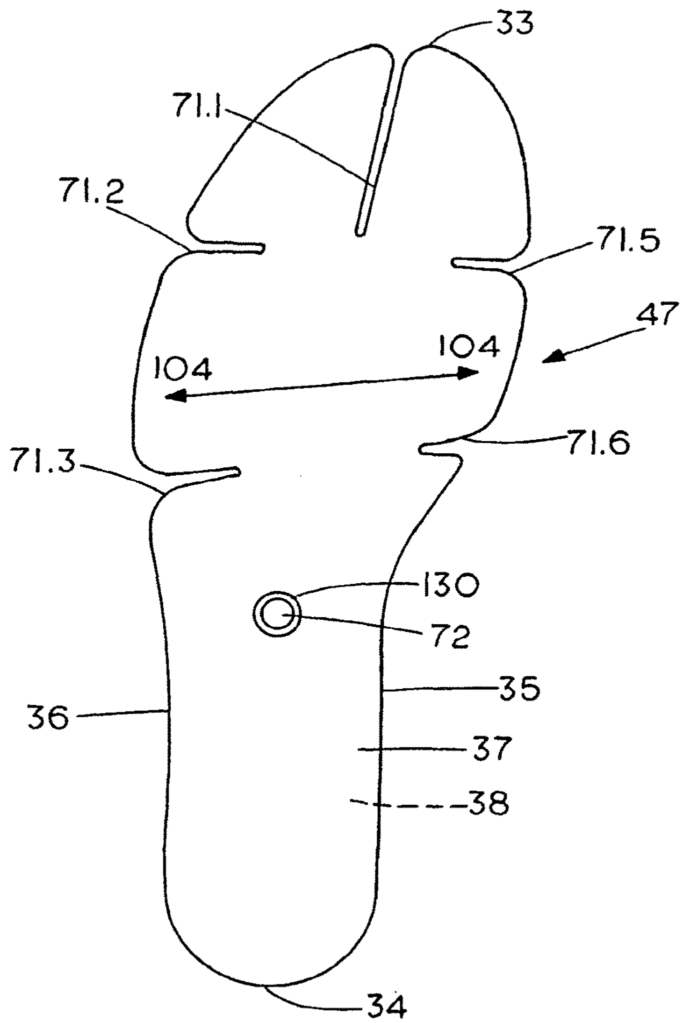

FIG. 536 is a top plan view of a superior spring element for possible use with an article of footwear having a longitudinal flex notch and two flex notches on the lateral side that straddle the position corresponding to the metatarsal-phalangeal joints of a wearer's foot.

Figure 537:
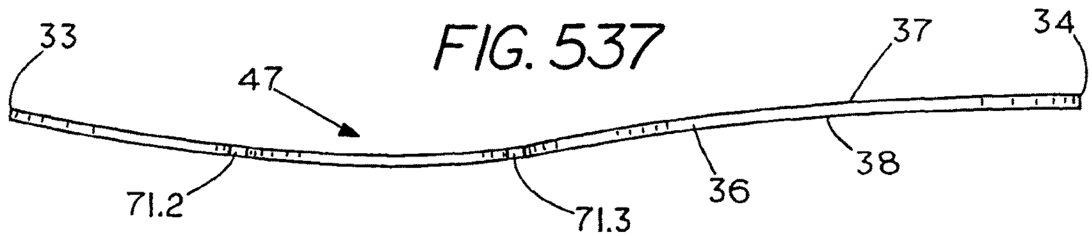

FIG. 537 is a lateral side view of the superior spring element shown in FIG. 536.

Figure 538:
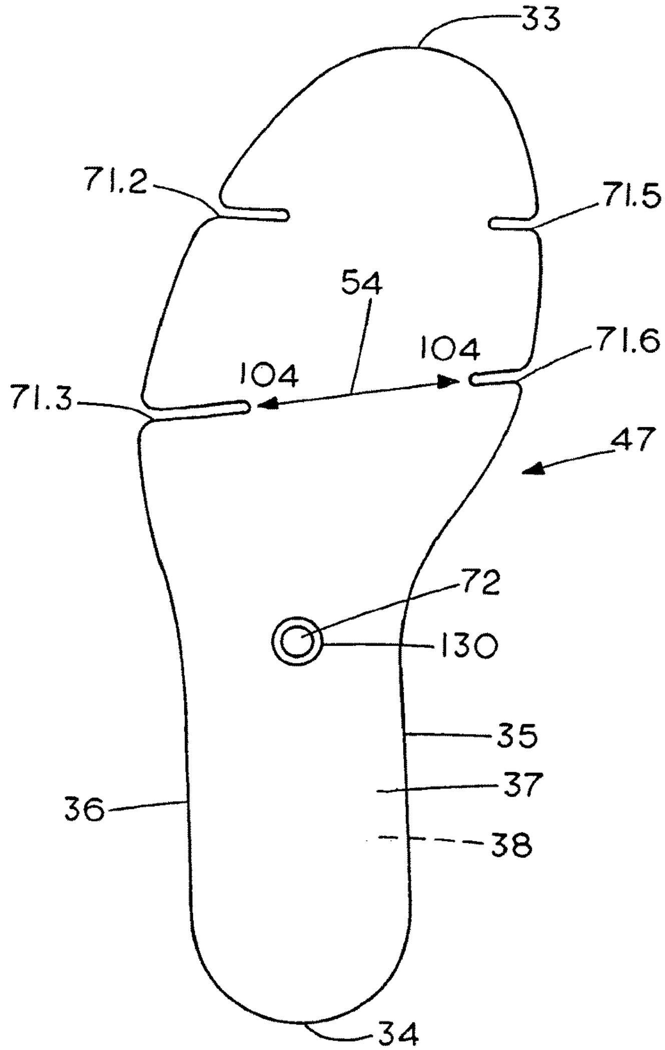

FIG. 538 is a top plan view of a superior spring element for possible use with an article of footwear having two flex notches on the lateral side.

Figure 539:
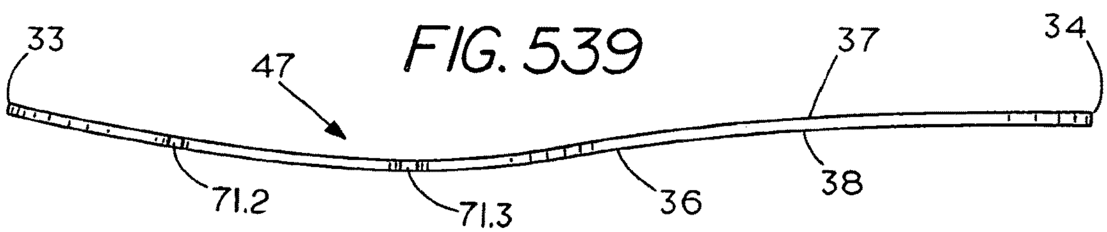

FIG. 539 is a lateral side view of the superior spring element shown in FIG. 538.

Figure 540:
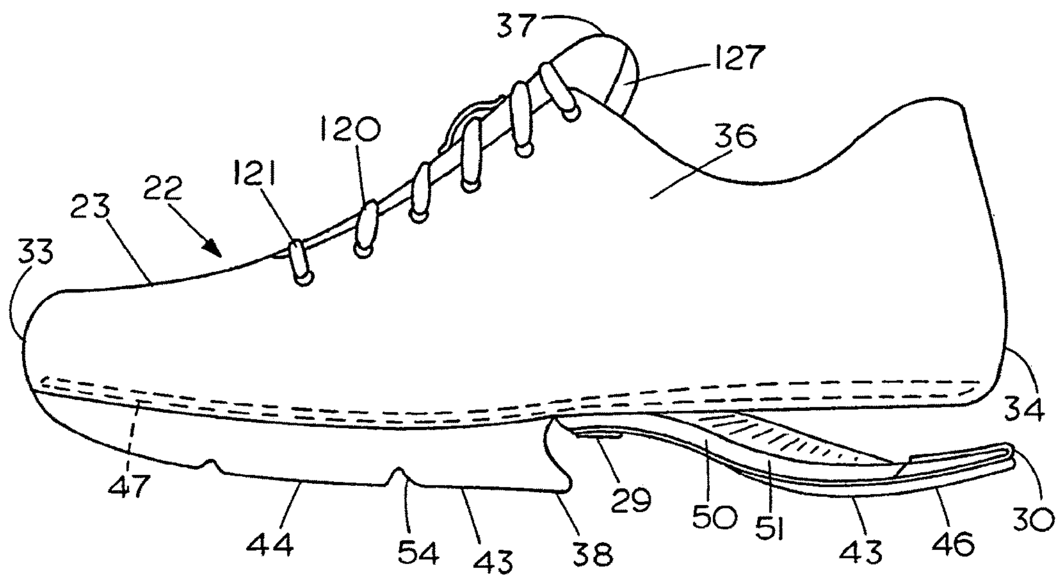

FIG. 540 is a lateral side view of an article of footwear including a superior spring element shown in phantom dashed lines and an inferior spring element.

Figure 541:
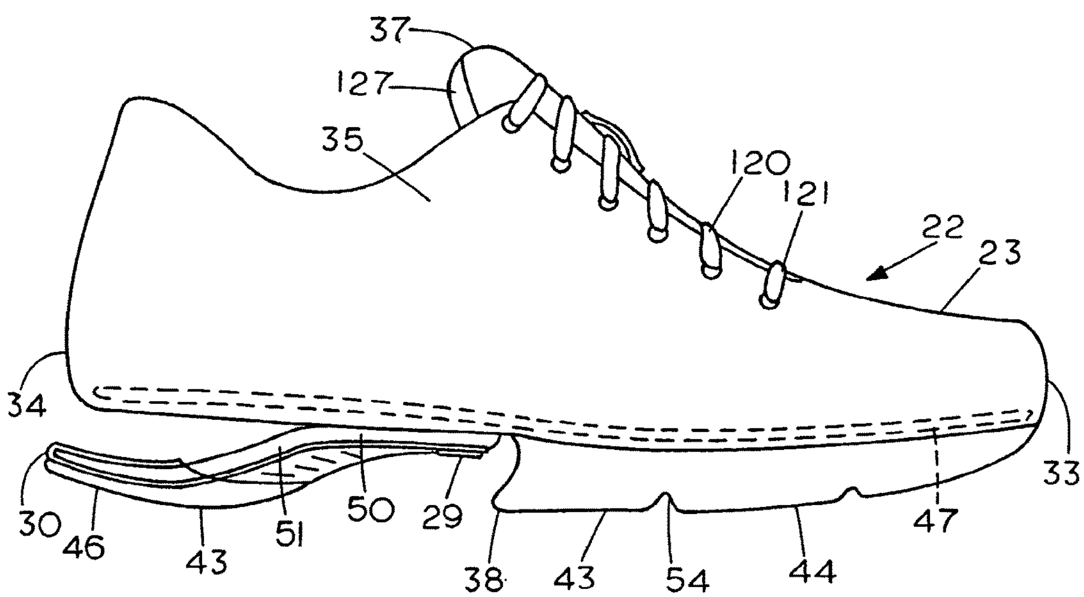

FIG. 541 is a medial side view of the article of footwear shown in FIG. 540.

Figure 542:
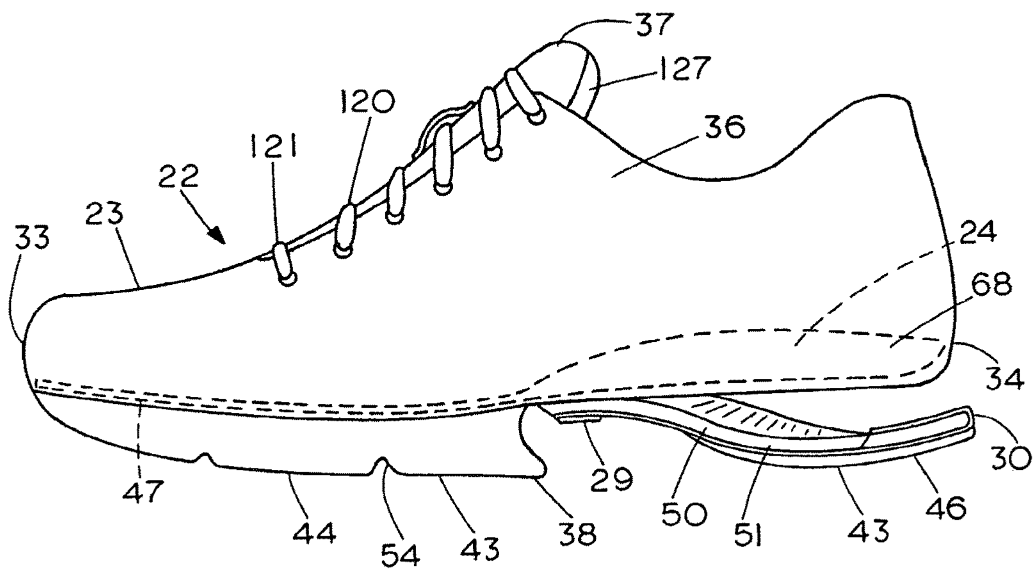

FIG. 542 is a lateral side view of an article of footwear including a superior spring element including an integral heel counter shown in phantom dashed lines and an inferior spring element.

Figure 543:
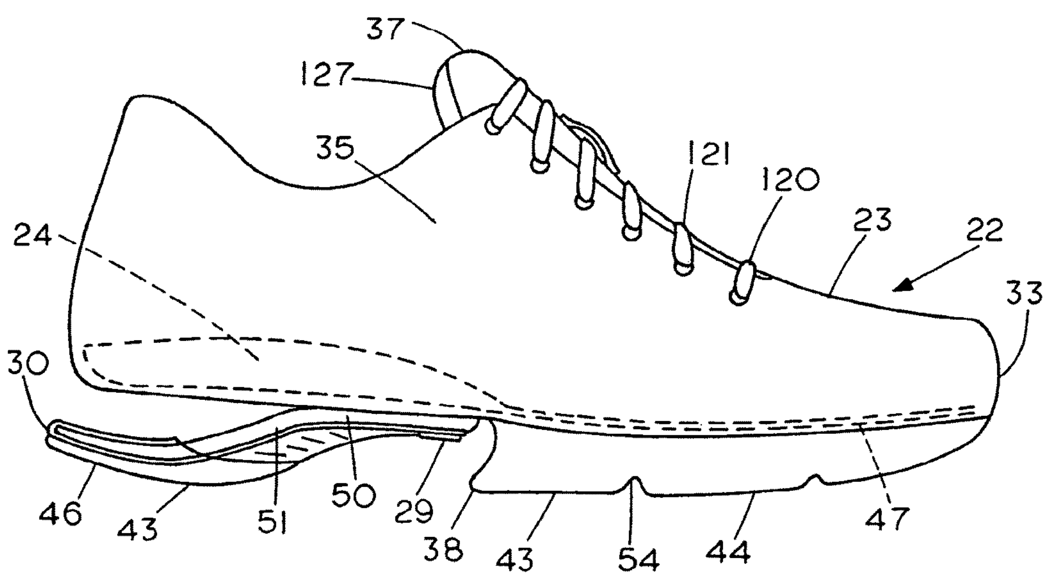

FIG. 543 is a medial side view of the article of footwear shown in FIG. 542.

Figure 544:
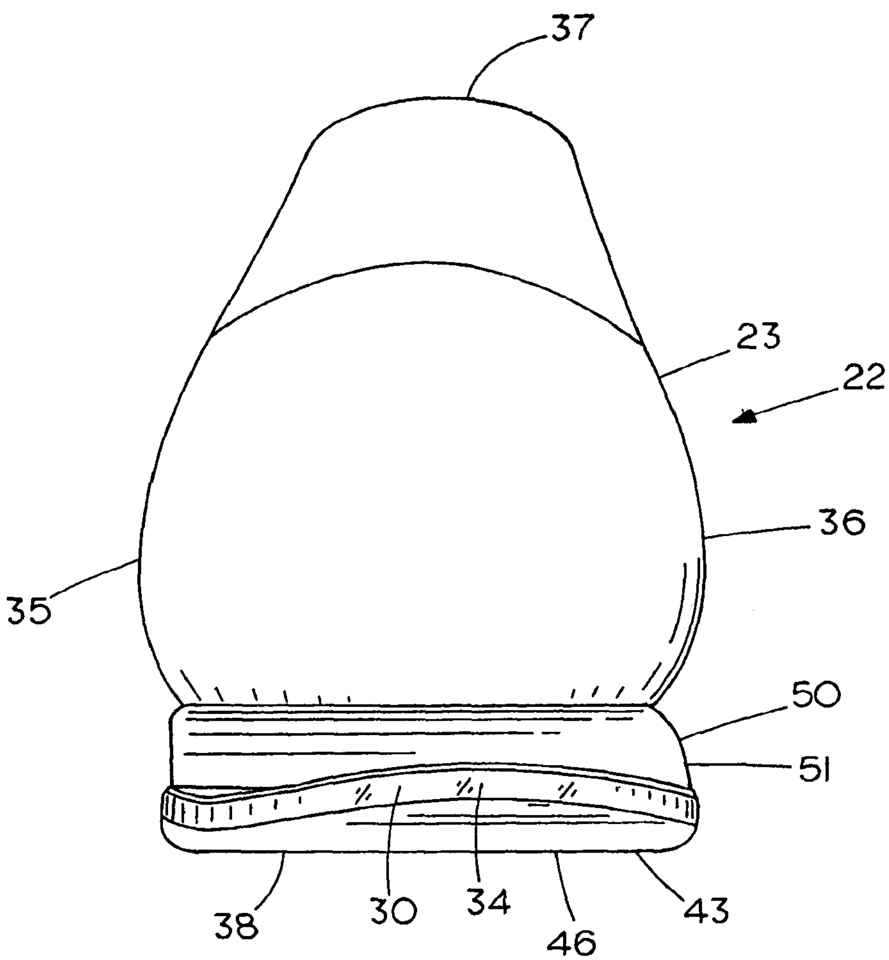

FIG. 544 is a rear view of the article of footwear shown in FIGS. 542 and 543.

Figure 545:
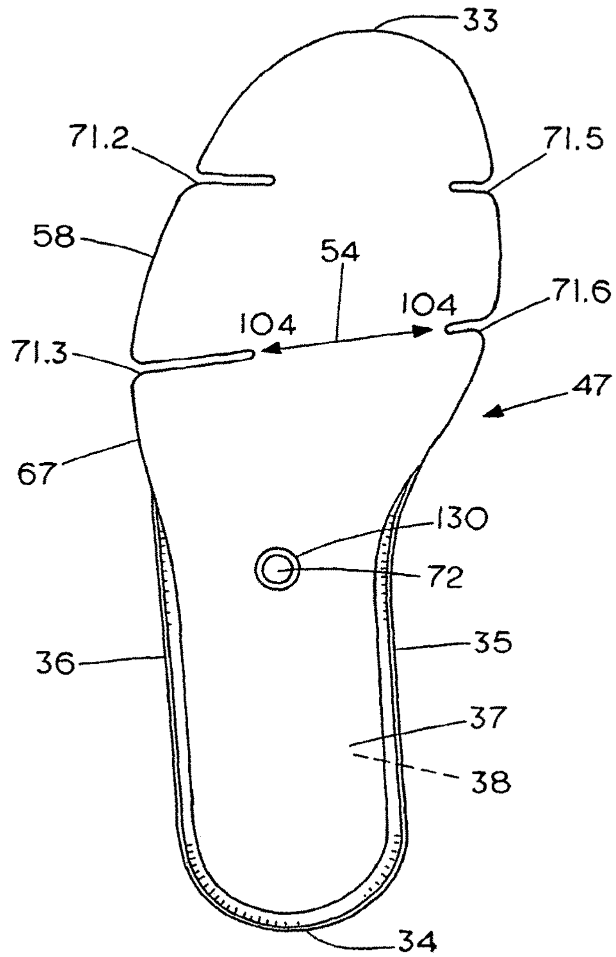

FIG. 545 is a top plan view of a superior spring element having an integral heel counter for possible use in an article of footwear generally similar to that shown in FIGS. 542, 543, and 544.

Figure 546:
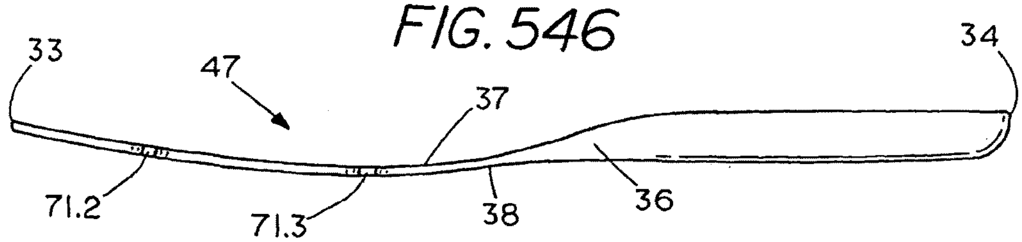

FIG. 546 is a lateral side view of the superior spring element shown in FIG. 545.

Figure 547:
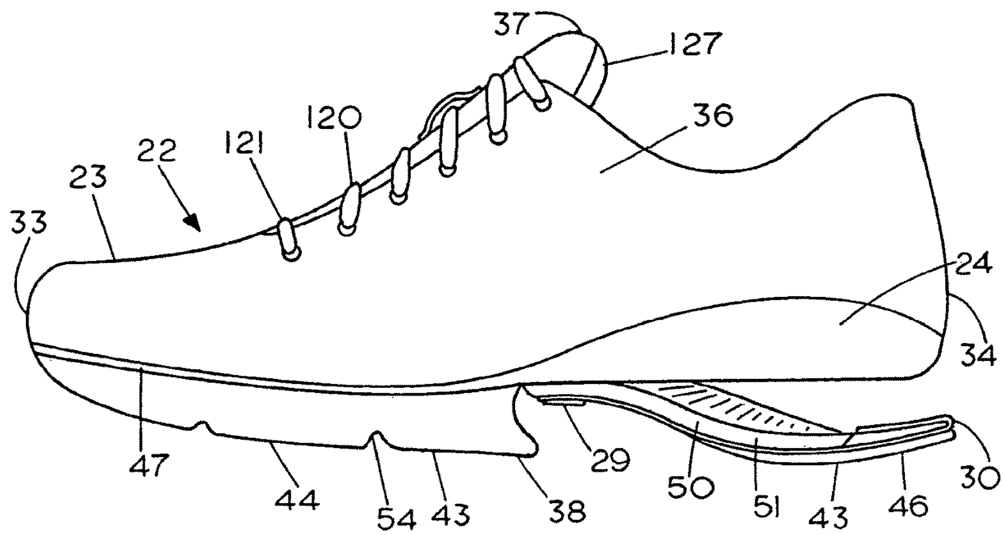

FIG. 547 is a lateral side view of an article of footwear including a superior spring element including an integral external heel counter and an inferior spring element.

Figure 548:
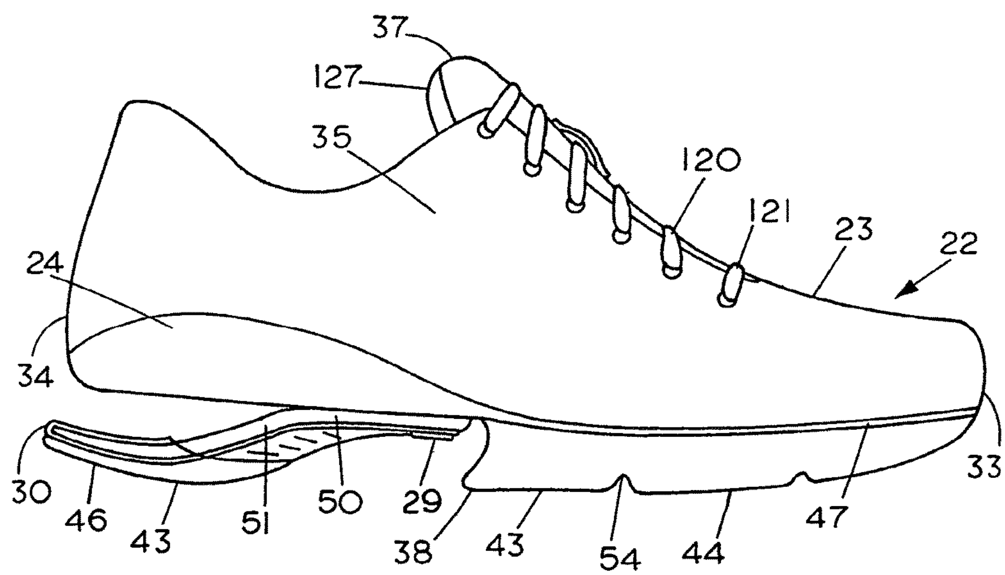

FIG. 548 is a medial side view of the article of footwear shown in FIG. 547.

Figure 549:
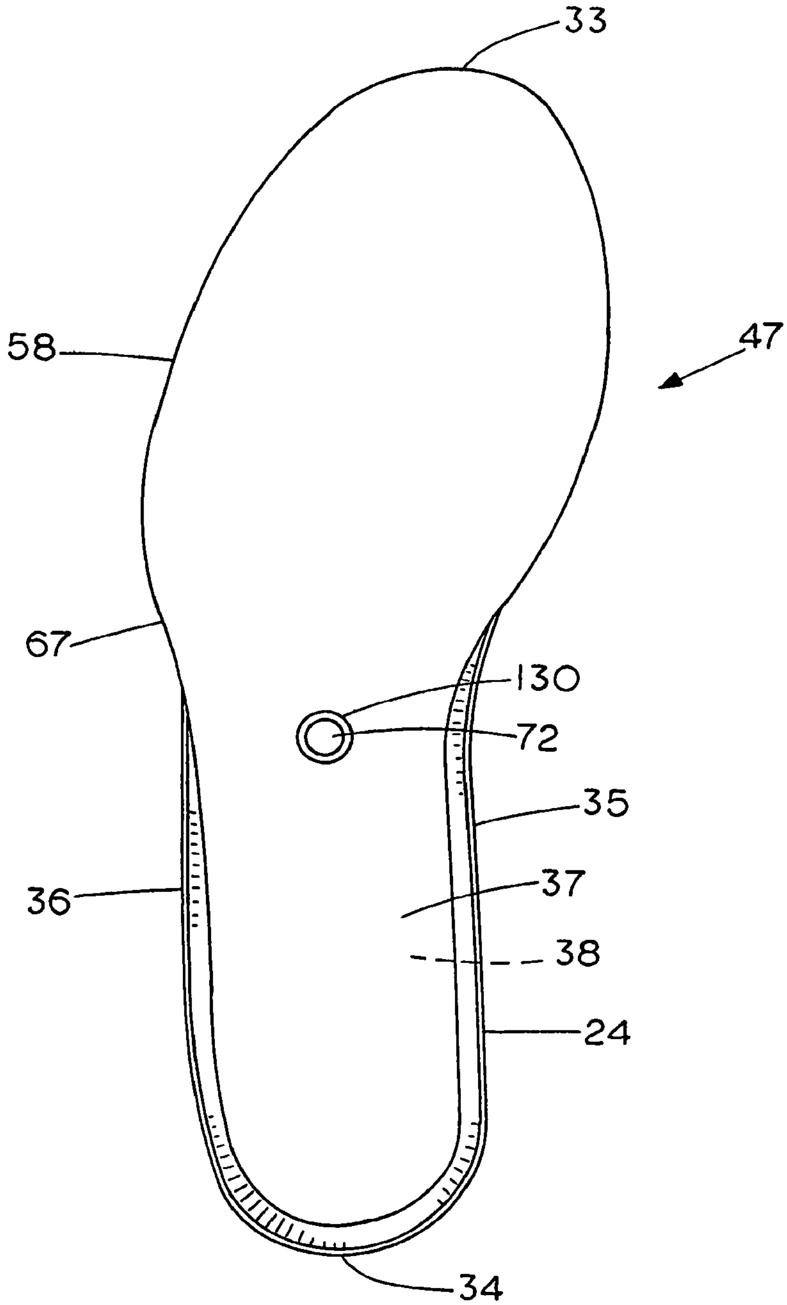

FIG. 549 is a top plan view of a superior spring element including an integral external heel counter for possible use with an article of footwear generally similar to that shown in FIGS. 547 and 548.

Figure 550:
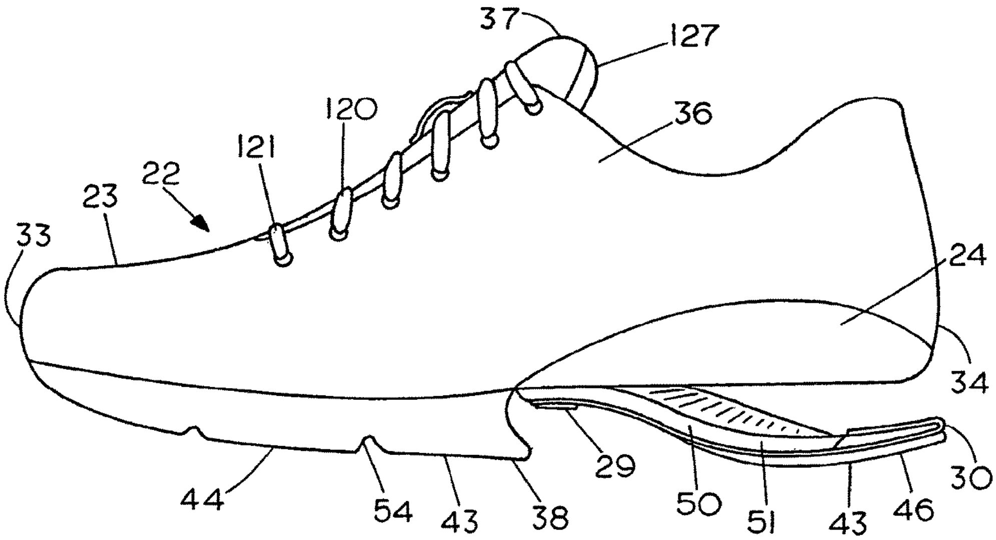

FIG. 550 is a lateral side view of an article of footwear including an inferior spring element having asymmetrical curvature on the medial and lateral sides.

Figure 551:
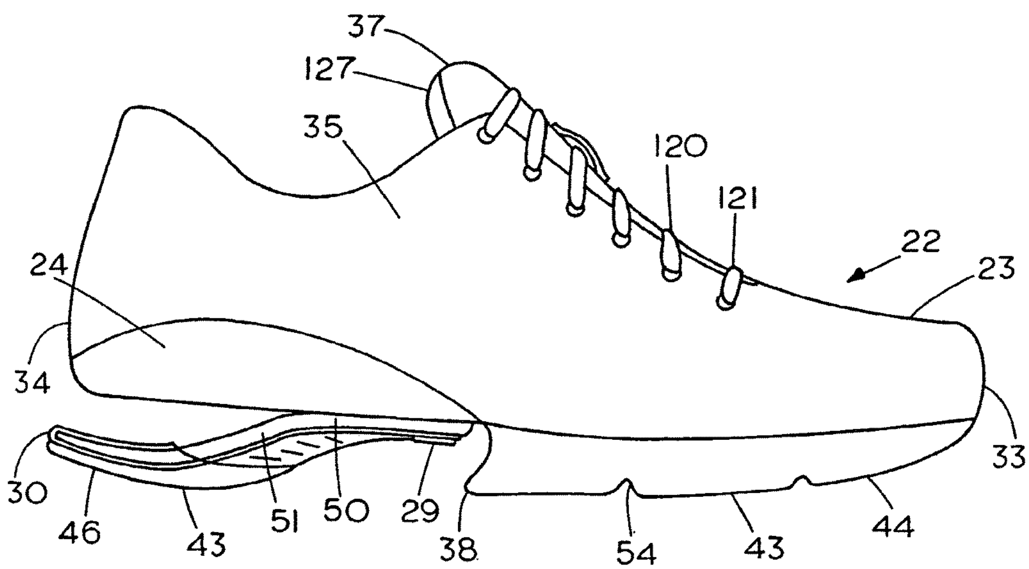

FIG. 551 is a medial side view of the article of footwear shown in FIG. 550.

Figure 552:
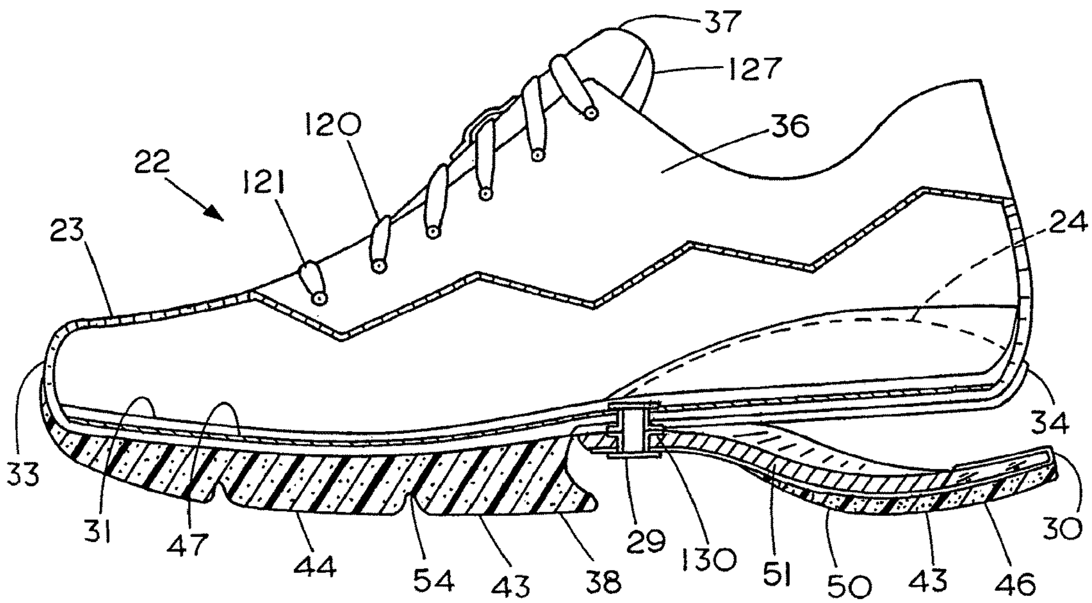

FIG. 552 is a lateral side view of an article of footwear having parts broken away showing the anterior outsole element affixed directly to the upper.

Figure 553:
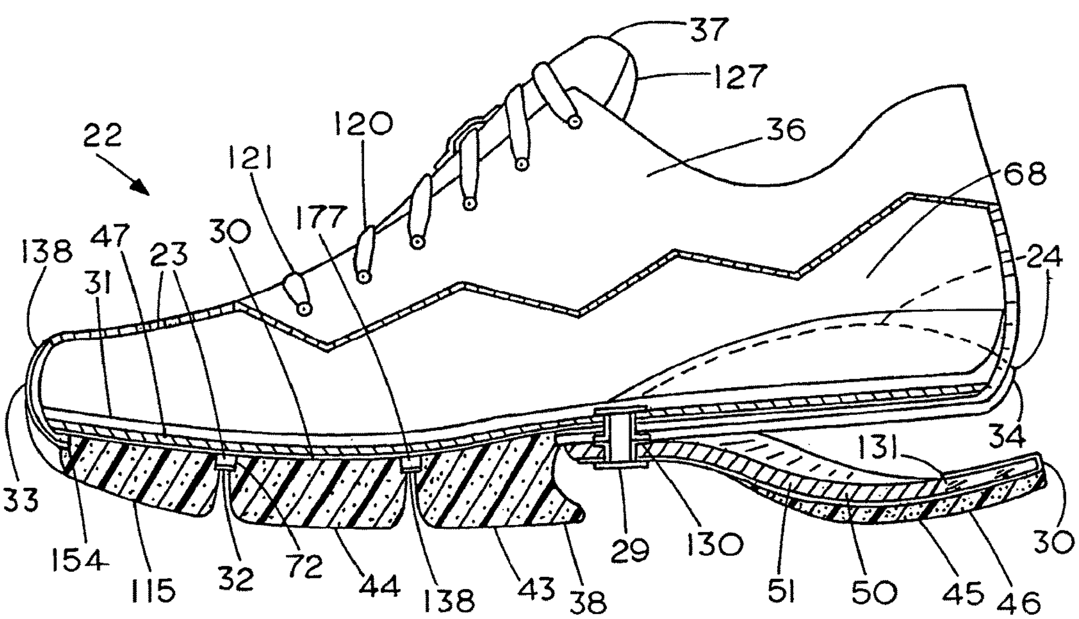

FIG. 553 is a lateral side view of an article of footwear having parts broken away showing portions of an anterior outsole element passing through openings in the inferior side of the upper.

Figure 554:
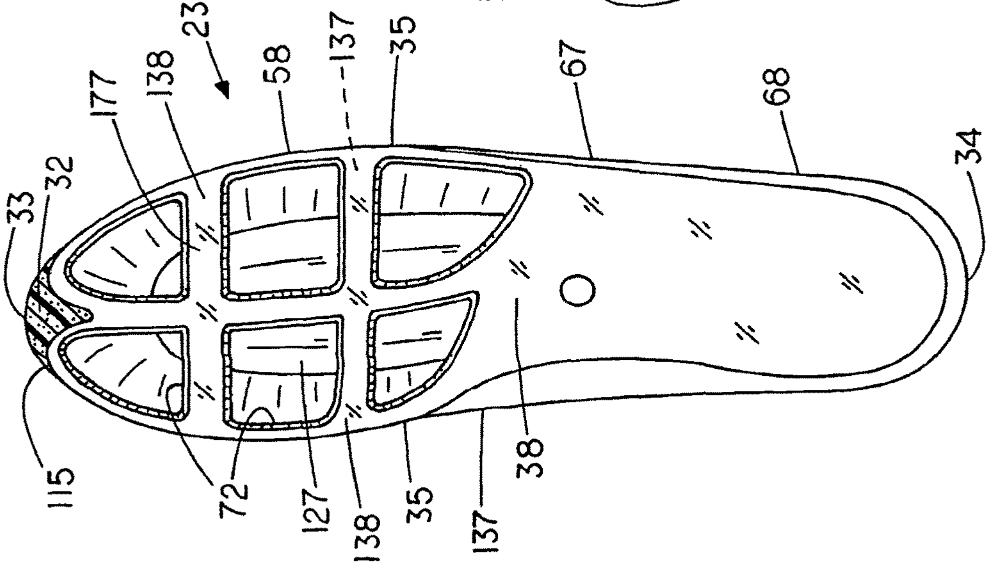

FIG. 554 is a bottom plan view of an upper having a plurality of openings for permitting portions of an anterior outsole element to pass therethrough.

Figure 555:
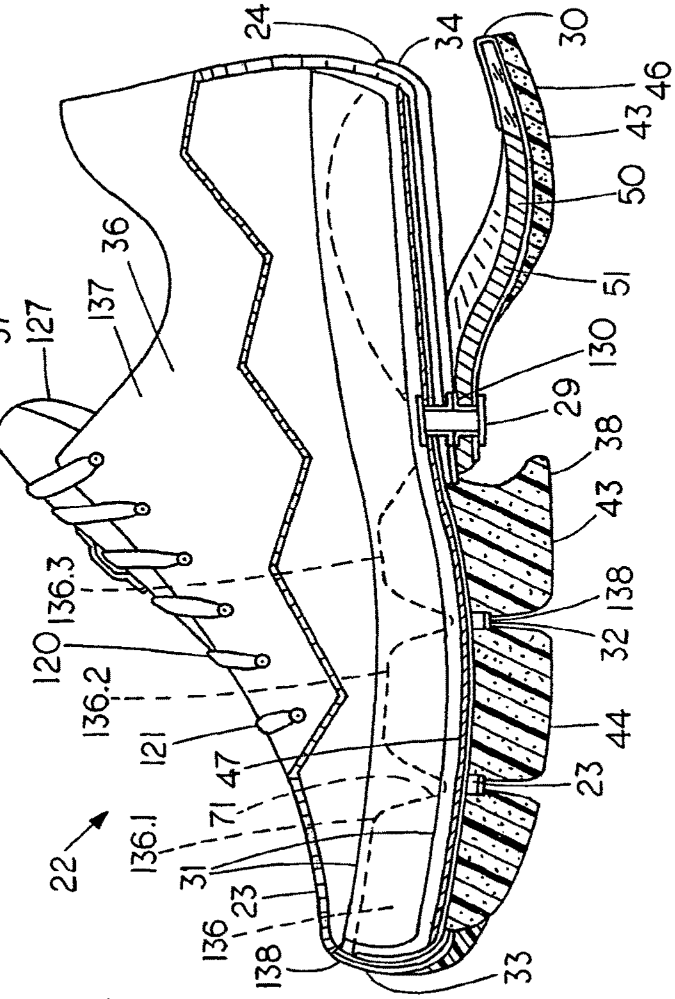

FIG. 555 is a lateral side view of an article of footwear including an anterior outsole element having an integral stability element.

Figure 556:
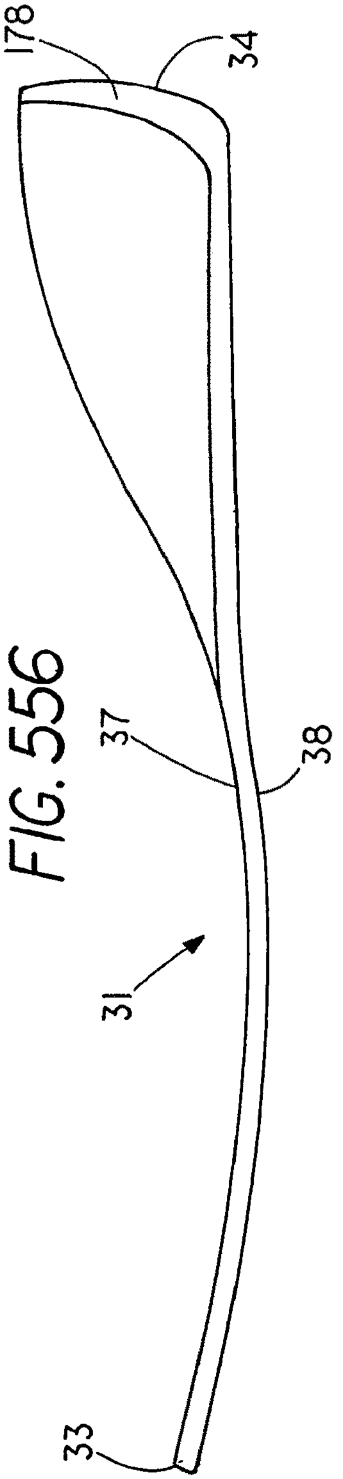

FIG. 556 is a longitudinal cross-sectional side view of an insole including an elevated heel pad for possible use with an article of footwear.

Figure 557:
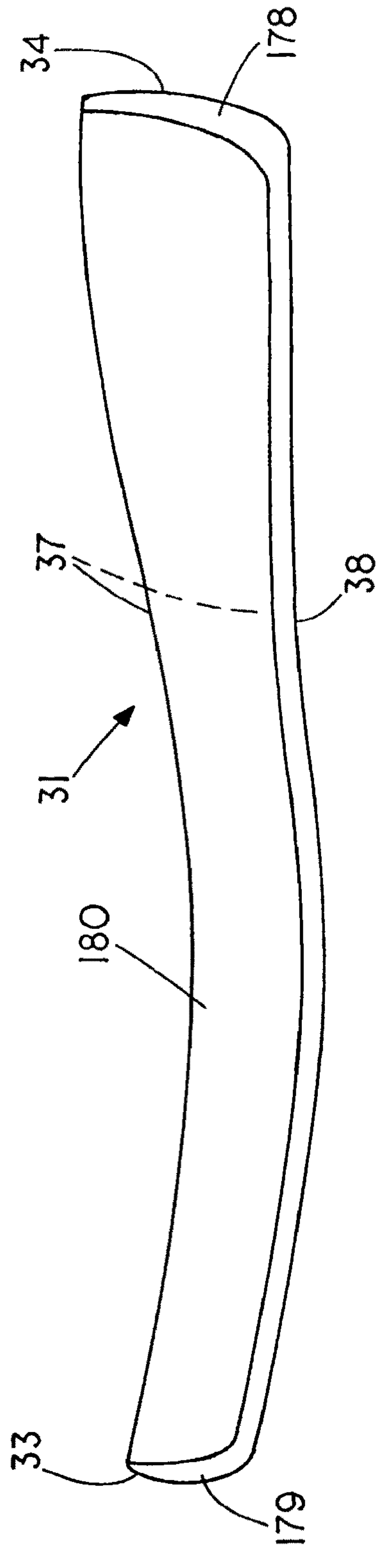

FIG. 557 is a longitudinal cross-sectional side view of an insole including an elevated heel pad, toe pad, and also an elevated side pad for encompassing a wearer's foot.

Figure 558:
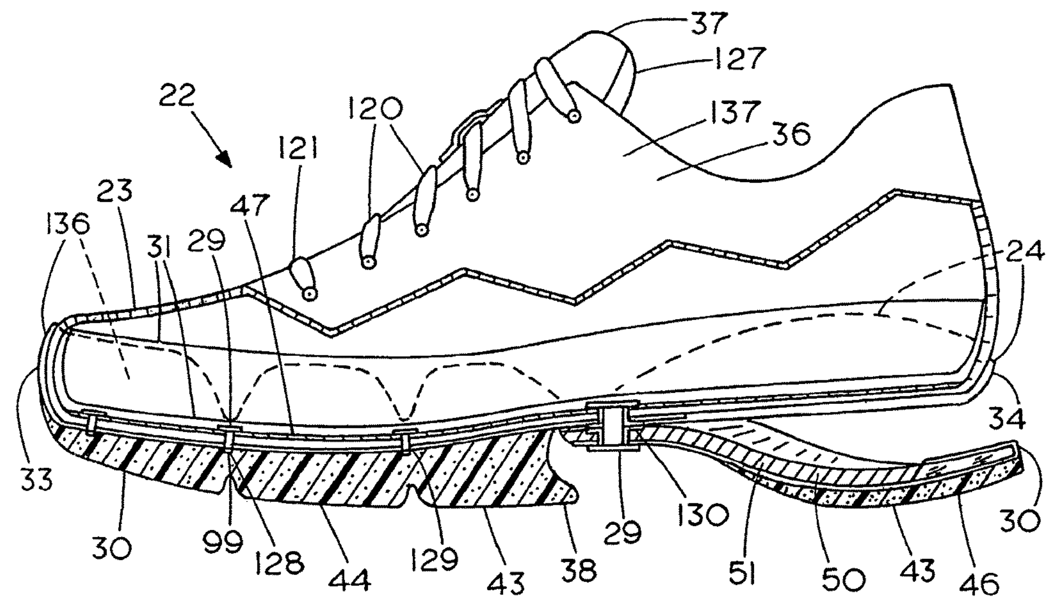

FIG. 558 is a lateral side view of an article of footwear having parts broken away showing the possible use of an anterior outsole element including a backing further including an external stability element.

Figure 559:
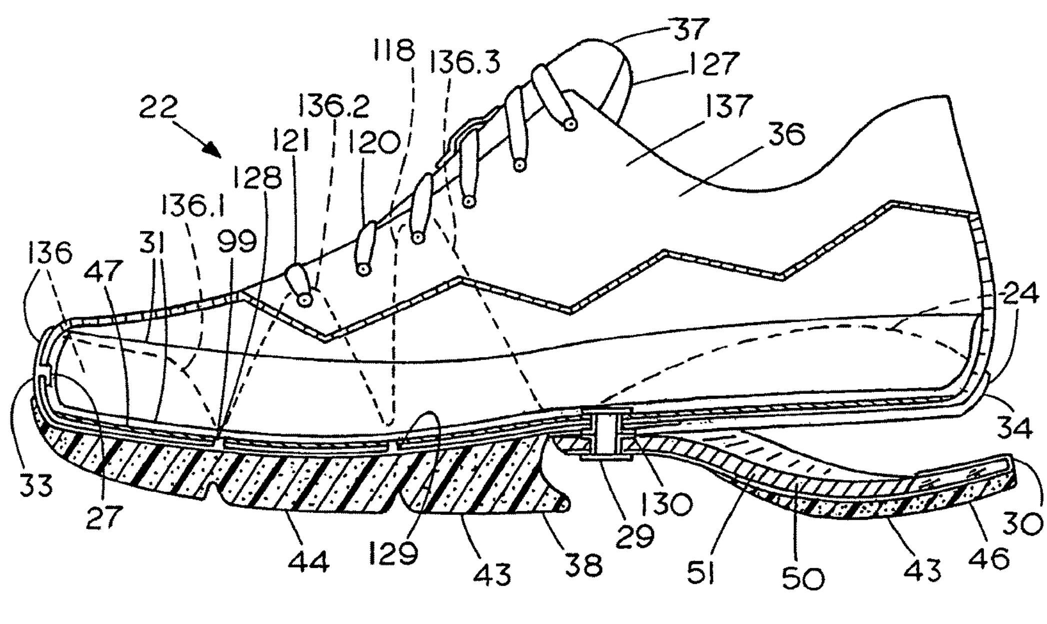

FIG. 559 is a lateral side view of an article of footwear having parts broken away showing the possible use of an anterior outsole element including a backing further including an external stability element that includes upwardly extending straps for use with closure means such as laces, straps, and the like.

Figure 560:
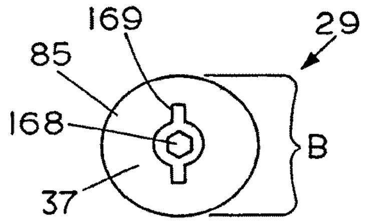

FIG. 560 is a top plan view of the male part of a fastener for possible use with an article of footwear showing both Allen drive and flat blade drive receptacles.

Figure 561:
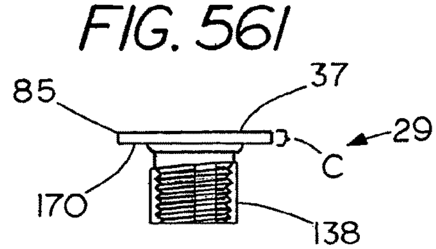

FIG. 561 shows a side view of the male part of a fastener shown in FIG. 560.

Figure 562:
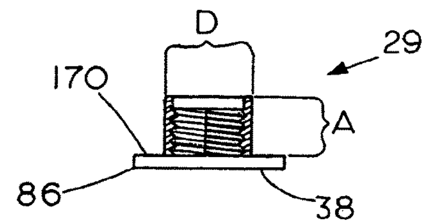

FIG. 562 shows a side view of a female part of a fastener for possible use with the male part of a fastener shown in FIGS. 560 and 561.

Figure 563:
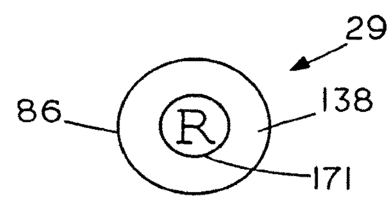

FIG. 563 is a bottom plan view of the female part of a fastener shown in FIG. 562.

Figure 564:
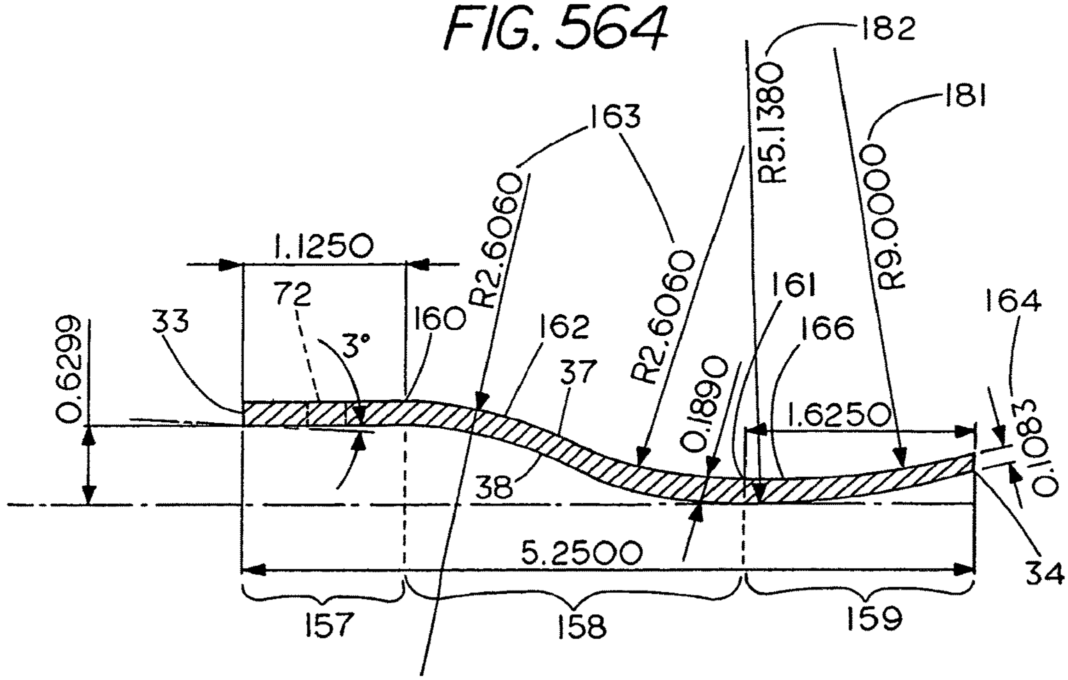

FIG. 564 is a side view engineering drawing showing the dimensions of an inferior spring element for possible use with an article of footwear such as that shown in FIGS. 524 and 525.

Figure 565:
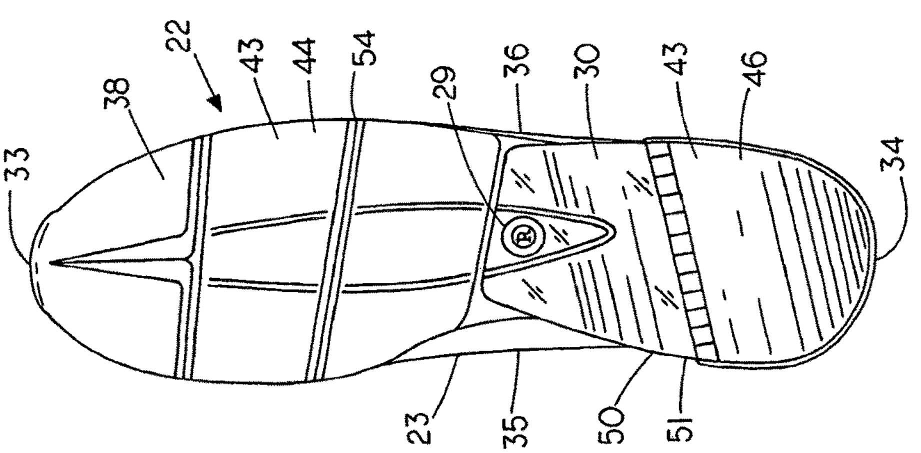

FIG. 565 is a bottom plan view of a semi-curve lasted article of footwear including an inferior spring element and a posterior outsole element including a transparent backing portion.

Figure 566:
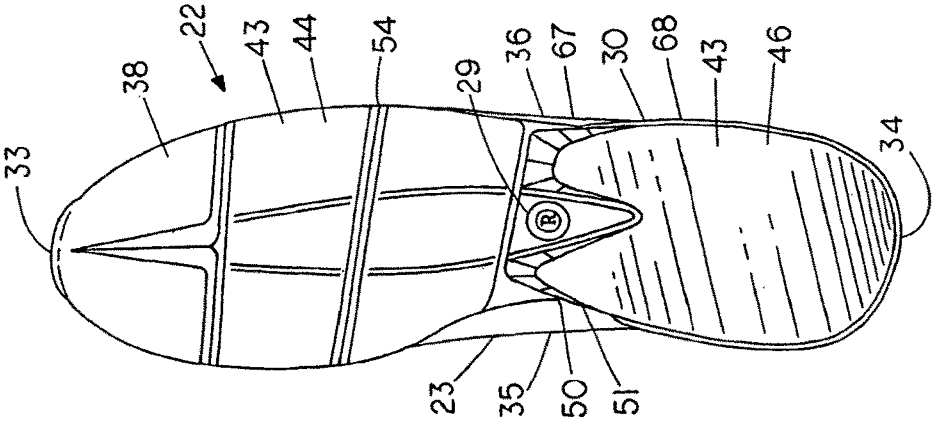

FIG. 566 is a bottom plan view of a semi-curved lasted article of footwear including a posterior outsole element that substantially covers the bottom side of an inferior spring element.

Figure 567:
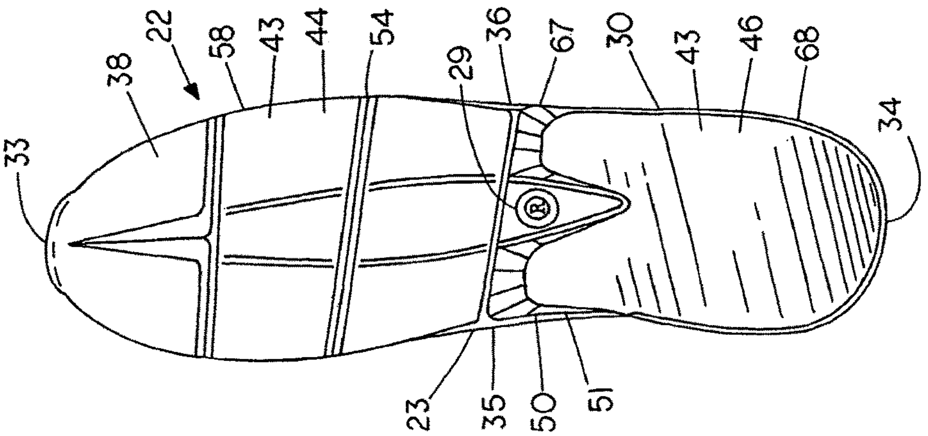

FIG. 567 is a bottom plan view of an article of footwear having a straight lasted configuration relative to those shown in FIGS. 565 and 566, and also a wider inferior spring element and posterior outsole element in the midfoot area.

Figure 568:
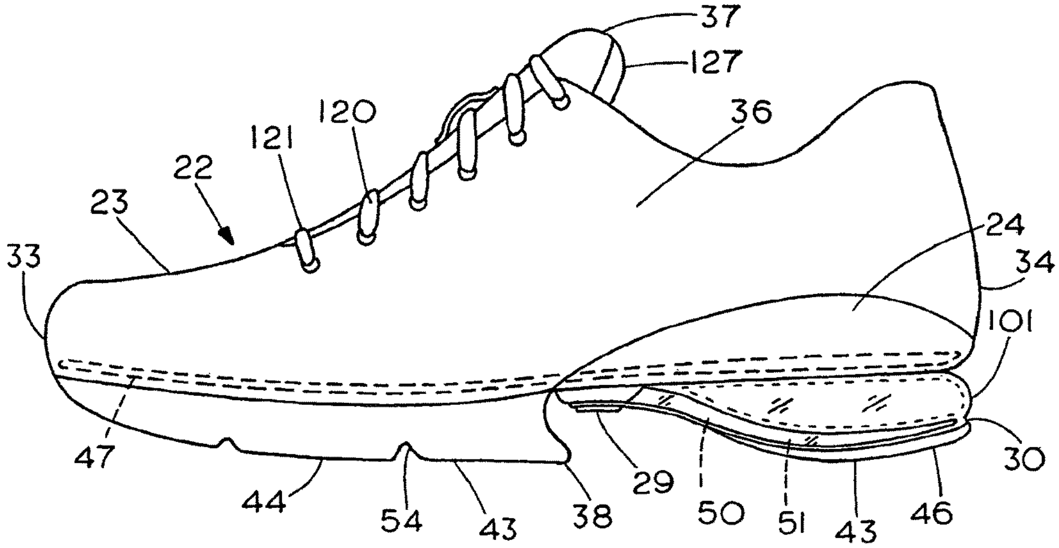

FIG. 568 is a lateral side view of an article of footwear generally similar to that shown in FIG. 524, further including a fluid-filled bladder.

Figure 569:
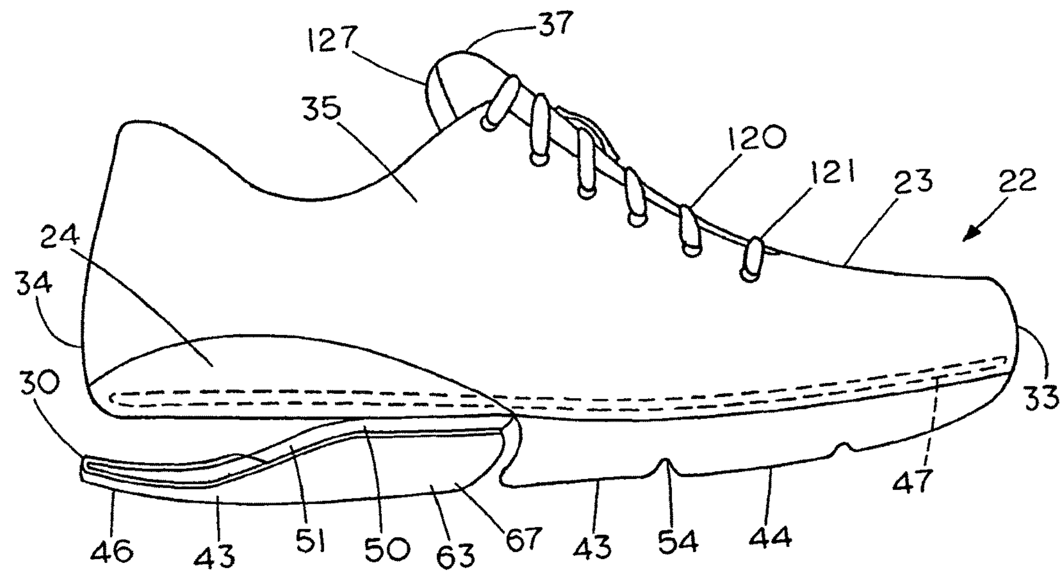

FIG. 569 is a medial side view of an article of footwear generally similar to that shown in FIG. 525, further including a posterior outsole element generally similar to that shown in FIGS. 566 and 567 which also serves as a stabilizer.

Figure 570:
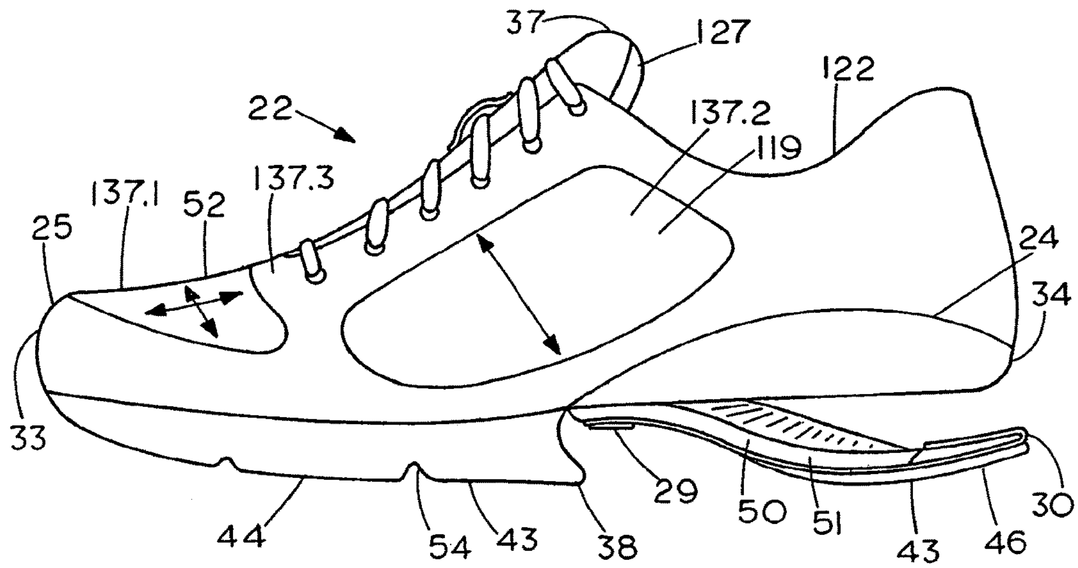

FIG. 570 is a lateral side view of an article of footwear including an upper that is substantially made using three dimensional and/or circular knitting methods.

Figure 571:
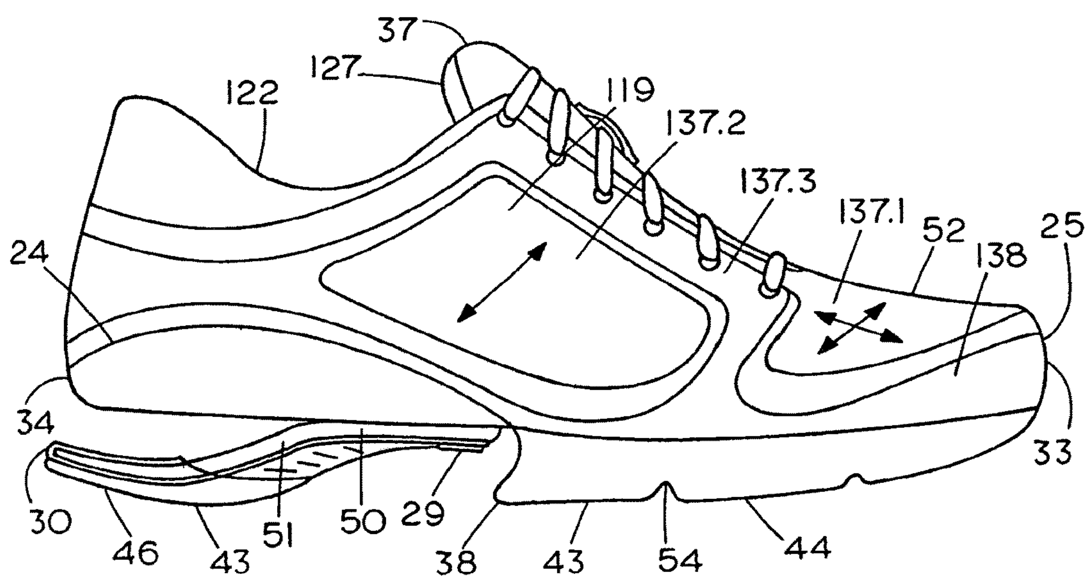

FIG. 571 is a medial side view of an article of footwear including an upper that is substantially made using three dimensional and/or circular knitting methods, further including an overmolded plastic material.

Figure 572:
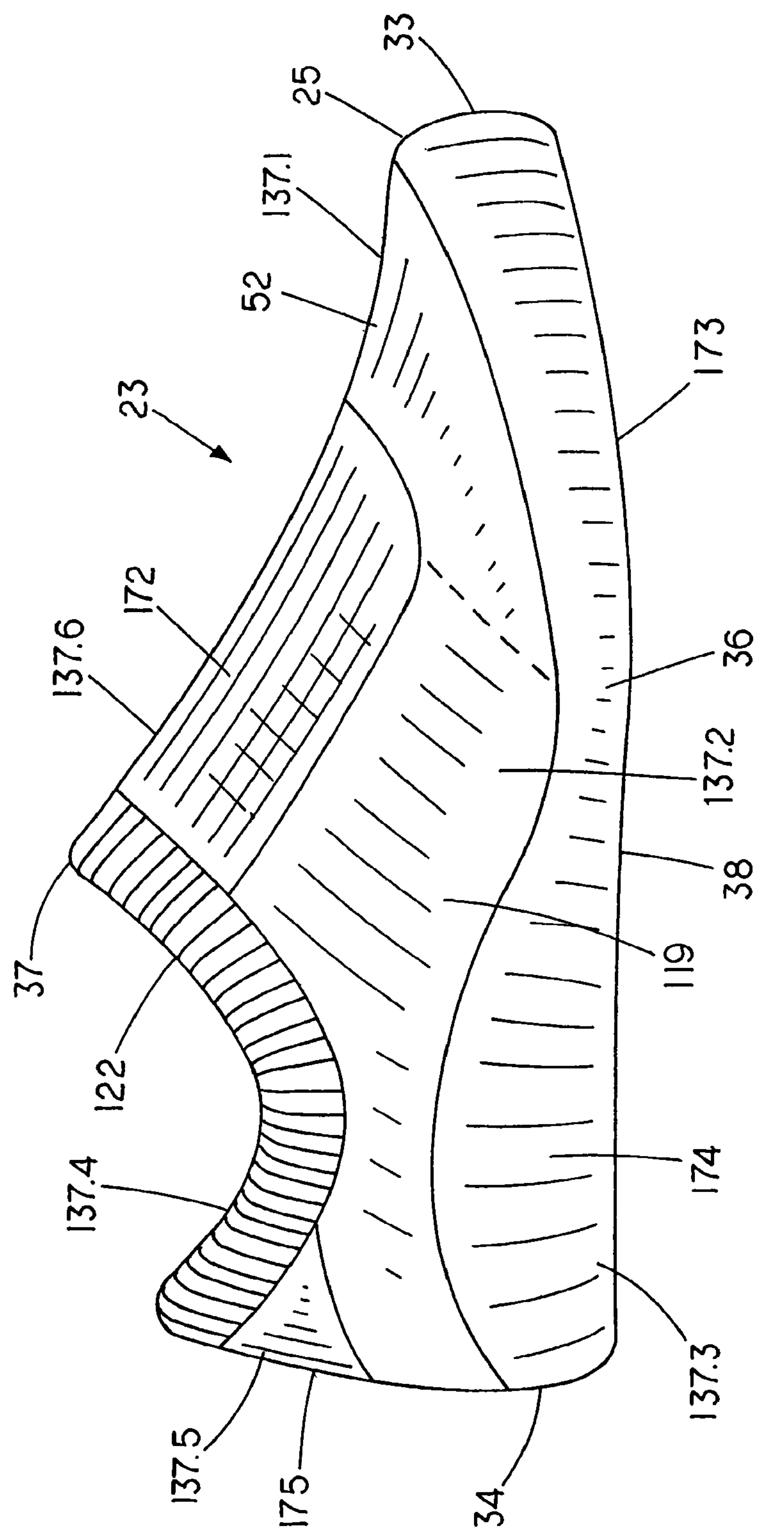

FIG. 572 is a lateral side view of a portion of an upper that is substantially made using three dimensional and/or circular knitting methods.

Figure 573:
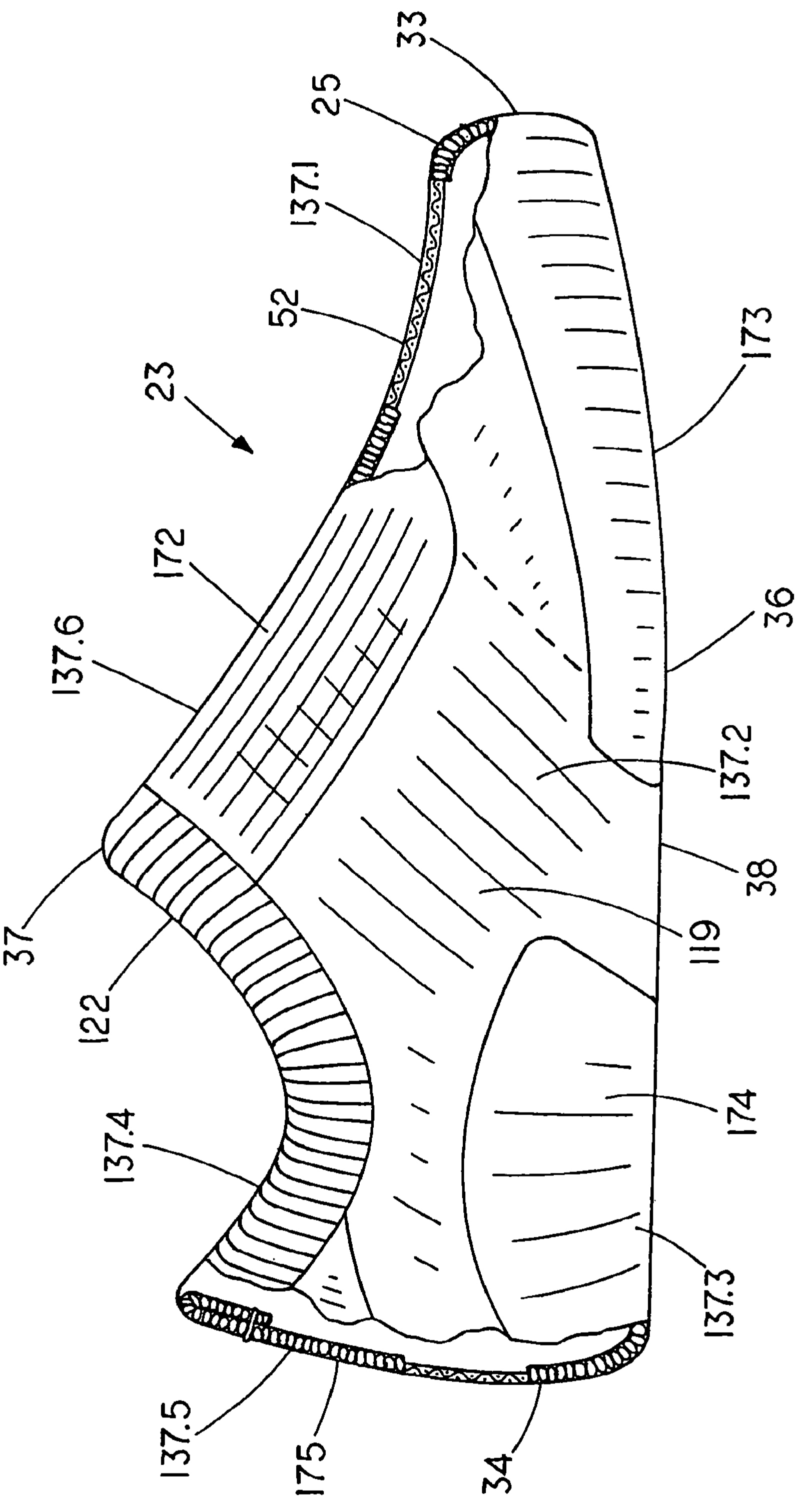

FIG. 573 is a lateral side view of the portion of an alternate upper generally similar to that shown in FIG. 572, but showing a different structure and parts broken away.

Figure 574:
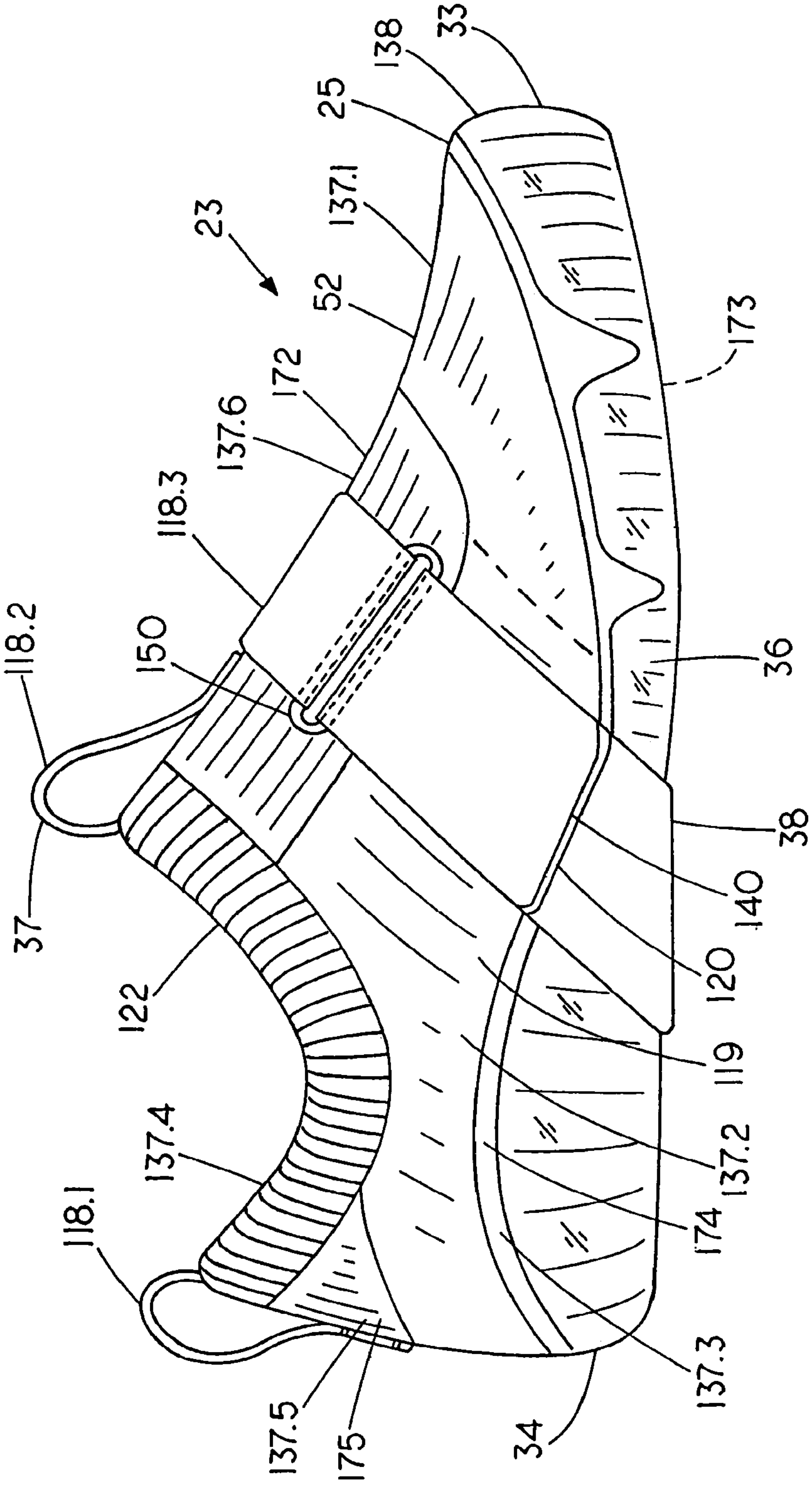

FIG. 574 is a lateral side view of the portion of an upper shown in FIG. 573, further including several straps and an external stability element consisting of an overmolded plastic material.

Figure 575:
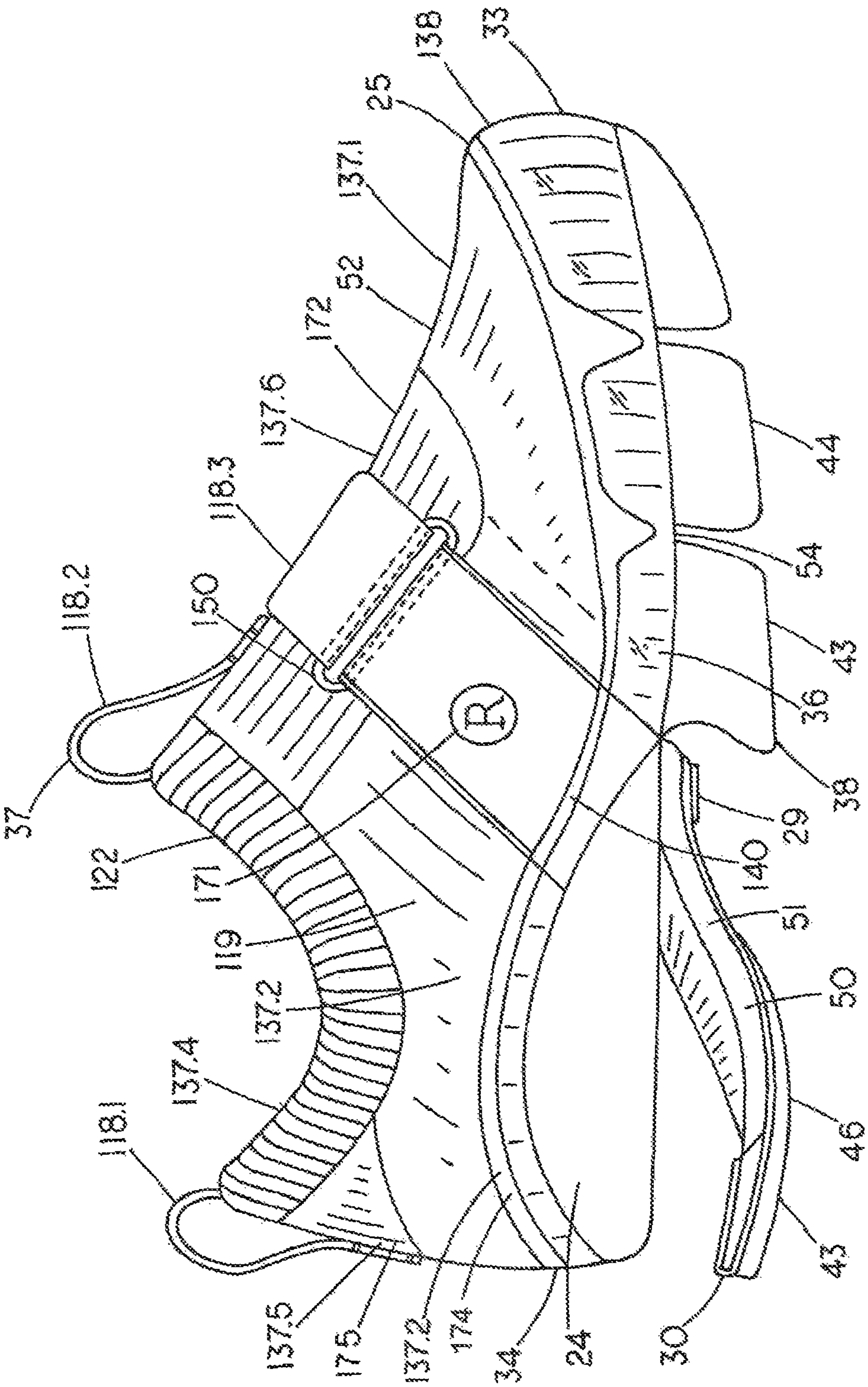

FIG. 575 is a lateral side view of an article of footwear including the upper shown in FIG. 574.

Figure 576:
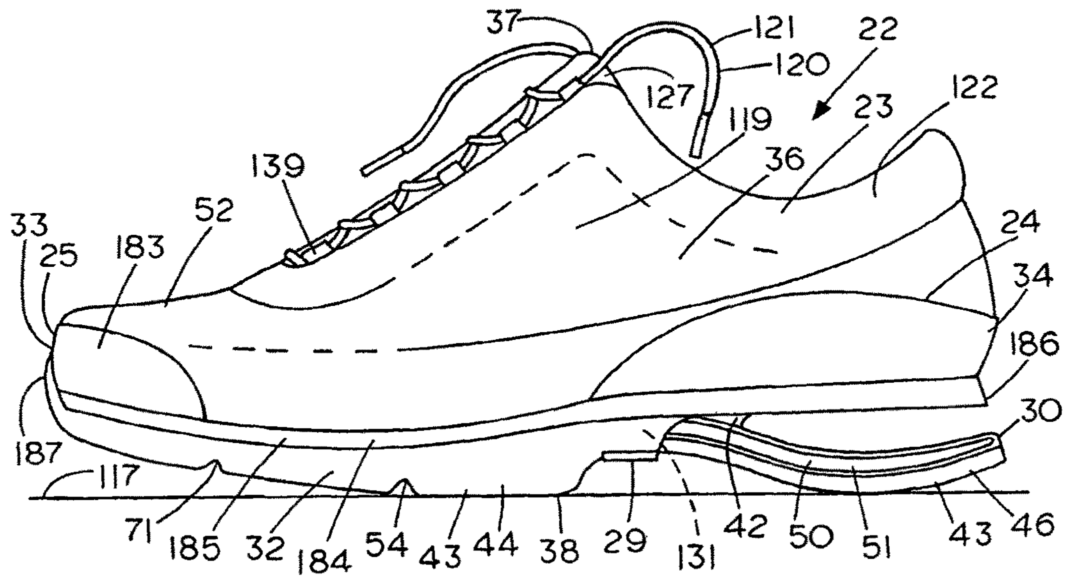

FIG. 576 is a lateral side view of an article of footwear including an upper, external toe counter, external heel counter, and inferior spring element.

Figure 577:
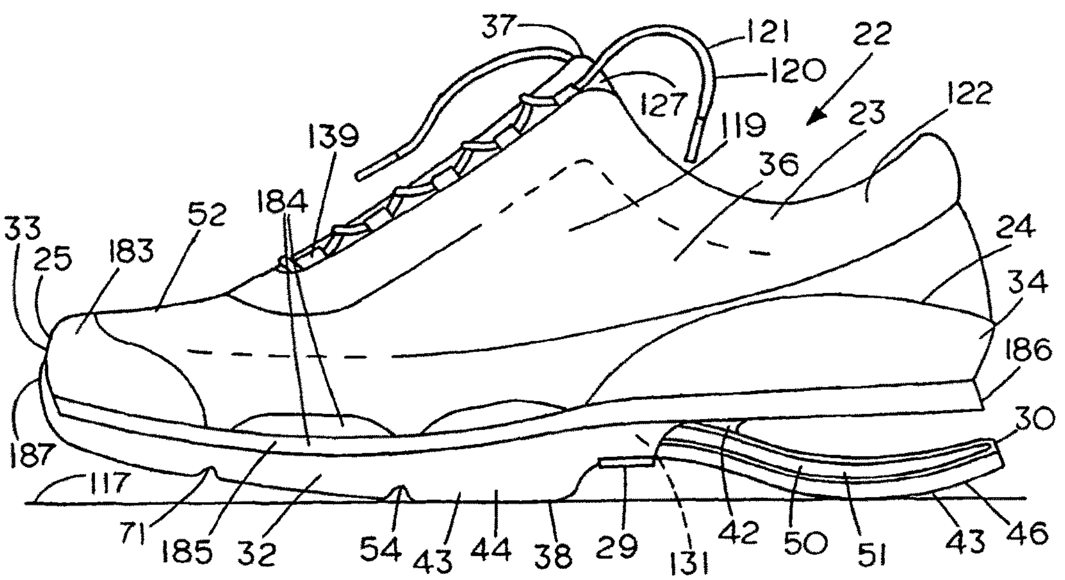

FIG. 577 is a lateral side view of an article of footwear generally similar to that shown in FIG. 576, but also including elevated sidewall portions.

Figure 578:
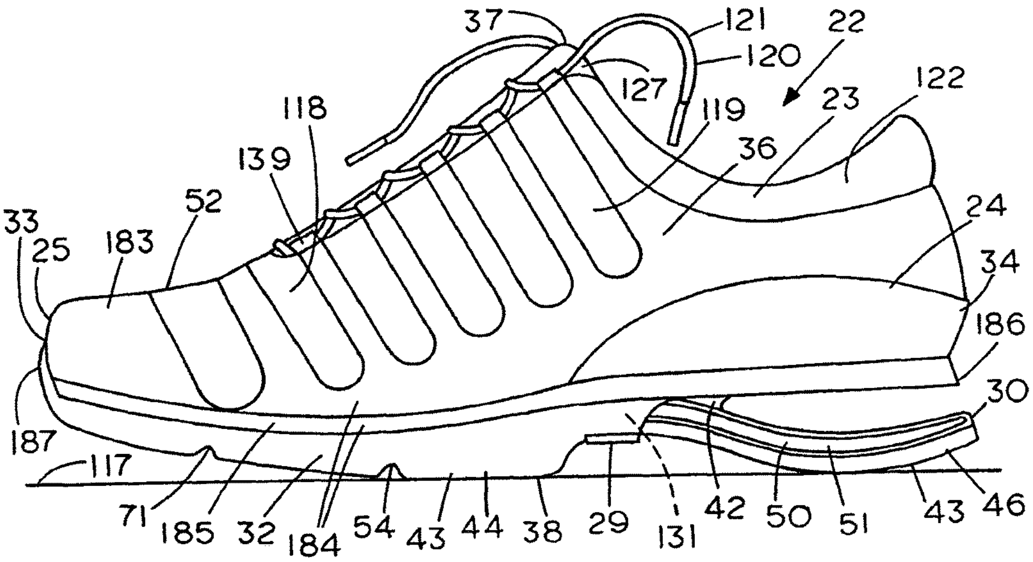

FIG. 578 is a lateral side view of an article of footwear generally similar to that shown in FIG. 577, but including elevated sidewall portions that also form straps.

Figure 579:
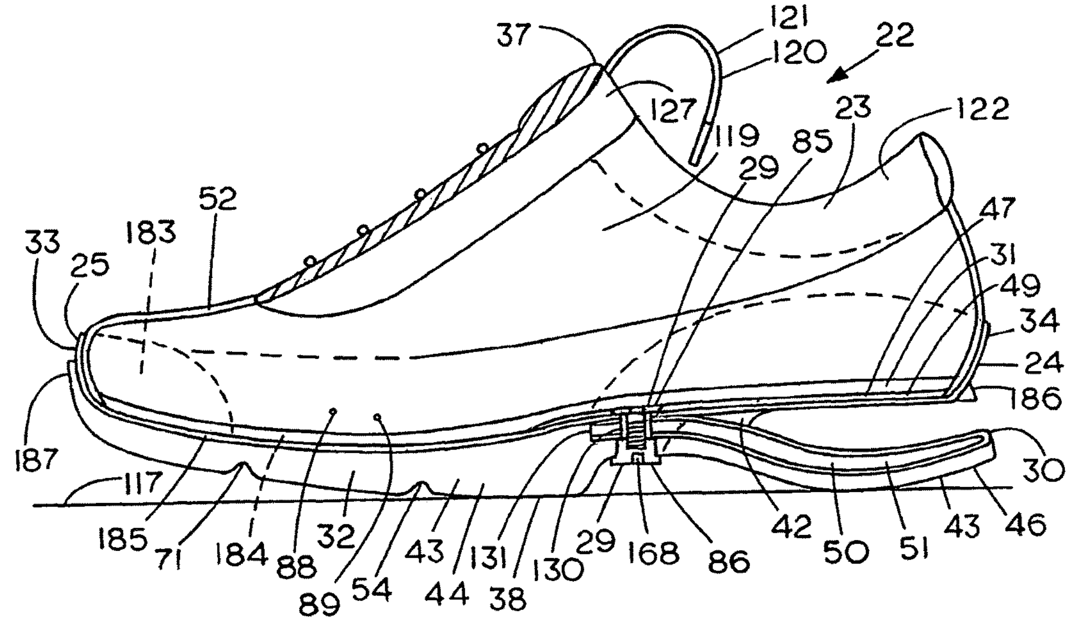

FIG. 579 is a lateral side cross-sectional view of an article of footwear generally similar to that shown in FIG. 576 showing a superior spring element.

Figure 580:
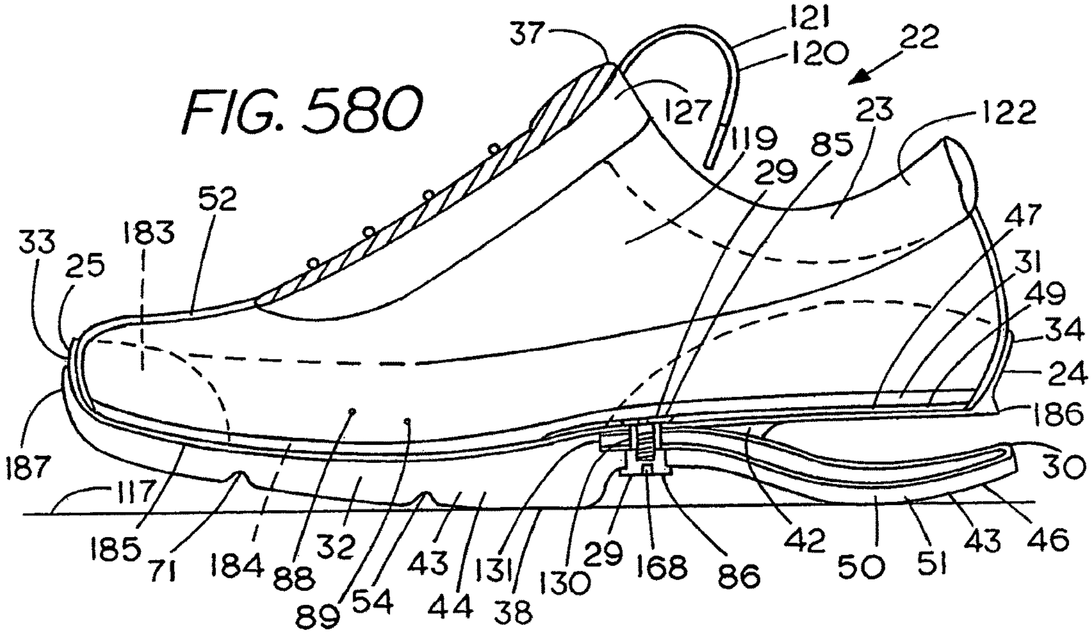

FIG. 580 is a lateral side cross-sectional view of an article of footwear generally similar to that shown in FIG. 579 showing an alternate superior spring element.

Figure 581:
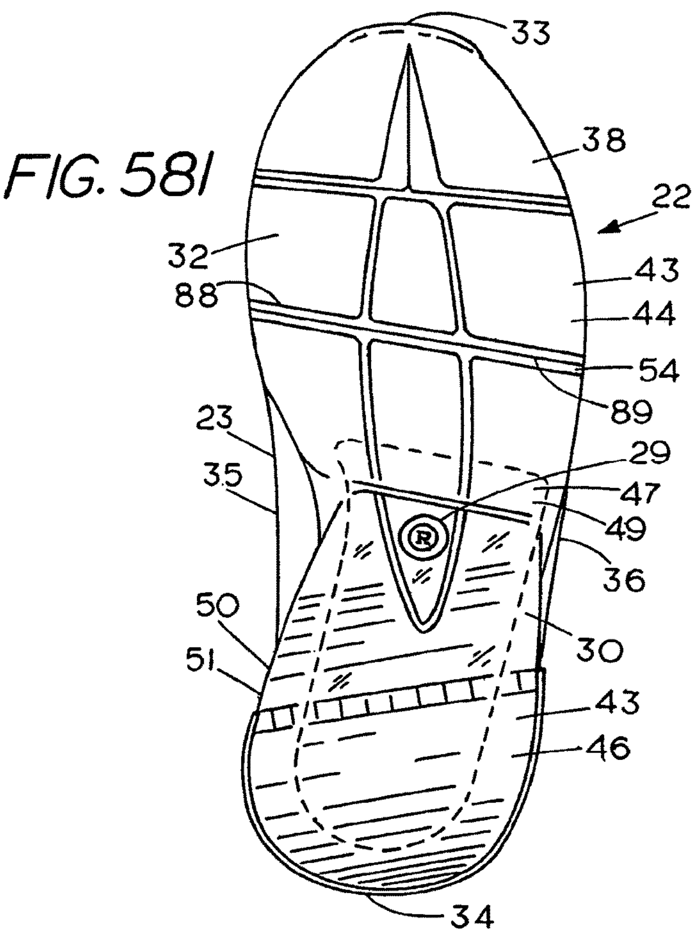

FIG. 581 is a bottom plan view of the article of footwear shown in FIG. 579 similar to an x-ray showing the superior spring element.

Figure 582:
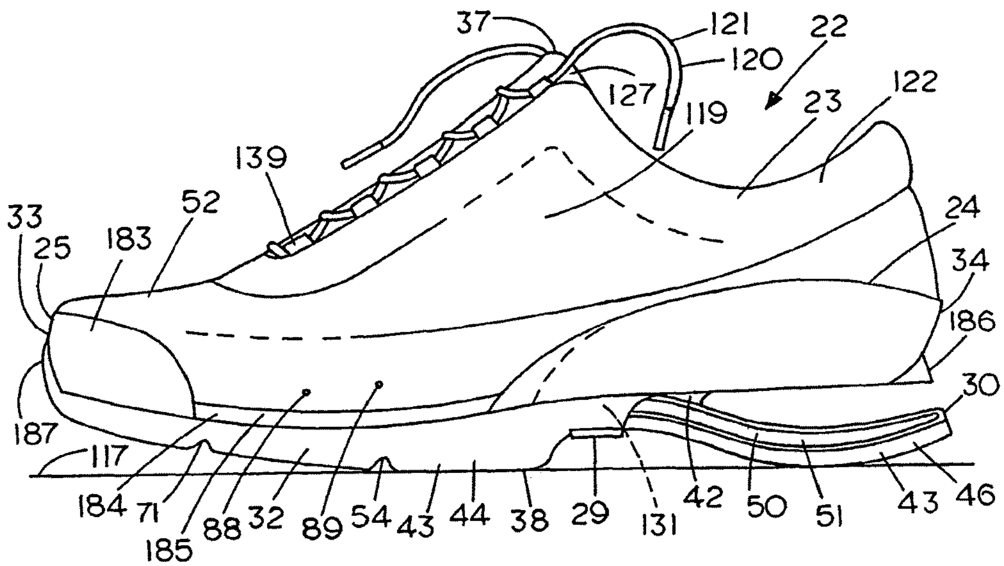

FIG. 582 is a lateral side view of an article of footwear generally similar to that shown in FIG. 576, but including an alternate external heel counter.

Figure 583:
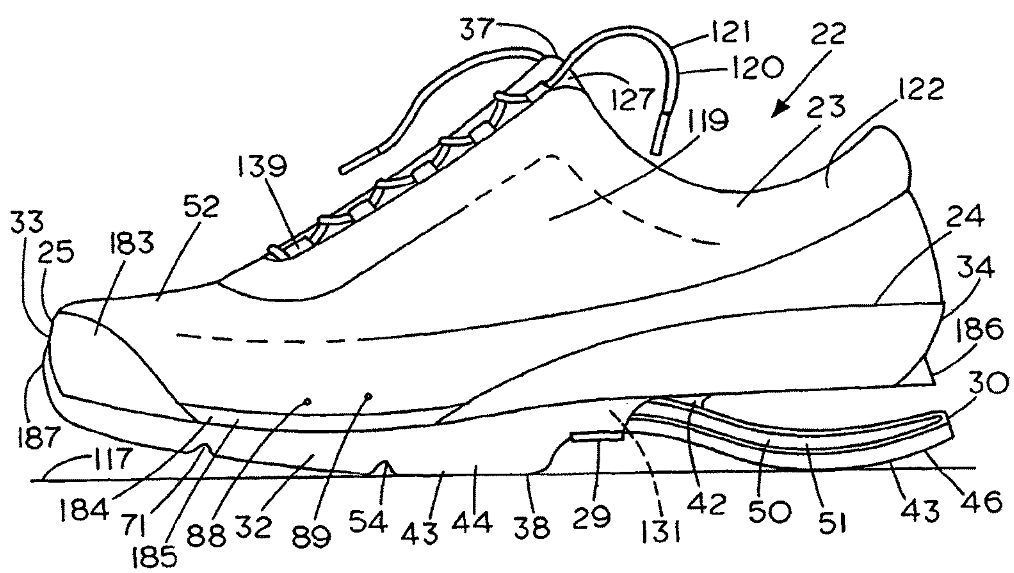

FIG. 583 is a lateral side view of an article of footwear generally similar to that shown in FIG. 576, but including an alternate external heel counter and external toe counter.

Figure 584:
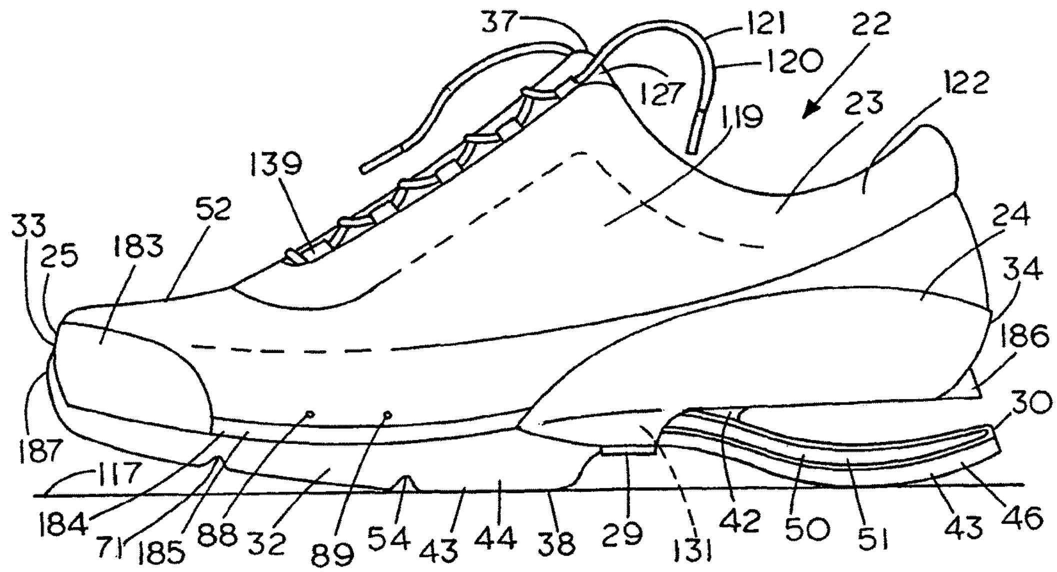

FIG. 584 is a lateral side view of an article of footwear generally similar to that shown in FIG. 576, but including an alternate external heel counter.

Figure 585:
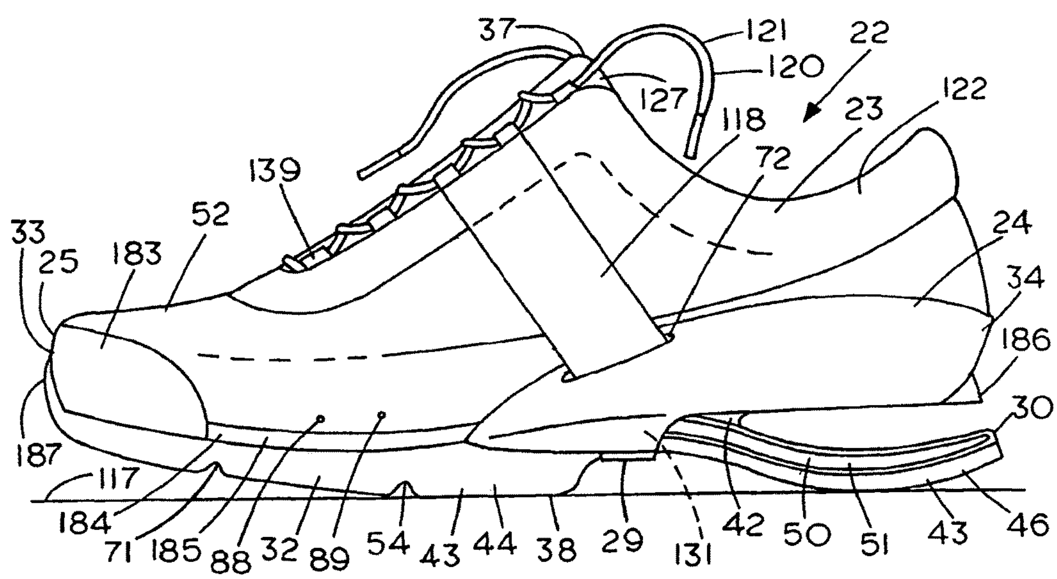

FIG. 585 is a lateral side view of an article of footwear generally similar to that shown in FIG. 576, but including an alternate external heel counter including an opening for receiving a strap.

Figure 586:
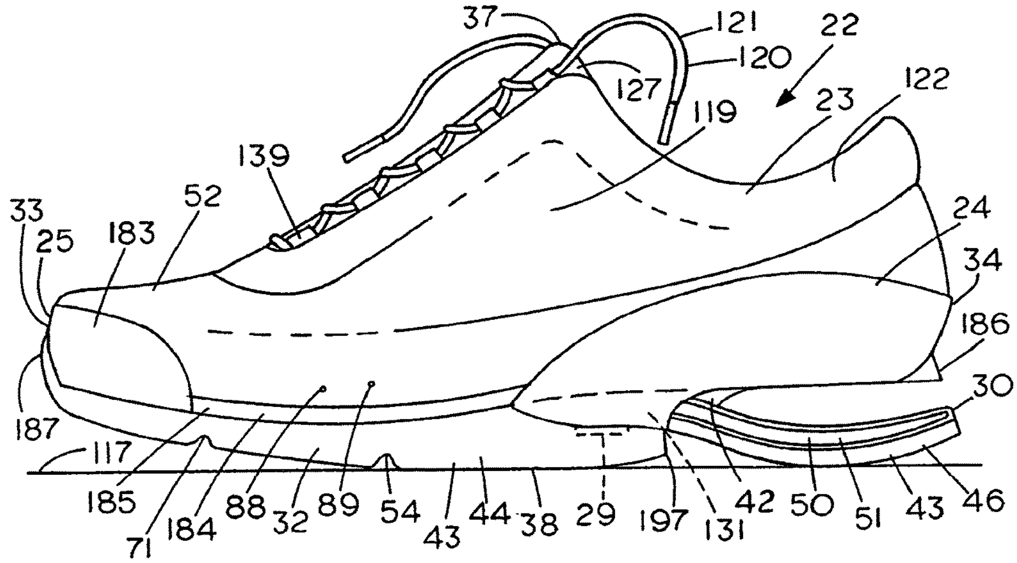

FIG. 586 is a lateral side view of an article of footwear generally similar to that shown in FIG. 576, but including an alternate external heel counter and anterior outsole element.

Figure 587:
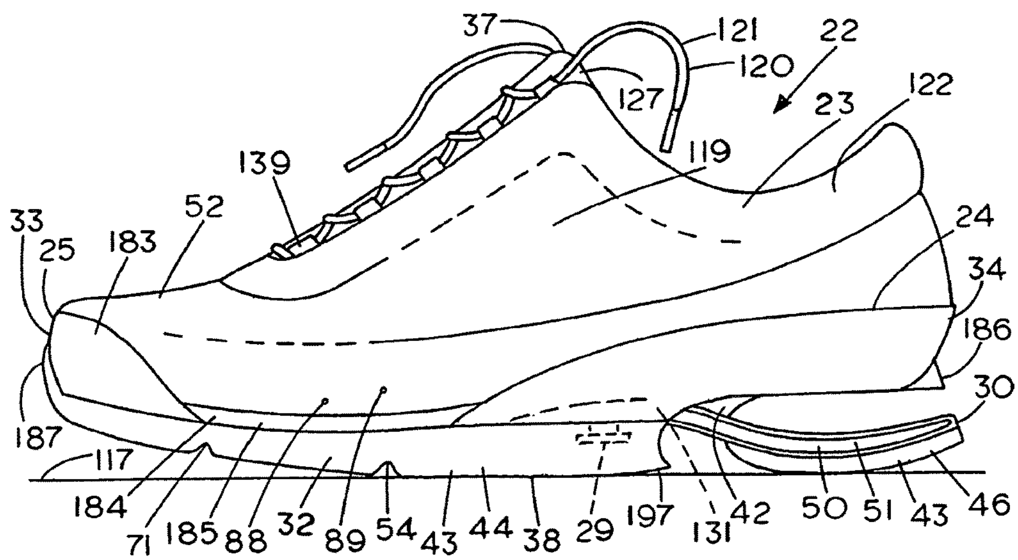

FIG. 587 is a lateral side view of an article of footwear generally similar to that shown in FIG. 576, but including an alternate external heel counter, external toe counter, and anterior outsole element.

Figure 588:
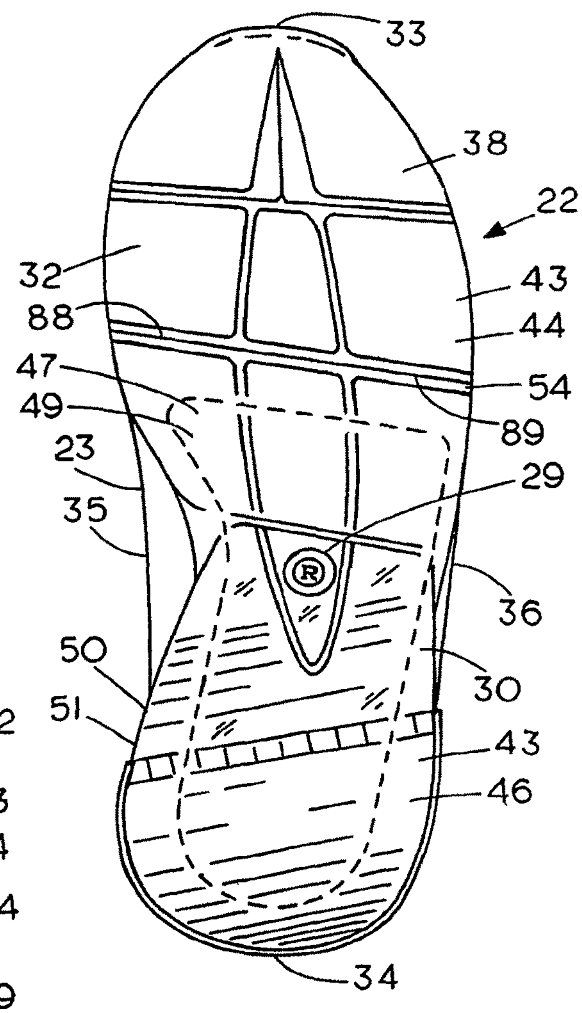

FIG. 588 is a bottom plan view of the article of footwear shown in FIG. 580 similar to an x-ray showing the superior spring element.

Figure 589:
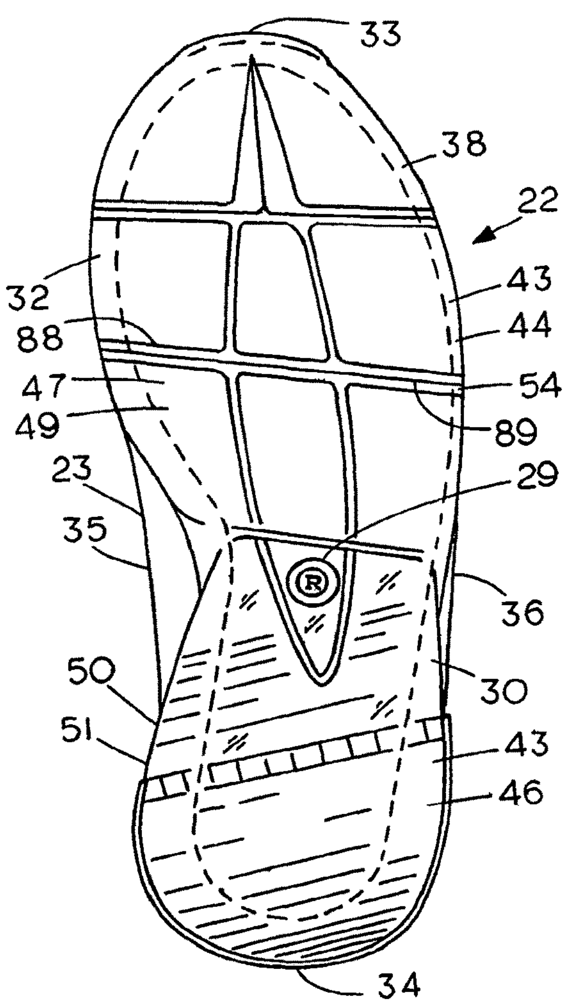

FIG. 589 is a bottom plan view of the article of footwear generally similar to that shown in FIG. 576 similar to an x-ray showing a full length superior spring element.

Figure 590:
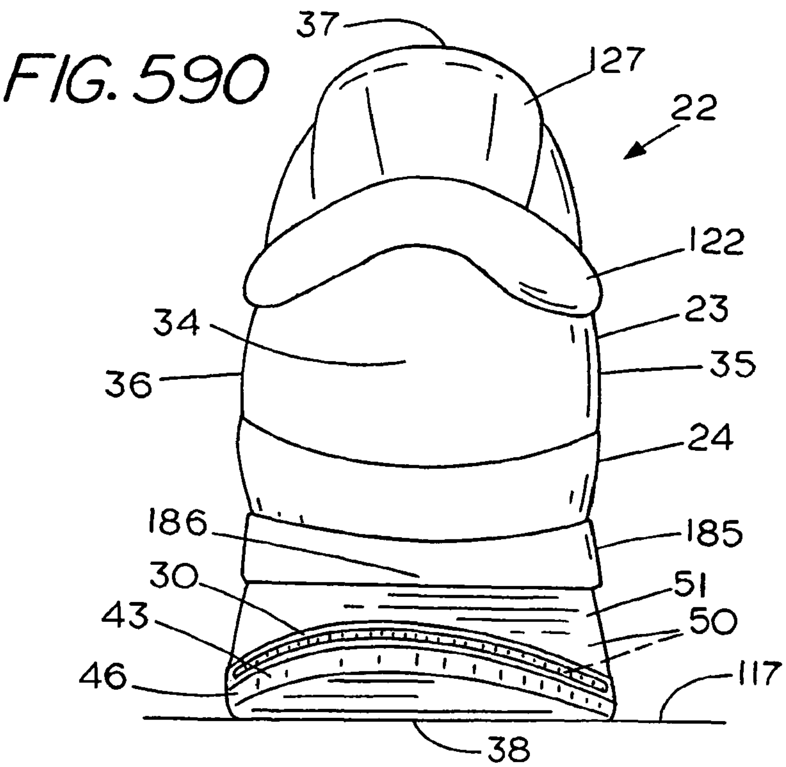

FIG. 590 is a rear view of the article of footwear shown in FIG. 576.

Figure 591:
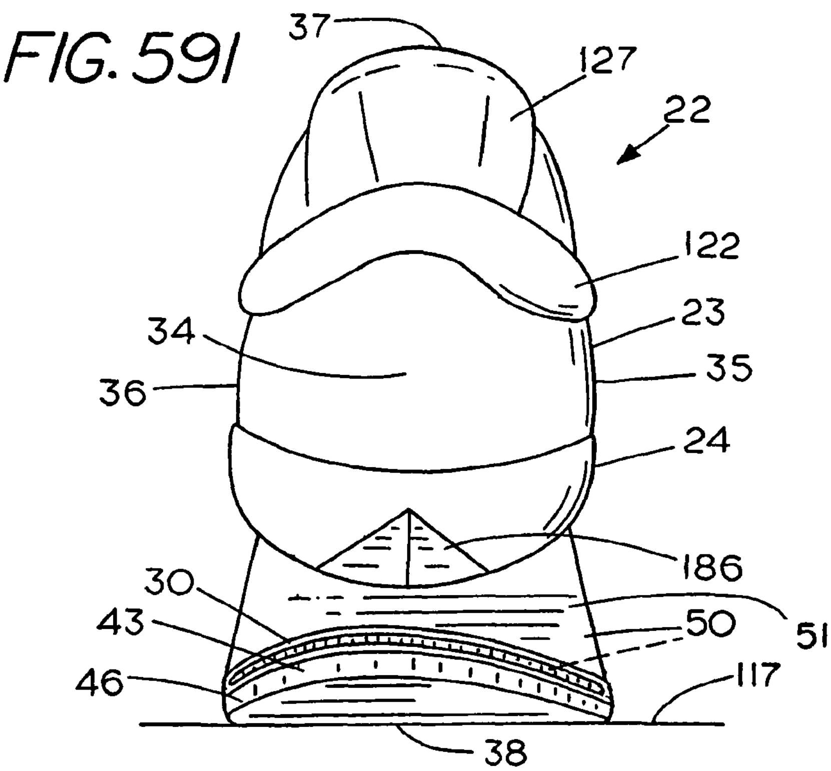

FIG. 591 is a rear view of the article of footwear shown in FIG. 582.

Figure 592:
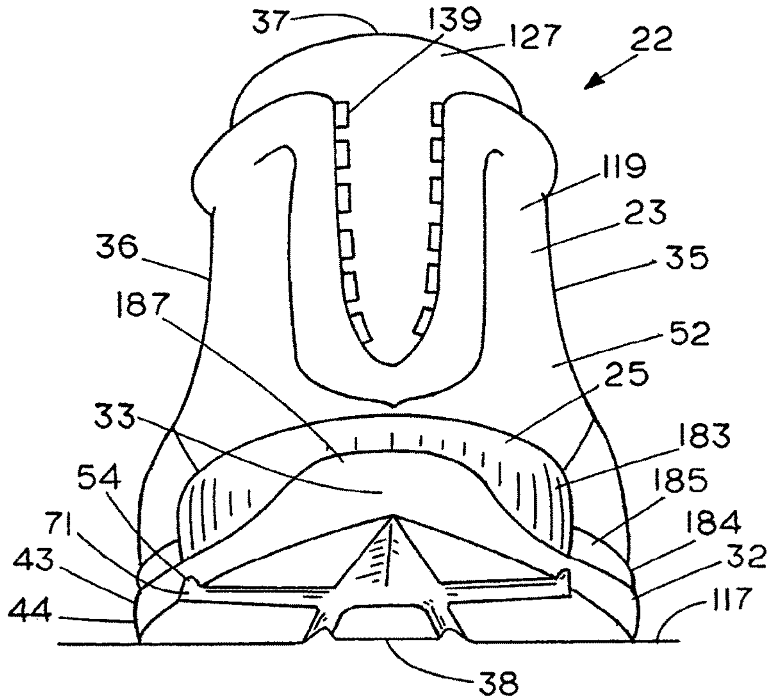

FIG. 592 is a front view of the article of footwear shown in FIG. 576.

Figure 593:
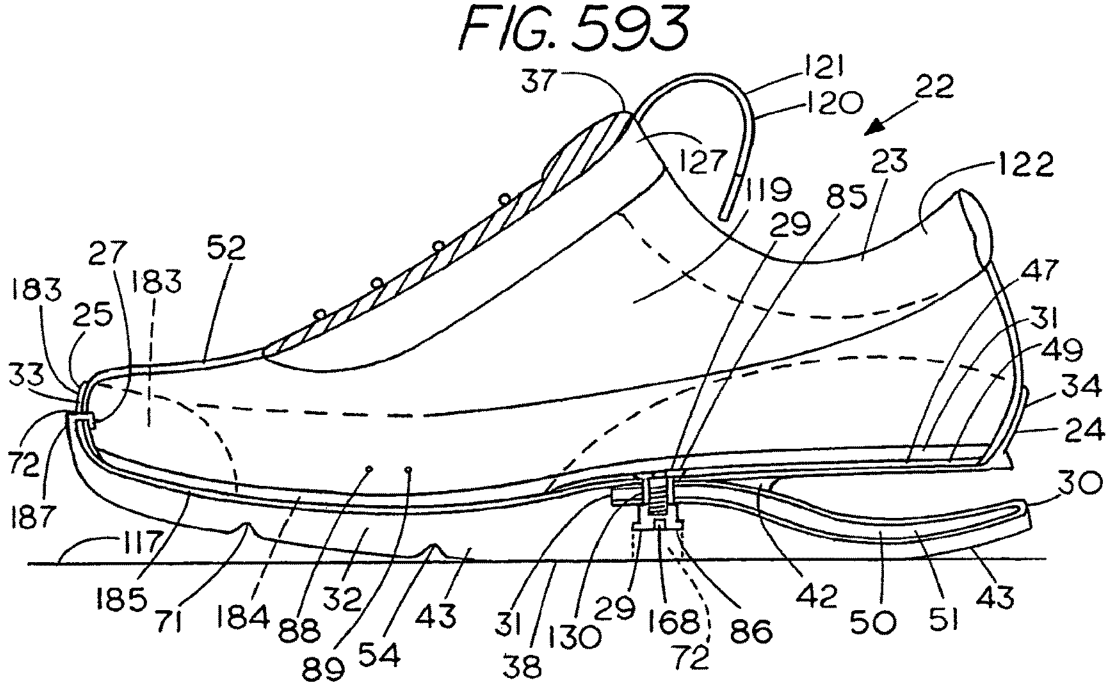

FIG. 593 is a lateral side cross sectional view of an article of footwear generally similar to that shown in FIG. 579, but also showing an anterior outsole element including a hook.

Figure 594:
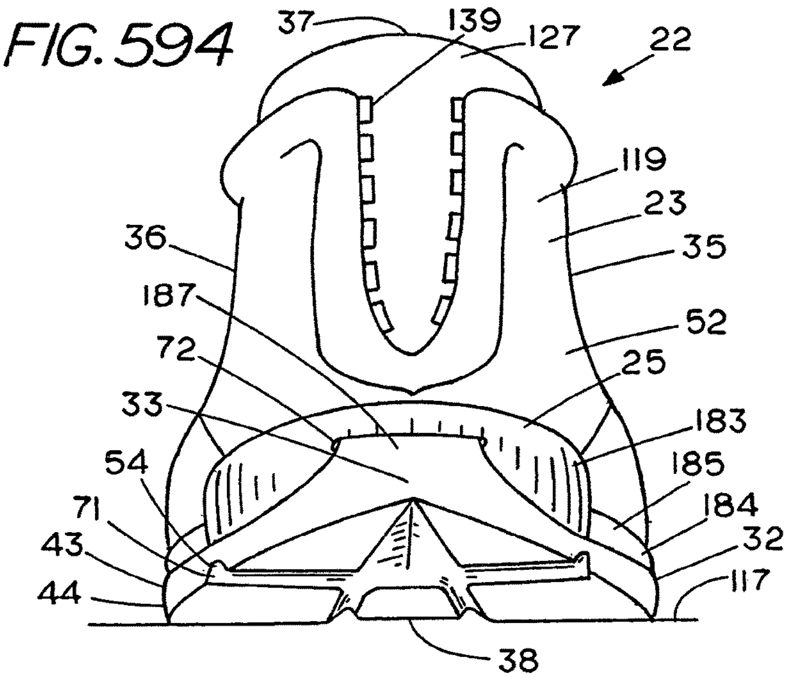

FIG. 594 is a front view of the article of footwear shown in FIG. 593.

Figure 595:
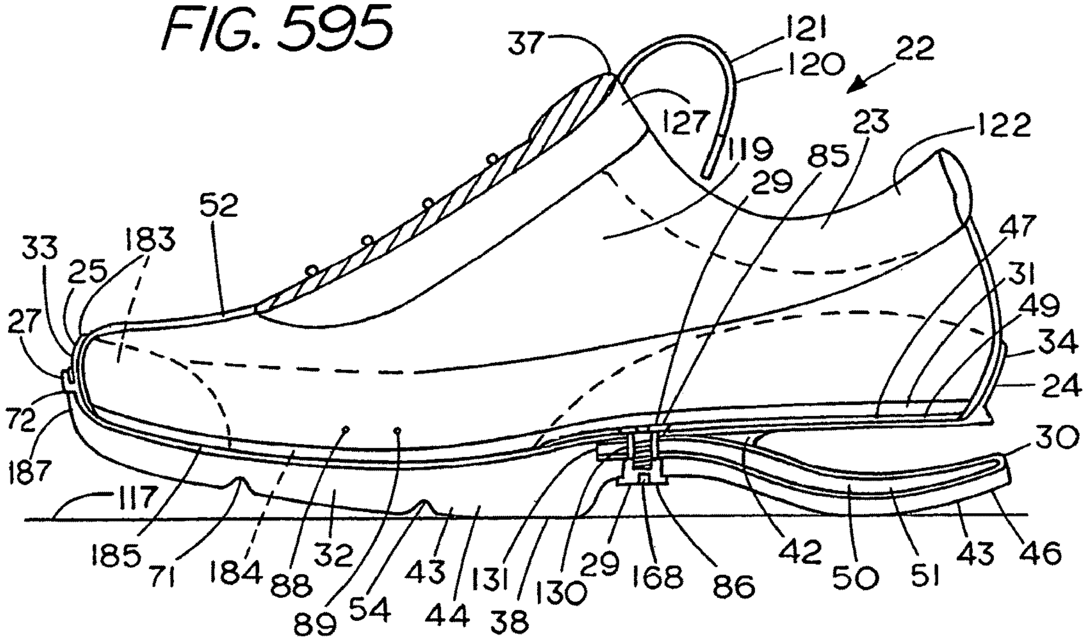

FIG. 595 is a lateral side cross sectional view of an article of footwear generally similar to that shown in FIG. 579, but also showing an external toe counter including a hook.

Figure 596:
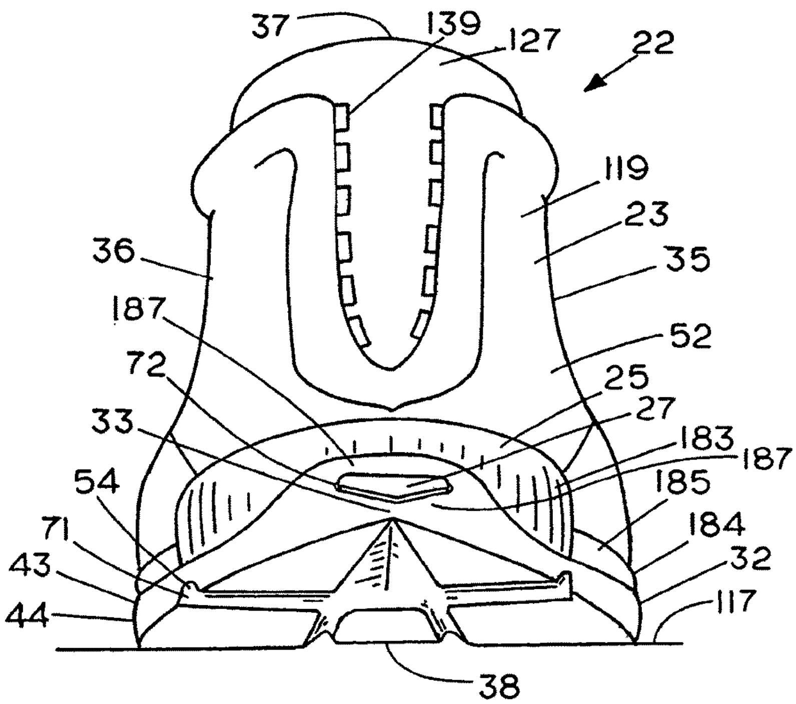

FIG. 596 is a front view of the article of footwear shown in FIG. 595.

Figure 597:
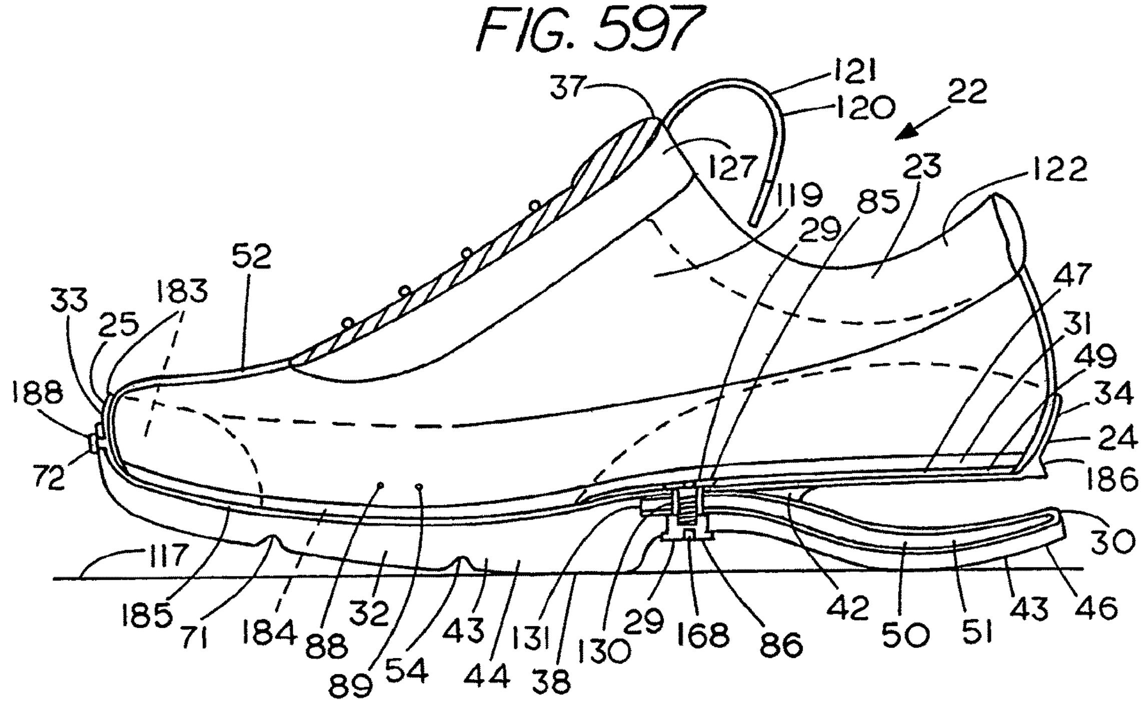

FIG. 597 is a lateral side cross sectional view of an article of footwear generally similar to that shown in FIG. 579, but also showing an external toe counter including a snap.

Figure 598:
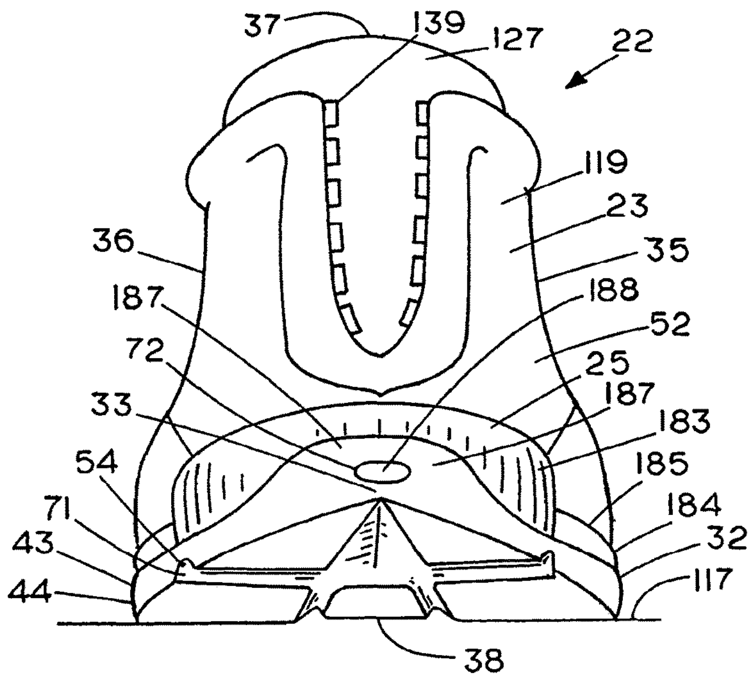

FIG. 598 is a front view of the article of footwear shown in FIG. 597.

Figure 599:
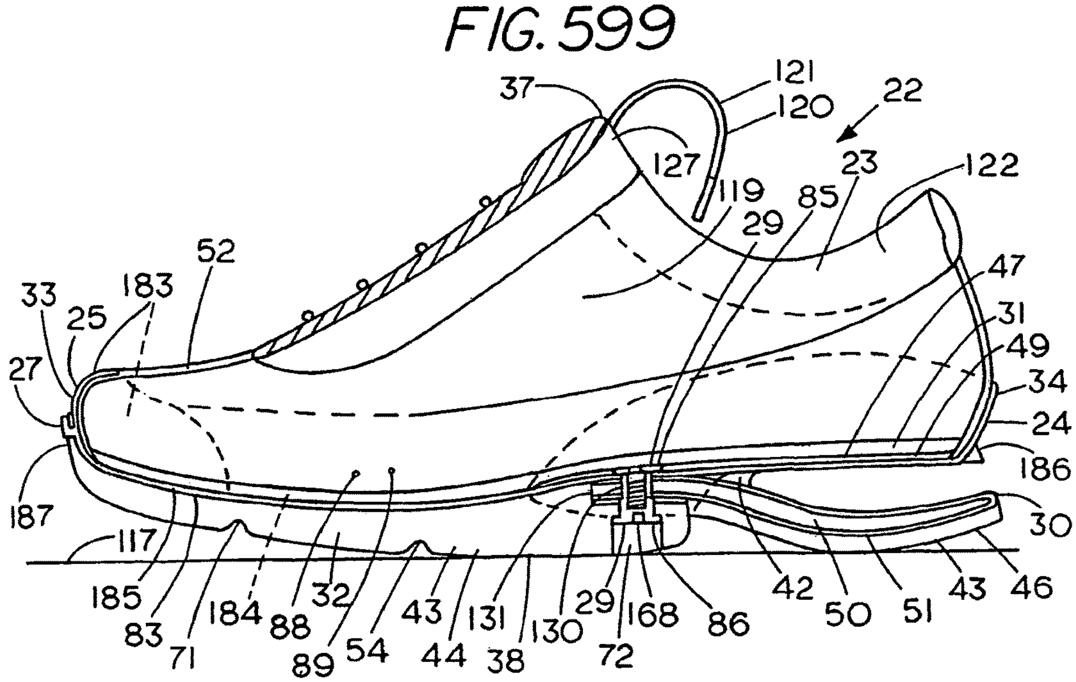

FIG. 599 is a lateral side cross sectional view of an article of footwear generally similar to that shown in FIG. 586, but also showing an external toe counter including a hook and an anterior outsole element including a self-adhesive surface.

Figure 600:
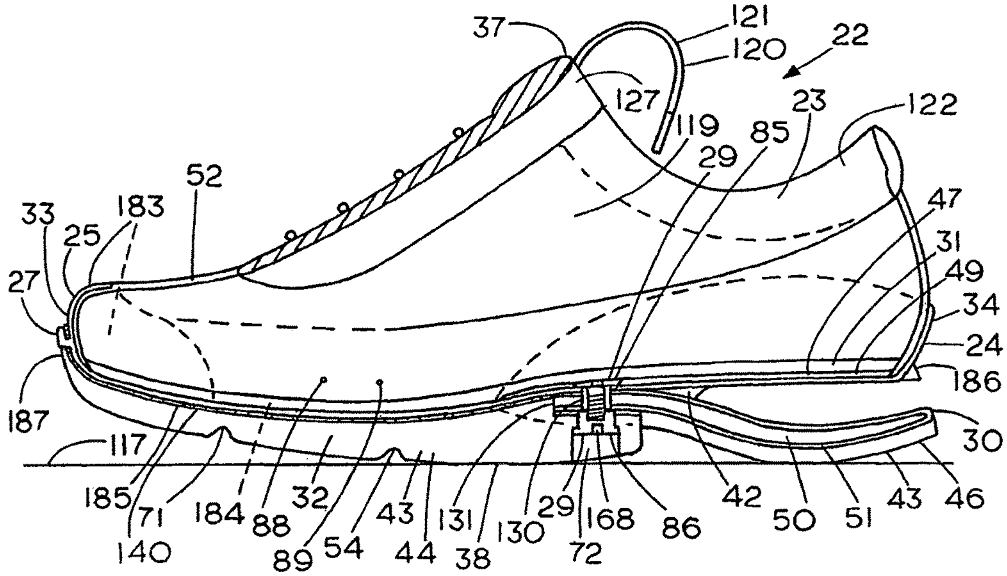

FIG. 600 is a lateral side cross sectional view of an article of footwear generally similar to that shown in FIG. 586, but also showing an external toe counter including a hook and an anterior outsole element including VELCRO®.

Figure 601:
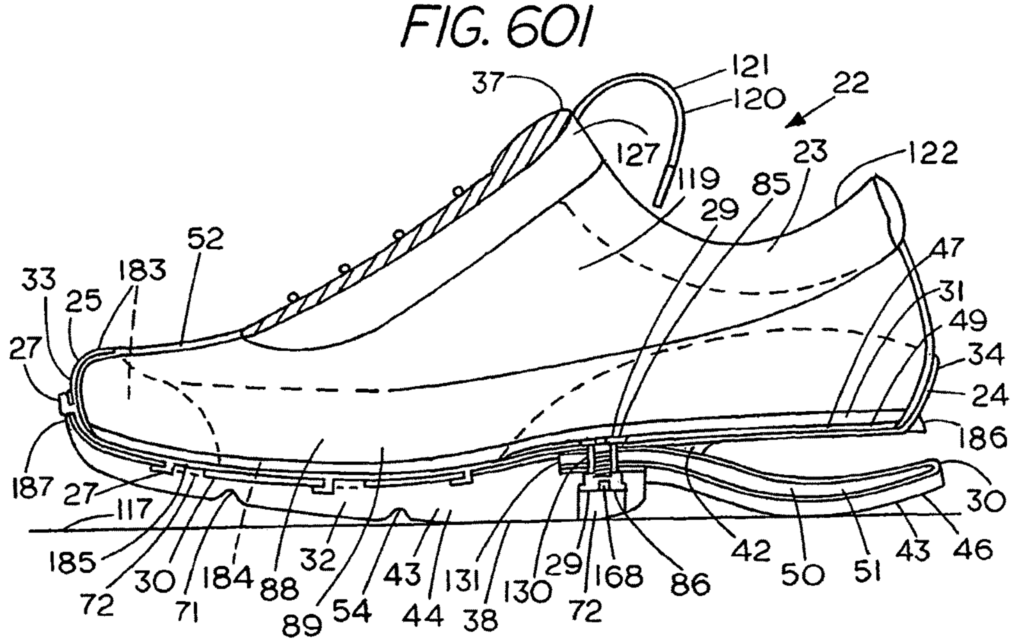

FIG. 601 is a lateral side cross sectional view of an article of footwear generally similar to that shown in FIG. 586, but also showing an upper including a plurality of hooks for securing the anterior outsole element.

Figure 602:
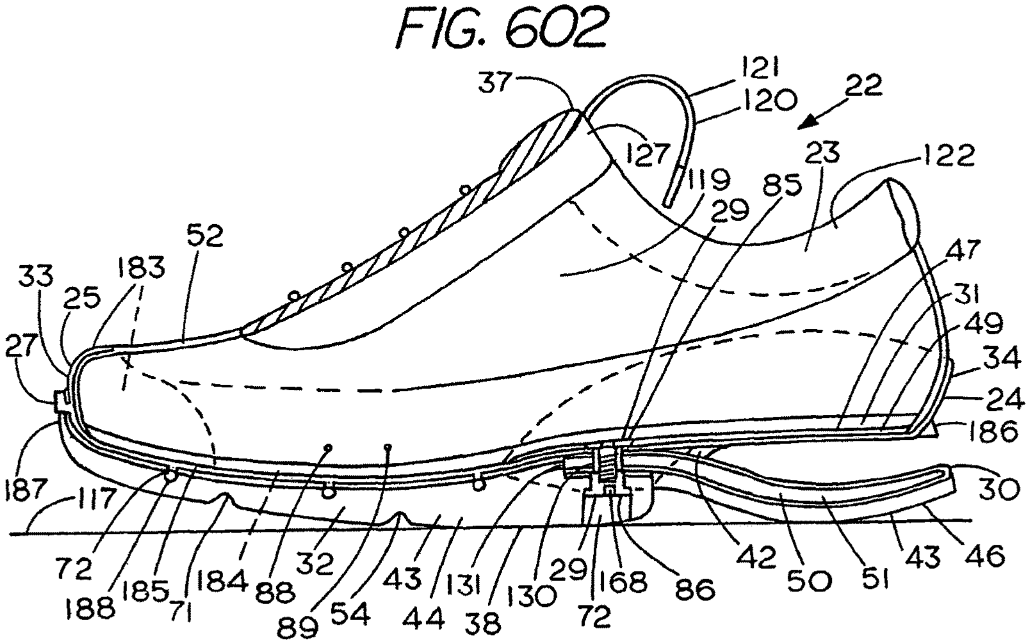

FIG. 602 is a lateral side cross sectional view of an article of footwear generally similar to that shown in FIG. 586, but also showing an upper including a plurality of snaps for securing the anterior outsole element.

Figure 603:
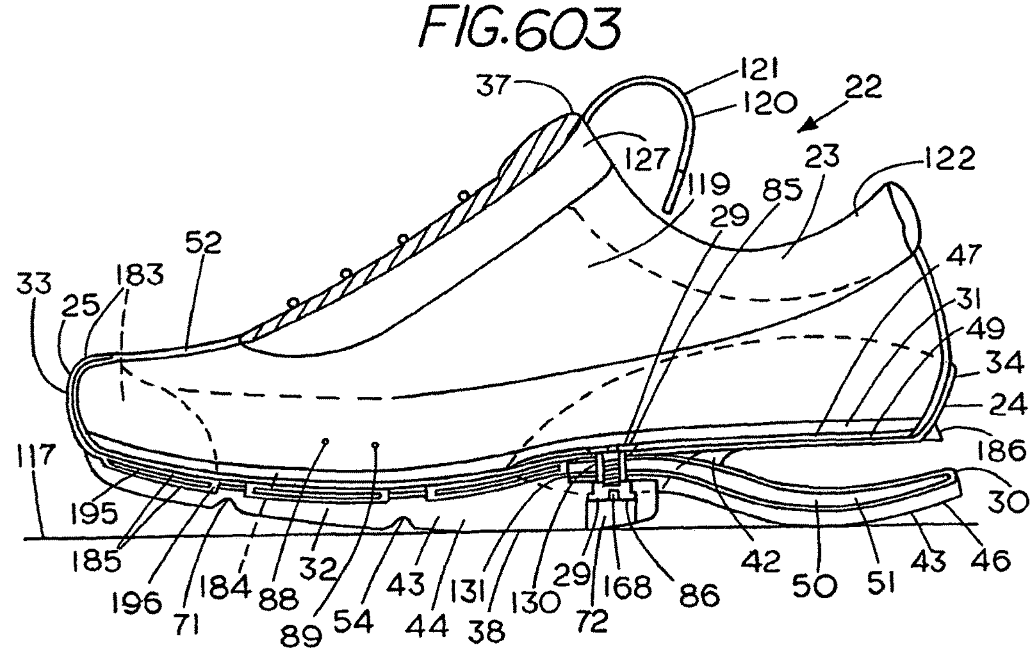

FIG. 603 is a lateral side cross sectional view of an article of footwear generally similar to that shown in FIG. 586, but also showing tongue and groove for securing the anterior outsole element.

Figure 604:
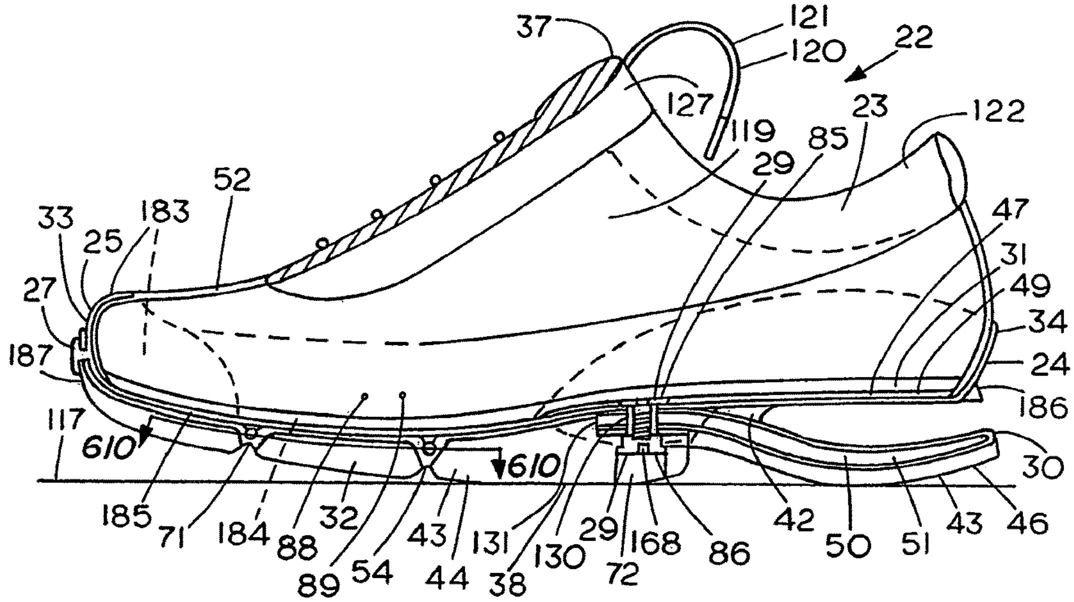

FIG. 604 is a lateral side cross sectional view of an article of footwear generally similar to that shown in FIG. 586, but also showing a plurality of pins and channels for securing the anterior outsole element.

Figure 605:
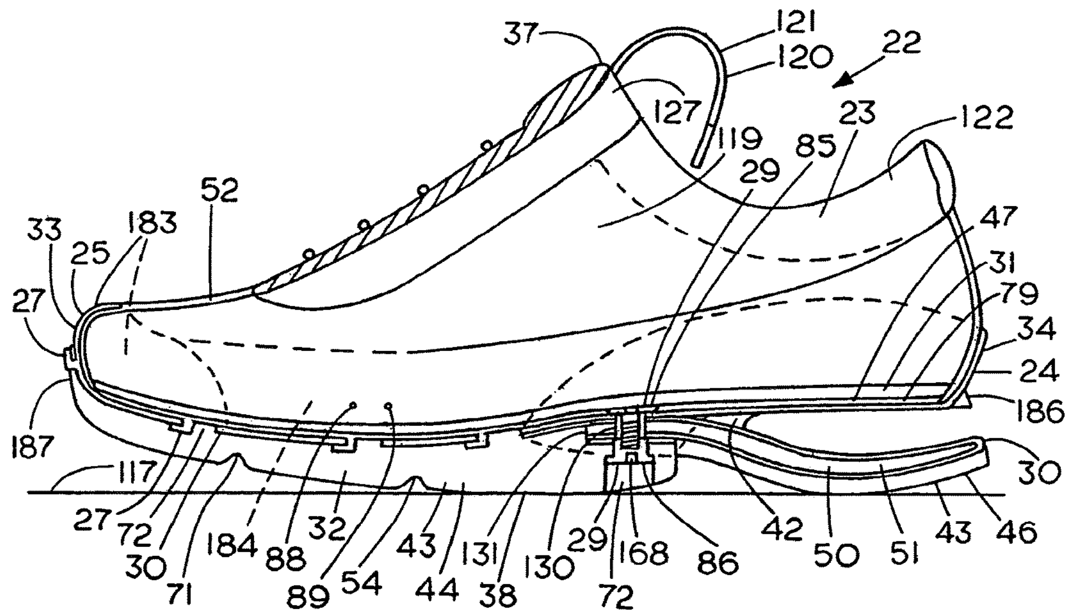

FIG. 605 is a lateral side cross sectional view of an article of footwear generally similar to that shown in FIG. 601, but also showing a plurality of hooks for securing the anterior outsole element.

Figure 606:
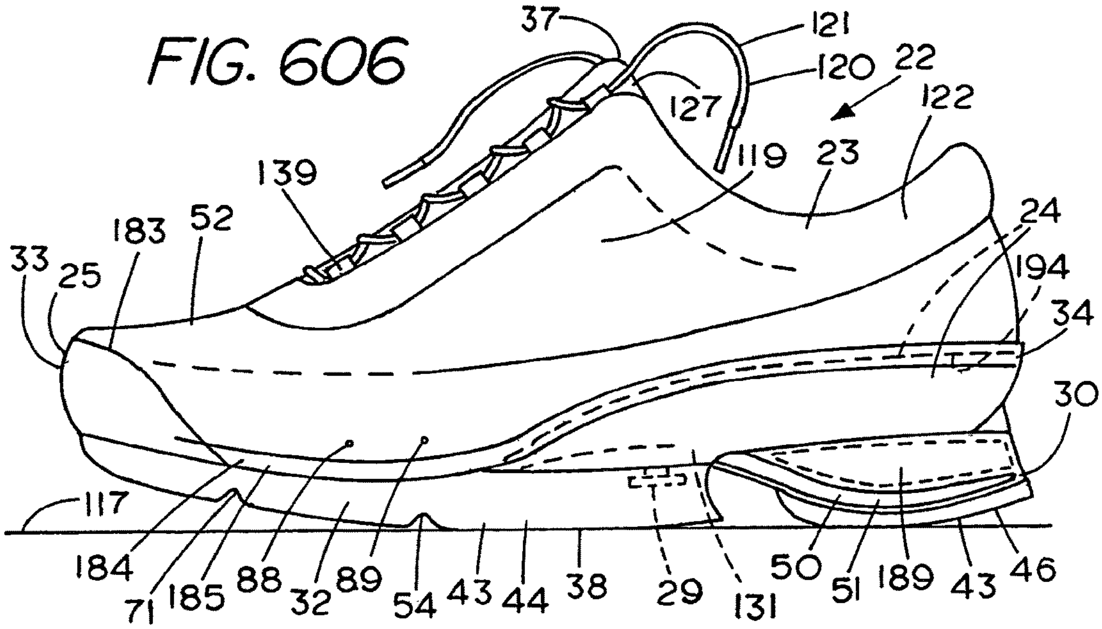

FIG. 606 is a lateral side cross sectional view of an article of footwear generally similar to that shown in FIG. 603, but also showing an upper including a channel for receiving a portion of an external heel counter and the use of an intelligent cushioning system.

Figure 607:
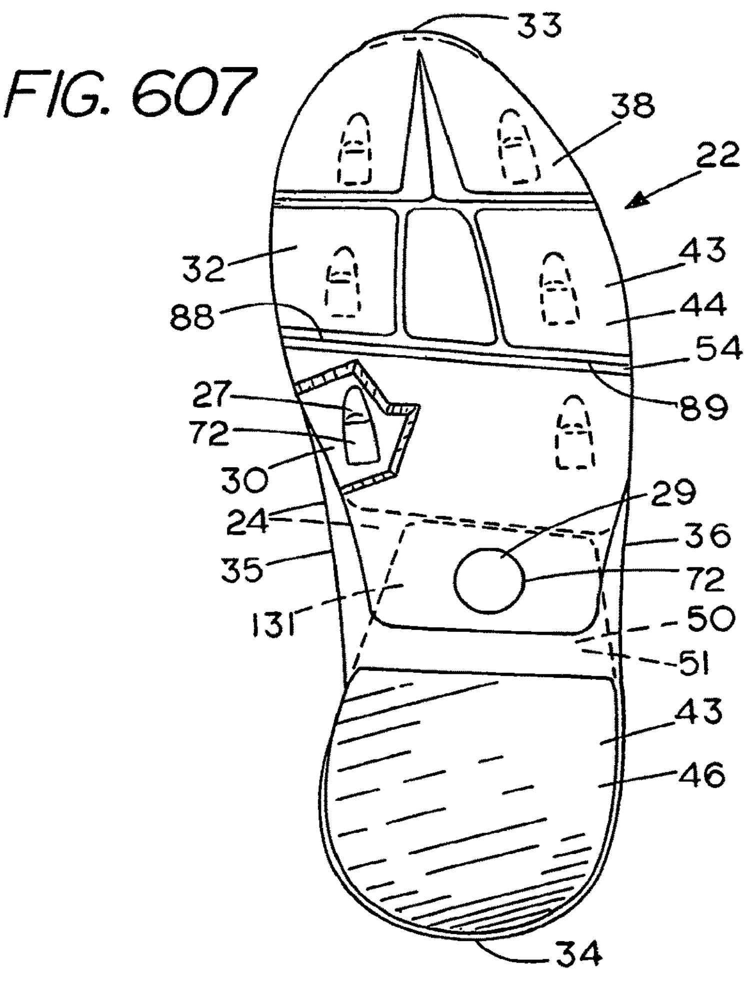

FIG. 607 is a bottom view of the article of footwear shown in FIGS. 601 and 605 showing a plurality of hooks for securing the anterior outsole element.

Figure 608:
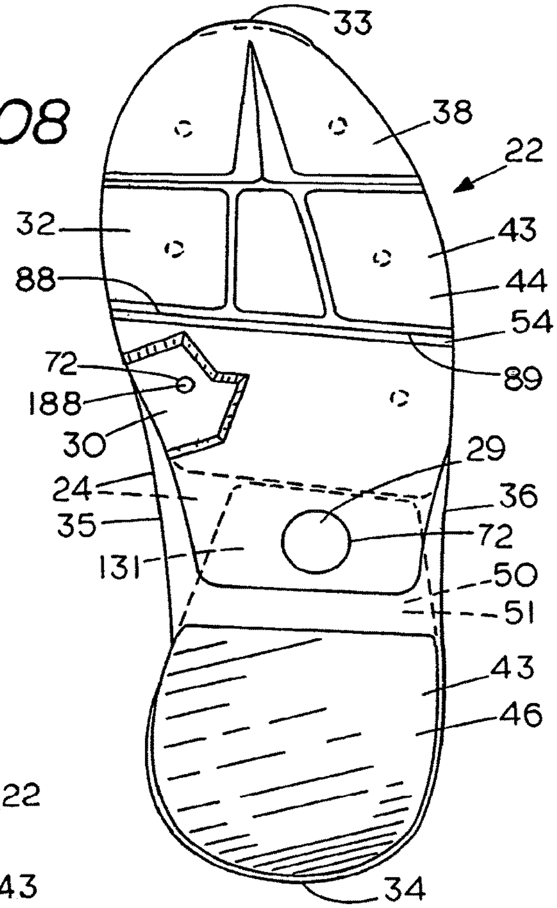

FIG. 608 is a bottom view of the article of footwear shown in FIG. 602 showing a plurality of snaps for securing the anterior outsole element.

Figure 609:
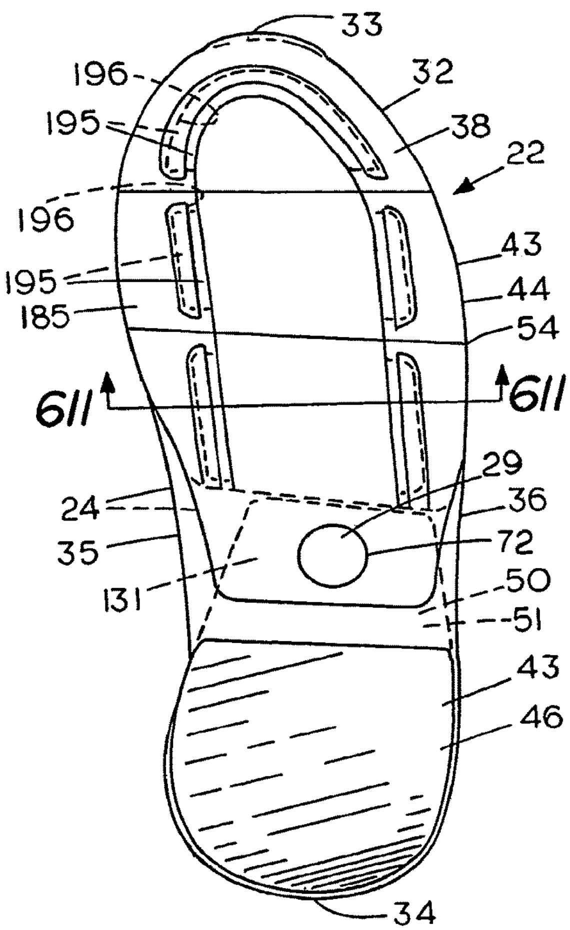

FIG. 609 is a bottom view of the article of footwear shown in FIG. 603 showing tongue and groove for securing the anterior outsole element.

Figure 610:
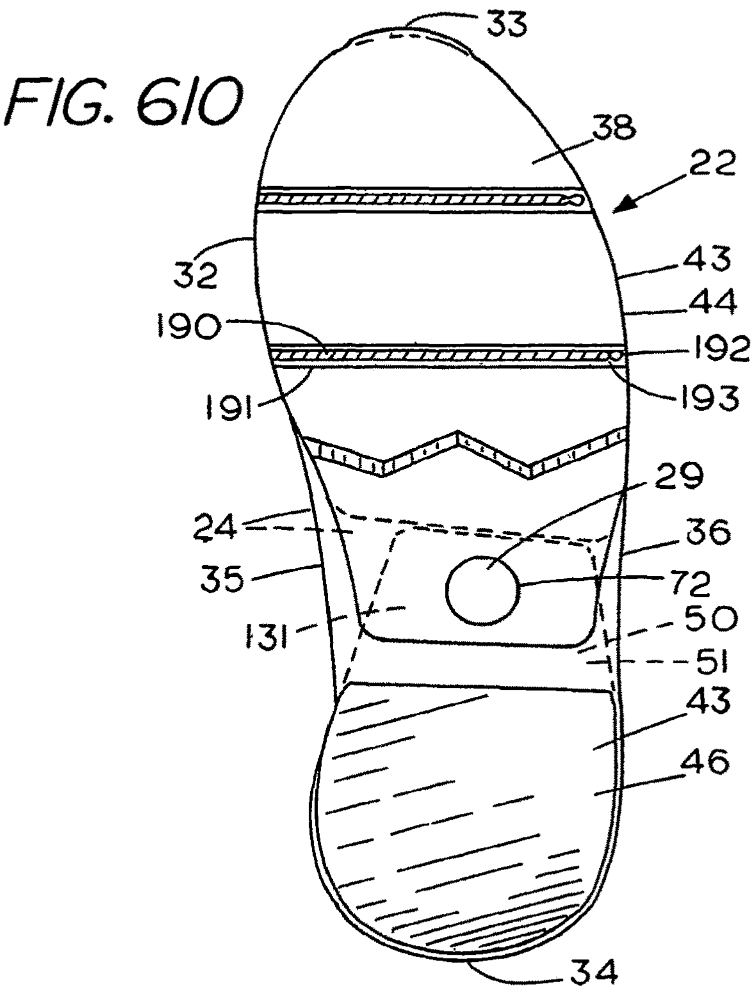
Figure 611:
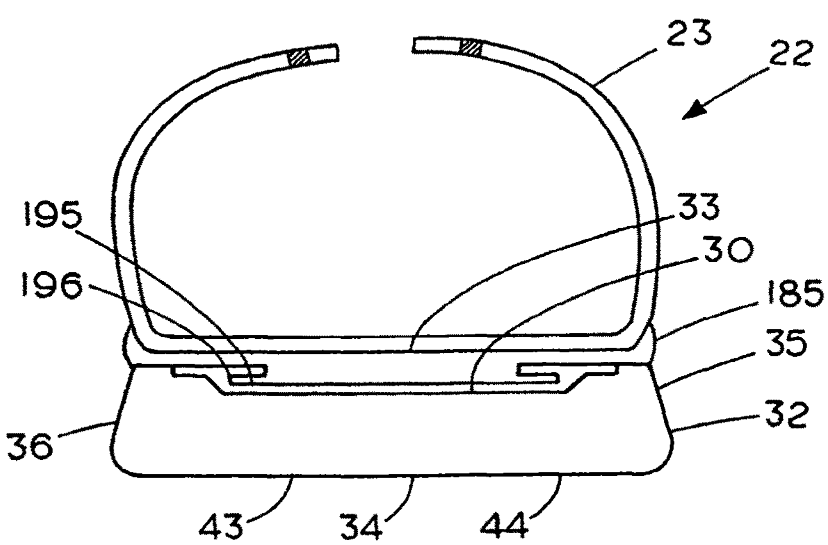

FIG. 610 is a bottom cross-sectional view of the article of footwear shown in FIG. 604 taken along line 610-610 showing pins and channels for securing the anterior outsole element FIG. 611 is a cross-sectional view of the article of footwear shown in FIG. 609 taken along line 611-611.

FIG. 612 is a front view of an article of footwear consisting of a boot.

FIG. 613 is a rear view of the boot shown in FIG. 612.

Figure 614:
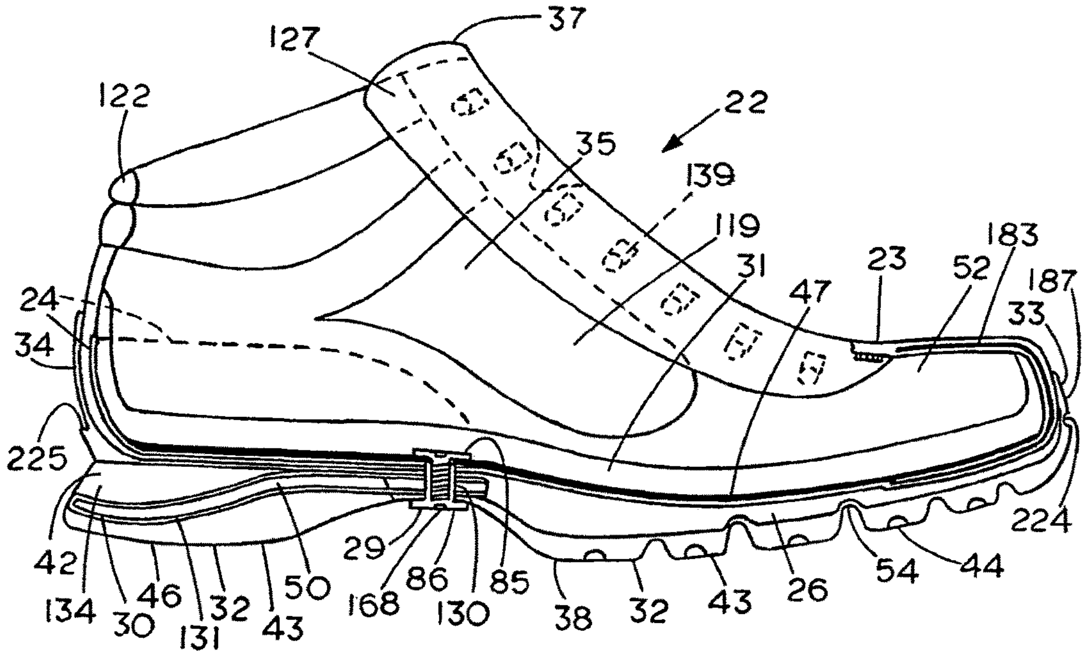

FIG. 614 is a medial side cross-sectional view of the boot shown in FIGS. 612-613.

Figure 615:
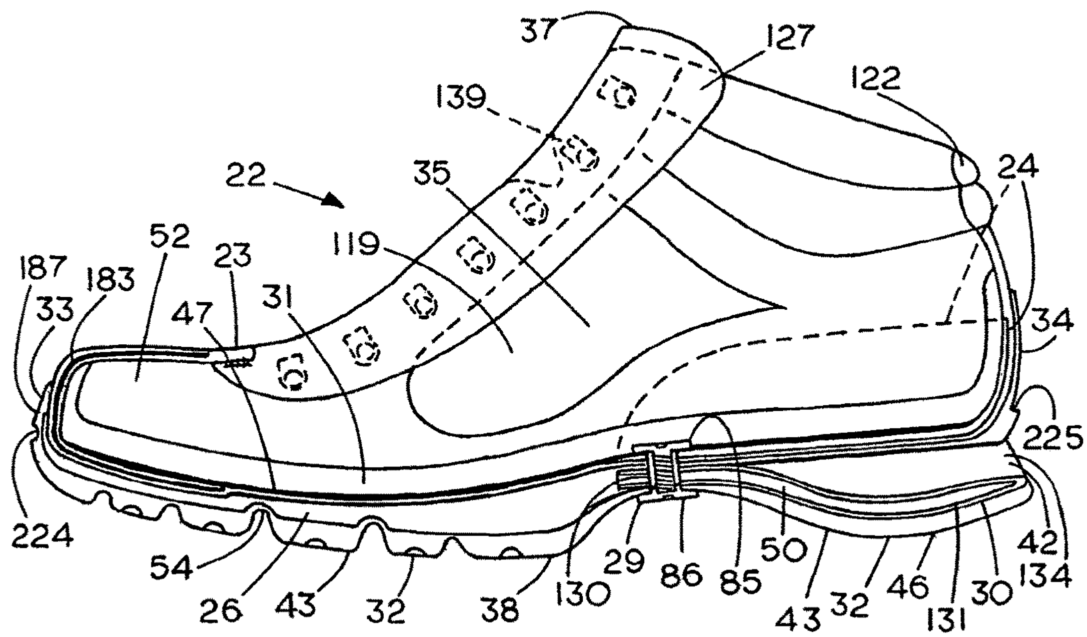

FIG. 615 is a lateral side cross-sectional view of the boot shown in FIGS. 612-614.

Figure 616:
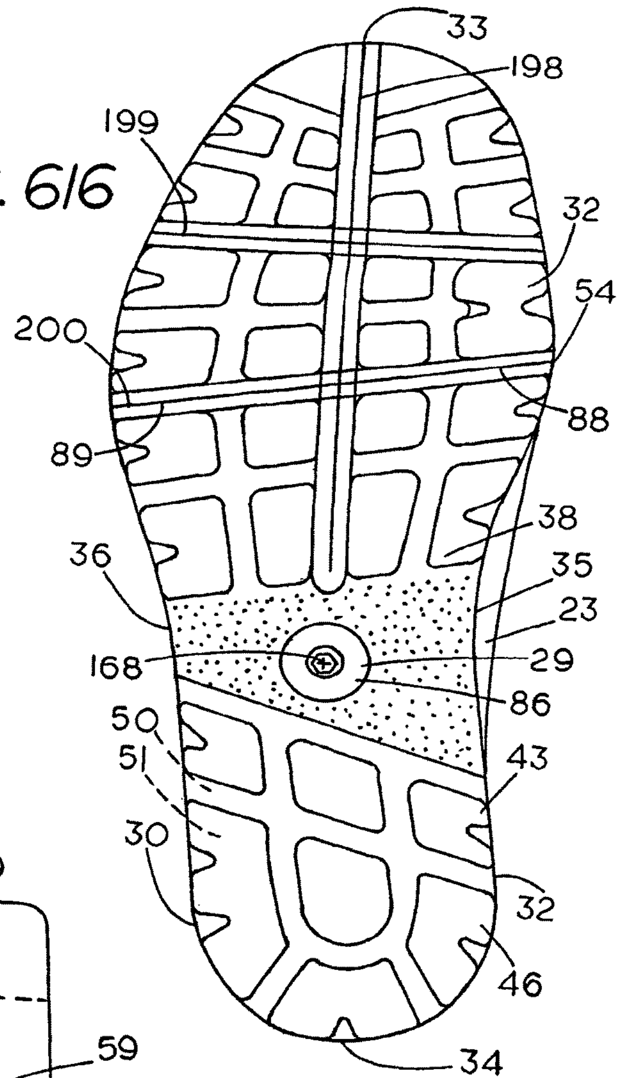

FIG. 616 is a bottom view of the boot shown in FIGS. 612-615.

Figure 617:
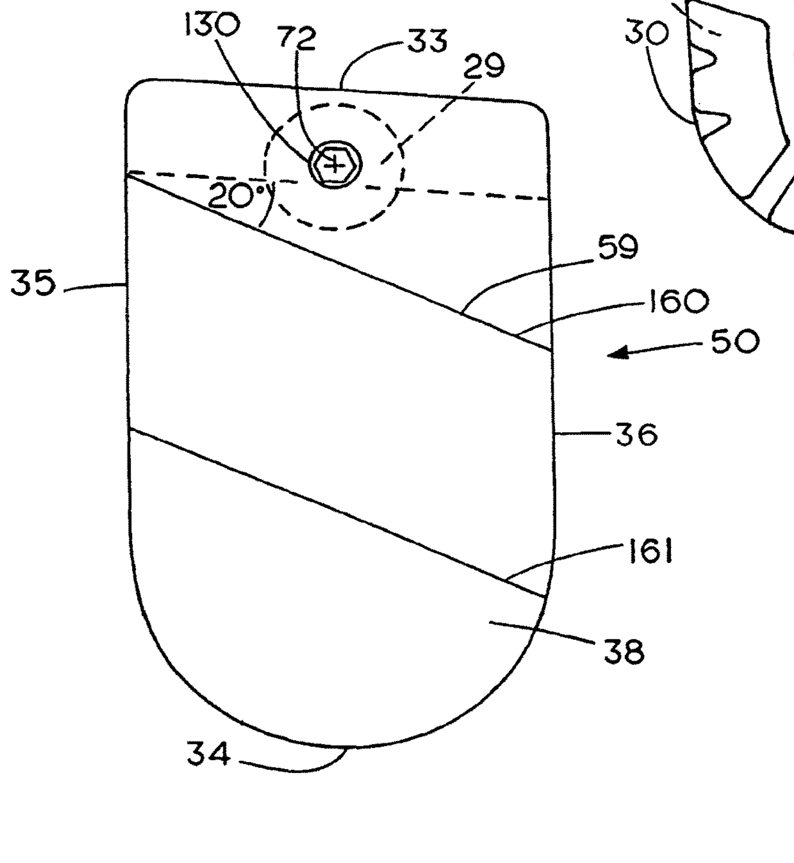

FIG. 617 is a bottom view of an inferior spring element for use with the boot shown in FIGS. 612-616.

Figure 618:
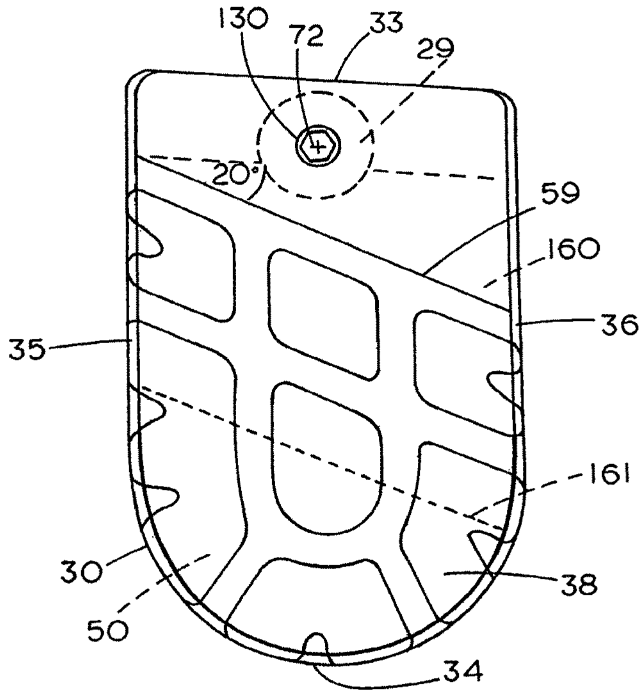

FIG. 618 is a bottom view of a posterior outsole element mounted on the inferior spring element shown in FIG. 617.

Figure 619:
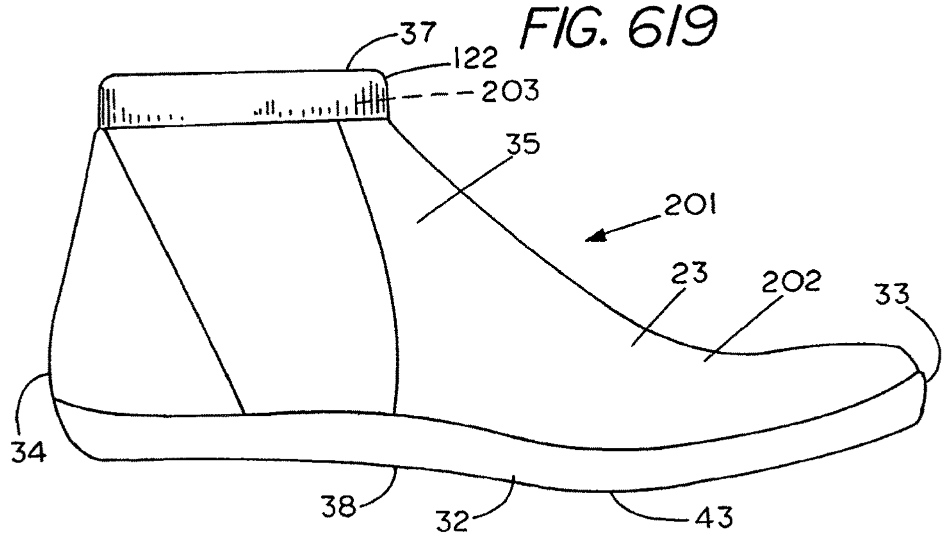

FIG. 619 is a lateral side view of a aquatic boot for possible use with the boot shown in FIGS. 612-616.

Figure 620:
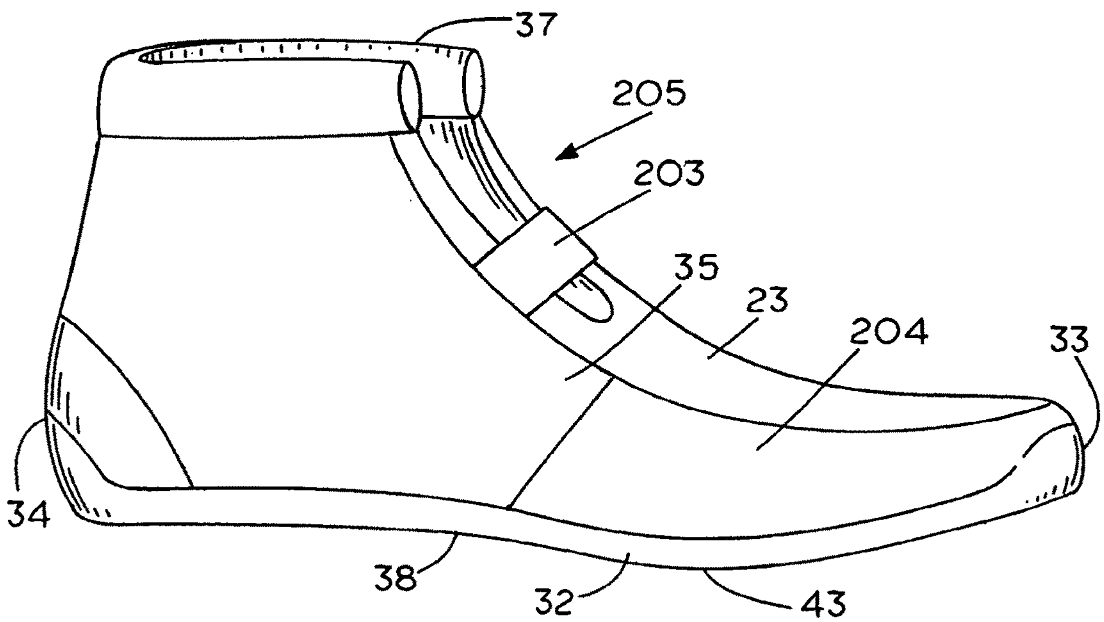

FIG. 620 is a lateral side perspective view of a cold temperature boot or liner for possible use with the boot shown in FIGS. 612-616.

Figure 621:
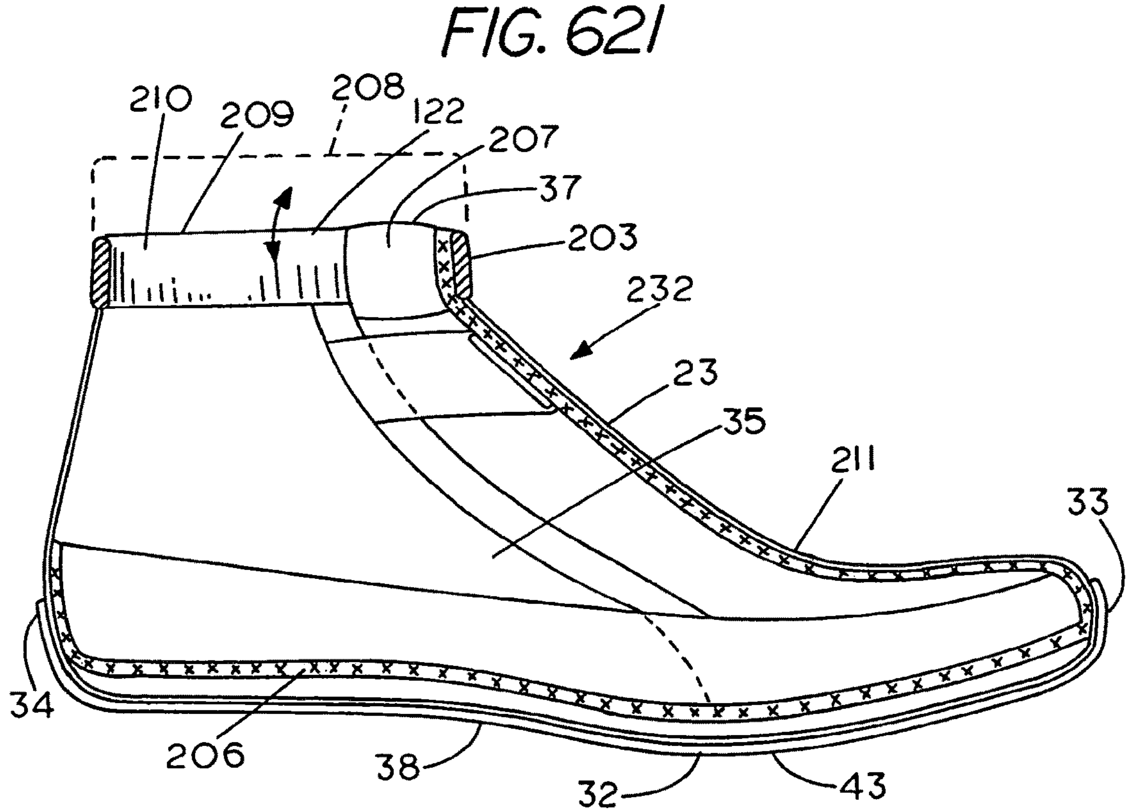

FIG. 621 is a lateral side cross-sectional view of a hot and wet climate slipper or liner for possible use with the boot shown in FIGS. 612-616.

Figure 622:
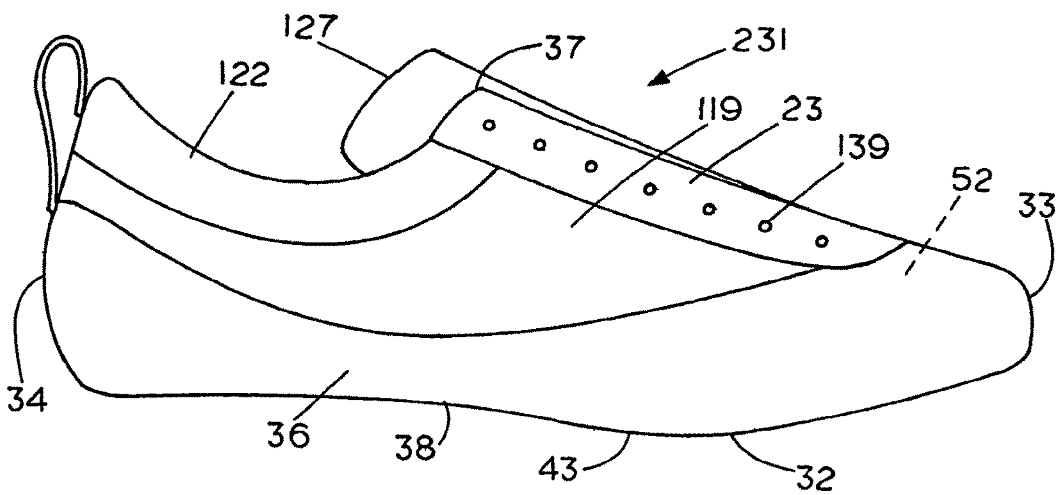

FIG. 622 is a lateral side view of a rock climbing shoe for possible use with the boot shown in FIGS. 612-616.

Figure 623:
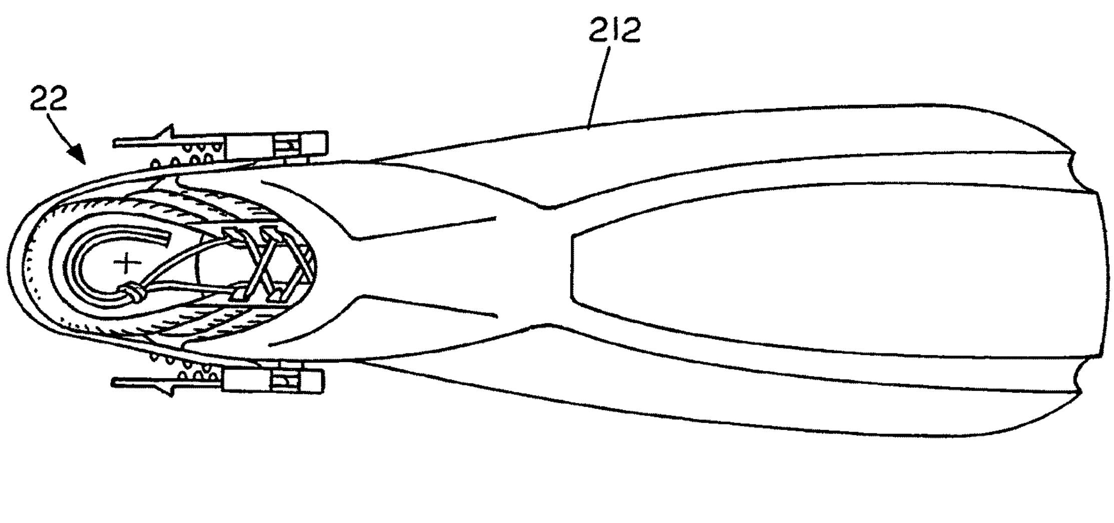

FIG. 623 is a top view of a swim fin for possible use with the boot shown in FIGS. 612-616.

Figure 624:
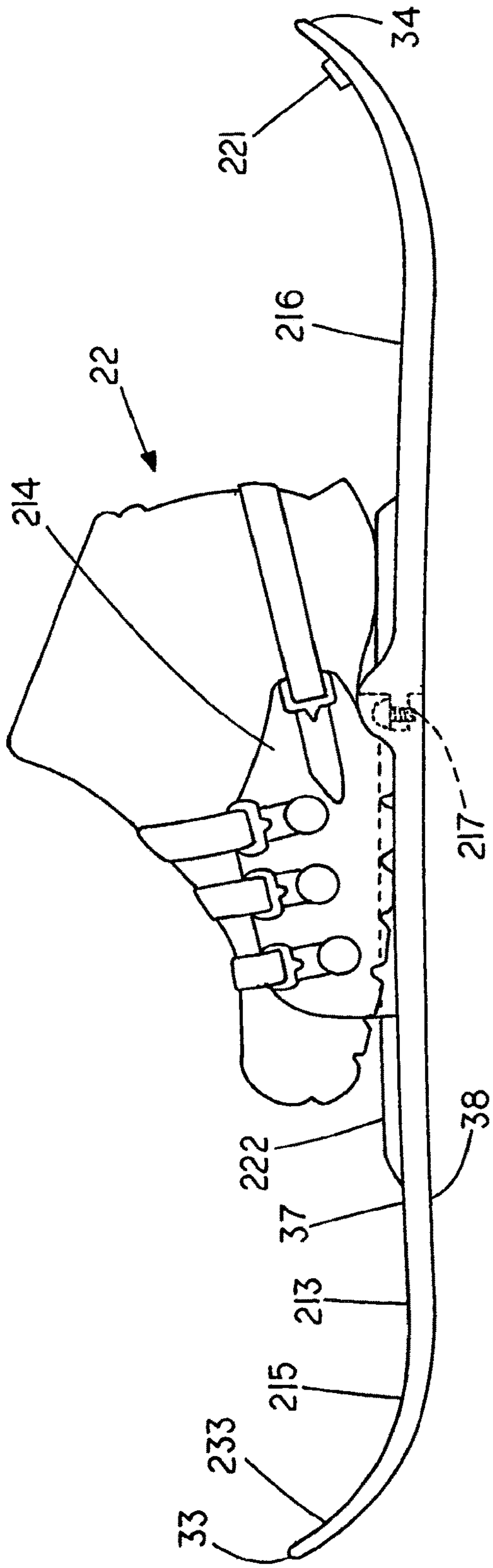

FIG. 624 is a side view of a ski being used with the boot shown in FIGS. 612-616.

Figure 625:
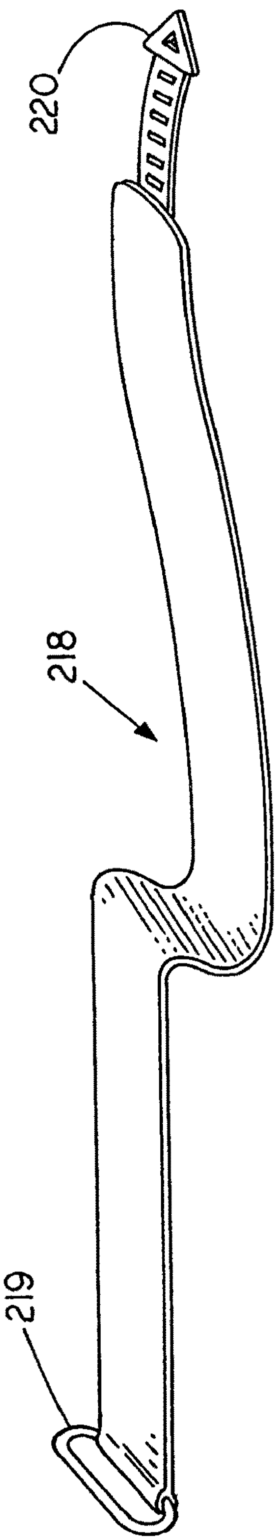

FIG. 625 is a top perspective view of a ski skin for use with the ski shown in FIG. 624.

Figure 626:
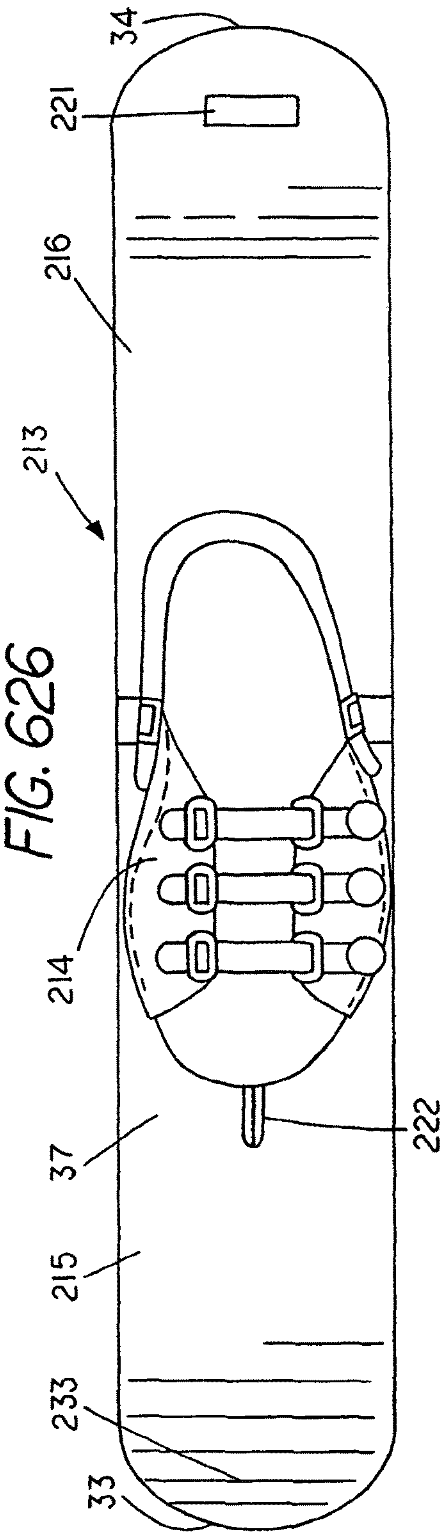

FIG. 626 is a top view of the boot and ski shown in FIG. 624.

Figure 627:
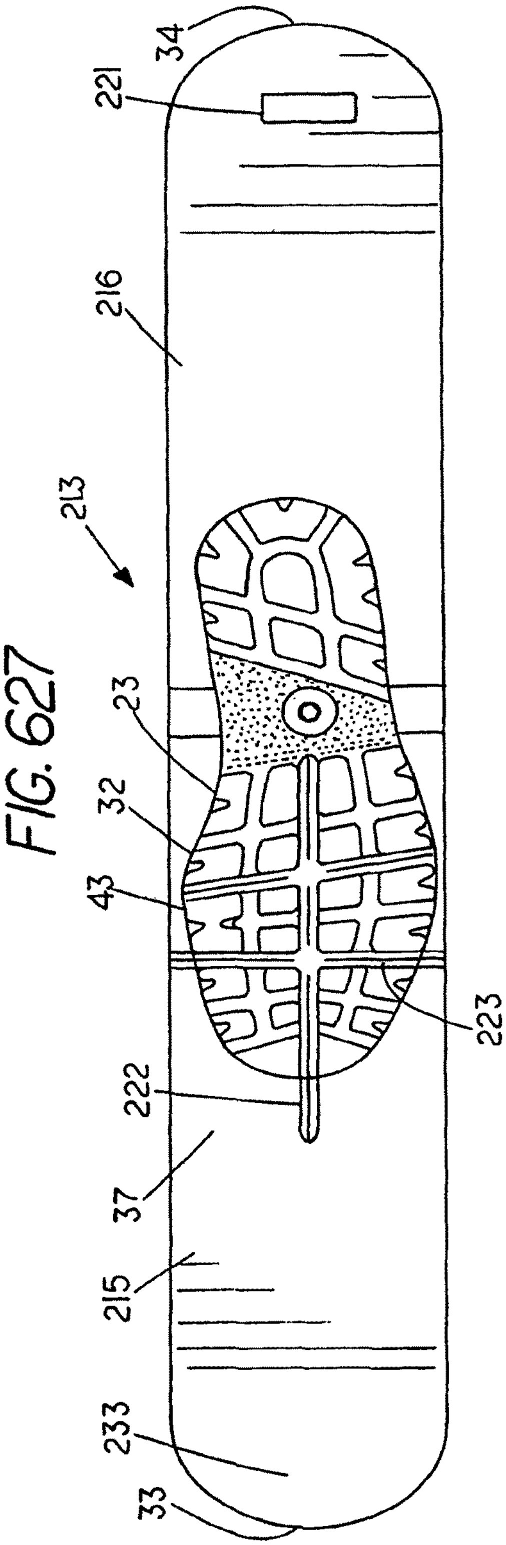

FIG. 627 is a top view of the ski shown in FIG. 626 showing the ski mating with the outsole of the boot previously shown in FIGS. 612-616.

Figure 628:
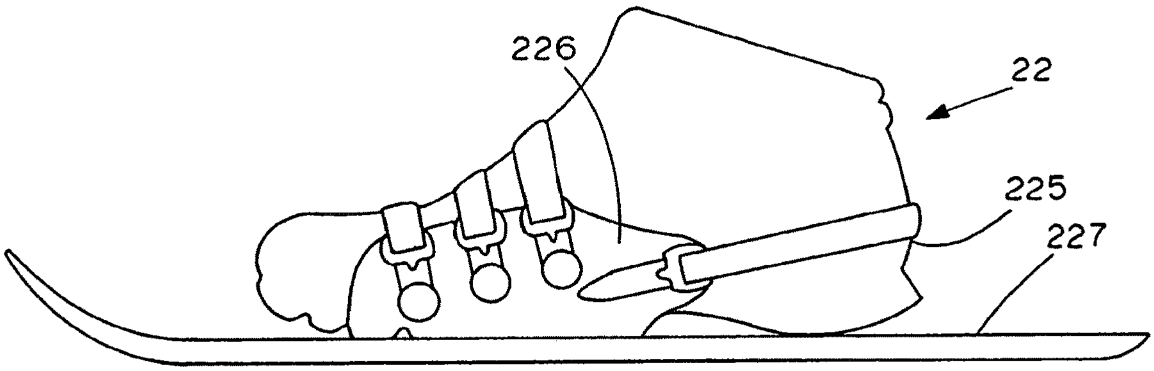

FIG. 628 is a side view of the boot shown in FIGS. 612-616 secured to a snowshoe.

Figure 629:
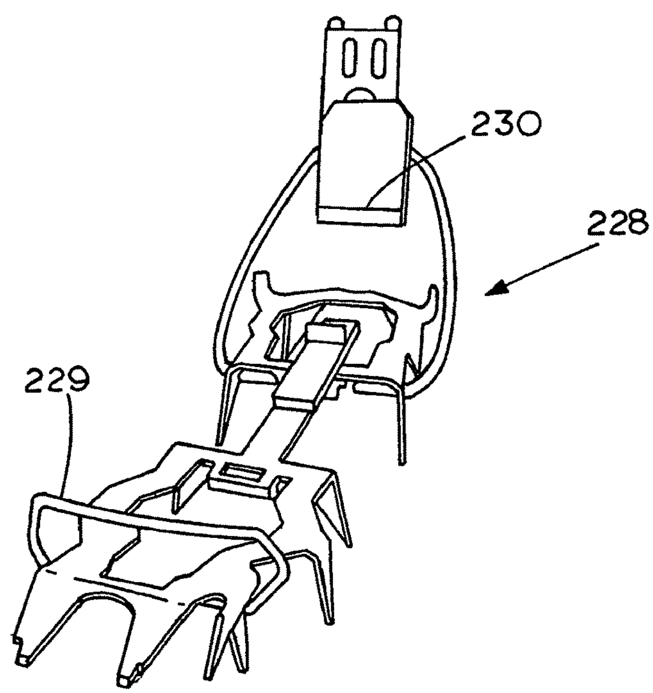

FIG. 629 is a top perspective view of a crampon for possible use with the boot shown in FIGS. 612-616.

DETAILED DESCRIPTION OF THE PREFERRED EMBODIMENTS

The article of footwear taught in the present invention can include a spring element which can provide improved cushioning, stability, and running economy. Unlike the conventional foam materials presently being used by the footwear industry, a preferred spring element is not substantially subject to compression set degradation and can provide a relatively long service life. The components of the article of footwear including the upper, insole, spring element, and sole can be selected from a range of options, and can be easily removed and replaced, as desired. The present invention also teaches an article of footwear including means for adjusting the length, width, girth and foot shape. Further, the relative configuration and functional relationship as between the forefoot, midfoot and rearfoot areas of the article of footwear can be readily modified and adjusted. Accordingly, the article of footwear can be customized by a wearer or specially configured for a select target population in order to optimize desired performance criteria. Moreover, the present invention teaches a novel method of manufacturing an article of footwear, and also, a novel way of doing both retail and Internet business.

Figure 1:
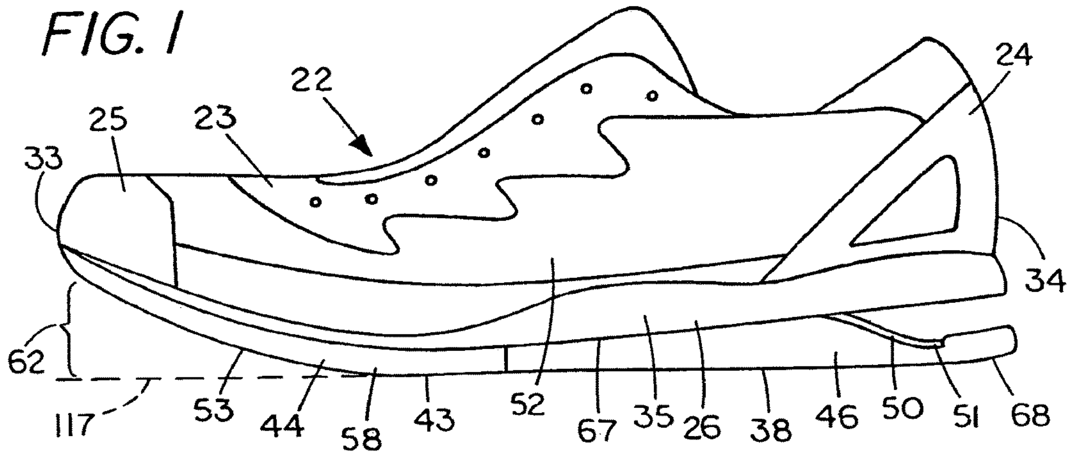
FIG. 1 is a medial side view of an article of footwear including a spring element according to the present invention.

FIG. 1 is a medial side view of an article of footwear 22 including a spring element 51 consisting of at least two portions, a superior spring element 47 and an inferior spring element 50. The portions of spring element 51 can be integrally formed in a single component, but can alternately be formed in at least two parts which can be affixed together by adhesives. Preferably, the superior spring element 47 is capable of being removably affixed in functional relation to the inferior spring element 50, upper 23, and sole 32 with the use of fastening means such as mechanical engagement means including at least one mechanical fastener 29.

A mechanical fastener 29 can be made, e.g., of metal, ceramic, composite, thermoplastic, or thermoset materials. Threaded nuts and bolts, rivets, pop-rivets, push-rivets, snap rivets, snaps, hooks, clips, mating male and female structures, quarter turn fasteners, bayonet style fasteners, quick-release fasteners, and the like, can be used as a fastener. Preferred metals for use in a fastener can include aluminum, stainless steel, titanium, zinc coated steel, and other metals or treatments that are resistant to substantial degradation caused normal oxidation and corrosion. Thermoplastic snap-rivets 151 and push rivets 152 made and distributed by Richco, Inc. of Chicago, Ill. are shown in FIGS. 481-482. A large variety of fasteners are made, e.g., by Penn Engineering & Manufacturing Corporation of Danboro, Pa., Avibank Manufacturing, Inc. of Burbank, Calif., Atlas Engineering of Kent, Ohio, Stayfast Products, Inc. of Fort Mill, S.C., DFS International Inc. of Orlando, Fla., and Fairchild, Inc. of Simi Valley, Calif. Shown in FIG. 483 is a standard full hex blind threaded insert 153 made by Atlas Engineering, Inc., and similar configurations are also available from Stayfast Products, Inc. Armand Savoie of MacNeill Engineering of Marlborough, Mass. is the inventor of so-called "Q-lock" fasteners taught in U.S. Pat. Nos. 6,151,805, and 6,332,281, and these patents are hereby being incorporated by reference herein. Fasteners having a threaded portion which further include a portion that can be collapsed or crimped in order to grip a portion of a structure into which they are being fitted are known in the prior art. When a thermoplastic material is used, a fastener can possibly be formed or affixed in position with the use of heat and pressure, welding, adhesive, polymerization, and then later be removed by destructive method or again with the use of heat and pressure. For example, the distal end of a male portion of a fastener can be melted and formed into a rivet like shape with the use of heat and pressure. When a thermoset material is used, a fastener can possibly be formed or affixed in position with the use of heat and pressure, polymerization, vulcanization, and later be removed with the use of heat and pressure, or destructive method. Contact adhesives and light cure adhesives can also be used to create or affix a fastener.

Preferably, a selectively removable and replaceable mechanical fastener 29 can be used, thus enabling some or all of the components of a spring element 51 and an article of footwear 22 to be removed and replaced, as desired. A fastener can include Allen head or star drive mechanical mating configurations for use with a like installation and removal tool. If desired, a fastener can also be torque limited so as to tighten to an appropriate and desired maximum torque value. So-called "smart bolts" developed for NASA which are known by the tradename INTELLIGENT FASTENER® and made by Ultrafast, Inc. of Malvern, Pa. can be used. Fasteners known in the prior art having a male portion including threads that are coated with a thermoplastic or other locking material, or alternately, a fastener having a female portion including a thermoplastic or other locking material, can also be used in order to prevent loosening during use. Moreover, fasteners including mating male and female parts which can be easily and quickly coupled and released by so-called quarter turn, bayonet, or quick-release structures and methods can be advantageous for use. In this regard, the thickness of a superior spring element 47, inferior spring element 50, and upper 23 can be known, thus standardized or graded for various sizes of an article of footwear. Accordingly, it is possible to design and engineer fasteners 29 including mating male and female parts that can be easily and quickly coupled and released by so-called quarter turn, bayonet, or quick-release structures and methods. Moreover, alternate inferior spring elements 50 having different thickness within an engineered and preferred selected range can be accommodated and used, as desired.

Figure 4:
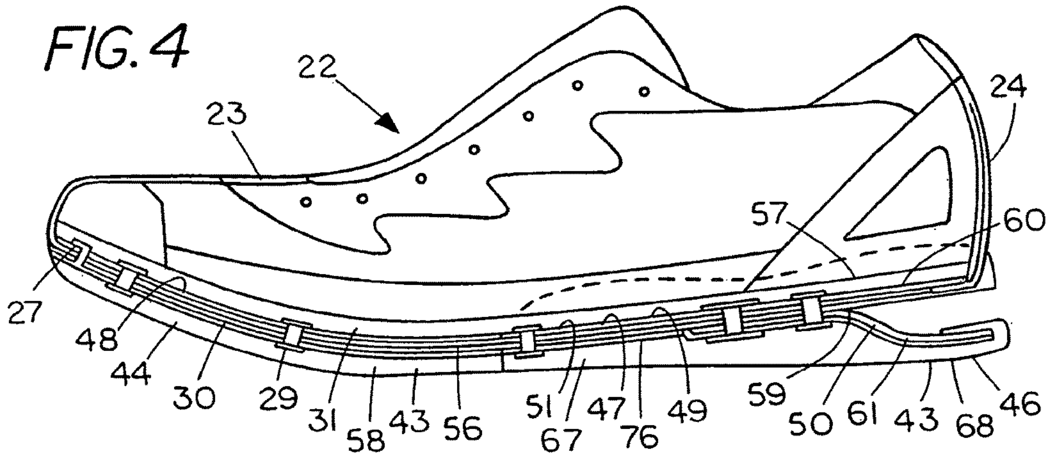
FIG. 4 is a longitudinal cross-sectional medial side view of the article of footwear shown in FIG. 1, with parts broken away.

Again, it can be readily understood that other conventional means can be used to affix the upper 23 in functional relation to the spring element 51 and outsole 43, such as VELCRO® hook and pile, or other mechanical engagement means and devices. For example, as shown in FIG. 4, a portion of the posterior outsole element 46 can slip over and trap a portion of the inferior spring element 50 and then be secured with fasteners 29. Further, at least one hook 27 can extend from the backing 30 of anterior outsole element 44 and engage a portion of the upper 23 or the superior spring element 47 as a portion of the outsole 43 is attached to a preferred article of footwear 22.

Again, published examples of devices and means for selectively and removably affixing various components of an article of footwear include, e.g., U.S. Pat. Nos. 2,183,277, 2,200,080, 2,220,534, 2,552,943, 2,588,061, 2,640,283, 2,873,540, 3,012,340, 3,818,617, 3,878,626, 3,906,646, 3,982,336, 4,103,440, 4,107,857, 4,132,016, 4,262,434, 4,267,650, 4,279,083, 4,300,294, 4,317,294, 4,351,120, 4,377,042, 4,535,554, 4,606,139, 4,807,372, 4,887,369, 5,042,175, 5,083,385, 5,317,822, 5,339,544, 5,410,821, 5,533,280, 5,542,198, 5,615,497, 5,628,129, 5,644,857, 5,657,558, 5,661,915, 5,678,327, 5,692,319, 5,729,916, 5,826,352, 5,896,608, 6,151,805, 6,247,249 B1, 6,282,814 B1, 6,324,772 B1, 6,332,281 B1, 6,349,486 B1, and application WO 02/13641 A1, all of these patents and patent applications hereby being incorporated by reference herein.

Also shown in FIG. 1 is an upper 23 including a heel counter 24, tip 25, vamp 52, anterior side 33, posterior side 34, medial side 35, top or superior side 37, bottom or inferior side 38, forefoot area 58, midfoot area 67, rearfoot area 68, midsole 26, a spring element 51 including an inferior spring element 50, an outsole 43 including an anterior outsole element 44 and posterior outsole element 46 having a tread or ground engaging surface 53, and the presence of toe spring 62. The upper 23 can be made of a plurality of conventional materials known in the footwear art such as leather, natural or synthetic textile materials, paper or cardboard, stitching, adhesive, thermoplastic material, foam material, and natural or synthetic rubber. Since the various components of a preferred article of footwear 22 can be easily removed and replaced, a wearer can select a custom upper 23 having a desired size, shape, design, construction and functional capability. The article of footwear 22 can also include means for customizing the shape, width, and fit of the upper 23 such as taught in U.S. Pat. Nos. 5,729,912, 5,813,146, 6,442,874, B1, WO 99/24498 A2, and the like, the recited patents and patent application hereby being incorporated by reference herein. Further, the present invention teaches novel devices and methods for customizing the width, girth, and last or foot shape of the preferred article of footwear, as discussed in greater detail below. Moreover, the article of footwear 22 can include a custom insole 31 using light cure material as taught in the applicant's U.S. Pat. No. 5,632,057, and also U.S. Pat. No. 6,939,502 entitled "Method of Making Custom Insoles and Point of Purchase Display, both of these patents hereby being incorporated by reference herein.

The upper 23 can be made with the use conventional patterns, materials, and means known in the prior art. Accordingly an upper 23 can include a natural or synthetic textile material 137 such as a woven or knit fabric, and the like. It can be readily understood that the textile material 137 can consist of a three dimensional textile material, a multi-layer textile material, water resistant or waterproof materials, shape memory textile materials, or stretchable and elastic textile materials, and the like. The textile material 137 included in the upper 23 can also be formed by three dimensional or circular knitting methods known in the prior art such as in the manufacture of socks, and a suitable pattern for use can be derived or cut therefrom.

Alternately, the textile material 137 forming at least a portion of the upper 23 can be made in the origami-like patterns taught in U.S. Pat. No. 5,604,997 granted to Dieter, U.S. Pat. No. 5,729,918 granted to Smets, U.S. Pat. No. 6,295,679 B1 granted to Chenevert, patent applications WO 02/13641 A1 by Long and WO 02/23641 A1 by Kilgore et al., and the like, all of these patents and patent applications being assigned to Nike, Inc. Further, the upper 23 can be made in accordance with the teachings of U.S. Pat. No. 6,237,251 granted to Litchfield et al., and also those of U.S. Pat. No. 6,299,962 granted to Davis et al., and the like, both of these patents being assigned to Reebok International, Ltd. In addition, generally similar to the teachings of U.S. Pat. No. 6,024,712 granted to Iglesias et al., the upper 23 can include a textile material that is overmolded with a thermoplastic material. All of the patents and patent applications recited in this paragraph are hereby incorporated by reference herein.

As shown in FIG. 349, the textile material 137 can be impregnated or overmolded with a plastic material 138 forming a stability element 136*d*, e.g., a relatively rigid thermoplastic material such as nylon, polyester, or polyethylene, or alternatively, an elastomeric thermoplastic material such as those made by Advanced Elastomer Systems that are recited elsewhere herein, a foam thermoplastic material, a rubber material, or a polyurethane material. The textile material 137 can be impregnated or overmolded while positioned in a substantially planar two dimensional orientation as shown in U.S. Pat. No. 6,299,962 granted to Davis et al., or alternately, while positioned in a relatively complex three dimensional shape on a footwear last 80, mold, or the like. For example, stability element 136*d* shown in FIG. 349 can be made of a thermoplastic material or a polyurethane material that is directly injection molded and bonded to the upper 23.

Alternately, a foam material can be applied to the upper 23 as taught in U.S. Pat. No. 5,785,909 granted to Chang et al., and also U.S. Pat. No. 5,885,500 granted to Tawney et al., and the like, both patents being assigned to Nike, Inc., these recited patents hereby being incorporated by reference herein. The textile material 137 can possibly be impregnated or overmolded with the use of a spray, dipping, or roller application generally similar to that known in the screen-printing prior art. If the plastic material 138 is of the thermoplastic variety, it can then be caused to cool and take a set.

Alternately, a thermoset material which is used to impregnate or overmold the textile material 137 can be caused to cross-link by conventional means known in the prior art. As taught in the applicant's U.S. Ser. No. 09/570,171, filed May 11, 2000, light-cure materials which can be caused to set and cure upon exposure to a specific range of light frequency and wavelength having adequate power can also be used. When the inferior side 38 of the upper 23 includes a plurality of openings 72 for accommodating the passage of a plurality of traction members 115 associated with the anterior outsole element 44 therethrough, it can be advantageous that the inferior side 38 of the upper 23 in the forefoot area 58, and possibly also that the midfoot area 67 and rearfoot area 68 be impregnated or overmolded by plastic material 138, or other suitable material. Alternately, the inferior side 38 of the upper 23 can be otherwise reinforced in order to enhance its structural integrity.

As shown in FIG. 350, the upper 23 can be made in general accordance with the so-called Huarache style commercialized by Nike, Inc. The textile material 137 can have resilient and elastic qualities, or alternatively, a rubber, neoprene foam rubber, polyurethane, or other material can be used in those areas of the vamp 52 and quarters 119 in which the location of a textile material 137 is indicated. In this regard, the textile material 137, or alternately, a substitute material having substantial elastic characteristics can extend into the collar area 122 in order to create a so-called fit sleeve and facilitate entry and exit of a wearer's foot. Accordingly, the upper 23 can in some footwear embodiments solely constitute the required and sufficient closure means for retaining a wearer's foot therein. Further, the upper 23 can include removable quarters including openings 72 and eyestays 139 for accommodating laces 121, straps 118, or other conventional closure means.

The upper 23 can also be made of new thermoplastic materials which have not yet been used to make articles of footwear that are biodegradable and environmentally friendly. For example, textile materials made from polylactic acid polymers derived from corn or other vegetation known by the tradename NATUREWORKS® fibers are presently under development and being commercialized by Cargill Dow Polymers LLC of Minneapolis, Minn. in cooperation with the Kanebo Corporation which is associated with the Itochu Corporation of Osaka, Japan. The physical and mechanical properties of fibers and thermoplastic materials derived from polylactic acid generally compare favorably with many existing fibers and thermoplastic materials, but unlike the vast majority of the synthetic fibers and thermoplastic materials presently being used in the manufacture of articles of footwear, those derived from polylactic acid are capable of substantially biodegrading when buried in the soil over a period of two to three years. Moreover, other biodegradable and environmentally-friendly plastic materials and fibers can also be suitable for use.

As shown in FIG. 4, the anterior outsole element 44 and posterior outsole element 46 can include a backing 30 portion. The outsole 43 can be firmly secured in function relation to the upper 23 and spring element 51 with the use of at least one fastener 29. In an alternate embodiment, it is possible to configure the posterior outsole portion 46 such that a portion can slip over and trap the posterior side of the inferior spring element 50, and the posterior outsole element 46 can then be secured with at least one fastener 29 near the anterior side of the posterior outsole element 46 and inferior spring element 50. Since the posterior outsole element 46 consists of a resilient elastomer such as natural or synthetic rubber, during footstrike and the early portion of the braking phase of the gait cycle, the posterior outsole element 46 can become somewhat elongated and distended along the longitudinal or anterior to posterior axis and to lesser degree the medial to lateral or transverse axis, and this can further contribute to reducing the shock and vibration generated upon impact, as the forces and direction of loading during footstrike and the braking phase have not only vertical or z axis, but also x and y axis components.

The ground engaging portion 53 of the outsole 43 can be made of a natural or synthetic rubber material such as nitrile or styrene butadiene rubber, a thermoplastic material, an elastomer such as polyurethane, a hybrid thermoplastic rubber, and the like. Further, these materials can possibly be suitable for use when blown or foamed. Suitable hybrid thermoplastic and rubber combinations include dynamically vulcanized alloys which can be injection molded such as those produced by Advanced Elastomer Systems, 338 Main Street, Akron, Ohio 44311, e.g., SANTOPRENE®, VYRAM®, GEOLAST®, TREFSIN®, VISTAFLEX®, GEOLAST®, DYTROL XL®, and taught in the following patents, e.g., U.S. Pat. Nos. 5,783,631, 5,779,968, 5,777,033, 5,777,029, 5,750,625, 5,672,660, 5,609,962, 5,591,798, 5,589,544, 5,574,105, 5,523,350, 5,403,892, 5,397,839, 5,397,832, 5,349,005, 5,300,573, 5,290,886, 5,177,147, 5,157,081, 5,100,947, 5,086,121, 5,081,179, 5,073,597, 5,070,111, 5,051,478, 5,051,477, 5,028,662, and U.S. Pat. No. RE 035398. SANTOPRENE® is known to consist of a combination of butyl rubber and ethylene-propylene. KRATON® thermoplastic elastomers made by the Shell Oil Corporation, DYNAFLEX® thermoplastic elastomers, and VERSAFLEX® thermoplastic elastomer alloys distributed by GLS Corporation of McHenry, Ill. can also be suitable for use. Further, the material compositions taught in both U.S. Pat. Nos. 6,342,544 B1 and 6,367,167 granted to Krstic et al. and assigned to Nike, Inc. can also be suitable for use, and these patents are hereby incorporated by reference herein.

The backing 30 portion of the outsole 43 can be made of a formulation of a thermoplastic material such as nylon, polyurethane, or SANTOPRENE® that is relatively firm relative to the ground engaging portion 53 of the outsole 43. For example, a polyurethane or SANTOPRENE® material having a hardness between 35-75 Durometer Asker C could be used on the ground engaging portion 53 of the outsole 43, whereas a polyurethane or SANTOPRENE® material having a hardness between 75-100 Durometer on the Shore A or D scales could be used to make the backing 30 of outsole 43. A polyurethane backing 30 can be bonded to a polyurethane ground engaging portion 53 of outsole 43 or other material, or alternately, a SANTOPRENE® backing can be bonded to a SANTOPRENE® ground engaging portion 53 of outsole 43. This can be accomplished by dual injection molding, or over-molding of the like materials.

One advantage when using homogenous materials for the two portions of the outsole 43 concerns the affinity of like materials for effectively bonding together. Another advantage in using homogenous materials for the two portions of the outsole 43 concerns the "green" or environmentally friendly and recyclable nature of the component at the end of its service life. It is possible for the spent homogenous outsole 43 component including the backing 30 and ground engaging portion 53 to be recycled by the footwear manufacturer or by a third party, e.g., the outsole 43 can be re-ground into pieces and be thermoformed to make a portion of a new outsole 43 component. Further, the relative absence of adhesives in the manufacture of the outsole components and article of footwear taught in the present invention also makes for a "green" or environmentally friendly product. In contrast, conventional articles of footwear are commonly manufactured with the extensive use of adhesives for bonding a foam midsole to an upper and outsole. These adhesives are commonly non-environmentally friendly and can pose health hazards, and the resulting article of footwear cannot be so easily disassembled or recycled at the end of its service life. Moreover, the process associated with making conventional foam materials in making a midsole, and the blowing agents used therein, can be non-environmentally friendly and relatively energy inefficient as compared with conventional injection molding of thermoplastic materials, or the use of light cure materials and methods, as taught in the applicant's U.S. patent application Ser. No. 08/862,598 entitled "Method of Making a Light Cure Component For Articles of Footwear," hereby incorporated by reference herein. For example, instead of using large presses imparting both heat and pressure upon compression molds for effecting the cure of a midsole or outsole component over perhaps a seven minute cycle time, injection molding equipment and light cure technology can be used to reduce the cycle times to perhaps fractions of a second with relative energy efficiency and little or no waste product in a relatively environmentally friendly manufacturing environment. Accordingly, manufacturing can be located in the United States, or otherwise closer to the intended market.

Figure 16:
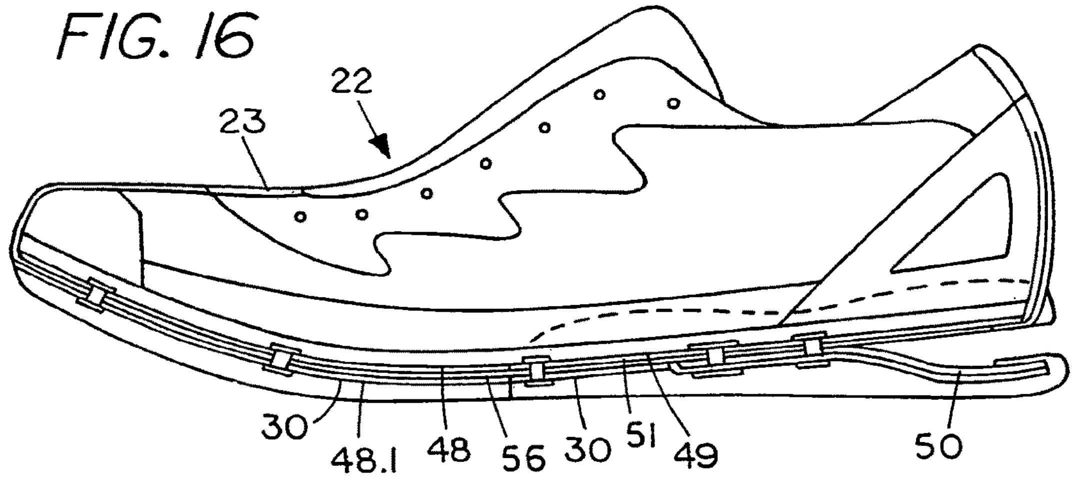
FIG. 16 is a longitudinal cross-sectional medial side view of an alternate article of footwear generally similar to that shown in FIG. 4, with parts broken away, having fewer layers underlying the superior spring element.

It is also possible for heterogeneous materials to be used in making the backing 30 and ground engaging portion 53 of the outsole 43. For example, Advanced Elastomer Systems has developed a formulation of SANTOPRENE® which is capable of bonding to nylon. See also U.S. Pat. Nos. 5,709,954, 5,786,057, 5,843,268, and 5,906,872 granted to Lyden et al. and assigned to Nike, Inc. which relate to chemical bonding of rubber to plastic materials in articles of footwear, all of these patents hereby incorporated by reference herein. Further, in an alternate embodiment of the present invention, the backing 30 can simultaneously comprise at least a portion of the spring element 51 of the article of footwear 22, as shown in FIG. 16. In addition, the outsole 43 can also include desired lines of flexion 54. The following patents and some of the prior art recited therein contain teachings with respect to lines of flexion 54 in articles of footwear such as grooves, and the like: U.S. Pat. Nos. 5,384,973, 5,425,184, 5,625,964, 5,709,954, 5,786,057, 4,562,651, 4,837,949, and 5,024,007, all of these patents being hereby incorporated by reference herein.

The use of a relatively soft elastomeric material having good dampening characteristics on the ground engaging portion 53 of an outsole 43 can contribute to enhanced attenuation of the shock and vibration generated by impact events. Relatively soft elastomeric materials having good dampening characteristics tend to have inferior abrasion and wear characteristics, and this can pose a practical limitation on their use in conventional articles of footwear constructed with the use of adhesives having non-renewable outsoles. However, the use of relatively soft elastomeric materials having good dampening characteristics does not pose a practical problem with respect to the preferred article of footwear 22 taught in the present application since the outsole 43 can be easily renewed and replaced. Accordingly, the preferred article of footwear 22 can provide a wearer with enhanced cushioning effects relative to many conventional articles of footwear.

The spring element 51 can be made of a resilient material such as metal, and in particular, spring steel or titanium. Titanium is widely used in the aerospace and automotive industries in part due to its excellent strength to weight ratio and durability. Titanium materials are available in three general categories depending upon their alloy content: alpha, that is, a material having a close packed hexagonal atomic arrangement, alpha/beta, and beta, that is, a material having a body centered cubic atomic arrangement, The preferred titanium alloys for use in a spring element 51 are those which can be characterized either as alpha/beta, or beta. Examples of suitable alpha/beta, or beta titanium alloys include "15-3" and "6-4" which can be obtained from TIMET®, Titanium Metals Corporation, of 403 Ryder Avenue, Vallejo, Calif. 94590, and also from President Titanium of Hanson, Mass. 02341.

The spring element 51 can alternately be made of a thermoplastic material, or alternately, a preferred fiber composite material. Glass fiber, aramid or KEVLAR® fiber, boron fiber, or carbon fiber composite materials can be used individually, or in partial or complete combination. Glass fiber composite materials are generally available at a cost of about $5.00 per pound, whereas carbon fiber materials are generally available at a cost of about $8.00-$14.00 per pound. Glass fiber composite materials generally exhibit a lower modulus of elasticity or flexural modulus, thus less stiffness in bending as compared with carbon fiber materials, but can generally withstand more severe bending without breaking. However, the higher modulus of elasticity of carbon fiber composite materials can provide greater stiffness in bending, a higher spring rate, and reduced weight relative to glass fiber composite materials exhibiting like flexural modulus. Blends or combinations of glass fiber and carbon fiber materials are commonly known as hybrid composite materials.

Carbon fiber composite materials can be impregnated or coated with thermoplastic materials or thermoset materials. The modulus of elasticity or flexural modulus of some finished thermoplastic carbon fiber composite materials can be lower than that of some thermoset carbon fiber composite materials. For example, a sample of thermoplastic carbon fiber composite material having a relatively broad weave can have a flexural modulus in the range between 10-12 Msi, and in the range between 5-6 Msi in a finished part, whereas a "standard modulus" grade of thermoset impregnated uni-directional carbon fiber composite material can have a flexural modulus in the range of 33 Msi, and in the range between 18-20 Msi in a finished part. Also available are "intermediate modulus" carbon fiber composite materials at approximately 40 Msi, and "high modulus" carbon fiber composite materials having a flexural modulus greater than 50 Msi and possibly as high as approximately 100 Msi. Accordingly, in order the achieve a desired flexural modulus or stiffness value, a thicker and heavier part made of a thermoplastic carbon fiber composite material can be required, that is, relative to a thermoset impregnated uni-directional carbon fiber composite material.

Impregnated carbon fiber composite materials are commonly known as "prepreg" materials. Such materials are available in roll and sheet form and in various grades, sizes, types of fibers, and fiber configurations, but also with various resin components. Various known fiber configurations include so-called woven, plain, basket, twill, satin, uni-directional, multi-directional, and hybrids. Prepreg carbon fiber composite materials are available having various flexural modulus, and generally, the higher is the modulus then the more expensive is the material. A standard modulus uni-directional prepreg peel-ply toughened carbon fiber composite material such as C2000, 33550, 150 GSM, having a 35 percent resin content, or alternately, "quick-cure" 2510 made by Zoltek Materials Group, Inc. of San Diego, Calif. 97121 can be suitable for use. This prepreg material can have a thickness of 0.025 mm or 0.01 inches including the peel-ply backing and in the range between 0.13-0.15 mm or 0.005 inches without. It is therefore relatively easy to predict the number of layers required in order to made a part having a known target thickness, but one should also allow for a nearly 10 percent reduction in thickness of the part due to shrinkage during the curing process. The cost in bulk of a suitable unidirectional 33 Msi thermoset standard modulus carbon fiber composite material having a weight of approximately 150-300 grams per square meter made and distributed by Zoltek Materials Group, Inc. is presently approximately in the range between $8.00 and $9.00 per pound, and one pound yields approximately one square meter of material.

The required thickness of a spring element 51 and any possible sub-components can vary considerably depending upon, e.g., the materials being used, the construction and processing methods being used, the overall design and configuration of a particular part, the fastener(s) possibly being used, the intended activity or particular application, and also the weight, biomechanical technique, and characteristic running speed or velocity of an individual wearer. Nevertheless, the following information can serve as a broad guideline both when making and selecting a spring element 51 and any possible sub-components for use in an article of footwear. The superior spring element can have a thickness approximately in the range between 0.5-10.0 mm. The superior spring element can include an anterior spring element having a thickness approximately in the range between 0.5-2.5 mm, and in particular, in the range between 1.0-1.75 mm. It can be advantageous that the anterior spring element 48 maintain a thickness that is not much less than 1 mm in order to well distribute point loads, enhance robustness of the part, and to provide a noticeable performance enhancement. The superior spring element or posterior spring element can have a thickness in the rearfoot area approximately in the range between 1-10 mm, but when formed in a three dimensional cupped shape including a heel counter, can have a lesser thickness in the range between 1-5 mm. The inferior spring element can have a thickness approximately in the range between 3-10 mm.

The following more specific guidelines relate to an article of footwear including a spring element having relatively short lever arms which can provide approximately 10 mm of deflection generally resembling the embodiment represented in drawing FIGS. 1-4. The required thickness of the superior spring element 47 or anterior spring element 48 in the forefoot area 58 of an article of footwear intended for use in running when using standard modulus 33 Msi thermoset uni-directional prepreg carbon fiber composite material is then normally approximately in the range between 1.0-1.25 mm for an individual weighing 100-140 pounds running at slow to moderate speeds, approximately in the range between 1.25-1.50 mm for an individual weighing 140-180 pounds running at slow to moderate speeds, and in the range between 1.5-1.75 mm for an individual weighing 180-220 pounds running at slow to moderate speeds. When running at higher speeds, e.g., on a track and field surface, individuals generally prefer a thicker and stiffer plate relative to that selected for use at slow or moderate speeds. The perceived improvement in running economy can be on the order of at least one second over four hundred meters which corresponds to approximately two to three percent improvement in aerobic ability. The superior spring element 47 or anterior spring element 48 can store energy when loaded during the latter portion of the stance phase and early portion of the propulsive phase of the running cycle, and then release that energy during the latter portion of the propulsive phase. A spring element can provide not only deflection for attenuating shock and vibration associated with impact events, but can also provide a relatively high level of mechanical efficiency by possibly storing and returning in excess of 70 percent of the energy imparted thereto. Accordingly, the spring to dampening ratio of the material of which the spring element is made can be expressed as being equal to or greater than 70/30 percent. In fact, a preferred unidirectional carbon fiber composite material or spring titanium material can return in excess of 90 percent of the energy imparted thereto during the materials test associated with test method ASTM 790. In contrast, most conventional prior art athletic footwear soles including foam midsoles and rubber outsoles have a spring to dampening ratio somewhere between 40 and 60 percent. The preferred article of footwear 22 can then afford a wearer with greater mechanical efficiency and running economy than most conventional prior art athletic footwear.

Further, unlike the conventional foam materials used in prior art articles of footwear such as ethylene vinyl acetate which can become compacted and take a compression set, the spring elements 51 used in the present invention are not substantially subject to compression set degradation due to repetitive loading. The degradation of conventional foam materials can cause injury to a wearer, as when a broken down midsole results in a wearer's foot being unnaturally placed in a supinated or pronated position as opposed to a more neutral position, or when a compacted foam midsole in the forefoot area 58 causes a wearer's metatarsals to drop out of normal orientation or to unnaturally converge. Further, the quality of cushioning provided by conventional foam materials such as ethylene vinyl acetate or polyurethane rapidly degrades as the material becomes compacted and takes a compression set. In contrast, the spring elements 51 taught in the present invention do not substantially suffer from these forms of degradation, rather provide substantially the same performance and geometric integrity after extended use as when new. Given an article of footwear including removable and replaceable components, in the event of a fatigue or catastrophic failure of a spring element, the damaged part can simply be removed and replaced.

Again, given an article of footwear including a spring element generally resembling the embodiment represented in drawing FIGS. 1-4, the required thickness of a superior spring element 47, or posterior spring element 49 for the rearfoot area 68 of an article of footwear intended for running use when using standard modulus 33 Msi thermoset uni-directional prepreg carbon fiber composite material is approximately in the range between 2.0-5.0 mm, and in particular, is approximately in the range between 2.75-3.25 mm for an individual weighing in the range between 100-140 pounds, approximately in the range between 3.25-3.75 mm for an individual weighing in the range between 140-180 pounds, and approximately in the range between 3.75-4.25 for an individual weighing between 180-220 pounds. It can be advantageous for the sake of robustness that the thickness of the inferior spring element 50 be at least equal to or greater than that of the corresponding superior spring element 47 or posterior spring element 49 in the rearfoot area 68, as the inferior spring element 50 has a more complex curved shape and is subject to direct repetitive impact events. Accordingly, given an article of footwear including a spring element generally resembling the embodiment represented in drawing FIGS. 1-4, the required thickness of the inferior spring element 50 when using standard modulus 33 Msi thermoset uni-directional prepreg carbon fiber material is approximately in the range between 2.0-5.0 mm, and in particular, is approximately in the range between 2.75-3.25 mm for an individual weighing in the range between 100-140 pounds, approximately in the range between 3.25-3.75 mm for an individual weighing in the range between 140-180 pounds, and approximately in the range between 3.75-4.25 for an individual weighing between 180-220 pounds.

Different individuals can have different preferences with respect to the thickness and stiffness of various spring element components regardless of their body weight, and this can be due to their having different running styles or different habitual average running speeds. During normal walking activity the magnitude of the loads generated are commonly in the range between one to two body weights, whereas during normal running activity the magnitude of the loads generated are commonly in the range between two to three body weights. Accordingly, the flexural modulus of a spring element for use in an article of footwear primarily intended for walking can be reduced relative to an article of footwear intended for running, thus the thickness and/or stiffness of the spring element can be reduced. During a lateral movement and jumping sport such as basketball, the loads generated can be much higher and in the range between 2.5 and 10 body weights. Accordingly, greater stiffness and/or thickness can be required of a spring element 51 and any sub-component parts. As result it can sometimes be advantageous to introduce an additional cushioning medium or cushioning means such as a fluid-filled bladder and/or a foam material between a superior spring element 47 or posterior spring element 49 and an inferior spring element 50, and also between a superior spring element 47 or anterior spring element 48.1, and an anterior spring element 48.2.

When making spring elements using carbon fiber composite material, it is important to recognize that relatively slight variations in the configuration or design can have both substantial and subtle effects upon the exhibited stiffness, service life, and overall performance of the component. For example, consider the long bow, versus the recurve bow configuration used in archery. These two shapes provide different stiffness characteristics when the bow is being drawn, and also when the arrow is released. For example, when the inferior spring element 50 is made in a sharper curved shape it can exhibit greater stiffness and a different stress/strain curve, that is, relative to when it is made in a more gentle curved configuration.

Again, given an article of footwear including a spring element generally resembling the embodiment represented in drawing FIGS. 1-4, the following constitutes an approximate guideline regarding the required thickness and stiffness of a superior spring element 47 or anterior spring element 48 made of standard modulus 33 Msi unidirectional carbon fiber composite material for use in the forefoot area 48 of a running shoe given a wearer's body weight and common perception. Again, much depends on an individual's body weight, running technique, speed, and the intended application. For example, an individual having a given body weight who happened to be a heavy heel striker would likely select an anterior spring element 48 having the next highest stiffness value. Likewise, an individual who habitually runs at a faster pace than another individual having a similar body weight and running technique might also select an anterior spring element 48 having the next highest stiffness value. Nevertheless, Table 1 shown below can provide guidance to runners making selections regarding a suitable spring element 51.

TABLE 1

| Thickness | Runner's Body Weight (pounds) | | | | | | |
|---|---|---|---|---|---|---|---|
| (mm) | 100 | 120 | 140 | 160 | 180 | 200 | 220 |
| .75 | S | VS | VS | VS | | | |
| 1.0 | M | S | S | S | VS | VS | |
| 1.25 | H | M | M | M | S | S | VS |
| 1.50 | VH | H | H | M | M | M | S |
| 1.75 | | VH | VH | H | H | M | M |
| 2.0 | | | | VH | VH | H | H |
| 2.25 | | | | | | VH | VH |

Key to Abbreviations
VS = Very Soft = Suitable For Long Slow Distance (LSD) Running Slower than 7:00 minutes/mile.
S = Soft = Suitable For Running 6:00 minutes/mile.
M = Medium = Suitable For Running sub-5:00 minutes/mile.
H = Hard = Suitable For Running sub-60 seconds/400 meters.
VH = Very Hard = Suitable For Short Sprints, and Jumps.

Again, regarding the rearfoot area 68 of the superior spring element 47 or posterior spring element 49, the thickness of the part can vary considerably depending upon whether a relatively flat configuration, or alternately, a cupped shape anatomical configuration which possibly includes a curved midfoot area 67 including longitudinal and transverse arch support, medial and lateral side stabilizers, or a heel counter 24 is incorporated therein. Given a three dimensional cupped or anatomical shaped posterior spring element 49 including a heel counter, and an individual weighing between 100-200 pounds the minimum thickness required to achieve the desired robustness is believed to be approximately in the range between 1.0 and 1.5 mm. However, when a fastener 29 is used to affix the inferior spring element 50 to the superior spring element 47 or posterior spring element 49, even with the presence of a large washer or flange, a fastener 29 can still impart a relatively large point load, thus a minimum thickness of 2.5 mm in the area near the position of the fastener 29 can be required in order to ensure robustness.

Regardless, the upwardly extending portions of a posterior spring element 49 forming a heel counter 24 and also the anterior edge of the part can generally be made to have a thickness in the range between 0.5-2.0 mm. It is believed to be advantageous for the purposes of commercialization to over-engineer the part with respect to load tolerance and robustness and to make the inferior side of the posterior portion of a superior spring element 47 or a posterior spring element 49, in not more than three or four different thickness: e.g., approximately 2.0 mm for the range between 100-140 pounds body weight; approximately 2.5 mm for the range between 140-180 pounds body weight; and, approximately 3.0 mm for the range between 180-220 pounds body weight.

It can be helpful to provide guidance regarding the stiffness characteristics associated with various portions of a spring element 51, e.g., S (soft), M (medium), and H (hard), VH (very hard) UH (ultra hard), or to otherwise identify suitable performance criteria by specific event, player position, and the like. One way of expressing the relationship between superior spring elements 47 or posterior spring elements 49 having a three dimension cupped shape including a heel counter which are made in one of three different thickness in the rearfoot area 68, and the possible use of five different alternate thickness in the forefoot area 58 of the superior spring element 47 or an anterior spring element 48 in a running shoe suitable for use in track and field is shown in Table 2 below.

TABLE 2

| Runner's Weight & Posterior Spring Thickness in Rearfoot Area | Runner's Weight & Anterior Spring Thickness in Forefoot Area (mm) | | | | |
|---|---|---|---|---|---|
| (3D Part) (mm) | 1.0 | 1.25 | 1.5 | 1.75 | 2.0 |
| 2.0 (100-140 lbs) | LSD | 5k-10k | 800/1500 | Sprints | |
| 2.5 (140-180 lbs) | LSD | 5k-10K | 800/1500 | Sprints | Sprints |
| 3.0 (180-220 lbs) | LSD | LSD | 5k-10k | 800/1500 | Sprints |

Regarding the amount of deflection in the rearfoot area 68 associated with the superior spring element 47 or posterior spring element 49, if and when the superior spring element 47 or posterior spring element 49 is made in a three dimensional cupped shape possibly including a heel counter 24, then not much deflection will take place, e.g., normally something in the range between 0-2.0 mm. It is important to recognize that if the superior spring element 47 or posterior spring element 49 is made in a three dimensional cupped shape including a heel counter that only permits something in the range between 0-2.0 mm of deflection, then this can place a larger load and requirement for deflection upon the inferior spring element 50. Accordingly, all things being equal, the inferior spring element 50 could then have to be made thicker and/or stiffer. Nevertheless, if and when the superior spring element 47 or posterior spring element 49 is substantially flat and planar, and the inferior spring element 50 is curved, but both parts have about the same thickness, then the inferior spring element 50 will generally still exhibit the most deflection. However, the superior spring element 47 or posterior spring element 49 will also account for a portion of the total deflection. In the abstract, if the parts are engineered so as to permit 10 mm of total deflection, then the inferior spring will normally account for at least half, and perhaps nearer to three quarters of the deflection, before the two parts would meet and "bottom out" the mechanical system. Here, a great deal depends upon the design and manufacture of the parts, the application, and the wearer's body weight and technique.

Given a running shoe used in a typical linear running motion, even 4-6 mm of deflection of the superior spring element 47 or posterior spring element 49 in the rearfoot area 68 will not pose a biomechanical or stability problem provided that the article of footwear is designed properly. It should be noted that the fat pad on the human heel is known to commonly deflect approximately in the range between 8-10 mm, and also the longitudinal arches of many individuals are known to commonly deflect in the range between 2-6 mm. Moreover, in existing conventional articles of footwear including foam midsoles equal to or greater than 4-6 mm of deflection commonly takes place on both the top and bottom sides of the sole during a rearfoot impact event.

A question can be raised concerning the possibility of 4-6 mm of deflection taking place at the lateral rear corner, that is, deflection having a torsional component. If a line 80 mm in length is drawn representing the width of the bottom net of the outsole 43 of a typical running shoe sole in the rearfoot area 68, and then a line 6 mm high is drawn perpendicular to and intersecting the line having a length of 80 mm at the end on the lateral side, the resulting angle as measured from the opposite side of the line having a length of 80 mm is only approximately five degrees. This does not degrade stability since the feet of most individuals are normally supinated approximately 7-8 degrees upon footstrike when running barefoot on grass, and substantial rotative movements commonly take place between the rearfoot and forefoot areas of an individual's foot during running activity. Further, the average runner commonly pronates approximately 7-8 degrees when running barefoot on grass, but double that magnitude of pronation can be associated with running in conventional prior art articles of footwear including foam midsoles. However, both the rate and magnitude of pronation can often be reduced by using an article of footwear made according to the present invention, that is, relative to a conventional prior art article of footwear. Moreover, it can possibly be advantageous to engineer an article of footwear including a spring element 51 intended for running so as to approximate the magnitude of supination upon footstrike, and also the subsequent magnitude and rate of pronation commonly observed when individuals run barefoot on natural grass. Nevertheless, it can be readily understood that the design and engineering of an article of footwear including a spring element 51 can have different requirements for other sport applications which include lateral and random movements.

Again, the required thickness of the inferior spring element 50 will depend in part upon whether the superior spring element 47 or posterior spring element 49 is contributing to deflection, and by how much, the design and composition of the inferior spring element 50, but also a wearer's body weight, biomechanical technique, and speed. For example, given an article of footwear including a spring element generally resembling the embodiment represented in FIGS. 1-4 which provides approximately 10 mm of total deflection, and a generally planar superior spring element 47 or posterior spring element 49 making a contribution to deflection of less than or equal to 5 mm, and an individual running at slow to moderate speeds, the approximate required thickness of an inferior spring element 50 made of standard modulus 33 Msi carbon fiber composite material having a curved configuration and a diagonal flexural axis 59 is shown in Table 3 provided below.

If and when the superior spring element 47 or posterior spring element 49 has a three dimensional shape including a heel counter and therefore makes little or no contribution to deflection, that is, deflection in the range between 0-2.0 mm, then the inferior spring element 50 will generally need to be approximately at least 0.25-0.5 mm thicker in order to effectively manage the loading associated with greater deflection so as to not exceed approximately 60-66 percent of the inferior spring element's 50 maximum engineered loading capacity. This percentage represents an approximate threshold regarding the capability of carbon fiber composite materials to withstand cycling loading for hundreds of thousands or millions of cycles.

It is important to note that as the flexural axis 59 is rotated from the transverse axis 91 orientated at 90 degrees to the longitudinal axis 69 and towards a 45 degree angle, the effective length of the flexural axis 59 and stiffness of the inferior spring element 50 can be increased. Further, when the superior spring element 47 or posterior spring element 49 and the inferior spring element 50 are being fabricated, it can be advantageous to position some of the layers of the carbon fiber material both consistent with and perpendicular to the orientation of the flexural axis 59, since this area can function as a fulcrum point and be associated with high local loading.

The length of the effective lever arms 60 and 61 of the superior spring element 47 or posterior spring element 49, and the inferior spring element 50 on the medial and lateral sides will also influence the stiffness of the larger spring element 51. Accordingly, it can be readily understood that scalar effects can be present with respect to widely varying sizes of articles of footwear. Again, given an article of footwear including a spring element generally resembling the embodiment represented in FIGS. 1-4 providing approximately 10 mm of deflection and made of standard modulus 33 Msi carbon fiber composite material, the approximate required thickness of an inferior spring element 50 as a function of the body weight of a runner, and also the type of superior spring element 47 or posterior spring element 49 being used is shown in Table 3 below.

TABLE 3

| Body Weight (lbs) | Superior/Posterior Spring Deflects = 5 mm Thus, Inferior Spring Thickness (mm) | Superior/Posterior Spring Deflects 0-2 mm Thus, Inferior Spring Thickness (mm) |
|---|---|---|
| 100 | 2.5-2.75 | 2.75-3.25 |
| 120 | 2.75-3.0 | 3.0-3.5 |
| 140 | 3.0-3.25 | 3.25-3.75 |
| 160 | 3.25-3.50 | 3.5-4.0 |
| 180 | 3.5-3.75 | 3.75-4.25 |
| 200 | 3.75-4.0 | 4.0-4.5 |
| 220 | 4.0-4.25 | 4.25-4.75 |

When the superior spring element 47 consists of a single part, the thickness can vary and be tapered from the posterior side 34 to the anterior side 33, that is, the part can gradually become thinner moving in the direction of the anterior side 33. This can be accomplished by reducing the number of layers during the building of the part and/or with the use of compressive force during the molding or curing process. When the superior spring element 47 consists of two parts, e.g., an anterior spring element 48 and a posterior spring element 49, the parts can be made in different thickness. Alternately, the posterior spring element 49 can be made of a higher modulus material having a given thickness, and the anterior spring element 48 can be made of a lower modulus material having the same thickness, thus the two parts can possibly have the same thickness but nevertheless provide different and desired spring and dampening characteristics.

Alternately, the number of fiber composite layers, the type of fiber and resin composition of the layers, the inclusion of a core material, and the geometry and orientation of the layers, can be varied so as to create areas of differential stiffness in a spring element 51. For example, the inferior spring element 50 can project from the superior spring element 47 with the flexural axis 59 orientated consistent with a transverse axis, that is, at approximately 90 degrees with respect to the longitudinal axis 69 provided that the aforementioned variables concerning the fiber composite layers are suitably engineered so as to render the medial side 35 of the inferior spring element 50 approximately 2-3 times stiffer than the lateral side 36, that is, in an article of footwear intended for walking or running activity.

Figure 9:
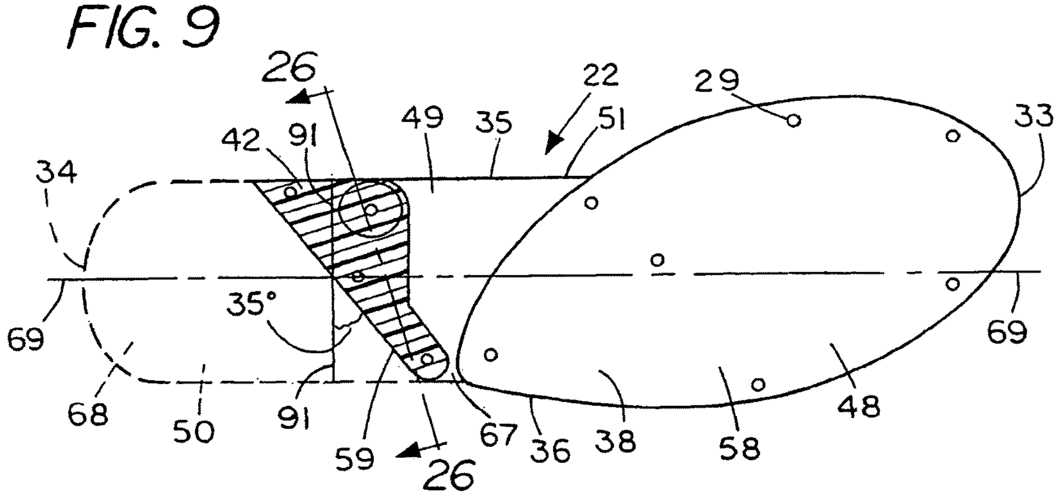
FIG. 9 is a bottom view of the article of footwear shown in FIG. 3, with the outsole elements being removed to reveal the anterior spring element, posterior spring element and inferior spring element.
Figure 10:
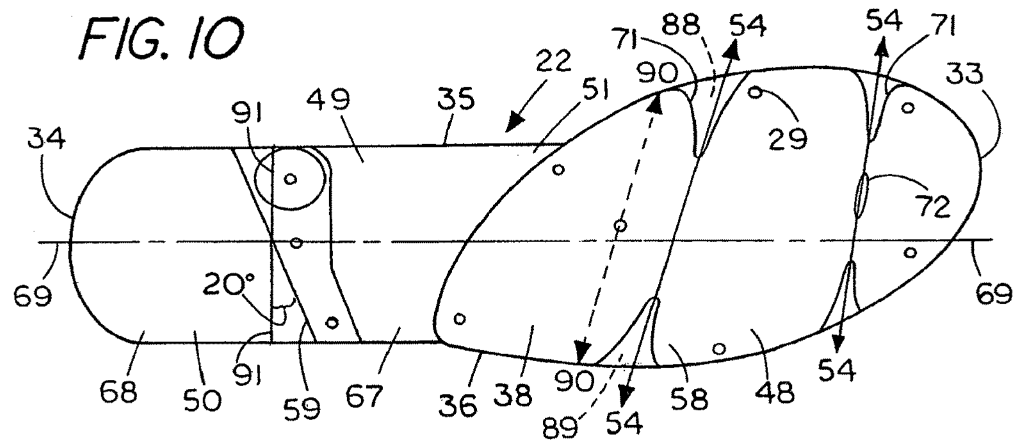
FIG. 10 is a bottom view of an alternate article of footwear generally similar to that shown in FIG. 9, with the outsole elements being removed to reveal an anterior spring element, a posterior spring element, an inferior spring element having an alternate configuration, and also a possible position of a rocker sole configuration.

Further, the configuration of a spring element 51, and in particular, an inferior spring element 50 having an flexural axis 59 orientated at approximately 90 degrees with respect to the longitudinal axis 69, can be configured so as to provide differential stiffness. For example, a portion of a spring element 51 can include transverse or longitudinal slits, notches, openings, a core material, or reduced thickness so as to exhibit areas of differential stiffness, as shown in FIG. 10. Several configurations and methods for achieving differential stiffness in the midfoot area 67 or rearfoot area 68 of an article of footwear are recited in U.S. Pat. No. 5,875,567, this patent being hereby incorporated by reference herein. However, the relatively sharp portion of the spring element that is shown projecting beyond the medial side of the sole in U.S. Pat. No. 5,875,567 could possibly result in injury to the medial side of a wearer's opposite leg during running. Further, given the common orientation of the foot of a wearer who would be characterized as a rearfoot striker during footstrike, an inferior spring element 50 having an flexural axis 59 orientated consistent with transverse axis 91, that is, at 90 degrees with respect to the longitudinal axis 69, is generally not so advantageously disposed to receive repetitive loading and exhibit robustness during its service life relative to an inferior spring element 50 having an flexural axis 59 deviated from the transverse axis 91 in the range between 10 and 50 degrees, as shown in FIGS. 9 and 10. In this regard, the foot of a wearer characterized as a rearfoot striker is normally somewhat dorsiflexed, supinated and abducted during footstrike, as recited and shown in U.S. Pat. Nos. 5,425,184, and 5,625,964, these patents being hereby incorporated by reference herein. Accordingly, given an average individual having normal biomechanics who would be characterized as a rearfoot striker, it can be advantageous for the flexural axis 59 of the inferior spring element 50 to be deviated from the transverse axis 91 in the range between 20-30 degrees in footwear intended for walking or running. However, the flexural axis 59 of an inferior spring element 50 can be deviated from the transverse axis 91 in the range between 30-50 degrees in footwear intended for use by individuals who tend to more substantially pronate during the braking and stance phases of the gait cycle. Other teachings having possible merit relating to differential stiffness in the rearfoot area of an article of footwear include, e.g., U.S. Pat. Nos. 4,506,462, 4,364,189, 5,201,125, 5,197,206, and 5,197,207, all of these patents hereby being incorporated by reference herein.

In order to make carbon fiber composite spring elements, it can be advantageous to create a form or mold. The form or mold can be made of wood, composite material, metal, and the like. For example, prototype forms or molds can be made of thin sheets of stainless steel which can be cut and bent into the desired configurations. The stainless steel can then be treated with a cleaner and appropriate release agent. For example, the stainless steel can be washed with WATERCLEAN and then dried, then given two coats of SEALPROOF sealer and dried, and finally given two coats of WATERSHIELD release agent and dried, all of these products being made by Zyvax, Inc. of Boca Raton, Fla., and distributed by Technology Marketing, Inc. of Vancouver, Wash., and Salt Lake City, Utah. A "prepreg" uni-directional carbon fiber composite material including a peel-off protective layer that exposes a self-adhesive surface can then be cut to the approximate shapes of the desired spring element by a razor blade, scissors, cutting die, water jet cutter, or automatic cutting machine. Suitable carbon fiber composite materials for use include F3(C) 50K made by FORTAFIL, AS4C made by HEXCEL, T300 made by TORAY/AMOCO, and in particular, ZMG-2000-Z346-150-35-24" which is a 150 GSM material including a toughened epoxy with a 35 percent resin content made by Zoltek Materials Group, Inc., and the like. The individual layers of carbon fiber composite material can have a thickness in the range between approximately 0.13-0.15 mm or 0.005 inches and be affixed to one another to build the desired thickness of the spring elements, but allowing for a reduction of approximately 10 percent due to shrinkage which commonly takes place during the curing process. The individual layers can be alternated in various orientations, e.g., some can be orientated parallel to the length of the desired spring element, and others inclined at 45 degrees to the left or right, or at 90 degrees. The result can be a quasi-isotropic fiber composite material, that is, one having a relatively homogenous flexural modulus in all directions. However, the flexural modulus or stiffness in bending exhibited by the spring element in various orientations can be specifically engineered by varying the number, type, and orientation of the fiber composite layers.

Once the spring element components have been built by adhering the desired number, type, and orientation of glass or carbon fiber composite layers together, the spring element can be rolled or placed under pressure and applied to the stainless steel prototype form or mold. When making prototype spring elements, the carbon fiber composite lay-up including the stainless steel form or mold can be wrapped in a peel ply or perforated release film such as Vac-Pak E 3760 or A 5000 Teflon® FEP, then wrapped in a bleeder such as A 3000 Resin Bleeder/Breather or RC-3000-10A polyester which will absorb excess resin which could leach from the spring elements during curing. This assembly can then be enclosed in a vacuum bagging film, e.g., a Vak-Pak® Co-Extruded Nylon Bagging Film such as Vac-Pak HS 800 and all mating edges can be sealed with the use of a sealant tape such as Schnee Morehead vacuum bag tacky tape, or RAP RS200. A vacuum valve can be installed in functional relation to the vacuum bagging film before the vacuum bag is completely sealed. The vacuum valve can be subsequently connected to an autoclave vacuum hose and a vacuum pump, and the assembly can be checked for leaks before placing it in an oven for curing. The entire assembly, while under constant vacuum pressure, can then be placed into an oven and heated at a temperature of approximately 250 degrees Fahrenheit for one to two hours in order to effect setting and curing of the carbon fiber composite spring elements. Upon removal from the oven and cooling, the vacuum bag can be opened and the cured carbon fiber composite spring elements can be removed from within the bleeder and the peel ply or release film, and separated from the stainless steel form or mold. The spring element parts can then possibly be cut or trimmed with a saw, a grinding wheel, a sander, a CNC machine, or with the use of water jet cutting equipment. The fasteners 29 can then be affixed and the spring element installed in functional relation to the upper and outsole of a prototype article of footwear.

The method of making fiber composite materials in a production setting differs depending upon whether thermoplastic or thermoset materials are being used. For example, thermoplastic carbon fiber composite materials including their resin coatings are commonly available in flat sheet stock. Parts can then be cut from these sheets using water jet cutting equipment. These parts can then be preheated for a short time in an oven in order to reach a temperature below, but yet relatively close to the melt point of the thermoplastic material, thus rendering the part moldable. Production compression molds are commonly milled from aluminum, then polished and treated with a non-stick coating and release agent. The cost of a single aluminum production compression mold is approximately $2,500. The heated thermoplastic carbon fiber composite parts can then be placed into a relatively cold compression mold and subjected to pressure as the part is simultaneously caused to set and cool. The parts can then be removed and inspected for possible use. One manufacturer of thermoset fiber composite parts is Performance Materials Corporation of 1150 Calle Suerte, Camarillo, Calif. 93012.

The production method and process is different when a thermoset carbon fiber composite uni-directional prepreg material is being used to make a desired part. The uncured layered thermoset part can be placed into an aluminum compression mold which has been preheated to a desired temperature. The mold is closed and the part is then subjected to both heat and pressure. In this regard, the set and cure time of thermoset fiber composite materials is temperature dependent. Generally, the set and cure time for thermoset parts will be about one hour given a temperature of 250 degrees Fahrenheit. However, it is often possible for the same thermoset parts to reach their gel state and take a set, whereupon the shape of the part will be stable, in about one half hour given a temperature of 270 degrees Fahrenheit, in about fifteen minutes given a temperature of 290 degrees Fahrenheit, or in about seven minutes given a temperature of 310 degrees Fahrenheit. Having once reached their gel state and taken a set, the thermoset parts can then be removed from the mold. The parts can later be placed in an oven and subjected to one to two hours of exposure to a temperature of 250 degrees Fahrenheit in order to complete the curing process. Moreover, Zoltek Materials Group, Inc. of San Diego, Calif. makes a "quick cure" thermoset material identified by their product code number 2510 which can completely cure in ten minutes given a mold temperature of 250 degrees Fahrenheit, and perhaps even faster at higher temperatures.

An alternate method of making thermoset carbon fiber composite spring element components involves making and using a single sided mold having sufficient width to encompass at least one part along the x axis, but the mold can then extend along the y axis for many feet, or vice-versa. For example, the mold can be made of 7075 grade aluminum which can be purchased from Metals USA, Specialty Metals Northwest, Inc. at 3400 S.W. Bond Avenue, in Portland, Oreg. The mold can have a have a width of 16 inches, a length of 30 inches, and maximum thickness of 1¼ inches, and be machined to provide a desired configuration using CNC equipment. Accordingly, a relatively long lay-up of carbon fiber material can be placed upon the mold, vacuum bagged, and then cured in an autoclave. For example, ZMG-2000-Z346-150-35-24" which is a 150 GSM prepreg carbon fiber material including a toughened epoxy with a 35 percent resin content made by Zoltek Materials Group, Inc. can be used. A thicker material such as 300 GSM prepreg carbon fiber material can be used alone, or alternately, in combination with a 150 GSM material in order to more rapidly build up the thickness of the desired part. A large number of individual components can then be cut from the resulting cured sheet of carbon fiber material. For example, approximately seven full-length superior spring element 47 parts can be obtained from a sheet of carbon fiber composite material formed upon mold having the size recited above. Alternately, approximately fourteen inferior spring elements 50 can be obtained from a sheet of carbon fiber composite material formed upon a mold having the size recited above. The individual parts can be cut with a saber saw, a CNC machine using a vacuum fixture for holding the cured sheet of carbon fiber composite material, or with a multi-dimensional water jet cutter. A provider of water jet cutting services is Hegar Manufacturing of 15600 S.E. FOR/MOR, Clackamas, Oreg. A superior spring element or anterior spring element having a planar configuration, or alternately, a curved shape can be made by this method. Moreover, an inferior spring element having more dramatic curved shape can be made by this method.

An alternate method of making carbon fiber composite parts involves using an injection mold. An uncured carbon fiber material which may or may not already be impregnated with a resin can be placed into an injection mold, and resin can then be injected under pressure and subsequently cured to form a finished part. Alternately, a resin containing short or long glass, carbon, or boron fibers can be injected into a mold and caused to set. The compression and injection mold methods of making fiber composite parts can be advantageous for use when attempting to make components having multiple complex curved shapes. Manufacturers of thermoset fiber composite parts include All Composites of 3206 232nd Street, East Spanayay, Wash. 98387, and Quatro Composites of 12544 Kirkham Court, Number 16, Poway, Calif. 92064.

Alternative methods of making fiber composite parts can include the use of light cure technology, other forms of compression or injection molding, reaction injection molding, and also pulltrusion. Compression molding, injection molding, and reaction injection molding have been widely used in the automotive industry, e.g., the body of the Corvette largely consists of fiber composite construction. Thermoplastic materials, or alternately, thermoset materials including polymers, resins, or epoxies which are rubber toughened that further include glass fiber, aramid fiber, carbon fiber, or boron fiber materials, and the like, can possibly be used. For example, Dow Chemical Company of Midland, Mich. makes SPECTRUM® reaction moldable polymer which has been used to make automobile body parts, and LNP Engineering Plastics of Exton, Pa. makes THERMOCOMP® and VERTON® thermoplastic materials which can include long carbon fibers. Further, PPG of Pittsburgh, Pa., Corning, of Corning, N.Y., and Vetrotex of Valley Forge, Pa., are makers of electrical and structural grade fiberglass products.

Figure 2:
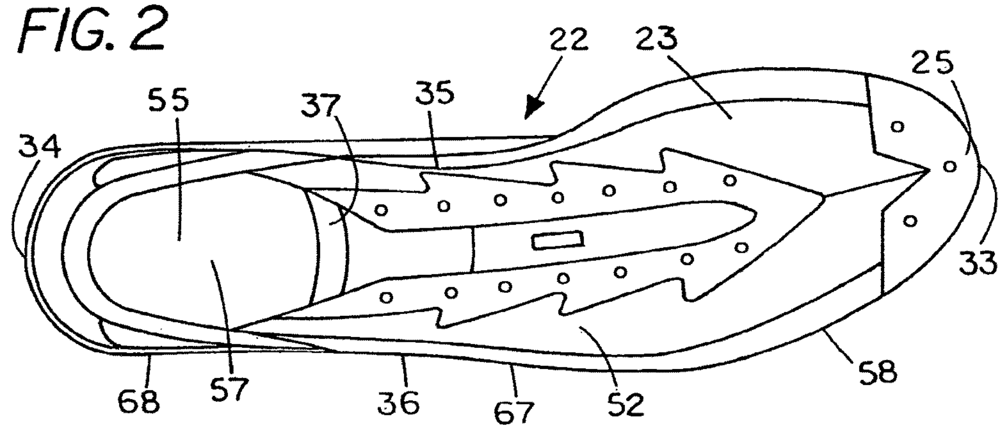
FIG. 2 is a top view of the article of footwear shown in FIG. 1.

FIG. 2 is a top view showing the superior side 37 of the article of footwear 22 shown in FIG. 1. Shown are the tip 25, vamp 52, insole 55, anterior side 33, posterior side 34, medial side 35, and lateral side 36 of the upper 23 of the article of footwear 22. Also shown is the forefoot area 58, midfoot area 67, rearfoot area 68, and position approximately corresponding to the weight bearing center of the heel 57.

Figure 3:
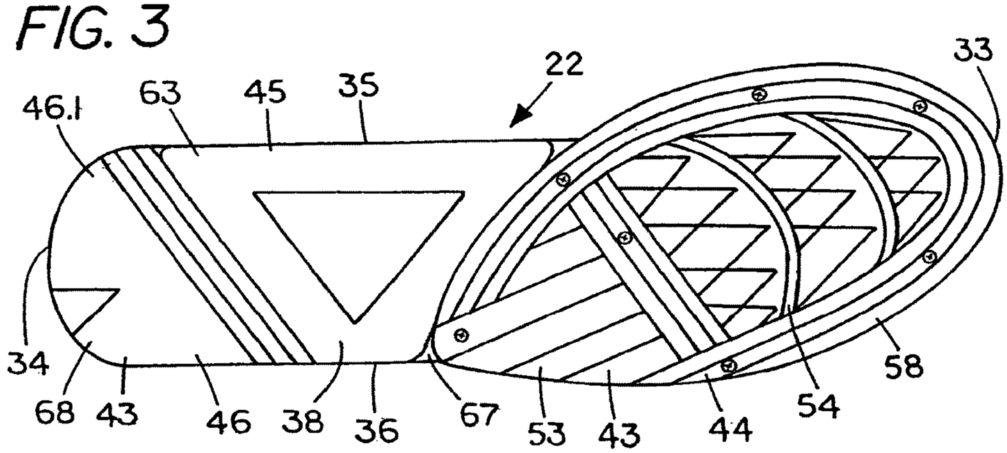
FIG. 3 is a bottom view of the article of footwear shown in FIG. 1.

FIG. 3 is a bottom view showing the inferior side 38 of the article of footwear 22 shown in FIG. 1. Shown is an outsole 43 having a tread or ground engaging surface 53 consisting of anterior outsole element 44 that includes lines of flexion 54, and a posterior outsole element 46 that extends substantially within the midfoot area 67 and rearfoot area 68. Alternately, posterior outsole element 46 can be made in two portions, that is, a posterior outsole element 46 positioned adjacent the posterior side 34 in the rearfoot area 68, and a stabilizer 63 or middle outsole element 45 having a generally triangular shape positioned substantially in the midfoot area 67. For the sake of brevity, both options have been shown simultaneously in FIG. 3. It can be readily understood that stabilizer 63 or middle outsole element 45 can be made in various configurations, and various different stiffness in compression options can be made in order to optimize desired performance characteristics such as cushioning and stability for an individual wearer, or a target population of wearers. In this regard, a stabilizer 63 or middle outsole element 45 can include a foam material, gas filled bladders, viscous fluids, gels, textiles, thermoplastic materials, and the like.

FIG. 4 is a longitudinal cross-sectional medial side view of the article of footwear 22 shown in FIG. 1, with parts broken away. Shown in FIG. 4 is a two part outsole 43 consisting of anterior outsole element 44, and posterior outsole element 46, each having a backing 30. Also shown are the upper 23, including a tip 25, vamp 52, heel counter 24, fasteners 29, and insole 31. The insole 31 can be made of a foamed or blown neoprene rubber material including a textile cover and having a thickness of approximately 3.75 mm, or a SORBOTHANE®, or PORON® polyurethane foam material including a textile cover. The insole 31 can include a light cure material for providing a custom fit in accordance with U.S. Pat. No. 5,632,057 granted to the present inventor, and also U.S. Pat. No. 6,939,502 entitled "Method of Making Custom Insoles and Point of Purchase Display, both of these documents having been previously incorporated by reference herein. The superior spring element 51 underlies the insole 31 and can be configured to approximate the shape of the insole 31 and last bottom about which the upper 23 can be affixed during the manufacturing process, or alternately, to a soft data storage and retrieval computer software three dimensional model relating to the configuration and pattern of the upper 23 of the article of footwear.

The spring element 51 can consist of a plurality of portions, and preferably three portions, an anterior spring element 48, a posterior spring element 49, and an inferior spring element 50 which can be affixed together in functional relation, e.g., with the use of at least one mechanical fastener 29, and the like. The anterior spring element 48 can underlay a substantial portion of the forefoot area 58 and is preferably affixed to the posterior spring element 49 in the forefoot area 58 or midfoot area 67 posterior of a position in the range between approximately 60-70 percent of the length of the upper 23 of the article of footwear 22 as measured from the posterior side 34, that is, a position posterior of the metatarsal-phalangeal joints of a wearer's foot when the article of footwear 22 is donned. The metatarsal-phalangeal joints are normally located near approximately 70 percent of foot length on the medial side 35 of the foot, and nearer to approximately 60 percent of foot length on the lateral side 36 of the foot. Accordingly the anterior spring element 48 can underlay the metatarsal-phalangeal joints of the foot and energy can temporarily be stored and later released to generate propulsive force when the anterior spring element 48 undergoes bending during the stance and propulsive phases of the running cycle. The anterior spring element 48 can be selectively and removably attached and renewed in the event of damage or failure. Further, a wearer can select from anterior spring elements 48 having different configurations and stiffness, and therefore customize the desired stiffness of the anterior spring element 48 in an article of footwear 22. For example, different individuals having different body weight, running styles, or characteristic running speeds could desire anterior spring elements 48 having different stiffness.

Likewise, the superior spring element 47 or posterior spring element 46 can be selectively and removably affixed to the inferior spring element 50 in the rearfoot area 68 or midfoot area 67 of the article of footwear 22. Accordingly the superior spring element 47 or posterior spring element 49 can underlay a substantial portion of the wearer's rearfoot and perhaps a portion of the wearer's midfoot and energy can be stored during the braking and early stance phases of the running cycle and released during the later portion of the stance and propulsive phases of the running cycle to provide propulsive force. The anteriormost portion of wearer's rearfoot on the lateral side of the foot is consistent with the junction between the calcaneus and cuboid bones of the foot which is generally in the range between 25-35 percent of a given foot length and that of a corresponding size upper 23 of an article of footwear 22. The superior spring element 47 or posterior spring element 49, and inferior spring element 50 can be selectively and removably attached and renewed in the event of failure. Further, a wearer can select from superior spring elements 47 or posterior spring elements 49, and inferior spring elements 50 having different configurations and stiffness, and therefore customize the desired stiffness of these spring elements in an article of footwear 22. For example, different individuals having different weight, running styles, or characteristic running speeds could desire to select superior spring elements 47 or posterior spring elements 49, and inferior spring elements 50 having different stiffness.

Accordingly, the spring element 51 of a preferred article of footwear can consist of three portions, an anterior spring element 48 which is positioned anterior of at least approximately 70 percent of the length of the upper 23 of the article of footwear 22 as measured from the posterior side 34, a posterior spring element 49 which extends anteriorly from proximate the posterior side 34 of the upper 23 of the article of footwear 22 and is affixed in functional relation to the anterior spring element 48, and an inferior spring element 50 which is affixed in functional relation to the posterior spring element 49. The inferior spring element 50 projects rearwards and downwards and can extend beneath a substantial portion of the rearfoot area 68 of the article of footwear 22. Alternately, the spring element 51 can be formed in two portions or a single part.

In the embodiment shown in FIG. 4, the elevation of the wearer's foot in the rearfoot area 68 measured under the weight bearing center of a wearer's heel 57 is approximately 26 mm, and the elevation of the wearer's foot in the forefoot area 58 measured under the ball of the foot proximate the metatarsal-phalangeal joints is approximately 16 mm in a size 9 men's article of footwear. The difference in elevation between the forefoot area 58 measured under the ball of the foot and the rearfoot area 68 measured under the weight bearing center of a wearer's heel 57 in a men's size 9 article of footwear is commonly in the range between 10-12 mm, and is approximately 10 mm in the embodiment shown in FIG. 4.

For some footwear applications, such as competition in track and field or road racing, the maximum amount of deflection that might be desired by some individuals between the superior spring element 47 or posterior spring element 49 and the inferior spring element 50 could be in the range between 8-15 mm. As shown in FIG. 4, the maximum amount of deflection possible as between posterior spring element 49 and inferior spring element 50 is approximately 10 mm. However, greater amounts of deflection in the range between 15-50 mm can be desired for use by some individuals in various footwear applications, as shown and discussed herein with respect to other embodiments of the present invention. Nevertheless, it can be advantageous from the standpoint of injury prevention that the elevation of the rearfoot area 68 minus the maximum amount of deflection permitted between the superior spring element 47 or posterior spring element 49 and the inferior spring element 50 be equal to or greater than the elevation of the forefoot area 58. It can also be advantageous as concerns the longevity of the working life of the spring element 51 that the amount of deflection permitted be equal to or less than approximately 75 percent the maximum distance between the proximate opposing sides of the spring element 51, that is, as between the inferior surface of the superior spring element 47 or posterior spring element 49 and the superior surface of the inferior spring element 50.

The amount of deflection or compression provided under the wearer's foot in the forefoot area 58 by the embodiment shown in FIG. 4 is commonly approximately in the range between 4-6 mm, and such can be provided by an insole 31 having a thickness of 3.75 mm in combination with an anterior outsole element 44 having a total thickness of 6.5 mm including a backing 30 having a thickness of approximately 1.5 mm and a tread or ground engaging portion 53 having a thickness of approximately 5 mm, and in particular, when the ground engaging portion 53 is made of a relatively soft and resilient material having good traction, and shock and vibration dampening characteristics. For example, a foamed natural or synthetic rubber or other elastomeric material can be suitable for use. If hypothetically, an outsole material having advantageous traction, and shock and vibration dampening characteristics only lasts 200 miles during use, that is, as opposed to perhaps 300 miles associated with a harder and longer wearing outsole material, this does not pose a practical problem, as the outsole 43 portions can be easily renewed in the present invention, whereas a conventional article of footwear would normally be discarded. Accordingly, it is possible to obtain better traction, and shock and vibration dampening characteristics in the present invention, as the durability of the outsole 43 portions is not such an important criteria.

Figure 5:
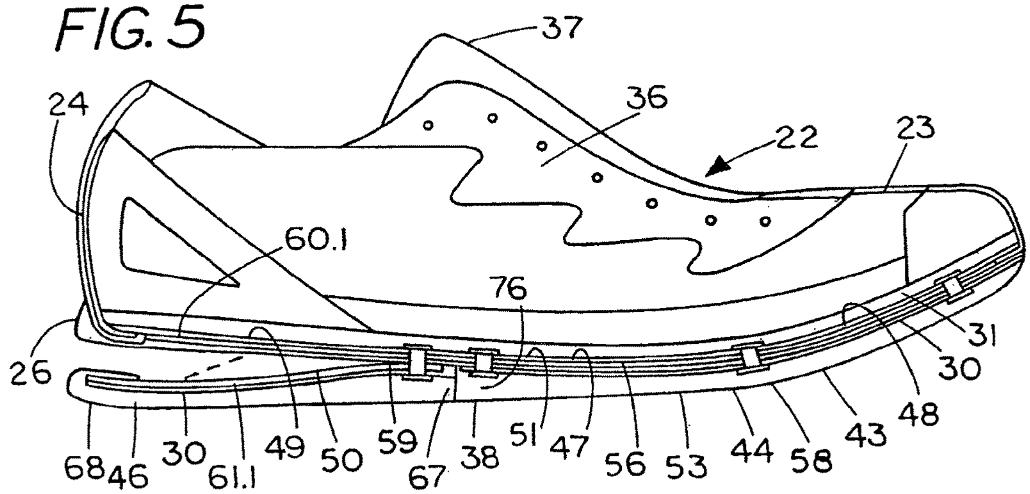
FIG. 5 is a longitudinal cross-sectional lateral side view of the article of footwear shown in FIG. 1, with parts broken away.

FIG. 5 is a longitudinal cross-sectional lateral side view of the article of footwear 22 shown in FIG. 1, with parts broken away. Shown in dashed lines is the medial aspect of the inferior spring element 50. It can be advantageous that the flexural axis 59 be deviated from the transverse axis 91 in the range between 10-50 degrees in an article of footwear intended for use in walking or running. As shown in FIGS. 4 and 5, the flexural axis 59 is deviated at about 35 degrees from the transverse axis 91 of the article of footwear 22.

It can be readily understood that posterior of the flexural axis 59 the length of the superior lever arm 60 and inferior lever arm 61 formed along the medial side 35 of the superior spring element 47 or posterior spring element 49 and the inferior spring element 50 are shorter than the length of the corresponding superior lever arm 60.1 and inferior lever arm 61.1 formed along the lateral side 36 of the superior spring element 47 or posterior spring element 49 and the inferior spring element 50. Accordingly, when the inferior spring element 50 is affixed in functional relation to the superior spring element 47 or posterior spring element 49 and is subject to compressive loading, the inferior spring element 50 exhibits less stiffness in compression at the lateral and posterior corner, and increasing stiffness in compression both anteriorly and laterally. Again, it can be advantageous for enhancing rearfoot stability during walking or running that the spring element 51 including inferior spring element 50 exhibit approximately two to three times the stiffness in compression on the medial side 35 relative to the stiffness exhibited on the lateral side 36. Further, as shown in FIGS. 4 and 5, the inferior aspect of the spring element 51 has a concave configuration in the midfoot area 67, that is, between the inferiormost portion of the anterior spring element 48 in the forefoot area 58 and the inferiormost portion of the inferior spring element 50 in the rearfoot area 68. It can be readily understood that the configuration of this concavity 76 and the flexural modulus of the spring element 51, as well as the stiffness of the anterior outsole element 44, middle outsole element 45, posterior outsole element 46, anterior spacer 55, and posterior spacer 42 can be engineered to provide optimal cushioning characteristics such as deflection with respect to the midfoot area 67 and rearfoot area 68 for an individual wearer, or for a target population having similar needs and requirements.

Figure 6:
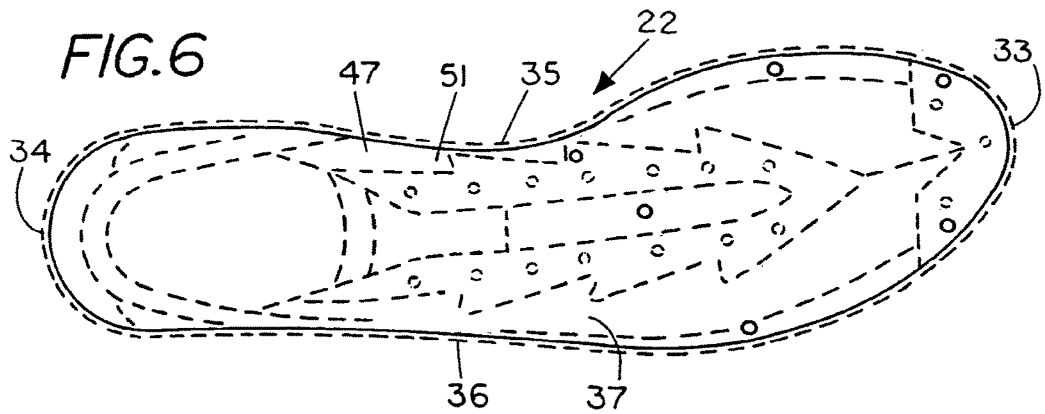
FIG. 6 is a top view of a spring element in the article of footwear shown in FIG. 2, with the upper shown in dashed lines.

FIG. 6 is a top view of a spring element 51 in the article of footwear 22 similar to that shown in FIG. 2, but having a relatively more curved shape corresponding to a relatively more curve lasted upper 23 shown in dashed lines. Shown is a spring element 51 consisting of a single full length superior spring element 47.

Figure 7:
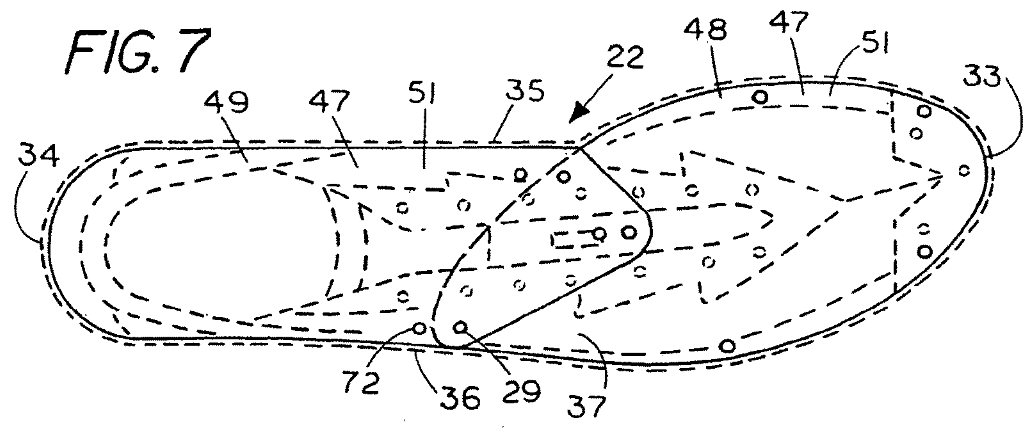
FIG. 7 is a top view of a two part spring element in the article of footwear shown in FIG. 2, with the upper shown in dashed lines.

FIG. 7 is a top view of a two part spring element 51 consisting of anterior spring element 48 and posterior spring element 49 in the article of footwear 22 shown in FIG. 2, with the upper 23 shown in dashed lines.

Figure 8:
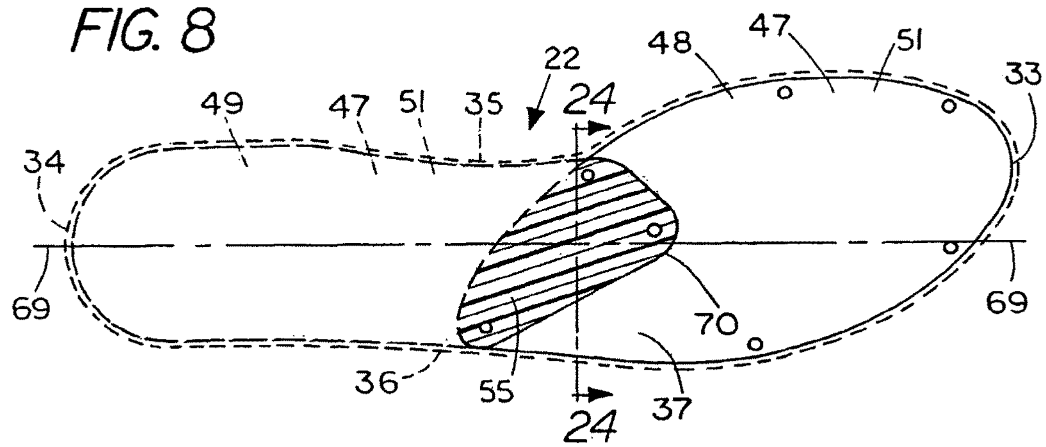
FIG. 8 is a top view of a two part spring element in an article of footwear generally similar to that shown in FIG. 2, but having a relatively more curve lasted upper shown in dashed lines.

FIG. 8 is a top view of a two part spring element 51 consisting of anterior spring element 48 and posterior spring element 49 in an article of footwear 22 generally similar to that shown in FIG. 2, but having a relatively more curved shape corresponding to a relatively more curve lasted upper 23 which is shown in dashed lines. The anterior spring element 48 and posterior spring element 49 can be affixed with three fasteners 29 in triangulation. The posterior spring element 48 can include a projection 70 proximate the longitudinal axis 69 of the article of footwear 22. The configuration of this projection 70 can at least partially determine the torsional rigidity of the assembled spring element 51 consisting of anterior spring element 48 and posterior spring element 49, thus the degree to which the forefoot area 58 can be rotated inwards or outwards about the longitudinal axis 69. Further, the number, dimension, and location of the fasteners 29 used to affix the anterior spring element 48 and posterior spring element 49 can affect both the flexural modulus of the superior spring element 47 along the length of the longitudinal axis 69, but also rotationally about the longitudinal axis 69, that is, the torsional modulus of the superior spring element 47. A portion of the anterior spring element 48 is shown broken away in order to reveal the optional inclusion of an anterior spacer 55 between the anterior spring element 48 and the posterior spring element 49.

As shown in FIG. 8, an anterior spacer 55 which can possibly consist of a cushioning medium or cushioning means having desired spring and dampening characteristics can be inserted in the area between the anterior spring element 48 and posterior spring element 49, that is, within an area of possible overlap as between the two components. The configuration and compressive, flexural, and torsional stiffness of an anterior spacer 55 can be used to modify the overall configuration and performance of a spring element 51 and article of footwear 22. In this regard, an anterior spacer 55 can have uniform height, or alternately an anterior spacer 55 can have varied height. Further, an anterior spacer 55 can exhibit uniform compressive, flexural, and torsional stiffness throughout, or alternately an anterior spacer 55 can exhibit different compressive, flexural, and torsional stiffness in different locations. These varied characteristics of an anterior spacer 55 can be used to enhance the cushioning, stability and overall performance of an article of footwear 22 for a unique individual wearer, or for a target population of wearers. For example, an anterior spacer 55 having an inclined or wedge shape can be used to decrease the rate and magnitude of pronation, supination, and inward or outward rotation of portions of a wearer's foot during portions of the walking or running gait cycle, and can also possibly correct for anatomical conditions such as varus or valgus. The relevant methods and techniques for making corrections of this kind are relatively well known to qualified medical doctors, podiatrists, and physical therapists. See also U.S. Pat. Nos. 4,399,620, 4,578,882, 4,620,376, 4,642,911, 4,949,476, and 5,921,004, all of these patents hereby being incorporated by reference herein. Normally, an anterior spacer 55 having an inclined wedge shape that increases in height from the lateral to the medial side, or one which exhibits greater stiffness in compression on the medial side can be used to compensate for a forefoot varus condition, whereas an anterior spacer 55 having an inclined wedge shape that increases in height from the medial to the lateral side, or one which exhibits greater stiffness in compression on the lateral side can be used to compensate for a forefoot valgus condition. An individual with a profound anatomical condition such as varus or valgus, or having a history of injury would be prudent to consult with a trained medical doctor when contemplating modification to their articles of footwear. Further, an anterior spacer 55 can also have a wedge or complex curved shape along the longitudinal axis 69, that is, in the posterior to anterior orientation, and various configurations of an anterior spacer 55 can be provided which can be used to modify the amount of toe spring 62 and the overall conformance of a spring element 51 and article of footwear 22, as desired.

FIG. 9 is a bottom view of the article of footwear 22 shown in FIG. 3, with the anterior outsole element 44 and posterior outsole element 46 removed to reveal the anterior spring element 48, posterior spring element 49, and inferior spring element 50. The flexural axis 59 of inferior spring element 50 is deviated approximately 35 degrees from the transverse axis 91. This configuration can be advantageous for use by distance runners who otherwise tend to pronate significantly during the braking and stance phases of the running cycle. Further, a portion of the inferior spring element 50 is shown broken away to reveal the optional use of a posterior spacer 42 which can serve a role in functional relation to the inferior spring element 50 and the superior spring element 47 or posterior spring element 49 analogous to that of the anterior spacer 55 which can be used as between the anterior spring element 48 and posterior spring element 49. Further, a posterior spacer 42 can also have a wedge or complex curved shape along the longitudinal axis 69, that is, in the posterior to anterior orientation, and various configurations of a posterior spacer 42 can be provided which can be used to modify the overall conformance of a spring element 51 and article of footwear 22, as desired.

It can be readily understood that in this specification and the associated drawing figures, the orientation and location of the longitudinal axis 69 is determined by longitudinally bisecting the rearfoot area 68 of the article of footwear 22, and likewise, any related components that are present in the rearfoot area 68 such as the inferior spring element 50, and also the posterior portion of the superior spring element 47 or posterior spring element 49. It is recognized that a longitudinal axis 69 drawn in this manner will not bisect the forefoot area 58 of an article of footwear 22 having a substantially curve lasted configuration. The orientation of the transverse axis 91 can be determined by drawing a line perpendicular to the longitudinal axis 69 as defined above, that is, the transverse axis 91 intersects the longitudinal axis 69 at a 90 degree angle. Accordingly, when an article of footwear 22 or component such as an inferior spring element 50 is recited as including or having a longitudinal axis 69 or transverse axis 91, it can be readily understood that this refers to the aforementioned defined coordinate system for describing, e.g., the orientation, relationship, or various specific features of the sub-components which are part of an article of footwear made according to the present invention.

FIG. 10 is a bottom view of an alternate article of footwear 22 with the anterior outsole element 44 and posterior outsole element 46 removed to reveal anterior spring element 48, posterior spring element 49 and an alternate configuration of inferior spring element 50. The flexural axis 59 of inferior spring element 50 is deviated approximately 30 degrees from the transverse axis 91. The anterior spring element 48, posterior spring element 49, and inferior spring element 50 are shown affixed together in an overlapping relationship in FIGS. 9 and 10. However, it can be readily understood that various components of a spring element 51 can be affixed in function relation with the use of adhesives, mating male and female parts such as tongue and groove, or other configurations and devices known in the prior art.

Figure 14:
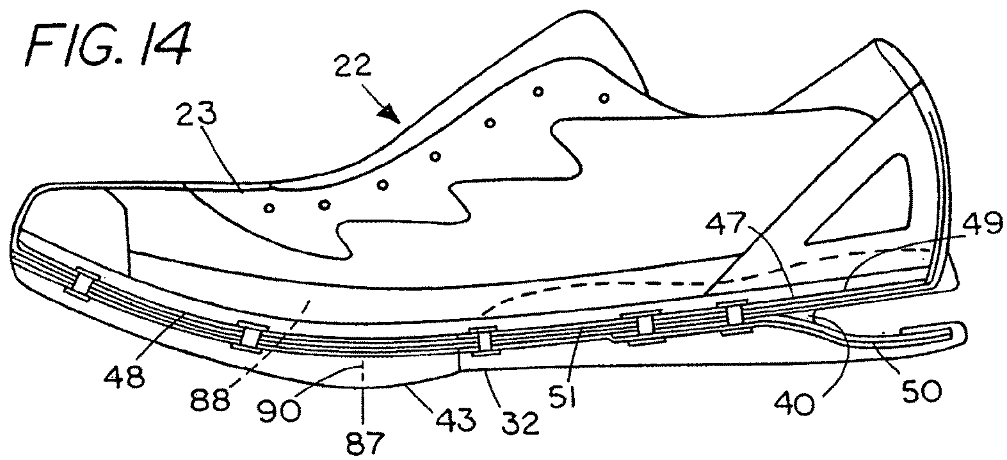
FIG. 14 is a longitudinal cross-sectional medial side view of an alternate article of footwear generally similar to that shown in FIG. 4, with parts broken away, further including a spring guard, and also a rocker sole configuration.

The possible use of notches 71 or openings 72 in order to diminish the stiffness in bending or flexural modulus exhibited by a portion of spring element 51, and two substantially transverse lines of flexion 54 is also shown in FIG. 10. Shown with a dashed line 90 in FIG. 10, and also in medial side view in FIG. 14, is the possible inclusion of a rocker 87 configuration in the forefoot area 58 of the sole 32 an article of footwear 22. It can be advantageous for the point of greatest elevation of the rocker 87 to be located approximately in the range between 1-4 cm posterior of the metatarsal-phalangeal joints. The location of the first metatarsal-phalangeal joint 88 on the medial side 35 of an average wearer's foot is normally at slightly less than seventy percent of foot length, and the location of the fifth metatarsal-phalangeal joint 89 on the lateral side 36 is normally somewhat greater than sixty percent of foot length as measured from the posterior side 34 of the wearer's foot. Accordingly, a rocker 87 can be positioned in the range between 1-4 cm behind a generally transverse and slightly diagonal line that can be drawn as between these two approximate positions for any given size article of footwear.

Figure 11:
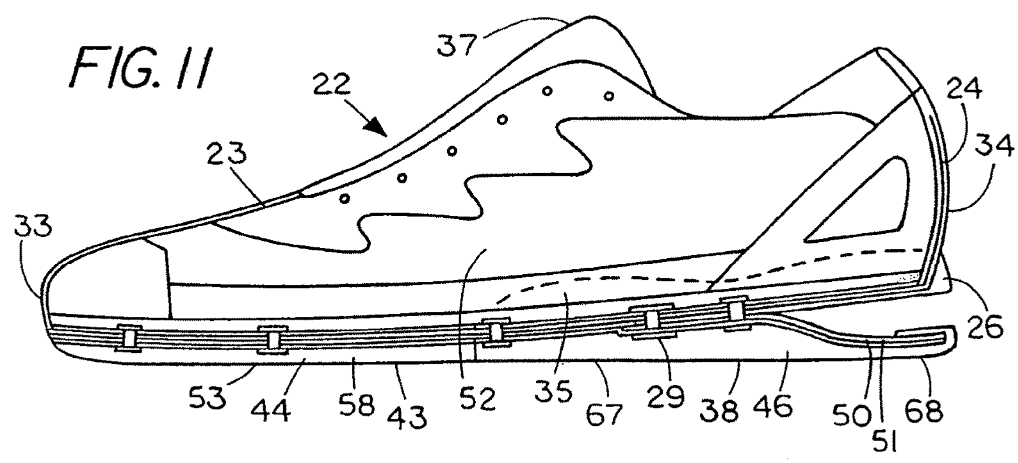
FIG. 11 is a longitudinal cross-sectional medial side view of an alternate article of footwear generally similar to that shown in FIG. 1, with parts broken away, but having a forefoot area without toe spring.

FIG. 11 is a longitudinal cross-sectional medial side view of an alternate article of footwear 22 generally similar to that shown in FIG. 1, with parts broken away, but having a forefoot area 58 without substantial toe spring 62. This particular article of footwear 22 can be suitable for use in activities such as tennis, volleyball, or basketball.

Figure 12:
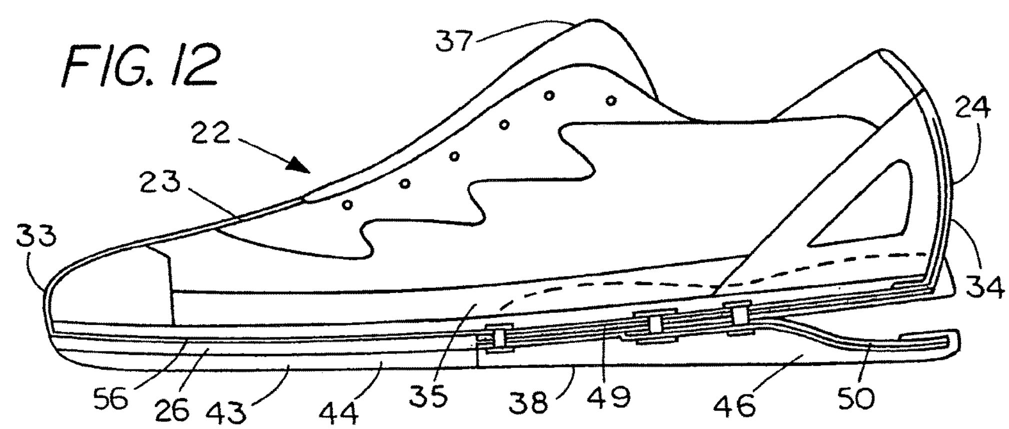
FIG. 12 is a longitudinal cross-sectional medial side view of an alternate article of footwear generally similar to that shown in FIG. 11, with parts broken away, but having a forefoot area including an outsole, foam midsole, and upper affixed together with an adhesive.

FIG. 12 is a longitudinal cross-sectional medial side view of an alternate article of footwear 22 generally similar to that shown in FIG. 11, with parts broken away, having a forefoot area 58 without substantial toe spring 62, but including an anterior outsole element 44, foam midsole 26, and upper 23 which are affixed together with the use of adhesives.

Figure 13:
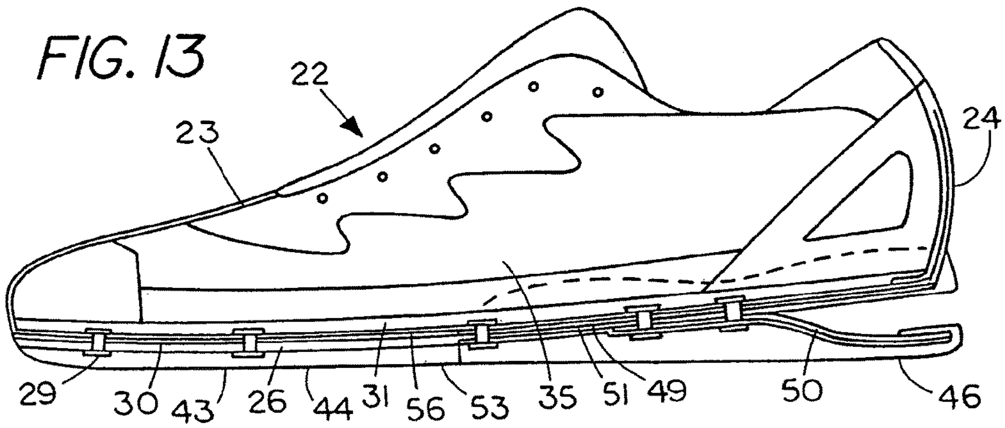
FIG. 13 is a longitudinal cross-sectional medial side view of an alternate article of footwear generally similar to that shown in FIG. 12, with parts broken away, but having a forefoot area including a detachable outsole and foam midsole.

FIG. 13 is a longitudinal cross-sectional medial side view of an alternate article of footwear 22 generally similar to that shown in FIG. 12, with parts broken away, having a forefoot area 58 without substantial toe spring 62, but including a detachable anterior outsole element 44 and foam midsole 26.

Figure 18:
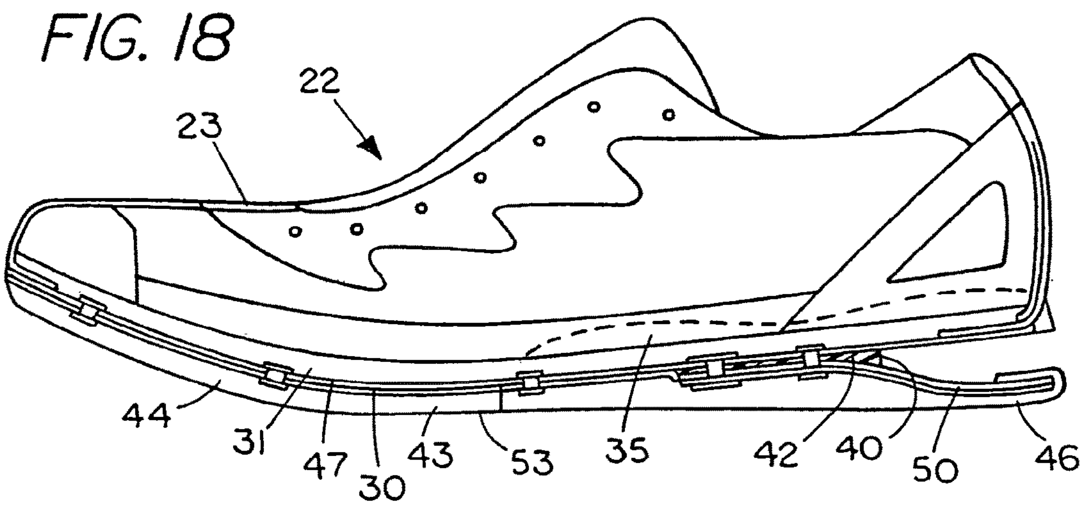
FIG. 18 is a longitudinal cross-sectional medial side view of an alternate article of footwear generally similar to that shown in FIG. 17, further including a posterior spacer including a spring guard.
Figure 20:
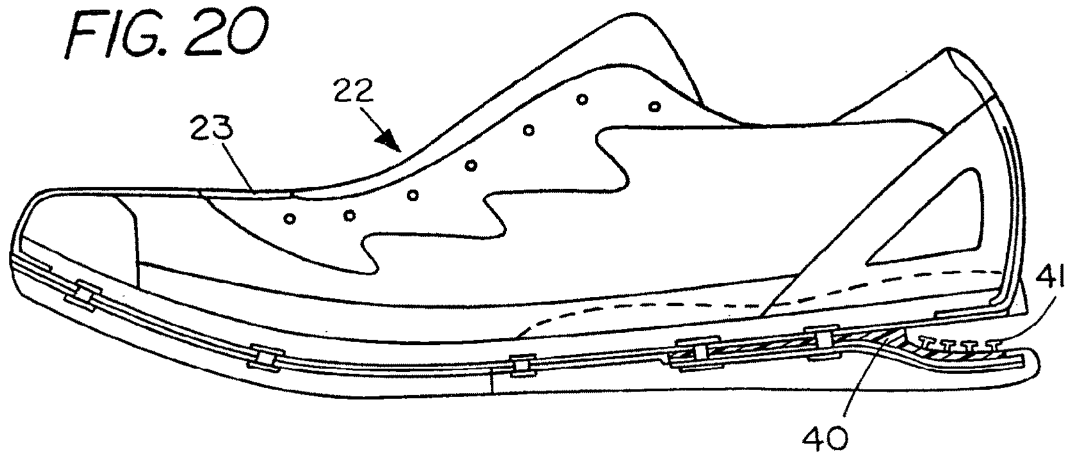
FIG. 20 is a longitudinal cross-sectional medial side view of an alternate article of footwear generally similar to that shown in FIG. 19, further including a spring guard including a plurality of vibration decay time modifiers.

FIG. 14 is a longitudinal cross-sectional medial side view of an alternate article of footwear 22 similar to that shown in FIG. 4, further including a spring guard 40. The spring guard 40 can be made of a relatively soft resilient material such as a foam material, or a natural or synthetic rubber. The spring guard 40 can prevent foreign matter from becoming lodged in the area proximate the junction of the superior spring element 47 or posterior spring element 49 and the inferior spring element 50, thus can prevent damage to spring element 51. The spring guard 40 can be affixed to the superior spring element 47 or posterior spring element 49, or to the inferior spring element 50, or to both portions of the spring element 51. Alternately, the spring guard 40 can form a portion and extension of posterior spacer 42, as shown in FIG. 18. Further, the spring guard 40 can also serve as a vibration decay time modifier 41, as shown in FIG. 20. Also shown in FIG. 14 is the approximate position of the first metatarsal-phalangeal joint 88 on the medial side 35, and a sole 32 or outsole 43 including a rocker 87 configuration in the forefoot area 58. As shown, the rocker 87 configuration can be formed and substantially consist of a portion of the sole 32 or outsole 43, or alternately, the rocker 87 configuration can be formed at least in part by an inferiorly protruding portion of the spring element 51, and in particular, the anterior spring element 48.

Figure 15:
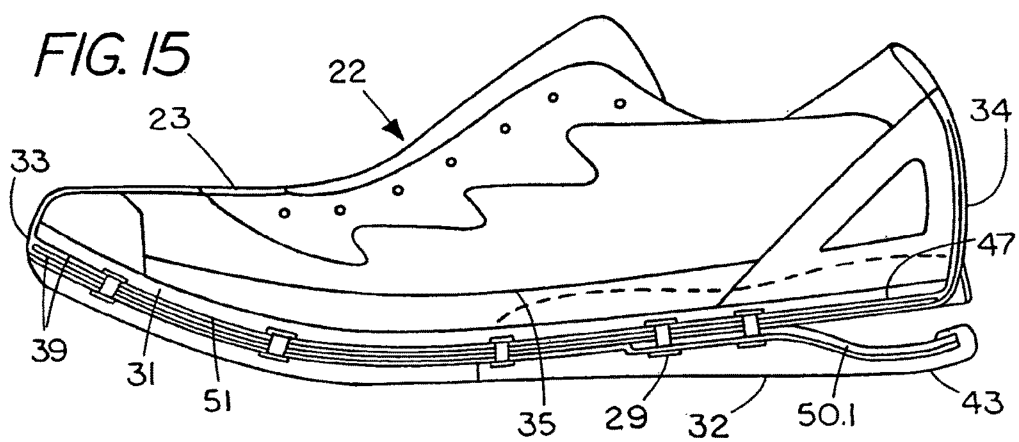
FIG. 15 is a longitudinal cross-sectional medial side view of an alternate article of footwear generally similar to that shown in FIG. 4, with parts broken away, having a upper including a sleeve for accommodating a lasting board or spring element.

FIG. 15 is a longitudinal cross-sectional medial side view of an alternate article of footwear 22 generally similar to that shown in FIG. 4, with parts broken away, having a upper 23 including a sleeve 39 for accommodating the superior spring element 47. The sleeve 39 can be formed in a portion of the upper 23 inferior to the insole 31, and can possibly consist of a portion of the t-sock 56. The spring element 51 can include an inferior spring element 50, and a superior spring element 47 that can include an anterior spring element 48 and a posterior spring element 49. The superior spring element 47 can be positioned within sleeve 39, thus at least partially retaining the superior spring element 47 in functional relation to the upper 23 of the article of footwear 22.

Further, in contrast with the configuration of inferior spring element 50 shown in FIG. 16, an alternate inferior spring element 50.1 is shown in FIG. 15. The alternate inferior spring element 50.1 descends from proximate the superior spring element 47 or posterior spring element 49 and attains maximum separation therefrom. The inferior spring element 50.1 can then possibly extend posteriorly in a parallel relationship with respect to the overlaying superior spring element 47. However, the inferior spring element 50.1 then curves upwards as the inferior spring element 50.1 extends towards the posterior side 34 of the article of footwear 22. It can sometimes be advantageous that the inferior spring element 50.1 be tapered in the range between approximately 1-15 degrees, or otherwise be curved upwards, as it extends towards the posterior side 34 and lateral side 36 corner of the sole 32 of the article of footwear 22.

FIG. 16 is a longitudinal cross-sectional medial side view of an alternate article of footwear 22 generally similar to that shown in FIG. 4, with parts broken away. However, this alternate embodiment does not include an additional covering such as a coating, textile, or outsole 43 on the inferior side of the upper 23, as shown in FIG. 4. Accordingly, the inferior side of the upper 23 is in direct contact with the superior side of the backing 30 of the outsole 43, that is, anterior outsole element 44 and posterior outsole element 46 when the article of footwear 22 is assembled. Further, in an alternate embodiment of the present invention, the backing 30 of an outsole 43 can be made of a material having sufficient flexural modulus and resilience as to simultaneously serve as a spring element of the article of footwear, as shown in FIG. 16. Accordingly, the anterior spring element can consist of two portions, anterior spring element 48, and anterior spring element 48.1, which also serves as the backing 30 of anterior outsole element 44.

In the article of footwear shown in FIG. 16, when a line is drawn parallel to the ground support surface and tangent to the inferior surface of the superior spring element 47 in the forefoot area 58, the approximate slope of the superior spring element 47 as it extends posteriorly is approximately five degrees. When affixed in functional relation to the superior spring element 47 or posterior spring element 49, the inferior spring element 50 projects downwards and rearwards therefrom before attaining the desired amount of separation between the components which at least partially determines the maximum amount of deflection that the resulting spring element 51 can provide. As shown in FIG. 16 and several other drawing figures, once the inferior spring element 50 descends and attains the desired amount of separation, the inferior spring element 50 extends posteriorly in a substantially parallel relationship with respect to the corresponding overlaying portion of the superior spring element 47 or posterior spring element 49. Accordingly, after descending from proximate the superior spring element 47 or posterior spring element 49 and establishing the desired amount of separation, the inferior spring element 50 does not curve upwards as it extends towards the posterior side 34 of the article of footwear 22. Instead, it is known in prior art articles of footwear, and can also be advantageous in the present invention for a portion of the outsole 43 near the posterior side 34, and in particular, proximate the posterior side 34 and lateral side 36 corner, to be tapered in the range between 1-15 degrees, or otherwise curved upwards. However, the overall configuration of the article of footwear 22 including the amount of toe spring 62 and the aforementioned slope of the superior spring element 47 can influence or determine the amount of slope or curvature that is advantageous to incorporate in this portion of the outsole 43.

Figure 17:
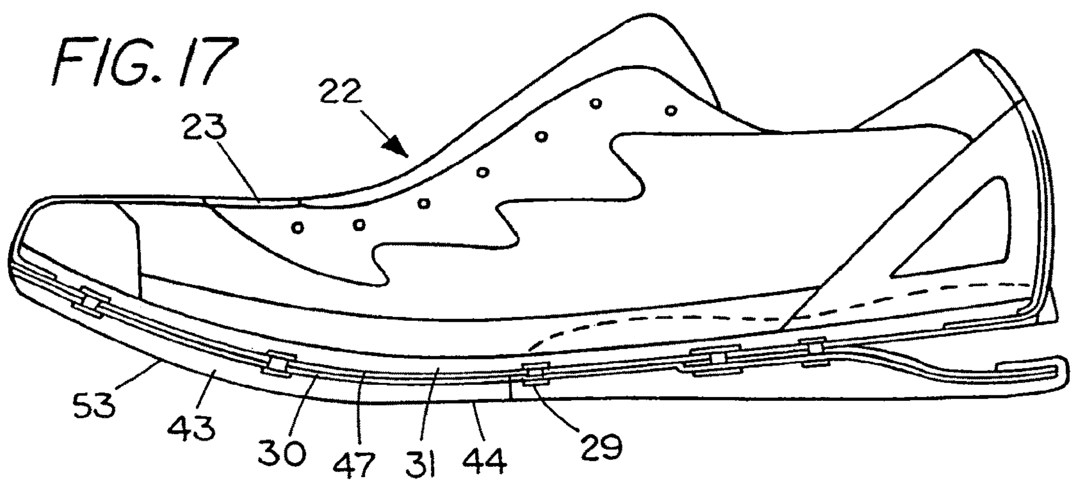
FIG. 17 is a longitudinal cross-sectional medial side view of an alternate article of footwear generally similar to that shown in FIG. 4, with parts broken away, having a upper affixed to a spring element.

FIG. 17 is a longitudinal cross-sectional medial side view of an alternate article of footwear 22 generally similar to that shown in FIG. 4, having a upper 23 affixed to superior spring element 47, with parts broken away. The upper 23 is affixed to the top or superior surface of superior spring element 47, thus the superior spring element 47 can be exposed on its bottom or inferior surface. Accordingly, the superior surface of the outsole 43 portions including backing 30 can be placed in direct contact with the superior spring element 47 when they are affixed into position.

FIG. 18 is a longitudinal cross-sectional medial side view of an alternate article of footwear 22 similar to that shown in FIG. 17, further including a posterior spacer 42. As shown in FIG. 18, a posterior spacer 42 can include a spring guard 40. As shown in FIG. 20, a spring guard 40 can further include a vibration decay time modifier 41. The posterior spacer 42 can serve to at least partially isolate the superior spring element 47, upper 23 and wearer from the transmission of shock and vibration which could be imparted by the inferior spring element 50 and posterior outsole element 46 caused by an impact event.

It can be readily understood that a posterior spacer 42 can serve a purpose analogous to that of anterior spacer 55, and vice-versa. Accordingly, a posterior spacer 42 can consist of a cushioning medium or cushioning means having desired spring and dampening characteristics. The posterior spacer 42 can be inserted between the inferior spring element 50 and posterior spring element 49, that is, within an area of possible overlap as between the two components. The configuration and stiffness of a posterior spacer 42 can be used to modify the overall configuration and performance of a spring element 51 and article of footwear 22. In this regard, a posterior spacer 42 can have uniform height, or alternately a posterior spacer 42 can have varied height. Further, a posterior spacer 42 can exhibit uniform compressive, flexural, or torsional stiffness throughout, or alternately can exhibit different properties in different locations. These varied characteristics of a posterior spacer 42 can be used to enhance the cushioning and/or stability of an article of footwear 22 for an unique individual wearer, or for a target population of wearers.

For example, a posterior spacer 42 having an inclined or wedge shape can be used to decrease the rate and magnitude of pronation, supination, inward or outward rotation of portions of a wearer's foot during phases of the walking or running gait cycle, and can also possibly correct for anatomical conditions such as varus or valgus. Again, the relevant methods and techniques for making corrections of this kind are relatively well known to qualified medical doctors, podiatrists, and physical therapists. Normally, a posterior spacer 42 having an inclined wedge shape that increases in height from the lateral to the medial side, or a posterior spacer 42 which exhibits greater stiffness in compression on the medial side can be used to reduce the magnitude and rate of rearfoot pronation, whereas a posterior spacer 42 having an inclined wedge shape that increases in height from the medial to the lateral side, or a posterior spacer 42 which exhibits greater stiffness in compression on the lateral side can be used to reduce the magnitude and rate of rearfoot supination. An individual having a profound anatomical condition such as varus or valgus, an individual who dramatically pronates or supinates, or an individual who has a history of injury would be prudent to consult with a trained medical doctor when contemplating modification to their articles of footwear.

It can be readily understood that with the use of an anterior spacer 55 positioned between anterior spring element 48 and posterior spring element 49, and a posterior spacer 42 positioned between the superior spring element 47 or posterior spring element 49 and the inferior spring element 50, that the configuration and functional relationship as between the forefoot area 58, midfoot area 67, and rearfoot area 68 of an article of footwear 22 can be adjusted and customized as desired by an individual wearer. Further, the use of an anterior spacer 55 and/or posterior spacer 42 having a select configuration can be used to adjust the amount of support provided by a superior spring element 47 or posterior spring element 49 which can possibly further include contours for mating with the complex curved shapes of a wearer's foot. For example, it is possible to customize the amount of support that is provided to the medial longitudinal, lateral longitudinal and transverse arches, and to the sides of a wearer's foot.

Figure 19:
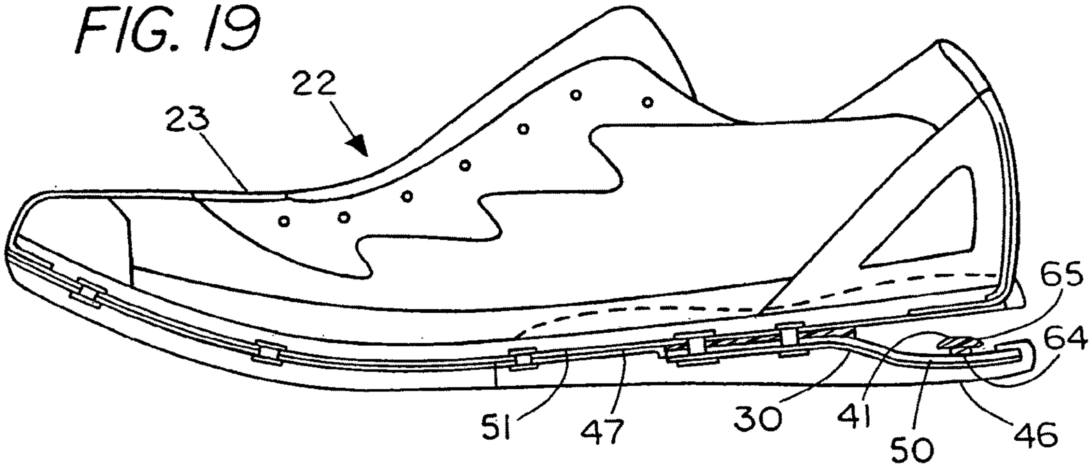
FIG. 19 is a longitudinal cross-sectional medial side view of an alternate article of footwear generally similar to that shown in FIG. 18, further including a vibration decay time modifier.

FIG. 19 is a longitudinal cross-sectional medial side view of an alternate article of footwear 22 having a posterior spacer 22 including a spring guard 40, and also a vibration decay time modifier 41 having a stem 64 and a head 65. The vibration decay time modifier 41 can be affixed in function relation to a portion of spring element 51, and in particular, a portion of an inferior spring element 50. The head 65 of the vibration decay time modifier 41 can be dimensioned and configured for vibration substantially free of contact with a spring element 51 in directions which substantially encompass a 360 degree arc and normal to the longitudinal axis of the stem 64, that is, when the vibration decay time modifier 41 is initially excited by shock and vibration. When the superior spring element 47 or posterior spring element 49 and inferior spring element 50 are subjected to compressive loading a vibration decay time modifier 41 can also serve as a stop and prevent any possible impact between these elements. The inclusion of a posterior spacer 42 and/or a vibration decay time modifier 41 can partially attenuate shock and vibration associated with impact events associated with movements such as walking or running, and can reduce the vibration decay time following an impact event. This can serve to enhance comfort, proprioception, reduce local trauma, and possibly solicit greater application of force and improved athletic performance.

Generally, the efficiency of a vibration decay time modifier will be enhanced the closer it is positioned in functional relation to a negative nodal point. When properly configured and placed proximate the negative nodal point of an object or implement, relatively little mass is required in order to substantially prevent, or alternately, to attenuate resonant vibration within fractions of a second. A negative nodal point is a point at which a substantial portion of the vibration energy in an excited object or implement will pass when it is excited by energy associated with an impact or other vibration producing event. Discussion of modes of vibration and negative nodal points can be found in Arthur H. Benade, *Fundamentals of Musical Acoustics,* 2nd edition, New York: Dover Publications, 1990, Harry F. Olson, *Music, Physics and Engineering,* 2nd edition, New York: Dover Publications, 1967, and U.S. Pat. No. 3,941,380 granted to Francois Rene Lacoste on Mar. 2, 1976, this patent hereby being incorporated by reference herein.

A technology taught by Steven C. Sims in U.S. Pat. No. 5,362,046, granted Nov. 4, 1994, this patent hereby being incorporated by reference herein, has been commercialized by Wilson Sporting Goods, Inc. into the SLEDGEHAMMER® INTUNE® tennis rackets, and by Hillerich and Bradsby Company, Inc. in the LOUISVILLE SLUGGER® SIMS STINGSTOP® aluminum baseball and softball bats, as well as the POWERBUILT® SIMS SHOCK RELIEF® golf club line, and LIMBSAVER® product for archery. These products substantially eliminate the vibration and stinging associated with impact events experienced by a wielder's hands. Certain aspects of the aforementioned teachings can be applied in the present invention in order to accomplish a similar results with regards to an article of footwear 22 and the lower extremities of a wearer.

The source of shock and vibration can derive from a relatively controlled and harmonic movement, such as when a wearer repeatedly impacts the pavement while running in an article of footwear 22. Further, the source of shock and vibration can be random in nature, as when a wearer rides a wheeled vehicle such as a bicycle or motorcycle over rough terrain. Alternately, the source of shock and vibration can be constant and mechanically driven as when a wearer rides a bicycle, or a motor vehicle such as a motorcycle or snowmobile. A shock wave, that is, a shock pulse or discontinuity can travel at the speed of sound in a given medium. In the human body, the speed of sound in bone is approximately 3,200 meters/second, and in soft tissue approximately 1,600 meters/second. A shock wave traveling in a relatively dense fluid medium such as water has approximately five times the power that it does in a less dense fluid medium such as air. It is important to recognize that the human body is largely comprised of water and like fluid medium.

When a metal bell is struck, the bell will resonate and continue to ring for an extended time while the vibration energy is gradually dampened out. When a small bell is rung, one can place one's hand upon it and silence it. In that case, the primary dampening means for attenuating the resulting shock and vibration is the anatomy of the human subject. The same thing can happen when an impact event takes place as between an individual's foot and the materials which are used in an athletic shoe, and a running surface. When an individual runs on an asphalt surface in running shoes, the sound of the impact event that one hears is the audible portion of the shock wave that has been generated as result of the impact.

Many individuals know from experience that a vibrating implement or object can numb the hands. This is even more true when the source of the vibration is continuous and driven as when power equipment is being used. Associated with that numbness can be pain, reduced sensation and proprioception, and reduced muscular effort and performance as the body responds to protect itself from a perceived source of trauma and injury. Chronic exposure to high levels of vibration can result in a medical condition known as white finger disease. Generally, the lower extremities of most individuals are not subject to high levels of driven vibration. However, bicycle riders wearing relatively rigid articles of footwear can experience constant driven vibration, thus their feet can become numb or "go to sleep" over time. Motorcycle riders can also experience the same phenomenon.

The preferred article of footwear includes spring and dampening means for at least partially attenuating shock and vibration, that is, the initial shock pulse, pressure wave, or discontinuity and associated peak g's that are imparted to a wearer due to an impact event. At a cellular or molecular level, such vibration energy is believed to disturb normal functions such as blood flow in tendon tissue. Given appropriate engineering with respect to the characteristic or desired spring stiffness, mass, deflection, frequency, dampening, and percent transmissibility, an article of footwear of the present invention can partially attenuate shock and vibration. Viscous, friction, and mechanical dampening means can be used to attain this end. It is known that the mean power frequency associated with the rearfoot impact event in running generally corresponds to 20 Herz, and that of the forefoot to 5 Herz. The design and configuration, as well as the spring and dampening characteristics of a spring element 51, posterior spacer 42, and vibration decay time modifier 41 can be engineered so as to target these frequencies and provide a specific characteristic tuned mechanical response.

An anterior spacer 55, posterior spacer 42, and vibration decay time modifier 41 can be made of a cushioning medium or cushioning means such as a natural or synthetic rubber material, or a resilient elastomer such as polyurethane. In this regard, thermoset or thermoplastic materials can be used. Thermoplastic materials can be less expensive to produce as they can be readily injection molded. In contrast, thermoset materials are often compression molded using a relatively time and energy consuming vulcanization process. However, some thermoset materials can possess superior dampening properties and durability. Dampening materials which can be cured with the use of ultrasonic energy, microwave, visible or ultraviolet light, radio frequency, or other portions of the electromagnetic spectrum can be used. Room temperature cure elastomers, such as moisture or evaporation cure, or catalytic cure resilient materials can also be used. A suitable dampening material can be made of a butyl, chloroprene, polynorborene, neoprene, or silicone rubber, and the like. Alternately, a dampening material can be made of an elastomeric material such as polyurethane, or SORBOTHANE®. Suitable hybrid thermoplastic and rubber combinations can also be used, including dynamically vulcanized alloys which can be injection molded such as those produced by Advanced Elastomer Systems, 338 Main Street, Akron, Ohio 44311, e.g., SANTOPRENE®, VYRAM®, GEOLAST®, and TREFSIN®. SANTOPRENE® is known to consist of a combination of butyl rubber and ethylene-propylene. Generally, other materials developed for use in the audio industry for dampening vibration such as EAR ISODAMP®, SINATRA®, EYDEX®, and the like, or combinations thereof, can be used. Fillers such as organic or inorganic microspheres, carbon black or other conventional fillers can be used. Plasticizing agents such as fluids or oils can be used to modify the physical and mechanical properties of the dampening material in a desired manner. The preferred dampening material has transition characteristics suitable for the expected operational temperature of an article of footwear 22, and other physical and mechanical properties well suited to dampen shock and vibration and reduce vibration decay time.

It can be advantageous that the dampening material used to make a solitary vibration decay time modifier 41 including a stem 64 and a head 65 have a hardness in the range of 10-30 durometer, and preferably approximately 20 durometer on the Shore A scale. A relatively soft dampening material is capable a dampening a wide range of exciting vibration frequencies, and also relatively low vibration frequencies. However, a harder dampening material having greater shear and tear strength can sometimes be advantageous for use when making an anterior spacer 55 or posterior spacer 42 due to the magnitude of the loads which can be placed upon these components during use. A vibration decay time modifier 41 can be affixed to spring element 51 by conventional means such as adhesive, mechanically mating parts, chemical bonding, heat and pressure welding, radio frequency welding, compression molding, injection molding, photocuring, and the like.

In a conventional article of footwear having a foam midsole and rubber outsole, the materials located between the wearer's foot and the inferior ground engaging surface of the outsole normally become compressed during footstrike and subsequent loading of the sole. During compressive loading the stiffness of these materials increases linearly or geometrically and as result the ability of the sole to dampen shock and vibration rapidly diminishes. Further, the area of the sole which transmits most of the shock and vibration can be relatively small and localized. In this regard, the energy associated with a shock pulse or discontinuity passes tends to pass quickly by the shortest route and through the hardest or stiffest material in which it is in communication. Again, the transmission of shock and vibration is extremely fast in the human body and the materials used in conventional articles of footwear. In a conventional article of footwear, the shock and vibration resulting from impact with the support surface is rapidly transmitted through the outsole, midsole, upper and insole and into a wearer's foot.

However, in the present invention the shock and vibration generated proximate the inferior ground engaging surface 53 of the outsole 43 must travel anteriorly along the outsole 43 and inferior spring element 50 before being transmitted to the superior spring element 47, upper 23 and wearer, thus for a greater distance relative to a conventional article of footwear. This affords more time and space in which to attenuate and dampen shock and vibration. Further, in the present invention the outsole 43 can be made of a softer material having better shock and vibration dampening characteristics than is normally the case in a conventional article of footwear. In addition, a posterior spacer 42 can serve as a shock and vibration isolator between the inferior spring element 50 and the superior spring element 47, upper 23, and wearer's foot. Moreover, as shown in FIGS. 19 and 20, at least one vibration decay time modifier 41 can be positioned in direct communication with inferior spring element 50 in order to dampen shock and vibration before it can be transmitted to a wearer. Accordingly, the present invention can provide a wearer with enhanced cushioning, shock and vibration isolation, and dampening effects relative to conventional footwear constructions.

FIG. 20 is a longitudinal cross-sectional medial side view of an alternate article of footwear 22 including a posterior spacer 42 similar to that shown in FIG. 18. As shown in FIG. 20, a posterior spacer 42 can include a spring guard 40 and at least one protrusion which can be configured and engineered to serve as a vibration decay time modifier 41.

Figure 21:
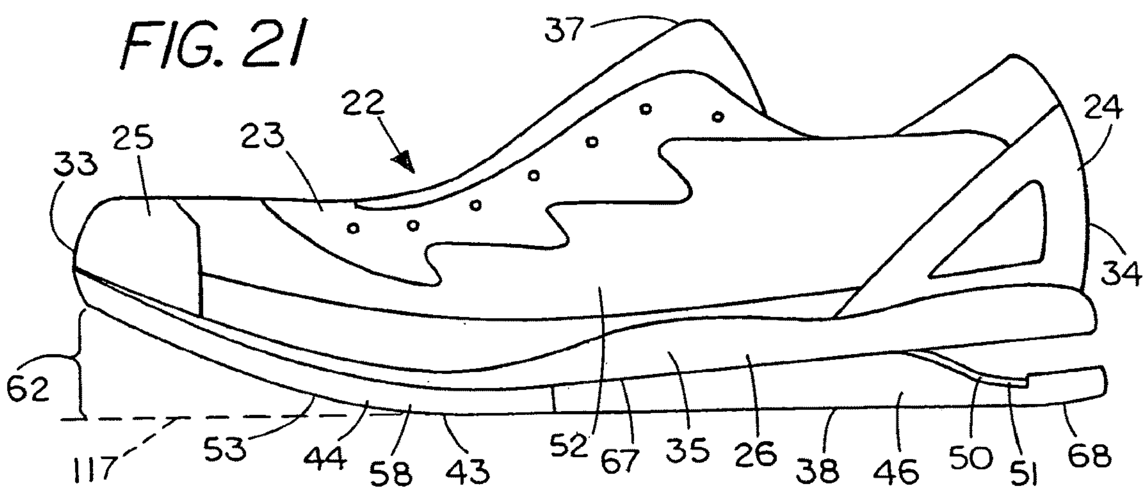
FIG. 21 is a medial side view of an alternate article of footwear similar to that shown in FIG. 4, but having various components affixed together with the use of adhesives.

FIG. 21 is a longitudinal cross-sectional medial side view of an alternate article of footwear 22 generally similar to that shown in FIG. 1, but having various components including the upper 23, spring element 51, and outsole 43 affixed together with the use of adhesives in the manner of a conventional article of footwear.

Figure 22:
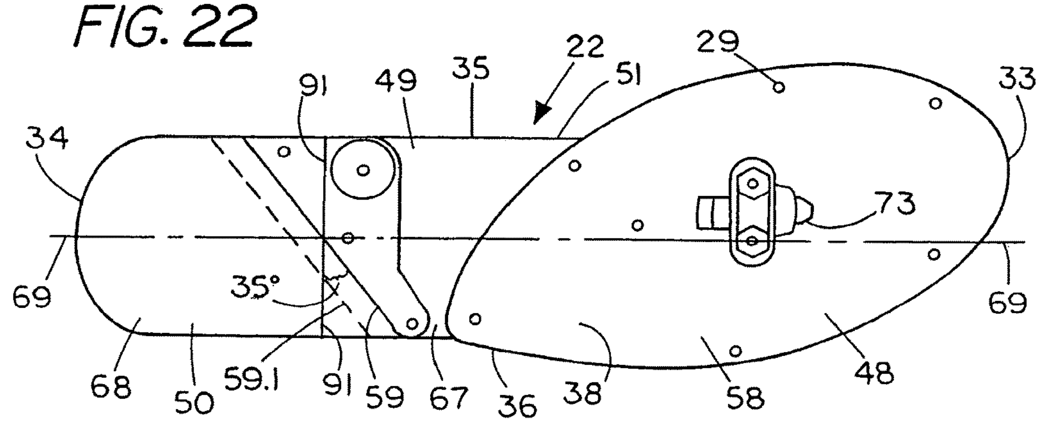
FIG. 22 is a bottom view of an alternate article of footwear similar to that shown in FIG. 3, having a spring element configured for accommodating a bicycle or skate cleat.

FIG. 22 is a bottom view of an alternate article of footwear 22 generally similar to that shown in FIG. 3, having a spring element 51 configured for accommodating a detachable bicycle cleat 73. The article of footwear 22 can then serve as bicycling shoe, and possibly also as a functional upper 23 for an in-line skate, as taught in the applicant's co-pending U.S. patent application Ser. No. 10/628,540 entitled "Wheeled Skate With Step-In Binding And Brakes," hereby incorporated by reference herein.

Also shown in FIG. 22 is flexural axis 59, and with the use of a dashed line, an alternate position of flexural axis 59.1 with reference to the longitudinal axis 69. It can be readily understood that other more anterior or more posterior positions of a flexural axis 59 with reference to the longitudinal axis 69 are possible. The position of the flexural axis 59 can be selected in order to influence or determine the physical and mechanical properties of a spring element 51, and the overall conformance and performance of an article of footwear 22, as desired. Generally, it can be advantageous that the posteriormost portion of the flexural axis on the medial side be located in the range between 1-6 inches from the posterior side of the upper, and in particular, in the range between 2-4 inches from the posterior side of the upper. However, in the footwear embodiment shown in FIG. 22, it can be advantageous both with respect to the stability of the preferred article of footwear 22, but also the weight and cost of the spring element, that the posteriormost position of the flexural axis 59 on the medial side 35 be located approximately in the range between 1-3.5 inches from the posterior side 34 of the upper 23 in a men's size 9 article of footwear 22. The method of grading and scaling various footwear components for other men's or women's sizes is well known in the footwear industry, thus the preferred range as concerns the position of the flexural axis 59 on the medial side 32 can be determined from this information for any given size article of footwear 22.

It can be readily understood that this teaching concerning the angular orientation of the flexural axis 59 with reference to the longitudinal axis 69 can be applied to other embodiments of a preferred article of footwear 22. Possible angular deviation of the flexural axis 59 from the transverse axis 91 in the range between 10-50 degrees was previously discussed. One advantage to using a flexural axis 59 that is deviated from the transverse axis 91 in the range between 10-50 degrees is that it permits the use of an inferior spring element 50 having a relatively homogenous construction and a substantially uniform thickness, and this both serves to reduce manufacturing costs and enhances product reliability. It can be readily understood that various combinations and permutations with respect to the position of the flexural axis 59 with reference to the longitudinal axis 69 and the angular deviation of the flexural axis 59 from the transverse axis 91 can be functional.

Figure 23:
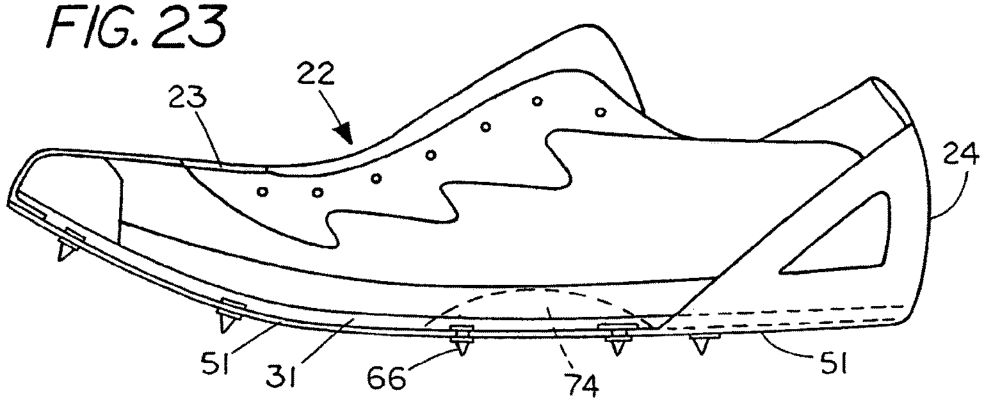
FIG. 23 is a medial side view of an alternate article of footwear generally similar to that shown in FIG. 17, but including a spring element which extends about the heel to form an integral heel counter, and about the lateral side of the forefoot to form a side support, with the outsole and inferior spring element removed, and including track spike elements.

FIG. 23 is a medial side view of an alternate article of footwear 22 generally similar to that shown in FIG. 17, but having the anterior outsole element 44, posterior outsole element 46, and inferior spring element 50 removed, and further including track spike elements 66. This embodiment can facilitate enhanced athletic performance and can be used by track and field athletes in the sprinting and jumping events. Further, the spring element 51 can extend upwards about the area of the heel to form an integral heel counter 24, as shown in FIG. 23. In addition, the spring element 51 can extend upwards about the lateral side 36 of the forefoot area 58 to form a side support 74, as shown with dashed lines in FIG. 23. Various configurations of a side support 74 and/or an integral heel counter 24 can be incorporated in any or all embodiments of a preferred article of footwear 22, as desired. Moreover, the superior spring element 47 used in any or all embodiments of a preferred article of footwear 22 can be configured to mate with or otherwise support the complex curved shapes and structures associated with the anatomy of the human foot.

Figure 24:
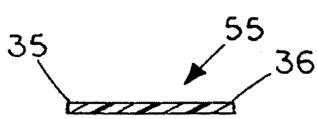
FIG. 24 is a cross sectional view of the anterior spacer included in the article of footwear shown in FIG. 8, taken along line 24-24.

FIG. 24 is a cross sectional view of the anterior spacer 55 included in the article of footwear 22 shown in FIG. 8, taken along line 24-24. As shown in FIG. 24, the anterior spacer 55 has a uniform elevation.

Figure 25:
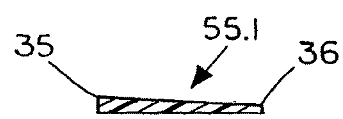
FIG. 25 is a cross sectional view of an alternate anterior spacer generally similar to that shown in FIG. 8, but having a wedge shape, taken along a line consistent with line 24-24.

FIG. 25 is a cross sectional view of an alternate anterior spacer 55.1 generally similar to that shown in FIG. 8, but having a wedge shape 28, taken along a line consistent with line 24-24. As shown in FIG. 25, the anterior spacer 55.1 has a wedge shape 28 which slopes upward from the lateral side 36 to the medial side 35.

Figure 26:
FIG. 26 is a cross sectional view of the posterior spacer included in the article of footwear shown in FIG. 9, taken along line 26-26.

FIG. 26 is a cross sectional view of the posterior spacer 42 included in the article of footwear 22 shown in FIG. 9, taken along line 26-26. As shown in FIG. 26, the posterior spacer 42 has a uniform elevation.

Figure 27:
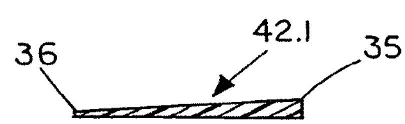
FIG. 27 is a cross sectional view of an alternate posterior spacer generally similar to that shown in FIG. 9, but having a wedge shape, taken along a line consistent with line 26-26.

FIG. 27 is a cross sectional view of an alternate posterior spacer generally similar to that shown in FIG. 9, but having a wedge shape, taken along a line consistent with line 26-26. As shown in FIG. 27, the posterior spacer 42.1 has a wedge shape 28 which slopes upward from the lateral side 36 to the medial side 35.

FIGS. 24-27 have been provided to illustrate a few of the possible configurations of an anterior spacer 55 and posterior spacer 22, and other variations are both possible and anticipated. For example, the configuration and slope of the wedge shapes 28 can be the opposite of that represented, and the anterior spacer 55 and/or posterior spacer 22 can slope upwards from the medial side 35 to the lateral side 36. Further, the anterior spacer 55 and/or posterior spacer 22 can have more complex or compound curved shapes. In addition, it can be readily understood that the amount of elevation and/or degree of slope of the anterior spacer 55 and/or posterior spacer 42 can be varied. The compressive, flexural and torsional stiffness of different anterior spacers 55 and/or posterior spacers 22 can also be varied. Moreover, an anterior spacer 55 and/or posterior spacer 22 can be made to exhibit differential stiffness in different portions.

Again, an anterior spacer 55 or posterior spacer 42 can also have a wedge or complex curved shape along the longitudinal axis 69, that is, in the posterior to anterior orientation, and various configurations can be provided which can be used to modify the overall conformance of a spring element 51 and article of footwear 22, as desired. Accordingly, many variables can be manipulated and selected to optimize the configuration and performance of an article of footwear for an individual, or for a given target population having similar characteristics and requirements.

Figure 28:
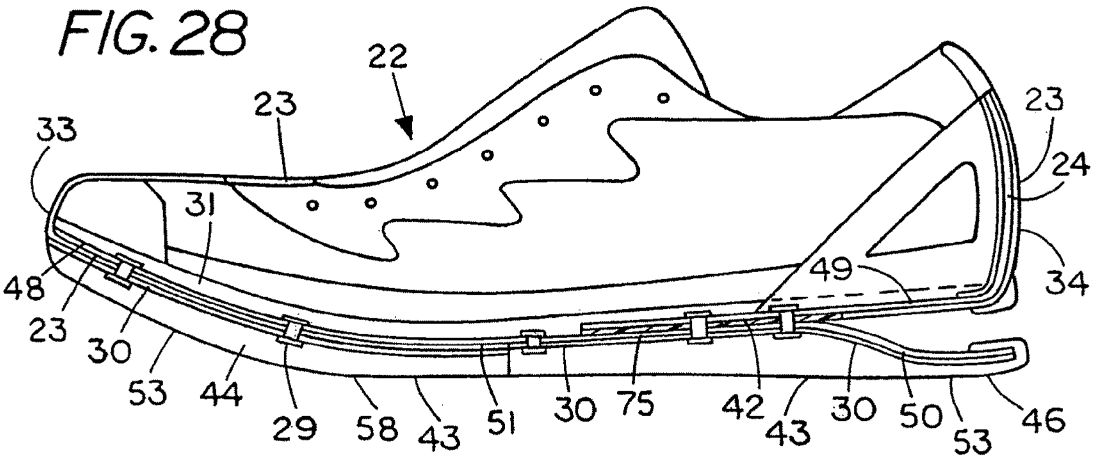
FIG. 28 is a longitudinal cross-sectional medial side view of an alternate article of footwear having an alternate spring element with parts broken away.

FIG. 28 is a longitudinal cross-sectional medial side view of an alternate article of footwear 22 having a different configuration of a spring element 51, with parts broken away. In this embodiment, the anterior spring element 48 and inferior spring element 50 can be affixed in functional relation with the use of mechanical means such as fasteners 29, and the like, or alternately be formed as a single component identified herein as anterior and inferior spring element 75. The anterior portion of the spring element 51 can pass through a slit in the t-sock 56 or upper 23 and then be affixed with fasteners 29 to outsole 43, thereby firmly securing the upper 23 in functional relation thereto. As shown, the posterior spring element 49 can be affixed to the posterior portion of the spring element 51 with at least one fastener 29, and a posterior spacer 42 can also be inserted therebetween. Alternately, the posterior spacer 42 be formed as a coating or otherwise consist of a portion of the t-sock 56 or upper 23. As shown in FIG. 28, the posterior spring element 49 can be made to further include an integral heel counter 24.

Figure 29:
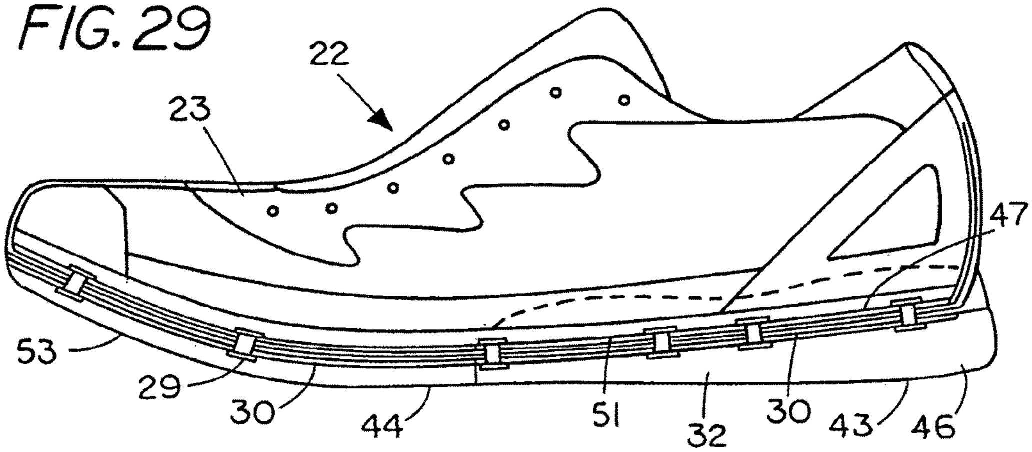
FIG. 29 is a longitudinal cross-sectional medial side view of an alternate article of footwear having a spring element, and a selectively removable sole.

FIG. 29 is a longitudinal cross-sectional medial side view of an alternate article of footwear 22 including a superior spring element 47, and a selectively removable sole 32 made of a more conventional cushioning medium or cushioning means such as an EVA or polyurethane foam material, a fluid-filled bladder, and a thermoplastic or thermoset rubber outsole. As shown, the sole 32 does not include an inferior spring element 50 made of a fiber composite material or metal. However, the posterior portion of the sole 32 consisting of a conventional cushioning medium or cushioning means such as an EVA or polyurethane foam material, a fluid-filled bladder, and a thermoplastic or thermoset rubber outsole can be made such as to be removable, thus an inferior spring element 50 made of a fiber composite material or metal could alternately be used, as desired. In this patent application, the terms or phrases “cushioning medium” or “cushioning means” shall mean any and all forms of matter, structure, energy, or force capable of attenuating the impact events commonly experienced with the use of articles of footwear. Accordingly, the terms or phrases “cushioning medium” or “cushioning means” can be used to indicate relatively conventional cushioning materials or devices, e.g., an EVA or polyurethane foam material, or a fluid-filled bladder, but also a spring element 51 solely consisting of a superior spring element 47, or alternately, a spring element 51 including a superior spring element 47 and an inferior spring element 50, and the like.

The superior spring element 47 can have the approximate configuration of the bottom net of a corresponding last 80 or other hard template, model, or pattern. Alternately, the superior spring element 47 can be made in accordance with a soft model created and maintained in a data storage and retrieval computer environment. A superior spring element 47 can possibly simultaneously consist and serve as a lasting board 79, and vice-versa. However, not every structure and material composition of a lasting board 79 would be such as to possibly create or serve as a spring element 51. A lasting board 79 can be made of wood, cellulose, cardboard, or other natural fiber, reconstituted leather, a textile formed by knitting or weaving, a non-woven textile, a textile formed by stitch bonding, metal such as steel, spring steel, aluminum, or titanium, a thermoplastic material such as nylon, polyester, polypropylene, an elastomer such as polyurethane, thermoplastic rubber or other natural or synthetic rubber, or alternately, as preferred and previously discussed in detail, a fiber composite material such as carbon fiber.

The sole 32 can include separate midsole 26 and outsole 43 components, or can be made as a single component. Various sole 32 components can be made having different physical and mechanical characteristics, and performance capabilities for possible selection and use by a wearer. The sole 32 can be selectively removed and replaced by a wearer in order to customize the article of footwear 22, or to renew a component, as desired. As shown in FIG. 29, the spring element 51 does not include an inferior spring element 50, rather the spring element 51 consists of a superior spring element 47, or an anterior spring element 48 and posterior spring element 49 which are affixed in functional relation.

Figure 30:
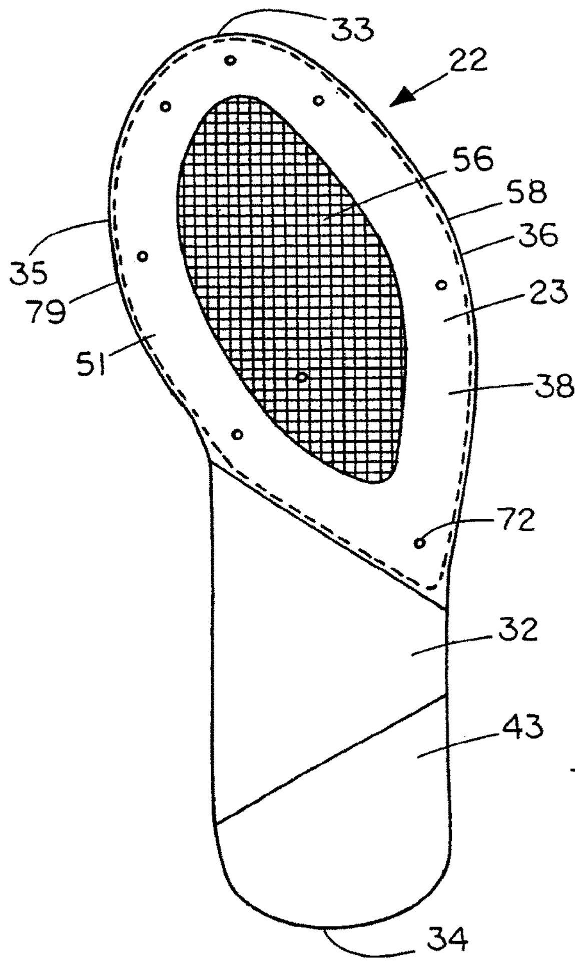
FIG. 30 is a bottom view of the inferior side of the upper of an article of footwear showing an anterior spring element having a plurality of openings.

FIG. 30 shows a bottom view of an alternate article of footwear 22 having an anterior lasting board 79 positioned in the forefoot area 58. Also shown is a portion of the inferior side 38 of the upper 23 including a plurality openings 72 which can be made to register with corresponding openings 72 in an anterior lasting board 79, thus enabling the use of a plurality of fasteners 29 to affix the upper 23 in functional relation to the anterior lasting board 79, and a sole 32 which can possibly include a midsole 26 and outsole 43, or merely an outsole 43. The article of footwear 22 shown in FIG. 30 also consists of a slip-lasted construction in the forefoot area 58 including a t-sock 56 to which the upper 23 is affixed by stitching or adhesive, or other conventional means. The t-sock 56 can consist of a substantially non-stretchlastic textile material, but preferably consists of a stretchlastic textile material. Alternately, the t-sock 56 can be made of cellulose, paper, cardboard, or other natural fiber, reconstituted leather, a textile formed by knitting or weaving, a non-woven textile, a textile formed by stitch bonding, a thin film or sheet consisting of thermoplastic material such as nylon, polyester, polypropylene, and the like, an elastomer such as polyurethane, thermoplastic rubber or other natural or synthetic rubber. Alternately, the upper 23 can consist of a different type of slip lasted construction, a moccasin construction, a string lasted construction, or another conventional footwear construction known in the art. The article of footwear 22 can include a sole 32 in the midfoot area 67 and rearfoot area 68 which is affixed to the upper 23 in a conventional manner with the use of adhesives. Alternately, the sole 32 can be affixed to a full length lasting board 79, or a posterior lasting board 79 with the use of fasteners 29.

It can be readily understood that within certain practical limitations, different lasting boards 79 having different configurations possibly including different lengths, foot shapes, and widths can be used with a given upper 23 in order to customize the fit of an article of footwear 22 for a unique individual or target population. For example, a plurality of lasting boards 79 can be developed for use with different target populations consisting of individuals having generally similar anatomical characteristics and foot dimensions. Further, it can also be readily understood that within certain practical limitations, different uppers 23 having different configurations possibly including different lengths, widths, and foot shapes can be used with a given lasting board 79 in order to customize the fit of an article of footwear 22 for a unique individual or target population. For example, a plurality of uppers 23 can be developed for use with different target populations consisting of individuals having generally similar anatomical characteristics and foot dimensions.

Figure 31:
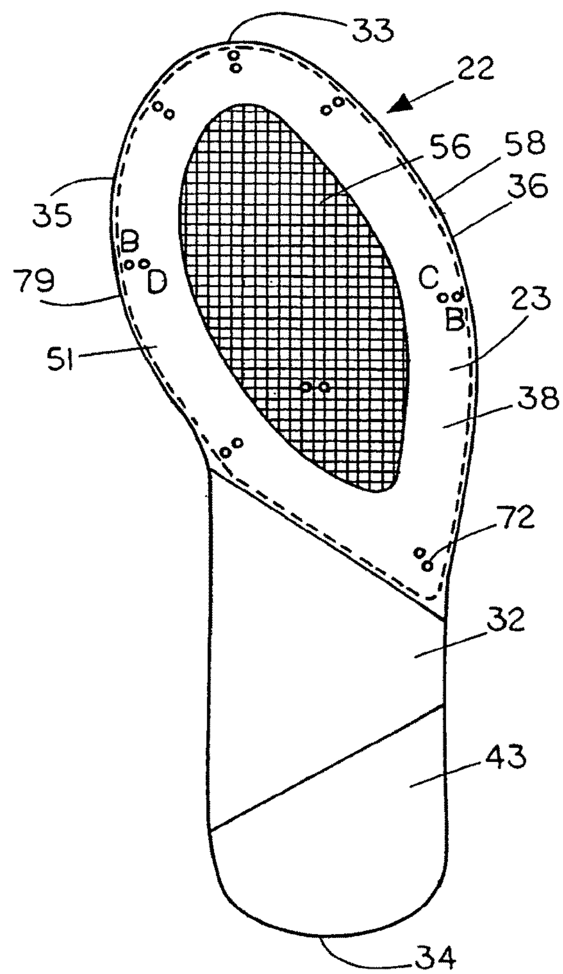
FIG. 31 is a bottom view of the inferior side of the upper of an article of footwear showing a plurality of adjacent openings at different positions.

FIG. 31 shows a bottom view of the inferior side 38 of the upper 23 of an article of footwear 22 generally similar to that shown in FIG. 30, but including two alternate openings 72 at a plurality of different positions at which a fastener 29 can be used. In the American sizing system, a change in length by one size corresponds to ⅓ inch, and changes in width as between respective sizes A, B, C, D, and E are associated with increments of ¼ inch. Further, the increments in length and width associated with other sizing systems are also known. Given an upper 23 having two alternate openings 72 that are separated by ¼ inch for possible use at each different position at which a fastener 29 can be used, and in particular, about the forefoot area 58, it is possible for the article of footwear 22 to provide three possible options such as width sizes B, C, and D. For example, if the openings 72 closest to the lateral side 23 and medial side 22 are associated with an article of footwear 22 having a B width, then increasing the width of the upper 23 by moving the adjacent opening 72 on one side or the other to that position will provide a C width, and moving the other adjacent opening 72 on the opposite side in like manner will provide a D width. It is generally advantageous to configure an upper 23 having only two alternate openings 72 for possible use at each different position at which a fastener 29 can be used in accordance with the width sizing model shown in FIG. 32.

Figure 32:
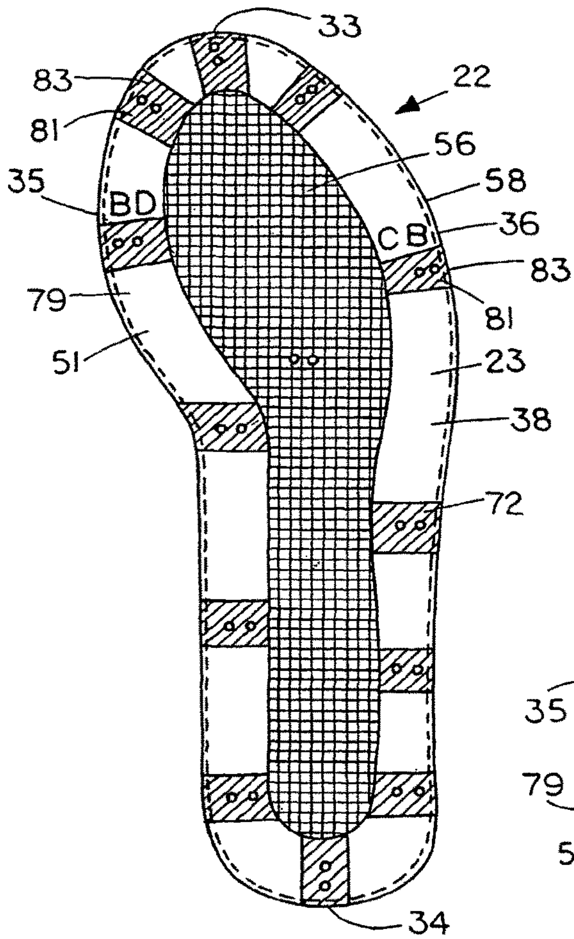
FIG. 32 is a bottom view of the inferior side of the upper of an article of footwear showing reinforcement material about a plurality of adjacent openings at different positions.

FIG. 32 shows an article of footwear 22 which is adjustable along the entire length of the upper 23 including the forefoot area 58, midfoot area 67, and rearfoot area 68 having two alternate openings 72 for possible use at each different position at which a fastener 29 can be used, and the possible use of local reinforcement material 81 in the area about the openings 72. The reinforcement material 81 can be made of tape, textile, plastic, natural or synthetic rubber, natural or synthetic leather, metal, or other robust material which serves to enhance the strength of the upper 23. The reinforcement material 81 can also be tactified, or otherwise possess relatively high static and dynamic coefficients of friction, and can possibly include a self-adhesive material 83. Nevertheless, it can be advantageous that the self-adhesive material 83 have a repeatable or renewable adhesion and release capability. Also shown is the use of a t-sock 56 made of stretchlastic material that has greater than 100 percent elongation which can easily accommodate the possible ½ inch width expansion of the upper 23.

Figure 33:
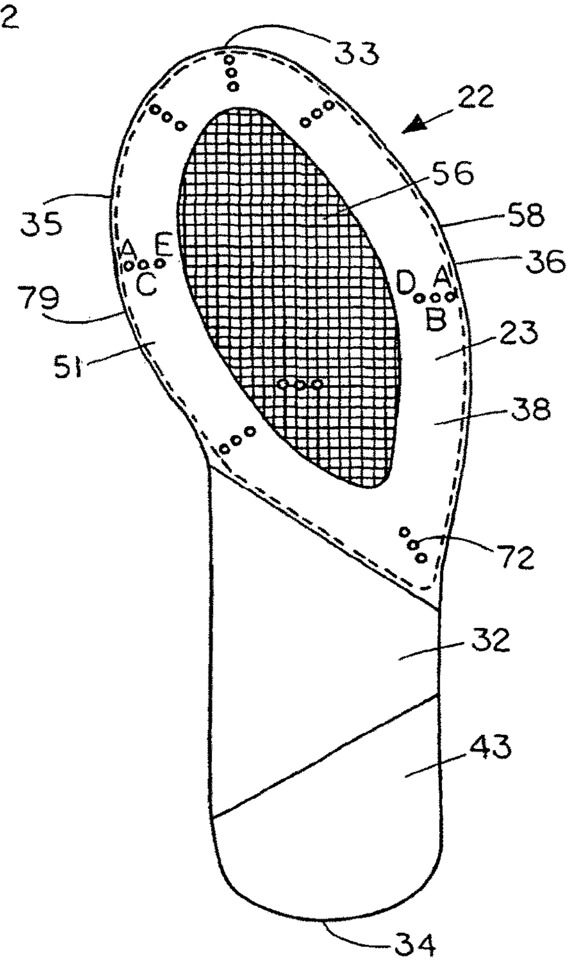
FIG. 33 is a bottom view of the inferior side of the upper of an article of footwear showing a plurality of adjacent openings at different positions.

FIG. 33 shows a bottom view of the inferior side 38 of the upper 23 of an article of footwear generally similar to that shown in FIGS. 30 and 31, but including three alternate openings 72 for possible use at each different position at which a fastener 29 can be used. In the American sizing system, a change in length by one size corresponds to ⅓ inch, and changes in width as between respective sizes A, B, C, D, and E are associated with increments of ¼ inch. Further, the increments in length and width associated with other sizing systems are also known. Given an upper 23 having three alternate openings 72 that are separated by ¼ inch for possible use at each fastener 29 position, and in particular, about the forefoot area 58, it is possible for the article of footwear 22 to provide five possible width size options such as width sizes A, B, C, D, and E. For example, if the openings 72 closest to the lateral side 23 and medial side 22 are associated with an article of footwear 22 having a size A width, then increasing the width of the upper 23 by moving the next adjacent opening 72 on one side or the other to that position will provide a B width, and moving the other adjacent opening 72 on the opposite side will provide a C width, and so on, thus possibly also providing size D and E widths, as desired. It can be advantageous to configure an upper 23 having three alternate openings 72 for possible use at each different position at which a fastener 29 can be used in accordance with the width sizing model shown in FIG. 34.

Figure 34:
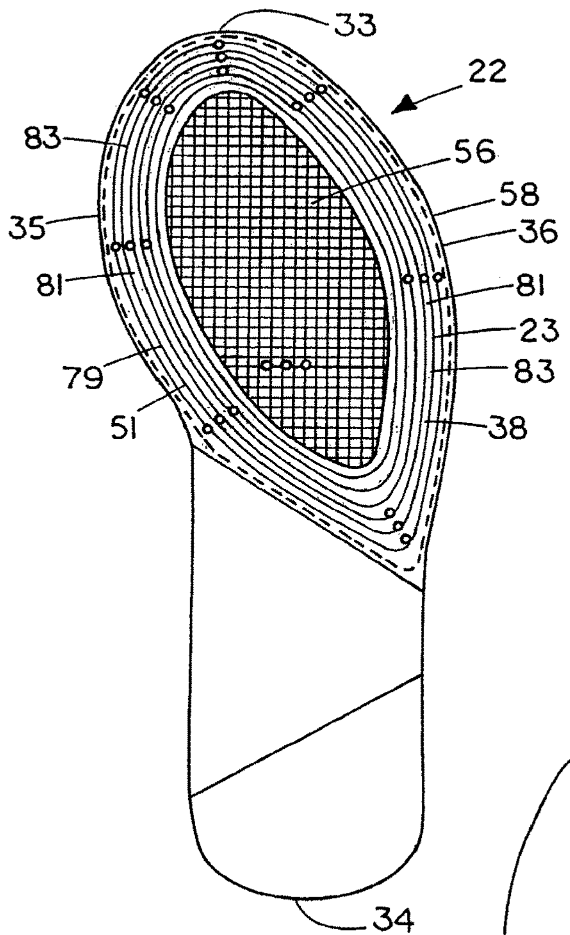
FIG. 34 is a bottom view of the inferior side of the upper of an article of footwear showing reinforcement material about and between a plurality of openings.

FIG. 34 shows an upper 23 having three alternate openings 72 for possible use at each different position at which a fastener 29 can be used, and also the possible use of reinforcement material 81 in the area about and between the openings 72. This reinforcement material 81 can be made of tape, textile, plastic, natural or synthetic rubber, natural or synthetic leather, metal, or other robust material that will serve to enhance the strength of the upper 23. The reinforcement material 81 can also be tactified, or otherwise possess a relatively high static and dynamic coefficient of friction, and can possibly include a self-adhesive material 83. Nevertheless, it can be advantageous that the self-adhesive material 83 have a repeatable or renewable adhesion and release capability. Also shown is the use of a t-sock 56 made of stretchlastic material that has greater than 100 percent elongation which can easily accommodate the possible 1 inch width expansion of the upper 23.

Figure 35:
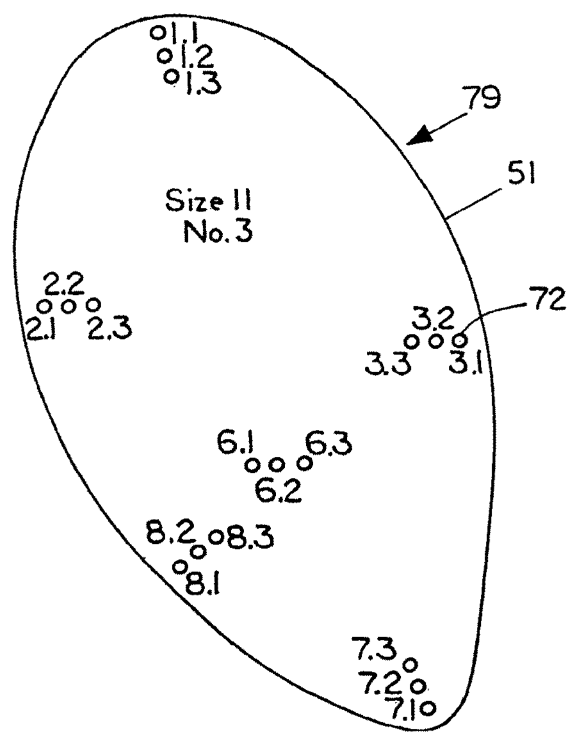
FIG. 35 is a bottom view of the inferior side of an anterior spring element having a plurality of openings at different positions for being affixed in function relation to an upper and outsole.

FIG. 35 shows a lasting board 79 for the forefoot area 58 including a plurality of openings 72, or alternately, a plurality of indications with respect to making a plurality of openings 72 for use in the present invention. These openings 72 can provide alternate positions for use in affixing portions of the upper 23 in functional relation to the lasting board 79 with the use of fasteners 29. Also shown is the use of a code for indicating each different position where a fastener 29 can be used, and also the three alternative openings 72 for possible use at each different position. The same code can also be used with corresponding parts of the upper 23 and sole 32. Accordingly, the information and intelligence created from the raw data which has been collected with respect to an individual wearer or target population can indicate the selection of a specific lasting board 79 and also a specific code indicating the openings 72 to be used in order to provide an individual wearer or target population with an optimal or preferred custom fit. For example, various lasting boards 79 having a particular size length, foot shape configuration, and size width can be given numerical and/or alphabetical identification. Further, the various different positions at which a fastener 29 can be used, and in particular, the alternate openings 72 which are present at each different position can be given an alphabetical and/or numerical identification, as shown in FIG. 35.

Accordingly, the raw data or feedback provided by an individual when transformed into information and intelligence could possibly indicate the selection a lasting board 79 having American length size 11, last or foot shape number 3 from amongst a possible selection of thirty different last or foot shape configurations, and also indicate selection of the following code with respect to utilization of the various different positions and alternate openings 72: Code 1.1/2.2/3.2/4.2/5.2/6.1/7.2/8.2. In contrast, an different individual could require the same lasting board 79 having American length size 11, last or foot shape number 3, but a different code for optimal utilization of the various different positions and alternate openings 72, e.g., Code 1.2/2.1/3.1/4.2/5.3/6.1/7.2/8.2. Obviously, a different individual could require a lasting board 79 having a different length and also a different last or foot shape, and the data and preferences of different individuals can also indicate or result in the selection of different uppers 23 having different functions, designs, styles, materials, and sizes.

Figure 36:
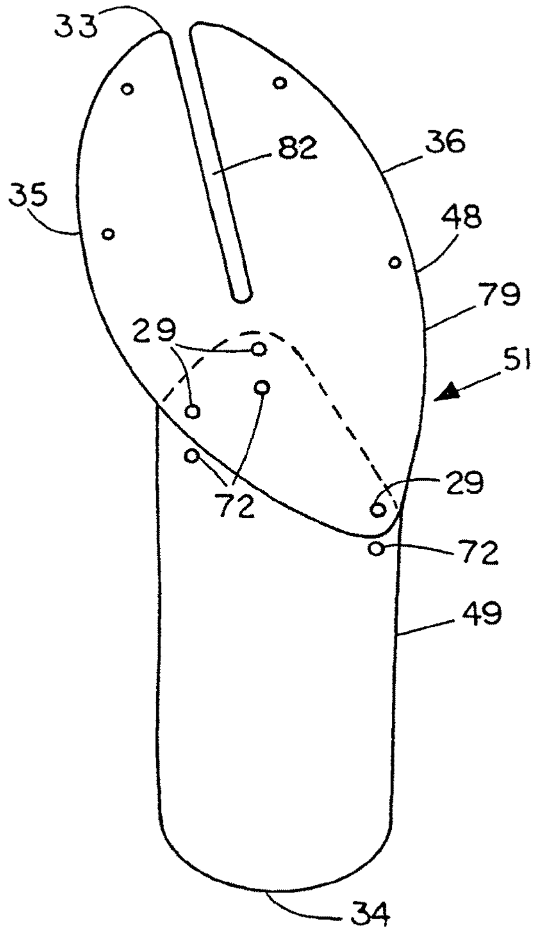
FIG. 36 is a top view of the superior side of a spring element including an anterior spring element including a longitudinal slit, and posterior spring element.

FIG. 36 shows an alternate lasting board 79 or spring element 51 for use in the forefoot area 58 of an article of footwear 22. The spring element 51 consists of a posterior spring element 49 and an anterior spring element 48 which includes a longitudinal slit 82 that at least partially separates the medial side 35 from the lateral side 36 and permits somewhat independent articulation and flexion of these two portions. It can be advantageous for the position of the longitudinal slit 82 to coincide with the space between an wearer's first and second toes and corresponding metatarsals, or alternately, with the space between an wearer's second and third toes and corresponding metatarsals. This can facilitate independent articulation of the toes and metatarsals of the foot and possibly enhance both comfort and athletic performance. See also U.S. Pat. No. 5,384,973 granted to the present inventor and assigned to Nike, Inc., previously incorporated by reference herein. The physical and mechanical properties of the anterior spring element 48 can be varied as between its anterior side and posterior side, but also as between its medial side 35 and lateral side 36.

A lasting board 79 or spring element 51 component having a given size length can also sometimes be used with articles of footwear 22 which are in the range between one to three different half sizes longer and shorter. As shown in FIG. 36, at least one alternate set of openings 72 can be included on the posterior spring element 49 for affixing the posterior spring element 49 in functional relation to the anterior spring element 48. Further, an alternate set of openings 72 can be included on the anterior spring element 48 for the same purpose. In the American sizing system, length changes of one full size approximately correspond to increments of ⅓rd of an inch, and the distances associated with other sizing systems are also known. Accordingly, two sets of alternate openings 72 spaced apart by a distance corresponding to a full size length can sometimes render a lasting board 79 or spring element 51 suitable for use with three or four sizes.

Figure 37:
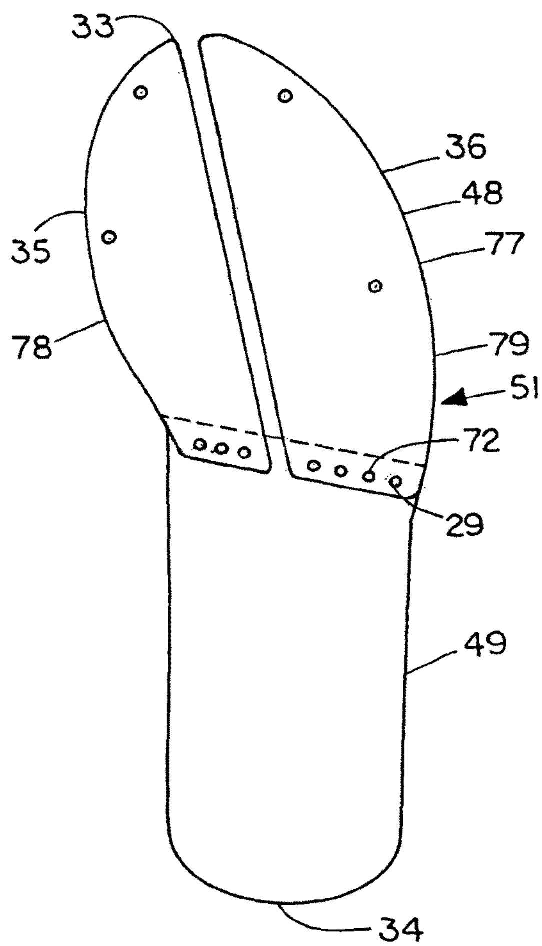
FIG. 37 is a top view of the superior side of a spring element including an anterior spring element consisting of two separate parts, a medial anterior spring element and a lateral anterior spring element.

FIG. 37 shows a different alternate lasting board 79 or spring element 51 including an anterior spring element 48 and a posterior spring element 49. The anterior spring element 48 for use in the forefoot area 58 of an article of footwear 22 consists of two separate parts, that is, a medial anterior spring element 78, and lateral anterior spring element 77. This configuration separates the medial side 35 from the lateral side 36 and permits substantial independent articulation and flexion of these two parts. It can be advantageous for the position of the longitudinal opening 72 between the medial anterior spring element 78 and lateral anterior spring element 77 to coincide with the space between an wearer's first and second toes and corresponding metatarsals, or alternately, with the space between an wearer's second and third toes and corresponding metatarsals. This can facilitate independent articulation of the toes and metatarsals of the foot and possibly enhance both comfort and athletic performance. See U.S. Pat. No. 5,384,973 granted to the present inventor and assigned to Nike, Inc., previously incorporated by reference herein. The physical and mechanical properties of the medial anterior spring element 78 and lateral anterior spring element 77 can be varied as between their respective anterior sides and posterior sides, but also as between their respective medial sides 35 and lateral sides 36. Further, the configuration and also the physical and mechanical properties of the medial anterior spring element 78 and lateral anterior spring element 77 can be different from one another. In addition, different medial anterior spring elements 78 and lateral anterior spring elements 77 can be selected for use in an article of footwear 22. Also shown in FIG. 37 is the possible use of a plurality of different alternate openings 72 for affixing the medial anterior spring element 78 and lateral anterior spring element 77 in different relative positions. Given American footwear sizing, if the medial anterior spring element 78 and lateral anterior spring element 77 are configured to provide a size B width when the two parts are in a closed position, that is, the two parts are adjacent to one another, then moving one of the parts ¼ inch will provide a size C width, and moving the other part ¼ inch will provide a D width, and the two parts will then be separated by ½ inch. If the medial anterior spring element 78 and lateral anterior spring element 77 are configured to provide a size A width when the two parts are in a closed position, that is, the two parts are adjacent to one another, then moving one of the parts ¼ inch will provide a size B width, and moving the other part ¼ inch will provide a C width, and so on, such that when providing an E width the two parts will be separated by one inch. The position of any potential openings 72 corresponding to half or whole size increments associated with a given sizing system which are to be made in portions of a lasting board 79, spring element 51, upper 23, or sole 32, can be indicated upon any or all of the components, or alternately, the various openings 72 can be made in stock parts intended for future use. Further, it can be readily understood that the openings 72 and any other adjustments which are made to various components of a customized article of footwear 22 can be unique to an individual wearer.

Figure 38:
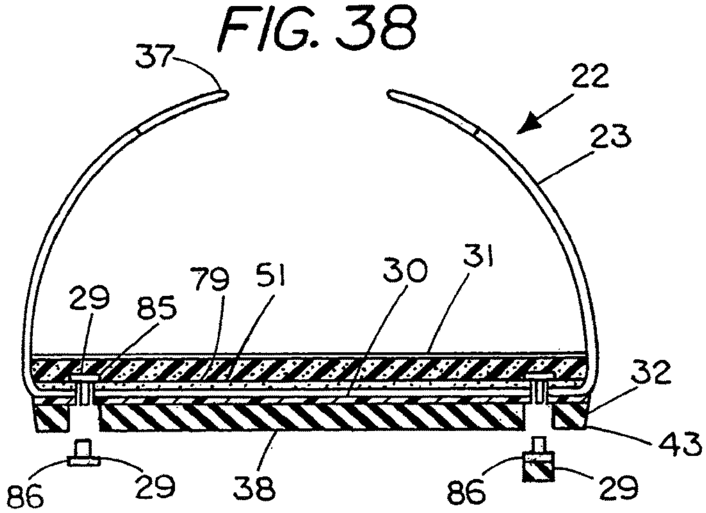
FIG. 38 is a transverse and exploded cross-sectional view of an article of footwear showing a lasting board or spring element having male mechanical engagement means affixed thereto, and also an upper, insole, sole, and female mechanical engagement means.

FIG. 38 is a transverse and exploded cross-sectional view taken along line 38-38 in FIG. 16 of an alternate article of footwear 22 showing a lasting board 79 or spring element 51 having male mechanical engagement means affixed thereto, and also an upper 23, insole 31, sole 32, and female mechanical engagement means for engaging in functional relation with the male mechanical engagement means. The male and female mechanical engagement means can consist of fasteners 29 have a male part 85 and a female part 86. Alternately, the male part 85 can be affixed to the sole 32, or the fasteners 29 can consist of loose parts. The fasteners 29 shown on the left in FIG. 38 can be visible on the inferior side 38 of the sole 32. Alternately, a fastener 29 can include a male part 85 or female part 86 which is affixed within the sole 32, and the corresponding mating part can be inserted and affixed in functional relation from the superior side within the defined space of the upper 23 of an article of footwear 22, as shown on the right in FIG. 43. Alternately, as shown on the right in FIG. 38, the fasteners 29 can include a resilient material suitable for use on the sole 32 or outsole 43 such that the fasteners 29 are hardly visible and their use does not appreciably degrade the cushioning or traction provided by the sole 32 or outsole 43. Alternately, a fastener 29 including a resilient material or other material can project from the surface of the sole and form a traction member, lug, or cleat, as shown in FIG. 23. Accordingly, an article of footwear 22 including a lasting board 79 or spring element 51 can include the structure disclosed in the specification and shown in the drawing figures of U.S. Pat. No. 6,954,998 B1 by Michel Lussier, and/or U.S. patent application Ser. No. 11/064,439 by Wolfgang Scholtz assigned to Adidas International Marketing B.V., both of these patent documents hereby incorporated by reference herein. Moreover, an article of footwear 22 can include the teachings of U.S. Pat. No. 6,948,264 by the applicant, and also U.S. Pat. No. 5,832,636 by Robert Lyden and Souheng Wu, assigned to Nike, Inc., both of these patents hereby being incorporated by reference herein.

Figure 39:
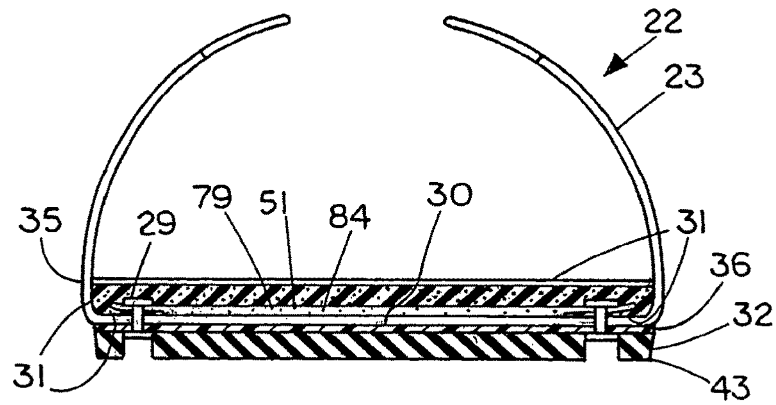
FIG. 39 is a transverse cross-sectional view of an article of footwear showing an insole overlapping the medial side and lateral side of a spring element.

FIG. 39 is a transverse cross-sectional view taken at a position consistent with line 38-38 in FIG. 16 of an alternate article of footwear 22 showing an insole 31 overlapping the superior side 38, medial side 35, lateral side 36, and a portion of the inferior side 38 of a lasting board 79 or spring element 51. The insole 31 can include a stock fit recess 84 for receiving the lasting board 79 or spring element 51. The insole 31 can be affixed by adhesive or overmolded to the lasting board 79 or spring element 51. Alternately, a portion of the insole 31 can be trapped between the inferior side 38 of the lasting board 79 or spring element 51 and the upper 23 when the article of footwear 32 is assembled, as shown in FIG. 39. This configuration can also serve to protect and cushion the edges of the lasting board 79 or spring element 51.

Figure 40:
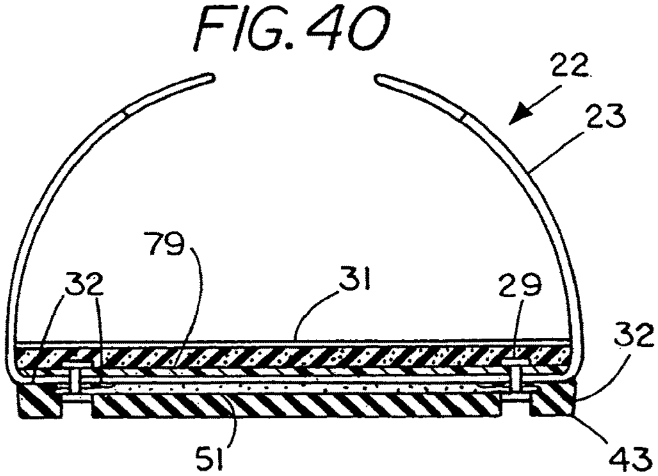
FIG. 40 is a transverse cross-sectional view of an article of footwear showing an portion of the sole overlapping the medial side and lateral side of a spring element.

FIG. 40 is a cross-sectional view taken at a position consistent with line 38-38 in FIG. 16 of an alternate article of footwear 22 showing a portion of the sole 32 or outsole 43 overlapping the inferior side 38, medial side 35, lateral side 36, and a portion to the superior side 37 of a lasting board 79 or spring element 51. This configuration serves to cover and protect the sides of the spring element 51. The spring element 51 and outsole 43 can be affixed to the upper 23 using a separate lasting board 79 positioned within the upper 23 and secured with fasteners 29. Alternately, a backing 30 can be used and take the position of the spring element 51, and the spring element 51 can be used and take the position of the lasting board 79, that is, the spring element 51 can simultaneously serve as the lasting board 79, as previously discussed.

Figure 41:
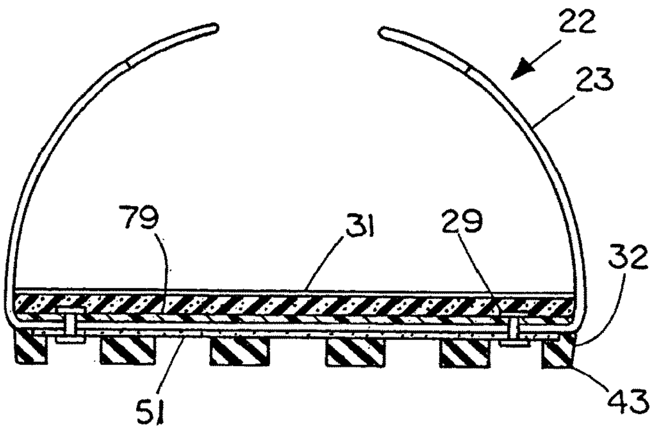
FIG. 41 is a transverse cross-sectional view of an article of footwear showing a separate lasting board and a spring element, and also an upper, insole, and outsole.

FIG. 41 is a transverse cross-sectional view taken at a position consistent with line 38-38 in FIG. 16 of an alternate article of footwear 22 showing a separate lasting board 79 and a spring element 51, and also an upper 23, insole 31, and outsole 43. In this alternate embodiment of an article footwear 22, the outsole 43 can cover, be affixed, bonded, or over-molded to the spring element 51. The spring element 51 can be completely covered by the outsole 43 on the inferior side 38, or alternately, portions of the spring element 51 can be visible and exposed.

Figure 42:
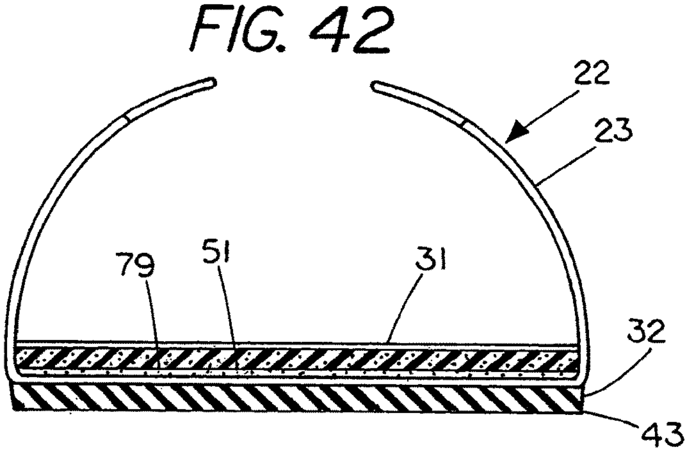
FIG. 42 is a transverse cross-sectional view of an article of footwear showing a sole affixed directly to an upper, and also a spring element.

FIG. 42 is a transverse cross-sectional view taken at a position consistent with line 38-38 in FIG. 16 of an article of footwear 22 showing a sole 32 or outsole 43 that is directly affixed and integral to the upper 23, and also a lasting board 79 or spring element 51, and an insole 31. The upper 23 can be made at least in part of a synthetic textile or leather made of a thermoplastic material, and the sole 32 can be made of the same type of thermoplastic material, or alternately, a different material which can be bonded to the upper 23. For example, a polyurethane material can be used for this purpose. The sole 32 can be affixed or overmolded onto the upper 23 by direct injection method. The direct injection process can be performed upon a substantially finished upper 23 into which a last 80 has been inserted, or upon an unfinished upper 23 which still has a relatively flat configuration and the upper 23 of the article of footwear 22 can then be completed using a three dimensional stitching process.

Figure 43:
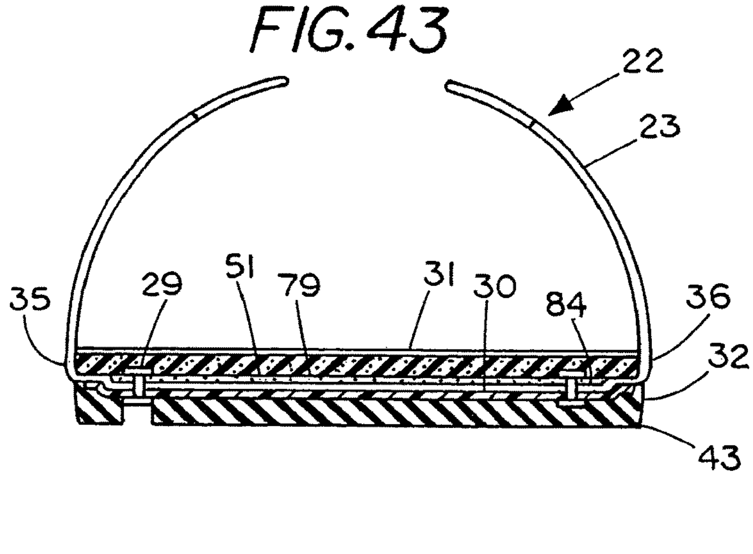
FIG. 43 is a transverse cross-sectional view of an article of footwear showing a sole affixed directly to an upper, and also a spring element located within a recess.

FIG. 43 is a transverse cross-sectional view taken along a position consistent with line 38-38 in FIG. 16 of an alternate article of footwear 22 showing a sole 32 directly affixed to an upper 23, an insole 31, and also a lasting board 79 or spring element 51 located within a recess 84. The contours associated with the recess 84 can provide a mechanical interlock between the upper 23, spring element 51, and backing 30 of the sole 32 or outsole 43. As shown in FIG. 43, the lasting board 79 or spring element 51 does not extend to the perimeter of the upper 23 or sole 32, and this can reduce the stiffness exhibited at the perimeter or edge of the sole 32, as discussed in U.S. Pat. No. 5,921,004 granted to the present inventor, and assigned to Nike, Inc., hereby incorporated by reference herein. It can be advantageous in an article of footwear 22 intended for use in running to extend the lasting board 79 or spring element 51 to the perimeter or edge of the sole 32 in those areas which are shown in dark shading in FIG. 24 of U.S. Pat. No. 5,921,004, but not to the perimeter or edge of the sole 32 in those areas which are not shaded. Accordingly, in the transverse cross-sectional view shown in FIG. 43, it can be advantageous to extend the lasting board 79 or spring element 51 to the perimeter or edge of the sole 32 on the medial side 35, but not on the lateral side 36. The sole 32 can be removably affixed to the upper 23 with the use of fasteners 29, and the like. As shown on the right in FIG. 43, a fastener 29 can include a male part 85 or female part 86 which is affixed within the sole 32, and the corresponding mating part can be inserted and affixed in functional relation from the superior side within the defined space of the upper 23 of an article of footwear 22. Alternately, the sole 32 can be permanently affixed to the upper 23 with the use of adhesives, or overmolded by direct injection process.

Figure 44:
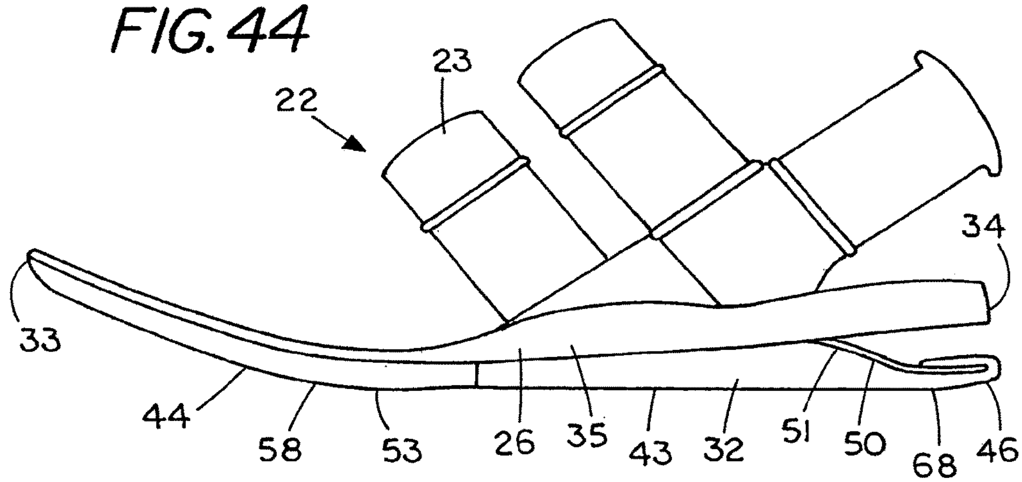
FIG. 44 is a medial side view of a sandal including a spring element.

FIG. 44 is a medial side view of an article of footwear 22 comprising a sandal which includes a spring element 51. Again, a spring element 51 can include an anterior spring element 48, a posterior spring element 49, and an inferior spring element 50 affixed together in functional relation. It can be readily understood that a plurality of different designs and configurations are possible with respect to the upper 23 of a preferred sandal. A sandal according to the present invention can be designed for high fashion, or alternately, for hiking and recreational use, as shown in FIG. 44. Further, the various components of a sandal can be affixed together with adhesive, or alternately, can be selectively and removably replaced with the use of mechanical engagement means including but not limited to fasteners 29, and the like.

The present invention teaches and makes possible not only a novel method of manufacturing articles of footwear, but also, a novel way of doing both retail and Internet business. The configuration and dimensions of a given wearer's foot and any other special needs and requirements or wearer preferences can be recorded by direct observation and measurement in a retail or medical setting, or by a wearer or other individual at their home or other remote site, and this data can be used to generate information and intelligence relating to the manufacture of an appropriate custom article of footwear for the wearer and intended end use. This information and intelligence relating to an individual wearer or target population can include a so-called soft virtual model that is created and maintained in computer software or other data storage and retrieval system for present and future use.

Conventional measuring or reproduction means including but not limited to rulers, measuring tapes, Brannock devices, two or three dimensional scanners, pressure sensors, infrared thermography, stereolithography, paper, photographs, photocopies, cameras, images, tracings, video, verbal communication, telephone, television, FAX, computers and computer screens, software, data storage and retrieval systems, e-mail, lasts, lasting boards, templates, molds, models, and patterns can be used, as well as other tangible mediums of expression, and the like. Some of the data which might be collected could include, but not be limited to an individual's: foot length; foot width at one or more locations; foot girth at one or more locations; arch characteristics such as high arch, normal arch, or low arch; the presence of a varus or valgus condition; bunions; Morton's toe; two dimensional foot shape; three dimensional foot shape; data collected using F-scan equipment and software made by Tekscan, Inc.

of Boston, Mass.; strike index, plantar pressure, and center of pressure data collected using Pedar or Emed equipment made by Novel Electronics, Inc. of St. Paul, Minn.; digital photographs or video images showing superior, inferior, anterior, medial, lateral, and perspective views of an individual's foot; video data collected of an individual while in motion using digital cameras; biomechanical analysis of an individual's motion such as rearfoot motion analysis, and possibly including top, bottom, side, frontal, rear, and perspective view using equipment and software made by manufacturers such as Mikromak GmbH, of Erlangen, Germany, Northern Digital of Waterloo, Ontario, Canada, Motion Analysis of Santa Rosa, Calif., VICON Motion Systems of Lake Forest, Calif., or Peak Performance Technologies, Inc., of Englewood, Colo.; and, the individuals name; mailing and e-mail address; password, phone number; sex; weight; age; training age; walking or running pace; fit preference such as loose, normal, or tight; activity preference; affiliation; sizing system preference such as inches or metric; place of payment such as zip code or city; method of payment such as cash, check, debit card, credit card, and including the relevant account number and expiration date.

Given this collected raw data, information and intelligence can then be created including an individual record which could include a virtual model of an individual's feet. This information and intelligence can be used to select one or more options with respect to a footwear last, or other footwear configuration including length size, width, and girth measurements. Accordingly, this information and intelligence can be used to identify specific categories and footwear models for consideration. If and when working in a computer environment, the various options can be displayed for consideration and selection. This can be done with the use of a wireless computer or cell phone. Further, an individual can then click on various categories or models in order to receive additional technical information and also pricing information. In addition, an individual can then click on various segments or components of a virtual model or article of footwear being presented, and so access more specific menus relating to selections which can be made according to their preference with respect to the structure, function, material, color, and design of a given component. Accordingly, an individual can make a final and confirmed selection.

Given the collected data, the information and intelligence created, and a ready and adequate stock of the various components anticipated for use in making articles of footwear, an individual customer, or alternately, a worker in a retail, medical, manufacturing, or distribution center which possibly includes an automated system including robotics can gather the required components for assembly. An individual can then purchase the required components and assemble the article of footwear themselves. Alternately, the article of footwear can be manufactured or assembled by a worker in a retail, medical, manufacturing, or distribution center. In any case, a custom article of footwear can be manufactured and assembled within thirty minutes, and in some cases even in less than one minute.

For example, selections can be made from a ready stock of different uppers 23, lasting boards 79, spring elements 51 and related sub-component parts, insoles 31, and sole 32 components possibly including midsoles 26, and outsoles 43, having different configurations and dimensions corresponding to a selected article of footwear 22, and the resulting custom article of footwear 22 can be rapidly made or assembled, as desired. If desired, a substantial portion of an article of footwear 22, that is, greater than fifty percent, and preferably greater than seventy-five percent, and most preferably substantially all of the other major components of the article of footwear can be removably assembled and secured in functional relation to the upper 23 to make a custom article of footwear 22 within minutes. Again, this task can be performed by the customer, or a service provider at the point of purchase in a retail setting or medical facility. Accordingly, similar to the rapid delivery eyewear retail stores and service centers that presently exist, a customer can now also be provided with a custom article of footwear within minutes.

In brief, as illustrated in the flow chart shown in FIG. 250, a method of making a custom article of footwear according to the present invention can include the following steps, or their equivalent:

collecting data relating to an individual;

creating from the collected data information and intelligence for making the custom article of footwear for the individual;

providing a plurality of footwear components, and a plurality of variations of a plurality of the footwear components, a plurality of the footwear components including fastening means;

selecting from the plurality of footwear components sufficient footwear components for making the custom article of footwear having an anterior side, a posterior side, a medial side, a lateral side, and including at least an upper, a sole, and cushioning means affixable together in functional relation by the fastening means;

providing said information and intelligence and the sufficient footwear components to a physical location at which the custom article of footwear can be made; and, securing a plurality of the sufficient footwear components in functional relation with the fastening means and completing the assembly for making the custom article of footwear.

As illustrated in the flow chart shown in FIG. 251, a method of making a custom article of footwear by providing sufficient footwear components can include the following steps, or their equivalent:

collecting data relating to an individual;

creating from the collected data information and intelligence for making the custom article of footwear;

providing a plurality of footwear components, and a plurality of variations of a plurality of the footwear components, a plurality of the footwear components including fastening means;

selecting from the plurality of footwear components sufficient footwear components for making the custom article of footwear having an anterior side, a posterior side, a medial side, a lateral side, and including at least an upper, a sole, and cushioning means affixable together in functional relation by the fastening means;

providing the information and intelligence and the sufficient footwear components to a private residence, whereby the sufficient footwear components for making the custom article of footwear are secured in functional relation with the fastening means and the assembly for making the custom article of footwear is completed.

Alternately, if and when an individual's data and final selection is received from a remote site at the Website of a footwear company which practices the present invention, and this information is then possibly transmitted electronically to a manufacturing, assembly center, or distribution center the selected and required components for the customized article of footwear, or a fully assembled article of footwear can be made available or delivered to a customer at their home or other designated address within a selected number of working days, e.g., by mail, will call, courier, FEDEX, UPS, or other like means of delivery. Within the continental United States and many other host countries in which the present invention would be practiced, a customized article of footwear could be caused to be delivered by same day or overnight service, as desired. Accordingly, the present invention teaches a novel method of manufacturing articles of footwear, and also, a novel way of doing both retail and Internet business.

In brief, as illustrated in the flow chart shown in FIG. 252, the present invention teaches a method of making a custom article of footwear by providing at least one removable and replaceable footwear component. In this regard, the present invention teaches a method of making a custom article of footwear having an anterior side, a posterior side, a medial side, a lateral side, and having at least an upper, a sole, and cushioning means affixable together in functional relation including the steps of:

collecting data relating to an individual;

creating from the collected data information and intelligence for providing at least one footwear component for use in making the custom article of footwear;

providing a plurality of footwear components, and a plurality of variations of a plurality of the footwear components, a plurality of the footwear components including fastening means;

selecting from the plurality of footwear components at least one footwear component for making the custom article of footwear;

providing the information and intelligence and the at least one footwear component to a physical location, whereby a plurality of footwear components comprising sufficient footwear components for making the custom article of footwear including the at least one footwear component are secured in functional relation with the fastening means and the assembly for making the custom article of footwear is completed.

In brief, as illustrated in the flow chart shown in FIG. 253, the present invention teaches a method of making a custom article of footwear using a vending device. In particular, the present invention teaches a method of making a custom article of footwear with the use of a vending device, the article of footwear having an anterior side, a posterior side, a medial side, a lateral side, and having at least an upper, a sole, and cushioning means affixable together in functional relation including the steps of:

collecting data relating to an individual;

creating from the collected data information and intelligence for providing at least one footwear component for use in making the custom article of footwear;

providing a plurality of footwear components, and a plurality of variations of a plurality of the footwear components, a plurality of the footwear components including fastening means;

selecting from the plurality of footwear components at least one footwear component for use in making the custom article of footwear;

providing the information and intelligence and the at least one footwear component to a physical location, whereby a plurality of footwear components consisting of sufficient footwear components for making the custom article of footwear including the at least one footwear component are secured in functional relation with the fastening means and the assembly for making the custom article of footwear is completed.

Figure 46:
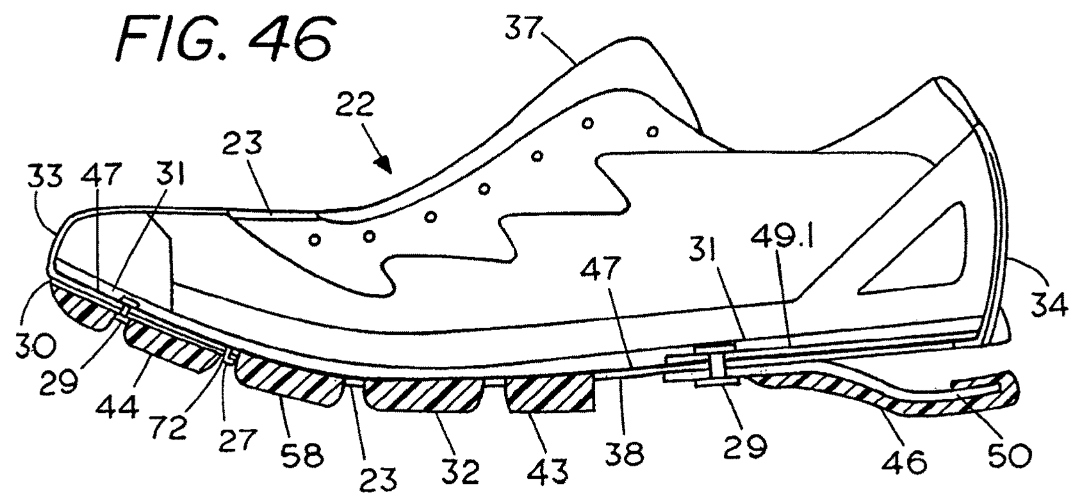
FIG. 46 is a longitudinal cross-sectional medial side view of an alternate article of footwear having outsole portions affixed directly to the superior spring element in the forefoot area, and further including a supplemental posterior spring element in the rearfoot area.
Figure 47:
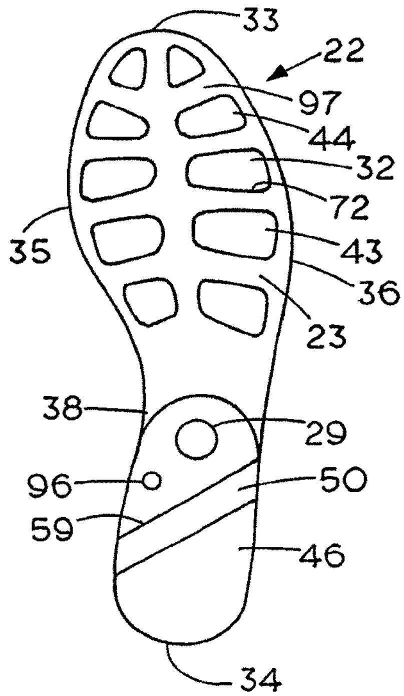
FIG. 47 is a bottom view of the alternate article of footwear shown in FIG. 45 having outsole portions affixed directly to the superior spring element in the forefoot area.

FIG. 45 is a medial cross-sectional side view of an alternate article of footwear 22 having outsole 43 portions affixed directly to the superior spring element 47 in the forefoot area 58 and/or midfoot area 67. Again, the superior spring element 47 can be made of a fiber composite material such as carbon fiber composite or a metal material such as titanium. The outsole 43 portions in the forefoot area 58 and also the midfoot area 67 can be affixed directly to the superior spring element 47 by conventional adhesives, and alternately, by self-adhesive means, or mechanical means. As shown in FIG. 47, the upper 23 includes a plurality of openings 72 for accommodating the outsole 43 portions, thus when the superior spring element 47 including the outsole 43 portions is inserted into the upper 23 the outsole 43 portions pass through the plurality of openings 72 as the superior spring element 47 is placed into proper position. An insole 31 can then be inserted into the upper 23, and the article of footwear 22 can then be donned by a wearer. Alternately, the insole 31 can also be affixed to the superior spring element 47 and inserted into the upper 23 as a single unit. Further, a portion of the anterior side 33 of the superior spring element 47 can be inserted into a sleeve 39 of the upper 23 and thereby be retained in position, as discussed and shown in connection with FIG. 15. Moreover, a part including backing 30, or alternately, an anterior spring element 48.1 including a portion of the outsole 43 can be used near the anterior side 33 of the forefoot area 58, and be affixed with the use of mechanical engagement means including male and female parts, e.g., at least one hook 27 and opening 72, and/or a fastener 29, as shown in FIG. 46. The inferior portion of the upper 23 can be made of a strong and long wearing textile material such as KEVLAR®, or a NYLCO® ballistic multi-ply fabric such as "N-915W" having a protective polyurethane face coating distributed by Worthen Industries, Inc., of 3 East Spit Brook Road, Nashua N.H., and 530 Main Street, Clinton, Mass. These fabric materials can be hand cut, die cut, laser cut, or cut using other conventional means including the possible use of an automatic cutting table.

FIG. 46 is a medial cross-sectional side view of an alternate article of footwear 22 having outsole portions 43 affixed directly to the superior spring element 47 in the forefoot area 58, and further including a supplemental posterior spring element 49.1 in the rearfoot area 68. The addition of a supplemental posterior spring element 49.1 which can be selected from a range of alternate posterior spring elements 49.1 having different thickness or shapes enables the stiffness and mechanical properties of the superior spring element 47 in the rearfoot area 68 to be easily changed and customized. The possible greater relative thickness of the superior spring element 47 in combination with the supplemental posterior spring element 49.1 can be accommodated by stock-fitting it in the inferior portion of the insole 31, and by engineering the approximate thickness into the desired forefoot versus heel elevation differential. Also shown in FIG. 46 is the use of a part including backing 30, or alternately, an anterior spring element 48.1 including a portion of the outsole 43 near the anterior side 33 of the forefoot area 58. When affixed in position the backing 30, or alternately, an anterior spring element 48.1 thereby traps a portion of the upper 23 between the backing 30 or anterior spring element 48.1 and superior spring element 47. The backing 30, or alternately, an anterior spring element 48.1 can be affixed with the use of mechanical engagement means including male and female parts, e.g., at least one hook 27 and opening 72, and/or a fastener 29, as shown in FIG. 46. The fasteners 29 can be visible from the bottom side as shown in the forefoot area 58, or alternately not be visible, as shown in the rearfoot area 68 in FIG. 46.

FIG. 47 is a bottom view of the alternate article of footwear 22 shown in FIG. 45 having outsole 43 portions affixed directly to the superior spring element 47 in the forefoot area 58 and midfoot area 67. As shown in FIG. 47, the outsole 43 portions pass through openings 72 in the inferior side 38 of the upper 23. The portions of the upper 23 about the openings 72 can form relatively narrow links or bridges 97 connecting the opposing sides of the upper 23, thus still substantially maintain the shape, and integrity of upper 23. A wide variety of structures and patterns can be used regarding the bridges 97 formed on the inferior side 38 of the upper 23. Shown in the rearfoot area 68 is inferior spring element 50 including posterior outsole element 46, a single fastener 29, and a locating pin 96. The locating pin 96 can be affixed to the inferior spring element 50, or alternately to the superior spring element 47 or posterior spring element 49 and be configured for passing through corresponding mating openings 72 in the various sub-components of the spring element 51. Further, the fastener 29 can be a loose part, or alternately can be affixed to one of the various sub-components of the spring element 51. Moreover, as shown in FIG. 101, the fastener 29 and/or locating pin 96 can have a round transverse cross-section, but at least one of these components preferably has a more complex geometric shape when viewed in a transverse cross-section, such as square, rectangle, pentagon, octagon, or star shape. Accordingly, the insertion of the fastener 29 and/or locating pin 96 can serve to lock the various sub-components of the spring element 50 into a specific geometric orientation so that they cannot be caused to shift or freely rotate about the axis of the fastener 29 and/or locating pin 96 when the sub-components are properly affixed in place.

Figure 48:
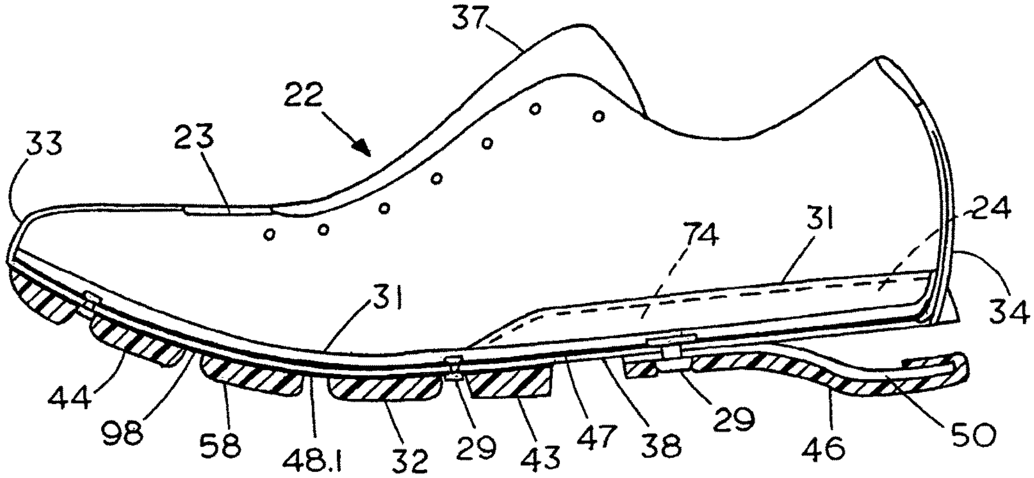
FIG. 48 is a longitudinal cross-sectional medial side view of an alternate article of footwear having outsole portions affixed directly to an anterior spring element in the forefoot area.

FIG. 48 is a medial cross-sectional side view of an alternate article of footwear 22 having outsole 43 portions affixed directly to an anterior spring element 48.1 in the forefoot area 58. Like the embodiment shown in FIG. 16, the superior spring element 47 is affixed to the anterior spring element 48.1 by fasteners 29 thereby trapping and firmly securing an inferior portion of the upper 23 therebetween. However, the use of a single fastener 29 for securing the inferior spring element 50 and numerous gaps 98 between portions of the anterior outsole element 44 are shown in FIG. 48.

FIG. 49 is a medial cross-sectional side view of an alternate article of footwear 22 having outsole 43 portions affixed directly to an anterior spring element 48.2 in the forefoot area 58 which is affixed to an anterior spacer 55.2 and the superior spring element 47. Again, the shape and thickness of an anterior spacer 55.2 in various locations can be varied so as to create a sloped shape, or other complex shapes along the longitudinal axis 69 or transverse axis 91 of the article of footwear 22. This can determine the relative position of the fulcrum created by the anterior spacer 55.2, but also the angular inclination, magnitude of deflection, and exhibited stiffness of the anterior spring element 48.2. As shown in FIG. 235, the inferior spring element 50 has a flexural axis 59 which is generally transverse to the longitudinal axis 69. Alternately, an inferior spring element 50 having a flexural axis 59 that is diagonal with respect to the longitudinal axis 69 could be used. In addition, as shown in FIG. 100, a midsole element 26 including a fluid-filled bladder can be employed in the space between the anterior spring element 48.2 and the inferior portion of the upper 23. When a gas-filled bladder is used, the gas contained within the bladder can be at ambient atmospheric pressure, or alternately, be pressurized above atmospheric pressure.

Figure 50:
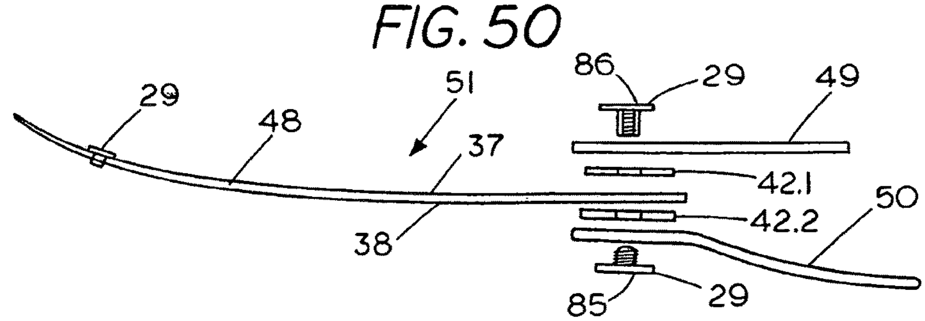
FIG. 50 is an exploded side view of a spring element including a superior spring element having an anterior spring element and a posterior spring element, superior and inferior posterior spacers, a fastener, and an inferior spring element.

FIG. 50 is an exploded side view of a spring element 51 including a superior spring element 47 having an anterior spring element 48 and a posterior spring element 49, superior posterior spacer 42.1, and inferior posterior spacer 42.2, a fastener 29 including male and female portions, and an inferior spring element 50. The spacers 42.1 and 42.2 can be made in varying thickness and configurations and can be used to change the geometry and configuration of a spring element 51, as desired. Further, the spacers 42.1 and 42.2 can include gripping surfaces for firmly locking the components of a spring element 51 in position when affixed by a fastener 29. Also shown is a fastener 29 affixed in position on the anterior spring element 48 and projecting beyond the inferior surface thereof. Accordingly, the inferior portion of this fastener 29 can be approximately flush, or alternately, can slightly protrude beyond the inferior portion of the upper 23 when the anterior spring element 48 is inserted in position. As shown, the posterior spring element 49 is positioned superior with respect to the anterior spring element 48 which in turn is positioned superior with respect to the inferior spring element 50.

Figure 51:
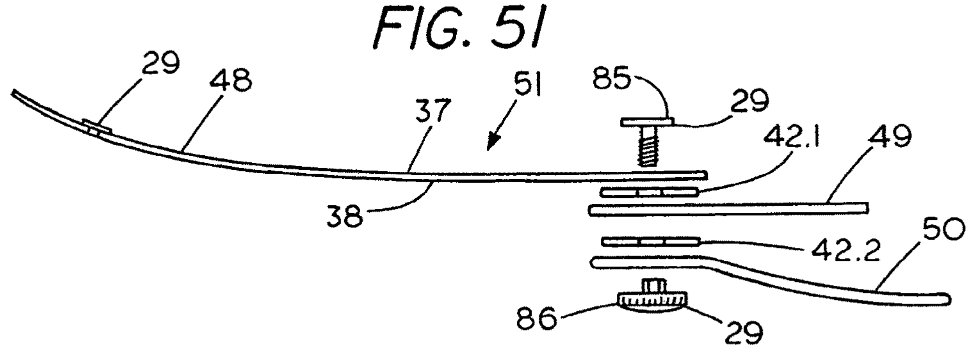
FIG. 51 is an exploded side view of a spring element including a superior spring element having an anterior spring element and a posterior spring element, superior and inferior posterior spacers, a fastener, and an inferior spring element.

FIG. 51 is an exploded side view of a spring element 51 including a superior spring element 47 having an anterior spring element 48 and a posterior spring element 49, superior posterior spacer 42.1, and inferior posterior spacer 42.2, a fastener 29 including male and female portions, and an inferior spring element 50. The spacers 42.1 and 42.2 can be made in varying thickness and configurations and can be used to change the geometry and configuration of a spring element 51, as desired. Further, the spacers 42.1 and 42.2 can include gripping surfaces for firmly locking the components of a spring element 51 in position when affixed by a fastener 29. Also shown is a fastener 29 affixed in position on the anterior spring element 48 that is flush with the inferior surface thereof. As shown, the anterior spring element 48 is positioned superior with respect to the posterior spring element 49 which in turn is positioned superior with respect to the inferior spring element 50.

Figure 52:
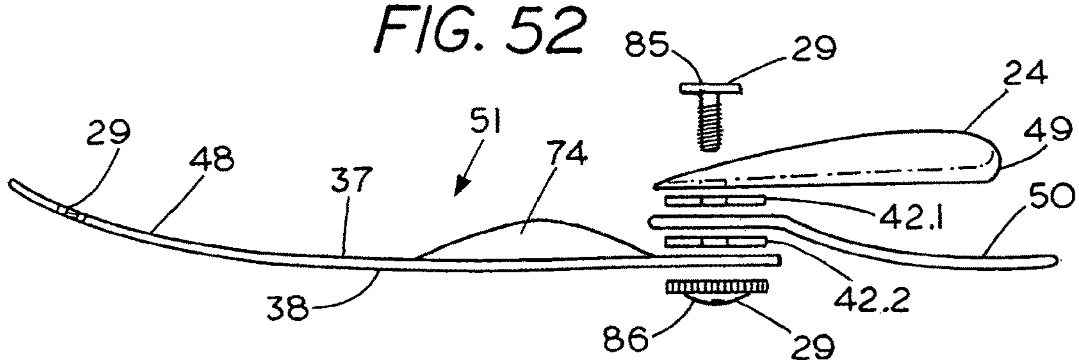
FIG. 52 is an exploded side view of a spring element including a superior spring element having an anterior spring element including a side support, a posterior spring element including a heel counter, superior and inferior posterior spacers, a fastener, and an inferior spring element.

FIG. 52 is an exploded side view of a spring element 51 including a superior spring element 47 having an anterior spring element 48 and a posterior spring element 49, superior posterior spacer 42.1, and inferior posterior spacer 42.2, a fastener 29 including male and female portions, and an inferior spring element 50. The spacers 42.1 and 42.2 can be made in varying thickness and configurations and can be used to change the geometry and configuration of a spring element 51, as desired. Further, the spacers 42.1 and 42.2 can include gripping surfaces for firmly locking the components of a spring element 51 in position when affixed by a fastener 29. Also shown is a fastener 29 affixed in position on the anterior spring element 48 that is flush with the inferior surface thereof. As shown, the posterior spring element 49 is positioned superior with respect to the inferior spring element 50 which in turn is positioned superior with respect to the anterior spring element 48. Further, the posterior spring element 49 includes a heel counter 24, and the anterior spring element 48 can include a side support 74 on the medial side 35 and/or the lateral side 36.

Figure 53:
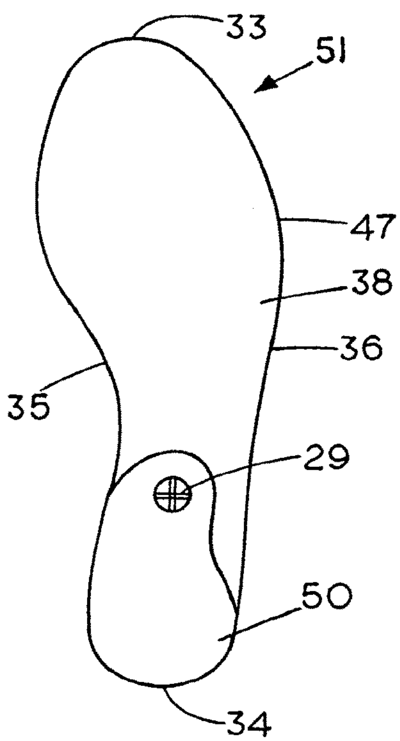
FIG. 53 is a bottom plan view of a spring element for use in an article of footwear having a superior spring element and an inferior spring element having an asymmetrical shape.

FIG. 53 is a bottom plan view of a spring element 51 for use in an article of footwear 22 having a superior spring element 47 and an inferior spring element 50 having an asymmetrical shape. The inferior spring element 50 has a more complex shape and diminished area on the lateral side 36 relative to the medial side 35, and can thereby exhibit less flexural modulus or stiffness in bending on the lateral side 36.

Figure 54:
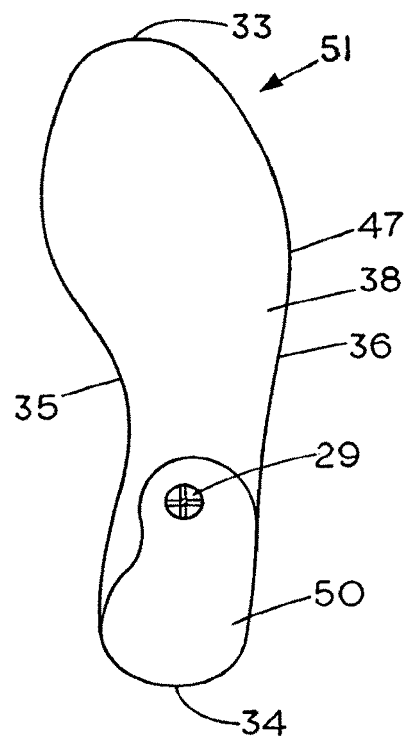
FIG. 54 is a bottom plan view of a spring element for use in an article of footwear having a superior spring element and an inferior spring element having an asymmetrical shape.

FIG. 54 is a bottom plan view of a spring element 51 for use in an article of footwear 22 having a superior spring element 47 and an inferior spring element 50 having an asymmetrical shape. The inferior spring element 50 has a more complex shape and diminished area on the medial side 35 relative to the lateral side 36, and can thereby exhibit less flexural modulus or stiffness in bending on the medial side 35.

Figure 55:
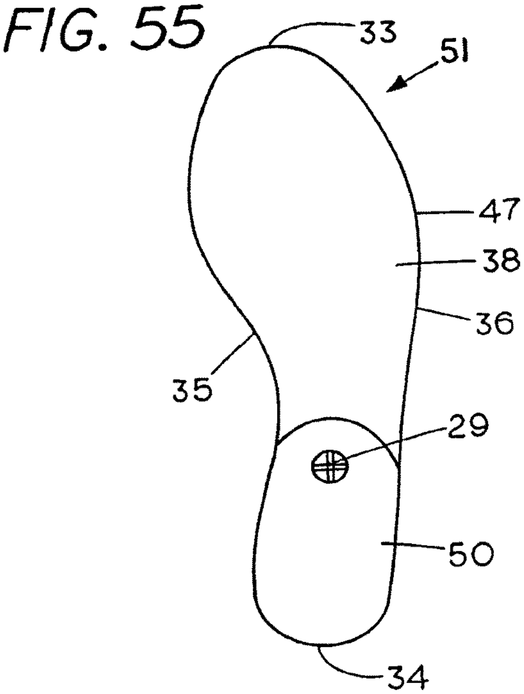
FIG. 55 is a bottom plan view of a spring element for use in an article of footwear having a superior spring element and an inferior spring element having a symmetric al shape.

FIG. 55 is a bottom plan view of a spring element 51 for use in an article of footwear 22 having a superior spring element 47 and an inferior spring element 50 having a symmetrical shape. The inferior spring element 50 is affixed to the superior spring element 47 by a single fastener 29 that can be quickly and easily affixed by a wearer in order to service, renew or customize the spring element 51 and associated article of footwear.

Figure 56:
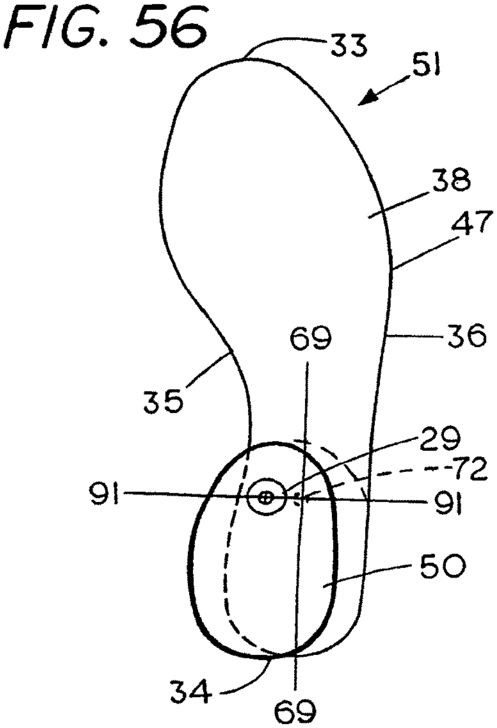
FIG. 56 is a bottom plan view of a spring element for use in an article of footwear having a superior spring element and an inferior spring element having a symmetrical shape and showing an alternate mounting position.

FIG. 56 is a bottom plan view of a spring element 51 for use in an article of footwear 22 having a superior spring element 47 and an inferior spring element 50 having a symmetrical shape and showing an alternate medial mounting position. The superior spring element 47 can include several alternate openings 72 at different positions along the same transverse axis 91 for accommodating the fastener 29. The same inferior spring element 50 can be affixed in several alternate positions, or alternately, various inferior spring elements 50 having a different configurations, such as inferior spring elements having greater width along the transverse axis 91, can be affixed into position. Accordingly, the configuration and mechanical properties of the spring element 51 can be readily adapted in order to customize exhibited performance for an individual wearer. The configuration shown in FIG. 56 can decrease the effective lever arm present at the lateral posterior corner of the inferior spring element 50.

Figure 57:
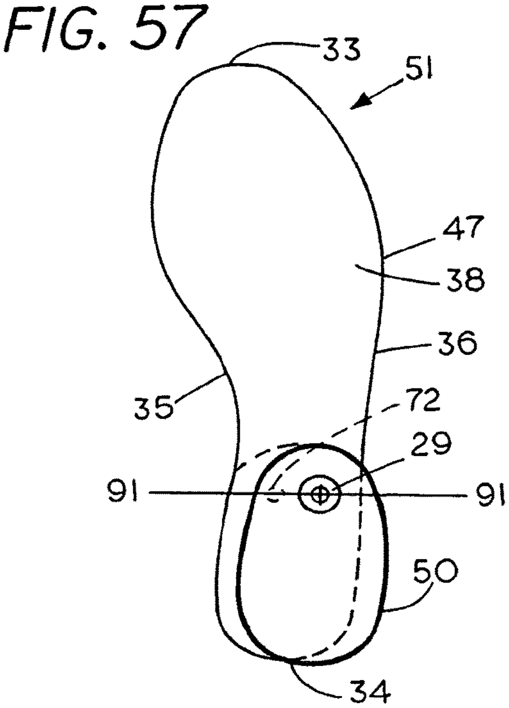
FIG. 57 is a bottom plan view of a spring element for use in an article of footwear having a superior spring element and an inferior spring element having a symmetrical shape and showing an alternate mounting position.

FIG. 57 is a bottom plan view of a spring element 51 for use in an article of footwear 22 having a superior spring element 47 and an inferior spring element 50 having a symmetrical shape and showing an alternate lateral mounting position. The superior spring element 47 can include several alternate openings 72 at different positions along the same transverse axis 91 for accommodating the fastener 29. The same inferior spring element 50 can be affixed in several alternate positions, or alternately, various inferior spring elements 50 having a different configurations, such as inferior spring elements having greater width along the transverse axis 91, can be affixed into position. Accordingly, the configuration and mechanical properties of the spring element 51 can be readily adapted in order to customize performance for an individual wearer. The configuration shown in FIG. 57 can increase the effective lever arm present at the lateral posterior corner of the inferior spring element 50.

Figure 58:
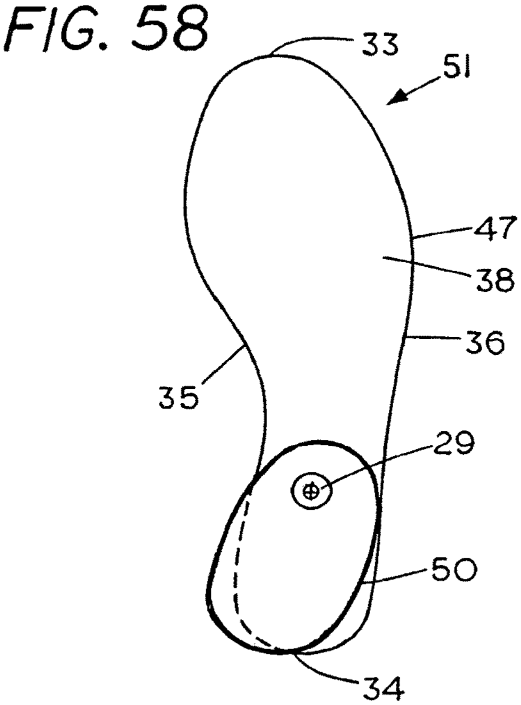
FIG. 58 is a bottom plan view of a spring element for use in an article of footwear having a superior spring element and an inferior spring element having a symmetrical shape and showing an alternate mounting angle.

FIG. 58 is a bottom plan view of a spring element 51 for use in an article of footwear 22 having a superior spring element 47 and an inferior spring element 50 having a symmetrical shape and showing an alternate mounting angle. The fastener 29 and any openings 72 therefore in the spring element 51 can have complex geometric shapes such as pentagon, hexagon, octagon, or star shape, or alternately, the fastener 29 and spring element 51 can include mating male and female surfaces which permit them to engage one another at various angular increments. Accordingly, the configuration and mechanical properties of the spring element 51 can be readily adapted in order to customize performance for an individual wearer. As shown in FIG. 58, the inferior spring element 50 is directed towards the medial side 35, and this will tend to decrease the effective lever arm present at the lateral posterior corner of the inferior spring element 50.

Figure 59:
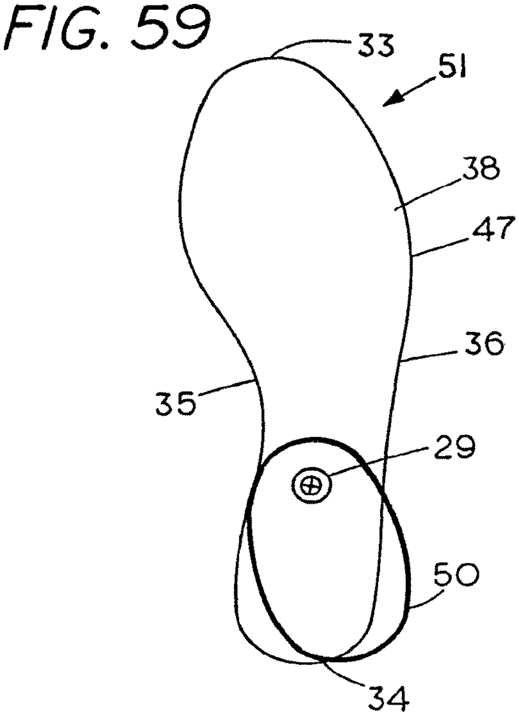
FIG. 59 is a bottom plan view of a spring element for use in an article of footwear having a superior spring element and an inferior spring element having a symmetrical shape and showing an alternate mounting angle.

FIG. 59 is a bottom plan view of a spring element 51 for use in an article of footwear 22 having a superior spring element 47 and an inferior spring element 50 having a symmetrical shape and showing an alternate mounting angle. The fastener 29 and any openings 72 therefore in the spring element 51 can have complex geometric shapes such as pentagon, hexagon, octagon, or star shape, or alternately, the fastener 29 and spring element 51 can include mating male and female surfaces which permit them to engage one another at various selected angular increments. Accordingly, the configuration and mechanical properties of the spring element 51 can be readily adapted in order to customize performance for an individual wearer. As shown in FIG. 59, the inferior spring element 50 is directed towards the lateral side 36, and this will tend to increase the effective lever arm present at the lateral posterior corner of the inferior spring element 50.

Figure 60:
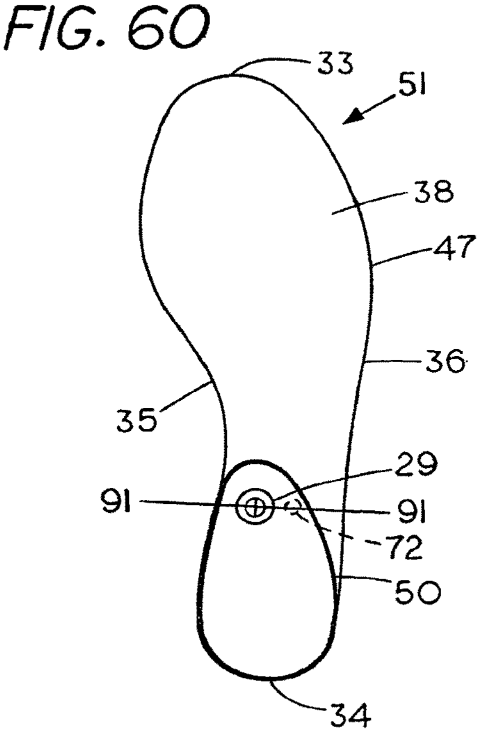
FIG. 60 is a bottom plan view of a spring element for use in an article of footwear having a superior spring element and an inferior spring element having a symmetrical shape and showing an alternate medial mounting position.

FIG. 60 is a bottom plan view of a spring element 51 for use in an article of footwear 22 having a superior spring element 47 and an inferior spring element 50 having a symmetrical shape and showing an alternate medial mounting position. The inferior spring element 50 can be affixed at one of several alternate positions along the same transverse axis 91, and also be affixed at various selected angular increments.

Figure 61:
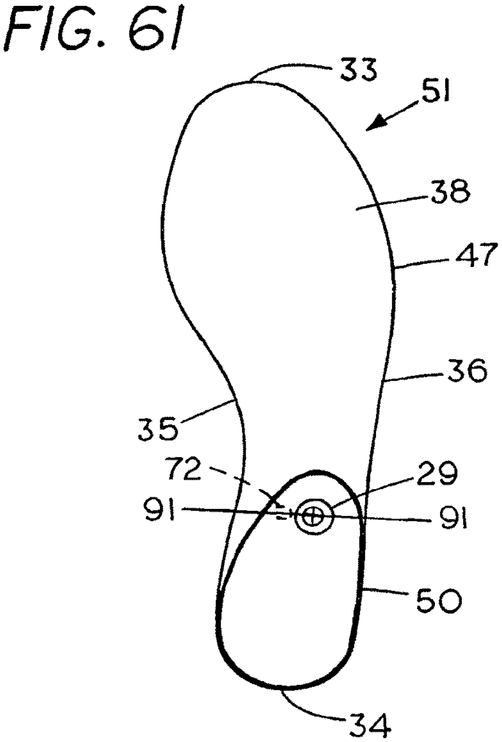
FIG. 61 is a bottom plan view of a spring element for use in an article of footwear having a superior spring element and an inferior spring element having a symmetrical shape and showing an alternate lateral mounting position.

FIG. 61 is a bottom plan view of a spring element 51 for use in an article of footwear 22 having a superior spring element 47 and an inferior spring element 50 having a symmetrical shape and showing an alternate lateral mounting position. The inferior spring element 50 can be affixed at one of several alternate positions along the same transverse axis 91, and also be affixed at various selected angular increments.

Figure 62:
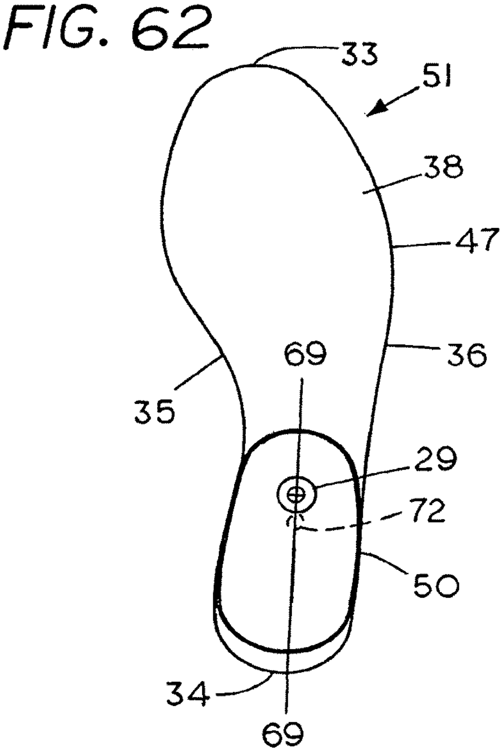
FIG. 62 is a bottom plan view of a spring element for use in an article of footwear having a superior spring element and an inferior spring element having a symmetrical shape and showing an alternate more anterior mounting position.

FIG. 62 is a bottom plan view of a spring element 51 for use in an article of footwear 22 having a superior spring element 47 and an inferior spring element 50 having a symmetrical shape, and showing an alternate more anterior mounting position. The superior spring element 47 can include several alternate openings 72 and positions along the same longitudinal axis 69 for affixing the inferior spring element 50 thereto. This can permit a given superior spring element 47 and inferior spring element 50 to be used with several different size length articles of footwear, and can also be used to customize the configuration and performance of the spring element 51. Generally, the configuration shown in FIG. 62 will tend to decrease the effective lever arm present at the lateral posterior corner of the inferior spring element 50.

Figure 63:
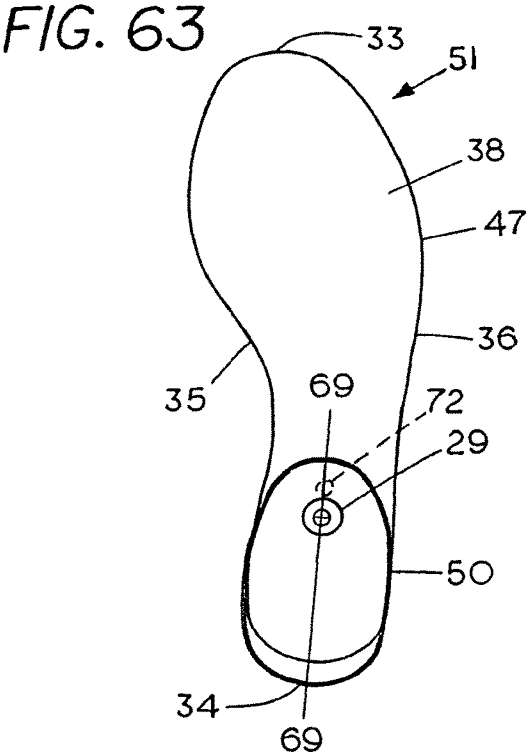
FIG. 63 is a bottom plan view of a spring element for use in an article of footwear having a superior spring element and an inferior spring element having a symmetrical shape and showing an alternate more posterior mounting position.

FIG. 63 is a bottom plan view of a spring element 51 for use in an article of footwear 22 having a superior spring element 47 and an inferior spring element 50 having a symmetrical shape and showing an alternate more posterior mounting position. The superior spring element 47 can include several alternate openings 72 and positions along the same longitudinal axis 69 for affixing the inferior spring element 50 thereto. This can permit a given superior spring element 47 and inferior spring element 50 to be used with several different size length articles of footwear, and can also be used to customize the configuration and performance of the spring element 51. Generally, the configuration shown in FIG. 63 will tend to increase the effective lever arm present at the lateral posterior corner of the inferior spring element 50.

Figure 64:
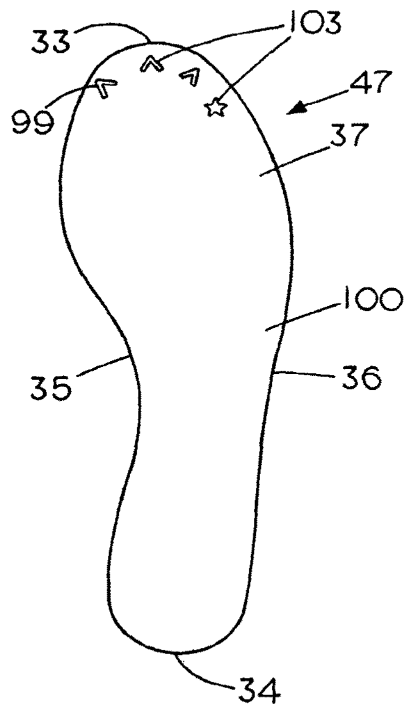
FIG. 64 is a top plan view of a superior spring element having a surface including affixing means.

FIG. 64 is a top plan view of a superior spring element 47 having a surface including affixing means. The superior spring element 47 can include a surface having texture, roughness, or protuberances 99 for enhancing or effecting a mechanical bond. Further, the superior spring element 47 can include a tactified or adhesive surface 100. In this regard, a self-adhesive surface which can be exposed by removal of a peel-ply layer 149 can be used. It can be readily understood that a surface including affixing means can be used with any or all sub-components of a spring element 51, and also the upper 23 of an article of footwear 22.

Figure 65:
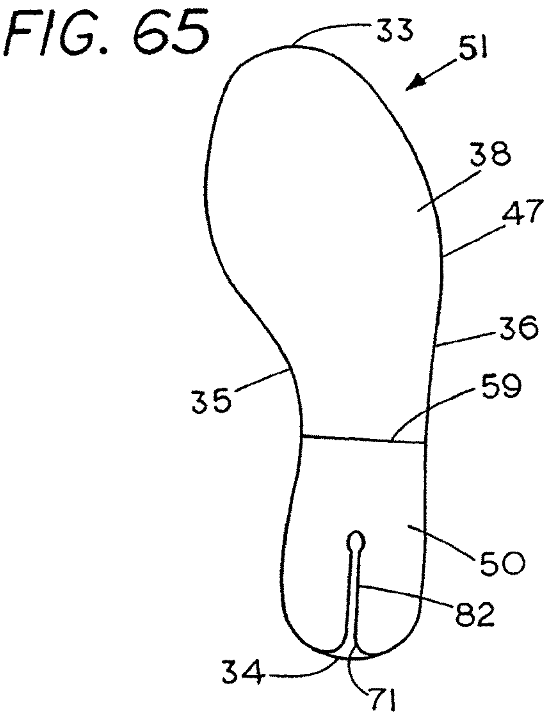
FIG. 65 is a bottom plan view of a spring element including a superior spring element and an inferior spring element having a notch and slit.

FIG. 65 is a bottom plan view of a spring element including a superior spring element 47 and an inferior spring element 50 having a notch 71 and a longitudinal slit 82. As shown, the longitudinal slit 82 partially bisects the inferior spring element 50. When an article of footwear 22 including the inferior spring element 50 is loaded near the lateral posterior corner the stiffness in bending is reduced relative to an otherwise similar inferior spring element 50 which does not include the longitudinal slit 82. As a result, the rate and magnitude of rearfoot pronation experienced by a wearer of an associated article of footwear 22 can be reduced.

Figure 66:
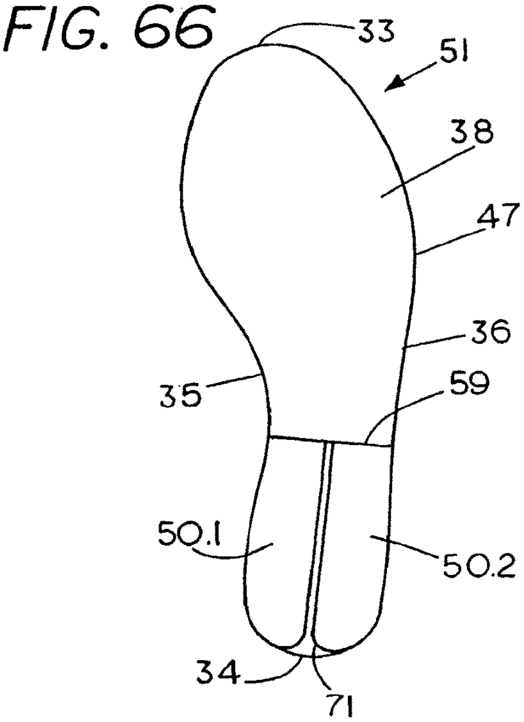
FIG. 66 is a bottom plan view of a spring element including a superior spring element and an inferior spring element consisting of two separate portions.

FIG. 66 is a bottom plan view of a spring element 51 including a superior spring element 47 and an inferior spring element consisting of two separate portions 50.1 and 50.2. The configuration and physical properties of each portion 50.1 and 50.2 can thereby be individually varied and customized for optimal performance.

Figure 67:
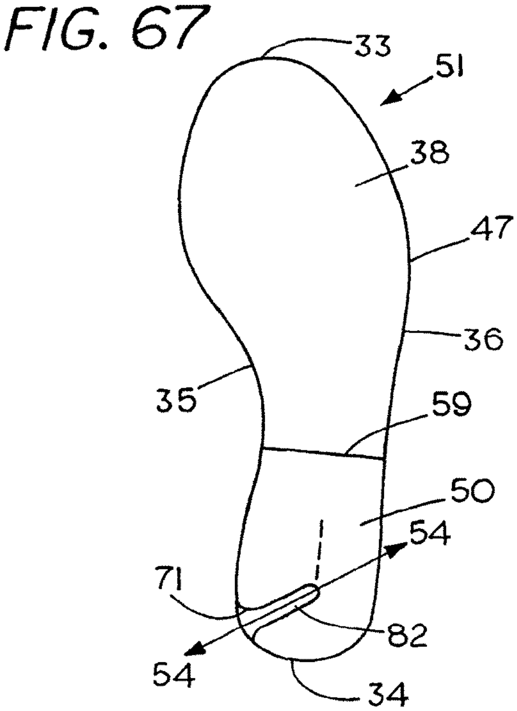
FIG. 67 is a bottom plan view of a spring element including a superior spring element and an inferior spring element having a notch and slit.

FIG. 67 is a bottom plan view of a spring element 51 including a superior spring element 47 and an inferior spring element 50 having a notch 71 and diagonal slit 82 that starting on the medial side 35 partially traverses the inferior spring element 50. The diagonal slit 82 creates a line of flexion 54 that reduces the flexural modulus or stiffness in bending exhibited by the inferior spring element 50 at the lateral posterior corner. As a result, the rate and magnitude of rearfoot pronation experienced by a wearer of an associated article of footwear 22 can be reduced.

Figure 68:
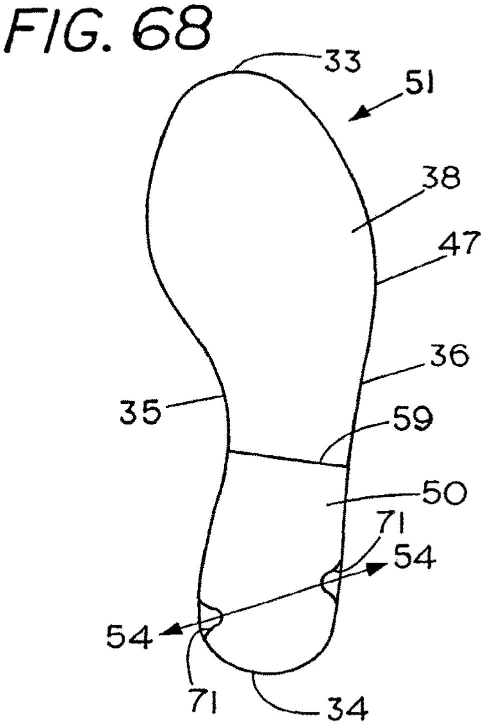
FIG. 68 is a bottom plan view of a spring element including a superior spring element and an inferior spring element having two notches.

FIG. 68 is a bottom plan view of a spring element 51 including a superior spring element 47 and an inferior spring element 50 having two notches 71. The two notches 71 approximately oppose one another forming a line of flexion 54 that is diagonal with respect to the longitudinal axis 69 of the inferior spring element 50. The diagonal line of flexion 54 reduces the flexural modulus or stiffness in bending exhibited by the inferior spring element 50 at the lateral posterior corner. As a result, the rate and magnitude of rearfoot pronation experienced by a wearer of an associated article of footwear 22 can be reduced.

Figure 69:
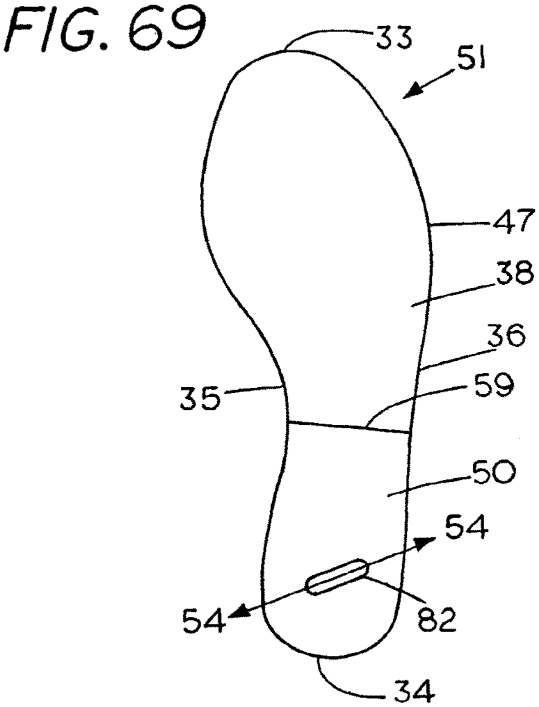
FIG. 69 is a bottom plan view of a spring element including a superior spring element and an inferior spring element having a slit.

FIG. 69 is a bottom plan view of a spring element 51 including a superior spring element 47 and an inferior spring element 50 having a slit 82. The slit 82 forms a line of flexion 54 that is diagonal with respect to the longitudinal axis 69 of the inferior spring element 50. The diagonal line of flexion 54 reduces the flexural modulus or stiffness in bending exhibited by the inferior spring element 50 at the lateral posterior corner. As a result, the rate and magnitude of rearfoot pronation experienced by a wearer of an associated article of footwear 22 can be reduced.

Figure 70:
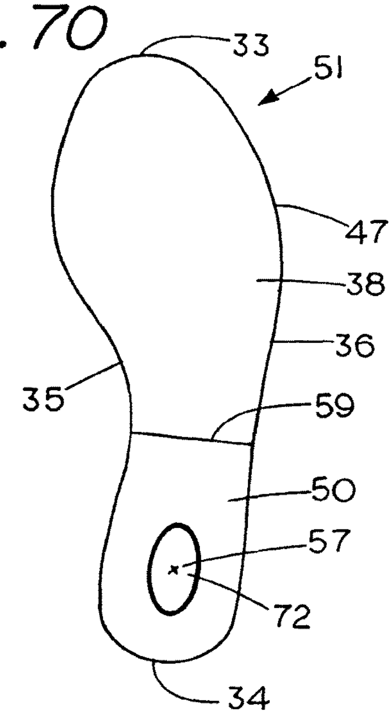
FIG. 70 is a bottom plan view of a spring element including a superior spring element and an inferior spring element having an opening.

FIG. 70 is a bottom plan view of a spring element 51 including a superior spring element 47 and an inferior spring element 50 having an opening 72. The opening 72 can be circular or oval shaped and is centrally positioned under the weight bearing center of a wearer's heel 57. The presence of opening 72 will decrease the flexural modulus or stiffness in bending and including the exhibited torsional stiffness exhibited by the inferior spring element 50. As a result, the rate and magnitude of rearfoot pronation experienced by a wearer of an associated article of footwear 22 can be reduced.

Figure 71:
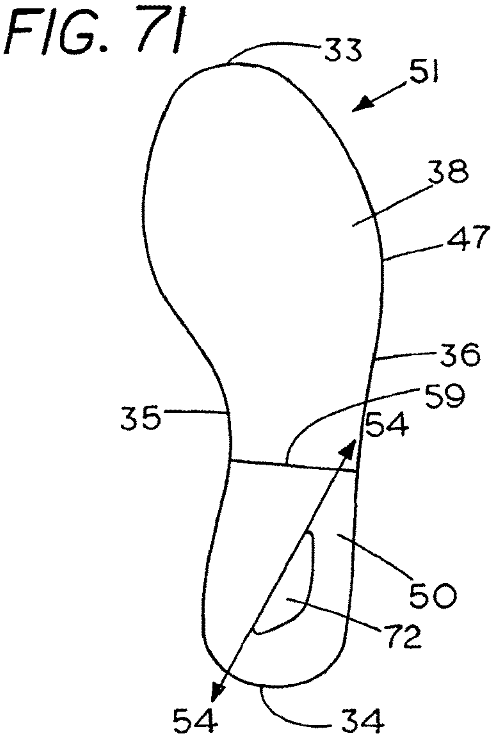
FIG. 71 is a bottom plan view of a spring element including a superior spring element and an inferior spring element having an opening.

FIG. 71 is a bottom plan view of a spring element 51 including a superior spring element 47 and an inferior spring element 50 having an opening 72. The opening 72 is asymmetrical and elongated such as to reduce the flexural modulus or stiffness in bending, and including the torsional stiffness exhibited by the inferior spring element 50 on the lateral side 36 of the line of flexion 54 created thereby. As a result, the rate and magnitude of rearfoot pronation experienced by a wearer of an associated article of footwear 22 can be reduced.

Figure 72:
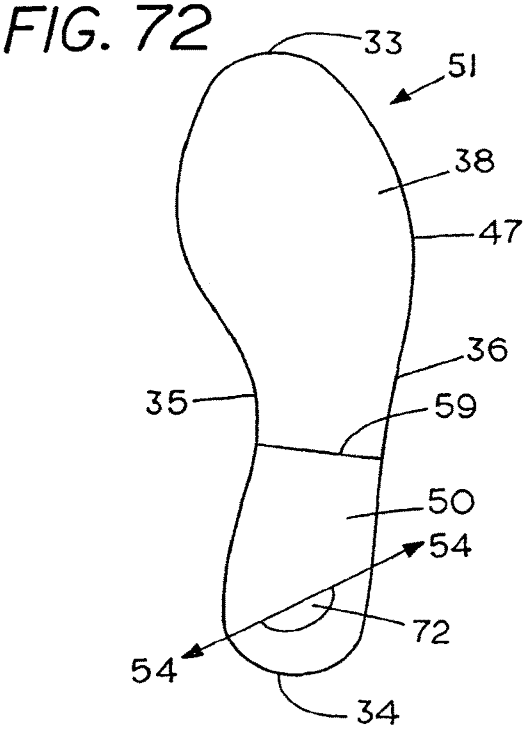
FIG. 72 is a bottom plan view of a spring element including a superior spring element and an inferior spring element having an opening.

FIG. 72 is a bottom plan view of a spring element 51 including a superior spring element 47 and an inferior spring element 50 having an opening 72. The opening 72 is asymmetrical and elongated such as to reduce the flexural modulus or stiffness in bending, and including the torsional stiffness exhibited by the inferior spring element 50 on the lateral side 36 of the line of flexion 54 created thereby. As a result, the rate and magnitude of rearfoot pronation experienced by a wearer of an associated article of footwear 22 can be reduced.

Figure 73:
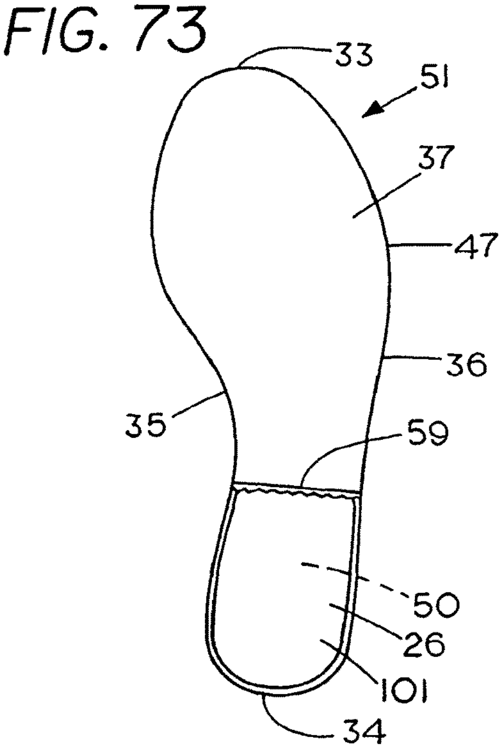
FIG. 73 is a top plan view of a spring element including a superior spring element with parts broken away posterior of the flexural axis in order to reveal a midsole cushioning element and an inferior spring element.

FIG. 73 is a top plan view of a spring element 51 including a superior spring element 47 with parts broken away posterior of the flexural axis 59 in order to reveal a midsole 26 cushioning element and an inferior spring element 50. The midsole 26 cushioning element can include or substantially consist of a fluid-filled bladder 101. It can be readily understood that a fluid-filled bladder 101 can contain a gas, liquid, or viscous material pressurized at ambient atmospheric pressure, or alternately, above atmospheric pressure. Published examples of fluid-filled bladders for possible use in articles of footwear include, but are not limited to: U.S. Pat. Nos. 5,930,918 and 5,363,570 assigned to Converse, Inc.; U.S. Pat. Nos. 5,704,137, 5,191,727, 5,097,607, and 4,934,072 assigned to Brooks Sports, Inc.; U.S. Pat. Nos. 5,718,063, 5,493,792, 5,155,927, and 4,768,295 assigned to Asics Corporation; U.S. Pat. Nos. 5,197,206, 5,197,207, and 5,201,125 assigned to Puma AG. Rudolf Dassler Sport; U.S. Pat. No. 5,598,645 assigned to Adidas International B.V.; U.S. Pat. Nos. 5,369,896, and 6,041,521 assigned to Fila Holdings SpA.; U.S. Pat. Nos. 4,217,705, 4,370,754, 4,441,211, 4,453,271, 4,486,901, 4,513,449, 4,874,640, and 5,235,715 granted to Byron Donzis; U.S. Pat. Nos. 4,926,503, 4,985,931, 5,029,341, 5,035,009, and 5,036,761 granted to J. C. Wingo; U.S. Pat. Nos. 5,572,804, 5,976,451, 6,029,962, and 6,098,313 granted to Joseph Skaja and/or Martyn Shorten; U.S. Pat. Nos. 4,183,156, 4,219,945, 4,271,606, 4,287,250, 4,340,626, 4,906,502, 4,936,029, 5,042,176, 5,083,361, and 5,543,194 granted to Marion F. Rudy; U.S. Pat. No. 6,161,240 granted to Ing-Jing Huang, and, U.S. Pat. Nos. 4,817,304, 5,406,719, 5,592,706, 5,425,184, 5,595,004, 5,625,964, 5,755,001, 5,802,739, 5,833,630, 5,979,078, 5,987,780, 5,993,585, 6,013,340, 6,020,055, 6,055,746, 6,082,025, 6,119,371, 6,127,026, 6,161,240, 6,258,421 B1, 6,321,465 B1, 6,430,843 B1, EP 0752216 A3, WO 01/70060 A2, WO 01/70061 A2, WO 01/70062 A2, WO 01/70063 A2, WO 01/70064 A2, and, WO 01/78539 A2, which are assigned to Nike, Inc, all of the recited patents and patent applications in this paragraph hereby being incorporated by reference herein. In particular, fluid-filled bladders including valves that can provide a motion control device such as taught in the above recited patent application WO 01/70061 A2, and fluid-filled bladders comprising a dynamically-controlled cushioning system, as taught in the above recited patent application WO 01/78539 A2, can be used. In the latter case, an article of footwear can include at least one fluid-filled bladder including a plurality of chambers, a control system possibly including a CPU, a pressure detector, and a regulator for modulating the level of fluid communication between different fluid-filled bladders or chambers. It can be readily understood that the fluid-filled bladders taught in the recited patents and patent applications, and the like, could be used in combination with a spring element 51, e.g., various alternate embodiments shown in FIGS. 73-82, 96-100, and 115-117.

Alternately, a midsole 26 cushioning element can also be made of a foam rubber or plastic material such as polyurethane or ethylene vinyl acetate. In addition, the midsole 26 can simultaneously comprise a posterior spacer 42. As shown in FIG. 73, a midsole 26 cushioning element can occupy substantially the entire space, area, and volume between the superior spring element 47 and the inferior spring element 50 posterior of the flexural axis 59. Alternately, a midsole 26 cushioning element can occupy a portion of the space, area, and volume between a superior spring element 47 and inferior spring element 50, as shown, e.g., in FIGS. 74-82, 96-98, 118-120, and the like.

FIG. 74 is a top plan view of a spring element 51 including a superior spring element 47 with parts broken away posterior of the flexural axis 59 in order to reveal a midsole 26 cushioning element and an inferior spring element 50. The midsole 26 cushioning element can be made of a fluid-filled bladder 101. It can be readily understood that a fluid-filled bladder 101 can contain a gas, liquid, or viscous material pressurized at ambient atmospheric pressure, or alternately, above atmospheric pressure. Alternately, the midsole 26 cushioning element can be made of a foam rubber or plastic material such as polyurethane or ethylene vinyl acetate. In addition, the midsole 26 can simultaneously comprise a posterior spacer 42. The termination of the midsole 26 at the relatively linear line of flexion 54 which is diagonal with respect to the longitudinal axis 69 creates an additional fulcrum associated with bending of the inferior spring element 50. As shown in FIG. 74, the midsole 26 encompasses substantially the entire space, area, and volume between the superior spring element 47 and the inferior spring element 50 posterior of the flexural axis 59 and anterior of the line of flexion 54. The flexural modulus or stiffness in bending, and including the torsional stiffness exhibited by the inferior spring element 50 on the lateral side 36 and posterior of the line of flexion 54 can thereby be decreased. As a result, the rate and magnitude of rearfoot pronation experienced by a wearer of an associated article of footwear 22 can be reduced.

FIG. 75 is a top plan view of a spring element 51 including a superior spring element 47 with parts broken away posterior of the flexural axis 59 in order to reveal a midsole 26 cushioning element and an inferior spring element 50. The midsole 26 cushioning element can be made of a fluid-filled bladder 101. It can be readily understood that a fluid-filled bladder 101 can contain a gas, liquid, or viscous material pressurized at ambient atmospheric pressure, or alternately, above atmospheric pressure. Alternately, the midsole 26 cushioning element can be made of a foam rubber or plastic material such as polyurethane or ethylene vinyl acetate. In addition, the midsole 26 can simultaneously comprise a posterior spacer 42. The termination of the midsole 26 at the arcuate line of flexion 54 creates an additional fulcrum associated with bending of the inferior spring element 50. As shown in FIG. 74, the midsole 26 encompasses substantially the entire space, area, and volume between the superior spring element 47 and the inferior spring element 50 posterior of the flexural axis 59 and anterior of the arcuate line of flexion 54. The flexural modulus or stiffness in bending, and including the torsional stiffness exhibited by the inferior spring element 50 on the lateral side 36 and posterior of the line of flexion 54 can thereby be decreased. As a result, the rate and magnitude of rearfoot pronation experienced by a wearer of an associated article of footwear 22 can be reduced.

FIG. 76 is a top plan view of a spring element 51 including a superior spring element 47 with parts broken away posterior of the flexural axis 59 in order to reveal a midsole 26 cushioning element and an inferior spring element 50. The midsole 26 cushioning element can be made of a fluid-filled bladder 101. It can be readily understood that a fluid-filled bladder 101 can contain a gas, liquid, or viscous material pressurized at ambient atmospheric pressure, or alternately, above atmospheric pressure. Alternately, the midsole 26 cushioning element can be made of a foam rubber or plastic material such as polyurethane or ethylene vinyl acetate. In addition, the midsole 26 can simultaneously comprise a posterior spacer 42. The termination of the midsole 26 at the arcuate line of flexion 54 creates an additional fulcrum associated with bending of the inferior spring element 50. As shown in FIG. 74, the midsole 26 encompasses substantially the entire space, area, and volume between the superior spring element 47 and the inferior spring element 50 posterior of the flexural axis 59 and anterior of the arcuate line of flexion 54. The flexural modulus or stiffness in bending, and including the torsional stiffness exhibited by the inferior spring element 50 on the lateral side 36 and posterior of the line of flexion 54 can thereby be decreased. As a result, the rate and magnitude of rearfoot pronation experienced by a wearer of an associated article of footwear 22 can be reduced.

Figure 77:
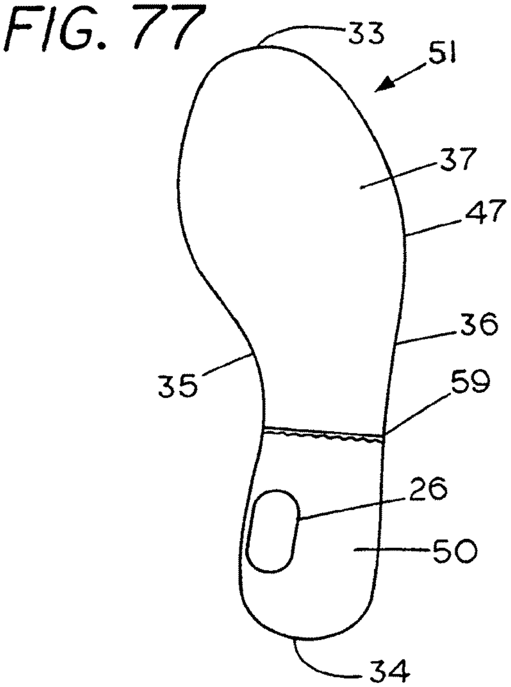
FIG. 77 is a top plan view of a spring element including a superior spring element with parts broken away posterior of the flexural axis in order to reveal a column shaped midsole cushioning element and an inferior spring element.

FIG. 77 is a top plan view of a spring element 51 including a superior spring element 47 with parts broken away posterior of the flexural axis 59 in order to reveal a column shaped midsole 26 cushioning element and an inferior spring element 50. Again, a midsole 26 cushioning element can consist of a fluid-filled bladder, or a foam material. As shown, the single midsole 26 cushioning element has an oval or elliptical shape in a top plan view. However, it can be readily understood that a single midsole 26 cushioning element can have other geometric shapes. As shown, the midsole 26 cushioning element is located on the medial side 35. The relative flexural modulus or stiffness in bending, and including the torsional stiffness exhibited by the inferior spring element 50 on the lateral side 36 can thereby be decreased. As a result, the rate and magnitude of rearfoot pronation experienced by a wearer of an associated article of footwear 22 can be reduced.

Figure 78:
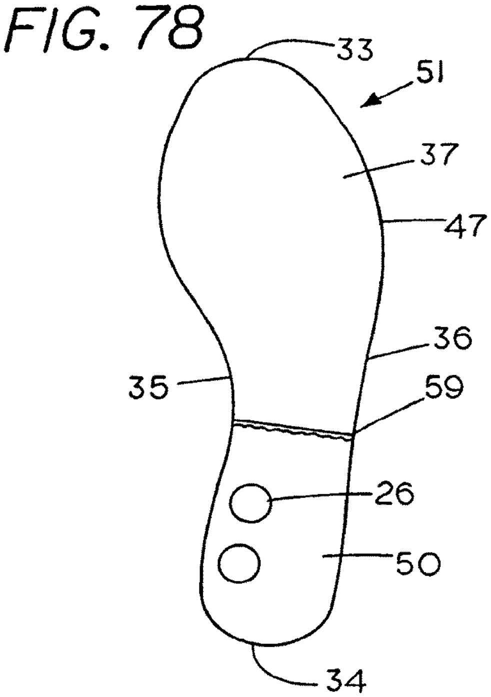
FIG. 78 is a top plan view of a spring element including a superior spring element with parts broken away posterior of the flexural axis in order to reveal two column shaped midsole cushioning elements and an inferior spring element.

FIG. 78 is a top plan view of a spring element 51 including a superior spring element 47 with parts broken away posterior of the flexural axis 59 in order to reveal two column shaped midsole 26 cushioning elements and an inferior spring element 50. Again, a midsole 26 cushioning element can consist of a fluid-filled bladder, or a foam material. As shown, the two midsole 26 cushioning elements have a circular shape in a top plan view. However, it can be readily understood that the two midsole 26 cushioning elements can have other geometric shapes. As shown, the midsole 26 cushioning elements are located on the medial side 35. The relative flexural modulus or stiffness in bending, and including the torsional stiffness exhibited by the inferior spring element 50 on the lateral side 36 can thereby be decreased. As a result, the rate and magnitude of rearfoot pronation experienced by a wearer of an associated article of footwear 22 can be reduced.

Figure 79:
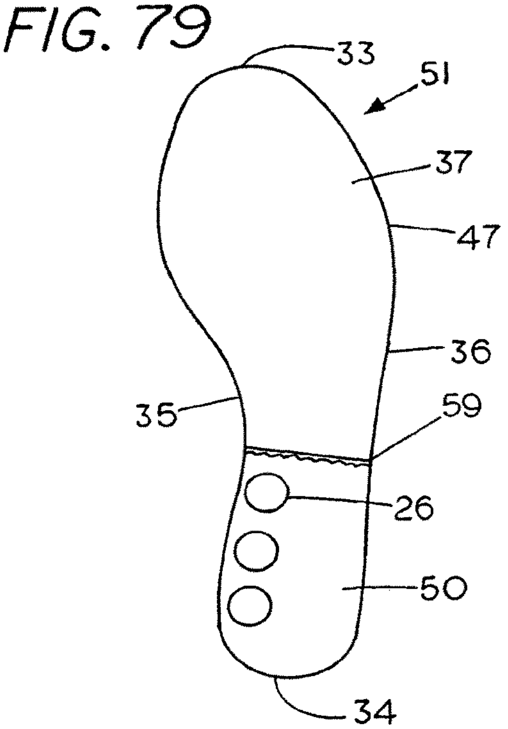
FIG. 79 is a top plan view of a spring element including a superior spring element with parts broken away posterior the flexural axis in order to reveal three column shaped midsole cushioning elements and an inferior spring element.

FIG. 79 is a top plan view of a spring element 51 including a superior spring element 47 with parts broken away posterior the flexural axis 59 in order to reveal three column shaped midsole 26 cushioning elements and an inferior spring element 50. Again, a midsole 26 cushioning element can consist of a fluid-filled bladder, or a foam material. As shown, the three midsole 26 cushioning elements have a circular shape in a top plan view. However, it can be readily understood that the three midsole 26 cushioning elements can have other geometric shapes. As shown, the midsole 26 cushioning elements are located on the medial side 35. The relative flexural modulus or stiffness in bending, and including the torsional stiffness exhibited by the inferior spring element 50 on the lateral side 36 can thereby be decreased. As a result, the rate and magnitude of rearfoot pronation experienced by a wearer of an associated article of footwear 22 can be reduced.

Figure 80:
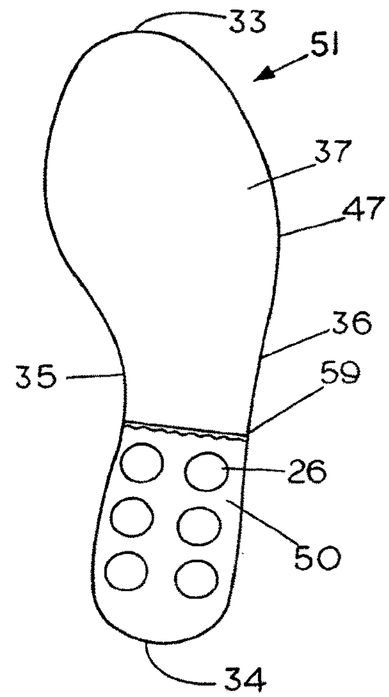
FIG. 80 is a top plan view of a spring element including a superior spring element with parts broken away posterior of the flexural axis in order to reveal six column shaped midsole cushioning elements and an inferior spring element.

FIG. 80 is a top plan view of a spring element 51 including a superior spring element 47 with parts broken away posterior of the flexural axis 59 in order to reveal six column shaped midsole 26 cushioning elements and an inferior spring element 50. Again, a midsole 26 cushioning element can consist of a fluid-filled bladder, or a foam material. As shown, the column shaped midsole 26 cushioning elements are symmetrically positioned on both the medial side 35 and lateral side 36, and the midsole 26 cushioning elements have a circular shape in a top plan view. However, it can be readily understood that the midsole 26 cushioning elements can have other geometric shapes. If desired, at least the posteriormost midsole 26 cushioning element on the lateral side 36 can be made of a composition as to exhibit less stiffness in compression than those on the medial side 35. As a result, the rate and magnitude of rearfoot pronation experienced by a wearer of an associated article of footwear 22 can be reduced.

Figure 81:
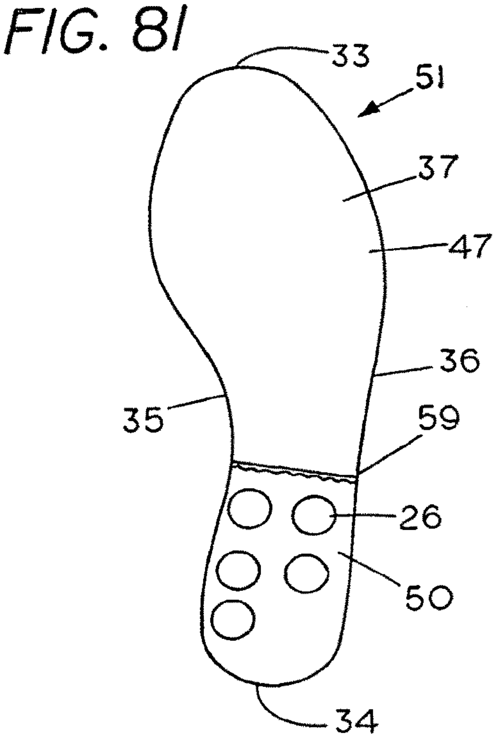
FIG. 81 is a top plan view of a spring element including a superior spring element with parts broken away posterior of the flexural axis in order to reveal five column shaped midsole cushioning elements and an inferior spring element.

FIG. 81 is a top plan view of a spring element 51 including a superior spring element 47 with parts broken away posterior of the flexural axis 59 in order to reveal five column shaped midsole 26 cushioning elements and an inferior spring element 50. Again, a midsole 26 cushioning element can consist of a fluid-filled bladder, or a foam material. The midsole 26 cushioning elements have a circular shape in a top plan view. However, it can be readily understood that the midsole 26 cushioning elements can have other geometric shapes. As shown, three of the column shaped midsole 26 cushioning elements are positioned on the medial side 35 and two of the column shaped midsole 26 cushioning elements are positioned on the lateral side 36. The relative flexural modulus or stiffness in bending, and including the torsional stiffness exhibited by the inferior spring element 50 on the lateral side 36 can thereby be decreased. As a result, the rate and magnitude of rearfoot pronation experienced by a wearer of an associated article of footwear 22 can be reduced.

Figure 82:
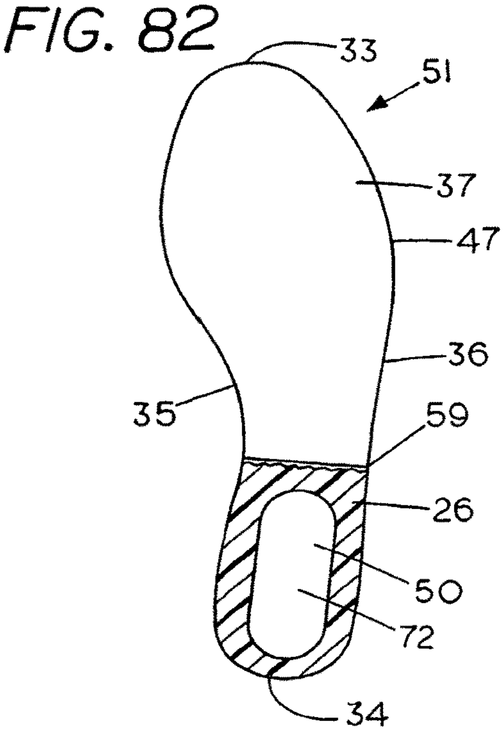
FIG. 82 is a top plan view of a spring element including a superior spring element with parts broken away posterior of the flexural axis in order to reveal a midsole cushioning element including an opening and an inferior spring element.

FIG. 82 is a top plan view of a spring element 51 including a superior spring element 47 with parts broken away posterior of the flexural axis 59 in order to reveal a midsole 26 cushioning element including an opening 72 and an inferior spring element 50. Again, a midsole 26 cushioning element can consist of a fluid-filled bladder, or alternately and as shown in FIG. 82, the midsole 26 cushioning element can consist of a foam material. As shown, the midsole 26 cushioning element encompasses a significant portion of the space, area, and volume between the superior spring element 47 and the inferior spring element 50 posterior of the flexural axis 59. However, the void space or opening 72 is asymmetrically positioned closer to the lateral side 36 than the medial side 35, thus the flexural modulus or stiffness in bending, and including the torsional stiffness exhibited by the inferior spring element 50 on the lateral side 36 can thereby be decreased. As a result, the rate and magnitude of rearfoot pronation experienced by a wearer of an associated article of footwear 22 can be reduced.

Figure 83:
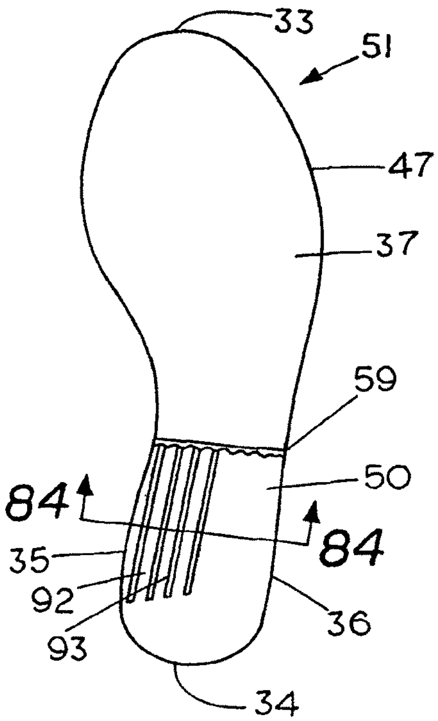
FIG. 83 is a top plan view of a spring element including a superior spring element with parts broken away posterior of the flexural axis in order to reveal an inferior spring element having convex peak and concave valley portions extending longitudinally on the medial side.

FIG. 83 is a top plan view of a spring element 51 including a superior spring element 47 with parts broken away posterior of the flexural axis 59 in order to reveal an inferior spring element 50 having convex peak 92 portions and concave valley 93 portions extending longitudinally on the medial side. The presence of convex peak 92 portions and concave valley 93 portions can increase the flexural modulus or stiffness in bending, and including the torsional stiffness exhibited by the inferior spring element 50 on the medial side 35 relative to the lateral side 36. As a result, the rate and magnitude of rearfoot pronation experienced by a wearer of an associated article of footwear 22 can be reduced.

Figure 84:
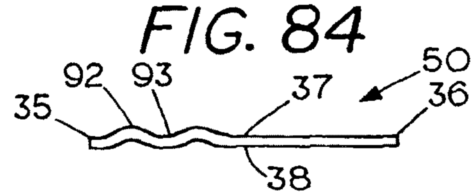
FIG. 84 is a cross-sectional view along line 84-84 of the inferior spring element shown in FIG. 83 having convex peak and concave valley portions.

FIG. 84 is a cross-sectional view along line 84-84 of the inferior spring element 50 shown in FIG. 83 having convex peak 92 portions and concave valley 93 portions.

Figure 85:
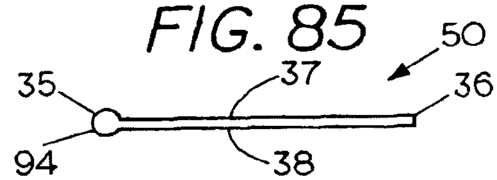
FIG. 85 is a cross-sectional view similar to that shown in FIG. 84 of an alternate inferior spring element having a medial extension.

FIG. 85 is a cross-sectional view similar to that shown in FIG. 84 of an alternate inferior spring element 50 having an extension 94 on the medial side 35. As shown, the extension 94 projects both above and below the two planes formed by the superior side 37 and inferior side 38 of the inferior spring element 50. The presence of an extension 94 can increase the flexural modulus or stiffness in bending, and including the torsional stiffness exhibited by the inferior spring element 50 on the medial side 35 relative to the lateral side 36. As a result, the rate and magnitude of rearfoot pronation experienced by a wearer of an associated article of footwear 22 can be reduced.

Figure 86:
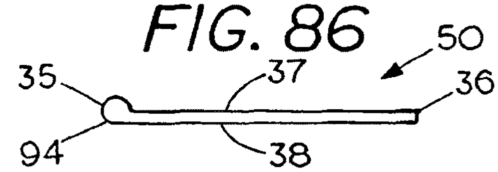
FIG. 86 is a cross-sectional view similar to that shown in FIG. 84 of an alternate inferior spring element having a medial extension.

FIG. 86 is a cross-sectional view similar to that shown in FIG. 84 of an alternate inferior spring element 50 having an extension 94 on the medial side 35. As shown, the extension 94 projects above the plane formed by the superior side 37 of the inferior spring element 50. The presence of an extension 94 can increase the flexural modulus or stiffness in bending, and including the torsional stiffness exhibited by the inferior spring element 50 on the medial side 35 relative to the lateral side 36. As a result, the rate and magnitude of rearfoot pronation experienced by a wearer of an associated article of footwear 22 can be reduced.

Figure 87:
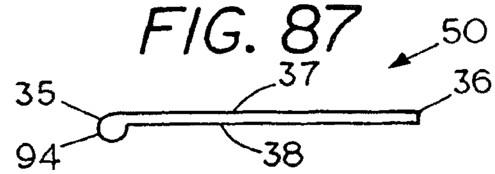
FIG. 87 is a cross-sectional view similar to that shown in FIG. 84 of an alternate inferior spring element having a medial extension.

FIG. 87 is a cross-sectional view similar to that shown in FIG. 84 of an alternate inferior spring element 50 having an extension 94 on the medial side 35. As shown, the extension 94 projects below the plane formed by the inferior side 38 of the inferior spring element 50. The presence of an extension 94 can increase the flexural modulus or stiffness in bending, and including the torsional stiffness exhibited by the inferior spring element 50 on the medial side 35 relative to the lateral side 36. As a result, the rate and magnitude of rearfoot pronation experienced by a wearer of an associated article of footwear 22 can be reduced.

Figure 88:
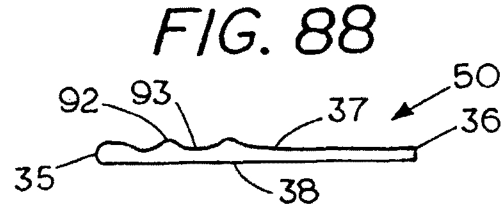
FIG. 88 is a cross-sectional view similar to that shown in FIG. 84 of an alternate inferior spring element having concave peaks and convex valleys on the superior side.

FIG. 88 is a cross-sectional view similar to that shown in FIG. 84 of an alternate inferior spring element 50 having concave peaks 92 and convex valleys 93 on the superior side 37. The presence of convex peaks 92 and concave valleys 93 can increase the flexural modulus or stiffness in bending, and including the torsional stiffness exhibited by the inferior spring element 50 on the medial side 35 relative to the lateral side 36. As a result, the rate and magnitude of rearfoot pronation experienced by a wearer of an associated article of footwear 22 can be reduced.

Figure 89:
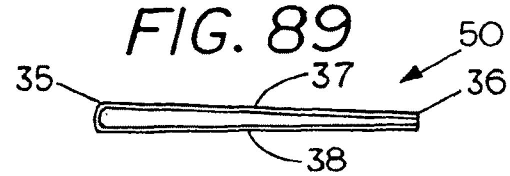
FIG. 89 is a cross-sectional view similar to that shown in FIG. 84 of an alternate inferior spring element having greater thickness on the medial side.

FIG. 89 is a cross-sectional view similar to that shown in FIG. 84 of an alternate inferior spring element 50 having greater thickness on the medial side 35. The presence of greater thickness can increase the flexural modulus or stiffness in bending, and including the torsional stiffness exhibited by the inferior spring element 50 on the medial side 35 relative to the lateral side 36. As a result, the rate and magnitude of rearfoot pronation experienced by a wearer of an associated article of footwear 22 can be reduced.

Figure 90:
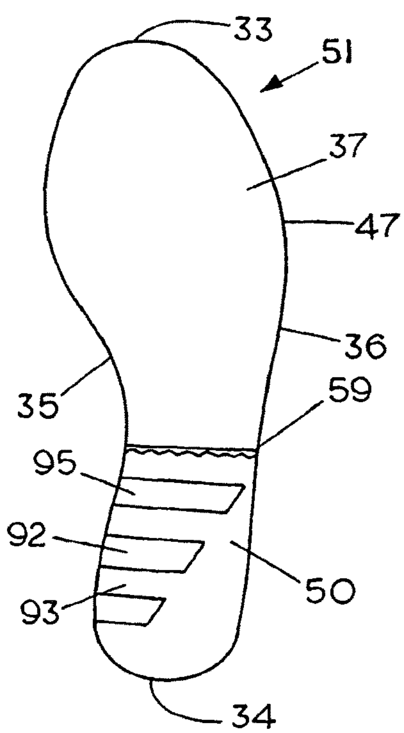
FIG. 90 is a top plan view of a spring element including a superior spring element with parts broken away posterior of the flexural axis in order to reveal an inferior spring element having convex and concave portions extending transversely from the medial side.

FIG. 90 is a top plan view of a spring element 51 including a superior spring element 47 with parts broken away posterior of the flexural axis 59 in order to reveal an inferior spring element 50 having convex peaks 92 and concave valleys 93 extending transversely from the medial side 35. The presence of convex peaks 92 and concave valleys 93 can increase the flexural modulus or stiffness in bending, and including the torsional stiffness exhibited by the inferior spring element 50 on the medial side 35 relative to the lateral side 36. As a result, the rate and magnitude of rearfoot pronation experienced by a wearer of an associated article of footwear 22 can be reduced.

Figure 91:
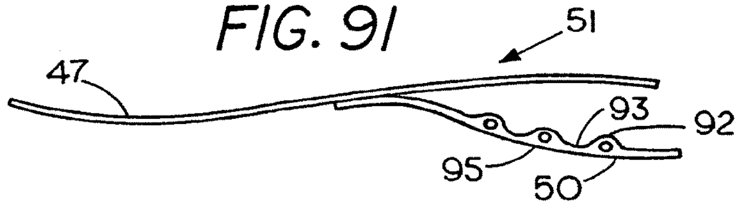
FIG. 91 is a side view of a spring element including a superior spring element and an inferior spring element including inserts and convex and concave portions.

FIG. 91 is a side view of a spring element 51 similar to that shown in FIG. 90 including a superior spring element 47 and an inferior spring element 50 including inserts 95 such as dowels and convex peaks 92 and concave valleys 93. An insert 95 can consist of a relatively light-weight material which can create or quickly build a desired generally planar thickness or convex peak 92 when substantially encapsulated by a fiber composite material. The presence of convex peaks 92 and concave valleys 93 can increase the flexural modulus or stiffness in bending, and including the torsional stiffness exhibited by the inferior spring element 50 on the medial side 35 relative to the lateral side 36. As a result, the rate and magnitude of rearfoot pronation experienced by a wearer of an associated article of footwear 22 can be reduced.

Figure 92:
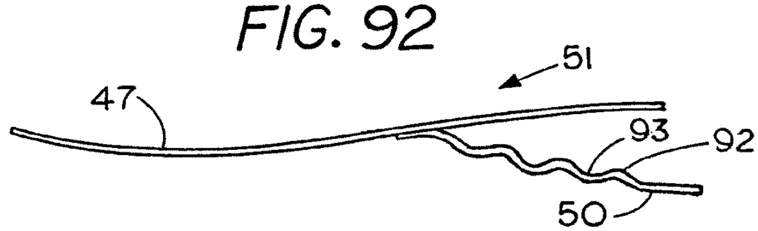
FIG. 92 is a side view of a spring element including a superior spring element and an inferior spring element including convex and concave portions.

FIG. 92 is a side view of a spring element 51 including a superior spring element 47 and an inferior spring element 50 including convex peaks 92 and concave valleys 93.
The presence of convex peaks 92 and concave valleys 93 can increase the flexural modulus or stiffness in bending, and including the torsional stiffness exhibited by the inferior spring element 50 on the medial side 35 relative to the lateral side 36. As a result, the rate and magnitude of rearfoot pronation experienced by a wearer of an associated article of footwear 22 can be reduced.

Figure 93:
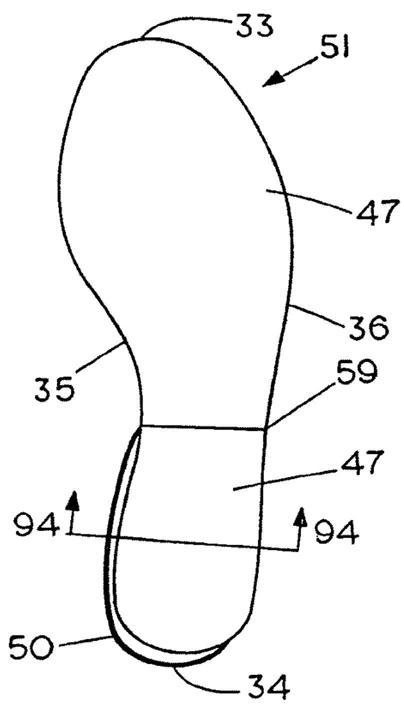
FIG. 93 is a top perspective view of a spring element including a superior spring element and an inferior spring element showing a cross-section taken along line 94-94.

FIG. 93 is a top perspective view of a spring element 51 including a superior spring element 47 and an inferior spring element 50 showing a cross-section taken along line 94-94. The inferior spring element 50 can be affixed to the superior spring element 47 at one or more locations proximate its anterior side, and the inferior spring element 50 can then gradually and evenly project downwards from the superior spring element 47 on the medial side 35 and lateral side 36. Accordingly, the configuration and relationship between the inferior spring element 50 and superior spring element 47 can appear as shown in the transverse cross-sectional view shown in FIG. 94.

Figure 94:
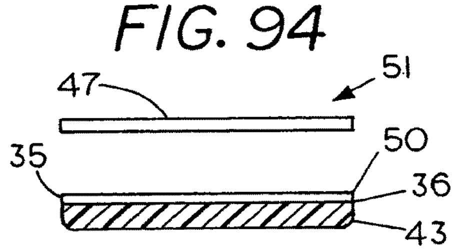
FIG. 94 is a cross-sectional view of the spring element shown in FIG. 93 taken along line 94-94.

FIG. 94 is a cross-sectional view of the spring element 51 shown in FIG. 93 taken along line 94-94.

Figure 95:
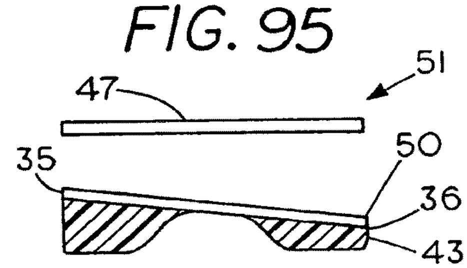
FIG. 95 is a cross-sectional view of an alternate spring element taken along a line similar to 94-94 shown in FIG. 93.

FIG. 95 is a transverse cross-sectional view of an alternate spring element 51 taken along a line similar to 94-94 shown in FIG. 93. Again, the inferior spring element 50 can be affixed to the superior spring element 47 at one or more locations near its anterior side. However, the inferior spring element 50 projects downwards from the superior spring element 47 on the medial side 35 unevenly relative to the lateral side 36. Accordingly, the configuration and relationship between the inferior spring element 50 and superior spring element 47 can appear as shown in the transverse cross-sectional view shown in FIG. 95. As shown, the inferior spring element 50 is sloped upwards from the lateral side 36 to the medial side 35. Accordingly, when the inferior spring element 50 is loaded at the lateral and posterior corner during the walking or running gait cycle, the inferior spring element 50 can exhibit greater counter-clockwise movement and torsional stiffness. In particular, when the inferior spring element 50 is affixed near its anterior end at a single and central location, the medial side 35 of the inferior spring element 50 can move counter-clockwise and exert force upon the support surface thereby actively posting and supporting the medial side 35.

Figure 96:
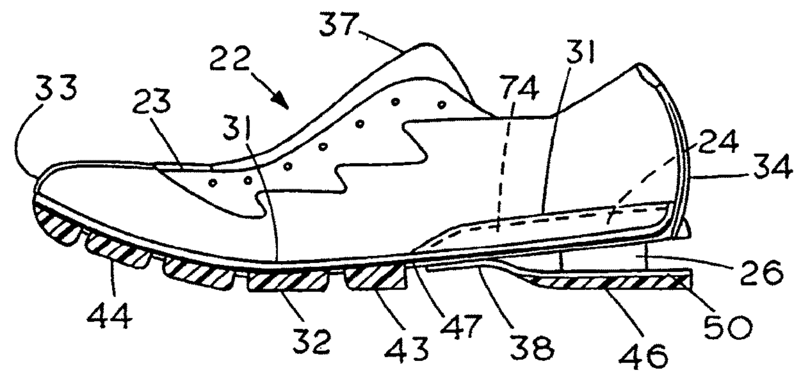
FIG. 96 is a longitudinal cross-sectional medial side view of an alternate article of footwear including a midsole cushioning element affixed between the superior spring element and the inferior spring element.

FIG. 96 is a longitudinal cross-sectional medial side view of an alternate article of footwear 22 including a midsole 26 cushioning element affixed to both the superior spring element 47 and the inferior spring element 50. Alternately, the midsole 26 cushioning element can be affixed only to the superior spring element 47, or alternately, the midsole 26 cushioning element can only be affixed to the inferior spring element 50. The midsole 26 cushioning element shown in FIG. 96 can generally resemble that shown in FIG. 77.

Figure 97:
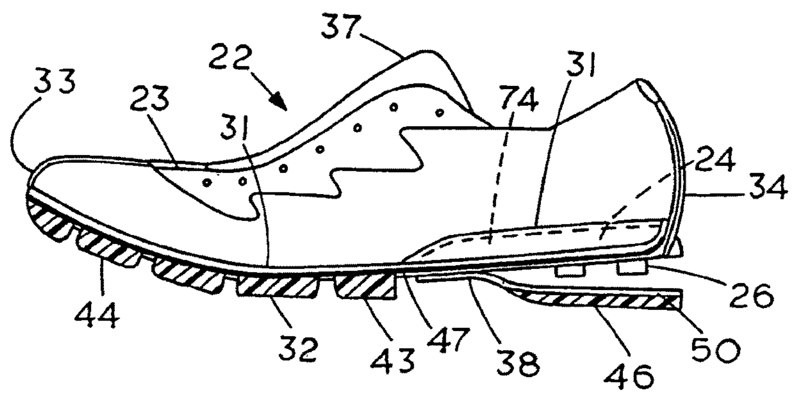
FIG. 97 is a longitudinal cross-sectional medial side view of an alternate article of footwear including two midsole cushioning elements affixed to the superior spring element.

FIG. 97 is a longitudinal cross-sectional medial side view of an alternate article of footwear 22 including two midsole 26 cushioning elements affixed to the superior spring element 47. Alternately, the midsole 26 cushioning element can be affixed only to the inferior spring element 50, or alternately, the midsole 26 cushioning element can be affixed to both the inferior spring element 50 and superior spring element 47. The midsole 26 cushioning element shown in FIG. 97 can generally resemble those shown in FIG. 78.

Figure 98:
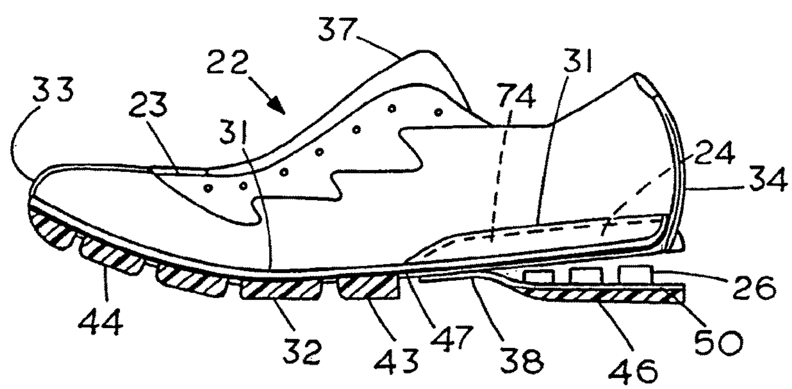
FIG. 98 is a longitudinal cross-sectional medial side view of an alternate article of footwear including three midsole cushioning elements affixed to the inferior spring element.

FIG. 98 is a longitudinal cross-sectional medial side view of an alternate article of footwear 22 including three midsole 26 cushioning elements affixed to the inferior spring element 50. Alternately, the midsole 26 cushioning element can be affixed only to the superior spring element 47, or alternately, the midsole 26 cushioning element can be affixed to both the inferior spring element 50 and superior spring element 47. The midsole 26 cushioning elements shown in FIG. 98 can generally resemble those shown in FIGS. 79, 80, 81. In addition, the height of the various midsole 26 cushioning elements can be the same, or alternately, the height of the midsole 26 cushioning elements can vary, thus introducing both a fulcrum and a distinct change in the exhibited stiffness of the spring element 51 in various stages. Accordingly, one or more of the midsole 26 cushioning elements can be loaded at the same time, or at different times during the gait cycle. As a result, the rate and magnitude of rearfoot pronation experienced by a wearer of an associated article of footwear 22 can be reduced.

Figure 99:
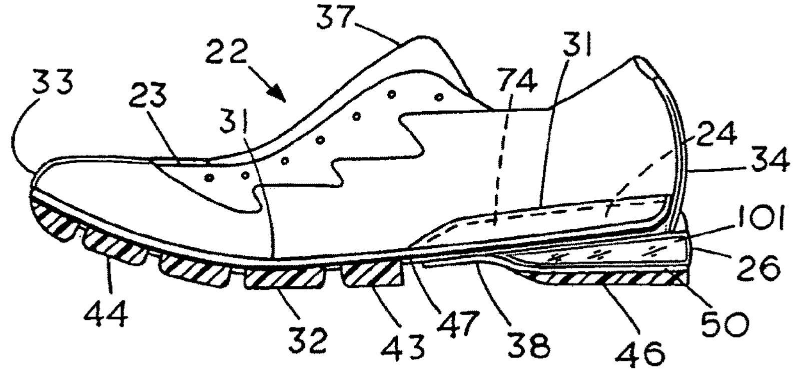
FIG. 99 is a longitudinal cross-sectional medial side view of an alternate article of footwear including a midsole cushioning element comprising a fluid-filled bladder affixed between the superior spring element and the inferior spring element.

FIG. 99 is a longitudinal cross-sectional medial side view of an alternate article of footwear 22 including a midsole 26 cushioning element comprising a fluid-filled bladder affixed between the superior spring element 47 and the inferior spring element 50. The midsole 26 cushioning element comprising a fluid-filled bladder 101 can generally resemble that shown in FIG. 73. It can be readily understood that a fluid-filled bladder 101 can contain a gas, liquid, or viscous material pressurized at ambient atmospheric pressure, or alternately, above atmospheric pressure. As shown in FIG. 73, the midsole 26 encompasses substantially the entire space, area, and volume between the superior spring element 47 and the inferior spring element 50 posterior of the flexural axis 59. However, the midsole 26 can encompass a portion of the space, area, and volume between the superior spring element 47 and the inferior spring element 50 posterior of the flexural axis 59, as shown in FIGS. 74-82, and many other configurations are possible.

FIG. 100 is a longitudinal cross-sectional medial side view of an alternate article of footwear 22 including a midsole 26 cushioning element comprising a first posterior fluid-filled bladder 101.1 affixed between the superior spring element 47 and the inferior spring element 50 in the rearfoot area 68, and a second anterior fluid-filled bladder 101.2 affixed between the superior spring element 47 and an inferior anterior spring element 48.2 in the forefoot area 58. The alternate article of footwear 22 shown in FIG. 100 can be generally similar to that shown in FIG. 49, but with the addition of fluid-filled bladders 101.1 and 101.2. It can be readily understood that a fluid-filled bladder can contain a gas, liquid, or viscous material pressurized at ambient atmospheric pressure, or alternately, above atmospheric pressure. As shown in FIG. 100, the midsole 26 cushioning elements encompass substantially the entire space, area, and volume between the superior spring element 47 and the inferior spring element 50 posterior of the flexural axis 59, but also substantially the entire space, area, and volume between the superior spring element 47 and the inferior anterior spring element 48.2 posterior of the anterior position of attachment behind the anterior spacer 55.2. Alternately, the midsole 26 cushioning elements can encompass only a portion of the space, area, and volume between the superior spring element 47 and the inferior spring element 50, and/or the superior spring element 47 and the inferior anterior spring element 48.2, thus many other configurations are possible.

FIG. 101 is a perspective exploded view of a spring element 51 including a superior spring element 47, and an inferior spring element 50 showing a fastener 29 and a locating pin 96. The superior spring element 47 and inferior spring element 50 can both include registered openings 72 having a shape such as a square, rectangle, diamond, triangle, pentagon, octagon, star, or other non-circular complex shape which can thereby be mechanically engaged and locked in position with respect to the fastener 29. In addition, a locating pin 96 can also be used to align and maintain the superior spring element 47 and inferior spring element 50 in proper position. The locating pin 96 can possibly be affixed to either the superior spring element 47 or inferior spring element 50, and can possibly pass through the upper 23 of an article of footwear 22 before engaging a corresponding component of the spring element 51.

FIG. 102 is a bottom plan view of a spring element 51 including a superior spring element 51 and an inferior spring element 50 having an insert 95. The insert 95 can be made of metal such as titanium or spring steel and can serve to increase the flexural modulus or stiffness in bending and also the torsional stiffness of the inferior spring element 50 on the medial side 35 relative to more substantial use of a fiber composite material 102 on the lateral side 36. The insert 95 can be partially or completely encapsulated by a fiber composite material 102.

FIG. 103 is a bottom plan view of a spring element 51 including a superior spring element 47 and an inferior spring element 50 having a different fiber composite material 102.1 on the medial side 35 than the fiber composite material 102.2 used on the lateral side 36. For example, a uni-directional carbon fiber composite material 102.1 could be used on the medial side 35, whereas a woven carbon fiber composite material 102.2 could be used on the lateral side 36. This can serve to increase the flexural modulus or stiffness in bending and also the torsional stiffness of the inferior spring element 50 on the medial side 35 relative to the lateral side 36.

FIG. 104 is a bottom plan view of a spring element 51 including a superior spring element 47 and an inferior spring element 50 having different fiber composite materials on the medial side 35 than on the lateral side 36. For example, a uni-directional carbon fiber composite material could be used on the medial side 35, whereas a fiberglass material could be used on the lateral side 36. This can serve to increase the flexural modulus or stiffness in bending and also the torsional stiffness of the inferior spring element 50 on the medial side 35 relative to the lateral side 36.

FIG. 105 is a bottom plan view of a spring element 51 including a superior spring element 47 and an inferior spring element 50 having different fiber composite material 102 orientations on the medial side 35 than on the lateral side 36. For example, on the medial side 35, when an inferior spring element 50 substantially consisting of uni-directional carbon fiber composite material 102 is being constructed, the direction of the fibers in one layer can be orientated parallel with respect to the longitudinal axis 69 or at 0 degrees, and the next layer can be orientated at about 45 degrees to the right, and then the next layer at about 45 degrees to the left. This sequence can then be repeated until the part is constructed to the desired thickness. If desired, on the lateral side 36, a greater number of the layers can be orientated between 0 degrees and 45 or 90 degrees right, as opposed to 0 degrees and 45 or 90 degrees left, as this can reduce the flexural modulus or stiffness in bending exhibited by the inferior spring element 50, since uni-directional carbon fiber composite materials normally exhibit greatest stiffness when bending at 90 degrees relative to the orientation of the fibers. This can serve to increase the flexural modulus or stiffness in bending and also the torsional stiffness of the inferior spring element 50 on the medial side 35 relative to the lateral side 36, and create a line a flexion 54.

FIG. 106 is a bottom plan view of a spring element 51 including a superior spring element 47 and an inferior spring element 50 having an uni-directional fiber composite material 102.1 orientated differently on the medial side 35, lateral side 36, and posterior side 34, than in the middle portion 105. In this alternate embodiment, the middle portion 105 can be constructed by alternating the orientation of the layers at 0 degrees, 45 degrees right, and 45 degrees left in a continuous sequences, whereas the medial side 35, lateral side 36, and posterior side 34 can omit layers at 45 degrees left and right, and instead possibly use a greater number of layers at 0 degrees. The resulting inferior spring element 50 can exhibit less stiffness in bending at the medial, lateral, and posterior sides and edges than in the middle 105. This could be advantageous with regards to reducing the stiffness in bending even if not the actual length of the effective lever arm created by the sole of an associated article of footwear 22, thus reduce the magnitude of pronation or supination exhibited in certain lateral movement applications of the article of footwear such as tennis, volleyball, or basketball. However, a dramatic reduction in the stiffness of the sole about the medial side 35, lateral side 36, and posterior sides 34 can at some point prove counter-productive and result in instability, and so ideally, the stiffness variable should be optimized and customized for use by an individual wearer for use in the particular targeted activity.

FIG. 107 is a top plan view of a spring element 51 including a superior spring element 47 and an inferior spring element 50 made of a metal material. The metal material can substantially consist of a titanium alloy, or spring steel. The inferior spring element 50 can be cut and formed in a single part from a flat sheet stock of titanium alloy by bending the piece about the flexural axis 59, or alternately, the inferior spring element 50 can be stamped, forged, cast or molded into the desired shape.

FIG. 108 is a cross-sectional view of the spring element 51 shown in FIG. 107 taken along line 108-108.

FIG. 109 is a bottom plan view of a spring element 51 including a superior spring element 47 and an inferior spring element 50 made of a metal material. The metal material can substantially consist of a titanium alloy, or spring steel. The spring element 51 can be cut and formed in a single part from a flat sheet stock of titanium alloy by bending the piece about a generally longitudinal flexural axis 59.1 on the medial side 35 and also about a generally longitudinal flexural axis 59.2 on the lateral side 36. Alternately, the inferior spring element 50 can be stamped, forged, cast or molded into the desired shape. The inferior spring element 50 can be have relatively greater separation from the superior spring element 47 near the posterior side 34 than near the anterior side 33.

FIG. 110 is a cross-sectional view of the spring element 51 shown in FIG. 109 taken along line 110-110.

FIG. 111 is a bottom plan view of a spring element 51 including a superior spring element 47 and an inferior spring element 50 having a symmetrical cantilever shape. The middle portion 105 of the inferior spring element 50 is generally planar and can lie flat against a portion of the superior spring element 47 when the two components are affixed together. However, the medial side 35, lateral side 36, and posterior side 34 of the inferior spring element 50 descend in an arcuate fashion from the middle portion 105 to form a cantilever shape whereby the inferior spring element 50 has a concave configuration when viewed in a transverse cross-section, as shown in FIG. 112.

FIG. 112 is a cross-sectional view of the spring element 51 shown in FIG. 111 taken along line 112-112, and is shown with the superior side 37 up.

FIG. 113 is a bottom plan view of a spring element 51 including a superior spring element 47 and an inferior spring element 50 having an asymmetrical cantilever shape. The middle portion 105 of the inferior spring element 50 is generally planar and can lie flat against a portion of the superior spring element 47 when the two components are affixed together. However, the medial side 35, lateral side 36, and posterior side 34 of the inferior spring element 50 descend in an arcuate fashion from the middle portion 105 to form a cantilever shape whereby the inferior spring element 50 has a concave configuration when viewed in a transverse cross-section, as shown in FIG. 114.

FIG. 114 is a cross-sectional view of the spring element 51 shown in FIG. 113 taken along line 114-114, and shown with the superior side 37 up. It can be seen by comparing FIGS. 111 and 133, and their corresponding cross-sectional views shown in FIGS. 112 and 114, that the inferior spring element 50 shown in FIGS. 113 and 114 has an asymmetric shape. The length of the lever arm of the inferior spring element 50 on the medial side 35 is shorter than that present on the lateral side 36, and at the lateral and posterior corner. This can serve to enhance the flexural modulus or stiffness in bending and also the torsional stiffness of the inferior spring element 50 on the medial side 35 relative to the lateral side 36, and create a line a flexion 54.

FIG. 115 is a cross-sectional view of the spring element 51 shown in FIG. 74 taken along line 115-115. A midsole 26 cushioning element consisting of a fluid-filled bladder 101 is located between the superior spring element 47 and inferior spring element 50. The fluid-filled bladder 101 can extend posteriorly to greater degree on the medial side 35 in order to create differential stiffness relative to the lateral side 36 and rearfoot strike zone.

FIG. 116 is a cross-sectional view of the spring element 51 shown in FIG. 75 taken along line 116-116. A midsole 26 cushioning element consisting of a fluid-filled bladder 101 is located between the superior spring element 47 and inferior spring element 50. The fluid-filled bladder 101 can extend posteriorly to greater degree on the medial side 35 in order to create differential stiffness relative to the lateral side 36 and rearfoot strike zone.

FIG. 117 is a cross-sectional view of the spring element 51 shown in FIG. 74 taken along line 117-117. A midsole 26 cushioning element consisting of a fluid-filled bladder 101 is located between the superior spring element 47 and inferior spring element 50. The fluid-filled bladder 101 can extend posteriorly on the medial side 35 in order to create differential stiffness relative to the lateral side 36 and rearfoot strike zone.

FIG. 118 is a cross-sectional view of an alternate spring element 51 taken along a line similar to 115 shown in FIG. 74. In this alternate embodiment, a midsole 26 cushioning element consisting of a foam material is located between the superior spring element 47 and inferior spring element 50 on the medial side 35. The inferior spring element 50 is affixed to the superior spring element 47 on the medial side 35, and the inferior spring element 50 then descends to a position of maximum separation from the superior spring element 47 at the lateral side 36. The midsole 26 cushioning element consisting of foam material supports the spring element 51 on the medial side 35, and an outsole 43 can underlie at least a portion of the foam material and spring element 51.

FIG. 119 is a cross-sectional view of an alternate spring element 51 taken along a line similar to 116 shown in FIG. 75. In this alternate embodiment, a midsole 26 cushioning element consisting of a foam material is located between the superior spring element 47 and inferior spring element 50 on the medial side 35. The inferior spring element 50 is affixed to the superior spring element 47 on the medial side 35, and the inferior spring element 50 then descends to a position of maximum separation from the superior spring element 47 at the lateral side 36. The midsole 26 cushioning element consisting of foam material supports the spring element 51 on the medial side 35, and an outsole 43 can underlie at least a portion of the foam material and spring element 51.

FIG. 120 is a cross-sectional view of an alternate spring element 51 taken along a line similar to 117 shown in FIG. 76. In this alternate embodiment, a midsole 26 cushioning element consisting of a foam material is located between the superior spring element 47 and inferior spring element 50 on the medial side 35. The inferior spring element 50 is affixed to the superior spring element 47 on the medial side 35, and the inferior spring element 50 then descends to a position of maximum separation from the superior spring element 47 at the lateral side 36. The midsole 26 cushioning element consisting of foam material supports the spring element 51 on the medial side 35, and an outsole 43 can underlie at least a portion of the foam material and spring element 51.

FIG. 121 is a side view of a spring element 51 including a superior spring element 47 including a heel counter 24, side support 74 and an inferior spring element 50.

FIG. 122 is a cross-sectional view taken along line 122-122 of the superior spring element 47 shown in FIG. 121. The superior spring element 47 includes a side support 74 on the medial side 35.

FIG. 123 is a cross-sectional view taken along line 123-123 of the superior spring element 47 shown in FIG. 121. The superior spring element 47 includes a heel counter 24 that provides support to both the medial side 35 and lateral side 36.

FIG. 124 is a cross-sectional view of an alternate superior spring element 47 taken along a line similar to 122 shown in FIG. 121. The superior spring element 47 includes side supports 74 on both the medial side 35 and lateral side 36.

FIG. 125 is a cross-sectional view of an alternate superior spring element 47 taken along a line similar to 122 shown in FIG. 121. The superior spring element 47 has an arcuate shape generally corresponding to the anatomical shape of a wearer's foot and includes side supports 74 on both the medial side 35 and lateral side 36.

FIG. 126 is a bottom plan view of a spring element 51 generally similar to that shown in a side view in FIG. 49 including a superior spring element 47, an inferior anterior spring element 48.2, and an inferior spring element 50. The inferior anterior spring element 48.2 is affixed by three fasteners 29 directly to the superior spring element 47 near the anterior side 33. The inferior spring element 50 is also affixed to the superior spring element 47 by a fastener 29. The approximate position of the metatarsal-phalangeal joints of a wearer's foot corresponding to the spring element 51 and an associated article of footwear 22 is normally slightly less than 70 percent of the length of an article of footwear 22 as measured from the posterior side 34 on the medial side 35, and greater than 60 percent of the length of an article of footwear 22 as measured from the posterior side 34 on the lateral side 36, but still somewhat less than on the medial side 35, as shown by line 104.

FIG. 127 is a bottom plan view of a spring element 51 generally similar to that shown in a side view in FIG. 49 including a superior spring element 47, an inferior anterior spring element 48.2, and an inferior spring element 50. The inferior anterior spring element 48.2 is affixed by three fasteners 29 to the anterior spacer 55.2 and the superior spring element 47 near the anterior side 33. As shown in FIG. 127, the posteriormost portion of the anterior spacer 55.2 upon which the superior spring element 47 and inferior anterior spring element 48.2 bear is shown by a dashed line that is anterior and parallel to line 104 indicating the approximate position of the metatarsal-phalangeal joints.

FIG. 128 is a bottom plan view of a spring element 51 generally similar to that shown in a side view in FIG. 49 including a superior spring element 47, an inferior anterior spring element 48.2, and an inferior spring element 50. The anterior spring element 48.2 is affixed by three fasteners 29 to the anterior spacer 55.2 and the superior spring element 47 near the anterior side 33. As shown in FIG. 127, the posteriormost portion of the anterior spacer 55.2 upon which the superior spring element 47 and inferior anterior spring element 48.2 bear is shown by a dashed line that converges towards line 104 on the medial side 35.

FIG. 129 is a bottom plan view of a spring element 51 generally similar to that shown in a side view in FIG. 49 including a superior spring element 47, an inferior anterior spring element 48.2, and an inferior spring element 50. The inferior anterior spring element 48.2 is affixed by three fasteners 29 to the anterior spacer 55.2 and the superior spring element 47 near the anterior side 33. As shown in FIG. 127, the posteriormost portion of the anterior spacer 55.2 upon which the superior spring element 47 and inferior anterior spring element 48.2 bear is shown by a dashed line that converges towards line 104 on the medial side 35 more dramatically than the spring element 51 embodiment shown in FIG. 128.

FIG. 130 is a bottom plan view of a spring element 51 generally similar to that shown in a side view in FIG. 49 including a superior spring element 47, an inferior anterior spring element 48.2, and an inferior spring element 50. The inferior anterior spring element 48.2 is affixed by one fastener 29 directly to the superior spring element 47 near the anterior side 33.

FIG. 131 is a bottom plan view of a spring element 51 generally similar to that shown in a side view in FIG. 49 including a superior spring element 47, an inferior anterior spring element 48.2, and an inferior spring element 50. The inferior anterior spring element 48.2 is affixed by one fastener 29 directly to the superior spring element 47 near the anterior side 33. However, the inferior anterior spring element 48.2 has less overall anterior to posterior length, and in particular, less area posterior of line 104 than the embodiment shown in FIG. 130.

FIG. 132 is a bottom plan view of a spring element 51 including a superior spring element 47, and an inferior spring element 50 having a U-shape. The inferior spring element 50 can be affixed to the superior spring element 47 with two fasteners and includes a notch 71 that can extend to various lengths in the middle portion 105 thereby imparting to the inferior spring element 50 a U-shape.

FIG. 133 is a bottom plan view of a spring element 51 including a superior spring element 47, and an inferior spring element 50 having a J-shape. The inferior spring element 50 can be affixed to the superior spring element 47 with two fasteners and includes a notch 71 that can extend to various lengths in the middle portion 105 thereby imparting to the inferior spring element 50 a J-shape.

FIG. 134 is a bottom plan view of a spring element 51 including a superior spring element 47 and an inferior spring element 50 including portions having a gently curved convex shape. The inferior spring element 50 can be curved upwards about a portion of the medial side 35, lateral side 36, and posterior side 34. This can increase the exhibited stiffness of the inferior spring element 50 about the sides in these areas. As result, the generally planar middle portion 105 of the inferior spring element 50 in the area anterior of the flexural axis 59 can assume most of the work associated with flexion and torsion. In some applications, the use of a curved convex structure or other method of increasing the stiffness of a specific portion of a spring element 51 can possibly be used to enhance the stability and performance of an article of footwear.

FIG. 135 is a cross-sectional view of the spring element 51 shown in FIG. 134 taken along line 135-135 showing a superior spring element 47 having a gently curved convex shape so as to better accommodate the shape of a wearer's heel, and an inferior spring element 50 having a similar convex shape including an outsole 43 affixed thereto.

FIG. 136 is a cross-sectional view of an alternate spring element 51 taken at a position similar to that shown in FIG. 134. Again, the superior spring element 47 has a gently curved convex shape that can better accommodate the shape of a wearer's heel. However, the inferior spring element 50 has a cantilever shape including a concavity 76 in the middle portion 105. The middle portion 105 of the inferior spring element 50 is generally planar and can lie flat against a portion of the superior spring element 47 when the two components are affixed together. However, a portion of the medial side 35, lateral side 36, and posterior side 34 of the inferior spring element 50 descends from the middle portion

105 to form a curved cantilever shape. Further, the inferior spring element 50 is curved slightly upwards at the edges about the medial side 35, lateral side 36, and posterior side 34. The possible introduction of curvature at the edges of an inferior spring element 50 can also be used to effect the exhibited flexural and torsional stiffness of the component, as desired. As shown, an outsole 43 can be affixed to the curved edge portions of the inferior spring element 50.

FIG. 137 is a side view of a spring element 51 consisting of a superior spring element 47 including toe spring in the forefoot area 58 and an inferior spring element 50 including a compound curved shape forming a concavity 76 in the midfoot area 67.

FIG. 138 is a side view of a spring element 51 consisting of a superior spring element 47 that is relatively flat in the forefoot area 58 and an inferior spring element 50 including a compound curved shape forming a concavity 76 in the midfoot area 67.

FIG. 139 is a side view of a spring element 51 having a flexural axis 59 in the forefoot area 58 consisting of a superior spring element 47 including toe spring and an inferior spring element 50 including a relatively flat shape.

FIG. 140 is a side view of a spring element 51 having a flexural axis 59 in the forefoot area 58 consisting of a superior spring element 47 having a relatively flat shape and also an inferior spring element 50 including a relatively flat shape.

FIG. 141 is a side view of a spring element 51 having a flexural axis 59 in the midfoot area 67 consisting of a superior spring element 47 made in continuity with an inferior spring element 50 forming an elliptical shape on the posterior side 34.

FIG. 142 is a side view of a spring element 51 having a flexural axis 59 in the midfoot area 67 consisting of a superior spring element 47 formed in continuity with an inferior spring element 50 forming an upwardly rounded shape on the posterior side 34.

FIG. 143 is a side view of a spring element 51 having a flexural axis 59 in the midfoot area 67 consisting of a superior spring element 47 formed in continuity with an inferior spring element 50 forming a downwardly rounded shape on the posterior side 34.

FIG. 144 is a side view of a spring element 51 having a flexural axis 59 and a concavity 76 in the midfoot area 67 consisting of a superior spring element 47 formed in continuity with an inferior spring element 50 forming an elliptical shape on the posterior side 34.

FIG. 145 is a side view of a spring element 51 consisting of a superior spring element 47, a posterior spacer 42, and an inferior spring element 50 having a relatively flat shape. As shown, a posterior spacer 42 can provide a substantial elevation in the rearfoot area 68.

FIG. 146 is a side view of a spring element 51 consisting of a superior spring element 47, a posterior spacer 42, and an inferior spring element 50 having an upwardly curved shape at the posterior side 34. As shown, a posterior spacer 42 can provide a substantial elevation in the rearfoot area 68.

FIG. 147 is a side view of a spring element 51 consisting of a superior spring element 47, a posterior spacer 42, and an inferior spring element 50 having a complex curved shape at the posterior side 34. As shown, a posterior spacer 42 can provide a substantial elevation in the rearfoot area 68.

FIG. 148 is a side view of a spring element 51 consisting of a superior spring element 47, a posterior spacer 42, and an inferior spring element 50 having an arcuate shape. As shown, a posterior spacer 42 can provide a substantial elevation in the rearfoot area 68.

FIG. 149 is a side view of a spring element 51 consisting of a superior spring element 47, a posterior spacer 42, and an inferior spring element 50 that is orientated downward along the posterior spacer 42, but which is relatively flat near the posterior side 34. As shown, a posterior spacer 42 can provide a substantial elevation in the rearfoot area 68.

FIG. 150 is a side view of a spring element 51 consisting of a superior spring element 47 made in continuity with an inferior spring element 50 forming an elliptical shape on the posterior side 34. As shown, the anterior portion of the inferior spring element 50 is affixed to a posterior spacer 42 which can provide substantial elevation in the rearfoot area 68. Alternately, an inferior spring element 50 can be made as a separate part, and can then be affixed to a posterior spacer 42 and/or superior spring element 47 near the anterior end of the inferior spring element 50, and also be affixed to the superior spring element 47 near the posterior end of the inferior spring element 50.

While it is generally preferred or advantageous that the inferior spring element 50 and flexural axis 59 be positioned in the midfoot area 67 or rearfoot area 68, it is possible for the inferior spring element 50 to extend into the anterior portion of the midfoot area 67 and forefoot area 58, as shown in FIGS. 151-154, and the like. FIG. 151 is a bottom plan view of a spring element 51 consisting of a superior spring element 47 and an inferior spring element 50. Line 104 indicates the approximate position of a wearer's metatarsal-phalangeal joints relative to the superior spring element 47. Again, on the medial side 35 the metatarsal-phalangeal joints are commonly found at slightly less than 70 percent of foot length and on the lateral side 36 greater than 60 percent of foot length, but yet somewhat less than on the medial side 35, that is, as measured from the posterior side 34 of an article of footwear 22. FIG. 151 illustrates the possibility of the flexural axis 59 being generally consistent with line 104.

FIG. 152 is a bottom plan view of a spring element 51 consisting of a superior spring element 47 and an inferior spring element 50. Line 104 indicates the approximate position of a wearer's metatarsal-phalangeal joints relative to the superior spring element 47. FIG. 152 illustrates the possibility of the flexural axis 59 being posterior and generally parallel to line 104.

FIG. 153 is a bottom plan view of a spring element 51 consisting of a superior spring element 47 and an inferior spring element 50. Line 104 indicates the approximate position of a wearer's metatarsal-phalangeal joints relative to the superior spring element 47. FIG. 153 illustrates the possibility of the flexural axis 59 being posterior and generally parallel to line 104 on the medial side 35, but then curved posteriorly away from line 104 on the lateral side 36.

FIG. 154 is a bottom plan view of a spring element 51 consisting of a superior spring element 47 and an inferior spring element 50. Line 104 indicates the approximate position of a wearer's metatarsal-phalangeal joints relative to the superior spring element 47. FIG. 154 illustrates the possibility of the flexural axis 59 being posterior and curved posteriorly away from line 104 on the medial side 35 and lateral side 36.

FIG. 155 is a top plan view of a spring element 51 which can consist solely of a superior spring element 47, or alternately, a superior spring element 47 can serve as a sub-component of a more complex spring element 51, such as one that could further include an inferior spring element 50. Further, a spring element 51 can extend substantially the entire length of an article of footwear 22, thus in the forefoot area 58, midfoot area 67, and rearfoot area 68, or alternately, in only a portion of the length of an article of footwear 22.

In this regard, a spring element 51 can be positioned in solely the rearfoot area 68, or alternately the rearfoot area 68 and midfoot area 67, or alternately solely in the forefoot area 58, or alternately the forefoot area 58 and midfoot area 67. Also shown in FIG. 155 are three primary characteristic last shapes corresponding to the insole net, top net, or bottom net associated with a given last or configuration of an article of footwear 22. In this regard, on the medial side 35 is shown a line corresponding to straight last 108, semi-curved last 106, and curved last 107 configurations. A semi-curved last 106 shape is used in most of the drawing figures herein, but it can be readily understood that a more curved last 107 or straight last 108 configuration can be used in any or all of the embodiments. It can be readily understood that the teachings regarding possible alternate embodiments, structure, and function contained in this paragraph can also be applied to many of the other embodiments shown in the drawing figures of this patent application, and in particular to FIGS. 155-220, but for the sake of brevity the relevant discussion contained in this paragraph will not be repeated in association with each embodiment and drawing figure.

FIG. 156 is a top plan view of a spring element 51 that includes a notch 71 on the lateral side 36 posterior of the approximate position of a wearer's metatarsal-phalangeal joints indicated by line 104. The inclusion of a notch 71 can reduce the flexural modulus or stiffness in bending exhibited along the longitudinal axis 59, but also the torsional stiffness exhibited as between the forefoot area 58, and both the midfoot area 67 and rearfoot area 68. The inclusion of a notch 71 can also create a potential or actual generally transverse line of flexion 54 as between the medial side 35 and the lateral side 36 of the spring element 51.

At higher walking or running speeds, or when jumping, it is known that individuals often impart higher forces on the medial side 35 of the forefoot 58 to greater degree than the lateral side 36, and so there can then sometimes be a need, and it can be advantageous to provide greater stiffness on the medial side 35 of the forefoot area 58. Further, given the biomechanical events associated with walking and running, it can be advantageous to reduce the torsional stiffness exhibited on the lateral side 36 of the forefoot area 58 relative to the medial side 35, as this can reduce the length of the effective lever arm formed by the spring element 51 and sole 32 of an article of footwear 22, thereby reduce the rate and magnitude of inward rotation of the foot and so enhance stability and performance. In addition, reducing the torsional stiffness exhibited on the lateral side 36 of the forefoot area 58 can increase the amount of deflection which takes place during impact and the ground support phase of the gait cycle, thus enhance perceived and actual cushioning effects. Moreover, the transition and work performed by the foot during the ground support phase can then be smoother and more economical, but also more natural or comfortable for a wearer. It can be readily understood that this description of biomechanical events and advantageous function could apply to many of the embodiments recited in the specification and shown in the drawing figures of this patent application, but for the sake of brevity the discussion contained in this paragraph will not be repeated in association with each embodiment and drawing figure.

FIG. 157 is a top plan view of a spring element 51 that includes two notches 71 on the lateral side 36, a first notch 71 posterior and a second notch 71 anterior of the approximate position of a wearer's metatarsal-phalangeal joints indicated by line 104. The inclusion of notches 71 can reduce the flexural modulus or stiffness in bending exhibited along the longitudinal axis 59, and in particular, in the area between both notches 71. Further, the inclusion of notches 71 can also reduce the torsional stiffness exhibited in the area between both notches 71, and also as between the forefoot area 58, and both the midfoot area 67 and rearfoot area 68. The inclusion of notches 71 can also create at least one potential or actual generally transverse line of flexion 54 as between the medial side 35 and the lateral side 36 of the spring element 51, but also at least one potential or actual generally longitudinal line of flexion 54 as between adjacent notches 71 located on the same side.

FIG. 158 is a top plan view of a spring element 51 that includes two notches 71 on the lateral side 36, a first notch 71 posterior and a second notch 71 anterior of the approximate position of a wearer's metatarsal-phalangeal joints indicated by line 104. Further, the spring element 51 includes one notch 71 on the medial side 35 that is generally transverse and opposing the anteriormost notch 71 on the lateral side 36.

Again, The inclusion of notches 71 can reduce the flexural modulus or stiffness in bending exhibited along the longitudinal axis 59, and in particular, in the area between both notches 71. Further, the inclusion of notches 71 can also reduce the torsional stiffness exhibited in the area between both notches 71, and also as between the forefoot area 58, and both the midfoot area 67 and rearfoot area 68. The inclusion of notches 71 can also create at least one potential or actual generally transverse line of flexion 54 as between the medial side 35 and the lateral side 36 of the spring element 51, but also at least one potential or actual generally longitudinal line of flexion 54 as between adjacent notches 71 located on the same side. It can be readily understood that this description of function could apply to many of the embodiments recited in the specification and shown in the drawing figures of this patent application, but for the sake of brevity the discussion contained in this paragraph will not be repeated in association with each embodiment and drawing figure.

FIG. 159 is a top plan view of a spring element 51 that is configured in a shape consistent with a straight last 108 and includes two notches 71 on the lateral side 36 that extend over half the distance from the lateral side 36 to the longitudinal axis 59, one being located posterior and another anterior of the approximate position of a wearer's metatarsal-phalangeal joints indicated by line 104.

FIG. 160 is a top plan view of a spring element 51 that includes two notches 71 on the lateral side 36, a first notch 71 being located posterior and a second notch 71 being located anterior of the approximate position of a wearer's metatarsal-phalangeal joints indicated by line 104, and also an opening 72 in the form of a longitudinal slit 82 located therebetween.

FIG. 161 is a top plan view of a spring element 51 that includes a notch 71 on the lateral side 36 being located posterior of the approximate position of a wearer's metatarsal-phalangeal joints indicated by line 104, and another notch 71 extending from near the anterior side 33 and forming a longitudinal slit 82.

FIG. 162 is a top plan view of a spring element 51 that includes two notches 71 on the lateral side 36, a first notch 71 being located posterior and a second notch 71 being located anterior of the approximate position of a wearer's metatarsal-phalangeal joints indicated by line 104, and an another notch 71 extended from near the anterior side 33 and forming a longitudinal slit 82.

FIG. 163 is a top plan view of a spring element 51 that includes one notch 71 on the lateral side 36 located posterior of the approximate position of a wearer's metatarsal-phalangeal joints indicated by line 104, and also an opposing notch 71 on the medial side 35.

FIG. 164 is a top plan view of a spring element 51 that includes three notches 71 on the lateral side 36, a first notch 71 being located posterior, a second notch 71 being along, and a third notch 71 being anterior of the approximate position of a wearer's metatarsal-phalangeal joints indicated by line 104, and also three opposing notches 71 on the medial side 35.

FIG. 165 is a top plan view of a spring element 51 that includes one notch 71 on the lateral side 36 located posterior of the approximate position of a wearer's metatarsal-phalangeal joints indicated by line 104, and a notch 71 extending from the anterior side 33 forming a longitudinal slit 82 thereby defining two fingers 109.1 and 109.2.

FIG. 166 is a top plan view of a spring element 51 that includes three notches 71 on the lateral side 36, a first notch 71 being located posterior, a second notch 71 being along, and a third notch 71 being located anterior of the approximate position of a wearer's metatarsal-phalangeal joints indicated by line 104.

FIG. 167 is a top plan view of a spring element 51 that includes three notches 71 on the lateral side 36, a first notch 71 being located posterior, a second notch 71 being along, and a third notch 71 being located anterior of the approximate position of a wearer's metatarsal-phalangeal joints indicated by line 104, and a notch 71 on the medial side 35 opposing the posteriormost notch 71 on the lateral side 36.

FIG. 168 is a top plan view of a spring element 51 that includes three notches 71 on the lateral side 36, a first notch 71 being located posterior, a second notch 71 being along, and a third notch 71 being located anterior of the approximate position of a wearer's metatarsal-phalangeal joints indicated by line 104, and a notch 71 on the medial side 35 opposing the posteriormost notch 71 on the lateral side 36, and another notch 71 on the medial side 35 opposing the anteriormost notch 71 on the lateral side 36.

FIG. 168 is a top plan view of a spring element 51 that includes three notches 71 on the lateral side 36, a first notch 71 being located posterior, a second notch 71 being along, and a third notch 71 being located anterior of the approximate position of a wearer's metatarsal-phalangeal joints indicated by line 104, and a notch 71 on the medial side 35 opposing the posteriormost notch 71 on the lateral side 36, and another notch 71 on the medial side 35 opposing the anteriormost notch 71 on the lateral side 36.

FIG. 169 is a top plan view of a spring element 51 that includes three notches 71 on the lateral side 36, a first notch 71 being located posterior, a second notch 71 being along, and a third notch 71 being located anterior of the approximate position of a wearer's metatarsal-phalangeal joints indicated by line 104, and a notch 71 on the medial side 35 opposing the posteriormost notch 71 on the lateral side 36, and another notch 71 on the medial side 35 opposing the middle notch 71 on the lateral side 36.

FIG. 170 is a top plan view of a spring element 51 that includes four notches 71 on the lateral side 36, a first notch 71 being located posterior, a second notch 71 being along, and third and fourth notches 71 being located anterior of the approximate position of a wearer's metatarsal-phalangeal joints indicated by line 104, and a notch 71 on the medial side 35 opposing the posteriormost notch 71 on the lateral side 36.

FIG. 171 is a top plan view of a spring element 51 that includes four notches 71 on the lateral side 36, a first notch 71 being located posterior, a second notch 71 being located along, and a third and fourth notch 71 being located anterior of the approximate position of a wearer's metatarsal-phalangeal joints indicated by line 104, and a notch 71 on the medial side 35 opposing the posteriormost notch 71 on the lateral side 36, and another notch 71 on the medial side 35 opposing the anteriormost notch 71 on the lateral side 36.

FIG. 172 is a top plan view of a spring element 51 that includes four notches 71 on the lateral side 36, a first notch 71 being located posterior, a second notch 71 being located along, and a third and fourth notch 71 being located anterior of the approximate position of a wearer's metatarsal-phalangeal joints indicated by line 104, and a first notch 71 on the medial side 35 opposing the posteriormost notch 71 on the lateral side 36, a second notch 71 on the medial side 35 consistent with the position of line 104, and a third notch 71 on the medial side 35 opposing the anteriormost notch 71 on the lateral side 36.

FIG. 173 is a top plan view of a spring element 51 that includes four notches 71 on the lateral side 36, a first notch 71 being located posterior, a second notch 71 being located along, and a third and fourth notch 71 being located anterior of the approximate position of a wearer's metatarsal-phalangeal joints indicated by line 104, and four notches 71 on the medial side 35 opposing those on the lateral side 36.

FIG. 174 is a top plan view of a spring element 51 having the shape of a curved last 107 and a notch 71 extending from the anterior side 33 forming a longitudinal slit 82 thereby defining two fingers 109.1 and 109.2.

FIG. 175 is a top plan view of a spring element 51 having the shape of a semi-curved last 106 and a notch 71 extending from the anterior side 33 forming a longitudinal slit 82 that nearly extends to line 104 thereby defining two fingers 109.1 and 109.2.

FIG. 176 is a top plan view of a spring element 51 that includes three notches 71 on the lateral side 36, a first notch 71 located posterior, a second notch 71 located along, and third notch 71 located anterior of the approximate position of a wearer's metatarsal-phalangeal joints indicated by line 104, a notch 71 extending from the anterior side 33 forming a longitudinal slit 82 thereby defining two fingers 109.1 and 109.2, and a notch 71 on the medial side 35 opposing the anteriormost notch 71 on the lateral side 36

FIG. 177 is a top plan view of a spring element 51 that includes three notches 71 on the lateral side 36, a first notch 71 located posterior, a second notch 71 located along, and a third notch 71 located anterior of the approximate position of a wearer's metatarsal-phalangeal joints indicated by line 104, a notch 71 extending from the anterior side 33 forming a longitudinal slit 82 thereby defining two fingers 109.1 and 109.2, and two notches 71 on the medial side 35, one opposing the anteriormost and another opposing the posteriormost notches 71 on the lateral side 36.

FIG. 178 is a top plan view of a spring element 51 that includes three notches 71 on the lateral side 36, a first notch 71 located posterior, a second notch 71 located along, and a third notch 71 located anterior of the approximate position of a wearer's metatarsal-phalangeal joints indicated by line 104, a notch 71 extending from the anterior side 33 forming a longitudinal slit 82 thereby defining two fingers 109.1 and 109.2, and three notches 71 on the medial side 35 opposing those on the lateral side 36.

FIG. 179 is a top plan view of a spring element 51 that includes two notches 71 on the lateral side 36, a first notch 71 located posterior and a second notch 71 located anterior of the approximate position of a wearer's metatarsal-phalangeal joints indicated by line 104, a notch 71 extending from the anterior side 33 forming a longitudinal slit 82 thereby defining two fingers 109.1 and 109.2, and a notch 71 on the medial side 35 opposing the anteriormost notch 71 on the lateral side 36.

FIG. 180 is a top plan view of a spring element 51 that includes one notch 71 on the lateral side 36 located posterior of the approximate position of a wearer's metatarsal-phalangeal joints indicated by line 104, and two notches 71 extending from near the anterior side 33 forming two longitudinal slits 82 thereby defining three fingers 109.1, 109.2, and 109.3.

FIG. 181 is a top plan view of a spring element 51 that includes one notch 71 on the lateral side 36 located posterior of the approximate position of a wearer's metatarsal-phalangeal joints indicated by line 104, and three notches 71 extending from near the anterior side 33 forming three longitudinal slits 82 thereby defining four fingers 109.1, 109.2, 109.3, and 109.4.

FIG. 182 is a top plan view of a spring element 51 that includes three notches 71 on the lateral side 36, a first notch 71 being located posterior, a second notch 71 being located along, and a third notch 71 being located anterior of the approximate position of a wearer's metatarsal-phalangeal joints indicated by line 104, and a notch 71 on the medial side 35 opposing the anteriormost notch 71 on the lateral side 36.

FIG. 183 is a top plan view of a spring element 51 that includes four notches 71 on the lateral side 36, a first notch 71 being located posterior, a second notch 71 being located along, and third and fourth notches 71 being located anterior of the approximate position of a wearer's metatarsal-phalangeal joints indicated by line 104, and a notch 71 on the medial side 35 opposing the anteriormost notch 71 on the lateral side 36.

FIG. 184 is a top plan view of a spring element 51 that includes two notches 71 extending from near the anterior side 33 forming two longitudinal slits 82 thereby defining three fingers 109.1, 109.2, and 109.3.

FIG. 185 is a top plan view of a spring element 51 that includes three notches 71 extending from near the anterior side 33 forming three longitudinal slits 82 thereby defining four fingers 109.1, 109.2, 109.3, and 109.4.

FIG. 186 is a top plan view of a spring element 51 that includes one notch 71 on the lateral side 36 located posterior of the approximate position of a wearer's metatarsal-phalangeal joints indicated by line 104, an opposing notch 71 on the medial side 35, and two notches 71 extending from near the anterior side 33 forming two longitudinal slits 82 thereby defining three fingers 109.1, 109.2, and 109.3.

FIG. 187 is a top plan view of a spring element 51 that includes two notches 71 on the lateral side 36, a first notch 71 being located posterior and a second notch 71 being located anterior of the approximate position of a wearer's metatarsal-phalangeal joints indicated by line 104, and two opposing notches 71 on the lateral side 36.

FIG. 188 is a top plan view of a spring element 51 that includes one notch 71 on the lateral side 36 located posterior of the approximate position of a wearer's metatarsal-phalangeal joints indicated by line 104, a notch 71 extending from the anterior side 33 forming a longitudinal slit 82 thereby defining two fingers 109.1 and 109.2, and a notch 71 on the medial side 35 opposing the notch 71 on the lateral side 36.

FIG. 189 is a top plan view of a spring element 51 that includes two notches 71 on the lateral side 36, a first notch 71 being located posterior and a second notch 71 being located anterior of the approximate position of a wearer's metatarsal-phalangeal joints indicated by line 104, a notch 71 extending from the anterior side 33 forming a longitudinal slit 82 thereby defining two fingers 109.1 and 109.2, and two notches 71 on the medial side 35 opposing the two notches 71 on the lateral side 36.

FIG. 190 is a top plan view of a spring element 51 that includes one notch 71 on the lateral side 36 located posterior of the approximate position of a wearer's metatarsal-phalangeal joints indicated by line 104, an opposing notch 71 on the medial side 35, and three notches 71 extending from near the anterior side 33 forming three longitudinal slits 82 thereby defining four fingers 109.1, 109.2, 109.3, and 109.4.

FIG. 191 is a top plan view of a spring element 51 that includes four notches 71 on the lateral side 36, a first notch 71 being located posterior, a second notch 71 being located along, and third and fourth notches 71 being located anterior of the approximate position of a wearer's metatarsal-phalangeal joints indicated by line 104, and four notches 71 on the medial side 35 opposing those on the lateral side 36, and a notch 71 extending from the anterior side 33 forming a longitudinal slit 82 thereby defining two fingers 109.1 and 109.2.

FIG. 192 is a top plan view of a spring element 51 that includes a notch 71 on the medial side 35 being located posterior of the approximate position of a wearer's metatarsal-phalangeal joints indicated by line 104, and the notch 71 then extends laterally and anteriorly towards the anterior side 33 forming a longitudinal slit 82.

FIG. 193 is a top plan view of a spring element 51 that includes a notch 71 on the lateral side 36 being located posterior of the approximate position of a wearer's metatarsal-phalangeal joints indicated by line 104, and the notch 71 then extends medially and anteriorly towards the anterior side 33 forming a longitudinal slit 82 and a relatively wide opening 82 in the forefoot area 58.

FIG. 194 is a top plan view of a spring element 51 that includes a relatively wide opening 82 in the forefoot area 58.

FIG. 195 is a top plan view of a spring element 51 that includes a relatively wide first opening 82 in the forefoot area 58, and a relatively wide second opening 82 in the rearfoot area 68.

FIG. 196 is a top plan view of a spring element 51 that includes a relatively wide opening 82 extending between the forefoot area 58, midfoot area 67, and rearfoot area 68.

FIG. 197 is a top plan view of a spring element 51 that includes three notches 71 on the lateral side 36, a first notch 71 extending substantially within the midfoot area 67 and located posterior of line 104, a second notch 71 located along line 104, and a third notch 71 located anterior of the approximate position of a wearer's metatarsal-phalangeal joints indicated by line 104, and a notch 71 extending from the anterior side 33 forming a longitudinal slit 82 thereby defining two fingers 109.1 and 109.2.

FIG. 198 is a top plan view of a spring element 51 that includes three notches 71 on the lateral side 36, a first notch 71 located posterior of line 104 and extending substantially within the midfoot area 67 and also longitudinally within the rearfoot area 68 thereby imparting a J shape to the spring element 51, a second notch 71 located along line 104, and a third notch 71 located anterior of the approximate position of a wearer's metatarsal-phalangeal joints indicated by line 104, and a notch 71 extending from the anterior side 33 forming a longitudinal slit 82 thereby defining two fingers 109.1 and 109.2.

FIG. 199 is a top plan view of a spring element 51 that includes two notches 71 on the lateral side 36, a first notch 71 located posterior of line 104, a second notch 71 located anterior of the approximate position of a wearer's metatarsal-phalangeal joints indicated by line 104, a notch 71 extending from the anterior side 33 forming a longitudinal slit 82 thereby defining two fingers 109.1 and 109.2, and a relatively wide notch 71 on the medial side 35 extending substantially within the midfoot area 67 and also longitudinally within the rearfoot area 68 thereby imparting a reverse J shape to the spring element 51.

FIG. 200 is a top plan view of a spring element 51 that includes a notch 71 on the lateral side 36 being located posterior of the approximate position of a wearer's metatarsal-phalangeal joints indicated by line 104, and the notch 71 then extends medially and anteriorly towards the anterior side 33 forming a longitudinal slit 82.

FIG. 201 is a top plan view of a spring element 51 that includes a first notch 71 located posterior and a second notch 71 located anterior of the approximate position of a wearer's metatarsal-phalangeal joints indicated by line 104 on the lateral side 36, and also two generally opposing notches 71 on the medial side 35, and two notches 71 extending from the anterior side 33 forming two longitudinal slits 82 thereby defining three fingers 109.1, 109.2, and 109.3. As shown in FIG. 201, the three fingers 109 which are present narrow at their anterior ends, and generally resemble those of a bird or reptile.

FIG. 202 is a top plan view of a spring element 51 that includes a first notch 71 located posterior and a second notch 71 located anterior of the approximate position of a wearer's metatarsal-phalangeal joints indicated by line 104 on the lateral side 36, and also two generally opposing notches 71 on the medial side 35, and three notches 71 extending from the anterior side 33 forming three longitudinal slits 82 thereby defining four fingers 109.1, 109.2, 109.3, and 109.4. As shown in FIG. 201, the four fingers 109 which are present narrow at their anterior ends, and generally resemble those of a bird or reptile.

FIG. 203 is a top plan view of a spring element 51 that includes a removable lateral anterior spring element 77 and medial anterior spring element 78, which are affixed to a posterior spring element 49 by fasteners 29. The medial and lateral spring elements 78 and 77 form fingers 109.1 and 109.2. Unlike the spring element 51 shown in FIG. 37, the posterior spring element 49 of the embodiment shown in FIG. 203 includes a projection 70 shown in dashed phantom lines.

FIG. 204 is a top plan view of a spring element 51 which includes a removable lateral anterior spring element 77 that can be affixed by a fastener 29 to a medial anterior spring element that is formed as a single part with a posterior spring element 49. The medial and lateral spring elements form fingers 109.1 and 109.2 and include notches 71 that can create potential or actual lines of flexion 54 such as along line 104 which corresponds to the approximate position of a wearer's metatarsal-phalangeal joints.

FIG. 205 is a top plan view of a spring element 51 which includes a removable medial anterior spring element 78 that can be affixed by a fastener 29 to a lateral anterior spring element that is formed as a single part with a posterior spring element 49. The medial and lateral spring elements form fingers 109.1 and 109.2 and include notches 71 that can create potential or actual lines of flexion 54 such as along line 104 which corresponds to the approximate position of the metatarsal-phalangeal joints.

FIG. 206 is a top plan view of a spring element 51 which includes a removable lateral anterior spring element 77 that can be affixed by fasteners 29 to a medial anterior spring element that is formed as a single part with a posterior spring element 49. The medial and lateral spring elements form fingers 109.1 and 109.2 and include notches 71 that can create potential or actual lines of flexion 54 such as along line 104 which corresponds to the approximate position of the metatarsal-phalangeal joints.

FIG. 207 is a top plan view of a spring element 51 which includes a removable lateral anterior spring element 77 that can be affixed by fasteners 29 to a medial anterior spring element that is formed as a single part with a posterior spring element 49. The medial anterior spring element includes fingers 109.1 and 109.2, and the lateral anterior spring element 77 includes fingers 109.3 and 109.4.

FIG. 208 is a top plan view of a spring element 51 which includes removable fingers 109.1, 109.2, 109.3 that can be affixed by fasteners 29 to a posterior spring element 49 that includes a projection 70.

FIG. 209 is a top plan view of a spring element 51 that includes an anterior spring element 48 that can be affixed by fasteners 29 to a posterior spring element 49 that includes a projection 70. The anterior spring element 48 includes a notch 71 on the lateral side 36 which extends anteriorly and forms a longitudinal slit 82. Accordingly, the anterior side 33 of the anterior spring element 48 is not interrupted by a longitudinal slit 82. This configuration can possibly be advantageous for use in a soccer shoe, since the anterior side 33 can exhibit greater stiffness and better overall performance characteristics when used to kick a soccer ball.

FIG. 210 is a top plan view of a spring element 51 which includes an anterior spring element 48 that includes a notch 71 and fingers 109.1, 109.2, 109.3, and is affixed by a fastener 29 to a posterior spring element 49 that includes a projection 70.

FIG. 211 is a top plan view of a spring element 51 which includes an anterior spring element 48 that includes notches 71, fingers 109.1, 109.2, 109.3, and is affixed by a fastener 29 to a posterior spring element 49 that includes a projection 70.

FIG. 212 is a top plan view of a spring element 51 which includes an anterior spring element 48 that includes notches 71, fingers 109.1, 109.2, 109.3, and a projection 70 that is affixed by a fastener 29 to a posterior spring element 49.

FIG. 213 is a top plan view of a spring element 51 which includes an anterior spring element 48 which includes notches 71 that extend from the lateral side 36 nearly to the longitudinal axis 59 and also a projection 70 that is affixed by a fastener 29 to a posterior spring element 49.

FIG. 214 is a top plan view of a spring element 51 which includes a medial anterior spring element 78, lateral anterior spring element 77, medial posterior spring element 111 and lateral posterior spring element 112 that are affixed by fasteners 29 to a bracket 110.

FIG. 215 is a top plan view of a spring element 51 which includes an anterior spring element 48 including a longitudinal slit 82, which is affixed by fasteners 29 to a posterior spring element 49 that includes notches 71.

FIG. 216 is a top plan view of a spring element 51 which includes a medial anterior spring element 78 and lateral anterior spring element 77 which are affixed by fasteners 29 to a posterior spring element 49 that includes a notch 71.

FIG. 217 is a top plan view of a spring element 51 which includes a medial anterior spring element 78 formed in continuity as a single part with a lateral posterior spring element 112, and a lateral anterior spring element 77 formed in continuity as a single part with a medial posterior spring element 111, and these two components are affixed together by a fastener 29 thereby forming an X shape.

FIG. 218 is a top plan view of a spring element 51 which includes an anterior spring element 48 that is affixed to a posterior spring element by a fastener 29.

FIG. 219 is a top plan view of a spring element 51 which includes an anterior spring element 48 that is affixed to an intermediate anterior spring element 113 by a fastener 29. The intermediate anterior spring element 113 is affixed in turn to a posterior spring element 49 having a protrusion 70 by a fastener 29.

FIG. 220 is a top plan view of a spring element 51 that includes a notch 71 and a plurality of openings 82. The openings 82 can be aligned to create a line of flexion 54, such as along line 104 corresponding to the approximate position of the metatarsal-phalangeal joints, and also for the purpose of ventilation. It can be readily understood that openings can be introduced in other embodiments of a spring element disclosed herein, and the like, for the purpose of enhancing ventilation, dissipating heat, or reducing weight.

FIG. 221 is a longitudinal cross-sectional side view of an article of footwear 22 including a spring element 51 including a superior spring element 47, an anterior spring element 48.2, and an inferior spring element 50. The anterior spring element 48.2 is affixed to the anterior spacer 55.2 and superior spring element 47 with fasteners 29. Also shown are outsole 43 traction members 115 affixed to the anterior spring element 55.2 and the inferior spring element 50. The traction members 115 affixed to the anterior spring element 55.2 can be superimposed over openings 72 in the anterior spring element 55.2, and when a force application is imparted thereto, the traction member 115 can deflect upwards to greater degree and thereby provide enhanced cushioning effects.

FIG. 222 is a cross-sectional view taken along line 222-222 of the inferior spring element 50 shown in FIG. 221. Shown are outsole 43 traction members 115 which can be affixed to the inferior side 38 of the inferior spring element 50, e.g., by conventional adhesive means and including self-adhesive, vulcanization, chemical bonding, mechanical means, and the like.

FIG. 223 is a cross-sectional view taken along a line similar to 222-222 of an alternate inferior spring element 50 including outsole 43 traction members 115. The traction members 115 adjacent the medial side 35 and lateral side 36 encompass the respective sides of the inferior spring element 50.

FIG. 224 is a cross-sectional view taken along a line similar to 222-222 of an alternate inferior spring element 50 including outsole 43 traction members 115. The traction members 115 adjacent the medial side 35 and lateral side 36 encompass the respective sides of the inferior spring element 50 and have a gently rounded or arcuate configuration.

FIG. 225 is a cross-sectional view taken along a line similar to 222-222 of an alternate inferior spring element 50 including outsole 43 traction members 115. A portion of the traction members 115 extend into openings 72 in the inferior spring element 50, and can thereby achieve an enhanced mechanical bond.

FIG. 226 is a cross-sectional view taken along a line similar to 222-222 of an alternate inferior spring element 50 including outsole 43 traction members 115. A portion of the traction members 115 including a head 65.1 and a stem 64.1 can extend through openings 72 in the inferior spring element 50, and can thereby achieve a mechanical bond thereto.

FIG. 227 is a cross-sectional view taken along a line similar to 222-222 of an alternate inferior spring element 50 including outsole 43 traction members 115. The traction members 115 can be in communication with one another by a thin web 114, but do not normally extend into the openings 72 in the inferior spring element 50. Accordingly, when a force application is imparted to the traction members 115, they can be caused to deflect into the openings 72 in the inferior spring element 50.

FIG. 228 is a cross-sectional view taken along a line similar to 222-222 of an alternate inferior spring element 50 including outsole 43 traction members 115. The traction members 115 are in communication with one another by a thin web 114 and a portion of the web 114 extends into the openings 72 in the inferior spring element 50. Accordingly, when a force application is imparted to the traction members 115, they can be caused to deflect into the openings 72 in the inferior spring element 50 and a portion of the web 114 then protrude on the superior side 37 of the inferior spring element 50.

FIG. 229 is a cross-sectional view taken along a line similar to 222-222 of an alternate inferior spring element 50 including outsole 43 traction members 115. The traction members 115 are in communication with one another by a thin web 114 which extends into the openings 72 in the inferior spring element 50. Accordingly, when a force application is imparted to the traction members 115, they can be caused to deflect into the openings 72 in the inferior spring element 50 and a portion of the web 114 can then protrude on the superior side 37 of the inferior spring element 50. Also shown are traction members 50 adjacent the medial side 35 and lateral side 36 which are not bounded on all sides by the inferior spring element 50.

FIG. 230 is a cross-sectional view taken along a line similar to 222-222 of an alternate inferior spring element 50 including outsole 43 traction members 115. The traction members 115 can be in communication with one another by a thin web 114 and extend into the openings 72 in the inferior spring element 50. Accordingly, when a force application is imparted to the traction members 115, they can be caused to deflect into the openings 72 in the inferior spring element 50 and a portion of the web 114 can then protrude on the superior side 37 of the inferior spring element 50. Also shown are traction members 50 adjacent the medial side 35 and lateral side 36 which are not bounded on all sides by the inferior spring element 50. As shown, the traction members 115 can have a triangular shape, or other geometric shapes. The asymmetric triangular shape shown in FIG. 230 can cause the traction members 115 to be so biased as to deflect in a desired direction, and this can influence the exhibited traction characteristics of the article of footwear 22.

FIG. 231 is a cross-sectional view taken along a line similar to 222-222 of an inferior spring element 50 similar to that shown in FIG. 228, but also showing the deflection of a traction member 115 relative to an opening 72 in the inferior spring element 50 due to a force application caused by impact with a rock 116 laying upon the ground support surface 117.

FIG. 232 is a bottom plan view of a spring element 51 including an inferior spring element 50 including openings 72 shown with phantom dashed lines and an outsole 43 having a web 114 and traction members 115 made of a resilient elastomeric material. Further, some of the traction members 115 adjacent to the medial side 35 and lateral side 36 are not bounded by the inferior spring element 50, as also shown in FIG. 229.

FIG. 233 is a longitudinal cross-sectional side view of an alternate article of footwear 22 including a spring element 51 including a superior spring element 47, anterior spring element 48.2, anterior spacer 55.2, inferior spring element 50, posterior fluid-filled bladder 101.1, and an anterior fluid-filled bladder 101.2. As shown, the anterior spring element 48.2 can optionally include openings 72 therethrough which can enhance the deflection of traction members 115. It can be readily understood that the inferior spring element 50 could also include similar openings 72 and related structure with respect to traction members 115.

FIG. 234 is a longitudinal cross-sectional lateral side 36 view of the article of footwear 22 and spring element 51 shown in FIG. 45. Although the flexural axis 59 of the inferior spring element 50 is diagonal with respect to the longitudinal axis 69, the magnitude of downward concavity, slope, curvature, and general configuration of the inferior spring element 50 in the area adjacent to and immediately posterior of the flexural axis 59 is essentially the same on both the medial side 35 and lateral side 36. It can be readily understand that other alternate inferior spring elements 50 could have different configurations, but nevertheless, have similar magnitude of downward concavity, slope, and curvature in the area adjacent to and immediately posterior of the flexural axis 59, that is, on both the medial side 35 and lateral side 36 of each given embodiment.

FIG. 235 is a longitudinal cross-sectional lateral side view of the article of footwear 22 and spring element 51 shown in FIG. 49. Again, the inferior spring element 50 could alternately have a flexural axis 59 that is diagonal with respect to the longitudinal axis 69. As also shown in FIG. 129, the anterior spacer 55.2 is positioned anterior the approximate position of the metatarsal-phalangeal joints indicated by line 104. Further, the anterior spacer 55.2 does not extend rearwards or posteriorly so far on the lateral side 36 as on the medial side 35. Other possible configurations of anterior spacer 55.2 are also shown in FIGS. 127-128.

FIG. 236 is a bottom plan view of an article of footwear 22 having the outsole 43 broken away or removed to show a midsole 26 in the rearfoot area 68 on the medial side 35. The spring element 51 includes a superior spring element 47, and an inferior spring element 50. As shown with a dashed phantom line, the superior spring element 47 is substantially located within the midfoot area 67 and rearfoot area 68. The inferior spring element 50 is located on the lateral side 36.

FIG. 237 is a bottom plan view of an article of footwear 22 having the outsole 43 broken away or removed to show a midsole 26 in the rearfoot area 68 on the medial side 35. The spring element 51 consists of an inferior spring element 50, and a superior spring element 47 including a posterior spring element 49 and an anterior spring element 48. The inferior spring element 50 extends slightly beyond the longitudinal axis 69, thus into a portion the medial side 35.

FIG. 238 is a bottom plan view of an article of footwear 22 having the outsole broken away or removed to show a midsole 26 in the rearfoot area 68 on the medial side 35. The spring element 51 includes a superior spring element 47 which extends substantially full length, and an inferior spring element 50. The inferior spring element 50 extends slightly more anteriorly and also further beyond the longitudinal axis 69 and towards the medial side 35 than the embodiment shown in FIG. 237.

FIG. 239 is a bottom plan view of an article of footwear 22 having the outsole broken away or removed to show a midsole 26 in the rearfoot area 68 on the medial side 35. The spring element 51 includes a superior spring element 47, and an inferior spring element 50. The superior spring element 47 includes two notches 71 on the lateral side 36, and a notch 71 on the medial side 35 that extends laterally and anteriorly to form a longitudinal slit 82. The inferior spring element 50 also projects slightly towards the medial side 35 near the posterior side 34.

FIG. 240 is a bottom plan view of an article of footwear 22 having the outsole 43 broken away or removed to show a midsole 26 in the rearfoot area 68 on the medial side 35. The spring element 51 includes a superior spring element 47, and an inferior spring element 50. The superior spring element 47 includes two notches 71 on the lateral side 36, and the more posterior notch 71 extends medially and anteriorly to form a longitudinal slit 82. The inferior spring element 50 projects more substantially towards the medial side 35 near the posterior side 34 than in the embodiment shown in FIG. 239.

FIG. 241 is a bottom plan view of an article of footwear 22 having an outsole 43 and including a midsole 26 in the rearfoot area 68 on the medial side 35. The spring element 51 includes a superior spring element 47, and an inferior spring element 50. The superior spring element 47 is shown with a dashed phantom line and includes one notch 71 on the lateral side 36, and another notch 71 on the medial side 35 consistent with line 104 indicating the approximate position of the metatarsal-phalangeal joints. The inferior spring element 50 also projects slightly towards the medial side 35 near the posterior side 34. The fastener 29 for affixing the inferior spring element 50 is not visible from the bottom side, thus is shown with a dashed phantom line.

FIG. 242 is a cross-sectional view taken along line 242-242 of the article of footwear 22 shown in FIG. 241. As shown, the superior spring element 47 is positioned under the insole 31 and inside the shoe upper 23.

FIG. 243 is a cross-sectional view taken along a line similar to 242-242 shown in FIG. 241 showing an alternate article of footwear 22 and construction relative to that shown in FIG. 242. As shown, the superior spring element 47 is positioned externally with respect to the shoe upper 23, and also extends about the medial side 35 and lateral side 36 of the shoe upper 22 providing a heel counter 24.

FIG. 244 is a cross-sectional view taken along a line similar to 242-242 shown in FIG. 241 showing an alternate article of footwear 22 and construction relative to that shown in FIG. 242. As shown, the superior spring element 47 is positioned externally with respect to the shoe upper 23 and is partially covered by the midsole 26 on the medial side 35, but is exposed and partially visible on the lateral side 36.

FIG. 245 is a cross-sectional view taken along a line similar to 242-242 shown in FIG. 241 showing an alternate article of footwear 22 and construction relative to that shown in FIG. 242. As shown, the superior spring element 47 is positioned externally with respect to the shoe upper 23 and can be completely or partially covered by the midsole 26. The superior spring element can be exposed on the medial side 35 as shown, or alternately be exposed on the lateral side 36, anterior side 33, or posterior side 34. Further, the superior spring element 47 can be permanently affixed in place relative to the midsole 26, or alternately, can be removed from the midsole 26 and be replaced, that is, the superior spring element 47 can optionally be removed from the space or opening 72 in the midsole 26 in which it is located.

FIG. 246 is a bottom plan view of an article of footwear 22 including a midsole 26 on the medial side 35, and also a spring element 51 including a superior spring element 47 and an inferior spring element 50. The inferior spring element 50 is located on the lateral side 36 of the rearfoot area 68, and is integral with an anterior spring element 48.3 located on the lateral side 36 in the forefoot area 58.

FIG. 247 is a bottom plan view of an article of footwear 22 including a spring element 51 including a superior spring element 47, and an inferior spring element 50. The inferior spring element 50 is located in the rearfoot area 68, and is integral with an anterior spring element 48.3 located in the forefoot area 58.

FIG. 248 is a bottom plan view of an article of footwear 22 including a spring element 51 including a superior spring element 47, and an inferior spring element 50. The inferior spring element 50 is located in the rearfoot area 68, and includes a notch 71 on the lateral side 36 in the midfoot area 67, and is integral with an anterior spring element 48.3 located in the forefoot area 58.

FIG. 249 is a longitudinal cross-sectional lateral side view of the embodiment shown in FIG. 248 showing an article of footwear 22 including a spring element 51 including a superior spring element 47, and an inferior spring element 50. The inferior spring element 50 is located in the rearfoot area 68 and is integral with an anterior spring element 48.3 that is located in the forefoot area 58. Accordingly, an article of footwear 22 including an inferior spring element 50 which is integral with an anterior spring element 48.3 can include the structure disclosed in the specification and shown in the drawing figures of U.S. patent application Ser. No. 10/719,668 published as US 2005/0108891 by Michael Aveni and assigned to Nike, Inc., this patent application hereby being incorporated by reference herein.

FIG. 250 is a flow diagram regarding a method of making a custom article of footwear.

FIG. 251 is a flow diagram regarding a method of making a custom article of footwear by providing sufficient footwear components.

FIG. 252 is a flow diagram regarding a method of making a custom article of footwear by providing at least one footwear component.

FIG. 253 is a flow diagram regarding a method of making a custom article of footwear using a vending device.

The collecting of data step shown in FIGS. 250-253 could be done at a retail store or other point of purchase or service location by spoken word and direct observation and measurement by a wearer possibly interacting with a retail employee or other service provider. Alternately, the collecting of data could be done by spoken word or key selection over the telephone, or by written word such as letter, Fax, e-mail, the use of a computer possibly including a keyboard, a touch screen, voice recognition capability, a wireless computer, a cell phone, or other data storage and retrieval system, or other methods of transmitting data and information such as with the use of two or three dimensional scanners or imaging devices, photos, video, or other tangible mediums of expression. The collecting step could include collecting data relating to a customer or individual, e.g., such as, their name, mailing address, age, sex, telephone number, e-mail address, identification number, password, desired method of payment, desired method of delivery, but also data relating to their weight, length and width foot size, arch characteristics, selected athletic activity, performance level, and also preferences with respect to a custom article of footwear and components thereof. It can be readily understood that a customer can order and purchase a custom article of footwear for a third party, e.g., a customer who is a parent may place a footwear order and make a purchase for another individual such as a family member.

The creating of information and intelligence step can include, e.g., determining for an individual, customer, or wearer a suitable footwear length and width size, a suitable footwear last or other three dimensional footwear model or shape, providing a selection of footwear category types and a selection of different styles of a custom article of footwear or at least one component thereof, determining and providing a finite set of combinations and permutations of a plurality of footwear components and a plurality of variations of a plurality of these components for making a custom article of footwear, determining present inventory and location thereof, causing new inventory to be created, and determining the most efficient and cost effective location from which to distribute and deliver a custom article of footwear or at least one component thereof.

The providing a selection of a plurality of footwear components, and a plurality of variations of a plurality of the components step can include providing a plurality of footwear product categories, and a plurality of possible footwear models or skus, and a further plurality of colors, materials, and footwear components relating to the plurality of footwear models or skus. Accordingly, this step can include creating and providing a plurality of virtual custom articles of footwear derived from a database in a computer environment or creating and providing different actual custom articles of footwear and related components to a customer, individual, or wearer.

The selecting step can include selecting a plurality of sufficient footwear components for making a new custom article of footwear, or alternatively, changing out and replacing a footwear component, or renewing at least one footwear component for re-making a custom article of footwear and extending its service life.

The step of providing the information and intelligence and the sufficient footwear components to physical location at which the custom article of footwear can be made could be done at a retail store and an employee could then provide the information and intelligence to their own location, or alternately to a different remote location. In FIG. 250, this step broadly entails providing information and intelligence to a physical location at which the custom article of footwear can be made. In FIG. 251, the information and intelligence and sufficient footwear components for making a custom article of footwear is defined as being provided to a private residence or home. Generally speaking, the step of providing information and intelligence and sufficient footwear components for making a custom article of footwear can include the possibility of the information and intelligence being sent to a factory, a vendor, a warehouse and distribution center, a retail store, a medical facility, a service center, a sales office, a mail or delivery courier service, a corporate headquarters, a private residence and home, or otherwise to a customer or individual for which the footwear product is intended, whether these locations be used in complete or partial combination.

In FIG. 250, the step of securing a plurality of sufficient footwear components for making a custom article of footwear can include the possibility of an employee at a retail store, factory, warehouse and distribution center, medical facility, service center, sales office, corporate headquarters, or alternately, a customer or third party individual completing the assembly for making the custom article of footwear. In a retail store, this step could entail a retail employee completing the assembly for making of a custom article of footwear and then delivering it directly by hand over the counter or other means to a customer or individual. When the customer or individual is making their selections and placing an order from a remote location such as their private residence, this step could include the delivery of a custom article of footwear by mail, courier, or express mail courier service such as UPS or FEDEX within a selected number of hours or days. Alternatively, the customer or individual could receive and possibly secure the sufficient footwear components, thus complete the assembly for making the custom article of footwear, as defined in FIG. 251.

The possibility of providing at least one footwear component to a customer or individual for either changing out, or renewing one or more components of a custom article of footwear is defined in FIG. 252. One or more footwear components could be delivered to a designated address, whereby the assembly for making of a custom article of footwear could be completed. The designated address could include a factory, a vendor, a warehouse and distribution center, a retail store, a medical facility, a service center, a sales office, a corporate headquarters, a mail or delivery courier service, or the private residence of a customer or individual, whether in complete or partial combination. In a retail store or setting, the delivery of at least one footwear component could be made directly to a customer or individual by a retail employee. When the customer or individual is making their selections and placing an order from a remote location such as their private residence or home, the selected footwear component(s) can be provided by mail, courier, or express mail courier service such as UPS or FEDEX within a selected number of hours or days. The customer or individual could then complete the assembly for making the custom article of footwear.

FIG. 253 relates to the use of a vending device for making and delivering at least one footwear component for use in making a custom article of footwear. The vending device could consist of a vending machine. Alternatively, the vending device could include a keyboard or touch screen associated with a computer, cell phone, or other data storage and retrieval system that includes or is linked with an inventory control system and also a substantially automated footwear component delivery system. Accordingly, in a shopping mall, retail store, private home, or some other remote location, a customer or individual could, e.g., input data, search, select, and complete a transaction to purchase at least one footwear component, or an entire custom article of footwear if desired with the use of a vending device.

FIG. 254 is a bottom view of an article of footwear 22 showing a plurality of traction members 115 associated with the sole 32 and outsole 43 extending through a plurality of openings 72 positioned between bridges 97 present in the inferior side 38 of the upper 23. The traction members 115 can be permanently or selectively and removably affixed to a lasting board 79 or spring element 51. The traction members 115 can extend through a plurality of openings in the forefoot area 58, midfoot area 67, rearfoot area 68, and partial or complete combinations thereof. Also shown by dashed lines is the approximate position of a strap 118 for the upper 23 including closure means 120 such as openings 72 and eyestays 139 for the passage of laces 121, or other mechanical engagement means such as VELCRO® hook and pile.

FIG. 255 is an internal longitudinal cross-sectional lateral side view of the article of footwear 22 shown in FIG. 254 showing a spring element 51 including traction members 115 extending through openings 72 in the upper 23, and a removable strap 118 which is substantially positioned inside the upper 23. The strap 118 can include openings for the passage of traction members 115 therethrough, or alternately, can include traction members which can be caused to pass through openings in the inferior side 38 of the upper 23. The strap 118 also includes closure means 120 such a openings 72 and eyestays 139 for receiving laces 121, or other mechanical engagement means such as VELCRO® hook and pile. As shown, portions of the strap 118 can extend through one or more openings 72 in the side or vamp 52 of the upper 23. As shown, the upper 23 includes a conventional U or V shaped opening on the superior side 37. However, as shown in FIG. 283, the upper 23 could alternately be substantially closed on the superior side 37 in the manner of the so-called "Huarache style" shoe upper as commercialized by Nike, Inc., e.g., in the HUARACHE®, MOWABB®, and more recently, the PRESTO®. Alternately, as shown in FIG. 284, portions of the strap 118 can remain substantially within the upper 23, but can be exposed or otherwise accessible on the superior side 37 of the upper 23. The strap 118 can possibly be at least partially maintained in position relative to the upper 23 using a retainer 123.

FIG. 256 is a medial side view of an article of footwear 22 with parts broken away showing a spring element 51 including traction members 115 extending through openings 72 in the upper 23, and a removable strap 118 or quarter(s) 119 substantially positioned outside of the upper 23. The removable strap 118 or quarter(s) 119 includes closure means 120 such as openings 72 and eyestays 139 for the passage of laces 121, or other mechanical engagement means such as VELCRO® hook and pile, and can be affixed in position by at least one fastener 29 which can also possibly be used to simultaneously affix the inferior spring element 50 to the superior spring element 47. The removable strap 118 or quarter(s) 119 can also include at least one traction member 115 and portion of the sole 32 or outsole 43. When the removable strap 118 or quarter(s) 119 is made from a thermoplastic or thermoset material a portion of the sole 32 or outsole 43 can be easily directed bonded or adhered thereto.

FIG. 257 is a bottom view of the article of footwear 22 shown in FIG. 256 showing a plurality of traction members 115 extending through openings 72 in the upper 23, and a removable strap 118 or quarters 119 which is substantially positioned outside the upper 23. As shown, the strap 118 or quarters 119 can include at least one middle outsole element 45, and closure means 120 such as openings 72 and eyestays 139 for the passage of laces 121, or other mechanical engagement means such as VELCRO® hook and pile. The strap 118 or quarters 119 can be affixed in position by at least one fastener 29 which can also possibly be used to simultaneously affix the inferior spring element 50 to the superior spring element 47.

FIG. 258 is a bottom view of an article of footwear 22 showing a plurality of traction members 115 extending through openings 72 in the upper 23 in a configuration or pattern which differs from that shown in FIG. 254. Many other configurations are possible.

FIG. 259 is a bottom view of an article of footwear 22 showing a plurality of traction members 115 extending through openings 72 in the upper 23 in a configuration or pattern which differs from that shown in FIG. 254. Many other configurations are possible.

FIG. 260 is a bottom view of an article of footwear 22 showing a plurality of traction members 115 extending through openings 72 in the upper 23 in a configuration or pattern which differs from that shown in FIG. 254. Many other configurations are possible.

FIG. 261 is a side exploded view of an article of footwear 22 showing a plurality of components including an insole 31, superior spring element 47, fastener 29, anterior outsole element 44, upper 23, strap 118 including closure means and at least one traction member 115, inferior spring element 50, and posterior outsole element 46. Instead, or in addition to a strap 118, it can be readily understood that a more conventional upper 23 could be used including a plurality of openings 72 and eyestays 139 for accommodating laces 121. Further, a strap 118 does not necessarily have to include a traction element 115. A traction element 115 or middle outsole element 45 can be formed as a separate and selectively removable part. The anterior outsole element 44 and posterior outsole element 46 can be affixed to the spring element 51, and particular portions of sub-components thereof, by chemical bonding, vulcanization, adhesive, self-adhesive, and also by mechanical engagement means including male parts 85 and female parts 86 such as snap-fit, tongue and groove, hook 27, fastener 29, hook and pile, and the like.

FIG. 262 is a bottom view of an anterior outsole element 44 including an outsole 43 having traction members 115 which are affixed in functional relation to a backing 30. The backing 30 extends between adjacent traction members 115, but is minimized therebetween by the inclusion of openings 72, thereby saving both weight and manufacturing cost.

FIG. 263 is a bottom view of an anterior outsole element 44 including an outsole having traction members 115 which are affixed in functional relation to a backing 30. The backing 30 extends between adjacent traction members 115 and substantially underlies the forefoot area 58. The backing 30 can consist of a thin web 114 of the same material which is used to make the traction members 115, or a different formulation of the same material, or alternately, a completely different material composition. The presence of a backing 30 or web 114 can enable the anterior outsole element 44 to be inserted in position within the upper 23 causing the traction members 115 to extend through openings 72 in the inferior side 38 of the upper 23, e.g., as shown in FIG. 254. The thin web 114 or backing 30 can then serve to maintain the registered orientation of the traction members 115, and also serve as a stop thereby preventing the individual traction members 115 and anterior outsole element 44 from passing completely through the upper 23. The anterior outsole element 44 can include male and/or female three dimensional structures for mating with compatible male and/or female three dimensional structures included or affixed upon the superior spring element 47, as shown in FIGS. 287 and 288.

FIG. 264 is a top view of an anterior outsole element 44 including an outsole 43 having traction members 115 that are affixed in functional relation to a backing 30, an opening 72, and fasteners 29 having female parts 86.

FIG. 265 is a top view of an anterior outsole element 44 including an outsole 43 having traction members 115 that are affixed in functional relation to a backing 30, openings 72, a plurality of fasteners 29 which include both male parts 85 and also female parts 86.

FIG. 266 is a side cross-sectional view of a portion of a spring element 51 and a fastener 29 including a male part 85 having a hook 27. When the spring element 51 is made of metal, the opening 72 and fastener 29 including a male part 85 and a hook 27 can be formed by being cut or punched. Alternately, the male part 85 can be molded or affixed in position with a fastener 29. In any case, the male part 85 can engage a complimentary female part 86 and thereby affix the spring element 51 to an upper 23 or a portion of the sole 32 of an article of footwear 22.

FIG. 267 is a top view of the spring element 51 having an opening 72 and a fastener 29 including a male part 85 having a hook 27 shown in FIG. 266.

FIG. 268 is a top view of a spring element 51 and a fastener 29 including a female part 86 having an opening 72 and a notch 71.

FIG. 269 is a side cross-sectional view of a spring element 51 and an alternate fastener 29 including a male part 85 having a hook 27.

FIG. 270 is a top view of the fastener 29 including a male part 85 having a hook 27 shown in FIG. 269.

FIG. 271 is a side cross-sectional view of a spring element 51 and an alternate fastener 29 including a male part 85 having a hook 27.

FIG. 272 is a top view of the fastener 29 including a male part 85 having a hook 27 shown in FIG. 271.

FIG. 273 is a side cross-sectional view of a spring element 51 and a fastener 29 including a male part 85 such as a screw or bolt and a female part 86 such as a nut.

FIG. 274 is a side cross-sectional view of a spring element 51 and a fastener 29 including a male part 85 and a female part 86. The female part 86 of the fastener 29 can further include its own male part 85.1 having both an upper and lower flange 124 for engaging a complimentary female part possibly associated with the upper 23, backing 30, or a portion of the sole 32.

FIG. 275 is a side cross-sectional view of a spring element 51 and a fastener 29 including a male part 85 and a female part 86. The male part 85 can pass through a bushing 125 which is inserted into an opening in the spring element 51. The female part 86 of the fastener 29 can further include its own male part 85.1 having a lower flange 124 for engaging a complimentary female part possibly associated with the upper 23, backing 30, or a portion of the sole 32.

FIG. 276 is a side cross-sectional view of a spring element 51 and a fastener 29 including a male part 85 and a female part 86. The female part 86 of the fastener 29 can also further include its own male part 85.1 having a lower flange 124 for engaging a complimentary female part 86 possibly associated with the upper 23, backing 30, or a portion of the sole 32.

FIG. 277 is a side cross-sectional view of a spring element 51 including an opening 72 and a fastener 29 including a male part 85 having a hook 27. The male part 85 having a hook 27 can consist of a portion of the backing 30 or sole 32, and can be affixed in functional relation to the female part 86 including a recessed opening 72 in the spring element 51.

FIG. 278 is a side cross-sectional view of a spring element 51 and a fastener 29 including a male part 85 affixed to a female part 86 which consists of a portion of the backing 30 to which is affixed a portion of the sole 32. Alternately, as shown in FIG. 286, the female part 86 can consist of a portion of the sole 32 without the presence of an intermediate layer of backing 30.

FIG. 279 is a side cross-sectional view of a spring element 51 and a fastener 29 including a male part 85 and a female part 86. The female part 86 can include a male part 85.1 such as a flange 124 for engaging a complimentary female part possibly associated with the upper 23, backing 30, or a portion of the sole 32.

FIG. 280 is a side cross-sectional view of a spring element 51 and a fastener 29 including a male part 85 having a flange 124. As shown, the fastener 29 can optionally pass through a bushing 125 which is inserted in the spring element 51. Alternately, the superior side 37 of the spring element 51 and/or bushing 125 can be recessed so that the male part 85 fits relatively flush. The inferior side 38 of the fastener 29 includes a flange 124 for engaging a complimentary female part possibly associated with the upper 23, backing 30, or a portion of the sole 32.

FIG. 281 is a side cross-sectional view of a spring element 51 and a fastener 29 including a male part 85 and a female part 86. The female part 86 includes an extension which can fit into the spring element 51 in the manner of a bushing 125, and also includes upper and lower male parts 85.1 consisting of flanges 124. The upper flange 124 serves as a stop against the inferior side 38 of the spring element 51 when the male part 85 and female part 86 are affixed in functional relation, whereas the lower flange 124 can be used to engage a complimentary female part possibly associated with the upper 23, backing 30, or a portion of the sole 32.

FIG. 282 is a side cross-sectional view of a spring element 51 and a fastener 29 including a male part 85 including an upper and lower flange 124, and a female part 86. The female part 86 fits into recess on the superior side 37 of the spring element 51 and can be positioned into an opening 72 therein, and the male part 85 can then be affixed to the female part 86 from the inferior side 38 of the spring element 51. The upper flange 124 on the male part 85 serves as a stop against the inferior side 38 of the spring element 51 when the male part 85 and female part 86 are affixed in functional relation, whereas the lower flange 124 on the male part 85 can be used to engage a complimentary female part possibly associated with the upper 23, backing 30, or a portion of the sole 32.

FIG. 283 is a medial side external view of an article of footwear 22 with parts broken away showing the use of a selectively removable strap 118, a spring element 51 having outsole 43 traction members 115 affixed thereto, and an upper 23 that is substantially closed on the superior side 37 in the manner of the so-called "Huarache style" shoe upper as commercialized by Nike, Inc., e.g., in the HUARACHE®, MOWABB®, and more recently, the PRESTO®, that is, the upper 23 does not include a conventional U or V shaped opening on the superior side 37 in the forefoot area 58.

FIG. 284 is an internal longitudinal cross-sectional lateral side view of an article of footwear 22 showing a spring element 51 including traction members 115 extending through openings 72 in the upper 23, and a removable strap 118 which is substantially positioned inside the upper 23. The superior portions of the strap 118 are exposed, or otherwise accessible to a wearer on the superior side 37 of the upper 23. The strap 118 can include openings for the passage of traction members 115 therethrough, or alternately, can include traction members which can be caused to pass through openings in the inferior side 38 of the upper 23. The strap 118 also includes closure means 120 such a openings 72 and eyestays 139 for receiving laces 121, or other mechanical engagement means such as VELCRO® hook and pile. As shown, portions of the strap 118 can extend through one or more retainers 123 which are affixed in functional relation to the inside of the vamp 52 of the upper 23.

FIG. 285 is an exploded medial side view of an article of footwear 22 which is somewhat similar to that shown in FIG. 261 showing a plurality of components including an insole 31, superior spring element 47, a fastener 29 including a male part 85 and female part 86, anterior outsole element 44, middle outsole element 45, upper 23, inferior spring element 50, and posterior outsole element 46. As shown, the middle outsole element 45 can be formed as a separate and selectively removable part. The anterior outsole element 44 can be affixed to the superior spring element 47 which can possibly include an anterior spring element 48. Further, the middle outsole element 45 can be affixed via fastener 29 to the superior spring element 47 which can possibly include a posterior spring element 49. The posterior outsole element 46 can be affixed to the inferior spring element 50 by chemical bonding, vulcanization, adhesive, self-adhesive, and also by mechanical engagement means including male parts 85 and female parts 86 such as snap-fit, tongue and groove, hook 27, fastener 29, hook and pile, and the like. If desired, the anterior outsole element 44 and middle outsole element 45 can also be affixed to their corresponding parts using like means. The inferior spring element 50 can be selectively and removably affixed to the superior spring element 47 by a fastener 29 including a male part 85 and a female part 86. It can be readily understood that at least a portion the fastener 29 can be integrated or otherwise included as a portion of the inferior spring element 50, middle outsole element 45, or superior spring element 47, and as desired, the fastener 29 can either be made visible, or invisible to an observer or customer on the exterior or interior of the article of footwear 22.

FIG. 286 is a cross-sectional side view of a spring element 51 and a fastener 29 including a male part 85 affixed to a female part 86 which constitutes a portion of the sole 32 such as a midsole 26 or outsole 43.

FIG. 287 is an exploded medial side view of an article of footwear 22 which is somewhat similar to that shown in FIG. 285 showing a plurality of components including an insole 31, superior spring element 47 including female mating structures 129, a fastener 29 including a male part 85 and female part 86, anterior outsole element 44 including male mating structures 128, middle outsole element 45, upper 23, inferior spring element 50, and posterior outsole element 46. As shown, the middle outsole element 45 can be formed as a separate and selectively removable part. The middle outsole element 45 can be affixed via fastener 29 to the superior spring element 47. The anterior outsole element 44 can be affixed in functional relation to the superior spring element 47 by engagement of the male mating structures 128 with the female mating structures 129. The male mating structures 128 and female mating structures 129 can be formed in semi-spherical shapes, or other mating geometric shapes such as square, rectangle, triangle, pentagon, hexagon, octagon, other symmetrical shapes, or asymmetrical shapes. The superior spring element 47 can possibly include an anterior spring element 48 and a posterior spring element 49. The posterior outsole element 46 can be affixed to the inferior spring element 50 by chemical bonding, vulcanization, adhesive, self-adhesive, and also by mechanical engagement means including male parts 85 and female parts 86 such as snap-fit, tongue and groove, hook 27, fastener 29, hook and pile, and the like. If desired, the anterior outsole element 44 and middle outsole element 45 can also be affixed to their corresponding parts using like means. The inferior spring element 50 can be selectively and removably affixed to the superior spring element 47 by a fastener 29 including a male part 85 and a female part 86. It can be readily understood that at least a portion the fastener 29 can be integrated or otherwise included as a portion of the inferior spring element 50, middle outsole element 45, or superior spring element 47, and as desired, the fastener 29 can either be made visible, or invisible to an observer or customer on the exterior or interior of the article of footwear 22.

FIG. 288 is an exploded medial side view of an article of footwear 22 which is somewhat similar to that shown in FIG. 287 showing a plurality of components including an insole 31, superior spring element 47 including male mating structures 128, a fastener 29 including a male part 85 and female part 86, anterior outsole element 44 including female mating structures 129, middle outsole element 45, upper 23, inferior spring element 50, and posterior outsole element 46. As shown, the middle outsole element 45 can be formed as a separate and selectively removable part. The middle outsole element 45 can be affixed via fastener 29 to the superior spring element 47. The anterior outsole element 44 can be affixed in functional relation to the superior spring element 47 by engagement of the female mating structures 129 with the male mating structures 128. The male mating structures 128 and female mating structures 129 can be formed in semi-spherical shapes, or other mating geometric shapes such as square, rectangle, triangle, pentagon, hexagon, octagon, other symmetrical shapes, or asymmetrical shapes. The superior spring element 47 can possibly include an anterior spring element 48 and a posterior spring element 49. The posterior outsole element 46 can be affixed to the inferior spring element 50 by chemical bonding, vulcanization, adhesive, self-adhesive, and also by mechanical engagement means including male parts 85 and female parts 86 such as snap-fit, tongue and groove, hook 27, fastener 29, hook and pile, and the like. If desired, the anterior outsole element 44 and middle outsole element 45 can also be affixed to their corresponding parts using like means. The inferior spring element 50 can be selectively and removably affixed to the superior spring element 47 by a fastener 29 including a male part 85 and a female part 86. It can be readily understood that at least a portion the fastener 29 can be integrated or otherwise included as a portion of the inferior spring element 50, middle outsole element 45, or superior spring element 47, and as desired, the fastener 29 can either be made visible, or invisible to an observer or customer on the exterior or interior of the article of footwear 22.

FIG. 289 is an exploded medial side view of an article of footwear 22 which is generally similar to that shown in FIG. 287 showing a plurality of components including an insole 31, superior spring element 47 including female mating structures 129, a fastener 29 including a male part 85 and female part 86, anterior outsole element 44 including male mating structures 128, middle outsole element 45, upper 23, inferior spring element 50, and posterior outsole element 46. As shown, the middle outsole element 45 can be formed as a separate and selectively removable part. The middle outsole element 45 can be affixed via fastener 29 to the superior spring element 47. The anterior outsole element 44 can be affixed in functional relation to the superior spring element 47 by engagement of the female mating structures 129 with the male mating structures 128. The male mating structures 128 and female mating structures 129 can be formed in semi-spherical shapes, or other mating geometric shapes such as square, rectangle, triangle, pentagon, hexagon, octagon, other symmetrical shapes, or asymmetrical shapes. As shown in FIG. 289, the superior spring element 47 includes an anterior spring element 48 and a posterior spring element 49 which can be affixed in functional relation by at least one fastener 29. The posterior outsole element 46 can be affixed to the inferior spring element 50 by chemical bonding, vulcanization, adhesive, self-adhesive, and also by mechanical engagement means including male parts 85 and female parts 86 such as snap-fit, tongue and groove, hook 27, fastener 29, hook and pile, and the like. If desired, the anterior outsole element 44 and middle outsole element 45 can also be affixed to their corresponding parts using like means. The inferior spring element 50 can be selectively and removably affixed to the superior spring element 47 by a fastener 29 including a male part 85 and a female part 86. It can be readily understood that at least a portion the fastener 29 can be integrated or otherwise included as a portion of the inferior spring element 50, middle outsole element 45, or superior spring element 47, and as desired, the fastener 29 can either be made visible, or invisible to an observer or customer on the exterior or interior of the article of footwear 22.

FIG. 290 is a top view of a mold 126 for making a plurality of superior spring elements 47 using a fiber composite material 102. As shown, the configuration or pattern for making the superior spring elements 47 can include arch support on the medial side 35, and both medial and lateral stabilizers or heel counter(s) 24. As shown in FIG. 290, the configuration for matching parts for use on the left and right feet can be placed together with their lateral sides 36 being adjacent, or alternately, can be placed side by side in a normal orientation. The configuration of the mold 126 for making multiple sets of matched pairs of parts can place the superior spring element patterns tip to tip as shown in FIG. 290, or alternately, tip to tail, tail to tail, side to side, and further, the pattern can also be nestled in order to minimize material waste.

FIG. 291 is a longitudinal cross-sectional side view of an article of footwear 22 including a superior spring element 47, a posterior fluid-filled bladder 101.1, an inferior spring element 50, an anterior spring element 48.2, and an anterior fluid-filled bladder 102.1. As shown, the flexural axis 59 associated with the inferior spring element 50 is substantially consistent with the transverse axis 91.

FIG. 292 is a bottom plan view of the article of footwear 22 shown in FIG. 290 showing an inferior spring element 50 having a substantially transverse flexural axis 59, and the location of the fluid-filled bladders 101.1 and 101.2 as if it were possible to view these structures through a transparent outsole 43, inferior spring element 50, and anterior spring element 48.2. The fluid-filled bladders 101.1 and 101.2 substantially fill the spaces between the inferior portion of the shoe upper 23 and superior spring element 47, and both the inferior spring element 50 and the anterior spring element 48.2, respectively.

FIG. 293 is a bottom plan view of an article of footwear 22 generally similar to that shown in FIG. 290 showing an inferior spring element 50 having a substantially transverse flexural axis 59, and the location of the fluid-filled bladders 101.1 and 101.2 as if it were possible to view these structures through a transparent outsole 43, inferior spring element 50, and anterior spring element 48.2. The fluid-filled bladders 101.1 and 101.2 substantially fill the spaces between the inferior portion of the shoe upper 23 and superior spring element 47 and both the inferior spring element 50 and the anterior spring element 48.2, respectively. The fluid-filled bladder 101.1 can be formed so as to include a plurality of individual bladders or chambers **133*a*, 133*b*, and 133*c*, as shown, and the like. The chambers 133*a*, 133*b*, and 133*c* of fluid-filled bladder 101.1 can be in fluid communication with one another, or alternately, be individually sealed. The fluid-filled bladder and chambers can be filled with a gas at atmospheric pressure, or above atmospheric pressure. Alternately, the fluid-filled bladder and chambers can be in fluid communication with one the atmosphere. The material structure, geometry, and/or internal fluid pressure of the bladder 101.1 and its chambers can be varied so as to provide different physical and mechanical characteristics. For example, it could be advantageous in a running shoe for the area of the sole associated with chamber 133*a* to exhibit less stiffness in compression than chamber 133*b*, and for chamber 133*b* to exhibit less stiffness in compression than chamber 133*c*. In a similar manner, the fluid-filled bladder 101.2 can be formed so as to include a plurality of individual bladders or chambers 133***d*, 133*e*, 133*f*, and 133*g*, as shown, and the like. The chambers 133*d*, 133*e*, 133*f*, and 133*g* of fluid-filled bladder 101.2 can be in fluid communication with one another, or alternately, be individually sealed. The fluid-filled bladder and chambers can be filled with a gas at atmospheric pressure, or above atmospheric pressure. Alternately, the fluid-filled bladder and chambers can be in fluid communication with one the atmosphere. The material structure, geometry, and/or internal fluid pressure of the bladder 101.2 and its chambers can be varied so as to provide different physical and mechanical characteristics. For example, it could be advantageous in a running shoe for the area of the sole associated with chambers 133*d* and 133*e* to exhibit less stiffness in compression than chambers 133*f* and 133*g*.

In the present application, it can be readily understood that those embodiments of an article of footwear that include fluid-filled bladders, and in particular, those including multiple fluid-filled bladders or fluid-filled bladders including multiple chambers, e.g., as shown in FIGS. 293, 294, 300, 301, and the like, can alternately include valves that can serve as a motion control device can be used, as taught in WO 01/70061 A2 entitled "Article of Footwear With A Motion Control Device, by John F. Swigart and assigned to Nike, Inc. Moreover, at least one fluid-filled bladder that forms part of a larger dynamically-controlled cushioning system can be used, as taught in WO 01/78539 A2 and U.S. Pat. No. 6,430,843 B1 entitled "Dynamically-Controlled Cushioning System For An Article of Footwear," by Daniel R. Potter and Allan M. Schrock, and assigned to Nike, Inc. Such an article of footwear can include at least one fluid-filled bladder including a plurality of chambers, a control system possibly including a CPU, a pressure detector, and a regulator for modulating the level of fluid communication between different fluid-filled bladders or chambers. The patent applications in this paragraph have been previously incorporated by reference herein.

FIG. 294 is a bottom plan view of an article of footwear 22 generally similar to that shown in FIG. 290 showing an inferior spring element 50 having a substantially transverse flexural axis 59, and the location of the fluid-filled bladders 101.1 and 101.2 as if it were possible to view these structures through a transparent outsole 43, inferior spring element 50, and anterior spring element 48.2. The fluid-filled bladders 101.1 and 101.2 substantially fill the spaces between the inferior portion of the shoe upper 23 and superior spring element 47 and both the inferior spring element 50 and the anterior spring element 48.2, respectively. The fluid-filled bladder 101.1 can be formed so as to include a plurality of individual bladders or chambers 133*a*, and 133*b*, as shown, and the like. The chambers 133*a* and 133*b* of fluid-filled bladder 101.1 can be in fluid communication with one another, or alternately, be individually sealed. The fluid-filled bladder and chambers can be filled with a gas at atmospheric pressure, or above atmospheric pressure. Alternately, the fluid-filled bladder and chambers can be in fluid communication with one the atmosphere. The material structure, geometry, and/or internal fluid pressure of the bladder 101.1 and its chambers can be varied so as to provide different physical and mechanical characteristics. For example, it could be advantageous in a shoe intended for lateral movements such as basketball or tennis that the area of the sole associated with chamber 133*a* to exhibit greater stiffness in compression than chamber 133*b*. In a similar manner, the fluid-filled bladder 101.2 can be formed so as to include a plurality of individual bladders or chambers 133*c*, 133*d*, and 133*e*, as shown, and the like. The chambers 133*c*, 133*d*, and 133*e* of fluid-filled bladder 101.2 can be in fluid communication with one another, or alternately, be individually sealed. The fluid-filled bladder and chambers can be filled with a gas at atmospheric pressure, or above atmospheric pressure. Alternately, the fluid-filled bladder and chambers can be in fluid communication with one the atmosphere. The material structure, geometry, and/or internal fluid pressure of the bladder 101.2 and its chambers can be varied so as to provide different physical and mechanical characteristics. For example, it could be advantageous in a shoe intended for lateral movements such as basketball or tennis for the area of the sole associated with chamber 133*c* to exhibit greater stiffness in compression than chambers 133*d* and 133*e*.

FIG. 295 is a bottom plan view of an article of footwear 22 generally similar to that shown in FIG. 290 showing an inferior spring element 50 having a substantially transverse flexural axis 59, and the location of the fluid-filled bladders 101.1 and 101.2 as if it were possible to view these structures through a transparent outsole 43, inferior spring element 50, and anterior spring element 48.2. The fluid-filled bladders 101.1 and 101.2 fill only a posterior portion of the spaces between the inferior portion of the shoe upper 23 and superior spring element 47, and both the inferior spring element 50 and the anterior spring element 48.2, respectively. This construction creates an open void space between the anterior spacer 55.2 and fluid-filled bladder 101.2, and also between the flexural axis 59 and fluid-filled bladder 101.1.

FIG. 296 is a bottom plan view of an article of footwear 22 generally similar to that shown in FIG. 290 showing an inferior spring element 50 having a substantially transverse flexural axis 59, and the location of the fluid-filled bladders 101.1 and 101.2 as if it were possible to view these structures through a transparent outsole 43, inferior spring element 50, and anterior spring element 48.2. The fluid-filled bladders 101.1 and 101.2 fill only a portion of the spaces between the inferior portion of the shoe upper 23 and superior spring element 47, and both the inferior spring element 50 and the anterior spring element 48.2, respectively. This construction creates an open void space between the anterior spacer 55.2 and fluid-filled bladder 101.2 on the lateral side 36, and also posterior of the flexural axis 59 on the lateral side 36, associated with less stiffness in compression, which can be advantageous for use in a running shoe.

FIG. 297 is a bottom plan view of an article of footwear 22 generally similar to that shown in FIG. 290 showing an inferior spring element 50 having a substantially transverse flexural axis 59, and the location of the fluid-filled bladders 101.1 and 101.2 as if it were possible to view these structures through a transparent outsole 43, inferior spring element 50, and anterior spring element 48.2. The fluid-filled bladders 101.1 and 101.2 fill only a portion of the spaces between the inferior portion of the shoe upper 23 and superior spring element 47, and both the inferior spring element 50 and the anterior spring element 48.2, respectively. This construction creates open void spaces encompassing fluid-filled bladders 101.1 and 101.2 This structure can result in both the medial side 35 and the lateral side 36 of the sole exhibiting less stiffness in compression than the middle portion, and can be possibly be advantageous in articles of footwear intended for certain lateral movements.

FIG. 298 is a bottom plan view of an article of footwear 22 generally similar to that shown in FIG. 290 showing an inferior spring element 50 having a substantially transverse flexural axis 59, and the location of the fluid-filled bladders 101.1 and 101.2 as if it were possible to view these structures through a transparent outsole 43, inferior spring element 50, and anterior spring element 48.2. The fluid-filled bladders 101.1 and 101.2 fill only a portion of the spaces between the inferior portion of the shoe upper 23 and superior spring element 47, and both the inferior spring element 50 and the anterior spring element 48.2, respectively. This construction creates open void spaces both anterior and posterior of the fluid-filled bladders 101.1 and 101.2, and the two bladders can then serve as supports and second fulcrum points for the inferior spring element 50, and anterior spring element 48.2, respectively.

FIG. 299 is a bottom plan view of an article of footwear 22 generally similar to that shown in FIG. 290 showing an inferior spring element 50 having a substantially transverse flexural axis 59, and the location of the fluid-filled bladders 101.1 and 101.2 as if it were possible to view these structures through a transparent outsole 43, inferior spring element 50, and anterior spring element 48.2. The fluid-filled bladders 101.1 and 101.2 fill only a portion of the spaces between the inferior portion of the shoe upper 23 and superior spring element 47, and both the inferior spring element 50 and the anterior spring element 48.2, respectively. This construction creates open void spaces in the middle of the sole 32 within substantially encompassing fluid-filled bladders 101.1 and 101.2, and can result in increasing the stiffness in compression about the medial side 35 and lateral side 36 of the sole 32. The construction can provide stability when articles of footwear are subjected to high loads.

FIG. 300 is a bottom plan view of an article of footwear 22 generally similar to that shown in FIG. 290 showing an inferior spring element 50 having a substantially transverse flexural axis 59, and the location of the fluid-filled bladders 101.1 and 101.2 as if it were possible to view these structures through a transparent outsole 43, inferior spring element 50, and anterior spring element 48.2. The fluid-filled bladders 101.1 and 101.2 fill only a portion of the spaces between the inferior portion of the shoe upper 23 and superior spring element 47, and both the inferior spring element 50 and the anterior spring element 48.2, respectively. This construction creates open void spaces in the middle of the sole 32 within substantially encompassing fluid-filled bladders 101.1 and 101.2, and can result in increasing the stiffness in compression about the medial side 35 and lateral side 36 of the sole 32. The construction can provide enhanced stability when articles of footwear are subjected to high loads. The fluid-filled bladders 101.1 and 101.2 can include a plurality of individual chambers 133 which are in fluid isolation, as shown in FIG. 300. In an alternate embodiment, the chambers 133 could be in fluid communication with one another and/or with the atmosphere. As shown, the individual chambers 133 can be formed in a semi-spherical or dome shape, or other common geometric shapes. The spacing between the chambers 133 can be varied, and the semi-spherical or other geometric shapes can also be alternately inverted and stacked upon one another in the vertical dimension as disclosed in U.S. Pat. Nos. 6,098,313, 6,029,962, 5,976,451, and 5,572,804 granted to Joseph Skaja and/or Martyn Shorten, all of these patents hereby being incorporated by reference herein.

FIG. 301 is a bottom plan view of an article of footwear 22 generally similar to that shown in FIG. 290 showing an inferior spring element 50 having a substantially transverse flexural axis 59, and the location of the fluid-filled bladders 101.1 and 101.2 as if it were possible to view these structures through a transparent outsole 43, inferior spring element 50, and anterior spring element 48.2. The fluid-filled bladders 101.1 and 101.2 fill only a portion of the spaces between the inferior portion of the shoe upper 23 and superior spring element 47, and both the inferior spring element 50 and the anterior spring element 48.2, respectively. This construction creates open void spaces on the lateral side 36 of the sole 32, and can result in relatively greater stiffness in compression on the medial side 35 than on the lateral side 36 of the sole 32 in both the rearfoot area 68 and forefoot area 58. This construction can be advantageous for use in a running shoe. The fluid-filled bladders 101.1 and 101.2 can include a plurality of individual chambers 133 which are in fluid isolation, as shown in FIG. 301. In an alternate embodiment, the chambers 133 could be in fluid communication with one another and/or with the atmosphere. As shown, the individual chambers 133 can be formed in a semi-spherical or dome shape, or other common geometric shapes. The spacing between the chambers 133 can be varied, and the semi-spherical or other geometric shapes can also be alternately inverted and stacked upon one another in the vertical dimension as disclosed in U.S. Pat. Nos. 6,098,313, 6,029,962, 5,976,451, and 5,572,804 granted to Joseph Skaja and/or Martyn Shorten, all of these patents being previously incorporated by reference herein. Alternately, a plurality of foam columns can be used in place of fluid-filled bladders, and the former can be made of the materials taught in U.S. Pat. Nos. 5,343,639 and 5,353,523. Alternately, a plurality of support structures for placement and use between the superior spring element 47 and an inferior spring element 50 and/or anterior spring element 48.2 can be made of the materials taught in U.S. Pat. Nos. 4,198,037 and 5,280,890 assigned to Miner, Enterprises, Inc., and/or those materials taught in U.S. Pat. Nos. 5,337,492, 5,461,800, and 5,822,886 assigned to Adidas International, BV., and the like.

FIG. 302 is a bottom plan view of an article of footwear 22 generally similar to that shown in FIG. 304 showing a fluid-filled bladder 101 extending substantially the entire length of the sole 32, as if it were possible to view the structure through a transparent outsole 43 and anterior spring element 48.2. The embodiment shown in FIG. 302 does not include an inferior spring element 50, but does include a superior spring element 47 and an anterior spring element 48.2. The fluid-filled bladder 101 can be made by injection molding and/or blow molding and include an integral anterior spacer 55.3.

FIG. 303 is a bottom plan view of an article of footwear 22 generally similar to that shown in FIG. 305 showing a fluid-filled bladder 101.2 extending posterior of anterior spacer 55.2 and anterior of the flexural axis 59 of the inferior spring element 50, and a fluid-filled bladder 101.1 substantially located posterior of the flexural axis 59, as if it were possible to view these structures through a transparent outsole 43, inferior spring element 50, and anterior spring element 48.2. The embodiment shown in FIG. 303 includes an inferior spring element 50, a superior spring element 47, and an anterior spring element 48.2. The fluid-filled bladders 101.1 and 101.2 can be made by injection molding and/or blow molding, and fluid-filled bladder 101.2 can alternately include an integral anterior spacer 55.3.

FIG. 304 is a longitudinal cross-sectional side view of an article of footwear 22 generally similar to that shown in FIG. 302 showing a fluid-filled bladder 101 extending substantially the entire length of the sole 32. The embodiment shown in FIG. 304 does not include an inferior spring element 50, but does include a superior spring element 47, posterior spring element 49, and an anterior spring element 48.2. The fluid-filled bladder 101 can be made by injection molding and/or blow molding and can possibly include an integral anterior spacer 55.3. The sole 32 including the fluid-filled bladder 101 and anterior spring element 48.2 can be affixed to the shoe upper 23 and superior spring element 47 with at least one fastener 29.

FIG. 305 is a longitudinal cross-sectional side view of an article of footwear 22 generally similar to that shown in FIG. 303 showing a fluid-filled bladder 101.2 extending posterior of anterior spacer 55.2 and anterior of the flexural axis 59 of the inferior spring element 50, and also a fluid-filled bladder 101.1 substantially located posterior of the flexural axis 59. The embodiment shown in FIG. 305 includes an inferior spring element 50, a superior spring element 47, and an anterior spring element 48.2. The fluid-filled bladders 101.1 and 101.2 can be made by injection molding and/or blow molding, and fluid-filled bladder 101.2 can alternately include an integral anterior spacer 55.3. The sole 32 including the fluid-filled bladders 101.1, 101.2, the inferior spring element 50, anterior spring element 48.2, anterior outsole element 44, and posterior outsole element 46, can be affixed to the shoe upper 23 and superior spring element 47 with at least one fastener 29. As shown, the anterior outsole element 44 includes a backing 30 which wraps around both the posterior and anterior ends of the anterior spring element 48.2, and the backing can be secured by being at least partially trapped between the anterior spacer 55.2 and/or affixed by at least one fastener 29.

FIG. 306 is a longitudinal cross-sectional side view of an article of footwear 22 including a shoe upper 22, insole 31, fastener 29 having a male part 85 and a female part 86, a male mating structure 128 and a female mating structure 129, an anterior outsole element 44 including a backing 30, a posterior outsole element 46 including a backing 30 and a pocket 131, a spring element 51 including an inferior spring element 50, and a superior spring element 47 including both an anterior spring element 48 and a posterior spring element 49. Also indicated are the anterior side 33, posterior side 34, superior side 37, and inferior side of the article of footwear 22.

FIG. 307 is an exploded longitudinal cross-sectional side view of the article of footwear 22 shown in FIG. 306. As can be readily understood from studying FIG. 307, the anterior outsole element 44 can be inserted into the shoe upper 23 and the outsole portions 43 can pass through the corresponding registered openings 72 in the inferior side 34 of the upper 23 and be at least partially mechanically secured in place. The relatively thin backing 30 of the anterior outsole element 44 extends about and between the area of the openings 72 in the upper and prevents the backing 30 portion of the anterior outsole element 44 from passing through the upper 23. The anterior spring element 48 can include at least one male mating structure 128 having a protuberance 99 for mating with a corresponding opening 72 or female mating structure 129 in the backing 30 or other portion of the anterior outsole element 44. Accordingly, when the anterior spring element 48 is inserted into the shoe upper 23 it can at least partially be mechanically secured in place. The posterior spring element 49 can then be inserted into the shoe upper 23, and it can overlap the anterior spring element 48, and can possibly include a recess for accommodating and actually mating with the anterior spring element 48, as shown in FIG. 309. A fastener 29 including a male part 85, as shown, or alternately, a female part 86 can be inserted into an opening 72 in the superior spring element 49 which corresponds and registers with openings in the anterior spring element 48, the web or backing 30 portion of the anterior outsole element 44, shoe upper 23, inferior spring element 50, and the web or backing 30 portion of the posterior outsole element 46. The posterior outsole element 46 can then be slipped over the posterior end of the inferior spring element 50 and thereby at least partially mechanically secured in place, and the opening 72 in the resulting unit for accommodating the fastener 29 can be appropriately positioned enabling the male part 85, or alternately the female part 86, as shown, to be inserted therethrough from the inferior side 38 and then be mechanically secured to the corresponding mating part of the fastener 29 which is inserted from the superior side 37. This method and process of affixing the components of an article of footwear 22 can thereby be accomplished in a matter of seconds and easily in less than one minute. Accordingly, given a ready stock of components, an article of footwear 22 can be customized and made to order immediately upon request, and any part can be removed, and replaced, as desired.

FIG. 308 is a top plan view of the insole 31 shown in FIGS. 306 and 307. In order to provide comfort, cushioning, and support in functional relation to the underlying superior spring element 47, it is important that a relatively high quality insole be used such as one made of foamed neoprene rubber including a textile cover having an overall thickness of approximately 3.75 mm, or one made of polyurethane such as PORON® which is made by the 3M Company of St. Paul, Minn., and the like. Again, it can be advantageous to use a custom molded insole as taught by the present inventor in U.S. Pat. No. 5,632,057, and also U.S. Pat. No. 6,939,502, entitled "Method of Making Custom Insoles and Point of Purchase Display, both of these documents having been previously incorporated by reference herein.

FIG. 309 is a top plan view of a spring element 51 showing a superior spring element 47 including both a posterior spring element 49 and an anterior spring element 48. Shown for reference purposes are the anterior side 33, posterior side 34, medial side 35, lateral side 36, and general orientation of the longitudinal axis 69, and transverse axis 91. The posterior spring element 49 overlaps a portion of the anterior spring element 48 which is shown in dashed lines. The posterior spring element 49 has a cupped shape so as to accommodate and encompass at least some of the natural anatomical characteristics of the heel of a wearer, and this three dimensional structure enables the part to exhibit relatively high flexural modulus or stiffness, thus permitting it to be made in a thin cross-sectional thickness resulting in low weight and reduced cost. The posterior spring element 49 can be made of a glass or carbon fiber composite material, or alternately, of a relatively rigid reinforced thermoplastic material including short or long fibers. Again, Dow Chemical Company of Midland, Mich. makes SPECTRUM® reaction moldable polymer which has been used to make automobile body parts, and LNP Engineering Plastics of Exton, Pa. makes THERMOCOMP® and VERTON® thermoplastic materials which can include long carbon fibers. The posterior spring element 49 also includes a projection 70 on the anterior and medial side which has the effect of increasing the stiffness of the medial side 35 of the spring element 51 in the associated area. Both the posterior spring element 49 and the anterior spring element 48 include an opening 72 for accommodating a fastener 29, and can include a protective wear prevention insert 130 therein for bearing directly upon a portion of the fastener 29.

The anterior spring element 48 includes a plurality of notches 71 for influencing the longitudinal, transverse, and torsional stiffness, and overall performance of the part. The presence, location, shape, length, depth, and number of the notches 71 can be varied to make the anterior spring element more suitable for a particular activity, or a particular individual. The embodiment shown in FIG. 309 is appropriate for use in a running shoe. The longitudinal notch 71.1 near the anterior side 33 extends to the anteriormost transverse line of flexion 54.2 and creates two opposing fingers 109.1 and 109.2 on the medial side 35 and lateral side 36, respectively. Given a spring element intended for use in a men's size 9 article of footwear, notches 71.5 and 71.6 on the medial side 35 can extend a relatively short distance such as approximately 15 mm, whereas notches 71.2, 71.3, and 71.4 can extend for a greater distance such as approximately 25 mm. The approximate alignment of notches 71.2 and 71.5 can create a generally transverse line of flexion 54.2 anterior of the approximate position of the metatarsal-phalangeal joints indicated by line 104. The approximate alignment of notches 71.3 and 71.6 can create a generally transverse line of flexion 54.3 generally consistent with the approximate position of the metatarsal-phalangeal joints indicated by line 104. The orientation of notch 71.4 can create a generally diagonal line of flexion 54.4 approximately following the anterior side of the posterior spring element 49. The proximity of notches 71.5 and 71.6 can create a generally longitudinal line of flexion 54.6 therebetween which can reduce both the stiffness in compression and torsional stiffness of the medial side 35 and enhance stability by reducing certain leverage effects which could impact inversion or eversion of a wearer's foot in an undesired manner. Similarly, the proximity of notches 71.2 and 71.3 and 71.4 can create a generally longitudinal line of flexion 54.1 therebetween which can reduce both the stiffness in compression and torsional stiffness of the lateral side 36 and enhance stability by reducing certain leverage effects which could impact inversion or eversion of a wearer's foot in an undesired manner.

In particular, on the lateral side 36 of the forefoot area 58 of a running shoe, it can be advantageous to create an extended area characterized by reduced stiffness in compression and torsional stiffness, or what can be called a "forefoot strike zone" somewhat analogous to the "rearfoot strike zone" which has been previously taught by the inventor in U.S. Pat. Nos. 5,425,184, 5,625,964, and 6,055,746, hereby incorporated by reference herein. Further, it can be advantageous in a running shoe for the stiffness in compression and torsional stiffness exhibited on the lateral side 36 of the anterior spring element 48 in the forefoot area 58 to be less than that exhibited on the medial side 35, and by a factor generally in the range between 10-50 percent. In this regard, it is generally known by those who study biomechanics that at lower speeds, as when an individual is walking or running slowly, the lateral side of the human foot is used to greater degree than when running at high speeds, thus the human foot can exhibit differential stiffness and utilization as between the lateral side and medial side. In brief, as result of the presence, location, shape, length, depth, and number of the notches 71 shown in FIG. 309, the anterior spring element 48 is perceived to provide enhanced cushioning, stability, and performance effects without the flexural or torsional modulus characteristics of the fiber composite material causing dysfunctional leverage effects or other undesired perceived phenomenon. Other configurations are possible and anticipated, e.g., notches 71.6 and 71.3 could be moved more towards the posterior side 34 to be placed well behind line 104 indicating the approximate location of the metatarsal-phalangeal joints.

FIG. 310 is a bottom plan view of the spring element 51 shown in FIG. 309 showing an inferior spring element 50, and a superior spring element 47 including both a posterior spring element 49 and an anterior spring element 48 that is substantially hidden by the anterior outsole element 44, thus shown by a dashed line. Shown are the anterior outsole element 44 and the posterior outsole element 46 including a web or backing 30 portion. The inferior side of the male mating structure 128 including a protuberance 99 is shown in functional relation with an opening or female mating structure in the backing 30 of the anterior outsole element 44.

FIG. 311 is a top plan view of an alternate posterior spring element 49 for use with an article of footwear 22 that includes raised heel counter 24 portions on both the medial side 35 and the lateral side 36 which are best shown in a side view of an article of footwear such as FIG. 323. Shown for reference purposes is the general orientation of the longitudinal axis 67, transverse axis 91, medial side 35, lateral side, anterior side 33 and posterior side 34. Also shown is the approximate position corresponding to the weight bearing center of the heel 57 of a wearer. In addition, a triangular opening 72 for accommodating a fastener that includes a wear prevention insert 130 is also shown in FIG. 311.

FIG. 312 is a top plan view of an alternate anterior spring element 48 which is generally similar to that shown in FIG. 309 for use with the posterior spring element 49 shown in FIG. 311. However, the shape of the part is different in several respects, e.g., the posterior side 34 of the anterior spring element 48 is formed in a diagonal shape, and the opening 72 for accommodating a fastener has a triangular instead of a pentagon shape.

FIG. 313 is a top plan view of the posterior spring element 49 of FIG. 311 and the anterior spring element 48 of FIG. 312 positioned in functional relation with the posterior spring element 49 overlapping the superior side 37 of the anterior spring element 48. In an alternate embodiment, the overlapping relationship can be reversed.

FIG. 314 is a bottom plan view of the posterior spring element 49 of FIG. 311 and the anterior spring element 48 of FIG. 312 positioned in functional relation with the posterior spring element 49 overlapping the anterior spring element 48, but with the addition of the anterior outsole element 44 including a backing 30 and an outsole 43 including six traction members 115. As shown, the posterior spring element 49 overlaps the anterior outsole element 44 on the superior side 37, thus the anterior outsole elements 44 passes underneath the posterior spring element 49. In an alternate embodiment, the overlapping relationship of these three components can be varied. On the superior side 37, the backing 30 portion of the anterior outsole element 44 includes a plurality of male mating structures 128 including a protuberance 99 which can mechanically mate with female mating structures 129 in the anterior spring element 48, and thereby at least partially secure the anterior outsole element 44 in functional relation to the overlaying anterior spring element 48.

FIG. 315 is a top plan view of an alternate posterior spring element 49 generally similar to that shown in FIG. 311 for use with an article of footwear 22 that includes raised heel counter 24 portions on both the medial side 35 and the lateral side 36 which are best shown in a side view of an article of footwear such as FIG. 323. Shown for reference purposes is the general orientation of the longitudinal axis 67, transverse axis 91, medial side 35, lateral side, anterior side 33 and posterior side 34. Also shown is the approximate position corresponding to the weight bearing center of the heel 57 of a wearer. Further, a hexagonal opening 72 for accommodating a fastener that includes a wear prevention insert 130 is also shown in FIG. 315. In addition, the posterior spring element 49 includes a recess 84 on the superior side 37 for accommodating and mechanically mating with the posterior portion of an anterior spring element 48. The location of a length measurement that is taken between the center of opening 72 and the posterior side 34, and also the location of a transverse width measurement that extends between the medial side 35 and lateral side 36 and intersects the center of the opening 72 is also shown in FIG. 315.

FIG. 316 is a top plan view of an alternate anterior spring element 48 generally similar to that shown in FIG. 312 for use with the posterior spring element 49 shown in FIG. 315. However, the shape of the part is different in several respects, e.g., the posterior side 34 of the anterior spring element 48 is formed in a pointed shape thereby forming a projection 70, and the opening 72 for accommodating a fastener has a hexagon shape instead of a triangular shape. The location of a length measurement that is taken between the center of opening 72 and the anterior side 33, and also the location of a transverse width measurement that extends along line 104 between the medial side 35 and lateral side 36 is also shown in FIG. 316.

FIG. 317 is a top plan view of the posterior spring element 49 of FIG. 315 and the anterior spring element 48 of FIG. 316 positioned in functional relation with the anterior spring element 48 overlapping the superior side 37 of the posterior spring element 49. In an alternate embodiment, the overlapping relationship can be reversed. The pointed shape of the projection 70 of the anterior spring element 48 is shown positioned in functional relation and at least partially secured by mechanical means within the recess 84 of the posterior spring element 49.

FIG. 318 is a bottom plan view of the posterior spring element 49 of FIG. 315 and the anterior spring element 48 of FIG. 316 positioned in functional relation with the anterior spring element 48 overlapping the superior side 37 of the posterior spring element 49, but with the addition of an anterior outsole element 44 including a backing 30 and an outsole 43 including six traction members 115. Similar to the anterior spring element 48, a portion of the anterior outsole element 44 also has a pointed shape including a projection 70.1 that overlaps the superior side 37 of the posterior spring element 49. In an alternate embodiment, the overlapping relationship of these three components can be varied. On the superior side 37, the backing 30 portion of the anterior outsole element 44 includes a plurality of male mating structures 128 including a protuberance 99 which can mechanically mate with female mating structures 129 in the anterior spring element 48, and thereby at least partially secure the anterior outsole element 44 in functional relation to the overlaying anterior spring element 48.

FIG. 319 is a top plan view of the superior side 37 of an inferior spring element 50 to which has been mounted a posterior outsole element 46 including a backing 30 and outsole 43. If desired, the backing 30 can be substantially transparent and can enable the portion of the posterior spring element 49 that is inserted into an opening or pocket 131 therein to be seen, as shown in FIG. 319. As shown, the backing 30 and/or posterior outsole element 46 can encompass a portion of the medial side 35, lateral side 36, superior side 37, inferior side 38, and posterior side 34 of the inferior spring element 50 forming an opening or pocket 131 into which a portion of the inferior spring element 50 can be removably inserted, thereby at least partially securing the posterior outsole element 46 by mechanical means in functional relation to the inferior spring element 50. Also shown is a triangular opening 72 including a wear prevention insert 130 for accommodating a fastener, thus the embodiment shown could be used with the posterior spring element 49, anterior spring element 48, and anterior outsole element 44 shown in FIG. 314.

FIG. 320 is a bottom plan view of the inferior spring element 50 and posterior outsole element 46 shown in FIG. 319. Near the anterior side 33, the web or backing 30 portion of the posterior outsole element 46 emerges from the ground engaging portion of the outsole 43 in a relatively superior position and the backing 30 also includes an opening 72 that registers with the similar opening present in the inferior spring element 50 for accommodating a fastener. Accordingly, once the inferior spring element 50 is inserted into the pocket 131 formed by posterior outsole element 46 and a fastener passes through the opening 72 present in the backing 30 and inferior spring element, the posterior outsole element 46 can be firmly secured solely by mechanical means to a larger spring element 51 and article of footwear 22.

FIG. 321 is a bottom plan view of an inferior spring element 50 similar to that shown in FIG. 320 with a posterior outsole element 46 having an alternate design. As shown, the web or backing 30 portion of the posterior outsole element 46 can be exposed in many areas creating a striking visual design, and in particular, when contrasting colors are used. However, such designs can also be functional, as they can be associated with varying elevations associated with the creation of discrete traction members 115.

FIG. 322 is a bottom plan view of an inferior spring element 50 similar to that shown in FIG. 320 with a posterior outsole element 46 having an alternate design. As shown, the web or backing 30 portion of the posterior outsole element 46 can be exposed in many areas creating a striking visual design, and in particular, when contrasting colors are used. However, such designs can also be functional, as they can be associated with varying elevations associated with the creation of discrete traction members 115. The posterior outsole element 46 and inferior spring element 50 include an opening 72 having a hexagon shape, thus the embodiment shown could be used with the posterior spring element 49, anterior spring element 48, and anterior outsole element 44 shown in FIG. 318.

FIG. 323 is a longitudinal cross-sectional side view of an article of footwear 22 generally similar to that shown in FIG. 306, but including a number of differences. Shown is a footwear last 80 and a shoe upper 23 having a different design. In the forefoot area 58, the superior side of the backing 30 includes male mating structures 128 including a protuberance 99 that is shown mechanically engaged in functional relation with a female mating structure 129 present in the anterior spring element 48. Similar to FIG. 306, the posterior spring element 49 overlaps the superior side of the backing 30 portion of the anterior outsole element 44 and the anterior spring element 48, and the latter structures both terminate at a location between the position of the fastener 29 and the posterior side 34 of the article of footwear 22. When a footwear last 80 or other three dimensional design and pattern of an article of footwear 22 includes a curved arch portion, this construction can be advantageous since it enables an especially smooth transition between the posterior spring element 49 and the anterior spring element 48 and anterior outsole element 44. As shown in FIG. 323, the posterior spring element 49 extends upwards and about the medial side 35, lateral side 36, and posterior side 34 within the shoe upper 23 forming a heel counter 24.

FIG. 324 is a longitudinal cross-sectional side view of an article of footwear 22 generally similar to that shown in FIG.

323, but including a number of differences. The anterior spring element 48 overlaps the superior side of the posterior spring element 49 and is mechanically engaged by a recess 84.1 therein which is generally similar to that shown in FIGS. 315-317. The posterior spring element 49 overlaps the superior side of the posterior portion of the backing 30 of the anterior outsole element 44, and is also mechanically engaged by a recess 84.2 therein. As shown in FIG. 324, the thickness of the posterior portion of the backing 30 of the anterior outsole element 44 can be varied in the area near the anterior side of the posterior spring element 49 in order to achieve a smooth transition. As shown in FIG. 324, the backing 30 portion of the anterior outsole element 44 can extend substantially to the posterior side 34 within the shoe upper 23 and can be curved upwards about the medial side 35, lateral side 36, and posterior side 34 within the shoe upper 23 forming a heel counter 24. Alternately, the posterior spring element 49 can be curved upwards about the medial side 35, lateral side 36, and posterior side 34 within the shoe upper 23 forming a heel counter 24, or alternately, both the posterior spring element 49 and the backing 30 portion of the anterior outsole element 44 can form a heel counter 24.

FIG. 325 is a longitudinal cross-sectional side view of an article of footwear 22 generally similar to that shown in FIG. 323, but including a number of differences. The posterior spring element 49 overlaps both the anterior spring element 48 and the posterior portion of the web or backing 30 of the anterior outsole element 44. The anterior spring element 48 terminates a relatively short distance posterior of the position of the fastener 29, but the posterior portion of the web or backing 30 of the anterior outsole element 44 extends substantially to the posterior side 34 within the shoe upper 23. Again, as shown in FIG. 324, the backing 30 portion of the anterior outsole element 44 can extend substantially to the posterior side 34 within the shoe upper 23 and can be curved upwards about the medial side 35, lateral side 36, and posterior side 34 within the shoe upper 23 forming a heel counter 24. Alternately, the posterior spring element 49 can be curved upwards about the medial side 35, lateral side 36, and posterior side 34 within the shoe upper 23 forming a heel counter 24, or alternately, both the posterior spring element 49 and the backing 30 portion of the anterior outsole element 44 can form a heel counter 24.

FIG. 326 is a longitudinal cross-sectional side view of an article of footwear 22 generally similar to that shown in FIG. 323, but including a number of differences. Both the anterior spring element 48 and the posterior portion of the backing 30 of the anterior outsole element 44 overlap the anterior portion of the superior side of the posterior spring element 49 and are mechanically engaged by a recess 84 therein which is generally similar to that shown in FIGS. 315-317. However, a substantial portion of the thickness of the posterior spring element 49 is maintained and extends to its anterior side, thus creating a more pronounced inferior standoff position for the inferior spring element 50 to bear loads against and be mechanically affixed thereto. The three dimensional curved shape of the posterior spring element 49 associated with the area of the recess 84 can have the effect of strengthening the part and increasing its flexural modulus. The more pronounced inferior standoff configuration can potentially accommodate for greater deflection of the inferior spring element 50, and/or make available more space between the superior spring element 47 and the inferior spring element 50 for the insertion of other cushioning media such a fluid-filled bladders, foam materials, thermoplastic structures having geometric shapes, and the like.

FIG. 327 is a longitudinal cross-sectional side view of an article of footwear 22 generally similar to that shown in FIG. 323, but including a number of differences. The posterior portion of the backing 30 of the anterior outsole element 44 terminates anterior of the position of the fastener 29. The anterior spring element 48 extends from a position near the anterior side 33 towards the posterior side 34 and passes through a slit 82 in the inferior side 38 of the shoe upper 23 that approximately coincides with the position of the fastener 29. In a bottom plan view, the slit 82 is substantially hidden from view by that portion of the inferior spring element 50 which bears against the inferior side 38 of the shoe upper 23. The posterior portion of the anterior spring element 48 thereby emerges from within the shoe upper 23 to the exterior side thereof and can be curved upwards about the medial side 35, lateral side 36, and posterior side 34 of the shoe upper 23 forming an external heel counter 24.1. The posterior spring element 49 can also be curved upwards about the medial side 35, lateral side 36, and posterior side 34 within the shoe upper 23 forming an internal heel counter 24.2 which can mechanically mate with the external heel counter 24.1 thereby firmly securing the shoe upper 23 therebetween when the fastener 29 is affixed in position.

FIG. 328 is a longitudinal cross-sectional side view of an article of footwear 22 generally similar to that shown in FIG. 323, but including a number of differences. Shown in FIG. 328 is a fluid-filled bladder 101 having a wall 132 and a chamber 133 that is substantially located between the posterior spring element 49 and the inferior spring element 50. The fluid-filled bladder 101 can be inserted through the open space provided for entry and exit of a wearer's foot into an opening 72 in the inferior side 38 of the shoe upper 23 that closely registers with the shape of the downwardly projecting structure of the fluid-filled bladder 101, and the fluid-filled bladder 101 can be at least partially maintained in position and prevented from passing through the opening 72 by the existence of a flange 124 thereupon. The fluid-filled bladder 101 can then be firmly secured in position by the insertion of the posterior spring element 49 into the shoe upper 23 in a superior position relative to the fluid-filled bladder 101, and also by affixing the posterior spring element 49 with a fastener 29 to the inferior spring element 50. Alternately, the fluid-filled bladder can be affixed in functional relation to the shoe upper 23 and/or the inferior spring element 50 with the use of adhesives, bonding, or welding, and other conventional methods.

FIG. 329 is a longitudinal cross-sectional side view of an article of footwear 22 generally similar to that shown in FIG. 328, but including a number of differences. As shown, the article of footwear 22 includes two fluid-filled bladders 101.1 and 101.2. Fluid-filled bladder 101.1 can be affixed by adhesives, bonding, welding, or other conventional means to the superior side of the backing 30 that is present on the superior side of the inferior spring element 50, and likewise, fluid-filled bladder 101.2 can be affixed by adhesives, bonding, welding, or other conventional means to the inferior side of the backing 30 that is present on the inferior side of the inferior spring element 50. Accordingly, the posterior outsole element 46 including the backing 30 and both the fluid-filled bladders 101.1 and 101.2 can be removed and replaced when the fastener 29 is removed and the inferior spring element 50 is slipped out of the pocket 131.

FIG. 330 is a longitudinal cross-sectional side view of an article of footwear 22 generally similar to that shown in FIG. 329, but including a number of differences. As shown, the article of footwear 22 includes two fluid-filled bladders 101.1 and 101.2. Fluid-filled bladder 101.1 is integrally formed with so that its inferior wall 132 also serves as the backing 30 that is present on the superior side of the inferior spring element 50, or vice-versa, and likewise, fluid-filled bladder 101.2 is integrally formed with so that its superior wall 132 also serves as the backing 30 that is present on the inferior side of the inferior spring element 50. Accordingly, the posterior outsole element 46 including the backing 30 and both the fluid-filled bladders 101.1 and 101.2 can be removed and replaced when the fastener 29 is removed and the inferior spring element 50 is slipped out of the pocket 131. As shown, the superior wall 132 of fluid-filled bladder 101.1 can extend anteriorly and be secured between the inferior spring element 50 and the superior spring element 47, or alternately, the superior wall 132 can terminate at a position posterior of the point of contact between the inferior spring element 50 and the inferior portion of the shoe upper 23 or superior spring element 47.

FIG. 331 is a longitudinal cross-sectional side view of an article of footwear 22 generally similar to that shown in FIG. 328, but including a number of differences. Fluid-filled bladder 101 can be seen and can optionally protrude from an opening 72 in the superior side of the insole 31, but it can also be seen and protrude from a corresponding registered opening in the inferior side of the shoe upper 23. The fluid-filled bladder 101 can be inserted and secured in position in the same manner as the embodiment recited in FIG. 328. However, as shown in FIG. 331, the inferior wall 132 of the fluid-filled bladder 101 can alternately be integrally formed with the backing 30 portion of the anterior outsole element 44, or alternately, the superior wall 132 of the fluid-filled bladder 101 can be integrally formed with the backing 30 portion of the anterior outsole element 44.

FIG. 332 is a longitudinal cross-sectional side view of an article of footwear 22 generally similar to that shown in FIG. 328, but including a number of differences. Shown is a fluid-filled bladder 101 including a superior wall 132.1 and an inferior wall 132.2 and a plurality of chambers 133. The chambers 133 can be in fluid communication with one another, or alternately, the chambers 133 can be in fluid isolation from one another. The plurality of chambers 133 protrude from a plurality of corresponding registered openings 72 in the superior side of the backing which overlaps the superior side of the inferior spring element 50. Accordingly, the fluid-filled bladder 101 can be inserted into the pocket 130 formed by the shape of the backing 30 of the posterior outsole element 46 and the protruding chambers 133 can then be properly fitted, that is, pop into place so as to protrude from the openings 72. The inferior spring element 50 can then be inserted into the pocket 131 thereby trapping and mechanically securing the fluid-filled bladder 101 in position.

FIG. 333 is a longitudinal cross-sectional side view of an article of footwear 22 generally similar to that shown in FIG. 331, but including a number of differences. Shown is a fluid-filled bladder 101.1 including a wall 132 and a plurality of chambers 133 that is integrally formed with its superior side being coincident with a posterior portion of the backing 30 of the anterior outsole element 44, and also a fluid-filled bladder 101.2 which is integrally formed with its superior side being coincident with a portion of the backing 30 of the anterior outsole element 44. As shown and discussed previously in connection with FIG. 300, the individual chambers 133 can be formed in a semi-spherical or dome shape, or other common geometric shapes. The spacing between the chambers 133 can be varied, and the semi-spherical or other geometric shapes can also be alternately inverted and stacked upon one another in the vertical dimension as disclosed in U.S. Pat. Nos. 6,098,313, 6,029,962, 5,976,451, and 5,572,804 granted to Joseph Skaja and/or Martyn Shorten, all of these patents being previously incorporated by reference herein.

FIG. 334 is a longitudinal cross-sectional side view of an article of footwear 22 generally similar to that shown in FIG. 331, but including a number of differences. In particular, a foam cushioning element 135 made of foam material 134 having a web 144 portion including a flange 124 can instead be stock-fitted into an opening 72 in the inferior side of the shoe upper 23 and can protrude downwards therefrom to engage the inferior spring element 50 when the article of footwear 22 is sufficiently loaded by a wearer. The foam cushioning element 135 can be made in a multiplicity of alternate shapes. Alternately, the foam cushioning element 135 made of foam material 134 can be affixed to a backing 30 including a flange 124 made of a different material, that is, instead of having a web 144 and flange 124 made in continuity of a single homogenous foam material 124 as is shown. Again, the foam cushioning element 135.1 can be inserted into the shoe upper 23 and secured in place by mechanical means, and also be removed and replaced, as desired.

FIG. 335 is a longitudinal cross-sectional side view of an article of footwear 22 generally similar to that shown in FIG. 332, but including a number of differences. In particular, a foam cushioning element 135 made foam material 134 having a web 114 portion including a flange 124 and three columns can instead be stock-fitted into an opening 72 in the superior side of the backing 30 on the superior side of the inferior spring element 50 and can protrude upwards therefrom to engage the inferior side of the shoe upper 23 when the article of footwear 22 is sufficiently loaded by a wearer. The foam cushioning element 135 can be made in a multiplicity of alternate shapes. Alternately, the foam cushioning element 135 made of foam material 134 can be affixed to a backing 30 including a flange 124 made of a different material, that is, instead of having a web 144 and flange 124 made in continuity of a single homogenous foam material 124 as shown. Again, the foam cushioning element 135 can be inserted into a pocket 130 formed by the backing 30 of the posterior outsole element 46 and secured in place by mechanical means, and also be removed and replaced, as desired.

FIG. 336 is a longitudinal cross-sectional lateral side 36 view of an article of footwear 22 generally similar to that shown in FIG. 323, but including a number of differences. In this embodiment, the backing 30 portion of the anterior outsole element 44 includes an upwardly extending stability element 136 including stability element portions 136.1, 136.2, and 136.3 which can serve both to define the shape of the shoe upper 23, but also to stabilize the foot of a wearer in functional relation to the upper 23 and article of footwear 22. When a textile material or other material having elastic or substantial elongation characteristics is used in the construction of the forefoot area 58 of the upper 23, the presence of the stability element 136 including portions 136.1, 136.2, and 136.3 can at least in part define the shape and fit of the upper 23, and in particular, can prevent trauma to a wearer's toes due to the elastic material possibly working against and dragging across a wearer's toenails. Given the use of an upper 23 including a textile material or other material having elastic or substantial elongation characteristics in the forefoot area 58, it is also possible for the upper 23 to accommodate wearers having a range of different size length and width. For example, a given size small upper 23 could accommodate men's sizes in the range between size lengths 7-8.5, and size widths A-E; a given size medium upper 23 could accommodate men's sizes in the range between size lengths 9-10.5, and size widths A-E; and, a given large upper 23 could accommodate men's sizes in the range between size lengths 11-12.5, and size widths A-E. Further, the anterior outsole element 44 including the stability element 136 can be made in corresponding small, medium, and large sizes. Moreover, the anterior outsole element 44 including the stability element 136 can be made in more specific sizes corresponding to each ½ inch length size, and also each width size graduation between A-E. Furthermore, an anterior outsole element 44 possibly including a stability element 136 can be made in various different three dimensional shapes and configurations generally corresponding to different footwear lasts 80, or other type of three dimensional rendering, or database relating to a desired model or pattern foot shape. The particular desired foot shape can be derived from a given individual wearer, and a customized anterior outsole element 44 possibly including a stability element 136 can be custom formed for the wearer when at least the backing portion 30 of the anterior outsole element 44 which can also substantially form the elevated structure of the stability element 136 is made from a thermoplastic material. It can be readily understood that alternate and generally equivalent sizing can also be made available using other footwear sizing scales and methods. Accordingly, an anterior outsole element 44 which can possibly include a stability element 136 can be used to at least partially define the length size and width size in the forefoot area 58, and thereby, more generally the length size and width size of an article of footwear 22.

Stability element 131.1 can wrap about the anterior side 33 within the upper 23, and stability elements 131.2 and 131.3 can be complimented by like structures on the medial side 35 which are suitably offset to accommodate for anatomical differences. Accordingly, a direct mechanical link can exist between the traction members 155 that are present on the anterior outsole element 44 and the stability elements 136.1, 136.2, and 136.3. The stability elements 136.1, 136.2 and 136.3 include notches 71.1 and 71.2 on the lateral side 36, and it can be readily understood that corresponding notches that would be suitably offset to accommodate for anatomical differences would be present on the medial side 35. The position of notch 71.2 approximately coincides with the location of a wearer's fifth metatarsal-phalangeal joint 89 and the position of notch 71.1 is more anterior, thus the stability elements 136.1, 136.2, and 136.3 do not substantially inhibit flexion of a wearer's foot about the metatarsal-phalangeal joints. The notches 71.1 and 71.2 terminate at a location near a tangent point which approximates the bottom net where the backing 30 curves to assume a substantially generally planar shape as it passes beneath the inferior side of the anterior spring element 48. It can be advantageous that the insole 31 extend upwards about the medial side 35, lateral side 36, and anterior side 33 to greater degree than is customary in a typical article of footwear in order to cushion and protect the wearer's foot from making substantial direct contact with the stability elements 136.1, 136.2, and 136.3, as shown in FIGS. 447, 448, and 480. If desired, the backing 30 and stability elements 136.1, 136.2, and 136.3 can be made of a transparent material as shown. It is anticipated that stability element 136 could be made in various alternate configurations, e.g., the stability element 136 could possibly extends upwards and be integrated with closure means such as laces or straps.

FIG. 337 is a longitudinal cross-sectional lateral side 36 view of an article of footwear 22 generally similar to that shown in FIG. 336, but including a number of differences. In this embodiment, the backing 30 portion of the anterior outsole element 44 includes upwardly extending stability element 136 including stability element portions 136.1, 136.2, and 136.4 which can serve both to define the shape of the shoe upper 23, but also to stabilize the foot of a wearer in functional relation to the article of footwear 22. Stability element 136.1 can wrap about the anterior side 33 within the upper 23, and stability elements 136.2 and 136.4 can be complimented by like structures on the medial side 35 which are suitably offset to accommodate for anatomical differences. In particular, stability element 136.4 wraps about the posterior side 34 within the upper 23 to form a heel counter 24.

FIG. 338 is a longitudinal cross-sectional lateral side 36 view of an article of footwear 22 generally similar to that shown in FIG. 336, but including a number of differences. In this embodiment, the backing 30 portion of the anterior outsole element 44 includes upwardly extending stability element 136 including stability element portions 136.1, 136.2, 136.3, and 136.5 which can serve both to define the shape of the shoe upper 23, but also to stabilize the foot of a wearer in functional relation to the article of footwear 22. Stability element 136.1 can wrap about the anterior side 33 within the upper 23, and stability elements 136.2, 136.3, and 136.5 can be complimented by like structures on the medial side 35 which are suitably offset to accommodate for anatomical differences. In particular, stability element 136.5 can wrap about the posterior side 34 within the upper 23 and form a heel counter 24. The stability elements 136.1, 136.2, 136.3 and 136.5 include notches 71.1, 71.2, and 71.3 on the lateral side 36, and it can be readily understood that corresponding notches that would be suitably offset to accommodate for anatomical differences would be present on the medial side 35. The position of notch 71.2 approximately coincides with the location of a wearer's fifth metatarsal-phalangeal joint 89 and the position of notch 71.1 is more anterior, thus the stability elements 136.1, 136.2, and 136.3 do not substantially inhibit flexion of a wearer's foot about the metatarsal-phalangeal joints. The notches 71.1 and 71.2 terminate at a location near a tangent point which approximates the bottom net where the backing 30 curves to assume a substantially generally planar shape as it passes beneath the inferior side of the anterior spring element 48. The position of notch 71.3 approximately coincides with the location of the fastener 29, but also with the apex of the curvature incorporated into the footwear last 80 corresponding to the longitudinal arches of a wearer's foot in the midfoot area 67, thus can accommodate deflection of the superior spring element 47. Again, the superior spring element 47 can include an anterior spring element 48 and a posterior spring element 49, as shown.

FIG. 339 is a longitudinal cross-sectional lateral side 36 view of an article of footwear 22 generally similar to that shown in FIG. 336, but including a number of differences. In particular, the stability elements portions 136.1*a*, 136.2*a*, and 136.3*a* are part of a stability element 136*a* that is not a part or extension of the backing 30 portion of the anterior outsole element 44, rather the stability element 136*a* is a separate component or feature of the exterior of the upper 23. For example, stability element 136*a* can be made of a thermoplastic material or a polyurethane material that is directly injection molded and bonded to the upper 23, and the like. Alternately, a foam material can be applied to the upper 23 as taught in U.S. Pat. No. 5,785,909 granted to Chang et al. and U.S. Pat. No. 5,885,500 granted to Tawney et al., assigned to Nike, Inc., and the like. In this embodiment, the upwardly extending stability elements 136.1*a*, 136.2*a*, and 136.3*a* can serve both to define the shape of the shoe upper 23, but also to stabilize the foot of a wearer in functional relation to the article of footwear 22. Stability element 136.1*a* can wrap about the anterior side 33 of the upper 23, and stability elements 136.2*a* and 136.3*a* can be complimented by like structures on the medial side 35 which are suitably offset to accommodate for anatomical differences. In an alternate construction, the anterior outsole element 44 can be eliminated, and the traction members of the outsole 43 can be directly affixed to the stability element 136*a*. However, in the construction shown in FIG. 339, the traction members 115 emerge through registered openings 72 in the stability element 136*a* and can bear directly thereupon when deformed by generally transverse loads. Accordingly, a direct mechanical link can exist between the traction members 115 that are present on the anterior outsole element 44 and the stability element 136*a*. When a textile material or other material having elastic characteristics is used in the construction of the forefoot area 58 of the upper 23, the presence of the stability elements 136.1*a*, 136.2*a*, and 136.3*a* can at least in part define the shape and fit of the upper 23 to which they are affixed by conventional means, and in particular, can prevent trauma to a wearer's toes due to the elastic material possibly working against and dragging across their toenails. The stability elements 136.1*a*, 136.2*a* and 136.3*a* include notches 71.1 and 71.2 on the lateral side 36, and it can be readily understood that corresponding notches that would be suitably offset to accommodate for anatomical differences would be present on the medial side 35. The position of notch 71.2 approximately coincides with the location of a wearer's fifth metatarsal-phalangeal joint 89 and the position of notch 71.1 is more anterior, thus the stability elements 136.1*a*, 136.2*a*, and 136.3*a* do not substantially inhibit flexion of a wearer's foot about the metatarsal-phalangeal joints. The notches 71.1 and 71.2 terminate at a location near a tangent point which approximates the bottom net where the stability element 136*a* curves to assume a substantially generally planar shape as it passes beneath the inferior side of the anterior spring element 48. It can be advantageous that the insole 31 extend upwards about the medial side 35, lateral side 36, and anterior side 33 to greater degree than is customary in a typical article of footwear in order to cushion and protect the wearer's foot from making substantial direct contact with the stability elements 136.1*a*, 136.2*a*, and 136.3*a*. If desired, the stability element 136*a* can be made of a transparent material as shown, or a thermoplastic material including decorative sublimation printing, and the like. The stability element 136*a* could have other configurations, and portions could possibly extends upwards to link with closure means such as laces or straps included in the construction of the upper 23.

FIG. 340 is a longitudinal cross-sectional lateral side 36 view of an article of footwear 22 generally similar to that shown in FIG. 337, but including a number of differences. In particular, the stability elements portions 136.1*b*, 136.2*b*, and 136.4*b* are part of a larger stability element 136*b* that is not a part or extension of the backing 30 portion of the anterior outsole element 44, rather the stability element 136*b* is a separate component or feature of the exterior of the upper 23. For example, stability element 136*b* can be made of a thermoplastic material or a polyurethane material that is directly injection molded and bonded to the upper 23, and the like. Alternately, a foam material can be applied to the upper 23 as taught in U.S. Pat. No. 5,785,909 granted to Chang et al. and U.S. Pat. No. 5,885,500 granted to Tawney et al., assigned to Nike, Inc., and the like. In this embodiment, the upwardly extending stability elements 136.1*b*, 136.2*b*, and 136.4*b* can serve both to define the shape of the shoe upper 23, but also to stabilize the foot of a wearer in functional relation to the article of footwear 22. Stability element 136.1*b* can wrap about the anterior side 33 of the upper 23, and stability elements 136.2*b* and 136.4*b* can be complimented by like structures on the medial side 35 which are suitably offset to accommodate for anatomical differences. Stability element 136.4*b* can wrap about the posterior side 34 of the upper 23 to form a heel counter 24. In an alternate construction, the anterior outsole element 44 can be eliminated, and the traction members of the outsole 43 can be directly affixed to the stability element 136*b*. However, in the construction shown in FIG. 340, the traction members 115 emerge through registered openings 72 in the stability element 136*b* and can bear directly thereupon when deformed by generally transverse loads. Accordingly, a direct mechanical link can exist between the traction members 115 that are present on the anterior outsole element 44 and the stability element 136*b*. When a textile material or other material having elastic characteristics is used in the construction of the forefoot area 58 of the upper 23, the presence of the stability elements 136.1*b*, 136.2*b*, and 136.4*b* can at least in part define the shape and fit of the upper 23 to which they are affixed by conventional means, and in particular, can prevent trauma to a wearer's toes due to the elastic material possibly working against and dragging across their toenails. The stability elements 136.1*b*, 136.2*b* and 136.4*b* include notches 71.1 and 71.2 on the lateral side 36, and it can be readily understood that corresponding notches that would be suitably offset to accommodate for anatomical differences would be present on the medial side 35. The position of notch 71.2 approximately coincides with the location of a wearer's fifth metatarsal-phalangeal joint 89 and the position of notch 71.1 is more anterior, thus the stability elements 136.1*b*, 136.2*b*, and 136.4*b* do not substantially inhibit flexion of a wearer's foot about the metatarsal-phalangeal joints. The notches 71.1 and 71.2 terminate at a location near a tangent point which approximates the bottom net where the stability element 136*b* curves to assume a substantially generally planar shape as it passes beneath the inferior side of the anterior spring element 48. It can be advantageous that the insole 31 extend upwards about the medial side 35, lateral side 36, anterior side 33, and posterior side 34 to greater degree than is customary in a typical article of footwear in order to cushion and protect the wearer's foot from making substantial direct contact with the stability elements 136.1*b*, 136.2*b*, and 136.4*b*. If desired, the stability elements 136*b* can be made of a transparent material as shown, or a thermoplastic material including decorative sublimation printing, and the like. The stability element 136*b* could have other configurations, and portions could possibly extends upwards to link with closure means such as laces or straps included in the construction of the upper 23.

FIG. 341 is a longitudinal cross-sectional lateral side 36 view of an article of footwear 22 generally similar to that shown in FIG. 338, but including a number of differences. In particular, the stability element portions 136.1*c*, 136.2*c*, 136.3*c*, and 136.5*c* are part of a larger stability element 136*c* that is not a part or extension of the backing 30 portion of the anterior outsole element 44, rather the stability element 136*c* is a separate component or feature of the exterior of the upper 23. For example, stability element 136*c* can be made of a thermoplastic material or a polyurethane material that is directly injection molded and bonded to the upper 23, and the like. Alternately, a foam material can be applied to the upper 23 as taught in U.S. Pat. No. 5,785,909 granted to Chang et al. and U.S. Pat. No. 5,885,500 granted to Tawney et al., assigned to Nike, Inc., and the like. In this embodiment, the upwardly extending stability elements 136.1*c*, 136.2*c*, 136.3*c*, and 136.5*c* can serve both to define the shape of the shoe upper 23, but also to stabilize the foot of a wearer in functional relation to the article of footwear 22. Stability element 136.1*c* can wrap about the anterior side 33 of the upper 23, and stability elements 136.2*c*, 136.3*c* and 136.5*c* can be complimented by like structures on the medial side 35 which are suitably offset to accommodate for anatomical differences. Stability element 136.5*c* can wrap about the posterior side 34 of the upper 23 to form a heel counter 24. In an alternate construction, the anterior outsole element 44 can be eliminated, and the traction members of the outsole 43 can be directly affixed to the stability element 136*c*. However, in the construction shown in FIG. 341, the traction members 115 emerge through registered openings 72 in the stability element 136*c* and can bear directly thereupon when deformed by generally transverse loads. Accordingly, a direct mechanical link can exist between the traction members 115 that are present on the anterior outsole element 44 and the stability element 136*c*. When a textile material or other material having elastic characteristics is used in the construction of the forefoot area 58 of the upper 23, the presence of the stability elements 136.1*c*, 136.2*c*, 136.3*c*, and 136.5*c* can at least in part define the shape and fit of the upper 23 to which they are affixed by conventional means, and in particular, can prevent trauma to a wearer's toes due to the elastic material possibly working against and dragging across their toenails. The stability elements 136.1*c*, 136.2*c*, 136.3*c*, and 136.5*c* include notches 71.1 and 71.2 on the lateral side 36, and it can be readily understood that corresponding notches that would be suitably offset to accommodate for anatomical differences would be present on the medial side 35. The position of notch 71.2 approximately coincides with the location of a wearer's fifth metatarsal-phalangeal joint 89 and the position of notch 71.1 is more anterior, thus the stability elements 136.1*c*, 136.2*c*, and 136.3*c* do not substantially inhibit flexion of a wearer's foot about the metatarsal-phalangeal joints. The notches 71.1 and 71.2 terminate at a location near a tangent point which approximates the bottom net where the stability element 136*c* curves to assume a substantially generally planar shape as it passes beneath the inferior side of the anterior spring element 48. It can be advantageous that the insole 31 extend upwards about the medial side 35, lateral side 36, anterior side 33, and posterior side 34 to greater degree than is customary in a typical article of footwear in order to cushion and protect the wearer's foot from making substantial direct contact with the stability elements 136.1*c*, 136.2*c*, 136.3*c* and 136.5*c*. If desired, the stability element 136*c* can be made of a transparent material as shown, or a thermoplastic material including decorative sublimation printing, and the like. The stability element 136*c* could have other configurations, and portions could possibly extends upwards to link with closure means such as laces or straps included in the construction of the upper 23.

FIG. 342 is a longitudinal cross-sectional lateral side 36 view of an article of footwear 22 generally similar to that shown in FIG. 341, but including a number of differences. As shown, the article of footwear 22 includes a first fluid-filled bladder 101.1 located between the inferior spring element 50 and the inferior side of the upper 23, and a second fluid-filled bladder 101.2 located between the anterior spring element 48.2 and the inferior side of the upper 23 including the anterior spring element 48.1. The fluid-filled bladders 101.1 and 101.2 can be affixed using adhesive, bonding, welding, or other conventional techniques. However, it can be advantageous for the fluid-filled bladders 101.1 and 101.2 to be affixed by mechanical means so that they can be customized, and removed and replaced, as desired. Again, the fluid-filled bladder 101.1 can be formed so that one of the walls 132 of the bladder is coincident or affixed to a portion of the backing 30 of the posterior outsole element 46 and/or the fluid-filled bladder 101.1 can include a thin web 114 extending therefrom which can be secured between the inferior spring element 50 and the inferior side of the upper 23. Likewise, the fluid-filled bladder 101.2 can be formed so that one of the walls 132 of the bladder is coincident or affixed to a portion of the backing 30 of the anterior outsole element 44 and/or the fluid-filled bladder 101.2 can include a thin web 114 extending therefrom which can be secured between the anterior spring element 48.2 and the inferior side of the upper 23, and/or between a portion of the anterior spacer 55.2 and an adjoining mating surface.

FIG. 343 is a longitudinal cross-sectional lateral side 36 view of an article of footwear 22 generally similar to that shown in FIG. 342, but including a number of differences. The article of footwear 22 includes a cushioning element 135 made of foam material 134 located between the inferior spring element 50 and the inferior side of the upper 23, and a plurality of generally similar cushioning elements 135 located between the inferior anterior spring element 48.2 and the upper 23 including the superior anterior spring element 48.1. The cushioning elements 135 can be affixed using adhesive, bonding, welding, or other conventional techniques. The cushioning elements 135 can possibly be affixed at both their superior side and inferior side, or at only their superior side as shown in FIG. 344, or at only their inferior side as shown in FIG. 345, as desired. However, it can be advantageous for the cushioning elements 135 to be affixed by mechanical means so that they can be customized, and removed and replaced, as desired. In this regard, the cushioning elements 135 can be affixed to the backing 30 present on the posterior outsole element 46 and the anterior outsole element 44. Alternately, as shown and taught in FIG. 335, the cushioning elements 135 can include an integral backing or web 114 portion including a flange 124 and can be inserted through an opening 72 in the backing 30 portion of the posterior outsole element 46 or anterior outsole element 44 and can thereby be mechanically affixed in place when the inferior spring element 50 and/or the anterior spring element 48.2 is inserted into the pocket 130 formed within either the posterior outsole element 46 or the anterior outsole element 50 and the posterior spring element 50 and/or the anterior spring element 46 are properly affixed in functional relation to the upper 23. Alternately, as shown and taught in FIG. 334, the cushioning elements 135 can include an integral backing or web 114 portion including a flange 124 and can be inserted through an opening 72 in the upper 23 and thereby be mechanically affixed in place when the superior spring element 47 possibly including a posterior spring element 49 and an anterior spring element 48.1 is inserted into the upper 23 and the inferior spring element 50 and anterior spring element 48.2 are properly affixed in functional relation to the upper 23. The physical and mechanical properties of the various cushioning elements 135 can be homogenous, or alternately, can be heterogeneous and varied so as to provide different physical and mechanical properties in various select areas of the sole 32 of the article of footwear 22. For example, it can possibly be advantageous to reduce the stiffness of the lateral side of the sole 32 in the rearfoot area 68 and forefoot area 58 in a running shoe.

FIG. 344 is a longitudinal cross-sectional lateral side 36 view of an article of footwear 22 generally similar to that shown in FIG. 343, but including a number of differences. The article of footwear 22 includes a cushioning element 135 made of foam material 134 located between the inferior spring element 50 and the inferior side of the upper 23, and a plurality of generally similar cushioning elements 135 located between the anterior spring element 48.2 and the upper 23 including the anterior spring element 48.1. As shown, the cushioning elements 135 can be affixed on their superior side using adhesive, bonding, welding, or other conventional techniques. However, it can be advantageous for the cushioning elements 135 to be affixed by mechanical means so that they can be customized, and removed and replaced, as desired. As shown and taught in FIG. 334, the cushioning elements 135 can include an integral backing or web 114 portion including a flange 124 and can be inserted through an opening 72 in the upper 23 and thereby be mechanically affixed in place when the superior spring element 47 possibly including a posterior spring element 49 and an anterior spring element 48.1 is inserted into the upper 23 and the inferior spring element 50 and anterior spring element 48.2 are properly affixed in functional relation to the upper 23. The physical and mechanical properties of the various cushioning elements 135 can be homogenous, or alternately, can be heterogeneous and varied so as to provide different physical and mechanical properties in various select areas of the sole 32 of the article of footwear 22. For example, it can possibly be advantageous to reduce the stiffness of the lateral side of the sole 32 in the rearfoot area 68 and forefoot area 58 in a running shoe.

FIG. 345 is a longitudinal cross-sectional lateral side 36 view of an article of footwear 22 generally similar to that shown in FIG. 344, but including a number of differences. The article of footwear 22 includes a cushioning element 135 made of foam material 134 located between the inferior spring element 50 and the inferior side of the upper 23, and a plurality of generally similar cushioning elements 135 located between the anterior spring element 48.2 and the upper 23 including the anterior spring element 48.1. As shown, the cushioning elements 135 can be affixed on their inferior side using adhesive, bonding, welding, or other conventional techniques. However, it can be advantageous for the cushioning elements 135 to be affixed by mechanical means so that they can be customized, and removed and replaced, as desired. As shown and taught in FIG. 335, the cushioning elements 135 can include an integral backing or web 114 portion including a flange 124 and can be inserted through an opening 72 in the backing 30 portion of the posterior outsole element 46 or anterior outsole element 44 and can thereby be mechanically affixed in place when the inferior spring element 50 or the anterior spring element 48.2 is inserted into the pocket 130 formed within either the posterior outsole element 46 and/or the anterior outsole element 50 and the posterior spring element 50 and/or the anterior spring element 46 are properly affixed in functional relation to the upper 23. The physical and mechanical properties of the various cushioning elements 135 can be homogenous, or alternately, can be heterogeneous and varied so as to provide different physical and mechanical properties in various select areas of the sole 32 of the article of footwear 22. For example, it can possibly be advantageous to reduce the stiffness of the lateral side of the sole 32 in the rearfoot area 68 and forefoot area 58 in a running shoe.

FIG. 346 is a longitudinal cross-sectional lateral side 36 view of an article of footwear 22 generally similar to that shown in FIG. 342, but including a number of differences. The article of footwear 22 includes a fluid-filled bladder 101.1 located between the inferior spring element 50 and the inferior side of the upper 23, and a fluid-filled bladder 101.2 located between the anterior spring element 48.2 and the upper 23 including the anterior spring element 48.1. The fluid-filled bladders 101.1 and 101.2 can be affixed using adhesive, bonding, welding, or other conventional techniques. The fluid-filled bladders can possibly be affixed at both their superior side and inferior side as shown in FIG. 346, or at only their superior side as shown in FIG. 347, or at only their inferior side as shown in FIG. 348, as desired. However, it can be advantageous for the fluid-filled bladders 101.1 and 101.2 to be affixed by mechanical means so that they can be customized, and removed and replaced, as desired. In this regard, the fluid-filled bladders 101.1 and 101.2 can be affixed to the backing 30 present on the posterior outsole element 46 and the anterior outsole element 44. Alternately, as shown and taught in FIG. 332, the fluid-filled bladders 101.1 and 101.2 can include an integral backing or web 114 portion including a flange 124 and can be inserted through an opening 72 in the backing 30 portion of the posterior outsole element 46 or anterior outsole element 44 and can thereby be mechanically affixed in place when the inferior spring element 50 and/or the anterior spring element 48.2 is inserted into the pocket 130 formed within either the posterior outsole element 46 or the anterior outsole element 50 and the posterior spring element 50 and/or the anterior spring element 46 are properly affixed in functional relation to the upper 23. Alternately, as shown and taught in FIG. 333, the fluid-filled bladders 101.1 and 101.2 can include an integral backing or web 114 portion including a flange 124 and can be inserted through an opening 72 in the upper 23 and thereby be mechanically affixed in place when the superior spring element 47 possibly including a posterior spring element 49 and an anterior spring element 48.1 is inserted into the upper 23 and the inferior spring element 50 and anterior spring element 48.2 are properly affixed in functional relation to the upper 23. The physical and mechanical properties associated with various chambers 103 and portions of the fluid-filled bladders 101.1 and 101.2 can be homogenous, or alternately, can be heterogeneous and varied so as to provide different physical and mechanical properties in various select areas of the sole 32 of the article of footwear 22. For example, it can possibly be advantageous to reduce the stiffness of the lateral side of the sole 32 in the rearfoot area 68 and forefoot area 58 in a running shoe.

FIG. 347 is a longitudinal cross-sectional lateral side 36 view of an article of footwear 22 generally similar to that shown in FIG. 346, but including a number of differences. The article of footwear 22 includes a fluid-filled bladder 101.1 located between the inferior spring element 50 and the inferior side of the upper 23, and a fluid-filled bladder 101.2 located between the anterior spring element 48.2 and the upper 23 including the anterior spring element 48.1. The fluid-filled bladders 101.1 and 101.2 can be affixed using adhesive, bonding, welding, or other conventional techniques. As shown in FIG. 347, the fluid-filled bladders 101.1 and 101.2 are affixed on their superior side. However, it can be advantageous for the fluid-filled bladders 101.1 and 101.2 to be affixed by mechanical means so that they can be customized, and removed and replaced, as desired. As shown and taught in FIG. 333, the fluid-filled bladders 101.1 and 101.2 can include an integral backing or web 114 portion including a flange 124 and can be inserted through an opening 72 in the upper 23 and thereby be mechanically affixed in place when the superior spring element 47 possibly including a posterior spring element 49 and an anterior spring element 48.1 is inserted into the upper 23 and the inferior spring element 50 and anterior spring element 48.2 are properly affixed in functional relation to the upper 23. The physical and mechanical properties associated with various chambers 103 and portions of the fluid-filled bladders 101.1 and 101.2 can be homogenous, or alternately, can be heterogeneous and varied so as to provide different physical and mechanical properties in various select areas of the sole 32 of the article of footwear 22. For example, it can possibly be advantageous to reduce the stiffness of the lateral side of the sole 32 in the rearfoot area 68 and forefoot area 58 in a running shoe.

FIG. 348 is a longitudinal cross-sectional lateral side 36 view of an article of footwear 22 generally similar to that shown in FIG. 347, but including a number of differences. The article of footwear 22 includes a fluid-filled bladder 101.1 located between the inferior spring element 50 and the inferior side of the upper 23, and a fluid-filled bladder 101.2 located between the anterior spring element 48.2 and the upper 23 including the anterior spring element 48.1. The fluid-filled bladders 101.1 and 101.2 can be affixed using adhesive, bonding, welding, or other conventional techniques. As shown in FIG. 347, the fluid-filled bladders 101.1 and 101.2 are affixed on their inferior side. However, it can be advantageous for the fluid-filled bladders 101.1 and 101.2 to be affixed by mechanical means so that they can be customized, and removed and replaced, as desired. In this regard, the fluid-filled bladders 101.1 and 101.2 can be affixed to the backing 30 present on the posterior outsole element 46 and the anterior outsole element 44. Alternately, as shown and taught in FIG. 332, the fluid-filled bladders 101.1 and 101.2 can include an integral backing or web 114 portion including a flange 124 and can be inserted through an opening 72 in the backing 30 portion of the posterior outsole element 46 or anterior outsole element 44 and can thereby be mechanically affixed in place when the inferior spring element 50 and/or the anterior spring element 48.2 is inserted into the pocket 130 formed within either the posterior outsole element 46 or the anterior outsole element 50 and the posterior spring element 50 and/or the anterior spring element 46 are properly affixed in functional relation to the upper 23. The physical and mechanical properties associated with various chambers 103 and portions of the fluid-filled bladders 101.1 and 101.2 can be homogenous, or alternately, can be heterogeneous and varied so as to provide different physical and mechanical properties in various select areas of the sole 32 of the article of footwear 22. For example, it can possibly be advantageous to reduce the stiffness of the lateral side of the sole 32 in the rearfoot area 68 and forefoot area 58 in a running shoe.

FIG. 349 is a lateral side 36 view of a shoe upper 23 mounted on a footwear last 80. The upper 23 can be made with the use conventional patterns, materials, and means known in the prior art, and can include openings 72 and possibly eyestays for accommodating laces and/or other conventional closure means. Shown is an upper 23 including a natural or synthetic textile material 137 such as a woven or knit fabric, and the like. It can be readily understood that the textile material 137 can consist of a circular knitted and/or three dimensional textile material, a multi-layer textile material, water resistant or waterproof materials, shape memory textile materials, or stretchable and elastic textile materials, and the like.

The textile material 137 included in the upper 23 can also be formed by circular knitting and/or three dimensional weaving or knitting methods known in the prior art related to the manufacture of socks, and a suitable pattern for use can be cut therefrom. Alternately, the textile material 137 forming at least a portion of the upper 23 can be made in the origami-like patterns taught in U.S. Pat. No. 5,604,997 granted to Dieter, and assigned to Nike, Inc. and the like, or the shoe construction taught in U.S. Pat. No. 6,237,251 granted to Litchfield et al. and assigned to Reebok International, Ltd., and the like, or the article of footwear taught in U.S. Pat. No. 6,299,962 granted to Davis et al. also assigned to Reebok International, Ltd., and the like, all of these recited patents hereby being incorporated by reference herein.

As shown in FIG. 349, the textile material 137 can be impregnated or over-molded with a plastic material 138 forming a stability element **136*d*, e.g., a relatively rigid thermoplastic material such as nylon, polyester, or polyethylene, or alternatively, an elastomeric thermoplastic material such as those made by Advanced Elastomer Systems which have been previously recited, a foam thermoplastic material, a rubber material, or a polyurethane material, and the like. The textile material 137 can be impregnated or over-molded while positioned in a substantially planar two dimensional orientation as shown in U.S. Pat. No. 6,299,962 granted to Davis et al., or alternately, while positioned in a relatively complex three dimensional shape on a footwear last 80, mold, or the like. For example, stability element 136*d* can be made of a thermoplastic material or a polyurethane material that is directly injection molded and bonded to the upper 23**.

Alternately, a foam material can be applied to the upper 23 as taught in U.S. Pat. No. 5,785,909 granted to Chang et al. and U.S. Pat. No. 5,885,500 granted to Tawney et al., assigned to Nike, Inc., and the like, the recited patents hereby being incorporated by reference herein. The textile material 137 can possibly be impregnated or over-molded with the use of a spray, dipping, or roller application generally similar to that known in the screenprinting prior art. If the plastic material 138 is of the thermoplastic variety, it can then be caused to cool to take a set. Alternately, a thermoset material which is used to impregnate or over-mold the textile material 137 can be caused to cross-link by conventional means known in the prior art. It is also possible to use a thermoplastic material that is moldable when heated to a relatively low temperature, and a wearer can then put on the article of footwear 22 and cause the upper 23 to be molded to a desired shape before the thermoplastic material cools and sets. Moreover, as taught in the applicant's U.S. Ser. No. 09/570,171, filed May 11, 2000, light-cure materials which can be caused to set and cure upon exposure to a specific range of light frequency and wavelength having adequate power can also be used. When the inferior side 38 of the upper 23 includes a plurality of openings 72 for accommodating the passage of a plurality of traction members 115 associated with the anterior outsole element 44 therethrough, it can be advantageous that the inferior side 38 of the upper 23 in the forefoot area 58, and possibly also that the midfoot area 67 and rearfoot area 68 be impregnated or over-molded by plastic material 138, or a suitable alternate material, or that the inferior side 38 otherwise be reinforced to enhance its structural integrity.

The upper 23 can also be made of new thermoplastic materials which have not yet been used to make articles of footwear that are biodegradable and environmentally friendly. For example, textile materials made from polylactic acid polymers derived from corn or other vegetation known by the trade name NATUREWORKS® fibers are presently under development and being commercialized by Cargill Dow Polymers LLC of Minneapolis, Minn. in corporation with the Kanebo Corporation associated with the Itochu Corporation of Osaka, Japan. The physical and mechanical properties of fibers and thermoplastic materials derived from polylactic acid generally compare favorably with many existing fibers and thermoplastic materials, but unlike the vast majority of the synthetic fibers and thermoplastic materials presently being used in the manufacture of articles of footwear those derived form polylactic acid are capable of substantially biodegrading when buried in the soil for a period of two to three years.

FIG. 350 is a lateral side 36 view of a shoe upper 23 that is generally similar to that shown in FIG. 349. However, as shown in FIG. 350, the upper 23 is made in general accordance with the so-called Huarache style commercialized by Nike, Inc. The textile material 137 can have elastic qualities, or alternatively, a rubber, neoprene foam rubber, polyurethane, or other material can be used in those areas of the vamp 52 and quarters 119 in which the location of a textile material 137 is indicated. In this regard, the textile material 137, or alternately, a substitute material having substantial elastic characteristics extends into the collar area 122 in order to facilitate entry and exit of a wearer's foot. Moreover, it can be readily understood that the upper 23 can include removable quarters including openings 72 for accommodating laces, straps 118, and/or other conventional closure means. The synergistic use of a textile material 137 or an alternate material having substantial elongation or elastic characteristics in combination with a relatively rigid thermoplastic material 138 or an alternate material having substantially less elongation or elastic characteristics in making the upper 23 can be coordinated to create select areas having different known and desired elongation characteristics in order to suitably accommodate or compliment a wearer's anatomical characteristics and biomechanical motions when engaged in activity. See U.S. Pat. No. 5,377,430 and also U.S. Pat. No. 6,367,168 B1 granted to Hatfield et al., and assigned to Nike, Inc., these patents being hereby incorporated by reference herein.

FIG. 351 is a bottom plan view of an upper 23 generally similar to that shown in FIGS. 349. Shown are a plurality of openings 72 for accommodating a plurality of traction members 115 associated with an anterior outsole element 44 generally similar to that shown in FIG. 318. Also shown is a hexagon shaped opening 72 for accommodating the passage of a fastener 29, the inferior side of the tongue 127, and the presence of a plastic material 138 or alternate wear resistant material on the inferior side 38 of the upper 23.

FIG. 352 is a longitudinal cross-sectional lateral side 36 view of an article of footwear 22 generally similar to that shown in FIG. 338, but including a number of differences. In this alternate embodiment, the openings 72 in the upper 23 for accommodating the outsole 43 traction members 115 associated with the anterior outsole element 44 extend not only on the inferior side 38, but also upwards about a portion of the medial side 35, lateral side 36, and also a portion of the anterior side 33 of the upper 23. Again, a portion of the backing 30 of the anterior outsole element 44 can extend upwards within the interior of the upper 23 forming stability elements 136.1, 136.2, 136.3, and 136.5, and traction members 115 which are not confined to the inferior side 38 of the upper 23 can extend therefrom. The structure can be advantageous for use in articles of footwear intended for use in activities requiring substantial lateral movement.

FIG. 353 is a longitudinal cross-sectional lateral side 36 view of an article of footwear 22 generally similar to that shown in FIG. 341, but including a number of differences. In this alternate embodiment, the openings 72 for accommodating the outsole 43 traction members 115 can extend not only on the inferior side 38, but also upwards about a portion of the medial side 35, lateral side 36, and also a portion of the anterior side 33 of the upper 23. Again, stability element **136*c* can form a plurality of individual stability elements 136.1*c*, 136.2*c*, 136.3*c*, and 136.5*c* that extend upwards about the exterior sides of the upper 23, and traction members 115 which are not confined to the inferior side 38 of the upper 23 can extend therethrough. The structure can be advantageous for use in articles of footwear intended for use in activities requiring substantial lateral movement. As shown, the traction members 115 can be affixed to the backing 30 of the anterior outsole element 44 and can emerge through registered openings 72 in the upper 23 and stability element 136*c*. Alternately, the traction members 115 can be directly affixed to a stability element generally similar to 136*c* which does not including openings 72. Again, the stability element 136*c* can be made of a transparent or translucent material as shown, or a thermoplastic material including decorative sublimation printing, and the like. The stability element 136*c* could have other configurations, and portions could possibly extends upwards to link with closure means such as laces or straps included in the construction of the upper 23. For example, an opening 72 is shown in the superior portion of stability element 136.3*c* and 136.2*c*** for possible use with a lace or strap.

FIG. 354 is a bottom plan view of an upper 23 generally similar to that shown in FIG. 351, but including openings 72 for accommodating the traction members 115 of the anterior outsole element 44 which extend upwards about the medial side 35, lateral side, and a portion of the anterior side 33 similar to that shown in FIGS. 352 and 353.

FIG. 355 shows a lateral side view of an article of footwear 22 including a spring element 51 and closure means including three straps 118 which can be affixed with VELCRO® hook and pile 140.

FIG. 356 shows a lateral side view of an article of footwear 22 including a spring element 51 and closure means including a removable strap 118 including eyestays 139 for accommodating the use of laces. Portions of the strap 118 can pass under the inferior side 38 of the upper 23 and be at least partially mechanically affixed within the grooves or valleys 93 formed between adjacent traction members 115.

FIG. 357 shows a lateral side view of an article of footwear 22 including a spring element 51, a backtab pull or strap 118.1, another pull or strap 118.2 located on the superior side 37 of the upper 23, and closure means including a removable strap 118.3 including eyestays 139 for accommodating the use of laces. Alternately, the strap taught in U.S. Pat. No. 5,692,319 granted to Parker et al. and assigned to Nike, Inc. can possibly be used, this patent hereby being incorporated by reference herein. A portion of the strap 118.3 can pass about the posterior side 34 of the upper 23 and there be adjusted and removably affixed with the use of VELCRO® hook and pile 140, and also under the inferior side 38 of the upper 23 and there be at least partially mechanically affixed within the grooves or valleys 93 formed between adjacent traction members 115 as was shown in FIG. 356.

FIG. 358 is a top plan view of a pattern for an upper 23 of an article of footwear 22 that is substantially formed in a single part. As shown, the upper 23 includes a textile material 137 and can be cut using an automatic cutting machine such as those made by the Eastman Company of Buffalo, N.Y. As previously discussed, the upper 23 can also be coated or over-molded with a thermoplastic material 138 to create reinforced areas, and this can be done either before or after the desired pattern is cut. The inferior side 38 of the upper 23 can include openings 72 for the passage of traction members therethrough, or alternately, can have traction members 115 directly affixed thereto, as shown in FIG. 360. The inferior side 38 be folded underneath in order to properly communicate with the medial, lateral, anterior and posterior portions of the upper 23 and be affixed in functional relation thereto with the use of conventional means such as stitching, adhesives, bonding, or welding such as radio frequency or sonic welding, and the like. The provision of an overlap area 141.1 can facilitate affixing the posterior sides 34 of the upper 23 together. Likewise the provision of an overlap area 141.2 on the inferior side 38 can facilitate affixing that portion in functional relation to the other portions of the upper 23. The overlap areas 141.1 and 141.2 can pass and therefore be visible within the interior of the upper 23, or alternately, on the exterior of the upper 23.

FIG. 359 is a top plan view of an alternate pattern for an upper 23 of an article of footwear 22 that is substantially formed in a single part. In this embodiment, the inferior side 38 is formed in two discontinuous portions that are connected to the generally opposing medial and lateral sides of the upper 23. As shown the upper 23 pattern is made of a textile material 137. As previously discussed, the textile material 137 can possibly be partially coated or over-molded with a thermoplastic material 138.

FIG. 360 is a top plan view of an alternate pattern for an upper 23 of an article of footwear 22 that is substantially formed in two parts. This can sometimes be advantageous when a material or color break exists in the design of the upper 23. As shown, the portion including the posterior side 34 includes an overlap portion 141.1 for facilitating affixing the medial side 35 and lateral side 36 together, and also an overlap portion 141.3 for affixing that portion of the upper 23 including the posterior side 34 to that portion of the upper 23 including the anterior side 33. As shown, the upper 23 is substantially made of a thermoplastic material 138. Alternately, the upper 23 can be made of a textile material 137, or a textile material 137 that is partially coated or over-molded with a thermoplastic material 138. As shown, traction members 115 can be directly affixed or integrally molded to the inferior side 38 of the upper 23.

FIG. 361 is a bottom plan view of an upper 23 of an article of footwear 22 having an opening 72 in the rearfoot area 68. The opening 72 can permit a portion of a fluid-filled bladder 101, foam cushioning element 135, or other cushioning medium or cushioning means that is inserted within the upper 22 to protrude downwardly therethrough as shown, e.g., in FIGS. 331 and 334.

FIG. 362 is a top plan view of a posterior spring element 49 having an opening 72 in the rearfoot area 68. The opening 72 can permit a portion of a fluid-filled bladder 101, foam cushioning element 135, or other cushioning medium or cushioning means that is inserted within the upper 23 to be visible from the superior side 37, and to also possibly protrude upwardly therethrough. Alternatively, the opening 72 in the posterior spring element 49 and/or heel counter 24 can be more substantial in size as taught in U.S. Pat. No. 6,925,732 by Richard Clarke and assigned to Nike, Inc., this patent hereby being incorporated by reference herein.

FIG. 363 is a side perspective view of a posterior spring element 49 having a three dimensional shape including a relatively low profile cupped shape about the medial side 35, lateral side 36, and posterior side 34.

FIG. 364 is a side perspective view of a posterior spring element 49 having a three dimensional shape including a heel counter 24 having a relatively high profile about the medial side 35, lateral side 36, and posterior side 34.

FIG. 365 is a side perspective view of a posterior spring element 49 having a three dimensional shape including two generally opposing heel counters 24 having a relatively high profile on the medial side 35 and the lateral side 36, and a relatively low profile cupped shape about the posterior side 34.

FIG. 366 is a top plan view of an inferior spring element 50, and showing two arrows indicating a position associated with a width measurement between the medial side 35 and lateral side 36, and also a position associated with a length measurement between the approximate center of the opening 72 for accommodating a fastener 29 and the posterior side 34.

FIG. 367 is a top plan view of an inferior spring element 50 showing a flexural axis 59 orientated at approximately 35 degrees from the transverse axis 91 for possible use by a wearer.

FIG. 368 is a top plan view of an inferior spring element 50 showing a flexural axis 59 orientated at approximately 45 degrees from the transverse axis 91 for possible use by a wearer.

FIG. 369 is a top plan view of an inferior spring element 50 showing a flexural axis 59 orientated at approximately 25 degrees from the transverse axis 91 for possible use by a wearer.

FIG. 370 is a top plan view of an inferior spring element 50 showing a flexural axis orientated at approximately 90 degrees from the longitudinal axis 67, thus generally consistent with the transverse axis 91.

FIG. 371 is a side view of an inferior spring element 50 affixed in functional relation to an article of footwear 22 showing possible deflection of the inferior spring element 50 with an arrow.

FIG. 372 is a side view of a portion of an inferior spring element 50 showing the thickness of the inferior spring element 50 with an arrow.

FIG. 373 is a side perspective view of an inferior spring element 50 having an asymmetrical curvature on the medial side 35 versus the lateral side 36. Again, the flexural axis 59 can be orientated at approximately 90 degrees from the longitudinal axis 67, thus generally consistent with the transverse axis 91, or alternately can be orientated at an angle deviated therefrom.

FIG. 374 is a side perspective view of an inferior spring element 50 having a symmetrical curvature on the medial side 35 and the lateral side 36. Again, the flexural axis 59 can be orientated at approximately 90 degrees from the longitudinal axis 67, thus generally consistent with the transverse axis 91, or alternately can be orientated at an angle deviated therefrom.

FIG. 375 is a bottom plan view of a posterior outsole element 46 mounted on an inferior spring element 50 showing a position associated with a width measurement and a position associated with a length measurement for possible use in an Internet Website or retail establishment.

FIG. 376 is a bottom plan view of a posterior outsole element 46 mounted on an inferior spring element 50 having a flexural axis 59 oriented at approximately 35 degrees from the transverse axis similar to that shown in FIG. 367.

FIG. 377 is a bottom plan view of a posterior outsole element 46 mounted on an inferior spring element 50 having a flexural axis 59 oriented at approximately 45 degrees from the transverse axis 91 similar to that shown in FIG. 368.

FIG. 378 is a bottom plan view of a posterior outsole element 46 mounted on an inferior spring element 50 having a flexural axis 59 oriented at approximately 25 degrees from the transverse axis 91 similar to that shown in FIG. 369.

FIG. 379 is a bottom plan view of a posterior outsole element 46 mounted on an inferior spring element 50 having a flexural axis 59 oriented at approximately 90 degrees from the transverse axis 91 similar to that shown in FIG. 370.

FIG. 380 is a top plan view of a posterior outsole element 46 mounted on an inferior spring element 50 having a flexural axis 59 oriented at approximately 35 degrees from the transverse axis 91 similar to that shown in FIG. 367. As shown, the backing 30 portion of the posterior outsole element 46 can be made of a transparent material, thus enabling the inferior spring element 50 to be visible.

FIG. 381 is a top plan view of a posterior outsole element 46 mounted on an inferior spring element 50 having a flexural axis 59 oriented at approximately 45 degrees from the transverse axis 91 similar to that shown in FIG. 368. As shown, the backing 30 portion of the posterior outsole element 46 can be made of a transparent material, thus enabling the inferior spring element 50 to be visible.

FIG. 382 is a top plan view of a posterior outsole element 46 mounted on an inferior spring element 50 having a flexural axis 59 oriented at approximately 25 degrees from the transverse axis 91 similar to that shown in FIG. 369. As shown, the backing 30 portion of the posterior outsole element 46 can be made of a transparent material, thus enabling the inferior spring element 50 to be visible.

FIG. 383 is a top plan view of a posterior outsole element 46 mounted on an inferior spring element 50 having a flexural axis 59 oriented at approximately 90 degrees from the transverse axis 91 similar to that shown in FIG. 370. As shown, the backing 30 portion of the posterior outsole element 46 can be made of a transparent material, thus enabling the inferior spring element 50 to be visible.

FIG. 384 is a top plan view of a posterior outsole element 46 including an opening 72 for accommodating a fluid-filled bladder 101. A fluid-filled bladder 101 can be inserted into the pocket 131 within the posterior outsole element 46. A portion of the fluid-filled bladder 101 can then project through the opening 72 in the backing 30, but the fluid-filled bladder 101 can be prevented from passing completely therethrough due to the inclusion of an integral generally planar flange 124.

FIG. 385 is a top plan view of a posterior outsole element 46 including an opening 72 for accommodating a foam cushioning element 135. A foam cushioning element 135 can be inserted into the pocket 131 within the posterior outsole element 46. A portion of the foam cushioning element 135 can then project through the opening 72 in the backing 30, but the foam cushioning element 135 can be prevented from passing completely therethrough due to the inclusion of an integral generally planar flange 124.

FIG. 386 is a top plan view of a posterior outsole element 46 including a plurality of openings 72 for accommodating a fluid-filled bladder 101 including three chambers 133. A fluid-filled bladder 101 can be inserted into the pocket 131 within the posterior outsole element 46. A portion of the fluid-filled bladder 101 can then project through the openings 72 in the backing 30, but the fluid-filled bladder 101 can be prevented from passing completely therethrough due to the inclusion of an integral generally planar flange 124. As shown, the fluid-filled bladder 101 can be positioned on the medial side 35 in order to increase the local stiffness in compression and thereby reduce exhibited pronation. Again, the backing 30 portion of the posterior outsole element 46 can be made of a transparent material, thus enabling the inferior spring element 50 to be visible.

FIG. 387 is a top plan view of a posterior outsole element 46 including a plurality of openings 72 for accommodating a foam cushioning element 135 including three columns. A foam cushioning element 135 can be inserted into the pocket 131 within the posterior outsole element 46. A portion of the three columns of the foam cushioning element 135 can then project through the openings 72 in the backing 30, but the foam cushioning element 135 can be prevented from passing completely therethrough due to the inclusion of an integral generally planar flange 124. As shown, the foam cushioning element 135 can be positioned on the medial side 35 in order to increase the local stiffness in compression and thereby reduce exhibited pronation. Again, the backing 30 portion of the posterior outsole element 46 can be made of a transparent material, thus enabling the inferior spring element 50 to be visible.

FIG. 388 is a top plan view of a posterior outsole element 46 including a plurality of openings 72 for accommodating a fluid-filled bladder 101 including three chambers 133. A fluid-filled bladder 101 can be inserted into the pocket 131 within the posterior outsole element 46. A portion of the fluid-filled bladder 101 can then project through the openings 72 in the backing 30, but the fluid-filled bladder 101 can be prevented from passing completely therethrough due to the inclusion of an integral generally planar flange 124. As shown, the fluid-filled bladder 101 can include a first chamber 133 positioned on the medial side 35, a second chamber 133 on the lateral side 36, and a third chamber 133 on the posterior side 34 in order to increase the local stiffness in compression. Again, the backing 30 portion of the posterior outsole element 46 can be made of a transparent material, thus enabling the inferior spring element 50 to be visible.

FIG. 389 is a top plan view of a posterior outsole element 46 including a plurality of openings 72 for accommodating a foam cushioning element 135 including three generally oval shaped portions. A foam cushioning element 135 can be inserted into the pocket 131 within the posterior outsole element 46. A portion of the three oval shaped portions of the foam cushioning element 135 can then project through the openings 72 in the backing 30, but the foam cushioning element 135 can be prevented from passing completely therethrough due to the inclusion of an integral generally planar flange 124. As shown, the foam cushioning element 135 can include a first oval shaped portion on the medial side 35, a second oval shaped portion on the lateral side 36, and a third oval shaped portion on the posterior side 34 in order to increase the local stiffness in compression. Again, the backing 30 portion of the posterior outsole element 46 can be made of a transparent material, thus enabling the inferior spring element 50 to be visible.

FIG. 390 is a bottom plan view of a posterior outsole element 46 including a plurality of traction members 115 for possible use on natural surfaces.

FIG. 391 is a bottom plan view of an anterior outsole element 44 including a plurality of traction members 115 for possible use on natural surfaces.

FIG. 392 is a side view of an article of footwear 22 including a posterior outsole element 46 and also an anterior outsole element 44 including a plurality of traction members 115 generally similar to those shown in FIGS. 390-391.

FIG. 393 is a side view of an article of footwear 22 including a posterior outsole element 46 and also an anterior outsole element 44 including a plurality of traction members 115 having greater height than those shown in FIGS. 390-392.

FIG. 394 is a bottom plan view of an anterior spring element 48 without flex notches, but including a portion of a prior art bicycle cleat system 73 affixed thereto. Shown is a portion of the prior art bicycle cleat system taught in U.S. Pat. No. 5,546,829 granted to Richard Bryne and assigned to Speedplay, Inc. of San Diego, Calif., and in particular, the embodiment shown in FIG. 19 therein, this patent hereby being incorporated by reference herein. The numerals used in U.S. Pat. No. 5,546,829 to indicate various portions of this prior art bicycle cleat system have been retained for possible reference.

FIG. 395 is a top plan view of an anterior spring element 48 generally similar to that shown in FIG. 316, but having a slightly different configuration. A portion of at least one flex notch 71 can simultaneously serve as a female mating structure 129 for use in combination with a mate mating structure 130, or alternately, as an opening for accommodating the passage of a portion of at least one fastener 29.

FIG. 396 is a top plan view of an anterior spring element 48 generally similar to that shown in FIG. 316, but including a greater number of flex notches 71. In particular, the position of some the flex notches have been changed, and this embodiment further includes longitudinal flex notches 71.8 and 71.9, and also a transverse flex notch 71.7. This embodiment can exhibit relatively less torsional stiffness when loads are expected to be applied from a greater number of directions.

FIG. 397 is a top plan view of an inferior anterior spring element 48.2 including a longitudinal flex notch 71.1, and transverse flex notches 71.2, 71.3, 71.5, and 71.6. These notches can be associated with lines of flexion 54.1, 54.2, 54.3, 54.5, and 54.6.

FIG. 398 is a top plan view of an inferior anterior spring element 48.2 including three longitudinal flex notches 71.1, 71.8, and 71.9. A portion of at least one flex notch 71 can simultaneously serve as a female mating structure 129 for use in combination with a mate mating structure 130, or alternately, as an opening for accommodating the passage of a portion of at least one fastener 29.

FIG. 399 is a top plan view of an anterior spacer 55.2 for use between an anterior spring element 48.1 and an inferior anterior spring element 48.2 similar to that shown in FIG. 342. The anterior spacer 55.2 includes a recess 84.3 for accommodating a portion of an anterior outsole element 44, and also three openings 72 for accommodating the passage of a portion of three fasteners 29 therethrough.

FIG. 400 is a cross-sectional view taken along line 400-400 of the anterior spacer 55.2 shown in FIG. 399 having a generally planar configuration. The thickness of an anterior spacer 55.2 can be selected from a number of available options in order to provide a specific amount of deflection and desired cushioning and stability characteristics.

FIG. 401 is a cross-sectional view taken along a line similar to line 400-400 shown in FIG. 399 of an alternate anterior spacer 55.2 having an inclined configuration. The relative amount of possible deflection on the medial side 35 versus the lateral side 36 can be determined by using an anterior spacer 55.2 having an inclined configuration. An anterior spacer 55.2 having an inclined configuration can also be used in order to compensate for a wearer having a varus or valgus condition, or otherwise improve the overall cushioning and stability characteristics for an individual wearer. As shown, an anterior spacer 55.2 can have an inclined configuration having greater height on the lateral side 36, or alternately on the medial side 35, or have another different oblique configuration.

FIG. 402 is a top plan view of an inferior anterior spring element 48.2 generally similar to that shown in FIG. 397 which is at least partially positioned below an anterior spacer 55.2 generally similar to that shown in FIG. 399, and the inferior anterior spring element 48.2 is also at least partially contained within an anterior outsole element 44. The inferior anterior spring element 48.2 can be inserted into a pocket 131 formed within a portion of the anterior outsole element 44 near the posterior side 34, whereas the anterior spacer 55.2 can be inserted near the anterior side 33, and a portion of the anterior outsole element 44 can be fitted and inserted into the recess 84.3 therein. At least one fastener 29 can be inserted through openings 72 thereby affixing the components in functional relation to an article of footwear 22.

FIG. 403 is a top plan view of an inferior anterior spring element 48.2 generally similar to that shown in FIG. 398 substantially positioned within an anterior outsole element 44. The inferior anterior spring element 48.2 can be inserted into a pocket 131 formed within the anterior outsole element 44 from the anterior side 33. As shown, the backing 30 portion of the anterior outsole element 44 can be made of a transparent material, thus enabling the inferior anterior spring element 48.2 to be visible therethrough.

FIG. 404 is a top plan view of an inferior anterior spring element 48.2 generally similar to that shown in FIG. 397 substantially positioned within an anterior outsole element 44. The inferior anterior spring element 48.2 can be inserted into a pocket 131 formed within the anterior outsole element 44 from the anterior side 33. As shown, the backing 30 portion of the anterior outsole element 44 can be made of a transparent material, thus enabling the inferior anterior spring element 48.2 to be visible therethrough.

FIG. 405 is a bottom plan view of an inferior anterior spring element 48.2 generally similar to that shown in FIG. 397 substantially positioned within an anterior outsole element 44 showing a plurality of traction members 115 on the ground engaging portion 53 of the outsole 43. As shown, the backing 30 portion of the anterior outsole element 44 can be made of a transparent material, thus enabling the inferior anterior spring element 48.2 to be visible therethrough. Alternately, the backing 30 can simply be made of a material having a different color than the traction members 115.

FIG. 406 is a top plan view of an alternate anterior spacer 55.2 for use between an anterior spring element 48.1 and an inferior spring element 48.2. This alternate anterior spacer 55.2 includes a opening 72 to a pocket 131 on the posterior side 34 for receiving the anterior side of an inferior spring element 48.2.

FIG. 407 is a posterior side view of the anterior spacer 55.2 shown in FIG. 406 for use between an anterior spring element 48.1 and an inferior anterior spring element 48.2. As shown, it can be advantageous to use a relatively hard thermoplastic material on the superior side 37 and encompassing the pocket 131 for receiving the inferior anterior spring element 48.2, whereas a relatively soft thermoplastic material or thermoset material having good cushioning characteristics can be used on the inferior side 38 and form traction members 115 thereupon.

FIG. 408 is an anterior side 33 view of the anterior spacer 55.2 shown in FIG. 406 for use between an anterior spring element 48.1 and an inferior anterior spring element 48.2.

FIG. 409 is a cross-sectional side view taken along line 409-409 of the anterior spacer 55.2 shown in FIG. 406 for use between an anterior spring element 48.1 and an inferior anterior spring element 48.2. Again, it can be advantageous to use a relatively hard thermoplastic material on the superior side 37 and encompassing the pocket 131 for receiving the inferior anterior spring element 48.2, whereas a relatively soft thermoplastic material or thermoset material having good cushioning characteristics can be used on the inferior side 38 and form traction members 115 thereupon.

FIG. 410 is a bottom plan view of an inferior anterior spring element 48.2 positioned within the anterior outsole element 44 shown in FIG. 405, but also within the anterior spacer 55.2 shown in FIGS. 406-409. The anterior outsole element 44, anterior spacer 55.2 and inferior anterior spring element 48.2 can be further affixed and secured in functional relation to an article of footwear 22 with the use of at least one fastener 29 which can pass through at least one registered opening 72 near the anterior side 33 of the associated components.

FIG. 411 is a bottom plan view of the anterior spacer 55.2 shown in FIGS. 406-410, and also a plurality of fasteners 29 having a semi-oval shape.

FIG. 412 is a cross-sectional side view generally similar to that shown in FIG. 344 showing the inferior anterior spring element 48.2, anterior spacer 55.2, and anterior outsole element 44 shown in FIGS. 404-411, and also showing in phantom the relative position of an upper 23 with the use of dashed lines. The angle and orientation of the pocket 131 included in the anterior spacer 55.2 can be selected from a variety of options for at least partially determining the amount of possible deflection and orientation of the anterior spring element 48.2. Further, the configuration of the inferior anterior spring element 48.2 and associated anterior outsole element 44 can be selected from a variety of options for partially determining the amount of possible deflection and orientation of the anterior spring element 48.2.

Moreover, the configuration and material composition of a posterior outsole element 46, middle outsole element 45, and anterior outsole element 44 can be selected from a variety of options which can be provided for optimizing performance in a specific activity, task, or in particular environmental conditions. For example, the outsole elements can be specifically designed and engineered for use in running on roads, trails, racing, walking, or cross-training. An outsole element for trail running can include a greater number of traction members having greater height relative to one best suited for running on roads, whereas it can be advantageous for an outsole element intended for use in racing to be especially light-weight. Further, an outsole element intended for use on an artificial track surface can include a plurality of relatively small protrusions or spikes. Outsole elements which are made of non-marking materials can be provided that are especially suitable for use in basketball, whereas outsole elements including natural rubber, and the like, can be provided that are especially suitable for use in volleyball. Material compounds which are especially resistant to wear can be provided for use in tennis. Outsole elements including a plurality of cleats, protrusions, or traction elements can be specifically designed and engineered for use in baseball, football, golf, and soccer, respectively. As shown in FIG. 394, an outsole element can accommodate the use of a bicycle cleat system. Outsole elements made of material compositions which are resistant to oil and other chemicals can be provided that are especially suitable for use in articles of footwear intended for work and industrial use.

FIG. 413 is a top plan view of an inferior anterior spring element 48.2 positioned within an anterior outsole element 44 having a backing 30 including a plurality of resilient semi-circular domes 143. Accordingly, it can be readily understood that the backing 30 can be configured to provide integral cushioning means between the superior side of the inferior anterior spring element 48.2 and the inferior side of the anterior spring element 48.1.

FIG. 414 is a top plan view of an inferior anterior spring element 48.2 positioned within an anterior outsole element 44 having a backing 30. The backing 30 further includes a plurality of foam cushioning elements 135 affixed thereto. Accordingly, the foam cushioning elements 135 can provide cushioning means between the superior side of the inferior anterior spring element 48.2 and the inferior side of the anterior spring element 48.1.

FIG. 415 is a top plan view of an inferior anterior spring element 48.2 positioned within an anterior outsole element 44 having a backing 30. The backing 30 can include an opening 72 for permitting a portion of a foam cushioning element 135 to project therethrough. As shown, the foam cushioning element 135 includes five columns which are made as a single integral component. Alternately, the column portions can be affixed to a thin web 114 having a generally planar configuration. In any case, the foam cushioning element 135 can include a flange 124 for retaining the columns in position. It can be readily understood that a foam cushioning element 135 can be made in a multiplicity of different configurations and shapes.

FIG. 416 is a top plan view of an inferior anterior spring element 48.2 positioned within an anterior outsole element 44 having a backing 30 including a plurality of openings 72 for permitting the projection of at least a portion of at least one fluid-filled bladder 101 therethrough. Alternately, the chambers 133 can be formed individually and be affixed in a desired configuration to a thin web 114 having a generally planar configuration. As shown, the fluid-filled bladder 101 includes three chambers 133 that are in fluid communication and form an integral component. Alternately, at least one fluid-filled bladder including valves that can serve as a motion control device can be used, as taught in WO 01/70061 A2 entitled "Article of Footwear With A Motion Control Device, by John F. Swigart and assigned to Nike, Inc. Moreover, at least one fluid-filled bladder that forms part of a larger dynamically-controlled cushioning system can be used, as taught in WO 01/78539 A2 and U.S. Pat. No. 6,430,843 B1 entitled "Dynamically-Controlled Cushioning System For An Article of Footwear," by Daniel R. Potter and Allan M. Schrock, and assigned to Nike, Inc. Such an article of footwear can include at least one fluid-filled bladder including a plurality of chambers, a control system possibly including a central processing unit or CPU, a pressure detector, and a regulator for modulating the level of fluid communication between different fluid-filled bladders or chambers. Again, the patent applications recited in this paragraph have been previously incorporated by reference herein. In any case, the fluid-filled bladder 101 can include a flange 124 for retaining the chambers 133 in relative position, as shown in FIG. 416. It can be readily understood that a fluid-filled bladder 101 can be made in a multiplicity of different configurations and shapes.

FIG. 417 is a side view of an article of footwear 22 including a middle outsole element 45.

FIG. 418 is a side view of an article of footwear 22 including a middle outsole element 45 substantially consisting of fluid-filled bladder 101. As shown, the middle outsole element 45 substantially consisting of fluid-filled bladder 101 can include a wall 132 and a chamber 133, and be made of a material that is substantially transparent.

FIG. 419 is a side exploded view of an article of footwear 22 including the middle outsole element 45 substantially consisting of the fluid-filled bladder 101 shown in FIG. 418. The posterior outsole element 46 is shown in position on the inferior spring element 50, whereas the middle outsole element 45, and the female portion 86 of a fastener 29 are shown separated. Accordingly, the middle outsole element 45 can be selectively removed and replaced, as desired.

FIG. 420 is a side view of an article of footwear 22 including a middle outsole element 45 substantially consisting of a foam cushioning element 135. As shown, the foam cushioning element 135 can include dual density material, that is, a relatively soft material near the superior side, but a relatively hard wear resistant material or skin near the inferior side and ground engaging portion 53 of the outsole 43.

FIG. 421 is a bottom plan view of the article of footwear 22 including a middle outsole element 45 substantially consisting of a fluid-filled bladder 101 shown in FIG. 418.

FIG. 422 is a bottom plan view of the article of footwear 22 including a middle outsole element 45 substantially consisting of a foam cushioning element 135 shown in FIG. 420.

FIG. 423 is a side view of a footwear last 80 showing the superior side 37, inferior side 38, anterior side 33, posterior side 34, heel elevation 145, a tread point 144, and toe spring 62. The amount of toe spring 62 incorporated into a footwear last 80 or other three dimensional rendering of a footwear configuration is commonly measured with the inferior side 38 of the area of the last 80 corresponding to the approximate position of the weight bearing center of a hypothetical wearer's heel being elevated such that the inferior side 38 of the rearfoot area 58 is approximately parallel to an underlying generally planar support surface. When so treading a last 80, the forefoot area of the last 80 will make contact at a position that is commonly called the tread point 144. It is common for the heel elevation 145 of a treaded last 80 to be in the range between 10-12 mm. When represented in 1/1 scale, the amount of toe spring 62 shown would measure approximately 20 mm.

FIG. 424 is a side view of a footwear last 80 with parts broken away showing toe spring 62 that would measure approximately 10 mm when represented in 1/1 scale.

FIG. 425 is a side view of a footwear last 80 with parts broken away showing toe spring 62 that would measure approximately 30 mm when represented in 1/1 scale. It can be advantageous to incorporate at least 10 mm of toe spring 62 into an article of footwear intended for running, but even 30 mm of toe spring 62 can sometimes be incorporated into track spikes intended for athletes running at high speeds.

FIG. 426 is a side view of an upper 23 including a removable strap 118.3 including openings 72 for accommodating lace 121 closure means. Again, the strap 118.3 can be selectively removed and replaced, and secured between an inferior spring element 50 and the upper 23 with the use of a fastener 29.

FIG. 427 is a side view of an upper 23 including a removable strap 118.3 including openings 72 for accommodating lace 121 closure means and also a strap portion encompassing the posterior side 34 of the upper 23 including VELCRO® hook and pile 140 closure means.

FIG. 428 is a side view of an upper 23 including a removable strap 118.3 including VELCRO® hook and pile 140 closure means.

FIG. 429 is a side view of an upper 23 including a removable strap 118.3 including VELCRO® hook and pile 140 closure means, and also a strap portion encompassing the posterior side of the upper 23 including VELCRO® hook and pile 140 closure means.

FIG. 430 is a side view of an upper 23 including a removable strap 118.3 including openings 72 for accommodating lace 121 closure means and also a strap portion encompassing the posterior side 34 of the upper 23 including VELCRO® hook and pile 140 closure means.

FIG. 431 is a bottom plan view showing a superior spring element 47 including a posterior spring element 49 and an anterior spring element 48 including a plurality of flex notches 71 generally similar to that shown in FIG. 316 positioned in functional relation within an upper 23, and showing a plurality of fasteners 29 for selectively adjusting the width and girth of the upper 23. Again, as discussed previously in connection with FIGS. 30-34, the inferior side 38 of the upper 23 can include a T-sock 56 made of a textile material 137 or other material having resilient elastic, stretch, or elongation physical properties and mechanical characteristics, and the relative position of various portions of the upper 23 can be adjusted and secured at a plurality of positions with the use of fasteners 29, as desired. Alternately, the inferior side 38 of the upper 23 can be made of a textile material 137 or other material which is also used on the superior side of the upper 23 having resilient elastic, stretch, or elongation physical properties and mechanical characteristics, and the relative position of various portions of the upper 23 can be adjusted and secured at a plurality of positions with the use of fasteners 29, as desired.

As shown, the fasteners 29 can be inserted through openings 72 in the inferior side of the upper 23 that also register with the longitudinal and transverse flex notches 71 associated with the anterior spring element 48. Accordingly, a given fastener 29 which is affixed to a portion of the inferior side 34 of the upper 23 can then simply be drawn inwards or outwards along the path of the corresponding longitudinal or transverse flex notch 71, and the upper 23 can then secured in a desired position.

FIG. 432 is a bottom plan view of an anterior outsole element 44 including a hexagonal opening 72 for accommodating a fastener 29. As shown, the backing 30 portion of the anterior outsole element 44 can be made of a transparent material. When protrusions 99 which constitute male mating structures 128 are included on the superior side 37 of the backing 30 for the purpose of mechanically engaging with an overlaying anterior spring element 44, these male mating structures 128 can then be visible from the inferior side 38. In FIG. 432, the location of a length measurement that is taken between the center of opening 72 and the anterior side 33, and also the location of a transverse width measurement that extends along line 104 between the medial side 35 and lateral side 36 is also shown for possible use in an Internet website or a retail establishment.

FIG. 433 is a bottom plan view of an anterior outsole element 44 generally similar to that shown in FIG. 432, but instead having a triangular opening 72 for accommodating a fastener 29, and also having a different configuration near the posterior side 34. Further, the anterior outsole element 44 shown in FIG. 433 has a different overall configuration or last shape than the embodiment shown in FIG. 432, and also a different length size and width size. It can be readily understood that a specific anterior outsole element 44 having a backing 30 and possibly further including a stability element 136 can be selected for use from amongst a wide variety and range of different provided options. However, the configuration and pattern of the outsole 43 traction members 115 shown in FIG. 433 could not be used with the same upper 23 as that used in combination with the embodiment of the anterior outsole element 44 shown in FIG. 432. Again, an anterior outsole element 44 having a backing 30 and possibly further including a stability element 136 can at least in part define the length size, width size, and configuration or last shape of an article of footwear 22 when inserted into an upper 23 including a textile material or other material having substantial elastic, stretch, or elongation physical properties and mechanical characteristics in at least a portion of the forefoot area 58.

FIG. 434 is a bottom plan view of an anterior outsole element 44 generally similar to that shown in FIG. 432, but further including a plurality of flex notches 71 for enhancing flexibility. Further, the embodiment shown in FIG. 434 also includes a backing 30 that extends more substantially about the sides of the anterior outsole element 44 which is made of a thermoplastic material having a relatively low softening and melting point relative to the material used to made the outsole 43 traction members 115. Accordingly, the anterior outsole element 44 can be heated to a temperature associated with the softening point of the thermoplastic material used to make the backing 30, and the backing 30 and anterior outsole element 44 can then be easily molded to a desired shape with the application of direct pressure. In this regard, a vacuum forming apparatus and method can be used. For example, various alternate metal last shapes and sizes can be provided which can be heated by an apparatus to a desired temperature, and these metal last shapes can also include a plurality of vacuum ports for effectively drawing and molding the backing 30 of an anterior outsole element 44 to a selected and desired shape. The backing 30 portion can also be cut to a desired shape, and the opening 72 for accommodating a fastener 29 can also made in a selected position which will determine at least in part the resulting length size of an article of footwear 22. In this way, a single embodiment of an anterior outsole element 44 can be readily adapted for use to make one of several different possible length sizes, width sizes, and last shapes, as desired.

FIG. 435 is a bottom plan view of an anterior outsole element 44 generally similar to that shown in FIG. 433, but further including a plurality of flex notches 71 for enhancing flexibility. Further, the anterior outsole element 44 shown in FIG. 435 has a different overall configuration or last shape than the embodiment shown in FIG. 434, and also a different length size and width size. It can be readily understood that a specific anterior outsole element 44 having a backing 30 and possibly further including a stability element 136 can be selected for use from amongst a wide variety and range of different provided options. In contrast with the anterior outsole element 44 embodiment shown in FIG. 433, the configuration and pattern of the outsole 43 traction members 115 shown in FIG. 435 could possibly be used with the same upper 23 as that used in combination with the embodiments of the anterior outsole element 44 shown in FIGS. 432 and 434. Again, an anterior outsole element 44 having a backing 30 and possibly further including a stability element 136 can at least in part define the length size, width size, and configuration or last shape of an article of footwear 22 when inserted into an upper 23 including a textile material or other material having substantial elastic, stretch, or elongation physical properties and mechanical characteristics in at least a portion of the forefoot area 58.

FIG. 436 is a bottom plan view of an anterior outsole element 44 including a backing 30 portion which can extend substantially full length between the anterior side 33 and the posterior side 34 of a corresponding upper 23 of an article of footwear 22.

FIG. 437 is a bottom plan view of a gasket 142 for possible use between an anterior outsole element 44 and an upper 23. The gasket 142 can slip over a plurality of traction members 115 and be affixed to the relatively thin flange or backing 30 portion of an anterior outsole element 44. Accordingly, the gasket 142 can serve both to seal and affix the anterior outsole element 44 in functional relation to the upper 23. The gasket 142 can consist of a thin layer of double sided adhesive tape having protective peel-ply layers, or alternately a material having more substantial thickness such as a closed cell foam material including double sided adhesive surfaces having protective peel-ply layers. Accordingly, a gasket 142 can further include a self-adhesive surface 83 on both its superior side 37 and inferior side 38 that can be exposed by the removal of peel-ply layers 149. As shown, the peel-ply layer 149 on the inferior side 38 has already been removed.

FIG. 438 is a side view of an anterior outsole element 44 having a generally planar configuration.

FIG. 439 is a side view of an anterior outsole element 44 including an elevated stability element 136 having a three dimensional wrap configuration. This configuration can be advantageous for use in articles of footwear 22 intended for use in sports or activities requiring substantial lateral movement.

FIG. 440 is a bottom plan view of an anterior outsole element 44 generally similar to that shown in FIG. 439. As shown, the outsole 43 including traction members 115 extends beyond the perimeter of the backing 30 portion of the anterior outsole element 44 on the medial side 35, lateral side 36 and anterior side 33.

FIG. 441 is a top plan view of an insole 31 showing arrows indicating approximate positions of width and length measurements.

FIG. 442 is a top plan view of an insole 31 having a substantially planar forefoot area 58.

FIG. 443 is a top plan view of an insole 31 made of light-weight foam material 134 including a brushed cover layer made of a textile material 137.

FIG. 444 is a top plan view of an insole 31 made of an elastomeric material 146 having substantial dampening characteristics including a relatively smooth cover layer made of a textile material 137.

FIG. 445 is a top plan view of the insole 31 shown in FIG. 444 further including a custom moldable bladder 147 including a light cure material 148.

FIG. 446 is a bottom plan view of the insole 31 shown in FIG. 444 further including a custom moldable bladder 147 including a light cure material 148.

FIG. 447 is a top plan view of an insole 31 having a three dimensional wrap configuration in the forefoot area 58.

FIG. 448 is a cross-sectional side view of an insole 31 having a three dimensional wrap configuration in the forefoot area 58, midfoot area 67, and rearfoot area 68. This configuration can be advantageous for use when an anterior outsole element 44 further including a stability element 136 and three dimensional wrap configuration in the forefoot area 58 is desired for use.

FIG. 449 is a top plan view of an insole 31 having an opening 72 in the rearfoot area 68. This configuration of an insole 31 can possibly be used with an upper 23 generally similar to that shown in FIG. 361, and also possibly a posterior spring element 49 generally similar to that shown in FIG. 362.

FIG. 450 is a longitudinal cross-sectional side view of an article of footwear 22 including a bladder 101, and a superior spring element 47 and an inferior spring element 50 that are made as a single integral part. The superior side of the superior spring element 47 and that of a portion of the bladder 101 can be affixed by adhesive, chemical bonding, or other conventional means to the inferior side of the upper 23 as shown, or alternately to an intermediate material which is to affixed to the upper, e.g., a midsole made of foam material. The bladder 101 can be formed by injection molding, blow-molding, and the like, and can include an opening 72 in a portion of the anterior side and superior side for permitting a portion of the spring element 51 to be inserted and contained therein. Alternately, the bladder 101 can be formed by using a shrink-wrap thermoplastic material. In this case, a portion of the spring element 51 can be inserted into an oversized bladder 101 component, and the application of heat can cause the bladder 101 to shrink and substantially mold to the shape defined by the outer surfaces of the portion of the spring element 51 contained therein. As shown, a portion of the superior side of the superior spring element 47 can extend posterior of the inferior and posterior side of the upper 23 forming a generally planar configuration.

FIG. 451 is a longitudinal cross-sectional side view of an article of footwear 22 generally similar to that shown in FIG. 450 including a bladder 101, and a superior spring element 47 and an inferior spring element 50 that are made separately, but later affixed together permanently to form a single integral part. The superior spring element 47 and inferior spring element 50 can be affixed by adhesives, chemical bonding, or other conventional means.

FIG. 452 is a longitudinal cross-sectional side view of an article of footwear 22 generally similar to that shown in FIG. 451 including a bladder 101, but also a selectively removable and replaceable inferior spring element 50. The inferior spring element 50, bladder 101, and posterior outsole element 46 can be selectively removed and replaced with the use of a fastener 29. As shown, the article of footwear 22 can include an internal heel counter 24, or alternately, an external heel counter. Again, a superior spring element 47 can alternately consist of a posterior spring element 49 and an anterior spring element 48 which are formed as individual parts and affixed together in functional relation.

FIG. 453 is a longitudinal cross-sectional side view of an article of footwear 22 generally similar to that shown in FIG. 450 including a bladder 101, and a superior spring element 47 and an inferior spring element 50 that are made as a single integral part. However, in contrast with the embodiment shown in FIG. 450, a portion of the superior side of the superior spring element 47 extends about the posterior side of the upper 23 forming a generally curved configuration.

FIG. 454 is a longitudinal cross-sectional side view of an article of footwear 22 generally similar to that shown in FIG. 452 including a bladder 101, but also a selectively removable and replaceable inferior spring element 50. The inferior spring element 50, bladder 101, and posterior outsole element 46 can be selectively removed and replaced with the use of a fastener 29. However, in contrast with the embodiment shown in FIG. 452, a portion of the superior side of the superior spring element 47 extends about the posterior side of the upper 23 forming a generally curved configuration. As shown, the article of footwear 22 can include an internal heel counter 24, or alternately, an external heel counter. Again, a superior spring element 47 can alternately consist of a posterior spring element 49 and an anterior spring element 48 which are formed as individual parts and affixed together in functional relation.

FIG. 455 is a longitudinal cross-sectional side view of an article of footwear 22 generally similar to that shown in FIG. 453 including a superior spring element 47 and an inferior spring element 50 that are made as a single integral part. However, the embodiment shown in FIG. 455 does not include a bladder 101.

FIG. 456 is a longitudinal cross-sectional side view of an article of footwear 22 generally similar to that shown in FIG. 455. However, the embodiment shown in FIG. 456 includes a superior spring element 47 and an inferior spring element 50 that are made separately, and later bonded together to form a single integral part. Further, the superior spring element 47 can form an external heel counter 24, as shown.

FIG. 457 is a longitudinal cross-sectional side view of an article of footwear 22 generally similar to that shown in FIG. 454 including a selectively removable and replaceable inferior spring element 50, and posterior outsole element 46. However, the embodiment shown in FIG. 457 does not include a bladder 101, rather the superior spring element 47 forms an external heel counter 24. Again, a superior spring element 47 can alternately consist of a posterior spring element 49 and an anterior spring element 48 which are formed as individual parts and affixed together in functional relation.

FIG. 458 is a medial side view of an upper 23 of an article of footwear 22 including a strap 118.3 and a retainer 123 on the superior side 37. The strap 118.3 includes an opening 72 on the inferior side 38 for the passage of a fastener 29 therethrough, and can be selectively removed and replaced, as desired. The strap 118.3 can pass through an opening or slot in the retainer 123 on the superior side 37, and thereby be held in position. The retainer 123 can also includes a strap 118.2 forming a loop that can serve as a pull for facilitating entry and exit of a wearer's foot with respect to the shoe upper 23. Also shown is a strap 118.1 on the posterior side 34 forming a loop that can serve as a pull for facilitating entry and exit of a wearer's foot with respect to the shoe upper 23. The upper 23 can be made using one or more textile materials, and a multiplicity of patterns and styles are possible. When the upper 23 is made of a stretch material or a substantially elastic material, or one that otherwise has substantial elongation characteristics, the geometry and shape of the upper 23 can be substantially defined by the insertion of a superior spring element 47 possibly including an anatomically shaped heel counter 24, and also an anterior outsole element 46 including a stability element 136, as shown in FIG. 352. Alternately, when the upper 23 is made of a stretch material or a substantially elastic material, or one that otherwise has substantial elongation characteristics, the geometry and shape of the upper 23 can be substantially defined by affixing a superior spring element 47 including an anatomically shaped heel counter 24 and also an anterior outsole element 46 including a stability element 136 to the external side of the upper 23, as shown in FIG. 353. Accordingly, a relatively simple design and pattern can then be used to made an upper 23, and in particular, one that can be cut using automatic cutting machines, and also substantially sewn using automatic sewing machines, thus minimizing the cost of human labor and errors in making the upper 23. One maker and distributor of automatic sewing machines and associated technology is Schroeder Sewing Technologies of San Marcos, Calif. The aforementioned structures and methods can make it economically feasible to manufacture the upper 23 and associated article of footwear 22 in the particular host country of intended distribution such as the United States, that is, instead of making articles of footwear in Asia due to the presence of relatively inexpensive human labor costs there, as is present widespread practice throughout the footwear industry.

FIG. 459 is a lateral side 36 view of the upper 23 of the article of footwear 22 shown in FIG. 458. The portion of strap 118.3 which passes from the medial side 35 through the retainer 123 on the superior side 37 can be attached to a D-ring 150, and the portion of the strap 118.3 that extends upwards on the lateral side 36 can include male and female VELCRO® hook and pile 140 closure means.

FIG. 460 is a medial side 35 view of an upper 23 of an article of footwear 22 including a strap 118.3 that is held in position by a retainer 123 on the superior side 37 which is generally similar to that shown in FIG. 458, but further including an integral strap portion that also encompasses the posterior side 34 of the upper 23.

FIG. 461 is a lateral side 36 view of the upper 23 of an article of footwear 22 shown in FIG. 460. Again, the portion of strap 118.3 which passes from the medial side 35 through the retainer 123 on the superior side 37 can be attached to a D-ring 150, and the portion of the strap 118.3 that extends upwards on the lateral side 36 can include male and female VELCRO® hook and pile 140 closure means. As shown, the strap 118.3 further includes an integral strap portion that also encompasses the posterior side 34 of the upper 23.

FIG. 462 is a lateral side 36 view of the upper 23 of an article of footwear 22 including a strap 118.3 made from a resilient and elastic material. For example, the strap 118.3 can be made of a thermoplastic material or thermoset material which is resilient and elastomeric, thus capable of substantial elongation and recovery. The strap 118.3 includes an opening 72 on the inferior side 38 for the passage of a fastener 29 therethrough, and can be selectively removed and replaced, as desired. A multiplicity of different designs and styles of a resilient and elastomeric strap 118.3 are possible.

FIG. 463 is a longitudinal cross-sectional lateral side 36 view of an article of footwear 22 that includes two bladders 101.1 and 101.2, and a selectively removable and replaceable spring element 51. As shown, the wall 132 of bladder 101.1 overlaps the superior side of the superior spring element 47, and also the inferior side of the inferior spring element 50. The posterior outsole element 46 can be affixed directly to the wall 132 of the bladder 101.1. The article of footwear 22 can include an external heel counter 24, or an internal heel counter 24, as shown. With the use of a fastener 29 the upper 23 including the heel counter 24 can be mechanically affixed to the superior spring element 47, inferior spring element 50, and portions of the wall 132 of bladder 101.1. The bladder 101.1 can include an opening 72 near the anterior side, and/or a portion of the superior side for facilitating the insertion of portions of the superior spring element 47 and inferior spring element 50. As shown, the wall 132 of bladder 101.2 overlaps the superior side of the anterior spring element 48.1, and also the inferior side of the anterior spring element 48.2. The anterior outsole element 44 can be affixed directly to the wall 132 of the bladder 101.2. With the use of at least one fastener 29, the upper 23 can be mechanically affixed to the anterior spring element 48.1, anterior spring element 48.2, anterior spacer 55.2, and portions of the wall 132 of bladder 101.2. The bladder 101.2 can include an opening 72 near the posterior side, and/or a portion of the superior side for facilitating the insertion of portions of the anterior spring element 48.1 and anterior spring element 48.2. Again, a superior spring element 47 can alternately consist of a posterior spring element 49 and an anterior spring element 48 which are formed as individual parts and affixed together in functional relation.

FIG. 464 is a longitudinal cross-sectional lateral side 36 view of an article of footwear 22 that includes two bladders 101.1 and 101.2 generally similar to that shown in FIG. 463, but not including a plurality of fasteners 29, rather the various components are affixed by other conventional means such as the use of adhesives. Again, a superior spring element 47 can alternately consist of a posterior spring element 49 and an anterior spring element 48 which are formed as individual parts and affixed together in functional relation.

FIG. 465 is a lateral side view of an article of footwear 22 generally similar to that shown in FIGS. 306-307, including an upper 23 and strap 118.3, and also including selectively removable and replaceable components. As shown, the superior spring element 47 includes a posterior spring element 49 and an anterior spring element 48 which are formed as individual parts and affixed together in functional relation.

FIG. 466 is a longitudinal cross-sectional side view of the article of footwear 22 shown in FIG. 465. As shown, substantially all of the various major components of the article of footwear 22 can be selectively removed and replaced with the use of a single fastener 29.

FIG. 467 is an exploded longitudinal cross-sectional side view of the article of footwear 22 shown in FIGS. 465-466.

FIG. 468 is a lateral side view of an article of footwear 22 including an upper 23 and strap 118.3 generally similar to that shown in FIGS. 458-459, and also including selectively removable and replaceable components. However, the upper 23 has been so configured as to accommodate the further inclusion of a midsole 26 in the forefoot area 58 within the upper 23.

FIG. 469 is a longitudinal cross-sectional side view of the article of footwear 22 shown in FIG. 468. As shown, the midsole 26 is located between the insole 31 and the anterior spring element 48, and can include at least one male mating structure 128 and/or female mating structure 129 for affixing the midsole 26 in functional relation to the insole 31 and/or anterior spring element 48. Again, the midsole 26 can be made of a cushioning medium or cushioning means such as a foam material, a fluid-filled bladder, and the like. The further introduction of a midsole 26 can serve to increase the amount of possible deflection and in some applications provide enhanced cushioning effects.

FIG. 470 is an exploded longitudinal cross-sectional side view of the article of footwear 22 shown in FIGS. 468-469.

FIG. 471 is a lateral side view of an article of footwear 22 including an upper 23 and strap 118.3 generally similar to that shown in FIGS. 458-459, and also including selectively removable and replaceable components. However, the upper 23 has been so configured as to accommodate the further inclusion of a midsole 26 in the forefoot area 58 within the upper 23.

FIG. 472 is a longitudinal cross-sectional side view of the article of footwear shown in FIG. 471. As shown, the midsole 26 is located between the anterior spring element 48 and the web or backing 30 portion of the anterior outsole element 44, and can include at least one male mating structure 128 and/or female mating structure 129 for affixing the midsole 26 in functional relation to the anterior spring element 48 and/or the backing 30 portion of the anterior outsole element 44. Again, the midsole 26 can be made of a cushioning medium or cushioning means such as a foam material, a fluid-filled bladder, and the like. The further introduction of a midsole 26. The further introduction of a midsole 26 can serve to increase the amount of possible deflection and in some applications provide enhanced cushioning effects.

FIG. 473 is an exploded longitudinal cross-sectional side view of portions of the article of footwear 22 shown in FIGS. 471-472.

FIG. 474 is a side view of an article of footwear 22 including a spring element 51 including a superior spring element 47 and an inferior spring element 50, and having a flexural axis 59 located in the forefoot area 58. The flexural axis 59 can be orientated generally consistent with the transverse axis 91, that is, approximately perpendicular to the longitudinal axis 69, or be orientated approximately in the range between 10-50 degrees. As shown, the inferior spring element 50 can be generally planar, or only slightly curved. Alternately, the inferior spring element 50 can be more substantially curved than shown in FIG. 474. As shown, the spring element 51 can be configured and engineered to provide a substantial amount of deflection approximately in the range between 10-50 mm, and can therefore store a substantial amount of energy for later use during the walking, jumping, or running cycle.

FIG. 475 is a longitudinal cross-sectional side view of the article of footwear 22 shown in FIG. 474. As shown, the spring element 51 can include a superior spring element 47 and an inferior spring element 50. The superior spring element 47 can be generally planar, thus substantially the entire length of the superior spring element 47 can bend and flex when loaded. Alternately, the superior spring element can further include an anterior spring element 48 and a posterior spring element 49. Closure means such as strap 118.3 can be affixed in functional relation to the upper 23 by mechanical engagement means such as a fastener 29. The superior spring element 47 can be selectively affixed in functional relation to the inferior spring element 50 by mechanical engagement means such as at least one fastener 29. Again, a superior spring element 47 can alternately consist of a posterior spring element 49 and an anterior spring element 48 which are formed as individual parts and affixed together in functional relation. The sole 32 can include a backing 30 and outsole 43 which can also be selectively removed and replaced, as desired. Alternately, the superior spring element 47 can be affixed in functional relation to the exterior of the upper 23.

FIG. 476 is a longitudinal cross-sectional side view of an article of footwear 22 generally similar to that shown in FIG. 475, but the superior spring element 47 further includes an integral heel counter 24 in the rearfoot area 68. Accordingly, the superior spring element 47 would be relatively resistant to bending and flexing in the rearfoot area 68, and greater relative bending and flexing would take place in the midfoot area 67 and forefoot area 58. As shown, the insole 31 can be configured so as to extend beyond the superior edges of the superior spring element 47 in order to protect a wearer from direct contact therewith. Again, a superior spring element 47 can alternately consist of a posterior spring element 49 and an anterior spring element 48 which are formed as individual parts and affixed together in functional relation.

FIG. 477 is a longitudinal cross-sectional side view of an article of footwear 22 generally similar to that shown in FIG. 475, but the superior spring element 47 further includes an integral heel counter 24 and extended side stabilizer in the rearfoot area 68, midfoot area 67, and also a portion of the forefoot area 58, that is, a position posterior of the approximate position of a wearer's metatarsal-phalangeal joints. Accordingly, the superior spring element 47 would be relatively resistant to bending and flexing in the rearfoot area 68, midfoot area 67, and also a portion of the forefoot area 58, and greater relative bending and flexing would take place in the forefoot area 58 near, at, and anterior of a position associated with the approximate position of a wearer's metatarsal-phalangeal joints. As shown, the insole 31 can be configured so as to extend beyond the superior edges of the superior spring element 47 in order to protect a wearer from direct contact therewith. Again, a superior spring element 47 can alternately consist of a posterior spring element 49 and an anterior spring element 48 which are formed as individual parts and affixed together in functional relation.

FIG. 478 is a side view of an article of footwear 22 generally similar to that shown in FIG. 474, but including an inferior spring element 50 having concave or downward curvature posterior of the flexural axis 59 and convex or upwards curvature near the posterior end of the inferior spring element 50. This configuration can enhance the overall performance of the spring element 51 in certain applications and athletic activities. As shown, the spring element 51 can be configured and engineered to provide a substantial amount of deflection approximately in the range between 10-50 mm, and can therefore store a substantial amount of energy for later use during the walking, jumping, or running cycle.

FIG. 479 is a side view of an article of footwear 22 generally similar to that shown in FIG. 478, but having a superior spring element 47 that is instead affixed in functional relation to the exterior of the upper 23. The superior spring element 47 can be affixed to the upper 23 with the use of conventional means such as adhesive, and the like. As shown, the superior spring element 47 can include an integral heel counter 24. The inferior spring element 50 can be selectively and removably affixed by mechanical means to a sole 32 including a web or backing 30 portion and an outsole 43, and also to an upper 23 including a superior spring element 47. Alternately, the superior spring element 47 can be affixed to the upper 23 with the use of removable mechanical engagement means, thus be selectively removable and replaceable, as shown in FIG. 480.

FIG. 480 is a longitudinal cross-sectional side view of an article of footwear 22 generally similar to that shown in FIG. 479, but the superior spring element 47 is not affixed to the upper 23 by adhesive means. The article of footwear 22 further includes an internal stability element 136 that can at least partially define the configuration or shape of portions of the upper 23, and also an anterior spacer 55 for use between the superior spring element 47 and the inferior spring element 50. When the components of the article of footwear 22 are assembled with the use of at least one fastener 29, a portion of the upper 23 can thereby be secured between the stability element 136 and the superior spring element 47. Accordingly, similar to the embodiment shown in FIG. 476, substantially all of the components of the article of footwear 22 shown in FIG. 480 are selectively removable and replaceable. As shown, a fastener 29 can be recessed and thereby not protrude from the surface of a component into which it is inserted. Again, a superior spring element 47 can alternately consist of a posterior spring element 49 and an anterior spring element 48 which are formed as individual parts and affixed together in functional relation.

FIG. 481 is a longitudinal cross-sectional side view of an article of footwear 22 generally similar to that shown in FIG. 480, but the superior spring element 47 instead includes an integral heel counter 24 that is located only in the rearfoot area 68, and the anterior spacer 55 for use between the superior spring element 47 and the inferior spring element 50 is gently rounded near its posterior side. The gently rounded shape of the posterior side of the anterior spacer 55 can help to prevent high local point loads from being placed on the superior spring element 47 and inferior spring element 50, that is, as compared with an anterior spacer 55 having a triangular shape near its posterior side. Further, the use of an anterior spacer 55 which is resilient and elastomeric, such as one made of rubber, polyurethane, or a thermoplastic elastomer, can also serve to avoid the introduction of high local point loads. Similar to the embodiment shown in FIG. 480, when the components of the article of footwear 22 are assembled with the use of at least one fastener 29, a portion of the upper 23 can thereby be secured between the stability element 136 and the superior spring element 47. Accordingly, similar to the embodiment shown in FIG. 480, substantially all of the components of the article of footwear 22 are selectively removable and replaceable.

FIG. 482 is a longitudinal cross-sectional side view of an article of footwear 22 including two fluid-filled bladders 101.1 and 101.2, and an outsole 43 that extends substantially full length between the posterior side 34 and the anterior side 33 of the article of footwear 22. As shown, the various components of the article of footwear 22 can be selectively removed and replaced with the use of at least one fastener 29. Alternately, the components of the article of footwear 22 could be affixed in functional relation by conventional means such as the use of adhesives.

FIG. 483 is a longitudinal side cross-sectional view of an article of footwear 22 including a plurality of foam cushioning elements 135, and an outsole 43 that extends substantially full length between the posterior side 34 and the anterior side 33 of the article of footwear 22. As shown, the various components of the article of footwear 22 can be selectively removed and replaced with the use of at least one fastener 29. Alternately, the components of the article of footwear 22 could be affixed in functional relation by conventional means such as the use of adhesives.

FIG. 484 is a longitudinal cross-sectional side view of an article of footwear 22 including a midsole 26 between the upper 23 and superior side of the spring element 51 in the rearfoot area 68, and also between the inferior side of the spring element 51 and the outsole 43 in the forefoot area 58. As shown, the components of the article of footwear 22 can be affixed in functional relation by conventional means with the use of adhesives.

FIG. 485 is a longitudinal cross-sectional side view of an article of footwear 22 including a midsole 26 between the upper 23 and superior side of the spring element 51 in the rearfoot area 68, midfoot area 67, and forefoot area 58, and also between the inferior side of the spring element 51 and the outsole 43 in the forefoot area 58. As shown, the components of the article of footwear 22 can be affixed in functional relation by conventional means with the use of adhesives.

FIG. 486 is a longitudinal cross-sectional side view of an article of footwear 22 including a midsole 26 between the upper 23 and superior side of the spring element 51 in the rearfoot area 68, midfoot area 67, and forefoot area 58. As shown, the components of the article of footwear 22 can be affixed in functional relation by conventional means with the use of adhesives.

FIG. 487 is a longitudinal cross-sectional side view of an article of footwear 22 including a midsole 26 in the forefoot area 58 between the inferior side of the spring element 51 and the outsole 43. As shown, the components of the article of footwear 22 can be affixed in functional relation by conventional means with the use of adhesives.

FIG. 488 is a longitudinal cross-sectional side view of a boot 22 including a spring element 51 with parts broken away. Shown is an embodiment of a boot that is particularly suitable for use by the armed forces. The spring element 51 can be made of carbon fiber composite material, a spring grade titanium such as "15-3" made by TIMET®, Titanium Metals Corporation of 403 Ryder Avenue, Vallejo, Calif. 94590, or a combination of both materials. When maximum weight reduction is desired, the spring element 51 can be made of carbon fiber composite material. However, when maximum protection against explosive devices such as land mines or enemy fire is desired, the spring element 51 can be made at least in part of spring grade titanium material.

For example, given a man of average body weight, the anterior spring element 48 can be made of "15-3" spring grade titanium having a thickness of approximately 1.6 mm, the posterior spring element 49 can be made of a carbon fiber composite material formed in an anatomical three dimension shape including an integral heel counter 24, and the inferior spring element 50 can be made of "15-3" spring grade titanium having a thickness approximately in the range between 3.5-4.5 mm. Accordingly, substantially the entire plantar side of a wearer's foot can thereby be shielded by a layer of spring grade titanium. The insole 31 can extend upwards in the area corresponding to a wearer's arches and encompass the rearfoot area 68 in order to shield a wearer's foot from direct contact with the heel counter 24 and enhance fit. As shown, the posterior spring element 49 can overlap a portion of the anterior spring element 48 that in turn can overlap a substantial portion of the backing 30 portion of the anterior outsole element 44. The generally planar web portion 114 of the sole 32 can be direct injection molded to the inferior side 38 of the upper 23. However, the web portion 114 can include a plurality of openings 72 for permitting the traction members 115 associated with the anterior outsole element 44 to pass therethrough. Alternately, the traction members 115 and sole 32 in forefoot area 58 can be formed as an integral unit by direct injection molding, that is, in a conventional manner. When the generally planar web portion 114 of the sole 32 is made of a resilient and elastomeric material such as a thermoplastic or thermoset natural or synthetic rubber, and the web portion 114 also has a substantial thickness that perhaps approximates one quarter inch, then it can be advantageous for overall performance to at least partially encapsulate a metal insert 95 including an opening 72 for accommodating a fastener 29 in the sole 32 during the direction injection molding process. A full-hex blind threaded insert made by Atlas Engineering, Inc. similar to that shown in FIG. 489 can be used as the female part 86 of the fastener 29, and the male part 85 of the fastener 29 can consist of a bolt having a flat head including an Allen or star drive such as those made by Stayfast Products, Inc., and having its threads coated with nylon to serve as a self-locking mechanism.

The thickness and stiffness of the anterior spring element 48, posterior spring element 49, and inferior spring element 50 can be selected from a variety and range of options in order to provide optimal performance depending upon whether an individual is walking, running, or possibly carrying a heavy pack. Further, the ground engaging portion 53 of the anterior outsole element 44 and also the posterior outsole element 46 can be selected from a variety and range of options with respect to their specific physical and mechanical properties and material composition. For example, a relatively soft material providing superior cushioning characteristic could be selected for use when drilling or running on asphalt, whereas a material having a wettability index of equal to or greater than 90 degrees, that is, hydrophobic properties could be selected for use in muddy conditions. Further, a material that is hydrophilic and porous could be suitable for use in snow or slippery conditions. In brief, the configuration of the traction elements 115 and their material composition can be selected for the specific anticipated or required task, terrain, and weather conditions. In less than one minute, the article of footwear 22 can be completely disassembled and re-assembled and any selected components then be replaced. Accordingly, the present invention can provide versatility and superior performance to members of the armed forces.

FIG. 489 is a longitudinal cross-sectional side view of an article of footwear 22 including an anterior outsole element 44 and also a posterior outsole element 46 including a web portion 114. In this embodiment of an article of footwear 22, the anterior outsole element 44 and the posterior outsole element 46 do not include a separate backing 30, rather, an integral web portion 114 made of the same material which is used to make the outsole 43 and traction members 115.

FIG. 490 is an exploded longitudinal cross-sectional side view of the article of footwear 22 shown in FIG. 489.

FIG. 491 is a longitudinal cross-sectional side view of an article of footwear 22 including an anterior outsole element 44 having traction members 115 including an undercut 154 portion. The individual traction members 115 can include an undercut 154 portion about their perimeter that matches the size of the corresponding registered openings 72 which are present in the upper 23. The traction members 115 can then overlap and effectively seal the openings 72, and the anterior outsole element 44 can be snap-fitted and mechanically locked in place when the traction members 115 of the anterior outsole element 44 are properly inserted through the upper 23. Accordingly, the article of footwear 22 can include the structures disclosed and illustrated in the drawing figures of U.S. Pat. No. 6,915,596 and U.S. patent application Ser. No. 11/134,112 published as US 2005/0210705 by Grove et al. assigned to Nike, Inc., both of these patent documents hereby being incorporated by reference herein.

FIG. 492 is an exploded longitudinal cross-sectional side view of the article of footwear 22 shown in FIG. 491.

FIG. 493 is a longitudinal cross-sectional side view of an article of footwear 22 including an anterior outsole element 44 including a web 114 portion that is affixed to the exterior of the upper 23. In this embodiment, the anterior outsole element 44 including a web 114 portion can possibly be affixed to the exterior of the upper 23 with the use of adhesives, and in particular, the use of a protective peel-ply layer 149 which can be removed to expose a self-adhesive surface 100, or alternately, with the use of VELCRO® hook and pile 140, bonding, welding, or other conventional means.

FIG. 494 is a longitudinal cross-sectional side view of an article of footwear 22 including an anterior outsole element 44 including a backing 30 that is affixed to the exterior of the upper 23. In this embodiment, the anterior outsole element 44 including a backing 30 can possibly be affixed to the exterior of the upper 23 with the use of adhesives, and in particular, the use of a protective peel-ply layer 149 which can be removed to expose a self-adhesive surface 100, or alternately, with the use of VELCRO® hook and pile 140, bonding, welding, or other conventional means.

FIG. 495 shows multiple views of a prior art snap rivet 151 made by Richco, Inc. of Chicago, Ill. The snap rivet 151 can be installed by inserting the inferior portion into an opening and applying direct pressure to the superior portion. A snap rivet 151 can possibly be used as a fastener 29 when it is desired to adjust the width and girth of an article of footwear 22.

FIG. 496 shows multiple views of a prior art push rivet 152 made by Richco, Inc. of Chicago, Ill. The push rivet 152 can be installed by inserting the inferior portion into an opening, and applying direct pressure to the superior pin portion. A push rivet 152 can possibly be used as a fastener 29 when it is desired to adjust the width and girth of an article of footwear 22.

FIG. 497 shows a perspective view of a prior art full-hex blind threaded insert. FIG. 498 shows a side view of the prior art full-hex blind threaded insert shown in FIG. 497. FIG. 499 shows a top view of the prior art full-hex blind threaded insert shown in FIG. 497. FIGS. 497-99 show multiple views of a prior art full-hex blind threaded insert made by Atlas Engineering, Inc. of Kent, Ohio which can be used as a female part 86 of a fastener 29. When a single female part 86 of a metal fastener 29 generally similar to that shown in FIGS. 497-499 is being used to affix the components of an article of footwear 22 together, the approximate A dimension as indicated in FIG. 498 will vary in accordance with the width of the superior spring element, upper, and inferior spring element, but will generally be in the range between 5-20 mm, and in particular, commonly in the range between 8-12 mm. Further, the approximate B dimension as indicated in FIG. 498 will generally be in the range between 1.0-2.0 mm. In addition, the approximate C dimension as indicated in FIG. 498 will generally be in the range between 8-25 mm, and in particular, commonly in the range between 10-20 mm. Moreover, the approximate D dimension as indicated in FIG. 499 will generally be in the range of 5-15 mm, and in particular, commonly in the range between 8-12 mm. The required size of the threaded opening is normally in the range between ¼th and ½ inch, thus 5/16ths of an inch can generally be used.

FIG. 500 is a perspective view of a bolt or male part 85 of a fastener 29 for possible use with the female part 86 of a fastener 29 that is shown in FIGS. 497-499. As shown, the male part 85 can include an Allen head, or other mechanical engagement means, whereby the male part 85 and female part 86 of the fastener 29 can be secured together to a desired torque value. The required size of the threaded portion of the male part 85 is generally in the range between ¼th and ½ inch, thus 5/16ths of an inch can generally be used. The bolt or male part 85 can include a thin plastic coating 138 for preventing it from becoming accidentally loosened.

FIG. 501 is a medial side view of an article of footwear 22 including a three quarter length superior spring element 47 and external heel counter 24. The heel counter 24 can be made of a glass or carbon fiber composite material, or alternately, a thermoplastic material reinforced with short or long fibers which is substantially rigid. For example, Dow Chemical Company of Midland, Mich. makes SPECTRUM® reaction moldable polymer which has been used to make automobile body parts, and LNP Engineering Plastics of Exton, Pa. makes THERMOCOMP® and VERTON® thermoplastic materials which can include long carbon fibers. The inferior spring element 50 is symmetrical in curvature on both the medial side 35 and lateral side 36. However, it can be advantageous for providing rearfoot stability during running for the flexural axis 59 to be deviated from the transverse axis 91 in the range between 10-50 degrees, and in particular, 20-30 degrees. Given the configuration shown in FIG. 501, the overall length of the inferior spring element 50 for a men's size 9 article of footwear can be approximately in the range between 120-

130 mm, and the approximate width can be in the range between 70-80 mm at the widest portion. In this embodiment, the approximate required thickness of the inferior spring element 50 for a men's size 9 is generally in the range between 4-8 mm, and the inferior spring element 50 is configured to provide deflection approximately in the range between 10-15 mm.

FIG. 502 is a medial side view of an article of footwear 22 including a full length superior spring element 47 and external heel counter 24. As shown, the heel counter 24 can include a recess on the inferior side 38 for accommodating the anterior portion of the inferior spring element 50. Also shown in dashed lines is a fastener 29 for affixing the posterior portion of the superior spring element 47 in functional relation to the external heel counter 24.

FIG. 503 is a medial side view of an article of footwear 22 including a full length superior spring element 47. The superior spring element 47 can further include an anterior spring element 48, and also a posterior spring element having an anatomical three dimensional cupped shape. The configuration of the superior spring element 47 or posterior spring element 49 in the rearfoot area can mate with that of the external heel counter 24. For example, mechanical engagement means such as mating male and female element can be included in the configuration of the superior spring element 47 and external heel counter 24.

FIG. 504 is a top plan view of a superior spring element 47 similar to that shown with dashed lines in FIG. 502 for use in an article of footwear 22. Shown are the longitudinal axis 69, transverse axis 91, flexural axis 59, a line 104 indicating the approximate relative position of the metatarsal-phalangeal joints of a hypothetical wearer, openings 72 for accommodating at least one fastener 29, and a plurality of flex notches 71.

FIG. 505 is a top plan view of the inferior spring element 50 shown in FIGS. 501-503 for possible use with a superior spring element 47 generally similar to that shown in FIG. 504. Shown are the longitudinal axis 69, transverse axis 91, flexural axis 59, and openings 72 for accommodating at least one fastener 29. Given the configuration shown in FIG. 505, the overall length of the inferior spring element 50 for a men's size 9 article of footwear can be approximately in the range between 120-130 mm, and the approximate width can be in the range between 70-80 mm at the widest portion. In this embodiment, the approximate required thickness of the inferior spring element 50 for a men's size 9 is generally in the range between 4-8 mm, and the inferior spring element 50 is configured to provide deflection approximately in the range between 10-15 mm.

FIG. 506 is a medial side view of an article of footwear 22 including a three quarter length superior spring element 47, and an inferior spring element 50 that extends rearward substantially beyond the posterior side 34 of the upper 23. Alternately, the inferior spring element 50 could possibly not extend so substantially beyond the posterior side 34 of the upper 23 in the embodiments shown in FIGS. 506-510, and 519, rather, the posterior side of the inferior spring element 50 could be located approximately adjacent or consistent with the posterior side 34 of the upper 23, that is, along the vertical or z axis. The inferior spring element 50 is symmetrical in curvature on both the medial side 35 and lateral side 36. However, it can be advantageous for providing rearfoot stability during running for the flexural axis 59 to be deviated from the transverse axis 91 in the range between 10-50 degrees, and in particular, 20-30 degrees. The inferior spring element 50 has greater length than the embodiment previously shown in FIG. 501. Given the configuration shown in FIG. 506, the overall length of the inferior spring element 50 for a men's size 9 article of footwear can be approximately in the range between 150-160 mm, and the approximate width can be in the range between 70-80 mm at the widest portion. In this embodiment, the approximate required thickness of the inferior spring element 50 for a men's size 9 is generally in the range between 5-10 mm, and the inferior spring element 50 is configured to provide more substantial deflection approximately in the range between 20-25 mm. Further, the forefoot area of this embodiment also includes a more substantial midsole 26 including foam material 134.

FIG. 507 is a medial side view of an article of footwear 22 including a full length superior spring element 47, and an inferior spring element 50 that extends rearward substantially beyond the posterior side 34 of the upper 23. This embodiment is generally similar in many respects to that shown in FIG. 506, but the midsole 26 and outsole 43 associated with the forefoot area extends further towards the posterior side 34 to at least partially surround the anterior side of the inferior spring element 50. This can provide more support to the midfoot area, and also facilitate a smoother transition during walking or running activity.

FIG. 508 is a medial side view of an article of footwear 22 including a full length superior spring element 47 including an anatomical three dimensional cupped shape, a fluid-filled bladder 101, and an inferior spring element 50 that extends rearward substantially beyond the posterior side 34 of the upper 23. This embodiment is generally similar in many respects to that shown in FIG. 507, but the midsole 26 and outsole 43 associated with the forefoot area extends even further towards the posterior side 34 and more substantially beneath the inferior spring element 50. This can provide more support to the midfoot area, and also facilitate a smoother transition during walking or running activity. The midsole 26 also includes a fluid-filled bladder 101 including a wall 132 and at least one chamber 133 as taught in the recited patents and patent applications that have been previously incorporated by reference herein. In particular, at least one fluid-filled bladder including valves that can serve as a motion control device can be used, as taught in WO 01/70061 A2 entitled "Article of Footwear With A Motion Control Device, by John F. Swigart and assigned to Nike, Inc. Moreover, at least one fluid-filled bladder that forms part of a larger dynamically-controlled cushioning system can be used, as taught in WO 01/78539 A2 and U.S. Pat. No. 6,430,843 B1 entitled "Dynamically-Controlled Cushioning System For An Article of Footwear," by Daniel R. Potter and Allan M. Schrock, and assigned to Nike, Inc. Such an article of footwear can include at least one fluid-filled bladder including a plurality of chambers, a control system possibly including a central processing unit or CPU, a pressure detector, and a regulator for modulating the level of fluid communication between different fluid-filled bladders or chambers. It can be readily understood and is hereby explicitly stated that the teachings associated with the patents and patent applications relating to fluid-filled bladders that have been recited and previously incorporated by reference herein can be used in synergistic combination with any or all of the embodiments of an article of footwear taught in the present application.

FIG. 509 is a medial side view of an article of footwear 22 including a fluid-filled bladder 101 which extends between the midfoot and forefoot areas, and an inferior spring element 50 that extends rearward substantially beyond the posterior side 34 of the upper 23. This embodiment is generally similar in many respects to that shown in FIG. 508, but the fluid-filled bladder 101 is larger and extends substantially into the forefoot area anterior of the approximate location of the average wearer's first metatarsal-phalangeal joint 88.

FIG. 510 is a medial side view of an article of footwear 22 including a removable and replaceable middle outsole element 45 or stabilizer 63 which is affixed to a fluid-filled bladder 101 that is removable therewith, and an inferior spring element 50 that extends rearward substantially beyond the posterior side 34 of the upper 23. The stiffness in compression and other physical and mechanical properties of the middle outsole element 45 can thereby be selected from a variety of different options provided to a customer, and the performance of the article of footwear can be customized for an individual wearer.

FIG. 511 is a top plan view of a superior spring element for possible use in an article of footwear generally similar to that shown in FIG. 507. Also shown are the longitudinal axis 69, transverse axis 91, flexural axis 59, and at least one opening 72 for accommodating at least one fastener 29. Again, it can be advantageous for providing rearfoot stability during running for the flexural axis 59 to be deviated from the transverse axis 91 in the range between 10-50 degrees, and in particular, 20-30 degrees. As result, and as previously discussed, the length of the effective lever arm on the medial side 35 of the inferior spring element 50 will be shorter than that on the lateral side 36, that is, as measured between the posterior side of the inferior spring element 50 and the location of the flexural axis 59 on each respective side. One way of expressing the length differential of the effective lever arms of the inferior spring element 50 on the medial side 35 versus the lateral side 36 is with a ratio, as taught by Herr et al. in U.S. Pat. No. 6,029,374, this patent having been previously incorporated by reference herein. In this regard, it can be advantageous for effecting rearfoot stability that the ratio of the length of the effective lever arms on the lateral side 36 relative to those on the medial side 35 be in the range between 1/1 to 2/1, and in particular, in the range between 1.25/1 to 2/1, and preferably in the range between 1.25/1 to 1.75/1.

FIG. 512 is a top plan view of a superior spring element 47 including flex notches 71 on the lateral side 36 for possible use in an article of footwear 22 generally similar to that shown in FIG. 507. Given the sometimes dramatic curvature of a superior spring element 47 towards the medial side 35 in an article of footwear 22 having a curved or semi-curve lasted configuration, a superior spring element 47 made of a relatively homogenous carbon fiber composite material will commonly exhibit greater stiffness in bending on the lateral side 36 relative to the medial side 35. All things being equal, the straighter the last and corresponding configuration of the superior spring element 47, the less the stiffness differential, and conversely, the more curved the last and corresponding configuration of the superior spring element 47, the greater the stiffness differential. Accordingly, it can sometimes be advantageous to introduce flex notches 71 that are longer, or more numerous on the lateral side 36 versus the medial side 35 in order to reduce, eliminate, or even reverse the stiffness differential. As previously discussed, it can sometimes be advantageous to create a "forefoot strike zone," that is, an area of relatively reduced stiffness in compression, torsional stiffness, and stiffness in bending on the lateral side 36 near the position normally associated with the average wearer's fifth metatarsal-phalangeal joint 89.

FIG. 513 is a top plan view of a three quarter length superior spring element 47 including flex notches 71 on the lateral side 36 for possible use in the articles of footwear shown 22 in FIGS. 501 and 506.

FIG. 514 is a top plan view of a superior spring element 47 including flex notches 71 on the lateral side 36 resembling those shown in FIG. 512, but also including two less substantial flex notches 71 on the medial side. The superior spring element 47 also includes an anatomical three dimensional cupped shape for conforming to a wearer's heel in the rearfoot area. This configuration can be used the article of footwear 22 shown in FIG. 508. When the side profile of a three dimensional cupped shape in the rearfoot area is sufficiently elevated, it can form an internal or external heel counter 24.

FIG. 515 is a top plan view of the inferior spring element 50 shown in FIGS. 506-510, and 519. Shown is the longitudinal axis 69, transverse axis 91, flexural axis 59, and at least one opening 72 for accommodating at least one fastener 29. Given the configuration shown in FIG. 515, the overall length of the inferior spring element 50 for a men's size 9 article of footwear can be approximately in the range between 150-160 mm, and the approximate width can be in the range between 70-80 mm at the widest portion. In this embodiment, the approximate required thickness of the inferior spring element 50 for a men's size 9 is generally in the range between 5-10 mm, and the inferior spring element 50 is configured to provide more substantial deflection approximately in the range between 20-25 mm.

FIG. 516 is an enlarged medial side view of the inferior spring element 50 shown in FIG. 515. As shown, the inferior spring element 50 is made of a relatively homogenous construction including carbon fiber composite material.

FIG. 517 is a medial side view of an alternate inferior spring element 50 generally similar to that shown in FIGS. 515-516, but including a laminate structure. In particular, the inferior spring element 50 includes a laminate 155 made of carbon fiber composite material, or the like, on the opposing superior side 37 and inferior side 38, whereas the core can be made of a different material, e.g., foam, rubber, wood, thermoplastic, resin, epoxy, fiberglass, carbon fiber composite, or polyurethane material. In particular, when the thickness of a spring element is greater than approximately 5 mm, a laminate construction can sometimes be used to reduce the weight and cost of an inferior spring element 50, as well as to enhance its performance characteristics.

FIG. 518 is a medial side view of an alternate inferior spring element 50 generally similar to that shown in FIG. 517, but including a laminate structure and having a gradually tapered configuration near the posterior side. As shown, the laminations 155 on the superior side 37 and inferior side 38 converge and directly overlap one another near the posterior side 34. The introduction of a tapered configuration can effectively reduce the exhibited stiffness of the inferior spring element 50 near the posterior side 34, and thereby serve to decrease the peak vertical force and shock associated with footstrike. A tapered configuration can also possibly serve to more evenly distribute loads throughout the inferior spring element 50.

FIG. 519 is a medial side view of an article of footwear 22 generally similar to that shown in FIG. 510, but also including a fluid-filled bladder 101 between the inferior side of the upper 23 and superior side of the inferior spring element 50. The fluid-filled bladder 101 portion substantially located on the superior side of the inferior spring element 50, or upper portion, can be in fluid communication with that portion substantially located on the inferior side of the inferior spring element 50, or lower portion. When the inferior spring element 50 is caused to deflect upwards upon footstrike, the resulting increase in fluid pressure in the upper portion of the fluid-filled bladder 101 can be intelligently directed to the lower portion, and in particular, towards the medial side thereof in order to increase the local stiffness in an optimal manner. Again, at least one fluid-filled bladder including valves that can serve as a motion control device can be used, as taught in WO 01/70061 A2 entitled "Article of Footwear With A Motion Control Device, by John F. Swigart and assigned to Nike, Inc. Moreover, at least one fluid-filled bladder that forms part of a larger dynamically-controlled cushioning system can be used, as taught in WO 01/78539 A2 and U.S. Pat. No. 6,430,843 B1 entitled "Dynamically-Controlled Cushioning System For An Article of Footwear," by Daniel R. Potter and Allan M. Schrock, and assigned to Nike, Inc. Such an article of footwear can include at least one fluid-filled bladder including a plurality of chambers, a control system possibly including a central processing unit or CPU, a pressure detector, and a regulator for modulating the level of fluid communication between different fluid-filled bladders or chambers. Again, the patent applications recited in this paragraph have been previously incorporated by reference herein.

FIG. 520 is a side view of an engineering drawing of an inferior spring element 50. Shown are the anterior side 33, posterior side 34, superior side 37, inferior side 38, medial side 35, lateral side 36, an opening 72 for accommodating a fastener 29, the anterior portion 157, middle portion 158, posterior portion 159, anterior tangent point 160, posterior tangent point 161, anterior curve 162, thickness 164, and the symmetrical fitted radius of curvature 163. In this embodiment the dimensions are approximately as follows: the overall length of the inferior spring element is 4.75 inches; the length of the anterior portion 157 is 0.815 inches; the length of the middle portion is 2.435 inches; the length of the posterior portion is 1.5 inches; the thickness is 0.1476 inches; the vertical distance between the inferior side of the anterior portion 157 and inferior side of the posterior portion 159 adjacent the posterior tangent point 161 is 0.1476 inches, and the symmetrical fitted radius of curvature 163 is 2.5107. In this particular embodiment, the posterior portion 159 of the inferior spring element 50 is relatively flat or planar. When given an anterior tangent point 160 and a posterior tangent point 161 separated by a given horizontal or anterior to posterior distance, and also by a given vertical or superior to inferior distance, there can be only one radius of curvature that can be drawn from both tangent points 160 and 161 that will define a smooth curve having perfect symmetry that will intersect both tangent points 160 and 161. This single possible solution having perfect symmetry regarding the radius of curvature is hereby defined herein as the symmetrical fitted radius of curvature 163. It can be advantageous to design and configure an inferior spring element 50 using a symmetrical fitted radius of curvature 163 since this can result in the creation of a component in which the forces and loads placed upon it are most evenly distributed throughout the middle portion 158 including the anterior curve 162. This can contribute to mechanical properties that could possibly be considered advantageous, e.g., the degree to which the stress/strain curve is linear, that is, the degree to which the exhibited stiffness of the inferior spring element 50 is said to be stacked when loaded. Moreover, it can also possibly contribute to the robustness and service life of the inferior spring element 50.

FIG. 521 is a side view of an engineering drawing of an inferior spring element 50 generally similar to that shown in FIG. 520, but having an upwardly inclined 165 posterior portion 159. As shown, the posterior portion 159 of the inferior spring element 50 is inclined 165 upwards at a 2 degree angle starting at the posterior tangent point 161 and extending to the posterior side 34 thereby creating an inclined posterior portion 159. When the inferior spring element 50 is affixed in functional relation to an article of footwear 22, this inclined 165 configuration can possibly be advantageous for reducing an undesirable leverage effect that can be generated near the lateral posterior corner of the inferior spring element 50 during footstrike and the braking phase of the gait cycle, as previously discussed above in this specification.

FIG. 522 is a side view of an engineering drawing of an inferior spring element 50 generally similar to that shown in FIG. 520, but having a posterior portion 159 including a posterior curve 166. Accordingly, the inferior spring element 50 has an anterior curve 162 formed between the anterior tangent point 160 and the posterior tangent point 161, but also a posterior curve 166 formed between the posterior tangent point 161 and the posterior side 34 of the inferior spring element 50. Depending upon the configuration and overall geometry of the associated article of footwear, the radius of curvature could possibly be the same for both the anterior curve 162 and posterior curve 166. Alternately, the posterior curve 166 could have a greater radius of curvature, but generally the posterior curve 166 will have a lesser radius of curvature than that of the anterior curve 162. However, much depends upon the configuration and overall geometry of the associated article of footwear, and in particular, the design and configuration of the outsole in the rearfoot area.

FIG. 523 is a top plan view of an inferior spring element 50 generally similar to that shown in FIGS. 505 and 520, but showing several features of the inferior spring element 50 in greater detail. In particular, shown are the anterior portion 157, middle portion 158, posterior portion 159, anterior tangent point 160, posterior tangent point 161, anterior curve 162, and posterior curve 166.

FIG. 524 is a lateral side view of an article of footwear 22 including an external heel counter 24, and a spring element 51 including a superior spring element 47 shown with phantom dashed lines and an inferior spring element 50 having a tapered configuration. Again, an external heel counter can be made of a thermoset fiber composite material possibly including glass, aramide, carbon, or boron fibers, or alternately be made of a reinforced thermoplastic material including short or long fibers. For example, Dow Chemical Company of Midland, Mich. makes SPECTRUM® reaction moldable polymer which has been used to make automobile body parts, and LNP Engineering Plastics of Exton, Pa. makes THERMOCOMP® and VERTON® thermoplastic materials which can include glass or carbon fibers. When the superior spring element 47 is affixed to the external heel counter 24 and the inferior spring element 50 with the use of a fastener 29, the posterior portion of the upper 23 is trapped between the superior spring element 47 and the external heel counter 24 and thereby affixed and secured in functional relation thereto. In this embodiment, nearly all of the deflection in the rearfoot area 68 will be provided by the inferior spring element 50, that is, the portion of the superior spring element 47 which overlaps the external heel counter 24 will not substantially flex during use.

FIG. 525 is a medial side view of the article of footwear shown in FIG. 524 showing the shorter relative effective length of the lever arm of the inferior spring element 50 on the medial side 35 relative to the lateral side 36, and also the tapered configuration of the inferior spring element 50.

FIG. 526 is a side view engineering drawing showing the dimensions of an inferior spring element 50 for possible use with a men's size 9 article of footwear such as that shown in FIGS. 524 and 525. As shown, the inferior spring element 50 has an overall length of 5.5 inches, and the anterior portion 157 can measure 1.25 inches, the middle portion 158 can measure 2.5 inches, and the posterior portion 159 can measure 1.75 inches. Alternately, the overall length can be reduced by 0.25 inch by subtracting 0.125 inches from both the anterior portion 157 and the posterior portion 159. As shown, the fitted symmetrical radius of curvature 163 of the anterior curve 162 has a radius of 2.845 inches, whereas the radius of curvature of the superior side 37 of the posterior curve 166 is 9.0 inches, and the radius of curvature corresponding to the tapering of the inferior side 38 of the posterior portion 159 is 5.138 inches. As shown, the vertical distance between the highest and lowest elevation is 0.7085 inches or 18 mm, and the thickness of the particular inferior spring element 50 shown is 0.1970 inches or 5 mm at the anterior side 33 and tapering to only 0.108 inches or 2.75 mm at the posterior side 34. The thickness and tapered configuration of the inferior spring element can be varied for use by individuals having different body weight, running technique, or characteristic running speeds, and also for use in many different activities. If and when desired, the vertical elevation can be changed in the range between 10-18 mm, something that would also cause the fitted symmetrical radius of curvature 163 associated with the anterior curve 162 to also change, but otherwise merely changing the vertical elevation need not substantially change the other dimensions and configuration. Generally, regarding a men's size 9 article of footwear, an advantageous overall length of an inferior spring element for running is in the range between 4.75 and 5.5 inches, the width in the range between 75-85 mm, the vertical distance between the highest and lowest elevation is in the range between 10-18 mm, and the thickness is in the range between 4-5.5 mm at the anterior side 33 and in the range between approximately 2-3 mm at the posterior side 34. Generally, an advantageous fitted symmetrical radius of curvature 163 for use in a men's size 9 running shoe with respect to the anterior curve 162 is in the range between 2.25 and 3.25 inches, an advantageous radius of curvature 181 with respect to the superior side 37 of the posterior curve 166 is in the range between 7 and 11 inches, and an advantageous radius of curvature 182 regarding the inferior side 38 of the posterior portion 159 is in the range between 4-6 inches.

FIG. 527 is a bottom plan view of the inferior spring element 50 shown in FIGS. 524 and 525, also showing an opening 72 and the bottom side of a wear prevention insert 130 inserted therein.

FIG. 528 is a rear view of an article of footwear 22 generally similar to that shown in FIGS. 524 and 525, showing the posterior side 34 of the inferior spring element 50 and its tapered configuration, but also a posterior outsole element 46 including a transparent backing 30.

FIG. 529 is a front view of the inferior spring element 50 shown in FIG. 527.

FIG. 530 is a top plan view of the inferior spring element 50 shown in FIG. 527. As shown, the flexural axis 59 is deviated from the transverse axis 91 of the inferior spring element 50 by approximately 20 degrees. When no other means are being used to create differential stiffness between the medial and lateral sides of an article of footwear which is intended for use in running, given an inferior spring element having the configuration shown, it is generally advantageous for the flexural axis 59 to be deviated from the transverse axis 91 in the range between 20-30 degrees. Further, in a running shoe application it is also generally advantageous to introduce a tapered configuration at least within the posterior portion 159 of the inferior spring element 50. Also shown is the top side of a wear prevention insert 130 further including splines 167 for mating with complimentary splines on another wear prevention insert which can be inserted into the bottom side of an external heel counter. Accordingly, the inferior spring element 50 can be secured to an external heel counter in various positions by merely rotating it by a desired angular increment, thereby adjusting the overall configuration and both the cushioning and stability characteristics of an article of footwear.

FIG. 531 is a bottom plan view of the external heel counter 24 shown in FIGS. 524, 525 and 528, and also showing a wear prevention insert 130 including splines 167 for mating with the complementary wear prevention insert 130 shown in FIG. 530. Further, the longitudinal axis 69 is shown, as well as lines associated with angular deviations of 5 and 10 degrees towards the medial side 35 and also towards the lateral side 36. When an inferior spring element 50 is secured to the external heel counter 24 and/or superior spring element 47 the amount of angular deviation, if any, can be selected as desired. Generally, the maximum amount of angular deviation that is required in order to accommodate wearer's having varying anatomy and biomechanics is less than or equal to 20 degrees, that is, the sum of 10 degrees deviation to the medial side 35 and also to the lateral side 36. More commonly, less than or equal to a total of 15 degrees of angular deviation, or even less than or equal to a total of 10 degrees of angular deviation, that is, the sum of 5 degrees of deviation to the medial side 35 and also to the lateral side 36 can suffice to well serve the stability needs or requirements of wearer's who may have a tendency to over-pronate or over-supinate. Moreover, angular rotation of the inferior spring element 50 can change the length of the effective lever arm and thereby change the effective stiffness and cushioning characteristics provided thereby. Accordingly, both the cushioning and stability characteristics of an inferior spring element 50 can possibly be optimized by an individual wearer selecting a desired angular orientation relative to the longitudinal axis 69.

FIG. 532 is a top plan view of a superior spring element 47 for possible use with an article of footwear having a longitudinal flex notch 71.1 and two flex notches 71.2 and 71.3 on the lateral side 36, and also a wear prevention insert 130 positioned in an opening 72. As shown, notches 71.3 and 71.6 are aligned to approximately correspond to the position of a wearer's metatarsal-phalangeal joint indicated by line 104, thereby creating a line of flexion 54. The length of all the flex notches 71 can be varied to change the local stiffness characteristics and overall performance of the superior spring element 47.

FIG. 533 is a lateral side view of the superior spring element 47 shown in FIG. 532.

FIG. 534 is a top plan view of a superior spring element 47 for possible use with an article of footwear having a longitudinal flex notch 71.1 and three flex notches 71.2, 71.3, and 71.4 on the lateral side 36 which can serve to create a forefoot strike zone 176, that is, an area of reduced local stiffness for attenuating impact events on the lateral side 36 relative to the medial side 35.

FIG. 535 is a lateral side view of the superior spring element 47 shown in FIG. 534.

FIG. 536 is a top plan view of a superior spring element 47 for possible use with an article of footwear having a longitudinal flex notch 71.1 and two flex notches 71.2 and 71.3 on the lateral side 36 that straddle the approximate position corresponding to the metatarsal-phalangeal joints 104 of a wearer's foot. This configuration can facilitate the positioning of a cushioning medium or cushioning means in continuity under the ball of a wearer's forefoot.

FIG. 537 is a lateral side view of the superior spring element 47 shown in FIG. 536.

FIG. 538 is a top plan view of a superior spring element for possible use with an article of footwear having two flex notches 71.2 and 71.3 on the lateral side 36. The presence of a longitudinal flex notch generally serves to decrease the stiffness of the superior spring element 47 near the anterior side 33, and accordingly, all things being equal, this embodiment would be stiffer relative to that shown in FIG. 532.

FIG. 539 is a lateral side view of the superior spring element 47 shown in FIG. 538.

FIG. 540 is a lateral side view of an article of footwear 22 including a superior spring element 47 shown in phantom dashed lines and an inferior spring element 50. The configuration of this article of footwear 22 is generally similar to that shown in FIG. 524, but for the exclusion of the external heel counter 24. Accordingly, the posterior portion of the superior spring element 50 can also contribute to deflection when loaded, that is, depending upon its thickness and stiffness, as desired.

FIG. 541 is a medial side view of the article of footwear 22 shown in FIG. 540.

FIG. 542 is a lateral side view of an article of footwear 22 including a superior spring element 47 including an integral heel counter 24 shown in phantom dashed lines and an inferior spring element 50. This configuration can slightly decrease the overall heel elevation relative to that shown in FIG. 524. Also shown for illustrative purposes is the possible use of an inferior spring element 50 having uniform thickness, as opposed to a tapered configuration.

FIG. 543 is a medial side view of the article of footwear 22 shown in FIG. 542.

FIG. 544 is a rear view of the article of footwear 22 shown in FIGS. 542 and 543, and showing the posterior side 34 of the inferior spring element 50 having uniform thickness.

FIG. 545 is a top plan view of a superior spring element 47 having an integral heel counter 24 for possible use in an article of footwear 22 generally similar to that shown in FIGS. 542, 543, and 544. Accordingly, the superior spring element 47 is configured so as to be positioned inside of the upper 23. Alternately, the midfoot area 67 and forefoot area 58 of the superior spring element 47 could include other flex notch patterns such as those shown in FIGS. 532, 534, and 536.

FIG. 546 is a lateral side view of the superior spring element 47 shown in FIG. 545.

FIG. 547 is a lateral side view of an article of footwear 22 including a superior spring element 47 including an integral external heel counter 24 and an inferior spring element 50. In this embodiment, the superior spring element 47 is substantially positioned between the upper 23 and the anterior outsole element 44.

FIG. 548 is a medial side view of the article of footwear 22 shown in FIG. 547.

FIG. 549 is a top plan view of a superior spring element 47 including an integral external heel counter 24 for possible use with an article of footwear 22 generally similar to that shown in FIGS. 547 and 548. Alternately, the midfoot area 67 and forefoot area 58 of the superior spring element 47 could include flex notch patterns such as those shown in FIGS. 532, 534, 536, and 545.

FIG. 550 is a lateral side view of an article of footwear 22 including an inferior spring element 50 having asymmetrical curvature on the medial side 35 and lateral side 36. For reference purposes, the reader may wish to refer to the terminology used in FIG. 530 in order to better understand the following discussion. In the inferior spring element 47 shown in FIG. 550, the radius of curvature between the anterior tangent point and posterior tangent point associated with the anterior curve is different on the medial side 35 relative to the lateral side 36. As shown in FIG. 550, the radius of curvature with respect to the anterior curve is smaller on the medial side 35 than on the lateral side 36.

FIG. 551 is a medial side view of the article of footwear 22 shown in FIG. 550.

FIG. 552 is a lateral side view of an article of footwear 22 having parts broken away showing the anterior outsole element 44 affixed directly to the upper 23. In this regard, the anterior outsole element 44 can be affixed by conventional adhesives or with the use of a self-adhesive surface. Alternately, the anterior outsole element 44 can be direct injection molded to the upper 23. In some footwear applications, the anterior outsole element 44 can be made of a recyclable and/or biodegradable plastics material.

FIG. 553 is a lateral side view of an article of footwear 22 having parts broken away showing portions of an anterior outsole element 44 passing through openings 72 in the inferior side 38 of the upper 23. The traction members 115 can be injection molded, co-injection molded, or otherwise affixed in functional relation to a relatively thin backing 30 portion that serves to bridge and properly register the traction members 115 relative to the openings 72, and also more generally within the upper 23. Further, the traction members 115 can also include an undercut 154 portion which can enable the traction members 115 to be press fit or snap fit into place in relation to the upper 23. Further, a gasket 142 generally similar to that shown and discussed in association with FIG. 437 can be used between the anterior outsole element 44 and the upper 23 to help seal and affix their mating surfaces. As shown, the inferior side of the bridge 177 portions of the upper 23 can be reinforced and protected by a wear resistant material such as a plastic material 138. As shown, the insole 31 can include a raised profile in the rearfoot area 68 for providing additional padding and protection from the external heel counter 24. Also shown is the use of two wear prevention inserts 130, one being inserted into the inferior side of the external heel counter 24, and the other into the superior side of the inferior spring element 50. The two wear prevention inserts 130 can include mating portions for preventing rotation when secured by a fastener 29 as shown in FIGS. 530 and 531. If desired, the head of the fastener 29 can be countersunk so as to fit flush with a superior spring element 47 or inferior spring element 50. The posterior outsole element 46 can include a backing 30 and a pocket 131 into which the posterior end of the inferior spring element 50 can be inserted, and the inferior spring element 50 including the posterior outsole element 46 and backing 30 can then be secured with the use of a fastener 29. Accordingly, the upper 23, insole 31, superior spring element 47, wear prevention inserts 130, superior spring element 47, external heel counter 24, anterior outsole element 44, inferior spring element 50, posterior outsole element 46, and fastener 29 are all removable, replaceable and customizable, and substantially affixed by mechanical means possibly including the use of a single fastener 29.

FIG. 554 is a bottom plan view of an upper 23 having a plurality of openings 72 for permitting portions of an anterior outsole element 44 to pass therethrough. Also shown are bridge 177 portions of the upper 23, and the use of a plastic material 138 on the inferior side 38 of the upper. The embodiment of an upper 23 shown in FIG. 554 is generally similar to that shown in FIG. 351, but features a more robust construction near the anterior side 33 including a traction member 115 that is affixed directly to the inferior side 38 and also a portion of the anterior side 33 of the upper 23.

FIG. 555 is a lateral side view of an article of footwear 22 generally similar to that shown in FIG. 553, but further including an anterior outsole element 44 having a backing 30 portion including an integral stability element 136. The stability element 136 is positioned inside the upper 23 and can include a plurality of upwardly directed portions such as 136.1, 136.2, and 136.3 for enhancing stability and fit, but also notches therebetween for enhancing its flexibility characteristics. As shown, the insole 31 can include a raised profile substantially about the circumference of a wearer's foot for providing protection and enhancing comfort.

FIG. 556 is a longitudinal cross-sectional side view of an insole 31 including an elevated heel pad 178 for possible use with an article of footwear 22. By changing the thickness of the heel pad 178 of the insole 31, the effective length size of an article of footwear 22 into which the insole is inserted can be changed, as desired. In this regard, it is possible to change the effective length size of a given upper 23 by at least one full size range, e.g., a given select upper can be made to fit size 9, 9.5, and 10. This feature can be advantageous since wearer's often have one foot that is one half size larger than the other. Further, a given select upper can then be used to span a greater size range, and this makes for greater economy in manufacturing, but also in supply and inventory.

FIG. 557 is a longitudinal cross-sectional side view of an insole 31 including an elevated heel pad 178, an elevated toe pad 179, but also an elevated side pad 180 for encompassing a wearer's foot. By changing the thickness of the heel pad 178 and/or the toe pad 179 of the insole 31, the effective length size of an article of footwear 22 into which the insole 31 is inserted can be changed, as desired. In this regard, it is possible to change the effective length size of a given upper 23 by at least one full size range, e.g., a given select upper can be made to fit size 9, 9.5, and 10. This feature can be advantageous since wearer's often have one foot that is one half size larger than the other. Further, a given select upper can then be used to span a greater size range, and this makes for greater economy in manufacturing, but also in supply and inventory. Moreover, by changing the thickness of the inferior side 38 and/or the elevated side pad 180 portion of the insole, the effective width and girth of the article of footwear 22 into which the insole 31 is inserted can be changed, as desired. Accordingly, it can be possible to change the effective width of an article of footwear 22 in the range between AA-EE.

FIG. 558 is a lateral side view of an article of footwear 22 having parts broken away showing the possible use of an anterior outsole element 44 including a backing 30 further including an external stability element 136. As shown, a plurality of relatively small fasteners 29 including a male mating structure 128 can pass through openings such as flex notches 71 present in the superior spring element 47 and the inferior side of the upper 23, and then be mechanically engaged and affixed in functional relation by those complimentary female mating structures 129 included in the anterior outsole element 44. Optionally, the superior side of the anterior outsole element can also include a tactified surface or a self-adhesive surface protected by a removable peel-ply layer for further affixing the anterior outsole element to an upper.

FIG. 559 is a lateral side view of an article of footwear 22 having parts broken away showing the possible use of an anterior outsole element 44 including a backing 30 further including an external stability element 136 that includes upwardly extending straps 118 for use with closure means 120 such as laces 121, straps, and the like. The inclusion of upwardly extending straps 118 for use with closure means 120 can serve to further secure the anterior outsole element 44 in functional relation with the upper 23, and in particular, with respect to an article of footwear that is intended for use in activities requiring substantial lateral movement. The backing 30 portion of the anterior outsole element 44 further includes a plurality of male mating structures 128 such as protuberances 99 and/or hooks 27 for mating with complimentary female mating structures 129 which are present in the upper 23 and/or superior spring element 47. Again, the superior side of the anterior outsole element can also include a tactified surface or a self-adhesive surface protected by a removable peel-ply layer for further affixing the anterior outsole element to an upper.

FIG. 560 is a top plan view of a male part 85 of a fastener 29 for possible use with the female part 86 of a fastener 29 shown in FIGS. 562 and 563, whereby the male part 85 and female part 86 of the fastener 29 can be secured together to a desired torque value. As shown in FIG. 560, the male part 85 of a fastener 29 includes both an Allen drive receptacle 168 and flat blade drive receptacle 169. Accordingly an Allen wrench tool, or alternately a screwdriver or other blade like implement can be used to manipulate the male part 85 of the fastener 29. Moreover, a common piece of spare change such as a quarter can alternately be used for the same purpose. When a single male part 85 of a metal fastener 29 generally similar to that shown in FIG. 560 is being used to affix the components of an article of footwear together, the approximate B dimension as indicated in FIG. 560 will generally be in the range between 8-25 mm, and in particular, commonly in the range between 10-20 mm.

FIG. 561 shows a side view of the male part 85 of a fastener 29 shown in FIG. 560. When a single male part 86 of a metal fastener 29 generally similar to that shown in FIGS. 560 and 561 is being used to affix the components of an article of footwear together, the approximate C dimension as indicated in FIG. 561 will generally be in the range between 1.0-2.0 mm. The required size of the threaded portion of the male part 85 is generally in the range between ¼th and ½ inch, thus 5/16ths of an inch can generally be used. The bolt or male part 85 can include a thin plastic coating 138 for preventing it from becoming accidentally loosened. Further, the inferior side of the head or flange portion of the bolt or male part 85 can include a textured surface such as a plurality of serrations for enhancing its holding power relative to a portion of a spring element 51.

FIG. 562 shows a side view of a female part 86 of a fastener 29 for possible use with the male part 85 of a fastener 29 shown in FIGS. 560 and 561. When a single female part 86 of a metal fastener 29 generally similar to that shown in FIG. 562 is being used to affix the components of an article of footwear together, the approximate A dimension indicated in FIG. 562 will vary in accordance with the width of the superior spring element, upper, and inferior spring element, but will generally be in the range between 5-20 mm, and in particular, commonly in the range between 8-12 mm. Moreover, the approximate D dimension as indicated in FIG. 562 will generally be in the range of 5-15 mm, and in particular, commonly in the range between 8-12 mm. The required size of the threaded opening is normally in the range between ¼th and ½ inch, thus 5/16ths of an inch can generally be used. Further, the superior side of the head or flange portion of the female part 86 can include a textured surface such as a plurality of serrations for enhancing its holding power relative to a portion of a spring element 51.

FIG. 563 is a bottom plan view of the female part 86 of a fastener 29 shown in FIG. 562, further including the symbol of a registered trademark indicia. Accordingly, the bottom side of an exposed fastener 29 on the inferior side 38 of an article of footwear 22 can simply appear to be a trademark indicia.

FIG. 564 is a side view engineering drawing showing the dimensions of an inferior spring element 50 for possible use with a men's size 9 article of footwear. For example, the article of footwear could be generally similar to those shown in FIG. 524, 525, 568, 569, or 575, or those shown elsewhere within the present application, and the like. As shown, the inferior spring element 50 has an overall length of 5.25 inches, and the anterior portion 157 can measure 1.125 inches, the middle portion 158 can measure 2.5 inches, and the posterior portion 159 can measure 1.625 inches. Alternately, the overall length can be reduced by 0.25 inch by subtracting 0.125 inches from both the anterior portion 157 and the posterior portion 159. As shown, the anterior portion 157 also projects downwards at a three degree angle towards the anterior side 33. This can facilitate attaining an advantageous geometry and fit with respect to a superior spring element and also an external heel counter. Further, the inferior spring element 50 can have a maximum width in the range between 75-80 mm, and the flexural axis can be deviated from the transverse axis in the range between 20-30 degrees. Given the inferior spring element 50 shown in FIG. 564 for a men's size 9 article of footwear, an advantageous maximum width is approximately 77 mm, and the addition of a posterior outsole element 46 including a backing 30 that overlaps the edges of the inferior spring element 50 by 1.5 mm on both the medial side 35 and lateral side 36 can therefore bring the maximum width of the outsole net to approximately 80 mm.

As shown in FIG. 564, the fitted symmetrical radius of curvature 163 of the anterior curve 162 has a radius of 2.606 inches, whereas the radius of curvature of the superior side 37 of the posterior curve 166 is 9.0 inches, and the radius of curvature corresponding to the tapering of the inferior side 38 of the posterior portion 159 is 5.138 inches. As shown, the vertical elevation is 0.6299 inches or 16 mm, and the thickness of the particular inferior spring element 50 shown is 0.189 inches or 4.8 mm at the anterior side 33 and tapering to only 0.1083 inches or 2.75 mm at the posterior side 34. If and when desired, the vertical elevation can be changed in the range between 10-18 mm, something that would also cause the fitted symmetrical radius of curvature 163 associated with the anterior curve 162 to also change, but otherwise merely changing the vertical elevation need not substantially change the other dimensions and configuration. The thickness and tapered configuration of the inferior spring element can be varied for use by individuals having different body weight, running technique, or characteristic running speeds, and also for use in many different activities. Given an inferior spring element 50 having the dimensions shown in FIG. 564, the following general guidelines regarding the desired thickness for a wearer could apply: a maximum thickness of 4.0 mm for a wearer having a body weight in the range between 100-120 pounds; 4.25 mm for a wearer in the range between 120-140 pounds; 4.5 mm for a wearer in the range between 140-160 pounds; 4.75 mm for a wearer in the range between 160-180 pounds; 5.0 mm for a wearer in the range between 180-200 pounds; and 5.25 mm for a wearer in the range between 200-220 pounds.

Generally, regarding a men's size 9 article of footwear, an advantageous overall length of an inferior spring element for running is in the range between 4.75 and 5.5 inches, the width in the range between 75-85 mm, the vertical elevation is in the range between 10-18 mm, and the thickness is in the range between 4-5.5 mm at the anterior side 33 and in the range between approximately 2-3 mm at the posterior side 34. Generally, an advantageous fitted symmetrical radius of curvature 163 for use in a men's size 9 running shoe with respect to the anterior curve 162 is in the range between 2.25 and 3.25 inches, an advantageous radius of curvature 181 with respect to the superior side 37 of the posterior curve 166 is in the range between 7 and 11 inches, and an advantageous radius of curvature 182 regarding the inferior side 38 of the posterior portion 159 is in the range between 4-6 inches. When no other means are being used to create differential stiffness between the medial and lateral sides of an article of footwear which is intended for use in running, given an inferior spring element having the configuration shown, it is generally advantageous for the flexural axis to be deviated from the transverse axis in the range between 20-30 degrees.

FIG. 565 is a bottom plan view of an article of footwear 22 having a semi-curved lasted configuration including an inferior spring element 50 and a posterior outsole element 46 including a transparent backing 30 portion. As a result, a substantial portion of the inferior spring element 50 can be seen. Further, when a relatively transparent thermoplastic or polyurethane material is used to make the outsole 43 portion of the posterior outsole element 46 as well, substantially the entire inferior spring element 50 can be visible. As shown, the outsole 43 covers only about half of the bottom surface area associated with the inferior spring element 50, and this can provide adequate support and stability for some wearers.

FIG. 566 is a bottom plan view of an article of footwear 22 having a semi-curved lasted configuration including a posterior outsole element 46 that substantially covers the bottom side of the inferior spring element 50. This configuration can provide greater support and stability in the rearfoot area 68 and midfoot area 67 for wearers having a tendency to excessively supinate or pronate. Further, this configuration can also be advantageous for use with articles of footwear intended for use in activities requiring substantial lateral movement.

FIG. 567 is a bottom plan view of an article of footwear 22 having a straight lasted configuration relative to those shown in FIGS. 565 and 566, and also a wider inferior spring element 50 and posterior outsole element 46 in the midfoot area 67. This configuration can provide greater support and stability in the rearfoot area 68 and midfoot area 67 for wearers having a tendency to excessively supinate or pronate, and in particular, those individuals having relatively flat arches. Further, this configuration can also be advantageous for use with articles of footwear intended for use in activities requiring substantial lateral movement.

FIG. 568 is a lateral side view of an article of footwear 22 generally similar to that shown in FIG. 524, further including a fluid-filled bladder 101. Again, the fluid-filled bladder 101 can include a gas that is at ambient atmospheric pressure, or alternately the gas can be pressured above atmospheric pressure. Moreover, the fluid-filled bladder 101 can occupy a portion, or alternately can occupy substantially all of the space between the external heel counter 24 and the inferior spring element 50.

FIG. 569 is a medial side view of an article of footwear 22 generally similar to that shown in FIG. 525, but including a posterior outsole element 46 generally similar to that shown in FIGS. 566 and 567. As shown in FIG. 569, the posterior outsole element 46 can include an integral stabilizer 63 for enhancing both cushioning and stability in the midfoot area 67.

FIG. 570 is a lateral side view of an article of footwear 22 including an upper 23 that is substantially made using three dimensional and/or circular knitting methods, or the like. These methods and techniques are commonly used in the making of apparel such as socks. Various socks and methods of making socks and like apparel items are taught in published patents including, but not limited to: U.S. Pat. Nos. 1,741,340, 1,889,716, 2,102,368, 2,144,563, 2,333,373, 2,391,064, 2,687,528, 2,771,691, 2,790,975, 3,085,410, 3,102,271, 3,274,709, 3,796,067, 4,253,317, 4,263,793, 4,341,096, 4,520,635, 4,615,188, 4,651,354, 4,732,015, 4,898,007, 5,230,333, 5,771,495, 5,784,721, 5,829,057, 5,946,731, 6,021,527, 6,122,937, 6,154,983, 6,138,281, 6,139,929, 6,230,525, 6,247,182, 6,256,824, 6,286,151, 6,292,951, 6,306,483, 6,314,584, 6,324,874, 6,334,222, 6,336,227, 6,354,114, 6,393,620, 6,446,267, 6,451,144, 6,457,332, EP 0 593 394 A1, D401,758, D403,149, D461,045, and also patents granted to James L. Throneburg including U.S. Pat. Nos. 4,194,249, 4,255,949, 4,277,959, 4,373,361, 5,307,522, 5,335,517, 5,560,226, 5,595,005, 5,603,232, 5,724,753, 5,791,163, 5,881,413, 5,909,719, 6,308,438, WO 96/21366, and D374,553. Several of the aforementioned patents also relate to making an upper for an article of footwear, and in particular, U.S. Pat. Nos. 5,595,005, 5,724,753, 5,881,413, 5,909,719, 6,154,983, 6,256,824, 6,308,438, and D374,553. All of the patents and patent applications recited in this paragraph are hereby incorporated by reference herein.

As shown in FIG. 570, various portions of the upper 23 can thereby be made of different textile materials and knits. For example, the vamp 52 can be made of a four way elastic textile material 137.1 and the quarter 119 can be made of a two way elastic textile material 137.2, whereas the tip 25 and other select portions of the upper 23 can be made with a relatively inelastic textile material 137.3. The primary desired direction of stretch of the elastic textile materials 137.1 and 137.2 has been indicated with arrows. As shown, the upper 23 includes conventional lace 121 closure means 120.

FIG. 571 is a medial side view of an article of footwear 22 including an upper 23 that is substantially made using three dimensional and/or circular knitting methods, or the like, generally similar to that shown in FIG. 570, further including a plastic material 138. The textile material portion of the upper 23 can be placed in functional relation upon a footwear last, or like mold, and the plastic material 138 can then be injection molded, bonded, fused, or applied with heat and pressure to the textile material.

FIG. 572 is a lateral side view of a portion of an upper 23 that is made using three dimensional and/or circular knitting techniques, or the like. The upper 23 can include a plurality of different textile materials and knits having different aesthetic, mechanical and physical properties. For example, a comfortable knit textile material 137.4 having resilient elastic characteristics can be used about the collar 122 in order to help prevent the entry of foreign matter into the upper 23, a three dimensional textile material 137.6 can be used to form a dorsal pad 172 in order to protect the wearer's foot from binding pressure possibly exerted by closure means, a four way stretch elastic textile material 137.1 can be used in the vamp 52 in order to accommodate flexion of a wearer's toes, a two way or four way stretch elastic textile material 137.2 having greater stiffness and resistance to elongation can be used in the quarter 119, and a textile material 137.3 that provides relatively little elongation and has excellent wear properties can be used in the tip 25 and anterior side 33, and also about the lower portion of the medial side 33, lateral side 36, posterior side 34, and inferior side 38 of the upper 23. Also shown is the plantar portion 173, and heel portion 174 of the upper 23.

FIG. 573 is a lateral side view of a portion of an alternate upper 23 generally similar to the embodiment shown in FIG. 572, but instead showing the use of a two way or four way stretch textile material 137.2 about a portion of the medial side 35, lateral side 36 and inferior side 38 of the upper 23, and also showing parts broken away. The use of a two way or four way stretch textile material 137.2 between the quarters 119 on the medial side 35 and lateral side 36 passing under the inferior side 38 of the upper 23 and a wearer's foot can introduce a functional elongation capability with respect to the length size of the upper 23. For example, an upper 23 having a given length size corresponding to men's size 9 could thereby be functional for use with sizes 8.5, 9, and 9.5, and perhaps even sizes 8, 8.5, 9, 9.5, and 10. The makes for greater economy in manufacture and supply with respect to inventory. Again, the upper 23 can include a plurality of different textile materials and knits having different aesthetic, mechanical and physical properties. For example, a comfortable knit textile material 137.4 having resilient elastic characteristics can be used about the collar 122 in order to help prevent the entry of foreign matter into the upper 23, a three dimensional textile material 137.6 can be used to form a dorsal pad 172 in order to protect the wearer's foot from binding pressure possibly exerted by closure means, a four way stretch elastic textile material 137.1 can be used in the vamp 52 in order to accommodate flexion of a wearer's toes, a two way or four way stretch elastic textile material 137.2 having greater stiffness and resistance to elongation can be used in the quarter 119 and can also extend about the medial side 35, lateral side 36, and inferior side 38, and a textile material 137.3 that provides relatively little elongation and has excellent wear properties can be used in the tip 25 and anterior side 33, and also about a substantial portion of the lower portion of the medial side 35, lateral side 36, posterior side 34, and inferior side 38 of the upper 23. Also shown is the plantar portion 173, and heel portion 174 of the upper 23.

FIG. 574 is a lateral side view of the portion of an upper 23 shown in FIG. 573, further including several straps 118.1, 118.2, and 118.3, and also an external stability element 136 consisting of an over-molded plastic material 138. A portion of strap 118.1 can be affixed or consist of a portion of the backtab 175. Strap 118.3 includes a d-ring 150 and also VELCRO® hook and pile 140 closure means 120.

FIG. 575 is a lateral side view of an article of footwear 22 including the upper 23 shown in FIG. 574, but further including an external heel counter 24, an inferior spring element 50, a superior spring element 47 and an insole 31 positioned inside the upper 23 that are not visible in the side view, a posterior outsole element 46, a fastener 29, and an anterior outsole element 44. Since the upper 23 can be substantially made without the need for substantial hand stitching or other labor intensive techniques, it can be made economically in the United States, or otherwise near the intended market. Again, the capability of the upper 23 to possibly serve a range of length sizes further simplifies manufacturing, supply, and inventory. Further, as previously discussed, if desired, a substantial portion of an article of footwear 22, that is, greater than fifty percent, and preferably greater than seventy-five percent, and most preferably substantially all of the other major components of the article of footwear can be removably assembled and secured in functional relation to the upper 23 to make a custom article of footwear 22 within minutes. Again, the upper 23 can be substantially made of recyclable and/or biodegradable materials, and substantially all the other various footwear components can also be made of materials that are recyclable. Accordingly, the materials, manufacturing methods, structure and way that various footwear components can be simply and rapidly assembled to make a custom article of footwear, and the method of conducting retail and Internet business taught in the present application can be associated with significant value added and economic efficiency, but also a substantially recyclable and environmentally friendly product.

FIG. 576 is a lateral side view of an article of footwear 22 resting on a ground support surface 117 including an upper 23, external heel counter 24, an inferior spring element 50, a posterior outsole element 46, a fastener 29, an anterior outsole element 44 including a pocket for receiving the anterior portion of an inferior spring element 50, toe counter 183, front tab 187, frame 185, and bump stop 186. The external heel counter 24, frame 185 and toe counter 183 can consist of individual components or can alternatively be made in partial or complete combination. It can be advantageous to make the external heel counter 24 of a plastic material including fiber filler, or a carbon fiber composite material as such can provide a relatively stiff and lightweight component, whereas the toe counter 183 and frame 185 can be made of a more flexible plastic material or foam material. The toe counter 183, frame 185 and heel counter 24 can be affixed to the upper 23 by conventional adhesives, or alternatively bonded, or fused thereto such as by injection molding. Likewise, the anterior outsole element 44 can be can be affixed to the upper 23 by conventional adhesives, or alternatively bonded, or fused thereto such as by direct injection molding. Alternatively, the anterior outsole element 44 can be affixed in functional relation to the upper 23 using self-adhesive, VELCRO® hook and pile, or other mechanical means which can possibly include the use of a fastener 29. The article of footwear can also a include a superior spring element 47 and an insole 31 positioned inside the upper 23 that are not visible in the side view.

FIG. 577 is a lateral side view of an article of footwear 22 resting on a ground support surface 117 similar to that shown in FIG. 576 including an upper 23, external heel counter 24, an inferior spring element 50, a posterior outsole element 46, a fastener 29, an anterior outsole element 44 including a pocket for receiving the anterior portion of an inferior spring element 50, toe counter 183, front tab 187, frame 185, and bump stop 186. Unlike the embodiment shown in FIG. 576, the toe counter 183 extends over a portion of the superior side of the upper 23. Also shown is a sidewall 184 which extends above the frame 18 about a portion of the lateral side of the article of footwear 22. The external heel counter 24, frame 185, sidewall 184 and toe counter 183 can consist of individual components or can alternatively be made in partial or complete combination. It can be advantageous to make the external heel counter 24 of a plastic material including fiber filler, or a carbon fiber composite material as such can provide a relatively stiff and lightweight component, whereas the toe counter 183, sidewall 184 and frame 185 can be made of a more flexible plastic material or foam material. The toe counter 183, frame 185, sidewall 184 and heel counter 24 can be affixed to the upper 23 by conventional adhesives, or alternatively bonded, or fused thereto such as by injection molding. Likewise, the anterior outsole element 44 can be can be affixed to the upper 23 by conventional adhesives, or alternatively bonded, or fused thereto such as by direct injection molding. Alternatively, the anterior outsole element 44 can be affixed in functional relation to the upper 23 using self-adhesive, VELCRO® hook and pile, or other mechanical means which can possibly include the use of a fastener 29. The article of footwear can also a include a superior spring element 47 and an insole 31 positioned inside the upper 23 that are not visible in the side view.

FIG. 578 is a lateral side view of an article of footwear 22 resting on a ground support surface 117 similar to that shown in FIG. 576 including an upper 23, external heel counter 24, an inferior spring element 50, a posterior outsole element 46, a fastener 29, an anterior outsole element 44 including a pocket for receiving the anterior portion of an inferior spring element 50, toe counter 183, front tab 187, frame 185, and bump stop 186. Unlike the embodiment shown in FIG. 576, the toe counter 183 extends over a portion of the superior side of the upper 23. Also shown is a sidewall 184 includes a plurality of integral straps 118 that extends above the frame 185 about a substantial portion of the lateral side 36 of the article of footwear 22. The external heel counter 24, frame 185, sidewall 184 and toe counter 183 can consist of individual components or can alternatively be made in partial or complete combination. It can be advantageous to make the external heel counter 24 of a plastic material including fiber filler, or a carbon fiber composite material as such can provide a relatively stiff and lightweight component, whereas the toe counter 183, sidewall 184 and frame 185 can be made of a more flexible plastic material or foam material. The toe counter 183, frame 185, sidewall 184 and heel counter 24 can be affixed to the upper 23 by conventional adhesives, or alternatively bonded, or fused thereto such as by injection molding. Likewise, the anterior outsole element 44 can be can be affixed to the upper 23 by conventional adhesives, or alternatively bonded, or fused thereto such as by direct injection molding. Alternatively, the anterior outsole element 44 can be affixed in functional relation to the upper 23 using self-adhesive, VELCRO® hook and pile, or other mechanical means which can possibly include the use of a fastener 29. The article of footwear can also a include a superior spring element 47 and an insole 31 positioned inside the upper 23 that are not visible in the side view.

FIG. 579 is a lateral side cross sectional view of an article of footwear 22 resting on a ground support surface 117 similar to that shown in FIG. 576 including an upper 23, external heel counter 24, an inferior spring element 50, a posterior outsole element 46 including a backing 30, a posterior spacer 42, a fastener 29 including a male part 85 and a female part 86 having at least one receptacle 168 for use with a tool such an allen or star drive, a wear prevention insert 130, an anterior outsole element 44 including a pocket for receiving the anterior portion of an inferior spring element 50, toe counter 183, front tab 187, frame 185, and bump stop 186. The external heel counter 24, frame 185, and toe counter 183 can consist of individual components or can alternatively be made in partial or complete combination. It can be advantageous to make the external heel counter 24 of a plastic material including fiber filler, or a carbon fiber composite material as such can provide a relatively stiff and lightweight component, whereas the toe counter 183 and frame 185 can be made of a more flexible plastic material or foam material. The toe counter 183, frame 185, and heel counter 24 can be affixed to the upper 23 by conventional adhesives, or otherwise bonded or fused thereto such as by injection molding. Alternatively, the heel counter 24 can be a separate component which is removable and replaceable. Likewise, the anterior outsole element 44 can be can be affixed to the upper 23 by conventional adhesives, or alternatively bonded, or fused thereto such as by direct injection molding. Alternatively, the anterior outsole element 44 can be affixed in functional relation to the upper 23 using self-adhesive, VELCRO® hook and pile, or other mechanical means which can possibly include the use of a fastener 29. The article of footwear also includes a superior spring element 47 and an insole 31 positioned inside the upper 23. As shown, the superior spring element 47 consists of a posterior spring element 49 and extends for only approximately 50 percent of the length of the article of footwear 22 between the posterior side 34 and anterior side 33, thus posterior of the approximate position of the first metatarsal-phalangeal joint 88 and fifth metatarsal-phalangeal joint 89 of a wearer's foot.

FIG. 580 is a lateral side cross sectional view of an article of footwear 22 resting on a ground support surface 117 similar to that shown in FIG. 579, but instead including a superior spring element 47 consisting of a posterior spring element 49 that extends between the posterior side 34 and anterior side 33, thus posterior of the approximate position of the first metatarsal-phalangeal joint 88 and fifth metatarsal-phalangeal joint 89 of a wearer's foot. When a superior spring element 47 that extends for substantially the full length of the upper 23 of the article of footwear 22 is not used, it can be advantageous and necessary to use a superior spring element 47 that extends in the range at least between 50-60 percent in order to maintain both the integrity and functionality of the article of footwear 22. Alternatively, a relatively inflexible or rigid heel counter 24 that extends in the range at least between 50-60 percent of the length of the upper 23 can be used alone or in combination with a superior spring element 47.

FIG. 581 is a bottom view of the article of footwear 22 shown in FIG. 579 showing the position of the superior spring element 47 consisting of a posterior spring element 49 in phantom using dashed lines relative to the position of the inferior spring element 50.

FIG. 582 is a lateral side view of an article of footwear 22 resting on a ground support surface 117 similar to that shown in FIG. 576, but including a heel counter 24 that extends more anteriorly for approximately 50 percent of the length of the upper 23. For reference purposes, the position of the heel counter 24 shown in FIG. 576 is represented using phantom dashed lines.

FIG. 583 is a lateral side view of an article of footwear 22 resting on a ground support surface 117 similar to that shown in FIG. 582, but including a heel counter 24 that extends more anteriorly for approximately 55 percent of the length of the upper 23.

FIG. 584 is a lateral side view of an article of footwear 22 resting on a ground support surface 117 similar to that shown in FIG. 582, but including a heel counter 24 that extends more inferiorly and includes a pocket 131 for receiving the anterior portion of an inferior spring element 50. Further, the heel counter 24 can also include a pocket 131 for receiving a posterior portion of the anterior outsole element 44.

FIG. 585 is a lateral side view of an article of footwear 22 resting on a ground support surface 117 similar to that shown in FIG. 584, but including a heel counter 24 that extends both more forwards or anteriorly for approximately 55 percent of the length of the upper 23, and also more upwards or superiorly. Further, the heel counter 24 includes an opening 72 for receiving a portion of a strap 118.

FIG. 586 is a lateral side view of an article of footwear 22 resting on a ground support surface 117 similar to that shown in FIG. 584, but including an anterior outsole element 44 that extends more posteriorly and includes a posterior bevel 197.

FIG. 587 is a lateral side view of an article of footwear 22 resting on a ground support surface 117 similar to that shown in FIG. 583, but including a heel counter 24 that includes a pocket for receiving the anterior portion of an inferior spring element 50, and an anterior outsole element 44 that extends more posteriorly and includes a posterior bevel 197.

FIG. 588 is a bottom view of the article of footwear 22 shown in FIG. 580 showing the position of the superior spring element 47 consisting of a posterior spring element 49 in phantom using dashed lines relative to the position of the inferior spring element 50.

FIG. 589 is a bottom view an the article of footwear 22 similar to that shown in FIG. 605 showing the position of a superior spring element 47 that extends substantially the full length of the upper 23 in phantom using dashed lines relative to the position of the inferior spring element 50.

FIG. 590 is a posterior view of the article of footwear 22 shown in FIG. 576.

FIG. 591 is a posterior view of the article of footwear 22 shown in FIG. 582.

FIG. 592 is an anterior view of the article of footwear 22 shown in FIG. 576.

FIG. 593 is a lateral side view of an article of footwear 22 having a sole 32 including a hook 27 for inserting into an opening 72 in the upper 23 and toe counter 183. A sole 32 can include a midsole, outsole, and cushioning means in partial or complete combination, and can be removably secured to the article of footwear 22. A toe counter can include male mechanical engagement means such as a hook, snap, or tongue, or female mechanical engagement means such as an opening for affixing or securing the sole 32. As shown, a sole 32 can extend full length and be affixed in functional relation to cushioning means such as an inferior spring element and also to the upper 23 with the use of fastening means such as a fastener 29.

FIG. 594 is an anterior view of the article of footwear 22 shown in FIG. 593 showing the anterior outsole element 44 including a hook 27 that has been inserted in functional relation within an opening 72 in the upper 23 and toe counter 183. The anterior outsole element 44 can thereby be mechanically engaged and removably secured near the anterior end 33 of the article of footwear 22.

FIG. 595 is a lateral side view of an article of footwear 22 resting on a ground support surface 117 similar to that shown in FIG. 579, but including an anterior outsole element 44 including an opening 72 for receiving a hook 27 extending from the upper 23 and toe counter 183. The anterior outsole element 44 can thereby be mechanically engaged and removably secured near the anterior end 33 of the article of footwear 22.

FIG. 596 is an anterior view of the article of footwear 22 shown in FIG. 593 showing the anterior outsole element 44 including an opening 72 for receiving a hook 27 that extends from the upper 23 and toe counter 183 which has been inserted in functional relation within the opening 72. The anterior outsole element 44 can thereby be mechanically engaged and removably secured near the anterior end 33 of the article of footwear 22.

FIG. 597 is a lateral side view of an article of footwear 22 resting on a ground support surface 117 similar to that shown in FIG. 579, but including an anterior outsole element 44 including an opening 72 for receiving a snap 188 extending from the upper 23 and toe counter 183. The anterior outsole element 44 can thereby be mechanically engaged and removably secured near the anterior end 33 of the article of footwear 22.

FIG. 598 is an anterior view of the article of footwear 22 shown in FIG. 593 showing the anterior outsole element 44 including an opening 72 for receiving a snap 188 that extends from the upper 23 and toe counter 183 which has been inserted in functional relation within the opening 72. The anterior outsole element 44 can thereby be mechanically engaged and removably secured near the anterior end 33 of the article of footwear 22.

FIG. 599 is a lateral side cross sectional view of an article of footwear 22 resting on a ground support surface 117 similar to that shown in FIG. 586, but including an anterior outsole element 44 including an opening 72 for receiving a hook 27 that extends from the upper 23 and toe counter 183 which has been inserted in functional relation within the opening 72. Further, the anterior outsole element 44 also includes a self-adhesive surface 83 for affixing the anterior outsole element 44 in functional relation to the upper 23. As shown, the upper 23 can also possibly include a frame 185, sidewall 184, toe counter 183, and heel counter 24. The anterior outsole element 44 can thereby be removably secured to the article of footwear 22.

FIG. 600 is a lateral side cross sectional view of an article of footwear 22 resting on a ground support surface 117 similar to that shown in FIG. 586, but including an anterior outsole element 44 including an opening 72 for receiving a hook 27 that extends from the upper 23 and toe counter 183 which has been inserted in functional relation within the opening 72. Further, the anterior outsole element 44 also includes hook and pile such as VELCRO® for affixing the anterior outsole element 44 in functional relation to the upper 23. As shown, the upper 23 can also possibly include a frame 185, sidewall 184, toe counter 183, and heel counter 24. The anterior outsole element 44 can thereby be removably secured to the article of footwear 22.

FIG. 601 is a lateral side cross sectional view of an article of footwear 22 resting on a ground support surface 117 similar to that shown in FIG. 586, but including an anterior outsole element 44 including a plurality of openings 72 for receiving a plurality of hooks 27 which can be inserted in functional relation within the openings 72. As shown, the upper 23 can possibly include a frame 185, sidewall 184, toe counter 183, and heel counter 24, and a plurality of hooks 27 can extend from one or more of these structures and be inserted and mechanically engaged in functional relation to the anterior outsole element 44. As shown, the hooks 27 can extend anteriorly, or alternatively they can extend posteriorly, sideways, or in any other orientation suitable for the purpose of mechanically engaging corresponding mating openings 72. It can be readily understood that the anterior outsole element 44 could alternatively include hooks 27 or other male features or components, and that the upper 23, toe counter 183, frame 185, and heel counter 24 could instead include openings 72 or other female features or components. Alternatively, or in addition to hooks 27 and openings 72, other male and female mating components can be used as mechanical means for affixing the outsole 43 in functional relations to the upper 23 of an article of footwear 22. Further, the anterior outsole element 44 can also be secured by at least one fastener 29 which can prevent the anterior outsole element 44 from shifting position and thereby possibly becoming disengaged. The anterior outsole element 44 can thereby be removably secured to the article of footwear 22.

FIG. 602 is a lateral side cross sectional view of an article of footwear 22 resting on a ground support surface 117 similar to that shown in FIG. 586, but including an anterior outsole element 44 including a plurality of openings 72 for receiving at least one hook 27 which can be inserted in functional relation within the anteriormost opening 72. As shown, the upper 23 can possibly include a frame 185, sidewall 184, toe counter 183, and heel counter 24, and at least one hook 27 and a plurality of snaps 188 can extend from one or more of these structures and be inserted and mechanically engaged in functional relation to the anterior outsole element 44. It can be readily understood that the anterior outsole element 44 could alternatively include hooks 27, snaps 188 or other male features or components, and that the upper 23, toe counter 183, frame 185, and heel counter 24 could instead include openings 72 or other female features or components. Alternatively, or in addition to hooks 27, snaps 188, and openings 72, other male and female mating components can be used as mechanical means for affixing the outsole 43 in functional relations to the upper 23 of an article of footwear 22. Further, the anterior outsole element 44 can also be secured by at least one fastener 29 which can prevent the anterior outsole element 44 from shifting position and thereby possibly becoming disengaged. The anterior outsole element 44 can thereby be removably secured to the article of footwear 22.

FIG. 603 is a lateral side cross sectional view of an article of footwear 22 resting on a ground support surface 117 similar to that shown in FIG. 586, but including an anterior outsole element 44 including a plurality of grooves 196 for receiving a plurality of tongues 195 which can be inserted in functional relation therein. As shown, the upper 23 can possibly include a frame 185, sidewall 184, toe counter 183, and heel counter 24, and at least one tongue 195 can extend from one or more of these structures and be inserted and mechanically engaged in functional relation to grooves 196 included in the anterior outsole element 44. It can be readily understood that the anterior outsole element 44 could alternatively include at least one tongue 195 or other male features or components, and that the upper 23, toe counter 183, frame 185, and heel counter 24 could instead include at least one groove 196 or other female features or components. Alternatively, or in addition to tongues 195 and grooves 196, other male and female mating components can be used as mechanical means for affixing the outsole 43 in functional relations to the upper 23 of an article of footwear 22. Further, the anterior outsole element 44 can also be secured by at least one fastener 29 which can prevent the anterior outsole element 44 from shifting position and thereby possibly becoming disengaged. The anterior outsole element 44 can thereby be removably secured to the article of footwear 22.

FIG. 604 is a lateral side cross sectional view of an article of footwear 22 resting on a ground support surface 117 similar to that shown in FIG. 586, but including an anterior outsole element 44 including a plurality of pin channels 191 for receiving a plurality of mating pins 190 which can be inserted in functional relation therein. As shown, the upper 23 can possibly include a frame 185, sidewall 184, toe counter 183, and heel counter 24, and at least one pin 190 can extend from one or more of these structures and be inserted and mechanically engaged in functional relation to mating pin channels 191 included in the anterior outsole element 44. It can be readily understood that the anterior outsole element 44 could alternatively include at least one pin 190 or other male features or components, and that the upper 23, toe counter 183, frame 185, and heel counter 24 could instead include at least one pin channel 191 or other female features or components. Alternatively, or in addition to pins 190 and pin channels 191, other male and female mating components can be used as mechanical means for affixing the outsole 43 in functional relations to the upper 23 of an article of footwear 22. Further, the anterior outsole element 44 can also be secured by at least one fastener 29 which can prevent the anterior outsole element 44 from shifting position and thereby possibly becoming disengaged. The anterior outsole element 44 can thereby be removably secured to the article of footwear 22.

FIG. 605 is a lateral side cross sectional view of an article of footwear 22 resting on a ground support surface 117 similar to that shown in FIG. 601 including an anterior outsole element 44 including a plurality of openings 72 for receiving a plurality of hooks 27 which can be inserted in functional relation within the openings 72. As shown, the upper 23 can possibly include a frame 185, sidewall 184, toe counter 183, heel counter 24, and a superior spring element 47 and/or lasting board 79 including a plurality of hooks 27 which can be inserted and mechanically engaged in functional relation to the anterior outsole element 44. As shown, the hooks 27 can extend anteriorly, or alternatively they can extend posteriorly, sideways, or in any other orientation suitable for the purpose of mechanically engaging corresponding mating openings 72. It can be readily understood that the anterior outsole element 44 could alternatively include hooks 27 or other male features or components, and that the upper 23, toe counter 183, frame 185, heel counter 24, and superior spring element 47 and/or lasting board 79 could instead include openings 72 or other female features or components. Alternatively, or in addition to hooks 27 and openings 72, other male and female mating components can be used as mechanical means for affixing the outsole 43 in functional relations to the upper 23 of an article of footwear 22. Further, the anterior outsole element 44 can also be secured by at least one fastener 29 which can prevent the anterior outsole element 44 from shifting position and thereby possibly becoming disengaged. The anterior outsole element 44 can thereby be removably secured to the article of footwear 22.

FIG. 606 is a lateral side view of an article of footwear 22 resting on a ground support surface 117 similar to that shown in FIG. 603, but further including a heel counter channel 194 for receiving and mechanically engaging the superior portion of the heel counter 24. Also shown is an intelligent cushioning device 189 that can include mechanical means for being removably secured to the article of footwear 22. For example, the intelligent cushioning device 189 can be secured in functional relation to the inferior spring element 50 and fastener 29. Further, the intelligent cushioning device 189 can be removably secured to and/or consist of a portion of a posterior spacer 42. The intelligent cushioning device 189 can include a fluid-filled bladder and be made in accordance with the teachings of U.S. Pat. Nos. 6,892,477 and 6,430,843 by Daniel Potter and Allan Schrock assigned to Nike, Inc., and the like, both of these patents hereby being incorporated by reference herein. Alternatively, an intelligent cushioning device 189 can include adjustable elements and be made in accordance with the teachings of U.S. patent application Ser. No. 10/385,300 published as US 20040177531 by Christian DiBenedetto et al. assigned to Adidas International Marketing B.V., and the like, this patent hereby being incorporated by reference herein.

FIG. 607 is a bottom view of an article of footwear 22 which is generally similar to that shown in FIGS. 601 and 605 having a portion of the anterior outsole element 44 broken away to show a hook 27 inserted into an opening 72 and mechanically engaged with a portion of the anterior outsole element 44. Further, a plurality of other hooks 27 which are inserted in openings 72 and mechanically engaged in functional relation to the anterior outsole element 44 are shown in phantom using dashed lines.

FIG. 608 is a bottom view of an article of footwear 22 which is generally similar to that shown in FIG. 602 having a portion of the anterior outsole element 44 broken away to show a snap 188 inserted into an opening 72 and mechanically engaged with a portion of the anterior outsole element 44. Further, a plurality of other snaps 188 which are inserted in openings 72 and mechanically engaged in functional relation to the anterior outsole element 44 are shown in phantom using dashed lines.

FIG. 609 is a bottom view of the article of footwear 22 shown in FIG. 603 taken along line 609-609 showing a portion of the anterior outsole element 44 broken away to show a plurality of tongues 195 and grooves 196 mechanically engaged and removably securing a portion of the anterior outsole element 44 in functional relation with the upper 23 of the article of footwear 22.

FIG. 610 is a bottom view of the article of footwear 22 shown in FIG. 604 taken along line 610-610 showing a portion of the anterior outsole element 44 broken away to show a plurality of pins 190 and pin channels 191 mechanically engaged and removably securing a portion of the anterior outsole element 44 in functional relation with the upper 23 of the article of footwear 22.

FIG. 611 is a cross sectional view of the article of footwear shown in FIG. 609 taken along line 611-611 showing a plurality of tongues 195 and grooves 196 mechanically engaged and removably securing a portion of the anterior outsole element 44 in functional relation with the upper 23 of the article of footwear 22.

FIG. 612 is an anterior view of an article of footwear 22 which consists of a boot for outdoor recreation and also possible military use. As shown, the upper 23 can include a collar 122, tongue 37 or elastic fit sleeve, eyestays 139, quarter 119 vamp 52. The sole 32 can include a midsole 26, sidewall 184, an outsole 43 having an anterior transverse groove 199, a longitudinal groove 198, and a front tab 187 including a front tab groove 224.

FIG. 613 is a posterior view of the article of footwear 22 shown in FIG. 612. As shown, the upper 23 can include a collar 122, tongue 37 or elastic fit sleeve, sidewall 184 and heel counter 24. Also shown is an inferior spring element 50, a posterior spacer 42 which can be made of foam material 134, a sole 32 including an outsole 43 having a backing 30 including a pocket 131.

FIG. 614 is a cross-sectional medial side view 35 of the article of footwear 22 shown in FIG. 612. As shown, the upper 23 can include an internal toe counter 183, tongue 127 or elastic fit sleeve, eyestays 139, collar 122, quarter 119, vamp 52, and backtab hold 225 for possible use with accessories such as crampons, skis, or snowshoes. Also shown is an internal heel counter 24, superior spring element 47, inferior spring element 50, wear prevention insert 130, and fastener 29 including male 85 and female 86 portions. Further, the sole 32 can include a midsole 26, and outsole 43 including an anterior outsole element 44 and posterior outsole element 46. The anterior outsole element 44 can include a front tab 187 including a front tab groove 224 for possible use with accessories such as crampons, skis, or snowshoes. The posterior outsole element 46 can include a backing 30 having a pocket 131 for mechanical engagement with the inferior spring element 50. As shown, posterior spacer 42 can be made of a foam material 134, and can partially or completely occupy the void space that could otherwise exists between the superior side of the inferior spring element 50 and inferior side of the upper 23, thus can prevent barbed wire or other objects from catching or becoming snagged therebetween. The semi-circular recessed area of the sole 32 adjacent the fastener 29 can be advantageous when using rope bridges and ladders. The article of footwear 22 includes an upper 23 which has been over-lasted, that is, the upper 23 enjoys a configuration and sufficient volume to have the ability to accommodate a wearer having a larger foot size, and in particular, the upper 23 has the ability to accommodate different footwear components such as insoles 31, liners, fit-sleeves, slippers, socks, or alternate articles of footwear therein. For example, the insole 31 can include elevated portions on the anterior, posterior, medial side and lateral side having a thickness of approximately 5 mm, and a thickness on the inferior side of approximately 10 mm, but other dimensions are possible. In an alternate embodiment, an insole 31 having substantial thickness can thereby afford some or all of the cushioning normally provided by the midsole 26 of an article of footwear 22, and as a result the midsole 26 positioned on the external side of the upper 23 can be reduced in thickness or even eliminated. The aforementioned structure and method of over-lasting and substituting footwear components can be used with many different kinds of shoes and boots including but not limited to athletic shoes and military boots.

FIG. 615 is a cross-sectional lateral side view 36 of the article of footwear 22 shown in FIG. 612. As shown, the inferior spring element 50 can have a different configuration on the lateral side 36 relative to the medial side 35, and in particular, such can provide greater stiffness on the medial side 35 when loaded and compressed for enhancing biomechanical stability during movement.

FIG. 616 is a bottom view of the article of footwear shown in FIG. 612. As shown, the sole 32 can include an outsole 43 having an anterior transverse groove 199 and a metatarsal-phalangeal joint transverse groove 200, and also a longitudinal groove 198 which can be associated with lines of flexion 54. Further, the longitudinal groove 198 and/or anterior transverse groove 199 can be used to mechanically mate with complementary mating structures on accessories such as bindings, fins, crampons, snow shoes, and skis.

FIG. 617 is a bottom view of the inferior spring element 50 shown in FIGS. 614 and 615. As shown, the inferior spring element 50 includes a flexural axis 59 that is offset approximately 20 degrees from its transverse axis which coincides with the anterior tangent point or line 160, and also a posterior tangent point or line 161 as previously defined within this document.

FIG. 618 is a bottom view of the posterior outsole element 46 shown in position on the inferior spring element 50 shown in FIG. 616.

FIG. 619 is a medial side view of an aquatic boot 201 similar to that used by Navy SEAL Team members for use with the article of footwear shown in FIGS. 612-616. In particular, the conventional insole 31 can be removed and the aquatic boot 201 can then be used instead within the article of footwear 22. This can be advantageous, e.g., when soldiers will be landing on beaches or otherwise exposed to cold water conditions. Further, it can be readily understood that a wearer can use the aquatic boot 201, and then quickly don the article of footwear 22, and vice-versa, as desired. The aquatic boot 201 can include an upper made of a textile laminated neoprene 202, an elastic material 203 near the collar 122, and a rubber outsole 43.

FIG. 620 is a medial side 35 view of a cold temperature slipper or liner 205 for use with the article of footwear shown in FIGS. 612-616. The slipper or liner 205 can be made of a textile covered Thinsulate material, or the like, and can also include closure means such as elastic 203, and an outsole 43.

FIG. 621 is a medial side 35 view of a hot and wet climate slipper or liner 232 for use with the article of footwear shown in FIGS. 612-616. As shown, the hot and wet climate slipper or liner 232 can have a upper 23 made of a substantially waterproof material 211, a collar 112 including an elastic material 203, a ventilating insole 206, and also a ventilating tongue or snorkel 207. The ventilating insole 206 and ventilating tongue or snorkel 207 can permit heat and moisture to escape from the interior of the hot and wet climate slipper or liner 232. Further, the collar 122 is flippable as between an up and down position. In the up position, the ventilating tongue or snorkel 207 and interior of the hot and wet climate slipper or liner 232 is effectively sealed off by the collar 122 which includes elastic material 203. This can be advantageous when walking in deep water or muddy conditions as the wearer's feet can remain clean and relatively dry. In the down position, the ventilating tongue or snorkel 207 and interior of the hot and wet climate slipper or liner 232 is in communication with the exterior environment and prevent undue heat and moisture build-up therein.

FIG. 622 is a lateral side 36 view of a rock climbing shoe 231 having an upper including a tongue 127, eyestays 139, collar 122, quarter 119, vamp 52, and an outsole 43 made of a durable rubber compound. Alternatively, a conventional article of footwear could similarly be used with the article of footwear consisting of a boot shown in FIGS. 612-616, and the like.

FIG. 623 is a top view of a fin 212 for use with the article of footwear 22 shown in FIGS. 612-616.

FIG. 624 is a side view of a ski 213 for use with the article of footwear 22 shown in FIGS. 612-616. As shown, the article of footwear 22 can be secured to the ski 213 with the use of a ski binding 214. The ski 213 can break down into two parts, that is, the anterior limb 215 and posterior limb 216, and these can be secured with the use of ski lock 217. The ski 213 can include a longitudinal rib 222 which can mate with the longitudinal groove 198 present within the outsole 43 of the article of footwear 22, and also a skin tail binding 221.

FIG. 625 is a top perspective view of a ski skin 218 for possible use with the ski 213 shown in FIG. 624. The skin 218 can include a hoop 219 for looping over and mechanically engaging the tip 233 of the ski 213 and also a skin tail 220 which can then be inserted therethrough and secured by the skin tail binding 221.

FIG. 626 is a top view of the ski 213 shown in FIG. 624 including an article of footwear 22 similar to that shown in FIGS. 612-616 secured by ski binding 214.

FIG. 627 is a top view of the ski 213 shown in FIG. 624 including an illustration of the outsole 43 of an article of footwear 22 similar to that shown in FIGS. 612-616 shown in position as if the article of footwear 22 was secured by ski binding 214. As shown, the longitudinal groove 198 of the outsole 43 can mate with the longitudinal rib 222, and the anterior transverse groove 200 with the transverse rib 234 of the ski 213.

FIG. 628 is a side view of the article of footwear 22 shown in FIGS. 612-616 secured by a snowshoe binding 226 to a snowshoe 227.

FIG. 629 is a perspective view of a crampon 228 for possible use with the article of footwear 22 shown in FIGS. 612-616. The hoop 229 of the crampon 228 can be mechanically engaged with the front tab groove 224, and the catch 230 can be mechanically engaged with the back tab hold 225 of the article of footwear 22.

The upper 23 of the article of footwear can be substantially made without the need for substantial hand stitching or other labor intensive techniques, and so it can be made economically in the United States, or otherwise near the intended market. Again, the capability of the upper 23 to possibly serve a range of length sizes further simplifies manufacturing, supply, and inventory. Further, as previously discussed, if desired, a substantial portion of an article of footwear 22, that is, greater than fifty percent, and preferably greater than seventy-five percent, and most preferably substantially all of the other major components of the article of footwear can be removably assembled and secured in functional relation to the upper 23 to make a custom article of footwear 22 within minutes. Again, the upper 23 can be substantially made of recyclable and/or biodegradable materials, and substantially all the other various footwear components can also be made of materials that are recyclable.

Given the teachings and substantial disclosure of the present invention in this specification and the associated drawing figures, it can be readily understood that at least some of the following article of footwear component selection options can be provided to a wearer or customer, e.g., via an Internet website, a cell phone, a remote manufacturing or distribution site, a medical facility, or a retail establishment. Moreover, many other selection options are possible. Again, the present invention teaches an article of footwear that can be rapidly assembled and customized in response to an individual's selections. The following is one example of a component selection guide for the method of making a custom article of footwear according to the present invention.

Component Selection Guide for Making a Custom Article of Footwear

- Article of Footwear 22
  - Category/Activity
    - Running
      - Road Running
      - Trail Running
      - Road Racing
      - Track & Field
    - Basketball
    - Tennis
    - Volleyball
    - Cross-Training
    - Walking
    - Baseball
      - Artificial
      - Natural Grass
    - Football
      - Artificial
      - Natural Grass
    - Golf
    - Sandal
    - Soccer
      - Indoor
      - Outdoor
      - Detachable Cleats
    - Cycling
      - Shimano System
      - Speedplay System
- Upper 23
  - Size Length
  - Size Width
  - Style
    - Footshape
    - Low
    - Mid
    - High
    - Boot
    - Other
  - Type
    - Standard Forefoot Outsole
    - 3D Wrap Forefoot Outsole
    - Laces
    - Stretchable Upper
    - Straps
    - Rearfoot Opening
    - Adjustable Width & Girth
- Laces 121
  - Size Length
    - Short (Low Upper)
    - Medium (Mid Upper)
    - Long (High Upper)
- Straps 118
  - Size Length
  - Size Width
  - Style
    - VELCRO D-Ring
    - Laces
    - VELCRO D-Ring Plus Heel Strap
    - Laces Plus Heel Strap
    - Laces Plus Midfoot Stabilizer
    - Other
- Insole 31
  - Size Length
  - Size Width
  - Style
  - Footshape
  - Type
    - Standard Forefoot Outsole
    - 3D Wrap Forefoot Outsole
    - Competition
    - Training
    - Customized Light Cure
- Anterior Spring Element 48
  - Size Length
  - Size Width
  - Style
  - Footshape
  - Type
    - Single Anterior Spring Element
      - Curvature (Toe Spring)
        - 10 mm
        - 20 mm
        - 30 mm
      - Flex Notch Pattern
        - MPJ Flex
        - Other
        - None (Cycling/Skating)
    - Double Anterior Spring Element

- Anterior Spacer
  - Neutral
  - Pronator
  - Supinator
- Flex Notch Pattern
  - MPJ Flex
  - Other
  - None (Cycling/Skating)
- Thickness/Stiffness For Approximate Body Weight
  - 0.75 mm/80-100 lbs
  - 1.0 mm/100-120 lbs
  - 1.25 mm/120-160 lbs
  - 1.5 mm/160-180 lbs
  - 1.75 mm/180-200 lbs
  - 2.0 mm/200-220 lbs Anterior Outsole Element 44
- Size Length
- Size Width
- Style
  - Footshape
  - Type
  - Single Anterior Spring Element
    - Standard Forefoot Outsole
    - 3D Wrap Forefoot Outsole
    - Gasket
    - Flex Notch Pattern
      - MPJ Flex
      - Other
      - None (Cycling/Skating)
  - Double Anterior Spring Element
    - Neutral
    - Pronator
    - Supinator
    - Window for Foam Columns
    - Window for Fluid-Filled Bladder
    - Flex Notch Pattern
      - MPJ Flex
      - Other
      - None (Cycling/Skating)

Inferior Spring Element 50
- Size Length
- Size Width
- Type
  - Pronator
  - Neutral
  - Supinator
- Total Deflection of Inferior Spring Element
  - 10 mm
  - 12 mm
  - 14 mm
  - 16 mm
  - 18 mm
  - Other
- Curvature
  - Symmetrical
  - Asymmetrical
- Thickness/Stiffness For Approximate Body Weight
  - Note: This can vary greatly depending upon the configuration of an inferior spring element. For example, given an inferior spring element having a length in the range between 4.75-5.5 inches, a maximum width in the range between 75-80 mm, an anterior curve having a fitted symmetrical radius of curvature in the range between approximately 2.25 and 3.0 inches, a tapered posterior portion, and a posterior curve having a radius of curvature of approximately 9 inches, the following general guidelines could apply:
  - 4.0 mm/100-120 lbs
  - 4.25 mm/120-140 lbs
  - 4.5 mm/140-160 lbs
  - 4.75 mm/160-180 lbs
  - 5.0 mm/180-200 lbs
  - 5.25 mm/200-220 lbs Posterior Outsole Element 46
- Size Length
- Size Width
- Type
  - Pronator
  - Neutral
  - Supinator
- Style
  - No Cushioning Element
  - Front Cushioning Element
    - Fluid-Filled Bladder
    - Foam Cushioning Element
  - Rear Cushioning Element
  - Fluid-Filled Bladder
    - Foam Cushioning Element
  - Rear Window for Foam Cushioning Element
  - Rear Window for Fluid-Filled Bladder Posterior Spring Element 49
- Size Length
- Size Width
- Arch Characteristics
  - Normal
  - High
  - Flat
- Style
  - Flat
  - Side Heel Counters
  - Full Heel Counter
  - Rearfoot Window
- Thickness/Stiffness For Approximate Body Weight (Full Heel Counter)
  - 2.0 mm/100-140 lbs
  - 2.5 mm/140-180 lbs
  - 3.0 mm/180-220 lbs External Heel Counter 24
- Thickness/Stiffness For Approximate Body Weight
  - 2.0 mm/100-140 lbs
  - 2.5 mm/140-180 lbs
  - 3.0 mm/180-220 lbs Middle Outsole Element 45
- Size Length
- Size Width
- Type
  - Fluid-Filled Bladder
  - Foam Cushioning Element Fastener(s) 29

Primary Fastener Style
- Threaded
- Quick-Release
- Sizes
- 10 mm
- 12 mm
- Other Anterior Spring Fastener Style
- Threaded
- Quick-Release
- Sizes
- 6 mm 8 mm
Other
Adjustable Width & Girth Fastener Style
Threaded
Quick Release
Snap Rivet
Push Rivet
Sizes
3 mm
4 mm
Other While the above detailed description of the invention contains many specificities, these should not be construed as limitations on the scope of the invention, but rather as exemplifications of several preferred embodiments thereof. It can be readily understood that the various teachings, alternate embodiments, methods and processes disclosed herein can be used in various combinations and permutations. For example, a spring element can consist of a heel counter and inferior spring element and be provided as a single integral footwear component. Alternatively, a spring element can consist of a heel counter, superior spring element, and inferior spring element and be provided as a single integral component. Many other variations are possible. Accordingly, the scope of the invention should be determined not by the embodiments discussed or illustrated, but by the appended claims and their legal equivalents.

I claim:

1. An article of footwear comprising an anterior side, a posterior side, a medial side, a lateral side, a superior side, an inferior side, a rearfoot area, a midfoot area, a forefoot area, an upper comprising a bottom side, a heel counter, and a spring element, said spring element comprising a superior spring element and a plurality of integrally formed inferior spring elements projecting downwardly and rearwardly from said superior spring element, said superior spring element comprising a top side and extending substantially between said anterior side and said posterior side of said article of footwear and said top side of said superior spring element being connected to said bottom side of said upper, said plurality of inferior spring elements each comprising a posteriormost side, a medialmost side, a lateralmost side, a top surface comprising a top curved configuration, a bottom surface comprising a bottom curved configuration and an inferiormost point and a geometric shape, said plurality of inferior spring elements comprising a first inferior spring element located on said medial side and being positioned across from at least one other of said plurality of inferior spring elements comprising a second inferior spring element located on said lateral side and being at least partially separated by a void space located therebetween, said first inferior spring element and said second inferior spring element each being configured to provide a vertical elevation of at least 10 mm from said inferiormost point to said top side of said superior spring element, each of said first inferior spring element and said second inferior spring element being located in at least one of said midfoot area and said rearfoot area, said midfoot area and said rearfoot area therefore both being elevated and capable of deflection, said first inferior spring element located on said medial side comprising a first top surface comprising a first top curved configuration and a first bottom surface comprising a first bottom curved configuration and comprising a first geometric shape, and said second inferior spring element located on said lateral side comprising a second top surface comprising a second top curved configuration and a second bottom surface comprising a second bottom curved configuration and comprising a second geometric shape, said first bottom curved configuration of said first inferior spring element being substantially the same as said second bottom curved configuration of said second inferior spring element, and said first geometric shape of said first inferior spring element being different and asymmetric relative to said second geometric shape of said second inferior spring element.

2. The article of footwear according to claim 1, wherein at least one of said plurality of inferior spring elements comprises a void space located between at least two inferior spring element sub-portions.

3. The article of footwear according to claim 2, further comprising an outsole element connected to and extending between said at least two inferior spring element sub-portions.

4. The article of footwear according to claim 1, further comprising a longitudinal axis and a transverse axis perpendicular to said longitudinal axis, wherein said at least one of said plurality of inferior spring elements projects from said superior spring element along said transverse axis.

5. The article of footwear according to claim 1, further comprising a longitudinal axis, a transverse axis perpendicular to said longitudinal axis, and a flexural axis deviated from said transverse axis less than 50 degrees, wherein at least one of said plurality of inferior spring elements projects from said superior spring element along said flexural axis.

6. The article of footwear according to claim 1, said plurality of inferior spring elements comprising an anterior inferior spring element located in said forefoot area comprising a third bottom surface comprising a third bottom curved configuration different from said second bottom curved configuration of said second inferior spring element located in at least one of said midfoot area and rearfoot area of said article of footwear.

7. The article of footwear according to claim 1, wherein said spring element comprises a V shape.

8. The article of footwear according to claim 1, wherein said bottom curved configuration of at least one of said plurality of inferior spring elements is substantially convex.

9. The article of footwear according to claim 1, said plurality of said inferior spring elements being located at least in said rearfoot area and said forefoot area.

10. The article of footwear according to claim 1, wherein at least one of said plurality of inferior spring elements comprising a different thickness on said medialmost side relative to said lateralmost side.

11. The article of footwear according to claim 1, at least one of said plurality of inferior spring elements comprising a tapered configuration.

12. The article of footwear according to claim 1, wherein said top curved configuration of at least one of said plurality of inferior spring elements is substantially concave.

13. The article of footwear according to claim 1, wherein said at least one of said plurality of inferior spring elements comprises a length of said at least one of said plurality of inferior spring elements on said lateralmost side is different than on said medialmost side.

14. The article of footwear according to claim 1, at least one of said plurality of inferior spring elements further comprising an outsole.

15. The article of footwear of claim 1, wherein at least one of said plurality of integrally formed inferior spring elements comprises a U shape.

16. The article of footwear of claim 1, wherein at least one of said plurality of integrally formed inferior spring elements comprises a J shape.

17. The article of footwear of claim 1, wherein at least one of said plurality of integrally formed inferior spring elements is disposed in at least one of said rearfoot area and said midfoot area.

* * * * *